US00RE39928E

(19) United States
(12) Reissued Patent
Oshima et al.

(10) Patent Number: US RE39,928 E
(45) Date of Reissued Patent: Nov. 27, 2007

(54) COMMUNICATION SYSTEM

(75) Inventors: Mitsuaki Oshima, Kyoto (JP); Seiji Sakashita, Osaka (JP)

(73) Assignee: Matsushita Electric Industrial Co., Ltd., Osaka (JP)

(21) Appl. No.: 09/669,916

(22) Filed: Sep. 25, 2000

Related U.S. Patent Documents

Reissue of:

(64) Patent No.: 5,600,672
Issued: Feb. 4, 1997
Appl. No.: 08/240,521
Filed: May 10, 1994

U.S. Applications:

(60) Division of application No. 09/244,037, filed on Feb. 4, 1999, which is a continuation-in-part of application No. 07/857,627, filed on Mar. 25, 1992, now abandoned.

(30) Foreign Application Priority Data

| | | |
|---|---|---|
| Mar. 27, 1991 | (JP) | 3-62798 |
| Apr. 25, 1991 | (JP) | 3-95813 |
| May 29, 1991 | (JP) | 3-155650 |
| Jul. 23, 1991 | (JP) | 3-182236 |
| Mar. 17, 1992 | (JP) | 4-60739 |
| May 10, 1993 | (JP) | 5-132984 |
| Sep. 24, 1993 | (JP) | 5-261612 |
| Dec. 27, 1993 | (JP) | 5-349972 |
| Mar. 24, 1994 | (JP) | 6-79668 |

(51) Int. Cl.
*H04B 15/00* (2006.01)

(52) U.S. Cl. ..... 375/285; 375/219; 375/270; 375/296; 375/301; 375/321; 375/324; 375/340; 348/554; 348/726

(58) Field of Classification Search ..... 375/261, 375/265, 270, 277, 285, 296, 298, 301, 321, 375/324, 340; 348/554, 726, 608
See application file for complete search history.

(56) References Cited

U.S. PATENT DOCUMENTS 3,824,548 A * 7/1974 Sullivan et al. ..... 714/706

(Continued)

FOREIGN PATENT DOCUMENTS

CA 2095435 5/1992

(Continued)

OTHER PUBLICATIONS

Masafumi Saito et al., "Bit Error Rate Characteristics of OFDM in Multipath Environment", 1991.

(Continued)

*Primary Examiner*—Dac V. Ha
(74) *Attorney, Agent, or Firm*—Wenderoth, Lind & Ponack, L.L.P.

(57) ABSTRACT

At the transmitter side, carrier waves are modulated according to an input signal for producing relevant signal points in a signal space diagram. The input signal is divided into, two, first and second, data streams. The signal points are divided into signal point groups to which data of the first data stream are assigned. Also, data of the second data stream are assigned to the signal points of each signal point group. A difference in the transmission error rate between first and second data streams is developed by shifting the signal points to other positions in the space diagram expressed at least in the polar coordinate system. At the receiver side, the first and/or second data streams can be reconstructed from a received signal. In TV broadcast service, a TV signal is divided by a transmitter into low and high frequency band components which are designated as first and second data streams respectively. Upon receiving the TV signal, a receiver can reproduce only the low frequency band component or both the low and high frequency band components, depending on its capability. Furthermore, a communication system based on an OFDM system is utilized for data transmission of a plurality of subchannels, wherein the subchannels are differentiated by changing the length of a guard time slot or a carrier wave interval of a symbol transmission time slot, or changing the transmission electric power of the carrier.

16 Claims, 178 Drawing Sheets

U.S. PATENT DOCUMENTS 3,909,721 A 9/1975 Bussgang et al.
3,959,726 A 5/1976 Hinoshita et al.
4,003,002 A 1/1977 Snijders et al.
4,048,572 A 9/1977 Dogliotti et al.
4,053,713 A 10/1977 Nitadori
4,077,021 A 2/1978 Csajka et al.
4,227,152 A 10/1980 Godard et al.
4,267,592 A 5/1981 Craiglow
4,271,527 A 6/1981 Armstrong
4,303,939 A * 12/1981 Stephens et al. ..... 348/194
4,303,941 A * 12/1981 Marti et al. ..... 348/467
4,309,726 A * 1/1982 Tanaka et al. ..... 360/32
4,525,846 A 6/1985 Bremer et al.
4,535,352 A 8/1985 Haskell
4,564,858 A 1/1986 Resch
4,581,639 A * 4/1986 Judge ..... 348/192
4,597,090 A 6/1986 Forney, Jr.
4,601,045 A 7/1986 Lubarsky
4,630,287 A 12/1986 Armstrong
4,636,876 A 1/1987 Schwartz
4,751,478 A 6/1988 Yoshida
4,769,819 A 9/1988 Matsutani et al.
4,794,447 A * 12/1988 Tsinberg ..... 375/240.25
4,800,426 A 1/1989 Glenn
4,817,192 A 3/1989 Phillips et al.
4,855,692 A 8/1989 Kennard et al.
4,873,701 A 10/1989 Tretter
4,891,806 A 1/1990 Farias et al.
4,903,125 A 2/1990 Parker
4,912,706 A 3/1990 Eisenberg et al.
4,914,655 A 4/1990 Johannes et al.
4,918,437 A 4/1990 Jasinski et al.
4,937,844 A 6/1990 Kao
4,940,954 A 7/1990 Aubert et al.
4,958,360 A 9/1990 Sari
5,007,088 A 4/1991 Ooi et al.
5,018,198 A 5/1991 Takahashi
5,023,889 A 6/1991 Divsalar et al.
5,029,003 A 7/1991 Jonnalagadda
5,038,219 A 8/1991 Yamashita et al.
5,038,402 A 8/1991 Robbins
5,050,188 A 9/1991 Dirr
5,063,445 A 11/1991 Nishizawa et al.
5,063,452 A 11/1991 Higurashi
5,086,340 A 2/1992 Citta et al.
5,087,975 A 2/1992 Citta et al.
5,105,442 A 4/1992 Wei
5,115,453 A 5/1992 Calderbank et al.
5,124,852 A 6/1992 Suwa et al.
5,128,758 A 7/1992 Azadegan et al.
5,134,464 A 7/1992 Basile et al.
5,136,380 A 8/1992 Cho
5,142,353 A 8/1992 Kageyama et al.
5,146,335 A 9/1992 Kim et al.
5,148,422 A 9/1992 Sako et al.
5,164,963 A 11/1992 Lawrence et al.
5,166,924 A 11/1992 Moose
5,168,509 A 12/1992 Nakamura et al.
5,170,413 A 12/1992 Hess et al.
5,181,112 A 1/1993 Citta et al.
5,197,061 A 3/1993 Halbert-Lassalle et al.
5,210,770 A * 5/1993 Rice ..... 375/142
5,214,656 A * 5/1993 Chung et al. ..... 375/261
5,218,436 A 6/1993 Sugiyama et al.
5,218,622 A 6/1993 Fazel et al.
5,243,629 A 9/1993 Wei
5,267,021 A 11/1993 Ramchandran et al.
5,282,019 A 1/1994 Basile et al.
5,291,289 A 3/1994 Hulyalkar et al.
5,311,547 A 5/1994 Wei
5,311,550 A 5/1994 Fouche et al.
5,377,051 A 12/1994 Lane et al.
5,398,073 A 3/1995 Wei
5,400,084 A 3/1995 Scarpa
5,452,015 A 9/1995 Hulyalkar
5,481,412 A 1/1996 Bannai et al.
5,519,730 A * 5/1996 Jasper et al. ..... 375/260
5,555,275 A * 9/1996 Oshima ..... 375/261
5,561,468 A 10/1996 Bryan et al.
5,565,926 A 10/1996 Bryan et al.
5,565,932 A 10/1996 Gitta et al.
5,576,902 A 11/1996 Lane et al.
5,598,220 A 1/1997 Citta et al.
5,638,112 A 6/1997 Bestler et al.
5,802,241 A * 9/1998 Oshima ..... 386/46
5,819,000 A 10/1998 Oshima
5,892,879 A 4/1999 Oshima
5,999,569 A 12/1999 Oshima
6,049,651 A 4/2000 Oshima
6,256,357 B1 7/2001 Oshima

FOREIGN PATENT DOCUMENTS

CN 1499725 5/2004
CN 2627574 7/2004
CN 1569334 1/2005
EP 0031193 7/1981
EP 0122805 10/1984
EP 0282298 9/1988
EP 0311188 4/1989
EP 0329158 8/1989
EP 0365431 4/1990
EP 0392538 10/1990
EP 0448492 A1 9/1991
EP 0485105 5/1992
EP 0485108 A2 5/1992
EP 0490552 6/1992
EP 0 506 400 9/1992
EP 0506400 A2 9/1992
EP 0525641 A2 2/1993
EP 0531046 A2 3/1993
EP 0540231 A2 5/1993
EP 1528854 5/2005
EP 1529838 5/2005
GB 2 187 611 9/1987
JP 53-108215 9/1978
JP 53-137657 12/1978
JP 57-39629 3/1982
JP 58-107740 6/1983
JP 58-161427 9/1983
JP 58-161547 9/1983
JP 61-70861 4/1986
JP 62-133842 6/1987
JP 62-502932 11/1987
JP 63-28145 2/1988
JP 63-180222 7/1988
JP 63-180280 7/1988
JP 63-253738 10/1988
JP 64-5135 1/1989
JP 64-68144 3/1989
JP 64-74836 3/1989
JP 2-94814 4/1990
JP 2-141049 5/1990
JP 2-154583 6/1990
JP 2-166979 6/1990
JP 2-195732 8/1990
JP 2-218279 8/1990
JP 2-260726 10/1990
JP 3-13145 1/1991
JP 3-48587 3/1991
JP 3-69295 3/1991
JP 04-196822 7/1992

| | | |
|---|---|---|
| JP | 4-322592 | 11/1992 |
| JP | 5-75568 | 3/1993 |
| JP | 5-167633 | 7/1993 |
| JP | 5-218978 | 8/1993 |
| JP | 7-79415 | 3/1995 |
| JP | 7-99522 | 4/1995 |
| JP | 2004-159207 | 6/2004 |
| UA | 52118 | 12/2002 |
| WO | 85/04541 | 10/1985 |
| WO | 86/07223 | 12/1986 |
| WO | 89/08366 | 9/1989 |
| WO | 91/20137 | 12/1991 |
| WO | 92/14343 | 8/1992 |
| WO | 92/22162 | 12/1992 |

OTHER PUBLICATIONS

Ryutaro Ohmoto et al., "π/4–shift QPSK Subcarrier Transmission", 1991.
J. A. C. Bingham, "Multicarrier Modulation for Data Transmission: An Idea Whose Time Has Come", IEEE Communications Magazine, vol. 28, May 1990, pp. 5–8 and 11–14.
B. Hirosaki, "An Orthogonally Multiplexed QAM System Using the Discrete Fourier Transform", IEEE Transactions on Communications, vol. Com–29, No. 7, Jul. 1981, pp. 982–989.
L. J. Cimini, Jr., "Analysis and Simulation of a Digital Mobile Channel Using Orthogonal Frequency Division Multiplexing", IEEE Transactions on Communications, vol. Com–33, No. 7, Jul. 1985, pp. 665–675 and Annex.
Shigeki Moriyama et al., "Delay Propagation Characteristics at VHF and UHF bands in Urban Area", 1991 Spring National Convention Record, The Institute of Electronics, Information and Communication Engineers, Part 2, p. 406, Mar. 15, 1991.
Yasuhiro Ito et al., "Adaptive Weighted Code Division Multiplexinsg (AW–CDM) Transmission System for Terrestrial Digital Television Broadcasting", ITE Technical Report vol. 17, No. 13, pp. 27–32, Feb. 25, 1993.
Shinji Matsumoto et al., "200 Mb/s 16 QAM Digital Radio–Relay System Operating in 4 and 5 GHz Bands", Japan Telecommunications Review, Jan. 1982, vol. 24, No. 1, pp. 65–73.
M. Pecot et al., "Compatible Coding of Television Images, Part 2. Compatible System", Signal Processing Image Communication, Oct. 2, 1990, No. 3, pp. 259–268.
Mitsuaki Oshima, "Constellation–Code Division Multiplex for Digital HDTV", IEEE, 1992, pp. 1086–1092.
Tricia Hill et al., "A Performance Study of NLA 64–State QAM", IEEE Transactions on Communications, vol. COM–31, Jun. 1983, No. 6, pp. 821–826.
Hideki Ishio et al., "A Proposal of a Carrier Digital Transmission System Using Multi–Level APSK", pp. 1–20, no date.
Shanmugam, "Digital and Analog Communication Systems" 1979, p. 272.
Khaled Fazel et al., Combined multilevel coding and multiresolution modulation, Feb. 8, 1993, pp. 1081–1085.
P. Hoeher et al., Performance of an RCPC–Coded OFDM–based Digital Audio Broadcasting (DAB) System, IEEE Global Telecommunications Conference "Globecom '91", Dec. 2–5, 1991, vol. 1 of 3, pp. 2.1.1.–2.1.7.
K. M. Uz et al., Combined multiresolution source coding and modulation for digital broadcast of HDTV*, 1991, pp. 283–292.
K. M. Uz et al., Multiresolution Source and Channel Coding for Digital Broadcast of HDTV, 1992, pp. 61–69.
Nambi Seshadri et al., Multi–Level Block Coded Modulations with Unequal Error Portection for the Rayleigh Fading Channel, vol. 4, No. 3, May–Jun. 1993, pp. 325–334.
William F. Schreiber, Spread–Spectrum Television Broadcasting, SMPTE Journal, Aug. 1992, pp. 538–549.
Martin Vetterli et al., Multiresolution Coding Techniques for Digital Television: A Review, Multidimensional Systems and Signal Processing, vol. 3, May 1992, pp. 161–187.
Ezio Biglieri et al., Introduction to Trellis–Coded Modulation with Applications, Apr. 6, 1992, pp. 173–207.
English Language Abstract of European Patent No. 93 30 7575, no date.
Kazuhiko Nitadori, Synthesis of Multichannel Orthogonal VSB Signals by Quadrature Method, 1976 International Conference on Communications, Jun. 14–16, 1976, vol. 1, pp. 3–25–3–29.
Thomas M. Cover, Broadcast Channels, IEEE Transactions on Information Theory, Jan. 1972, pp. 2–14.
"Optimum Weighted PCM for Speech Signals", Sundberg, IEEE Transactions on Communications, vol. COM–26, Jun. 1978, pp. 872–881.

* cited by examiner

FIG. 25( a )
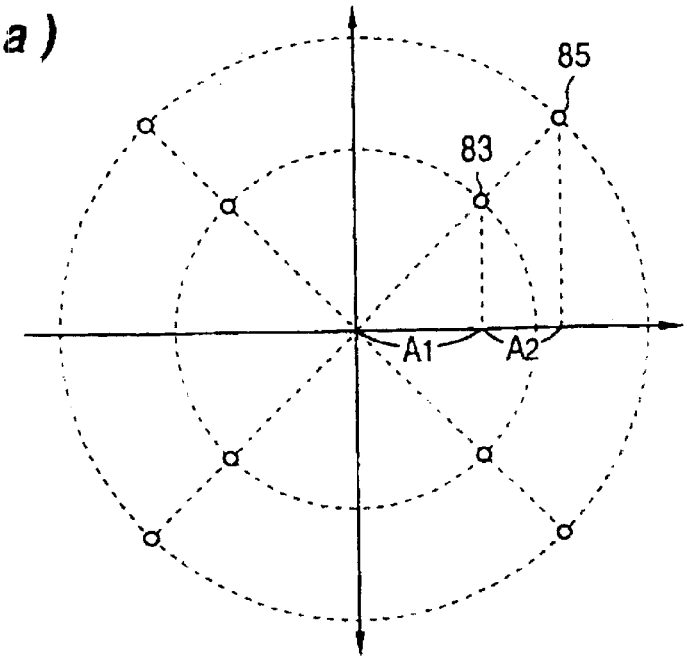
FIG. 25( b )
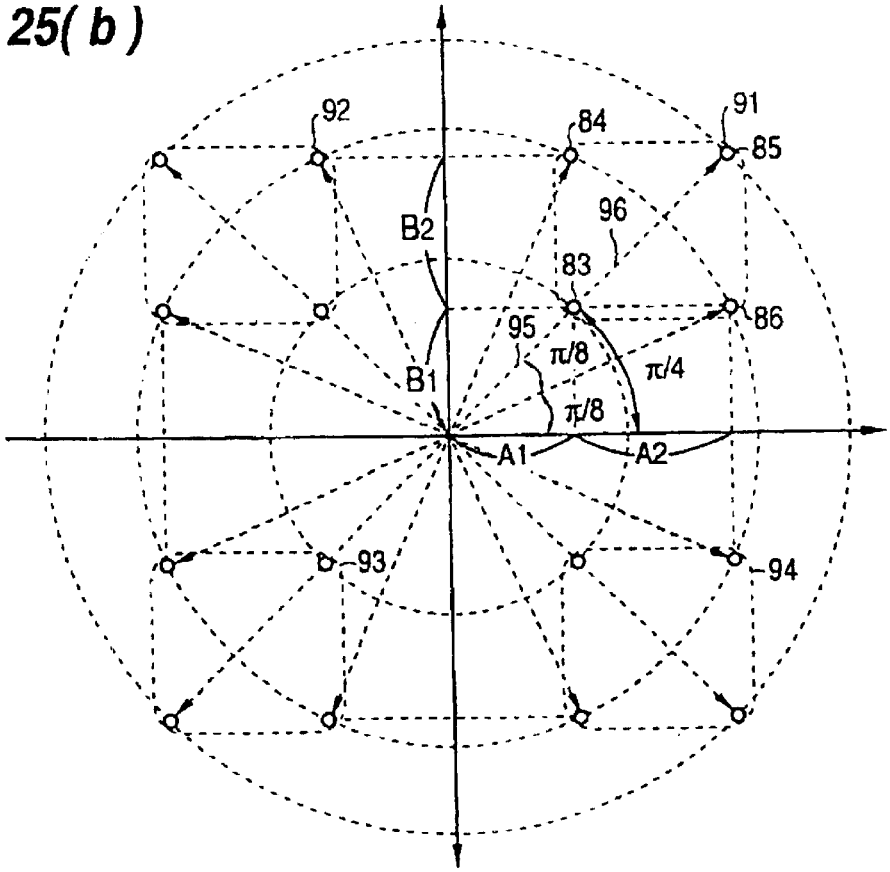

FIG. 48 (Amended)
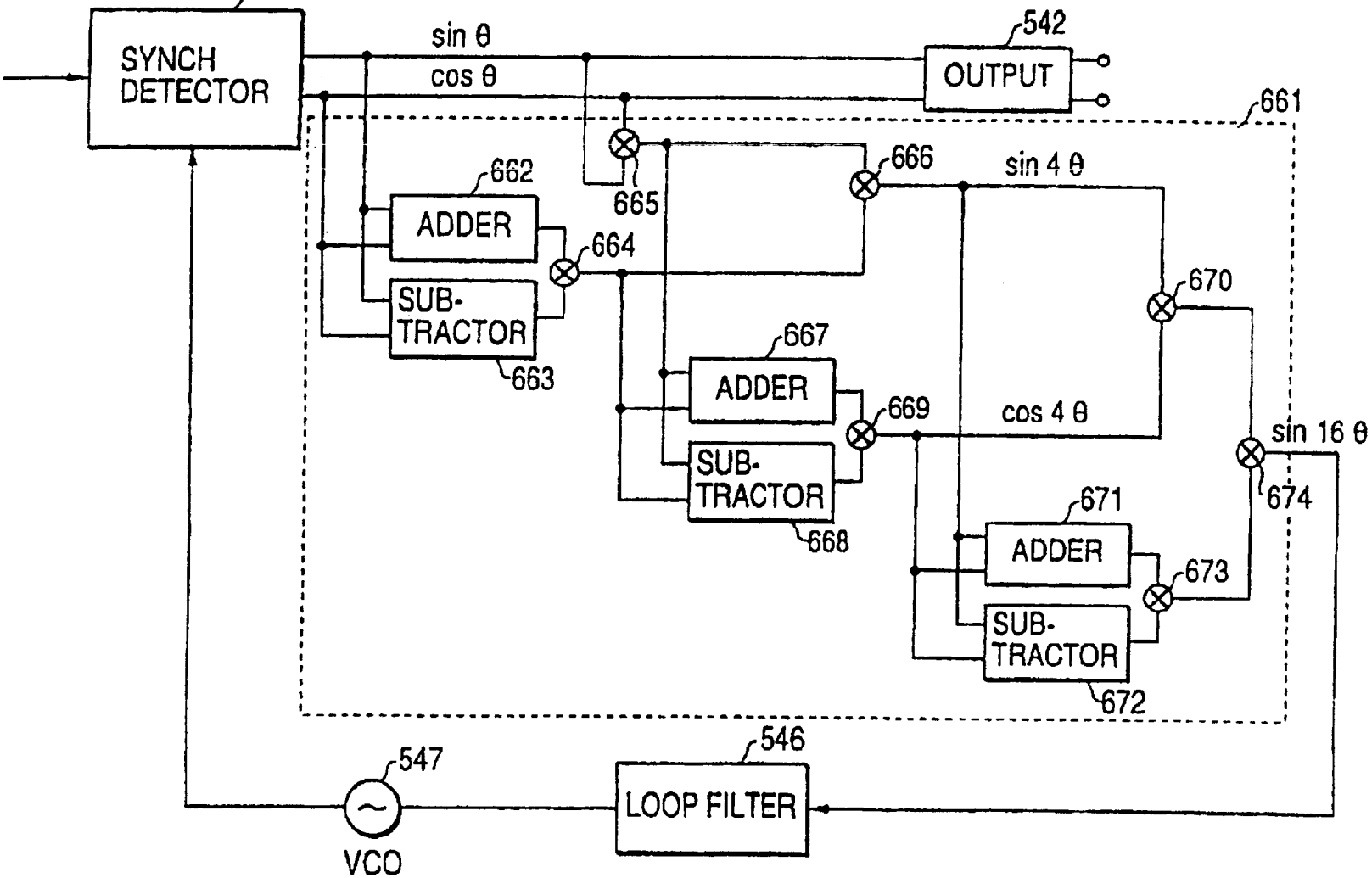

SPECTRUM OF ASK SIGNAL

CHARACTERISTICS OF VSB FILTER

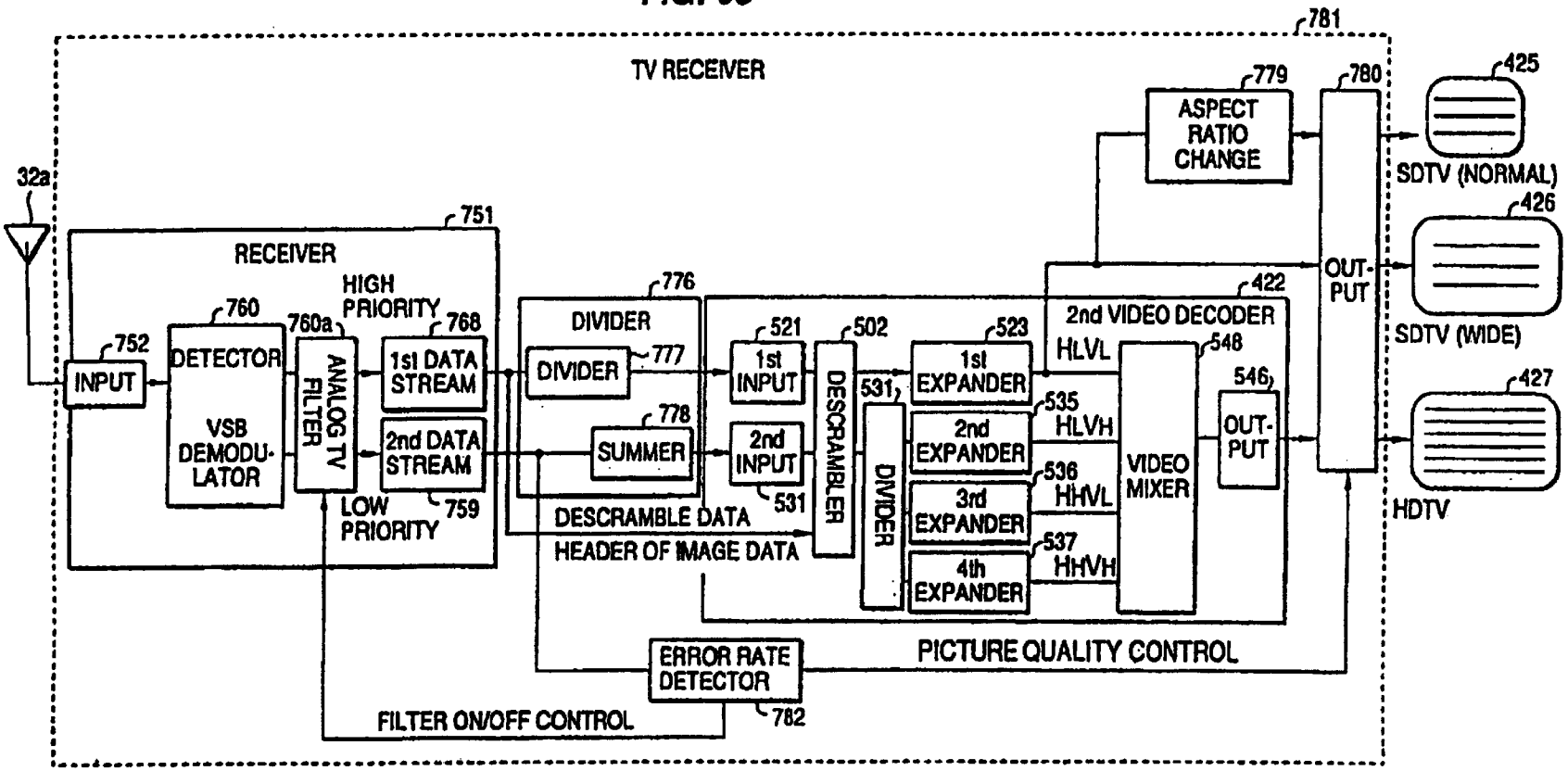
FIG. 65
TV RECEIVER
781
425
SDTV (NORMAL)
426
SDTV (WIDE)
427
HDTV
780
OUT-PUT
779
ASPECT RATIO CHANGE
422
2nd VIDEO DECODER
546
OUT-PUT
548
VIDEO MIXER
HLVL
535
HLVH
536
HHVL
537
HHVH
523
1st EXPANDER
2nd EXPANDER
3rd EXPANDER
4th EXPANDER
531
DIVIDER
502
DESCRAMBLER
521
1st INPUT
2nd INPUT
531
DESCRAMBLE DATA
HEADER OF IMAGE DATA
PICTURE QUALITY CONTROL
ERROR RATE DETECTOR
782
776
DIVIDER
777
DIVIDER
778
SUMMER
751
RECEIVER
HIGH PRIORITY
768
1st DATA STREAM
2nd DATA STREAM
759
LOW PRIORITY
760a
ANALOG TV FILTER
760
DETECTOR
VSB DEMODU-LATOR
752
INPUT
FILTER ON/OFF CONTROL
32a TV RECEIVER
781
780
OUTPUT
422
2ND VIDEO DECODER
788
DIVIDER
DIGITAL TV SIGNAL
ANALOG TV SIGNAL
D1
D2
35
QAM DEMODULATOR
1
2
758
1st DATA STREAM
759
2nd DATA STREAM
7880
757
DISCR/DEMOD
8-LEVEL SLICER
16-LEVEL SLICER
VIDEO DEMODULATOR
756
LPF
755
DETECTOR
VSB DEMODULATOR
760
753
MIXER
VARIABLE OSCILLATOR
754
34
INPUT
752
INPUT
752a
CATV DECODER
QAM
VSB OR QAM
VSB OR QAM
786
787
32
32a FIG. 112 (Amended)
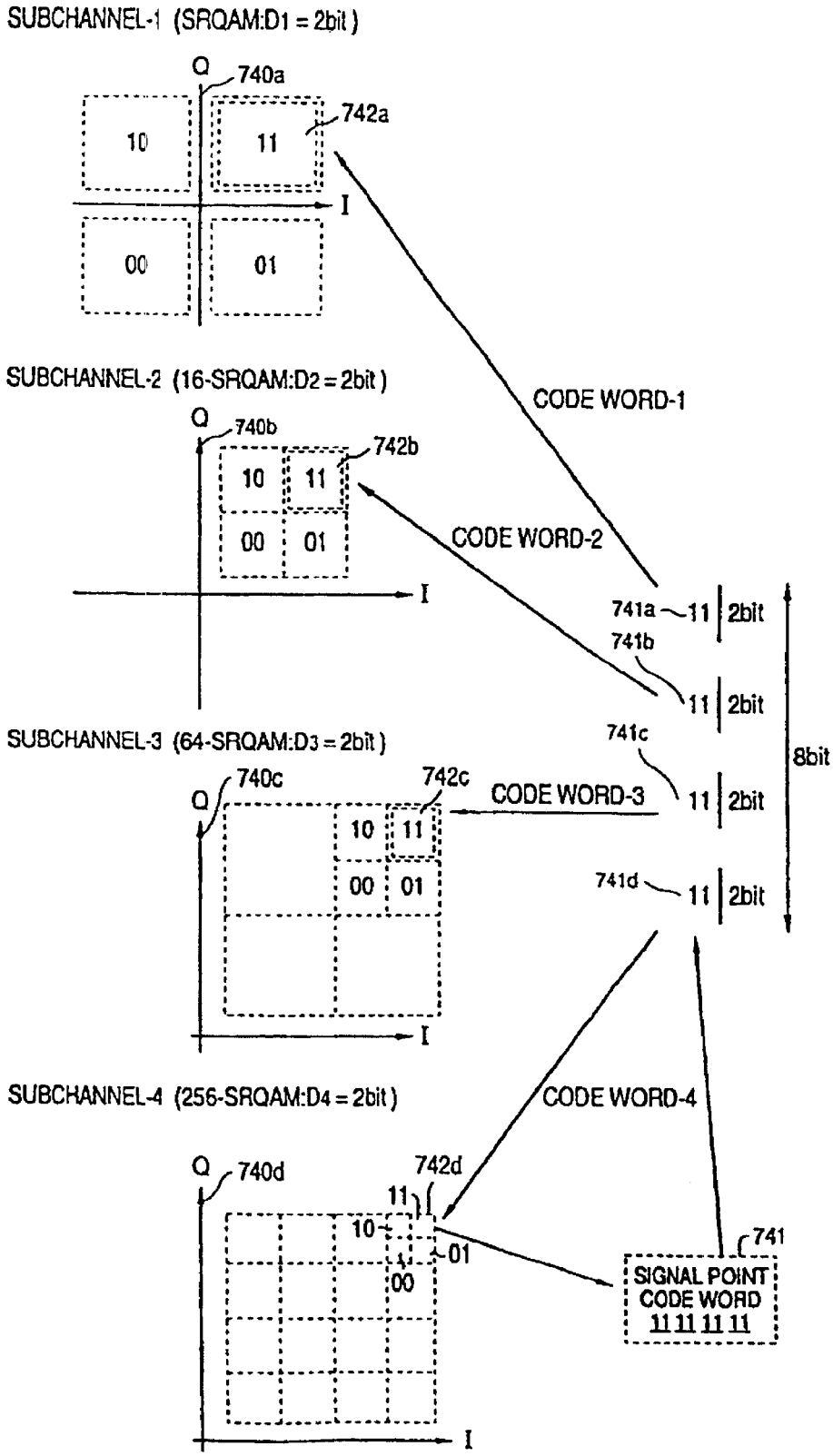

DOWN
UP
T
t
780a
780b
780c
780d
781a
781b
781c
781d
S
A
B
C
D
E
S
s
a
b
c
d
e
s

DOWN
UP
t
D3
D2
D1
780
782a
782b
782c
782d
782e
782f
782g
782h
782i
783a
783b
783c
783d
783e
783f
783g
783h
783i
A1-2
A2-2
A1-1
A2-1
a1-2
a2-2
a1-1
a2-1
E1-3
E2-3
E3-3
E1-2
E2-2
E3-2
E1-1
E2-1
E3-1
e1-3
e2-3
e3-3
e1-2
e2-2
e3-2
e1-1
e2-1
e3-1
S
B
C
D

FIG. 131 (Amended)
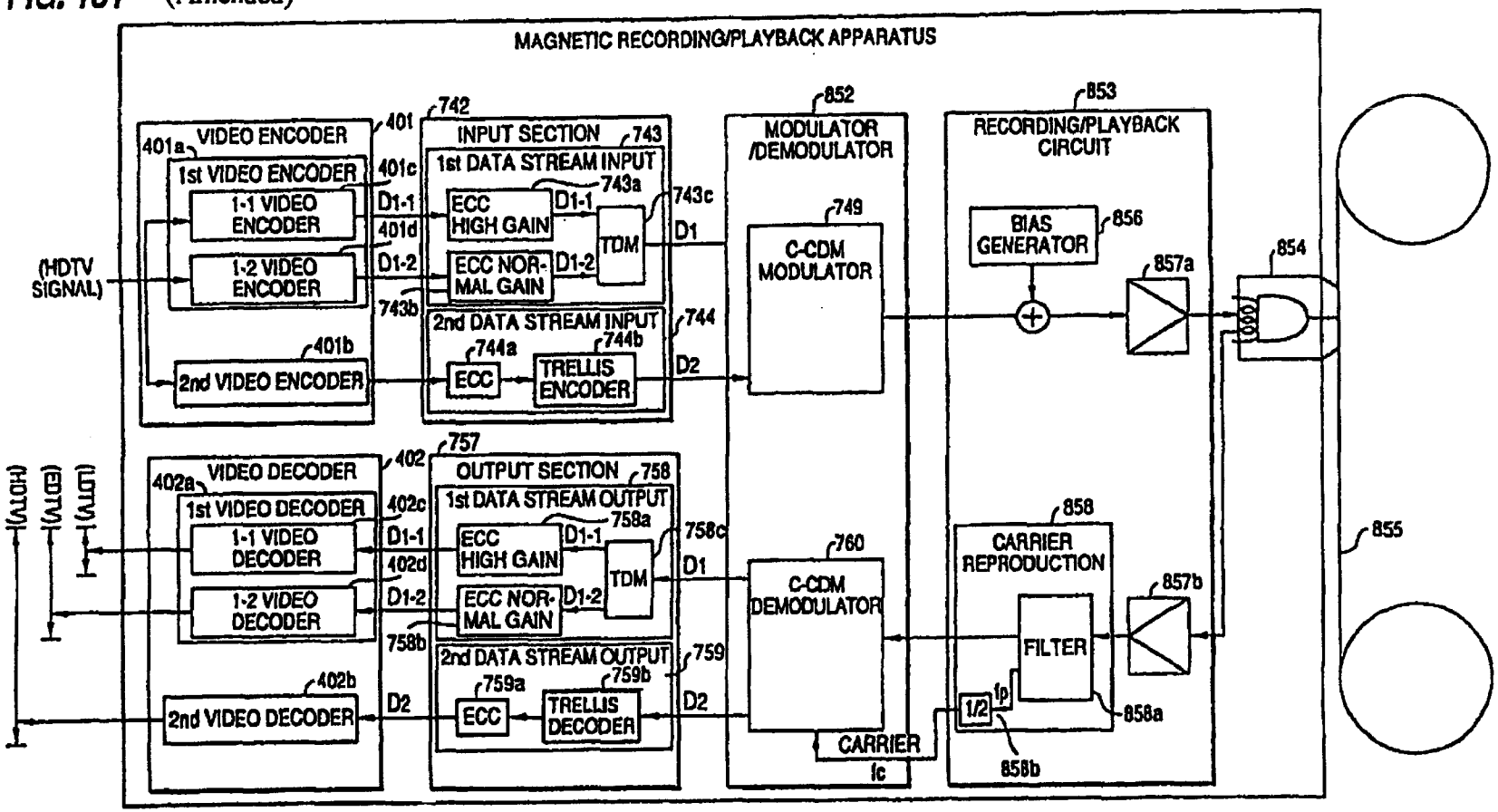

FIG. 138 (Amended)
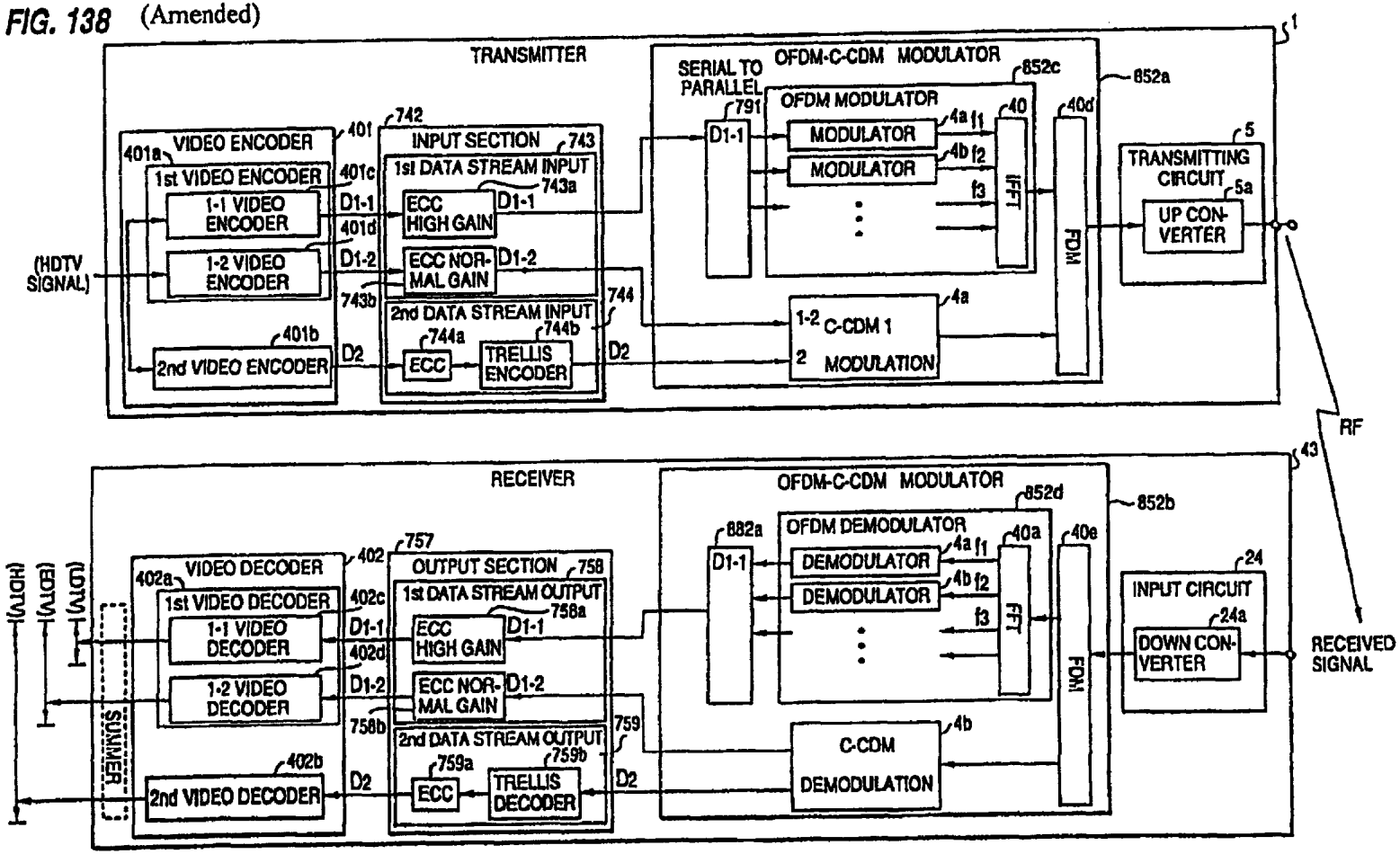

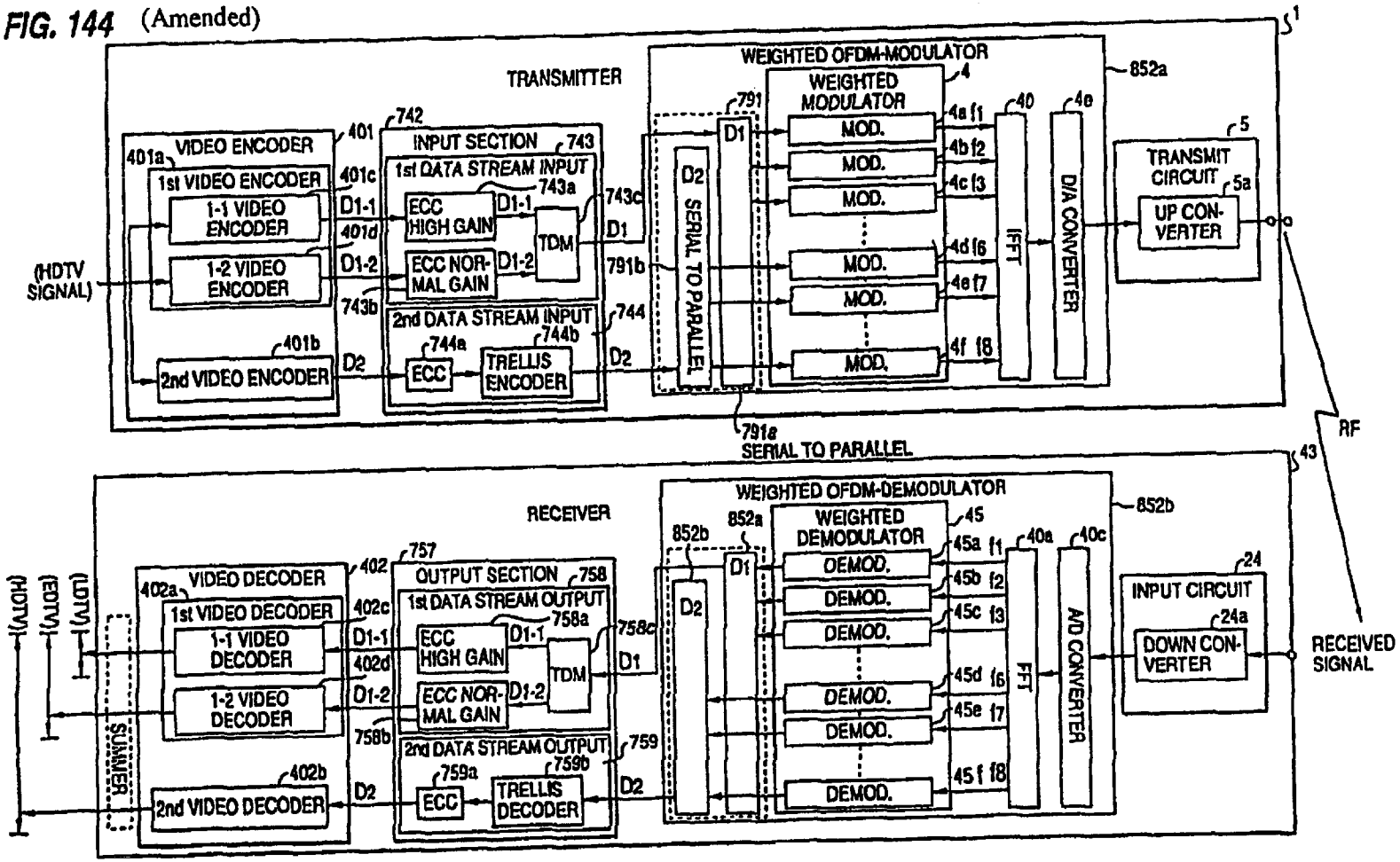
FIG. 144 (Amended)

FIG. 169 (Amended)
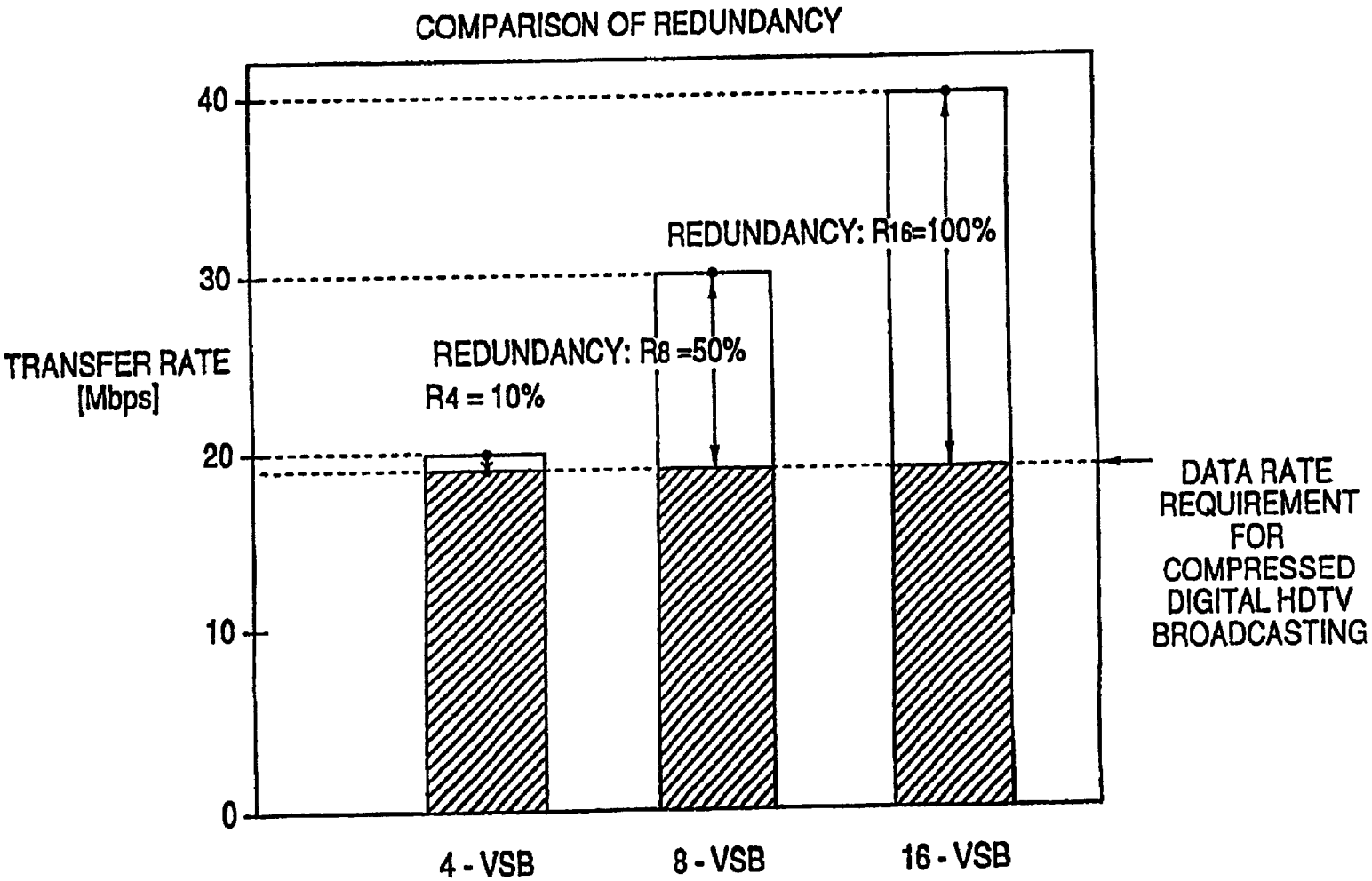

COMMUNICATION SYSTEM

Matter enclosed in heavy brackets [ ] appears in the original patent but forms no part of this reissue specification; matter printed in italics indicates the additions made by reissue.

[This application is a continuation-in-part of application Ser. No. 07/857,627, filed Mar. 25, 1992.]

*This is a reissue application of U.S. Pat. No. 5,600,672, issued Feb. 4, 1997, and a divisional application of reissue application No. 09/244,037, filed Feb. 4, 1999, which is also a reissue application of U.S. Pat. No. 5,600,672, issued Feb. 4, 1997, which is a Continuation-In-Part of application Ser. No. 07/857,627, filed Mar. 25, 1992 now abandoned. Further reissue divisional applications have been filed, all of which are reissues of U.S. Pat. No. 5,600,672. These further applications are: 09/677,421, filed Oct. 5, 2000; 09/678,014, filed Oct. 5, 2000; 09/677,420, filed Oct. 5, 2000; 09/680,177, filed Oct. 5, 2000; 09/680,176 filed Oct. 5, 2000; 09/686,467, filed Oct. 12, 2000; 09/686,463, filed Oct. 12, 2000; 09/686,466, filed Oct. 12, 2000; 09/688,028, filed Oct. 12, 2000; 09/686,464 , filed Oct. 12, 2000; 09/686,465, filed Oct. 12, 2000; 09/666,012, filed Sep. 19, 2000; 09/667,525, filed Sep. 21, 2000; 09/667,438, filed Sep. 21, 2000; 09/668,068, filed Sep. 25, 2000; 09/669,916, filed Sep. 25, 2000; 09/672,948, filed Sep. 29, 2000; 09/672,946, filed Sep. 29, 2000; 09/672,947, filed Sep. 29, 2000; 10/133,347, filed Apr. 29, 2002; 10/133,364, filed Apr. 29, 2002; 10/692,469, filed Oct. 24, 2003; 10/693,526, filed Oct. 27, 2003; 10/635,468, filed Aug. 7, 2003; 10/690,297, filed Oct. 27, 2003; 10/860,666, filed Jun. 4, 2004; 10/782,411, filed Feb. 20, 2004; 10/783,588, filed Feb. 23, 2004; 10/773,811, filed Feb. 9, 2004; 10/882,126, filed Jun. 30, 2004; 10/885,572, filed Jul. 7, 2004; 10/911,680, filed Aug. 5, 2004; and 11/038,006, filed Jan. 19, 2006.*

BACKGROUND OF THE INVENTION

1. Field of the Invention

The present invention relates to a communication system for transmission and reception of a digital signal through modulation of its carrier wave and demodulation of the modulated signal.

2. Description of the Prior Art

Digital signal communication systems have been used in various fields. Particularly, digital video signal transmission techniques have been improved remarkably.

Among them is a digital TV signal transmission method. So far, such digital TV signal transmission systems are in particular use for transmission between TV stations. They will soon be utilized for terrestrial and/or satellite broadcast service in every country of the world.

The TV broadcast systems including HDTV, PCM music, FAX, and other information services are now demanded to increase desired data in quantity and quality for satisfying millions of sophisticated viewers. In particular, the data has to be increased in a given bandwidth of frequency allocated for TV broadcast service. The data to be transmitted is always abundant and provided as much as handled with up-to-date techniques of the time. It is ideal to modify or change the existing signal transmission system corresponding to an increase in the data amount with time.

However, the TV broadcast service is a public business and cannot go further without considering the interests and benefits of viewers. It is essential to have any new service compatible with existing TV receivers and displays. More particularly, the compatibility of a system is much desired for providing both old and new services simultaneously or one new service which can be intercepted by both the existing and advanced receivers.

It is understood that any new digital TV broadcast system to be introduced has to be arranged for data extension in order to respond to future demands and technological advantages and also, for compatibility to allow the existing receivers to receive transmissions.

The expansion capability and compatible performance of *the* prior art digital TV system will be explained.

A digital satellite TV system is known in which NTSC TV signals compressed to [an] about 6 Mbps are [muitiplexed] *multiplexed* by time division modulation of 4 PSK and transmitted on 4 to 20 channels while HDTV signals are carried on a signal channel. Another digital HDTV system is provided in which HDTV video data compressed to as small as 15 Mbps are transmitted on a 16 or 32 QAM signal through ground stations.

Such a known satellite system permits HDTV signals to be carried on the channel by a conventional manner, thus occupying a band of frequencies equivalent to the same channels of NTSC signals. This causes the corresponding NTSC channels to be unavailable during the transmission of the HDTV signal. Also, the compatibility between NTSC and HDTV receivers or displays is hardly concerned and data expansion capability needed for matching a future advanced mode is utterly disregarded.

Such a common terrestrial HDTV system offers an HDTV service on conventional 16 or 32 QAM signals without any modification. In any analogue TV broadcast service, there are developed a lot of signal attenuating or shadow regions within its service area due to structural obstacles, geographical inconveniences, or signal interference from a neighbor station. When the TV signal is an analogue [from] *form*, it can be intercepted more or less at such signal attenuating regions although its reproduced picture is low in quality. If *the* TV signal is a digital form, it can rarely be reproduced at an acceptable level within the regions. This disadvantage is critically hostile to the development of any digital TV system.

SUMMARY OF THE INVENTION

It is an object of the present invention, for solving the foregoing disadvantages, to provide a communication system arranged for compatible use for both the existing NTSC and newly introduced HDTV broadcast services, particularly via satellite and also, for minimizing signal attenuating or shadow region of its service area on the [grounds] *ground*.

A communication system according to the present invention intentionally varies signal points, which used to be disposed at uniform intervals, to perform the signal transmission and reception. For example, if applied to a QAM signal, the communication system comprises two major sections: a transmitter having a signal input circuit, a modulator circuit for producing m numbers of signal points, in a signal vector field through modulation of a plurality of out-of-phase carrier waves using an input signal supplied from the input circuit, and a transmitter circuit for transmitting a resultant modulated signal; and a receiver having an input circuit for receiving the modulated signal, a demodulator circuit for demodulating one-bit signal points of a QAM carrier wave, and an output circuit.

In operation, the input signal containing a first data stream of n values and a second data stream is fed to the modulator circuit of the transmitter where a modified m-bit QAM carrier wave is produced representing m signal points in a vector field. The m signal points are divided into n signal point groups to which the n values of the first data stream are assigned respectively. Also, data of the second data stream are assigned to m/n signal points or sub groups of each signal point group. Then, a resultant transmission signal is transmitted from the transmitter circuit. Similarly, a third data stream can be propagated.

At the p-bit demodulator circuit, p>m, of the receiver, the first data stream of the transmission signal [if] *is* first demodulated through dividing p signal points in a signal space diagram into n signal point groups. Then, the second data stream is demodulated through assigning p/n values to p/n signal points of each corresponding signal point group for reconstruction of both the first and second data streams. If the receiver is at P=n, the n signal point groups are reclaimed and assigned the n values for demodulation and reconstruction of the first data stream.

Upon receiving the same transmission signal from the transmitter, a receiver equipped with a large sized antenna and capable of large-data modulation can reproduce both the first and second data streams. A receiver equipped with a small sized antenna and capable of small-data modulation can reproduce the first data stream only. Accordingly, the compatibility of the signal transmission system will be ensured. When the first data stream is an NTSC TV signal or low frequency band component of an HDTV signal and the second data stream is a high frequency band component of the HDTV signal, the small-data modulation receiver can reconstruct the NTSC TV signal and the large-data modulation receiver can reconstruct the HDTV signal. As understood, a digital NTSC/HDTV simultaneous broadcast service will be feasible using the compatibility of the signal transmission system of the present invention.

More specifically, the communication system of the present invention comprises: a transmitter having a signal input circuit, a modulator circuit for producing m signal [point,] *points* in a signal vector field through modulation of a plurality of out-of-phase carrier waves using an input signal supplied from the input, and a transmitter circuit for transmitting a resultant modulated signal, in which the main procedure includes receiving an input signal containing a first data stream of n values and a second data stream, dividing the m signal points of the signal into n signal point groups, assigning the n values of the first data stream to the n signal point groups respectively, assigning data of the second data stream to signal points of each signal point group respectively, and transmitting the resultant modulated signal; and a receiver having an input circuit for receiving the modulated signal, a demodulator circuit for demodulating p signal points of a QAM carrier wave, and an output circuit, in which the main procedure includes dividing the p signal points into n signal point groups, demodulating the first data stream of which n values are assigned to the n signal point groups respectively, and demodulating the second data stream of which p/n values are assigned to p/n signal points of each signal point group respectively. For example, a transmitter produces a modified m-bit QAM signal of which first, second, and third data streams, each carrying n values, are assigned to relevant signal point groups with a modulator. The signal can be intercepted and the first data stream only reproduced by a first receiver, both the first and second data streams can be reproduced by a second receiver, and all the first, second, and third streams can be reproduced by a third receiver.

More particularly, a receiver capable of demodulation of n-bit data can reproduce n bits from a multiple-bit modulated carrier wave carrying m-bit data where m>n, thus allowing the communication system to have compatibility and capability of future extension. Also, a multi-level signal transmission will be possible by shifting the signal points of QAM so that a nearest signal point to the origin point of I-axis and Q-axis coordinates is spaced nf from the origin where f is the distance of the nearest point from each axis and n is more than 1.

Accordingly, a compatible digital satellite broadcast service for both the NTSC and HDTV systems will be feasible when the first data stream carries an NTSC signal and the second data stream carries a difference signal between NTSC and HDTV. Hence, the capability of corresponding to an increase in the data amount to be transmitted will be ensured. Also, on the ground, the service area will be increased while signal attenuating areas are decreased.

BRIEF DESCRIPTION OF THE DRAWINGS

FIG. 25(a) and 25(b) are vector diagrams respectively showing an 8 and a 16 QAM signal of the first embodiment;

FIG. 48 is a block diagram of a carrier reproducing circuit for 16× multiplication of the third embodiment;

FIG. 65 is a block diagram of a TV receiver of the fifth embodiment;

FIG. 112 is a view showing an assignment of an extended 36 QAM according to the third embodiment;

FIG. 114 is a block diagram showing a magnetic recording/playback apparatus according to the fifth embodiment;

FIG. 115 is a block diagram showing a transmitter/receiver of a portable telephone according to the eighth embodiment;

FIG. 116 is a block diagram showing base stations according to the eighth embodiment;

FIG. 117 is a view illustrating communication capacities and traffic distribution of a conventional system;

FIG. 118 is a view illustrating communication capacities and traffic distribution according to the eighth embodiment;

FIG. 119(a) is a diagram showing a time slot assignment of a conventional system;

FIG. 119(b) is a diagram showing a time slot assignment according to the eighth embodiment;

FIG. 120(a) is a diagram showing a time slot assignment of a conventional TDMA system;

FIG. 120(b) is a diagram showing a time slot assignment according to a TDMA system of the eighth embodiment;

FIG. 121 is a block diagram showing a one-level transmitter/receiver according to the eighth embodiment;

FIG. 122 is a block diagram showing a two-level transmitter/receiver according to the eighth embodiment;

FIG. 123 is a block diagram showing an OFDM type transmitter/receiver according to the ninth embodiment;

Figure 124:
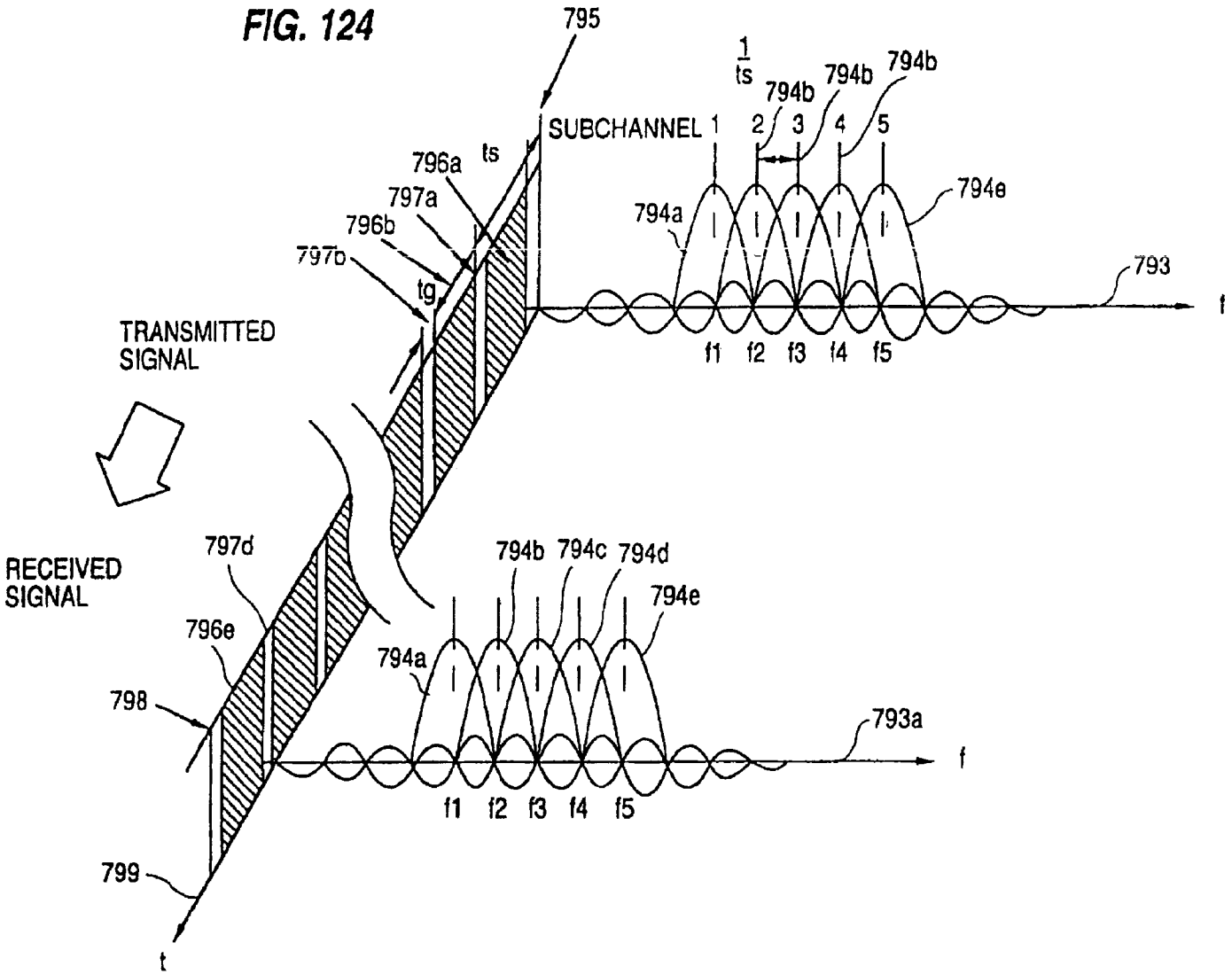
Figure 125A:
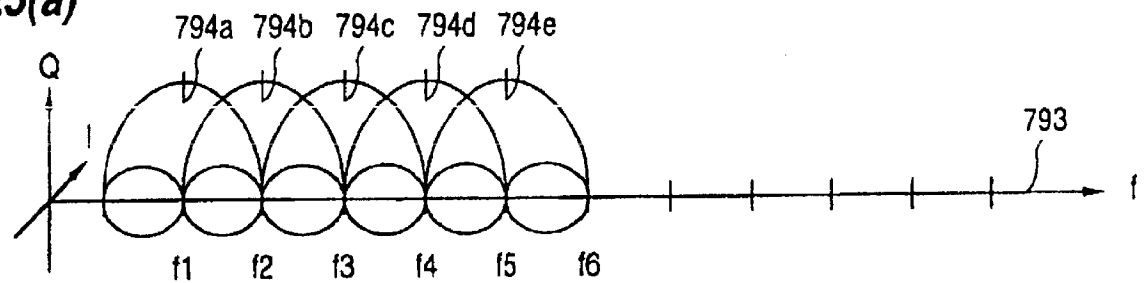
Figure 125B:
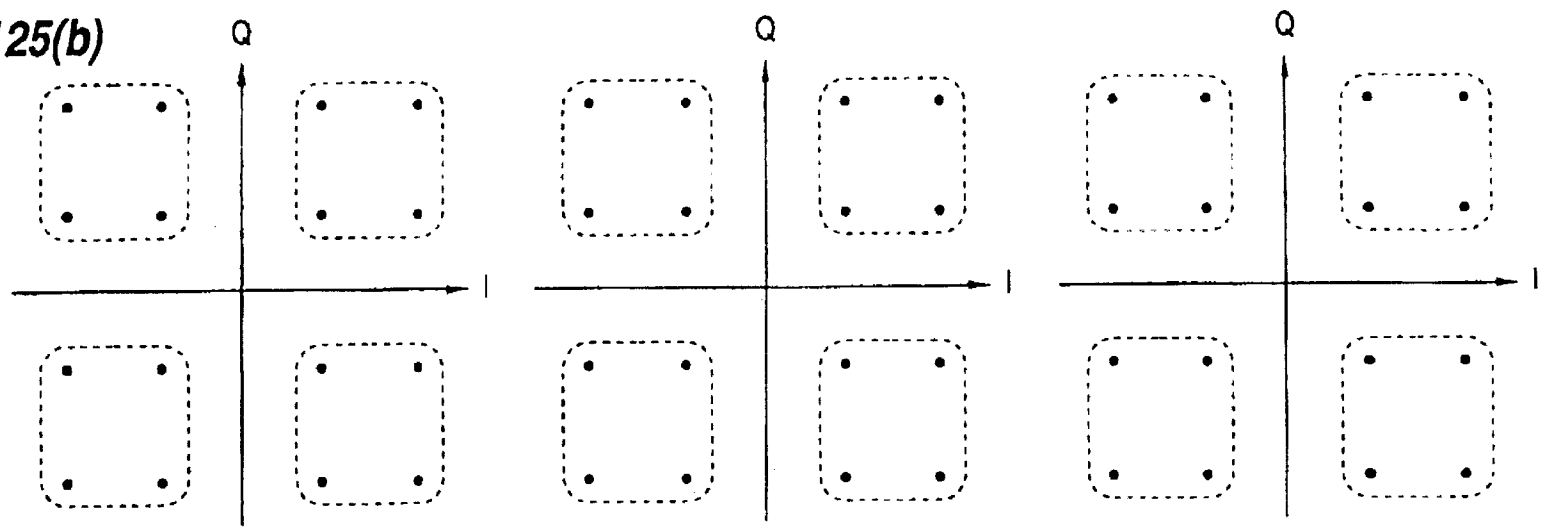
Figure 126A:
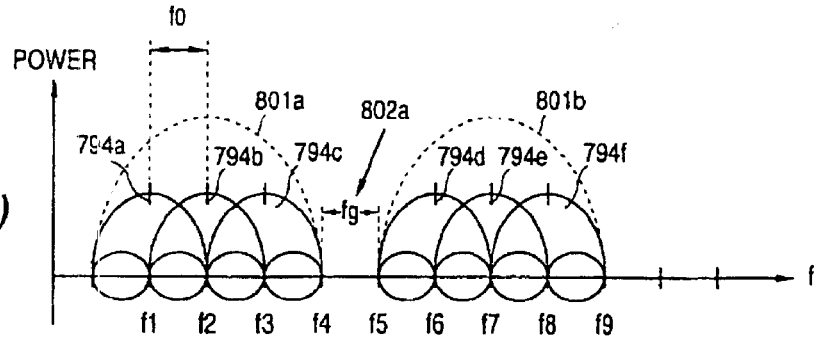
Figure 126B:
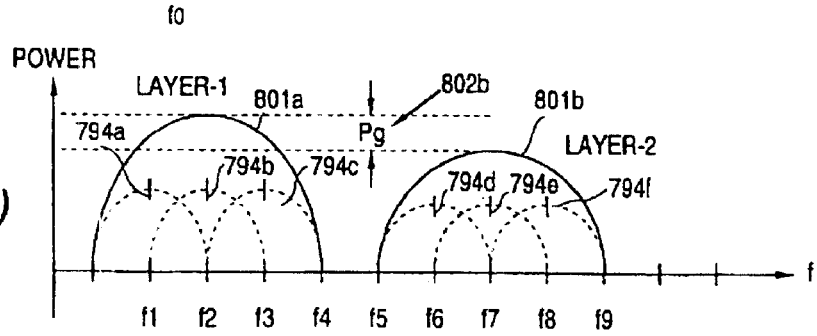
Figure 126C:
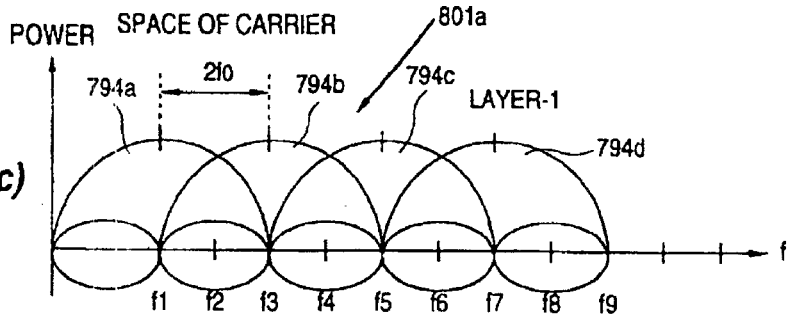
Figure 126D:
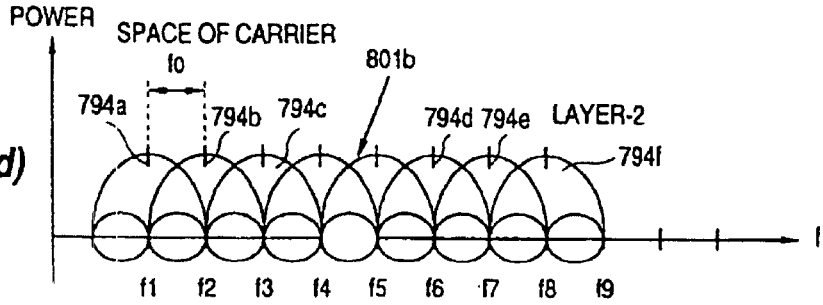
Figure 127:
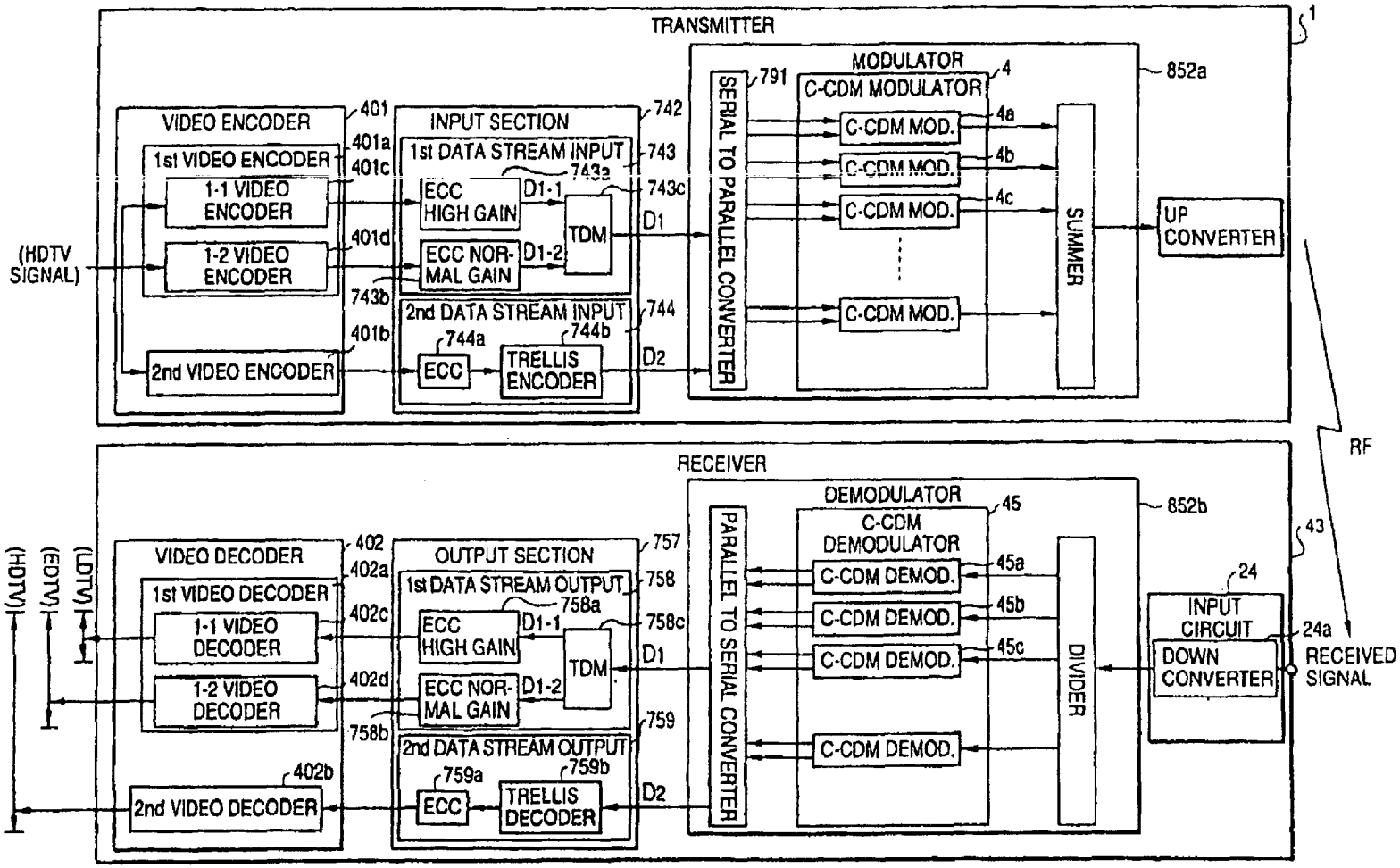
Figure 128A:
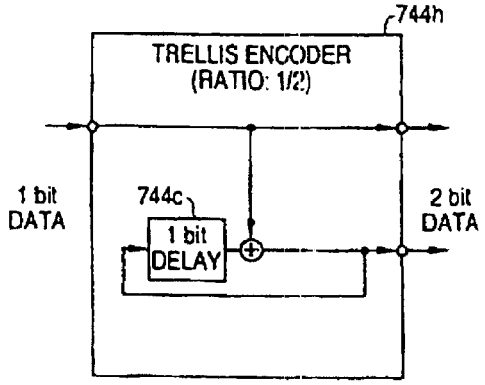
Figure 128D:
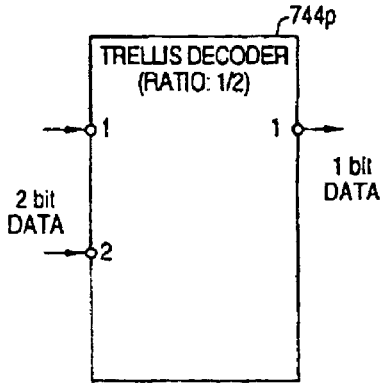
Figure 128B:
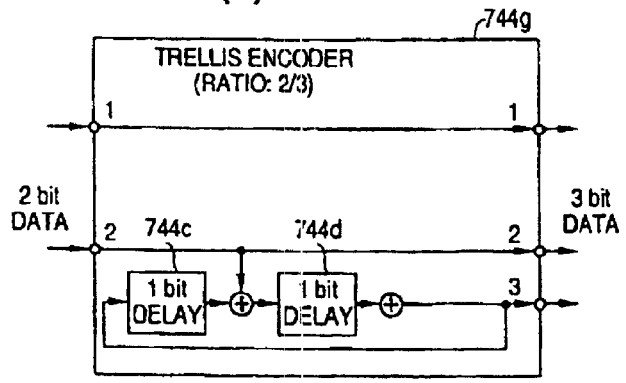
Figure 128E:
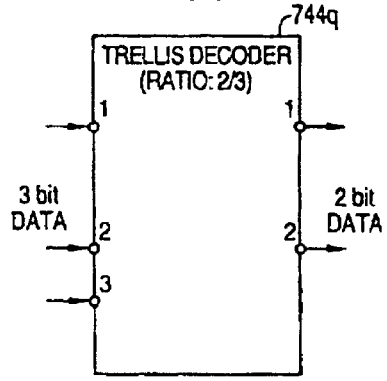
Figure 128C:
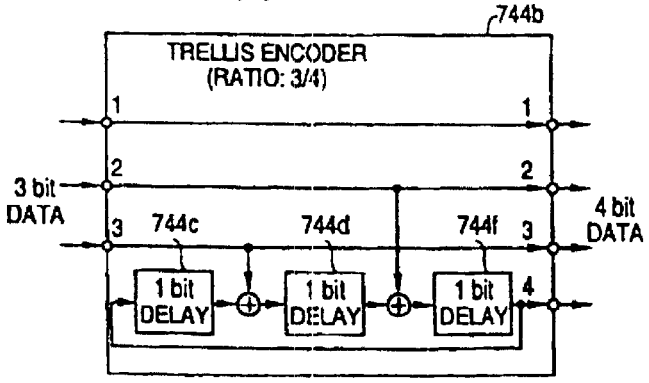
Figure 128F:
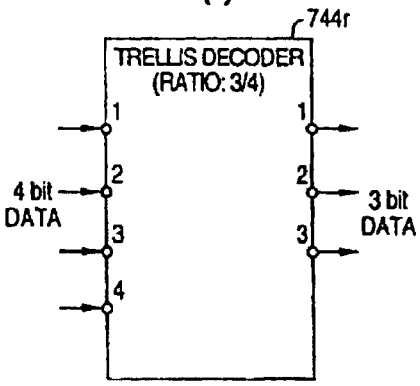
Figure 129:
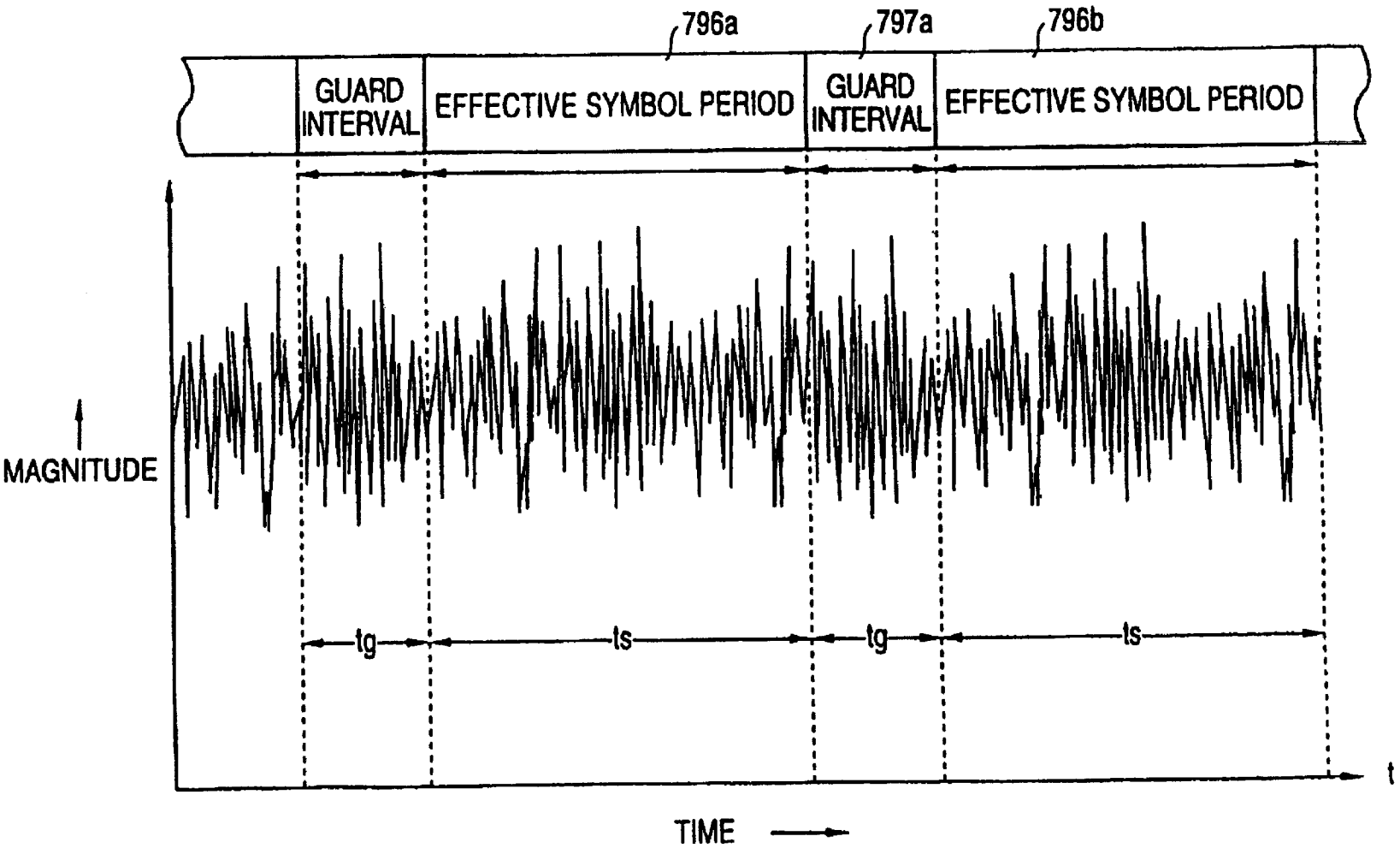
Figure 130:
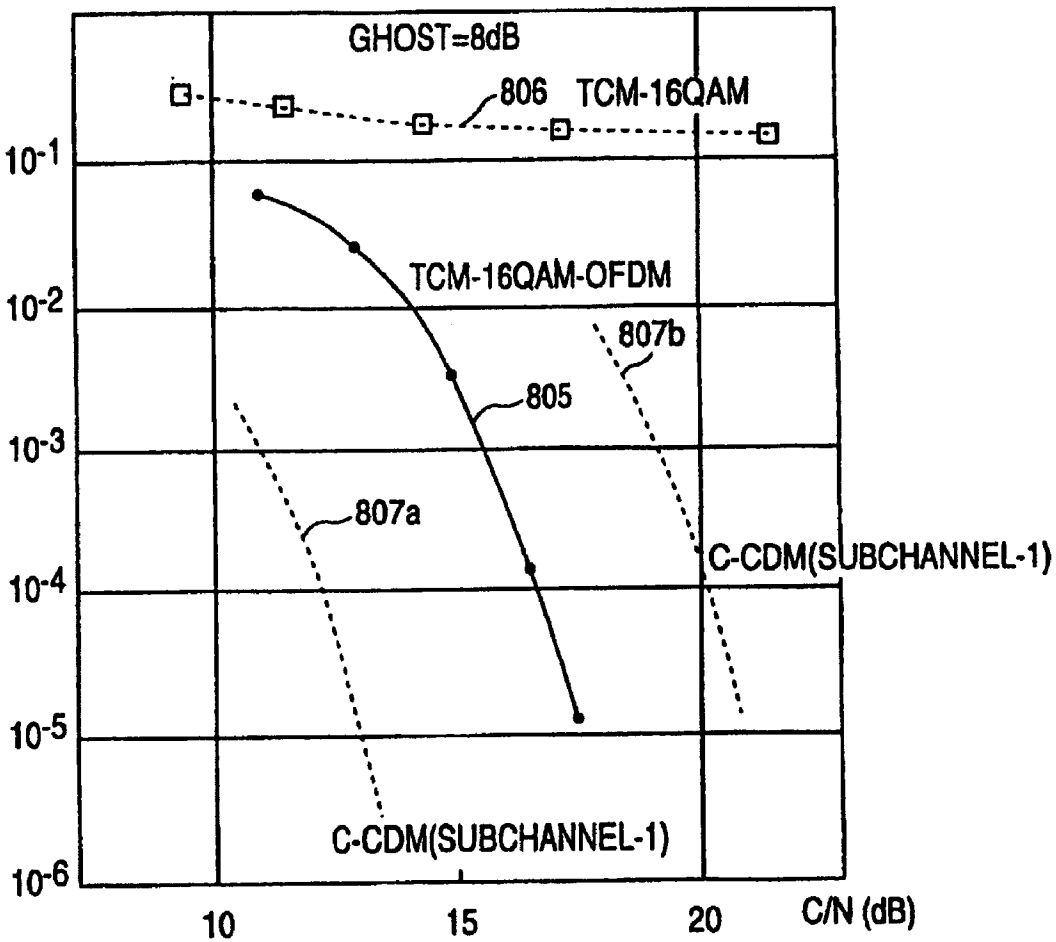
Figure 132:
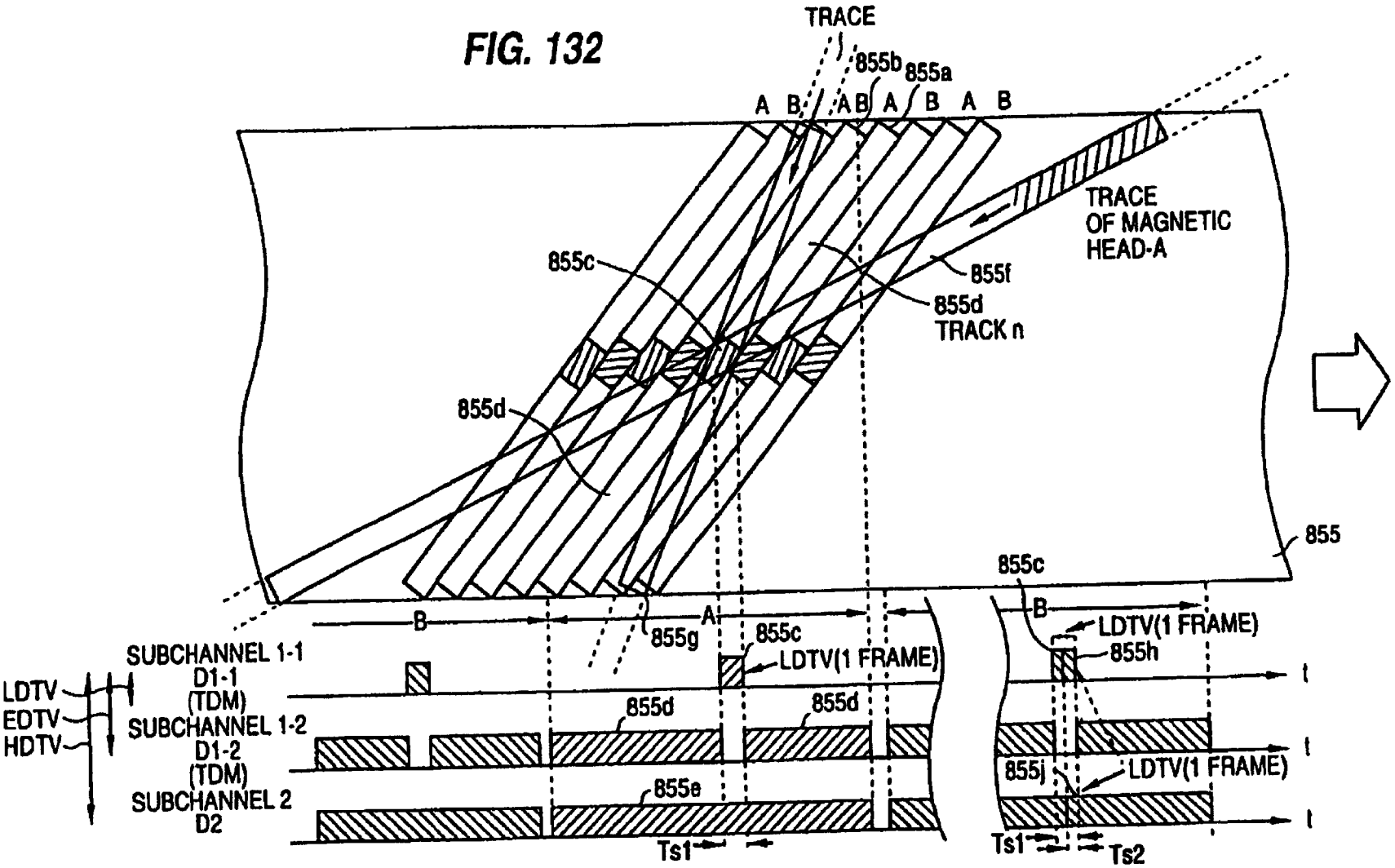
Figure 133:
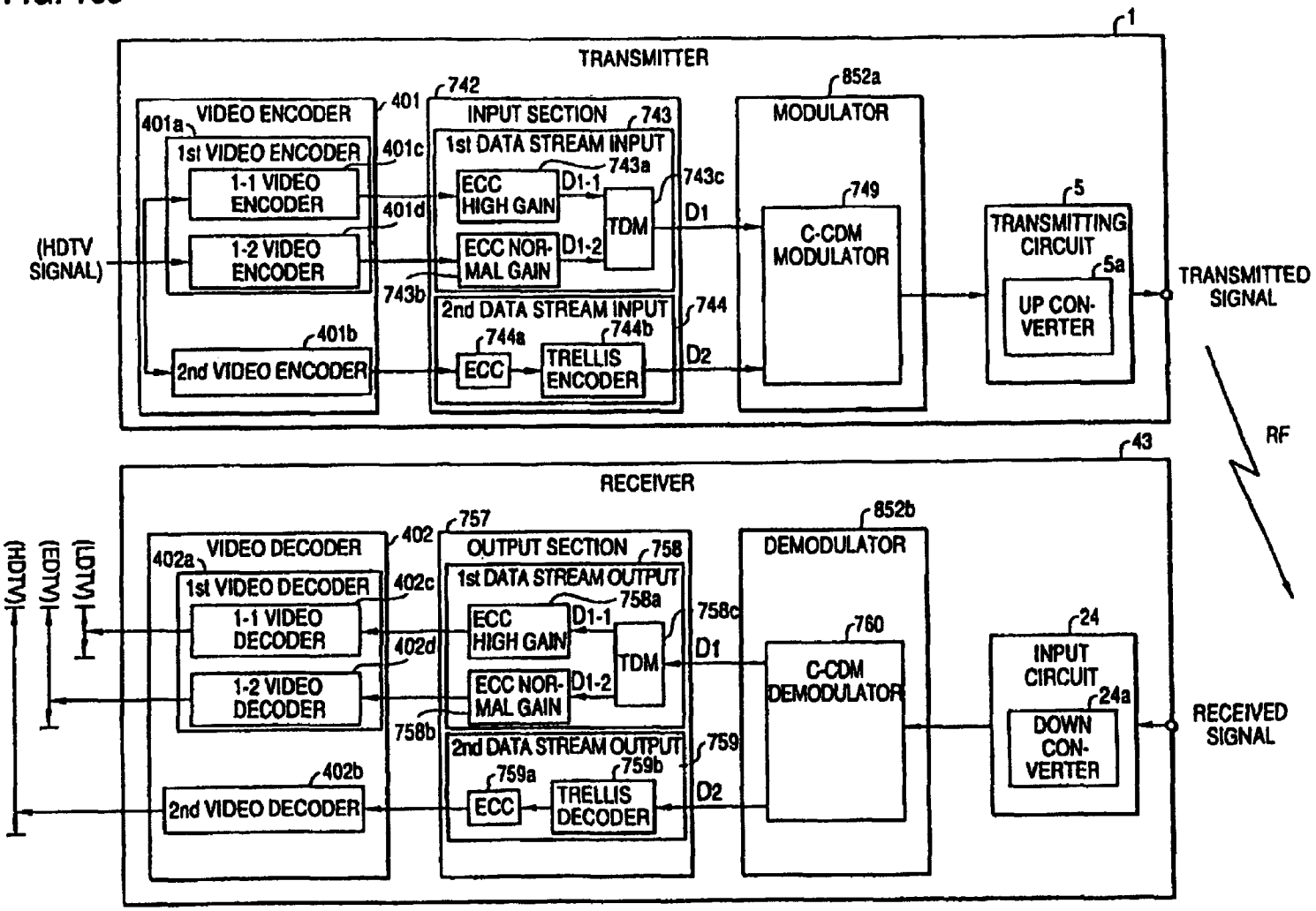
Figure 134:
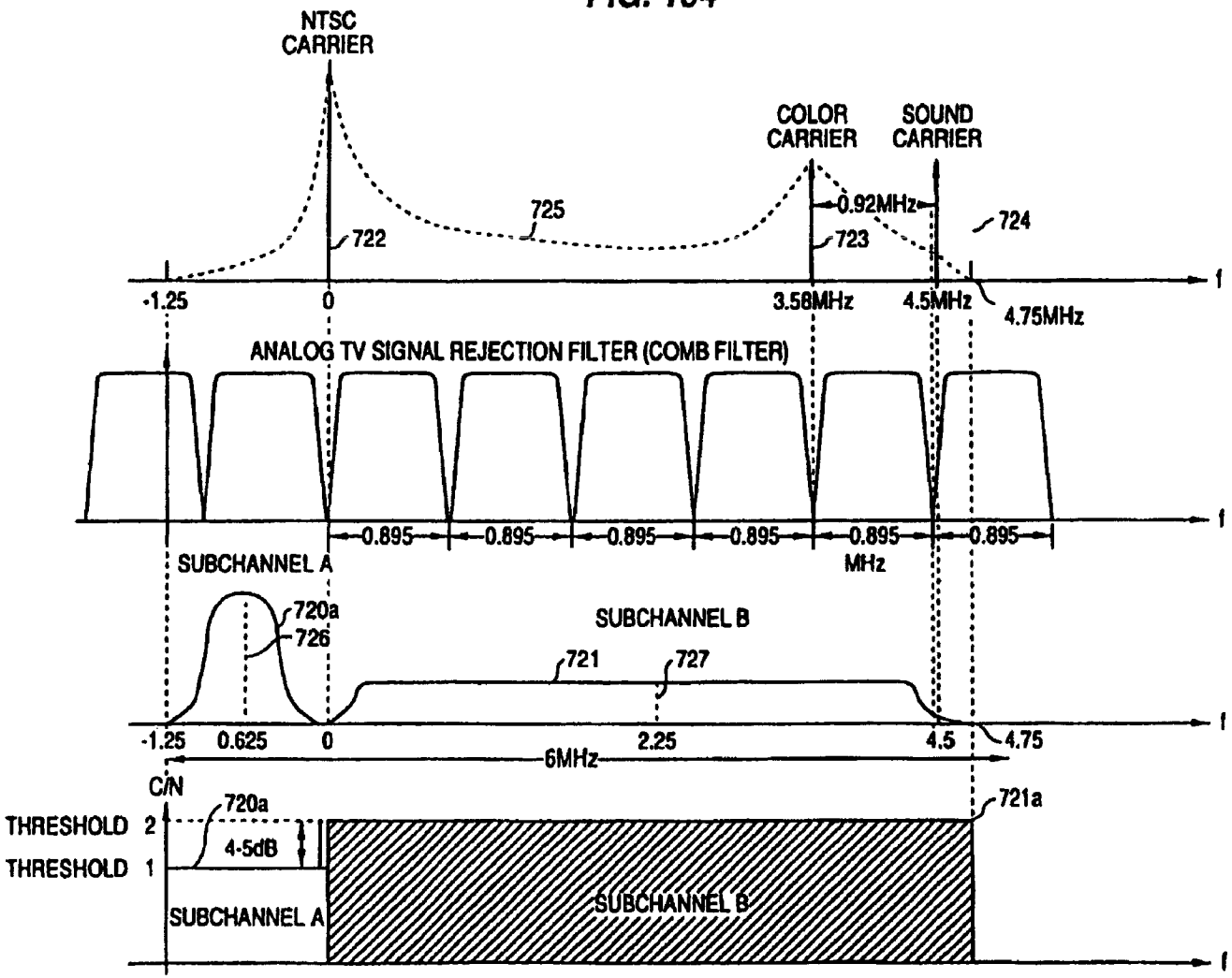
Figure 135:
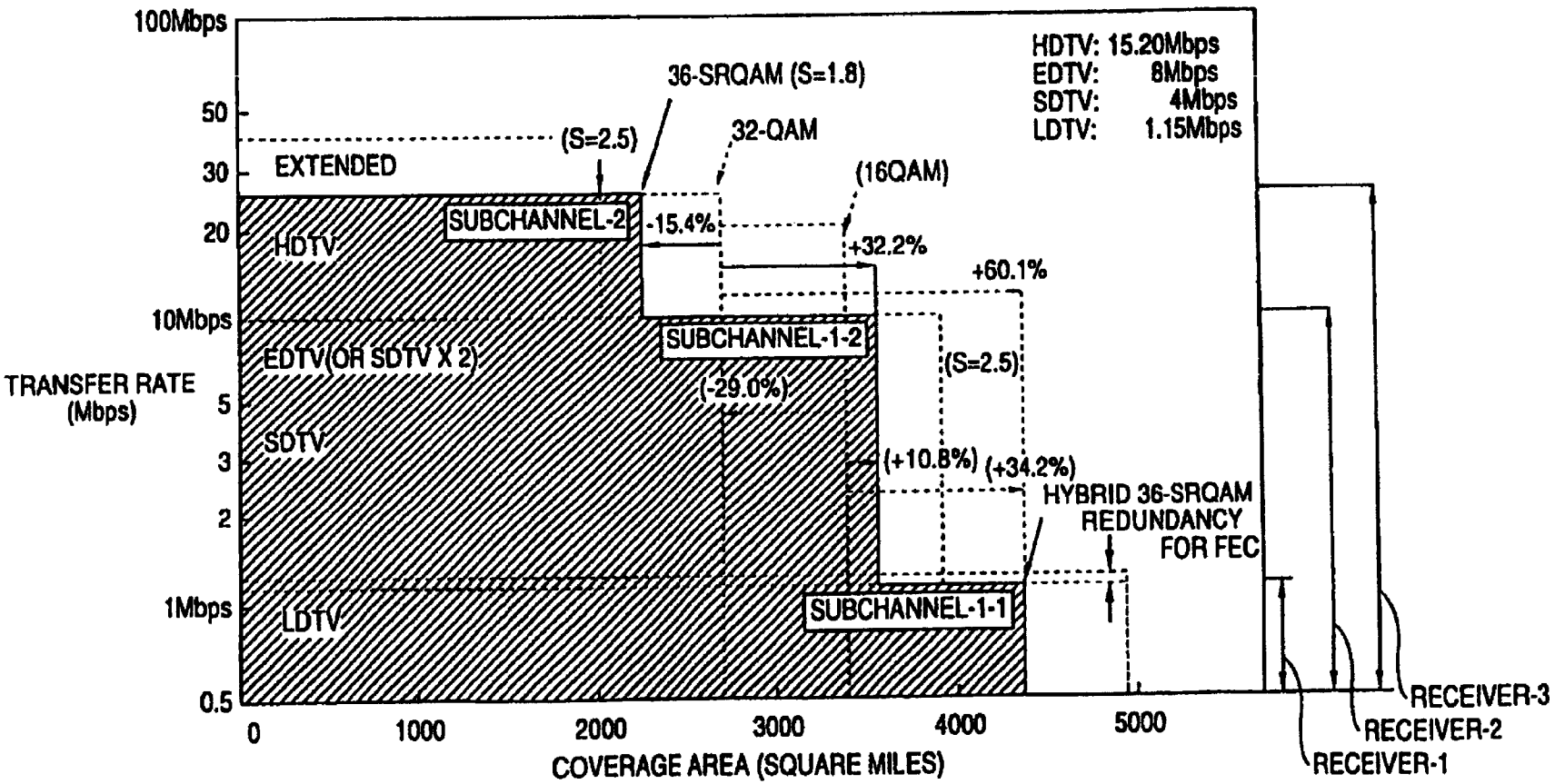
Figure 136:
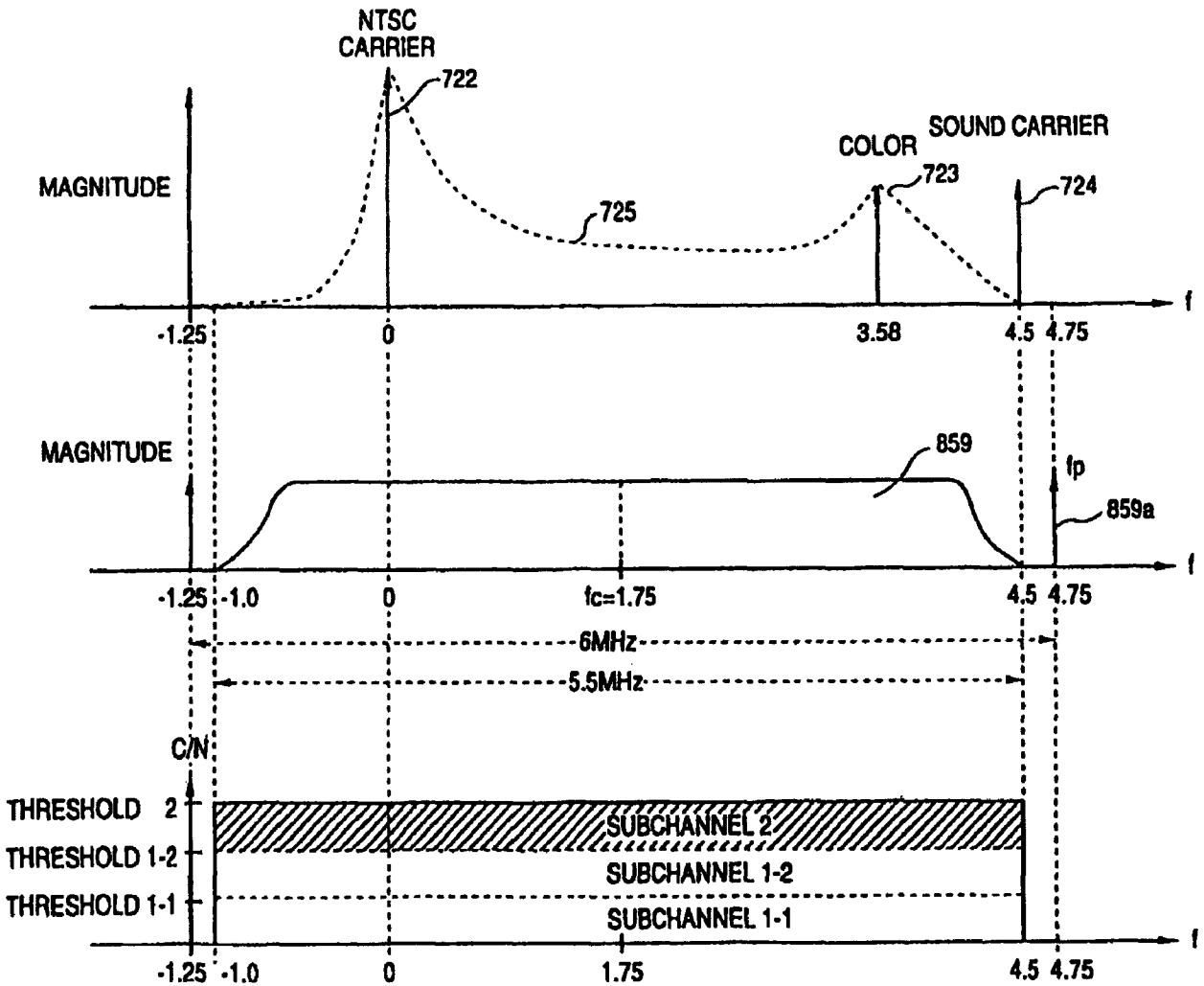
Figure 137:
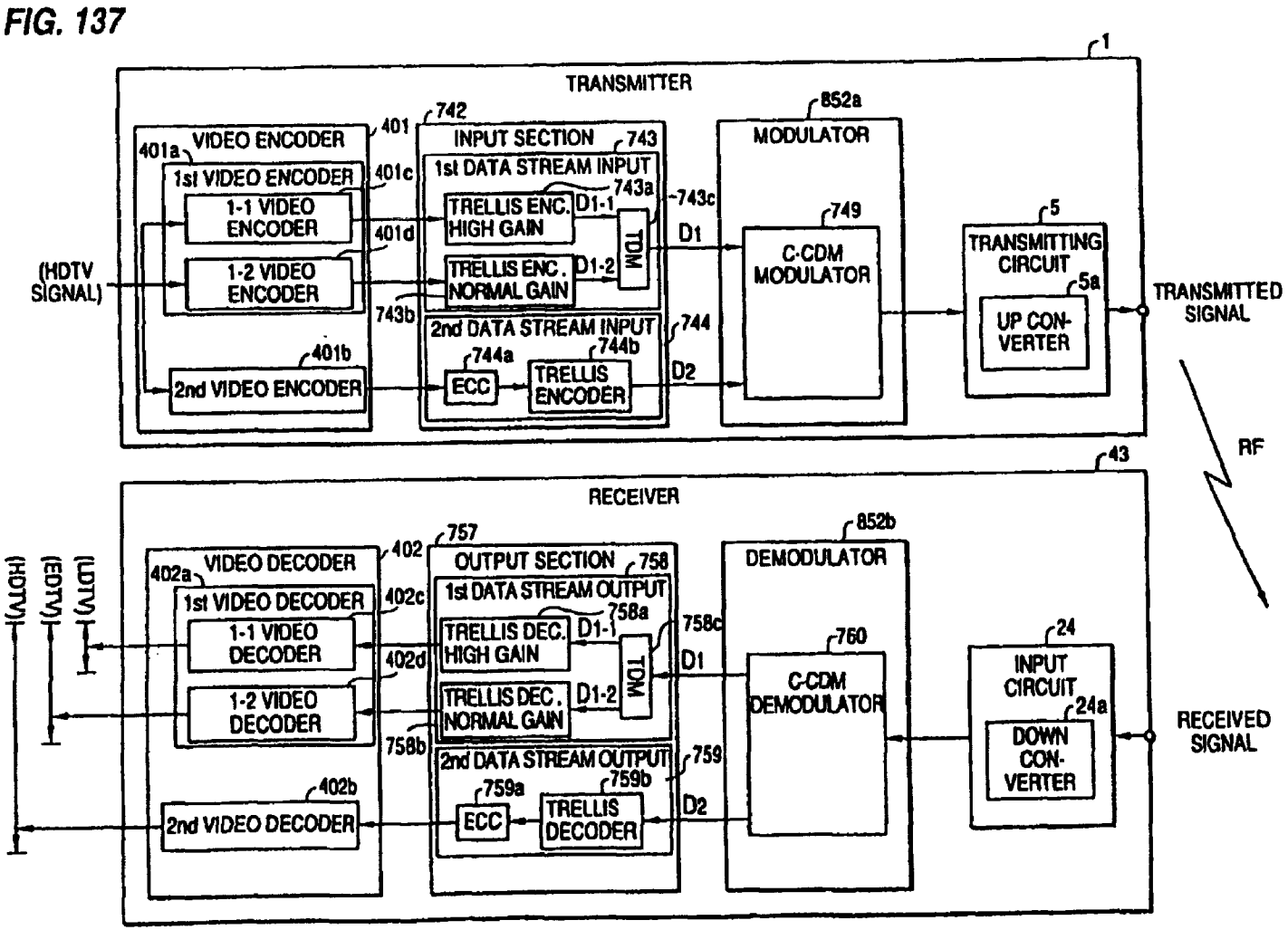
Figure 139:
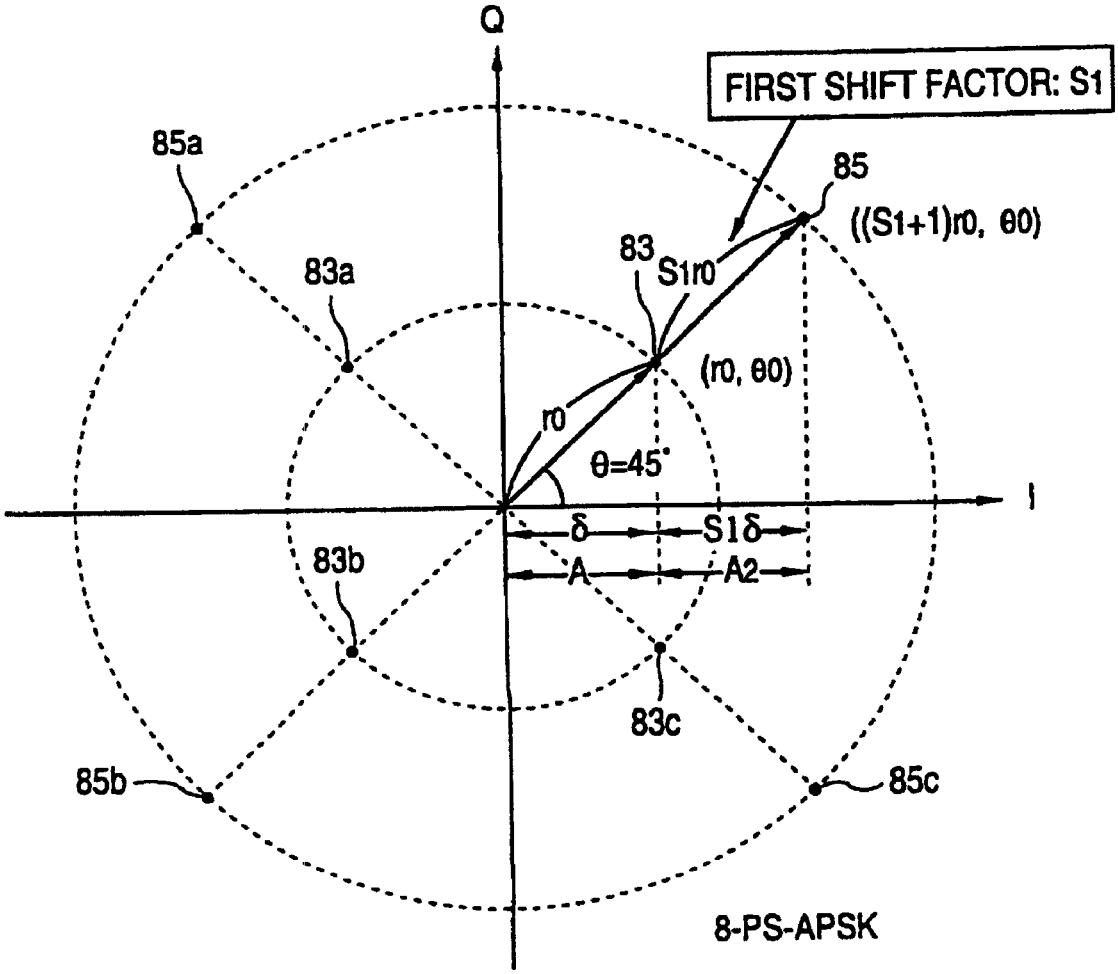
Figure 140:
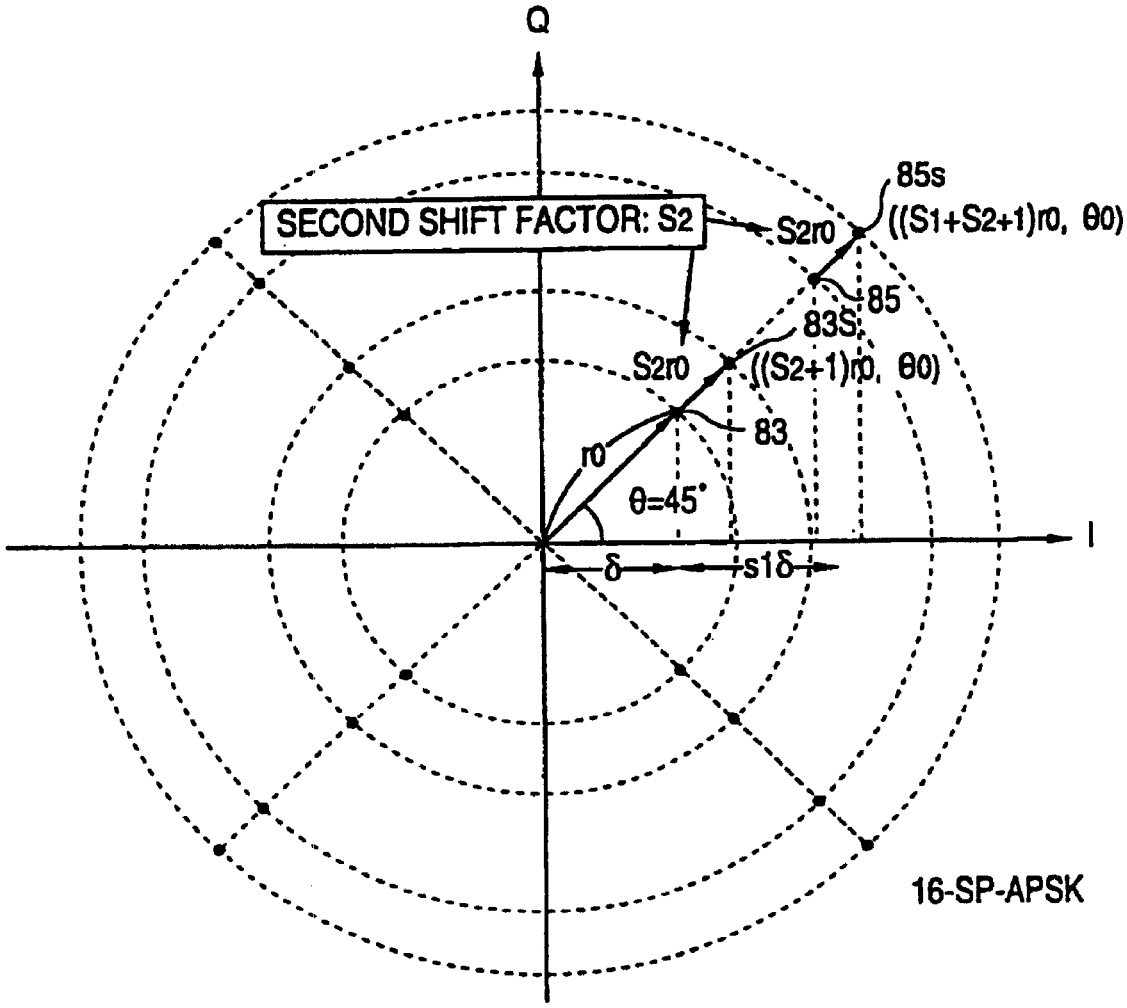
Figure 141:
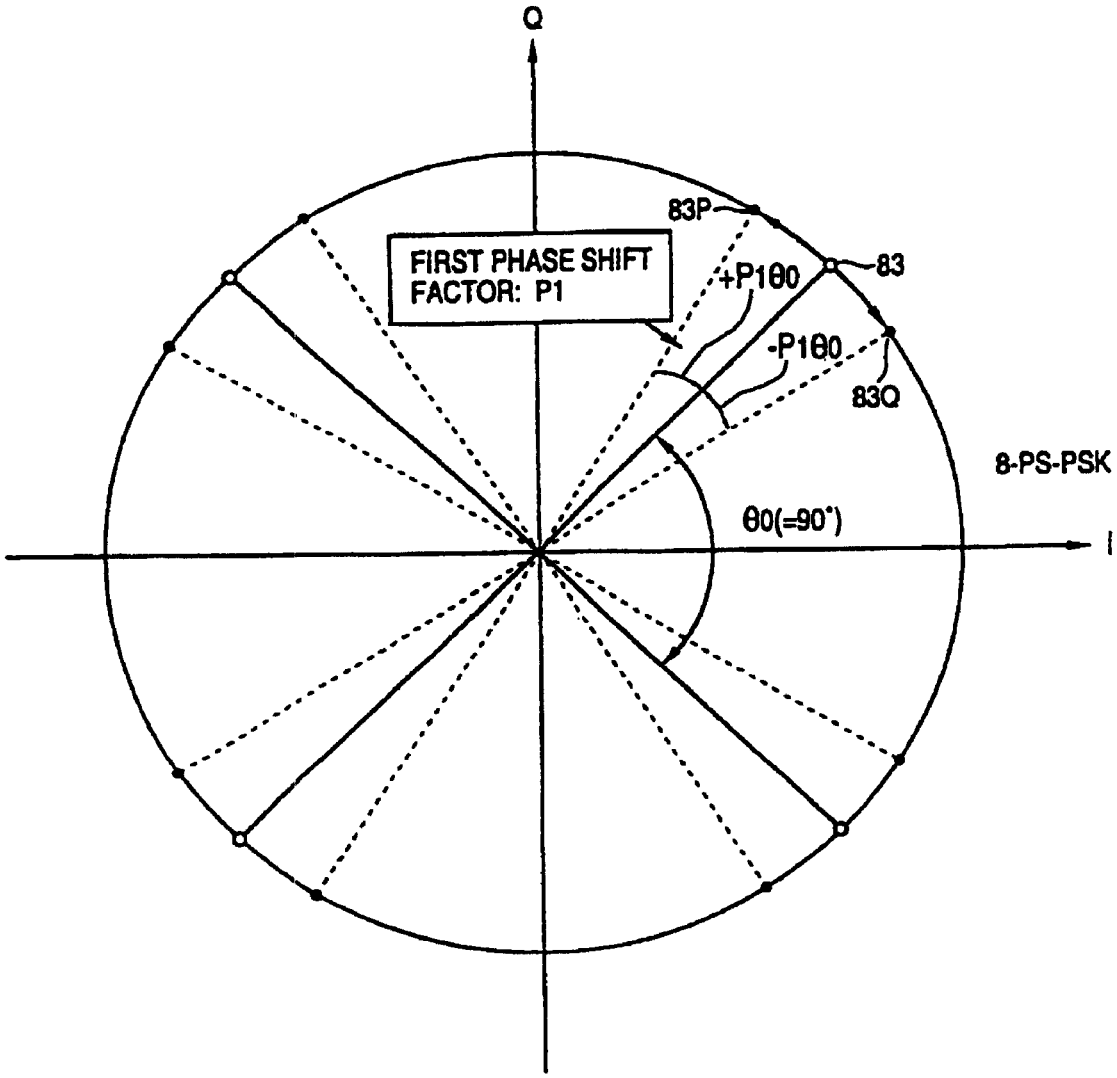
Figure 142:
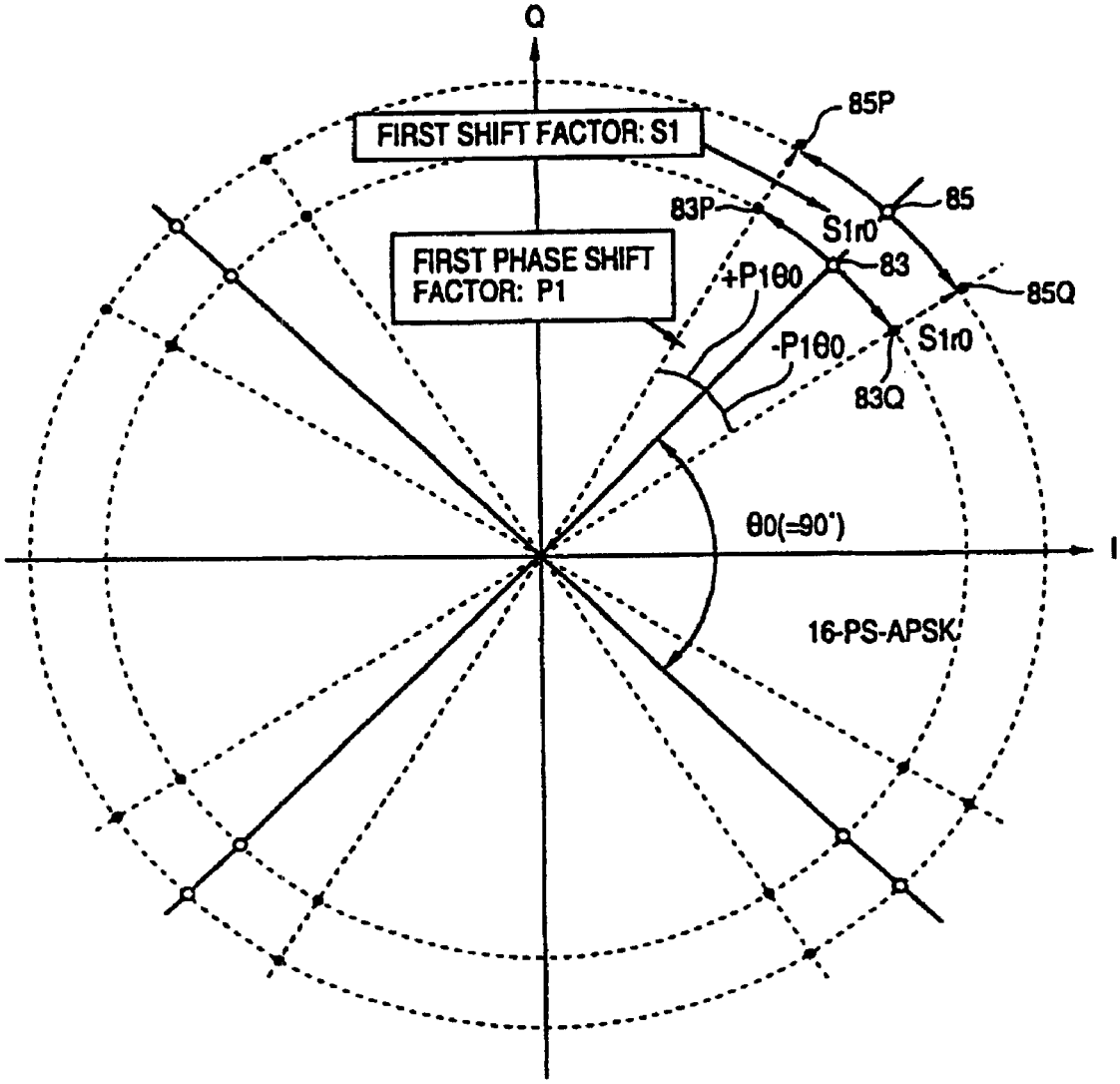
Figure 143:
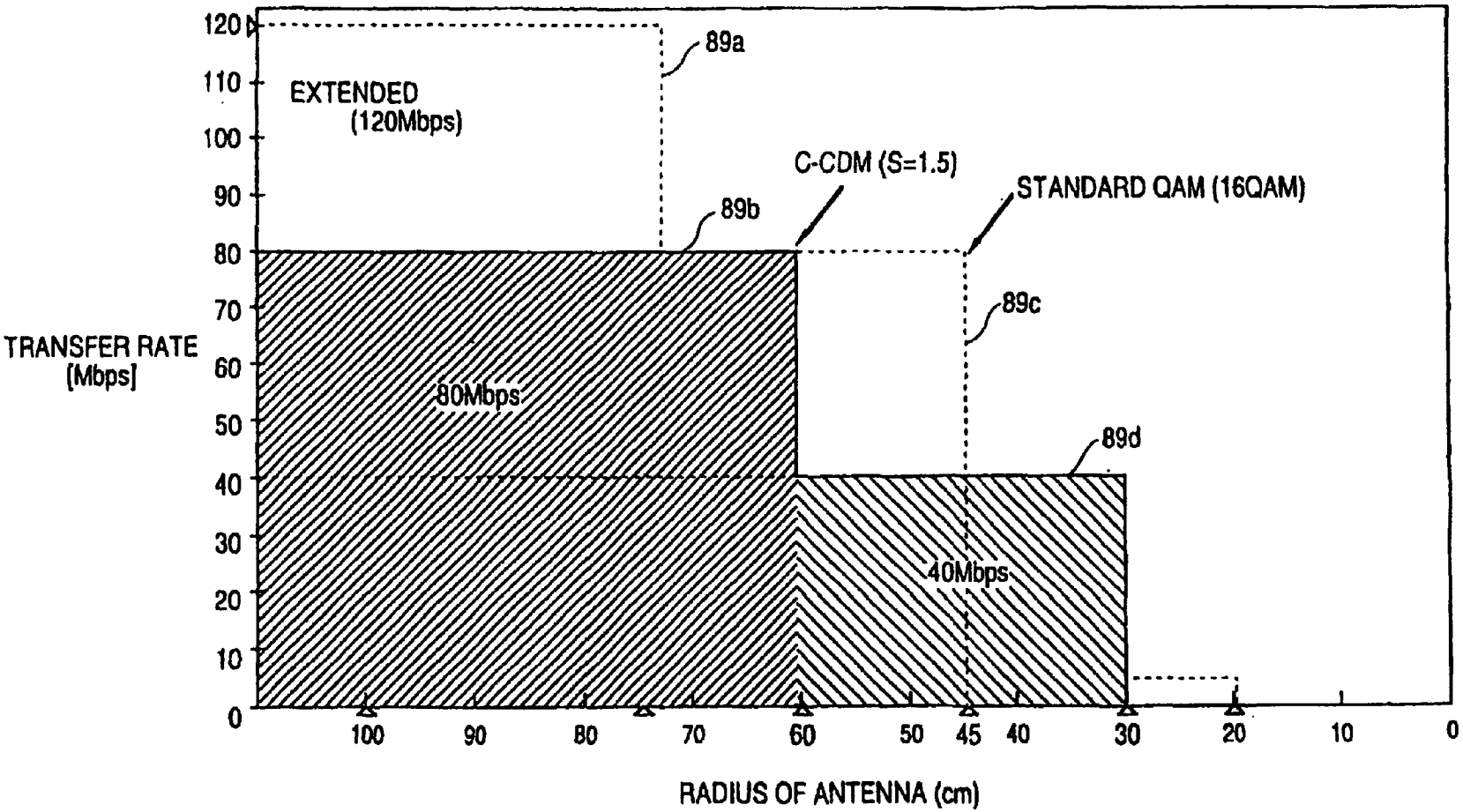
Figure 145A:
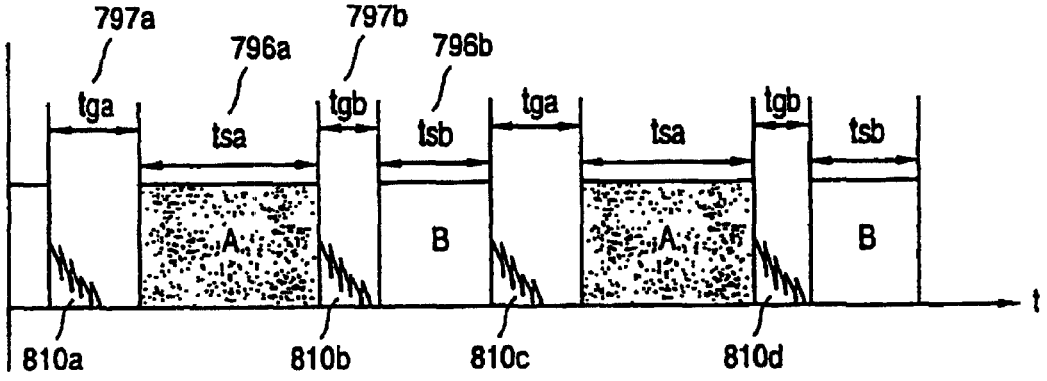
Figure 145B:
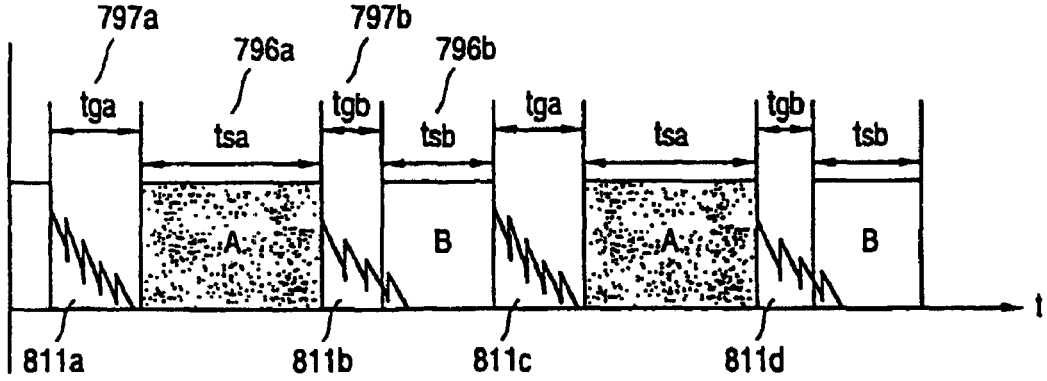
Figure 146:
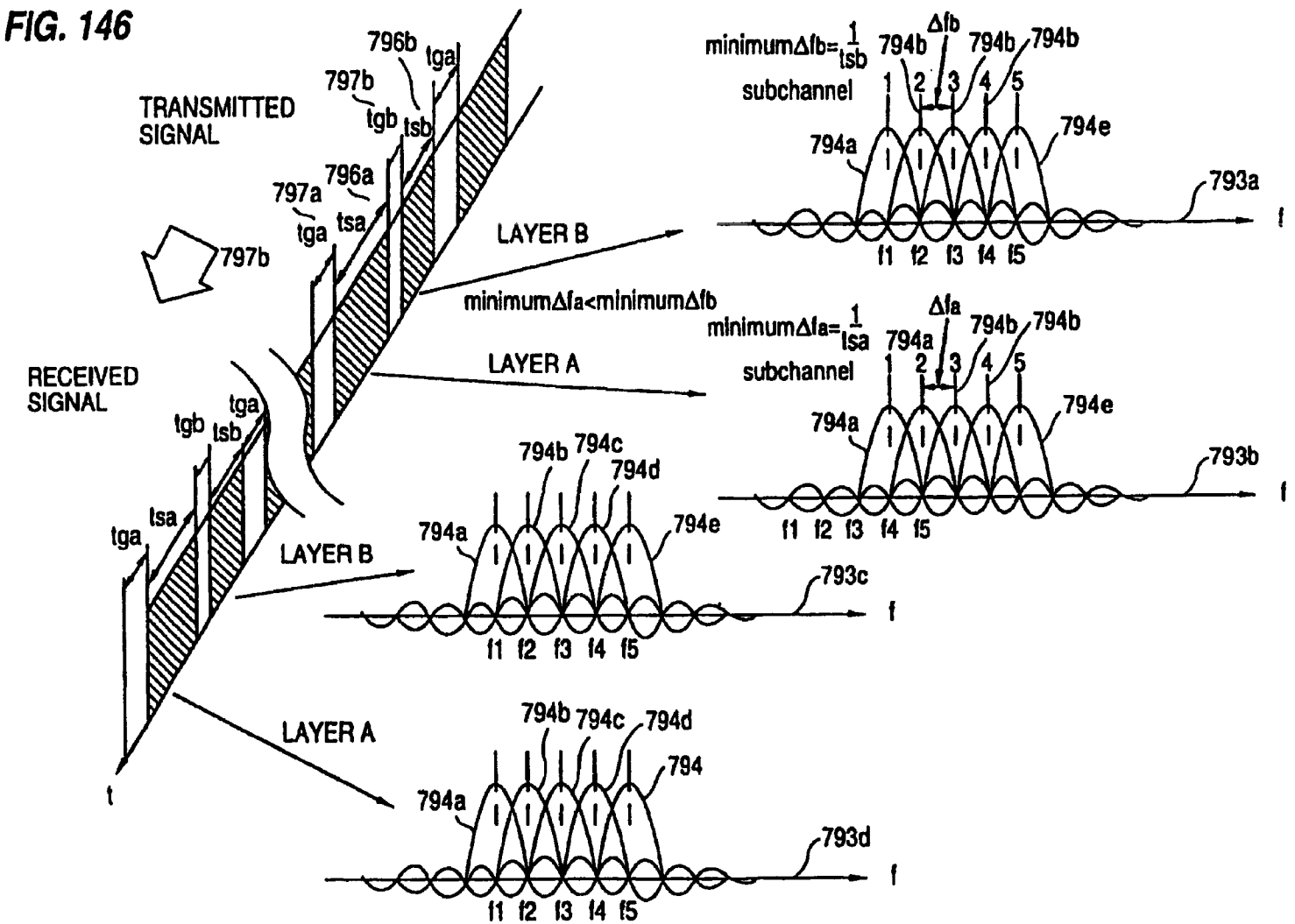
Figure 147:
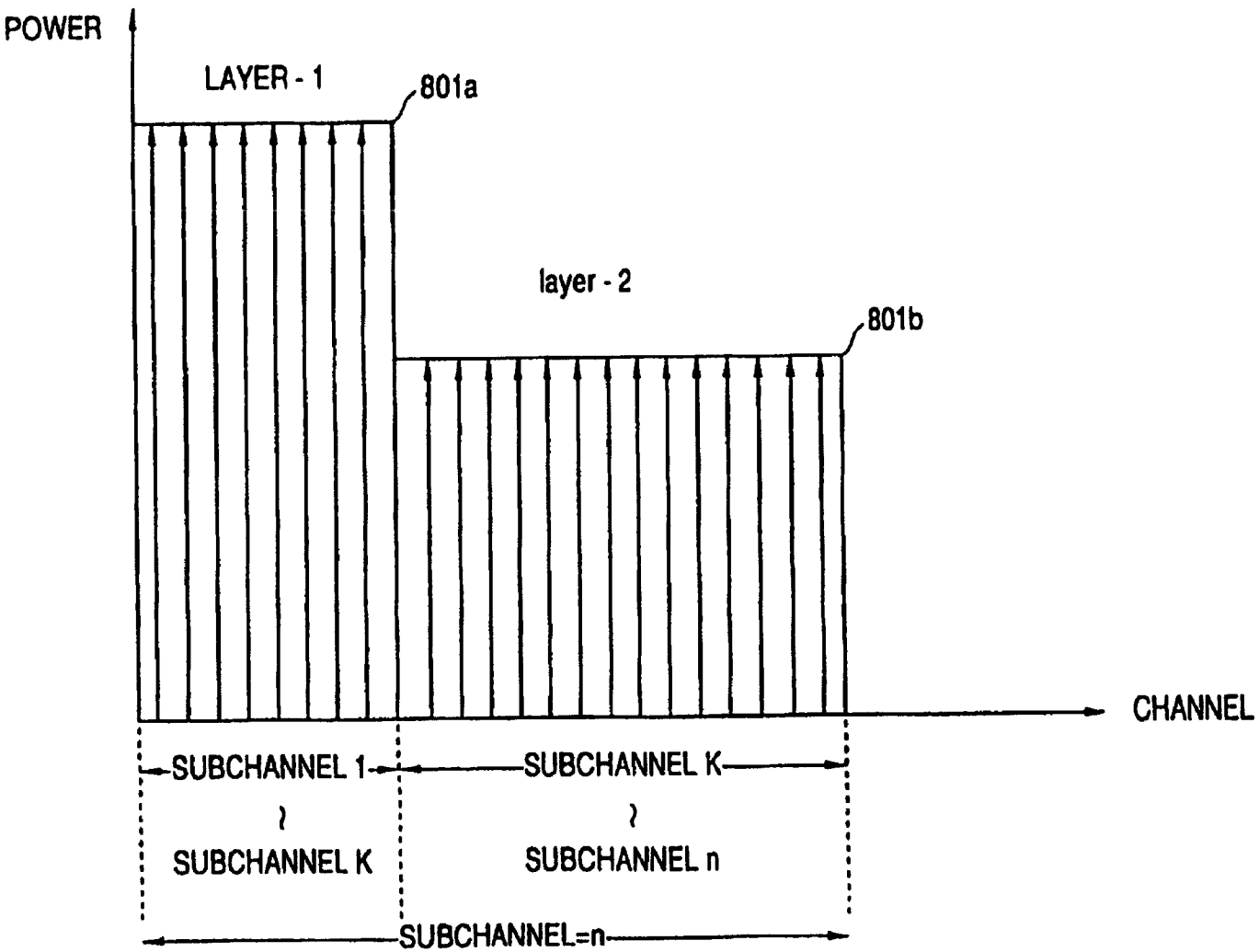
Figure 148:
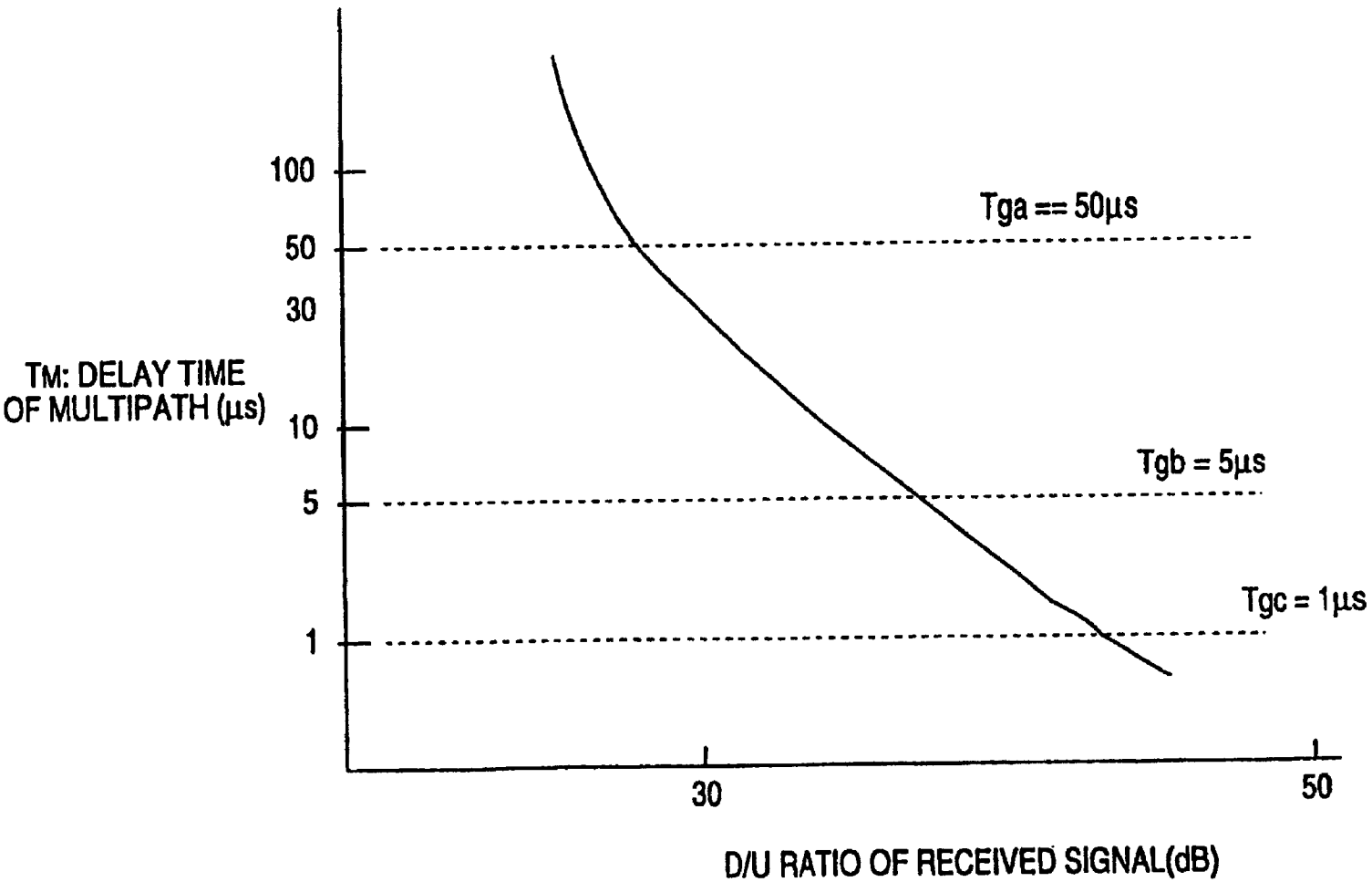
Figures 149A, 149B, 149C:
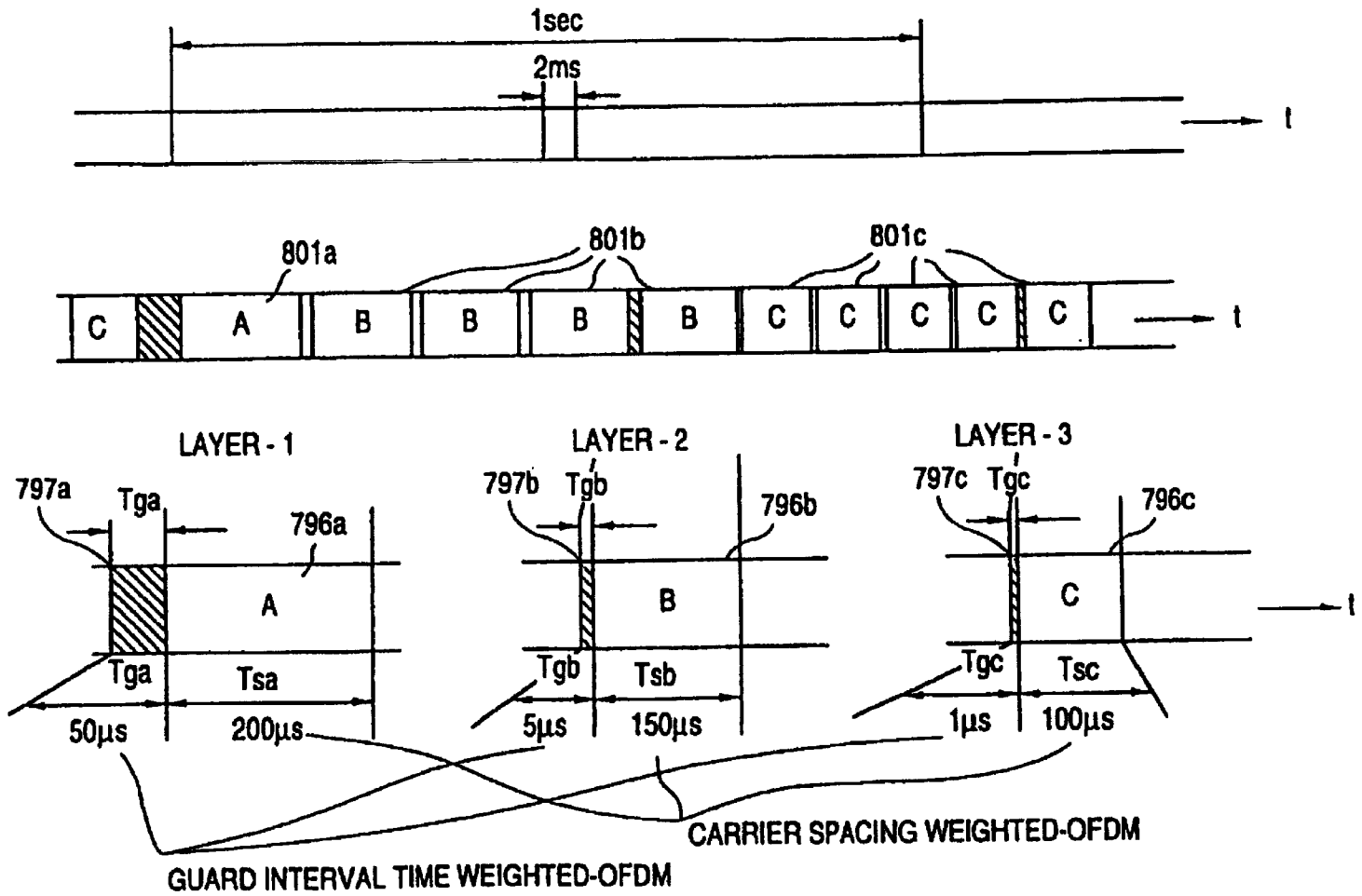
Figure 150:
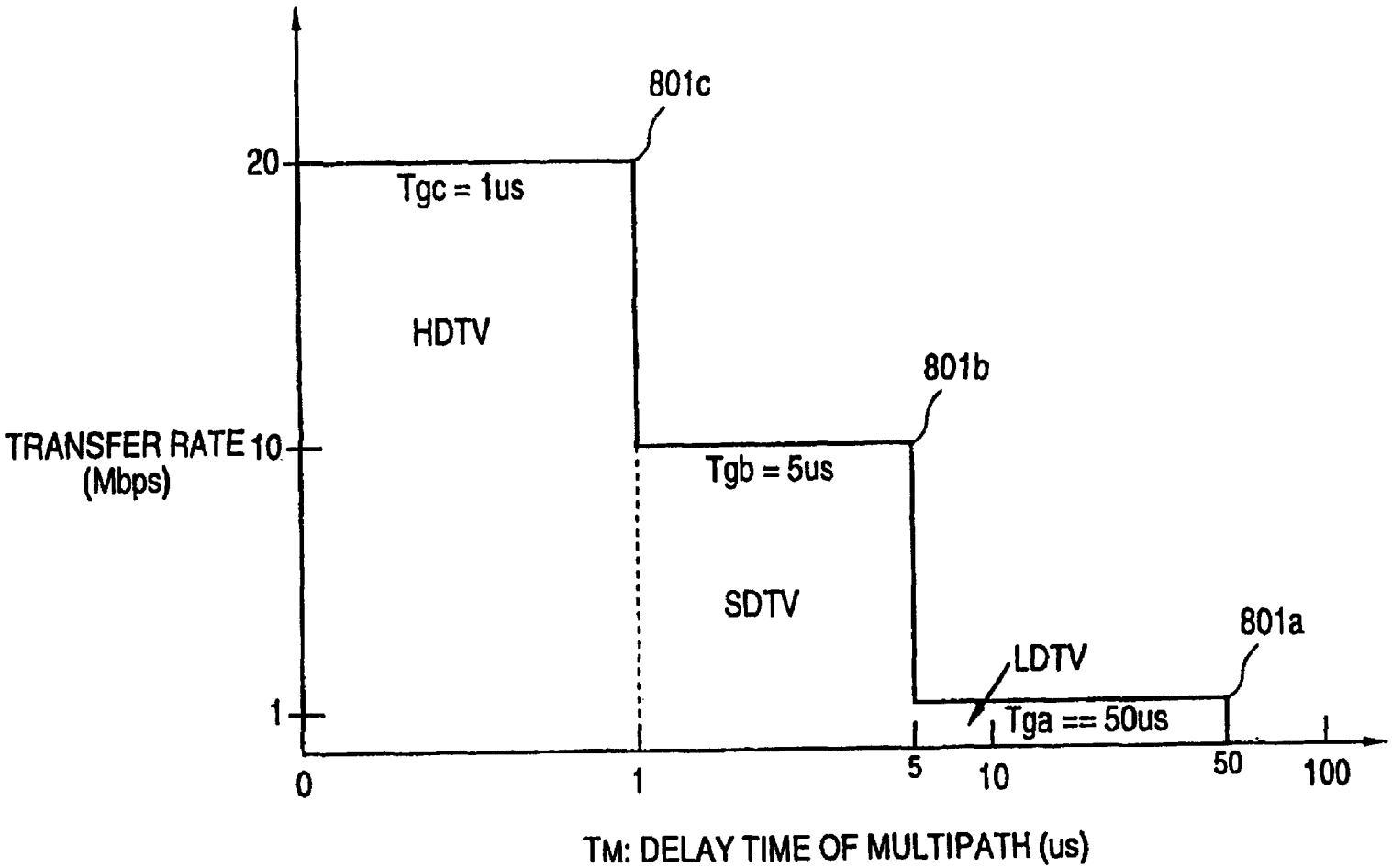
Figure 151:
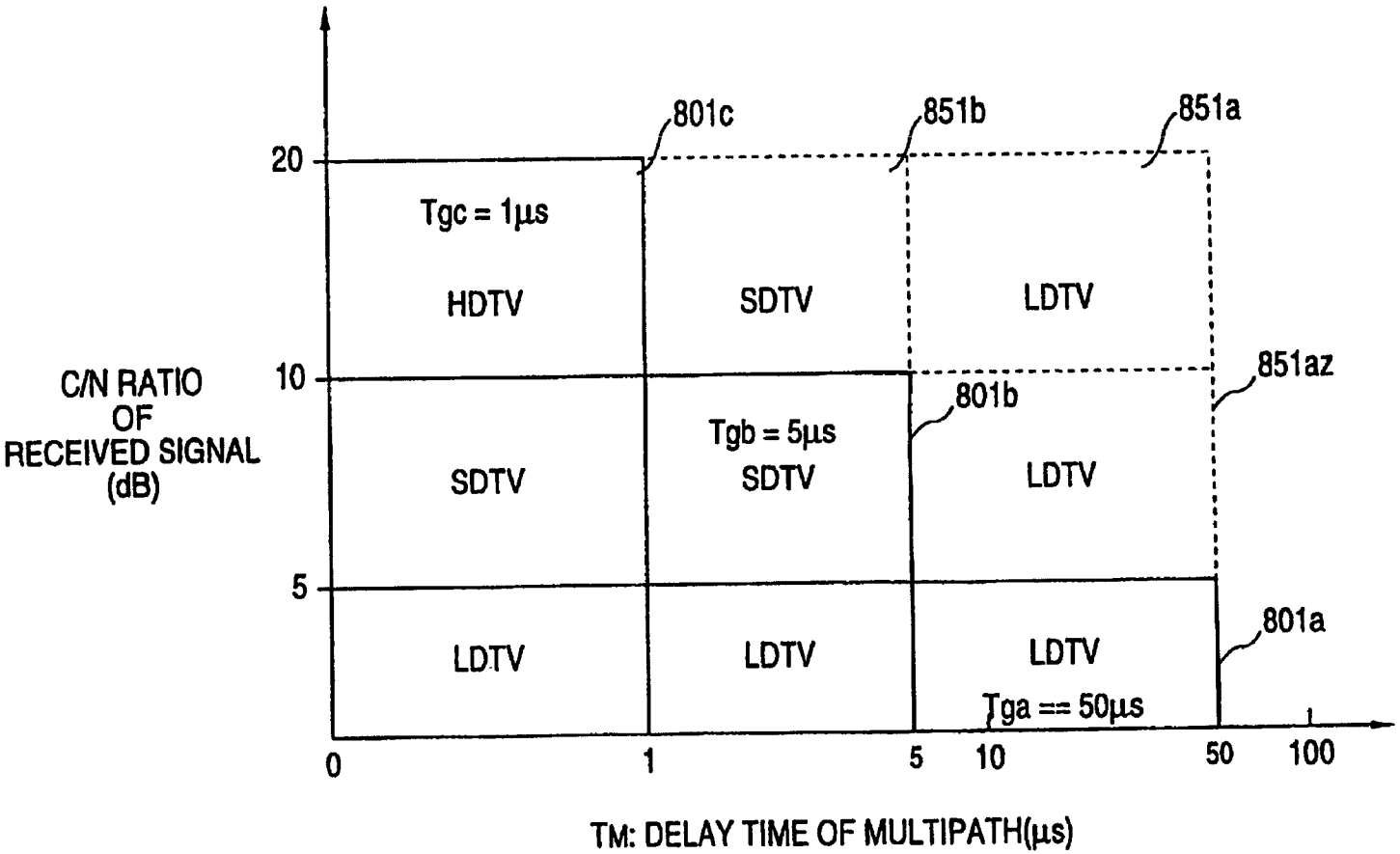

FIG. 124 is a view illustrating a principle of the OFDM system according to the ninth embodiment;

FIG. 125(a) is a view showing a frequency assignment of a modulation signal of a conventional system;

FIG. 125(b) is a view showing a frequency assignment of a modulation signal according to the ninth embodiment;

FIG. 126(a) is a view showing a frequency assignment of an OFDM signal of the ninth embodiment, wherein no weighting is applied;

FIG. 126(b) is a view showing a frequency assignment of an OFDM signal of the ninth embodiment, wherein two channels of two-layer OFDM are weighted by transmission electric power;

FIG. 126(c) is a view showing a frequency assignment of an OFDM signal of the ninth embodiment, wherein carrier intervals are doubled by weighting;

FIG. 126(d) is a view showing a frequency assignment of an OFDM signal of the ninth embodiment, wherein carrier intervals are not weighted;

FIG. 127 is a block diagram showing a transmitter/receiver according to the ninth embodiment;

FIG. 128(a) is a block diagram of a trellis encoder (ratio ½) in embodiments 2, 4, and 5, FIG. 128(b) is a block diagram of a trellis encoder (ratio ⅔) in embodiments 2, 4, and 5, FIG. 128(c) is a block diagram of a trellis encoder (ratio ¾) in embodiments 2, 4, and 5, FIG. 128(d) is a block diagram of a trellis decoder (ratio ½) in embodiments 2, 4, and 5, FIG. 128(e) is a block diagram of a trellis decoder (ratio ⅔) in embodiments 2, 4, and 5, FIG. 128(f) is a block diagram of a trellis decoder (ratio ¾) in embodiments 2, 4, and 5;

FIG. 129 is a view showing a time assignment of effective symbol periods and guard intervals according to the ninth embodiment;

FIG. 130 is a graphic diagram showing a relationship between C/N rate and error rate according to the ninth embodiment;

FIG. 131 is a block diagram showing a magnetic recording/playback apparatus according to the fifth embodiment;

FIG. 132 is a view showing a recording format of track on the magnetic tape and a [travelling] *traveling* of a head;

FIG. 133 is a block diagram showing a transmitter/receiver according to the third embodiment;

FIG. 134 is a diagram showing a frequency assignment of a conventional broadcasting;

FIG. 135 is a diagram showing a relationship between service area and picture quality in a three-level signal transmission system according to the third embodiment;

FIG. 136 is a diagram showing a frequency assignment in case the multi-level signal transmission signal according to the third embodiment is combined with FDM;

FIG. 137 is a block diagram showing a transmitter/receiver according to the third embodiment, in which Trellis encoding is adopted;

FIG. 138 is a block diagram showing a transmitter/receiver according to the ninth embodiment, in which a part of low frequency band signal is transmitted by OFDM;

FIG. 139 is a diagram showing an assignment of signal points of the 8-PS-APSK signal of the first embodiment;

FIG. 140 is a diagram showing an assignment of signal points of the 16-PS-APSK signal of the first embodiment;

FIG. 141 is a diagram showing an assignment of signal points of the 8-PS-PSK signal of the first embodiment;

FIG. 142 is a diagram showing an assignment of signal points of the 16-PS-PSK (PS type) signal of the first embodiment;

FIG. 143 is a graphic diagram showing the relationship between antenna radius of satellite and transmission capacity according to the first embodiment;

FIG. 144 is a block diagram showing a weighted OFDM transmitter/receiver according to the ninth embodiment;

FIG. 145(a) is a diagram showing the waveform of the guard time and the symbol time in the multi-level OFDM according to the ninth embodiment, wherein multipath is short;

FIG. 145(b) is a diagram showing the waveform of the guard time and the symbol time in the multi-level OFDM according to the ninth embodiment, wherein multipath is long;

FIG. 146 is a diagram showing a principle of the multi-level OFDM according to the ninth embodiment;

FIG. 147 is a diagram showing subchannel assignment of a two-layer signal transmission system, weighted electric power according to the ninth embodiment;

FIG. 148 is a diagram showing relationship among the D/V ratio, the multipath delay time, and the guard time according to the ninth embodiment;

FIG. 149(a) is a diagram showing time slots of respective layers according to the ninth embodiment;

FIG. 149(b) is a diagram showing time distribution of guard times of respective layers according to the ninth embodiment;

FIG. 149(c) is a diagram showing time distribution of guard times of respective layers according to the ninth embodiment;

FIG. 150 is a diagram showing the relationship between multipath delay time and transfer rate according to the ninth embodiment, wherein a three-layer signal transmission effective to multipath is realized; and FIG. 151 is a diagram showing the relationship between multipath delay time and C/N ratio according to the ninth embodiment, wherein two-dimensional, matrix type, multi-layer broadcast service can be realized by combining the GTW-OFDM and the C-CDM (or CSW-OFDM).

Figure 152:
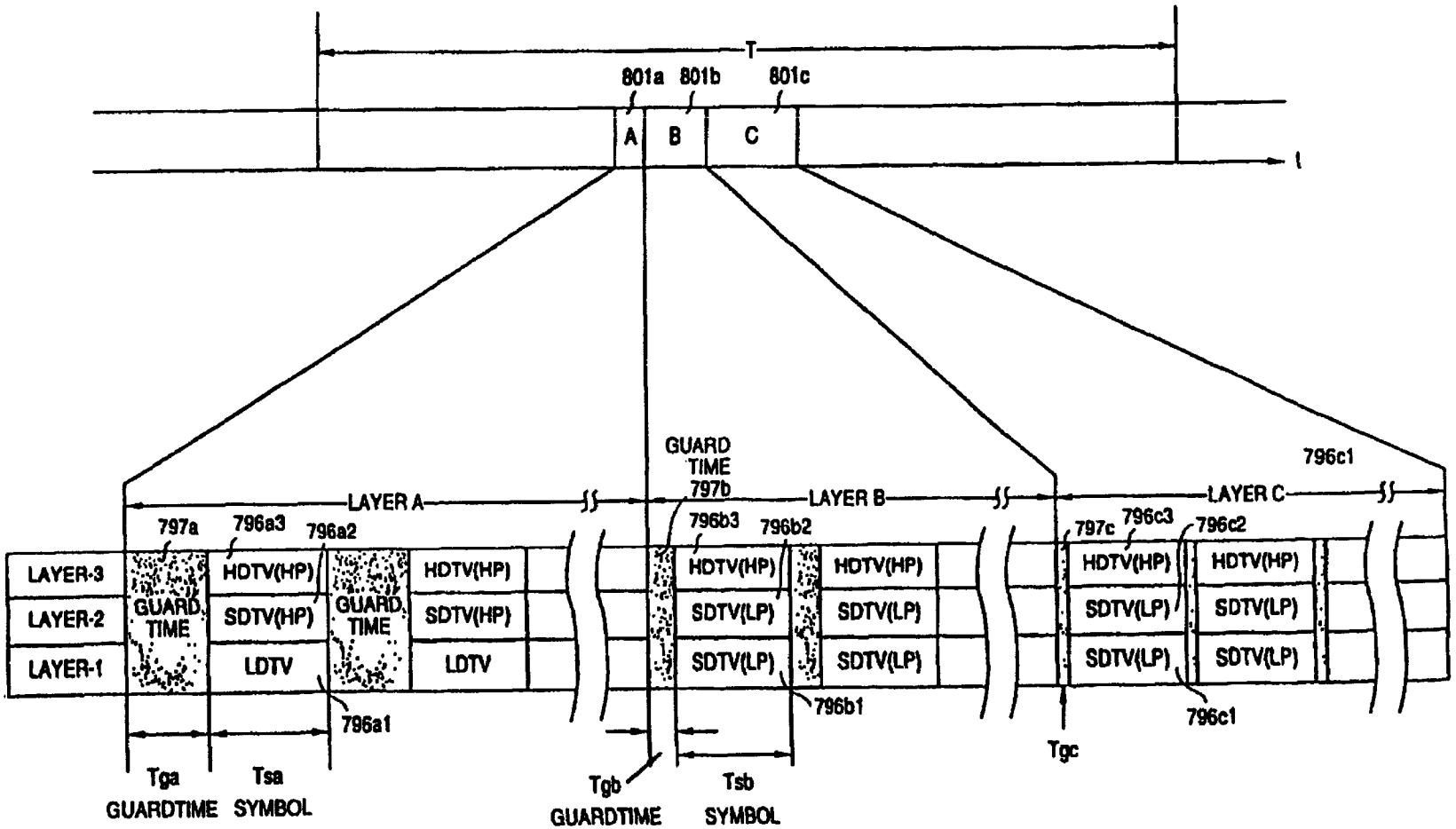
Figure 153:
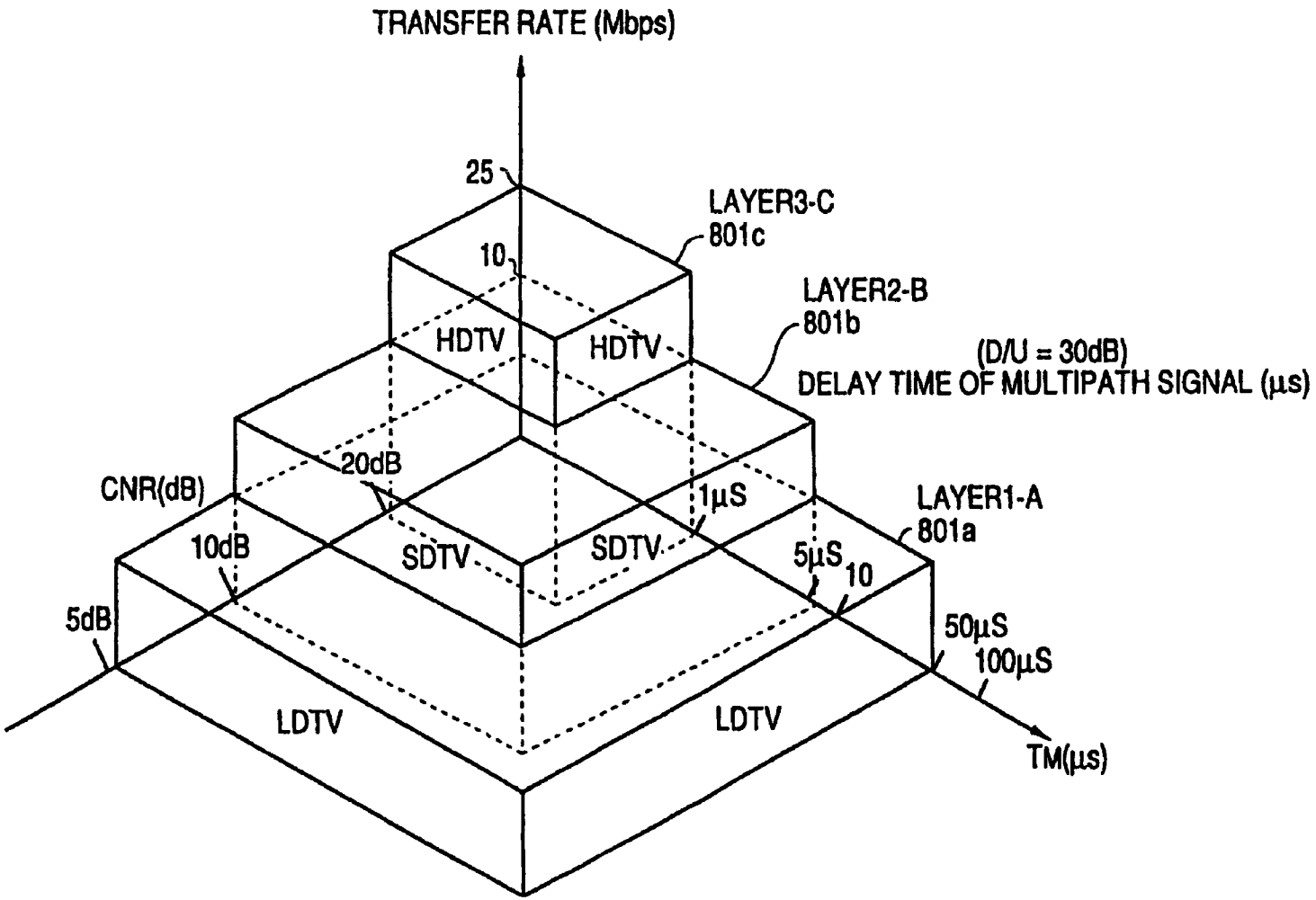
Figures 154A, 154B, 154C:
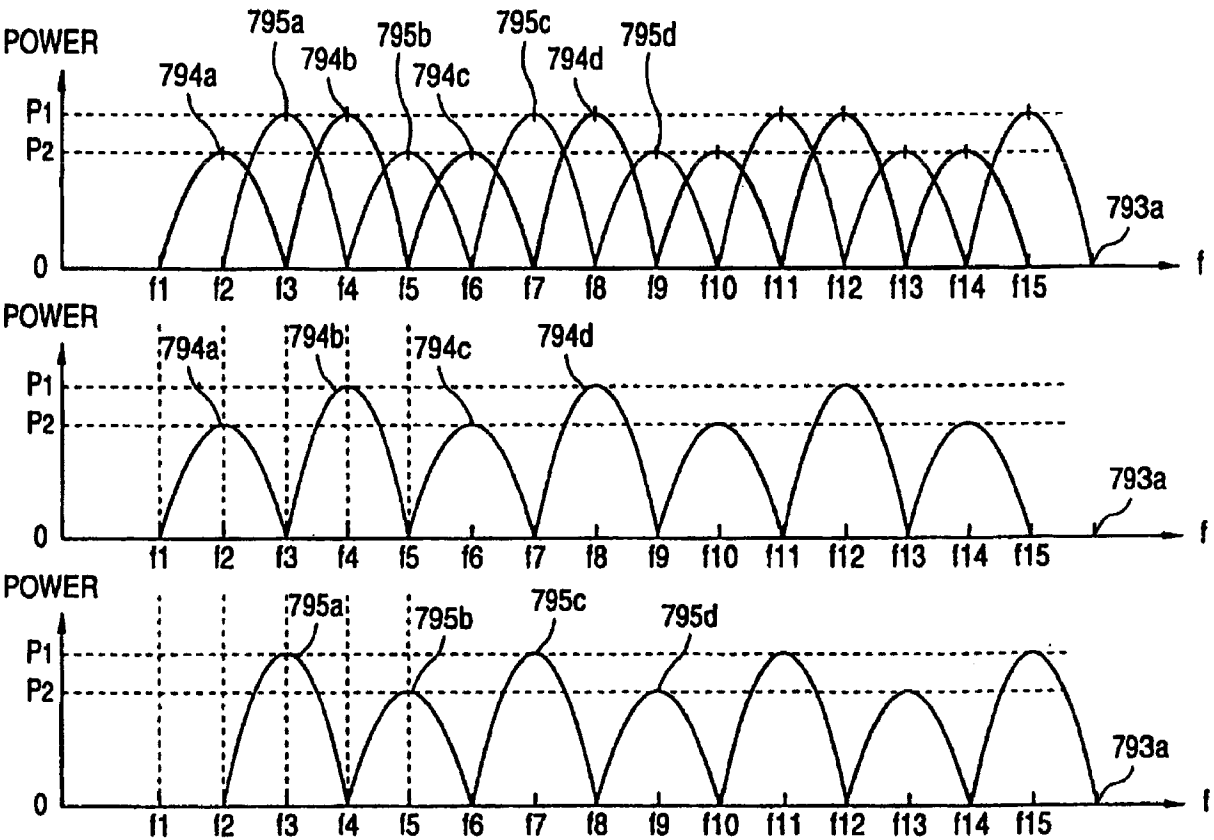
Figure 155:
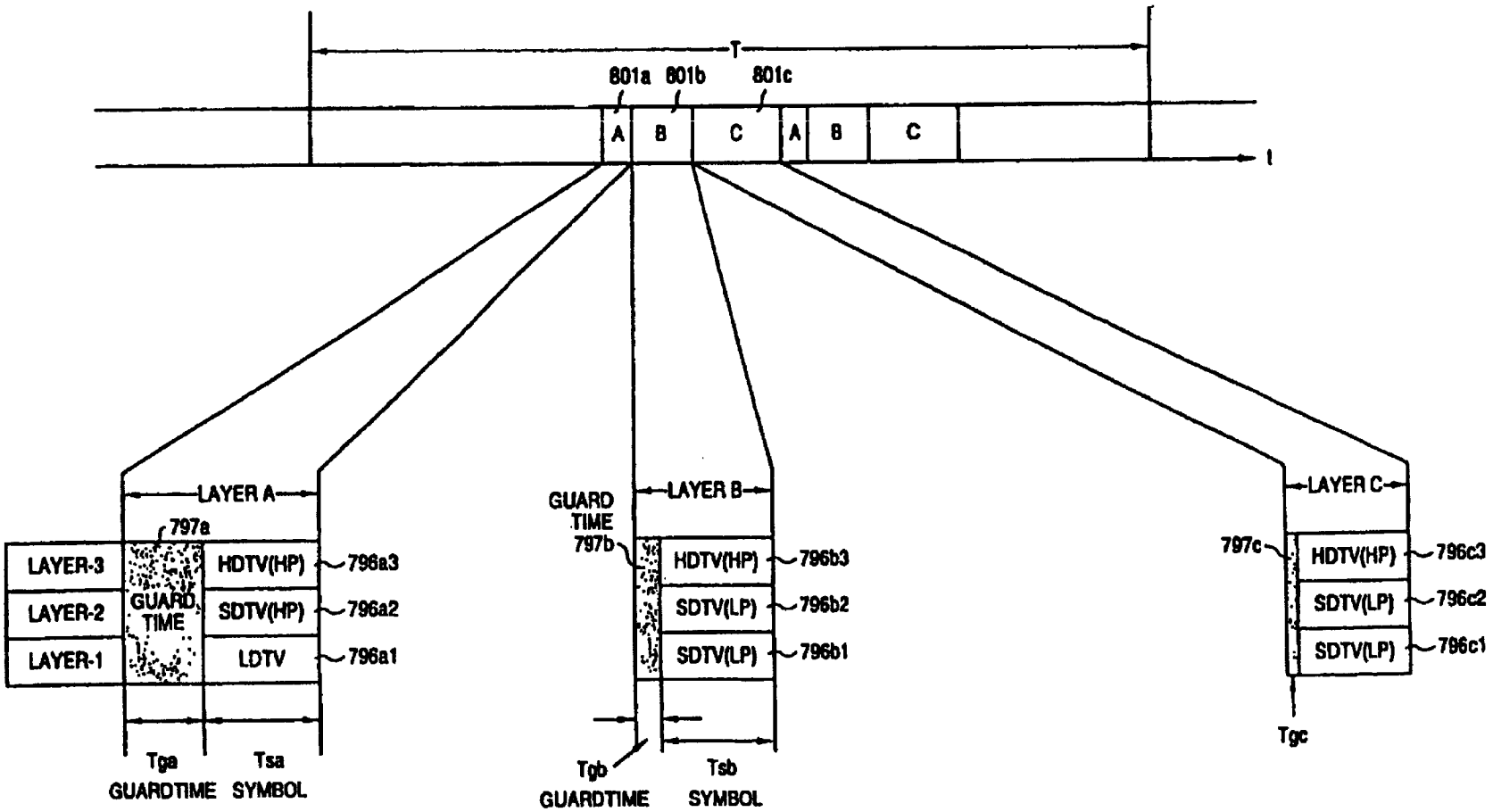
Figure 156:
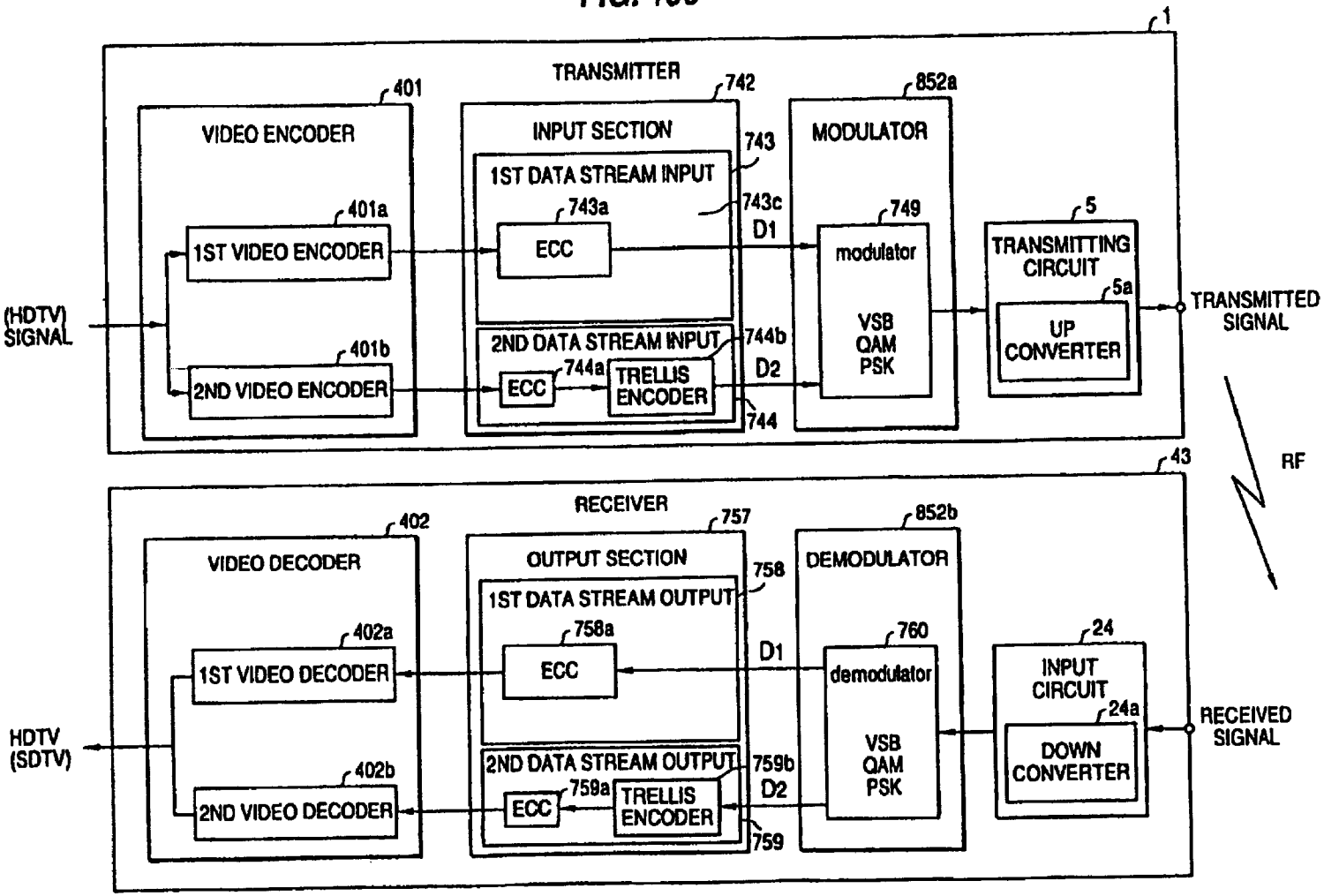
Figure 157:
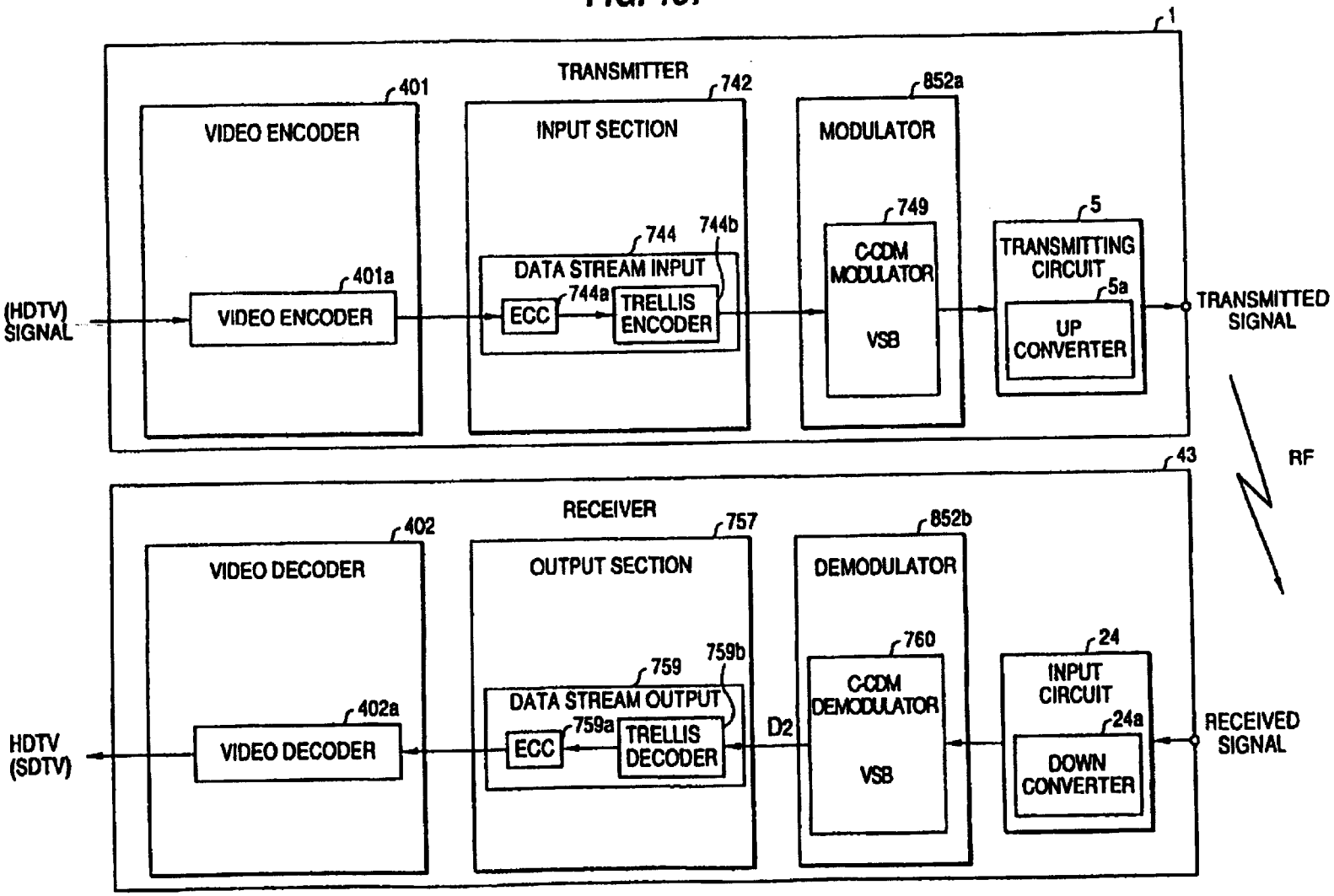
Figure 158:
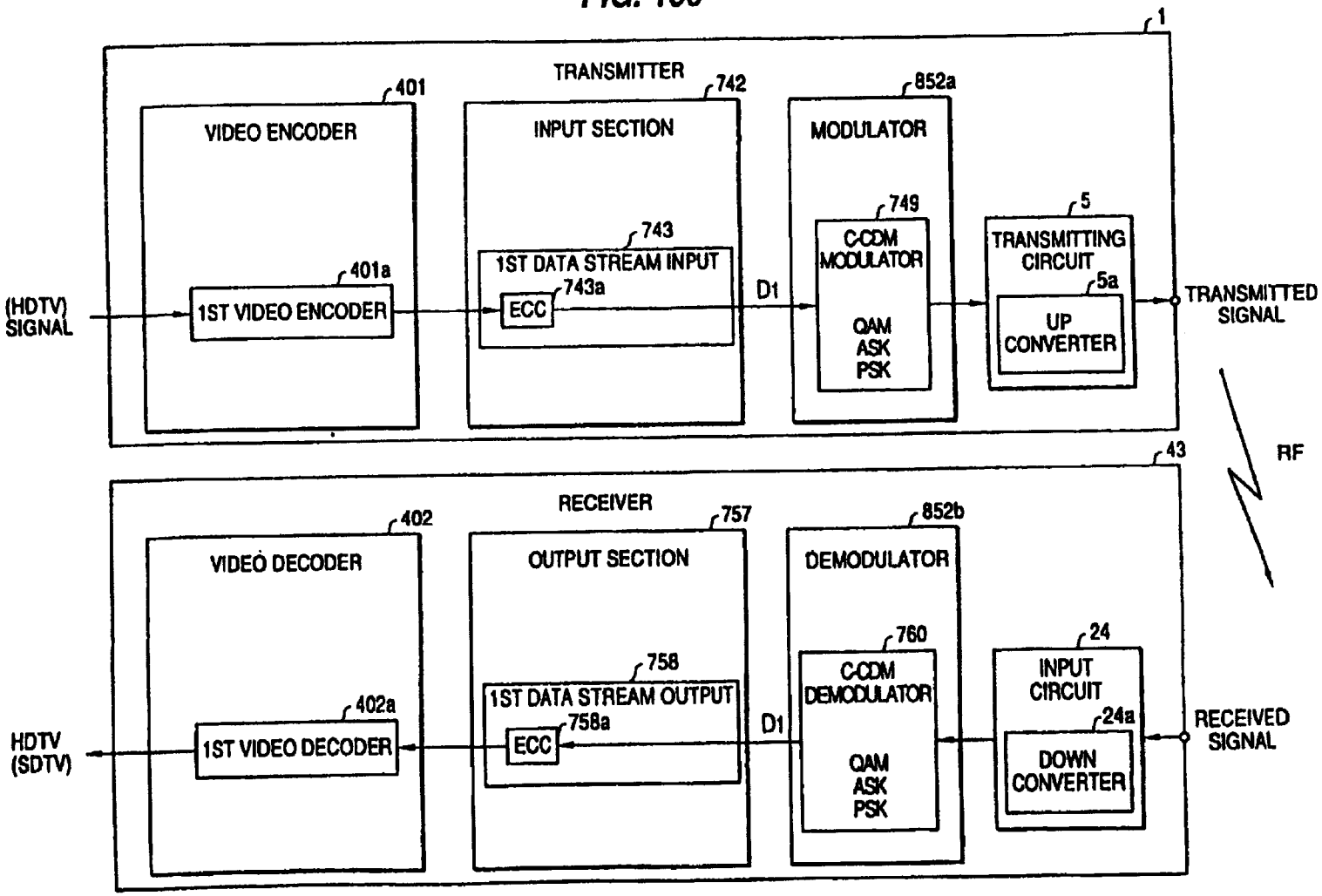
Figures 159A, 159B, 159C, 159D:
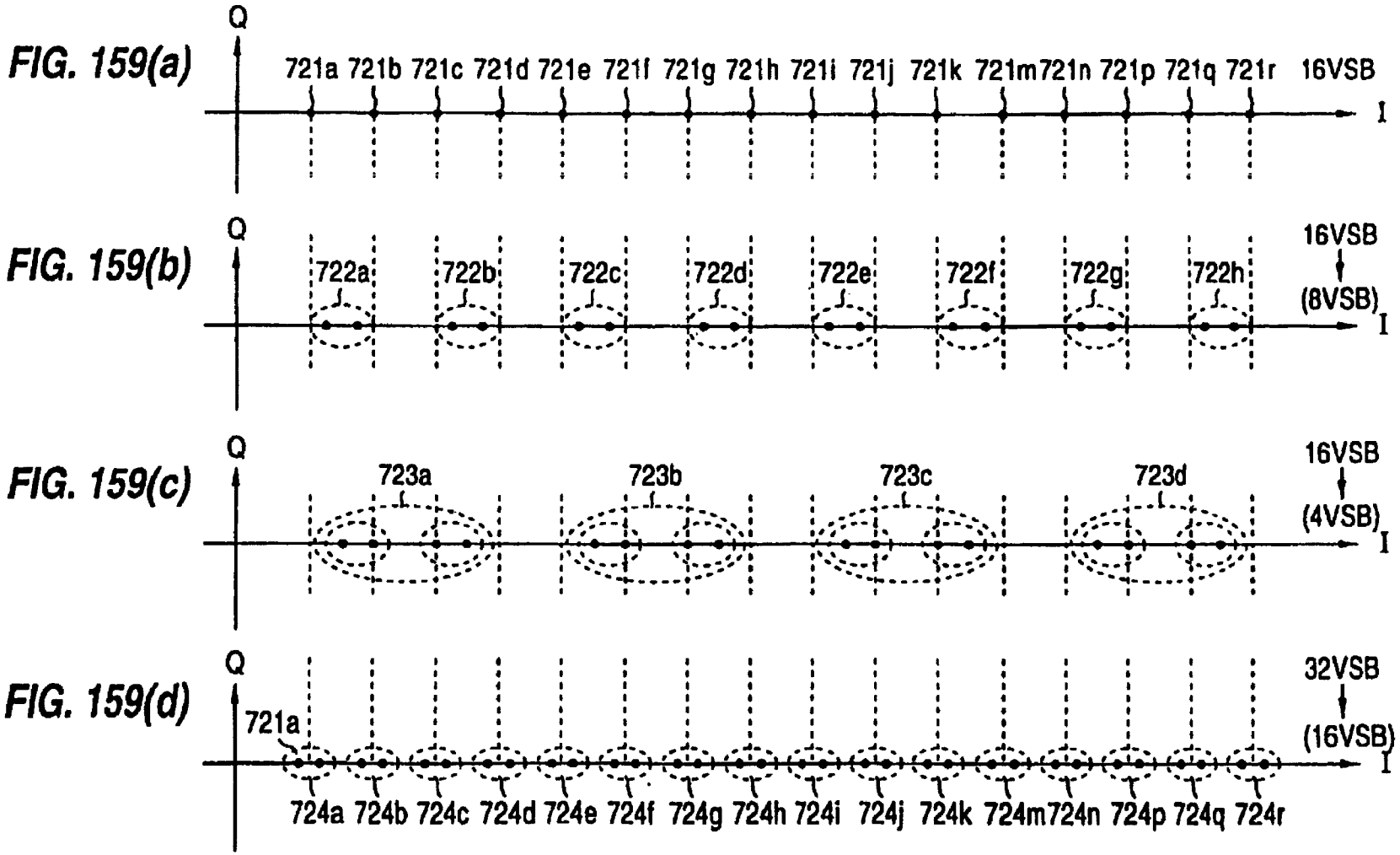
Figure 160A:
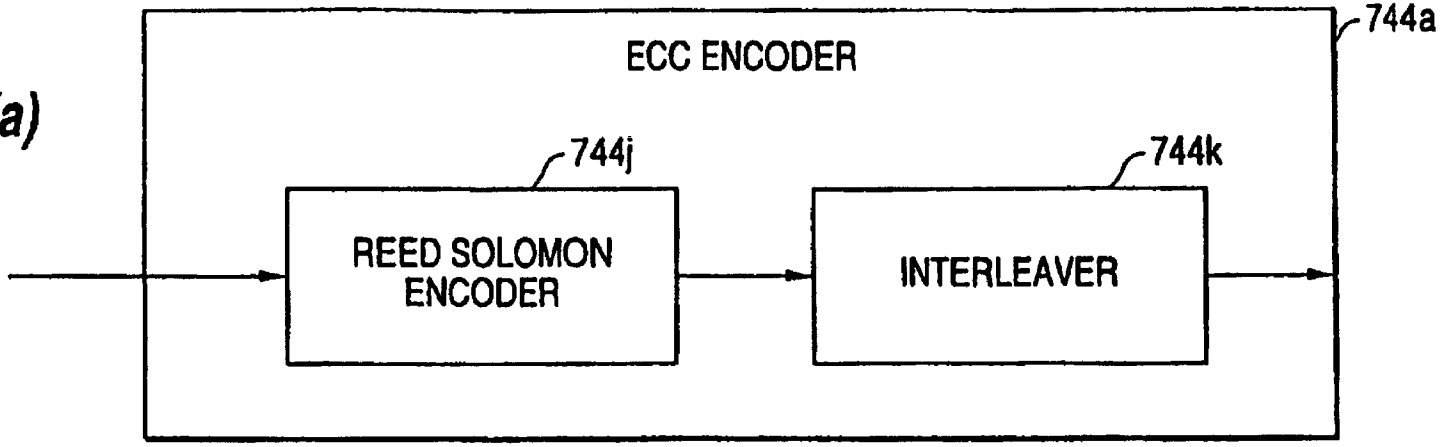
Figure 160B:
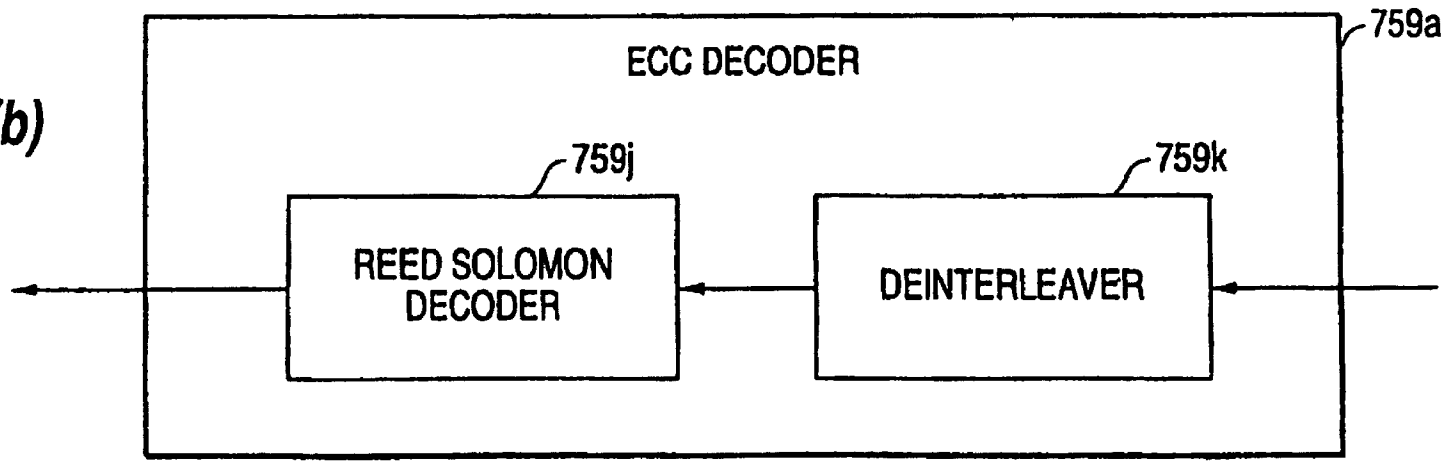
Figure 161:
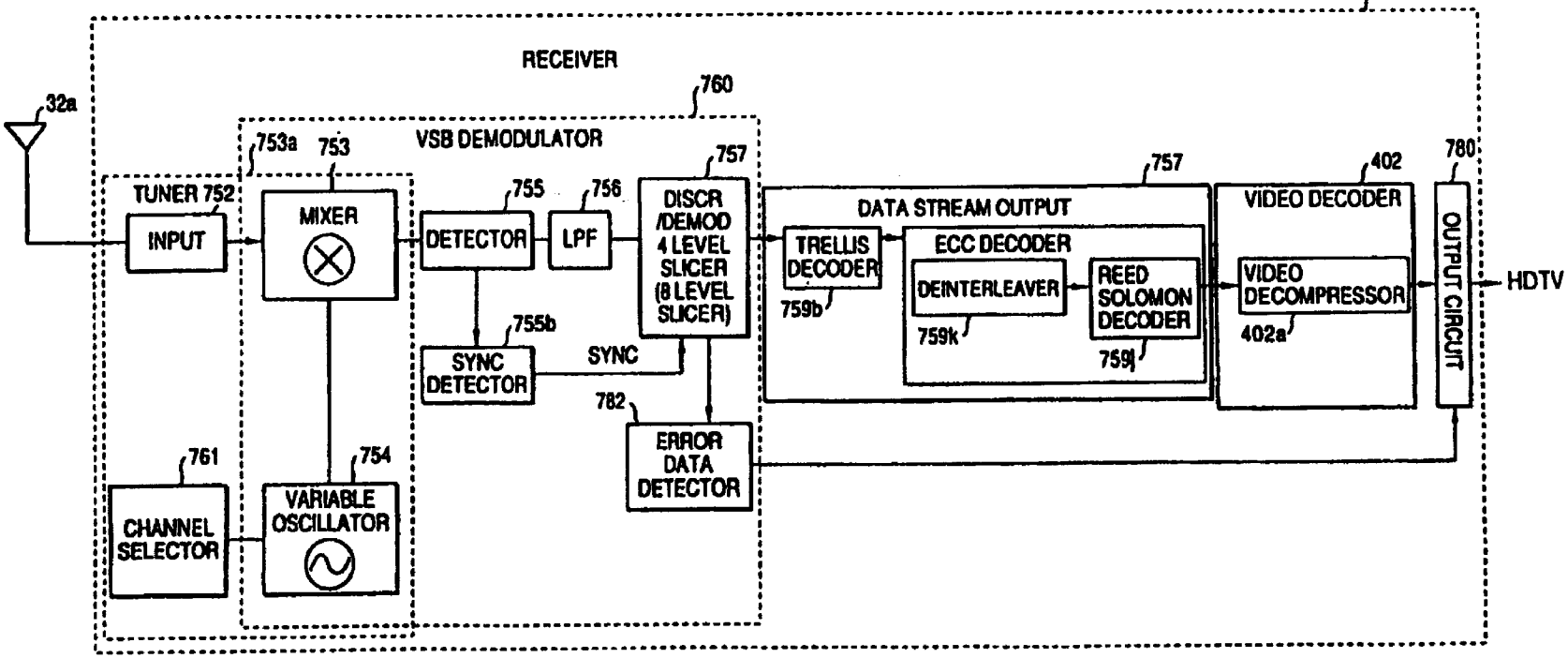
Figure 162:
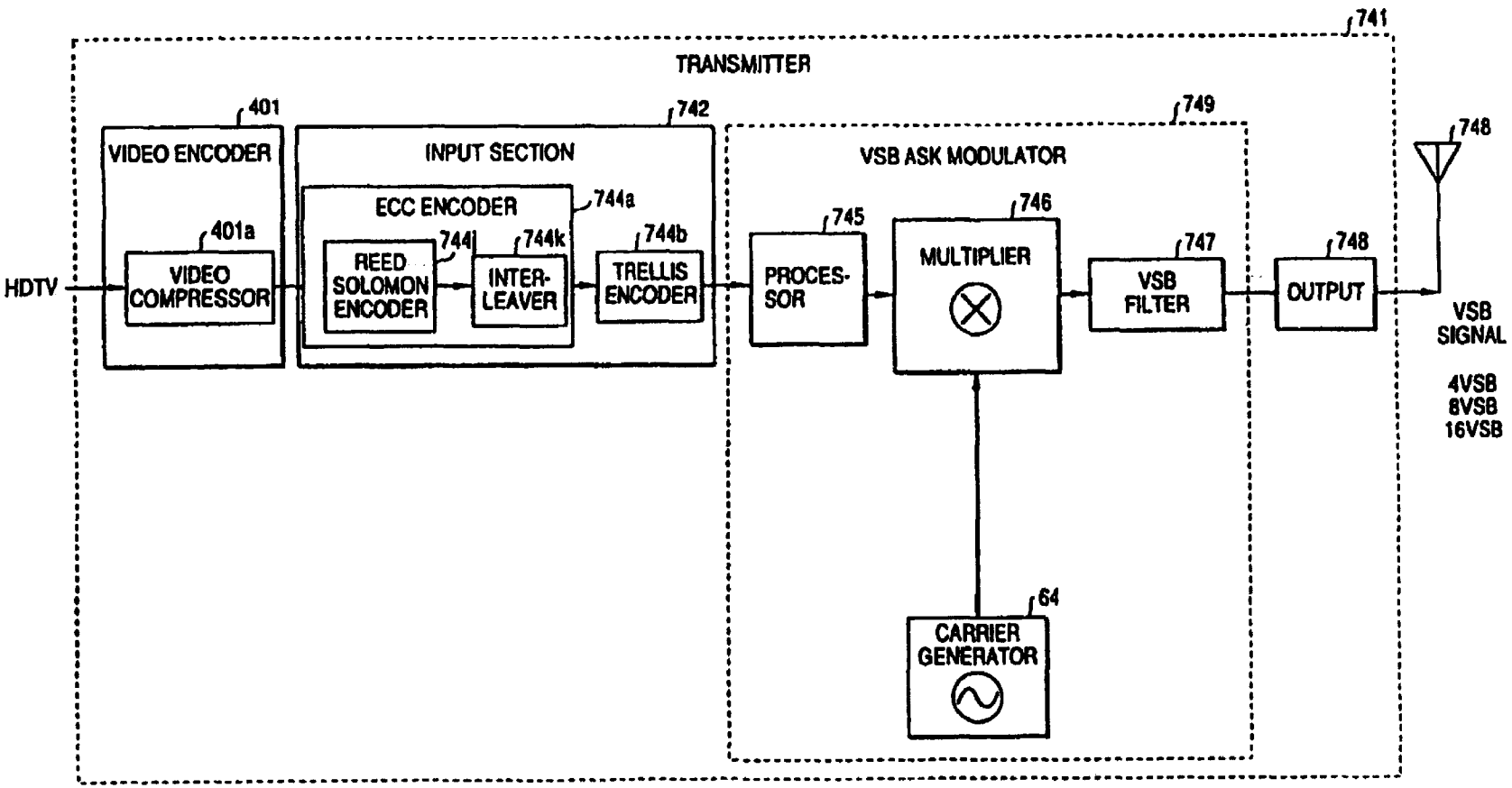
Figure 163:
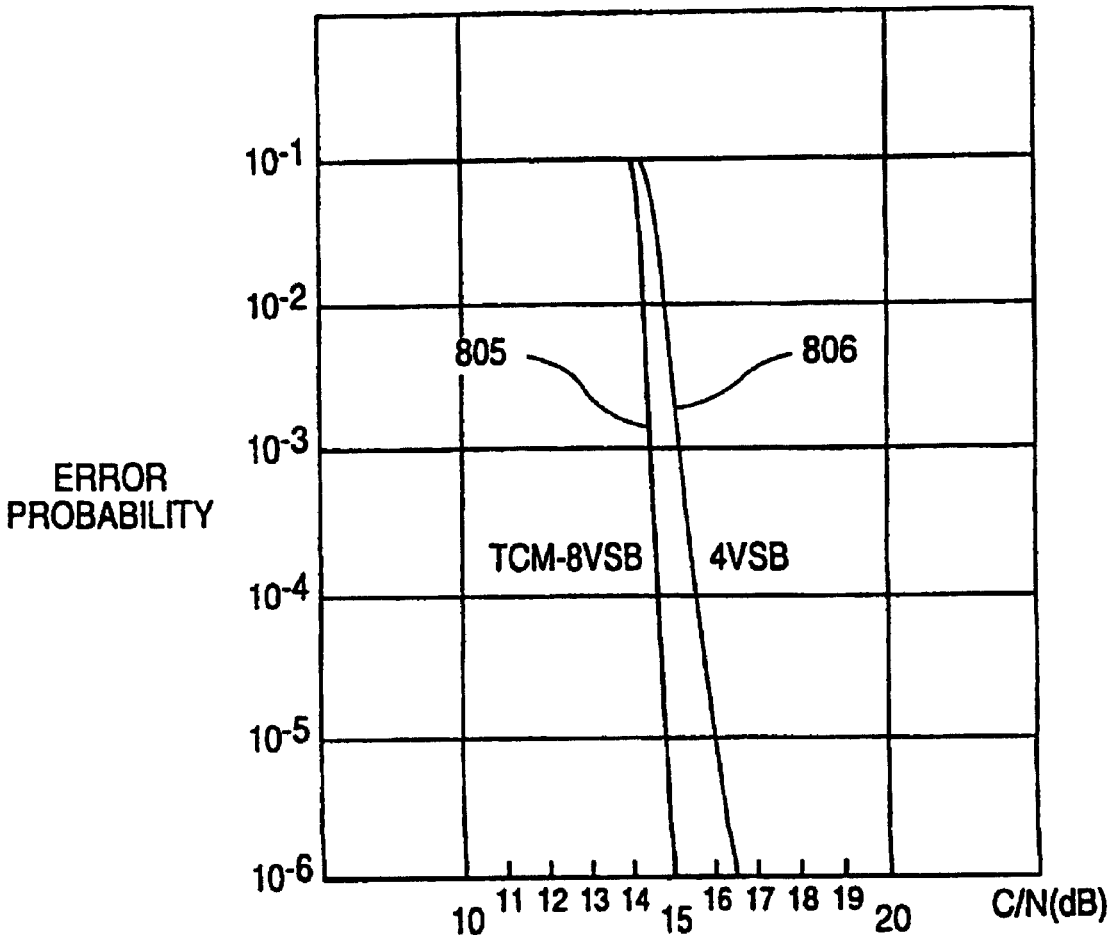
Figure 164:
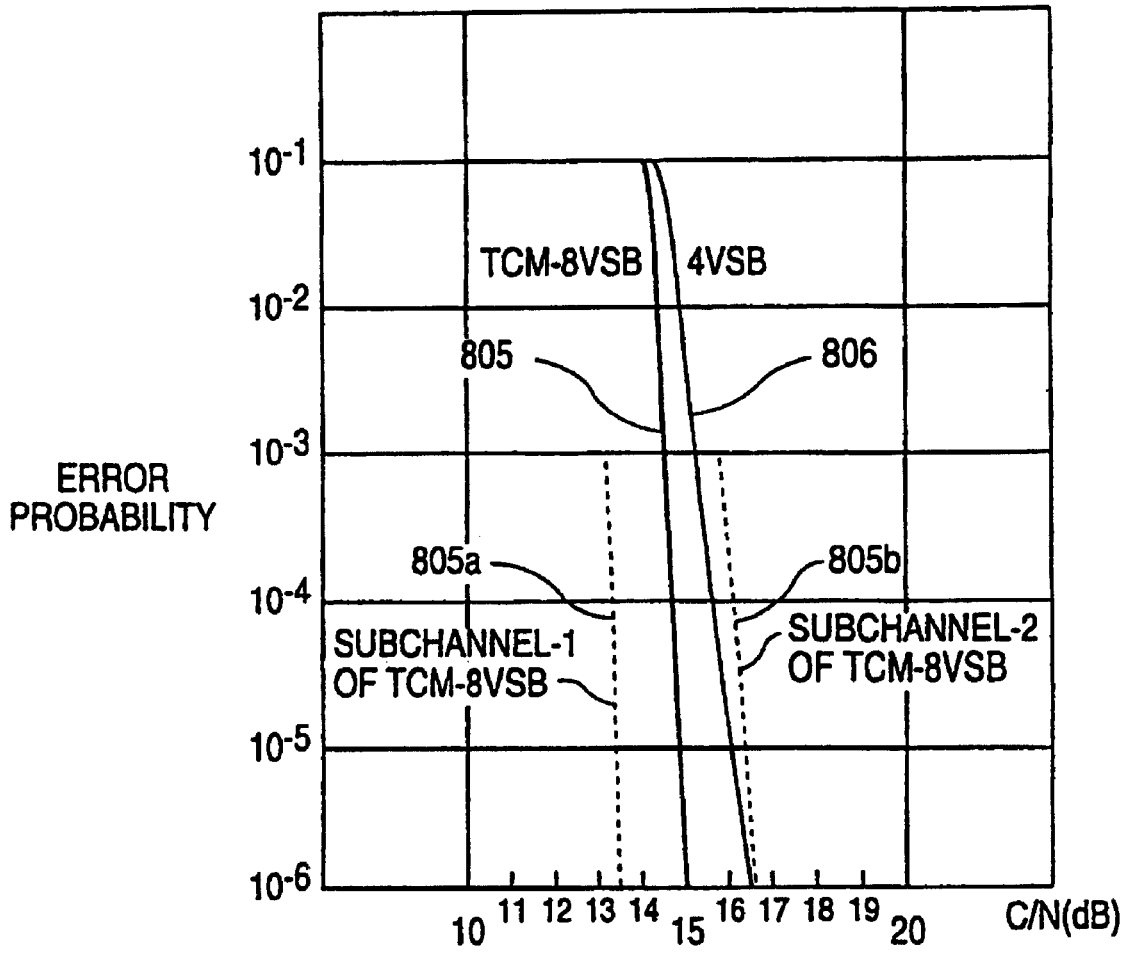
Figure 165A:
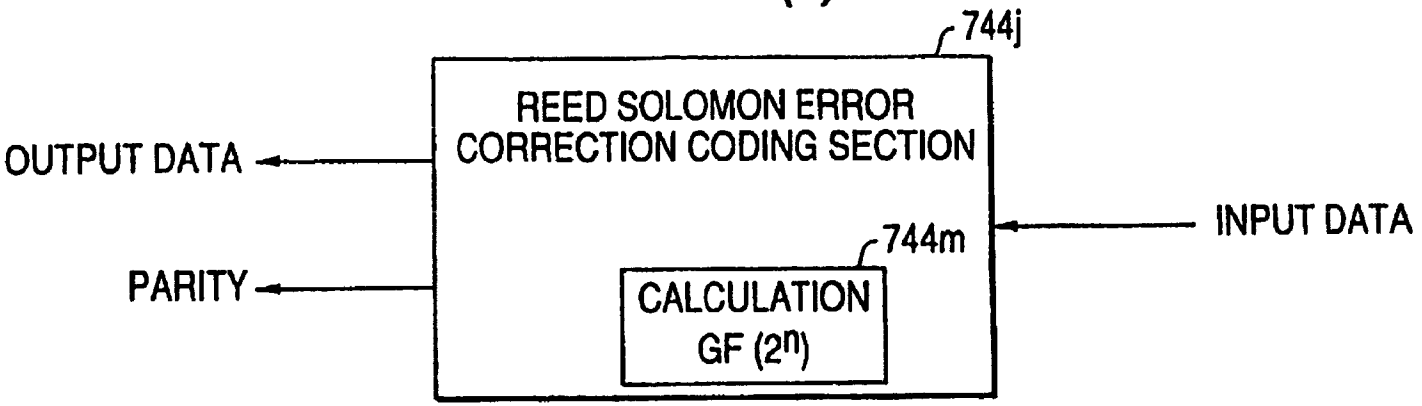
Figure 165B:
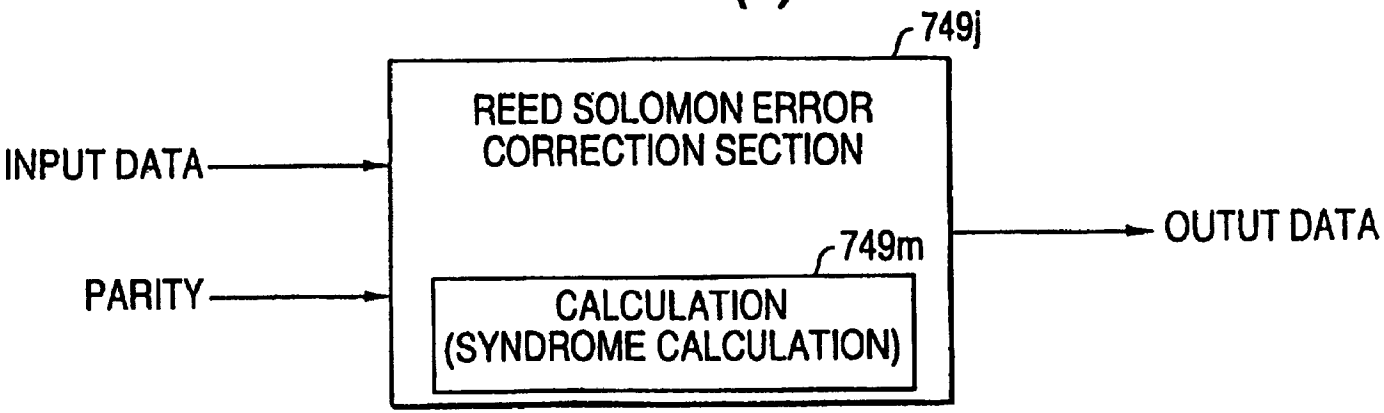
Figure 166:
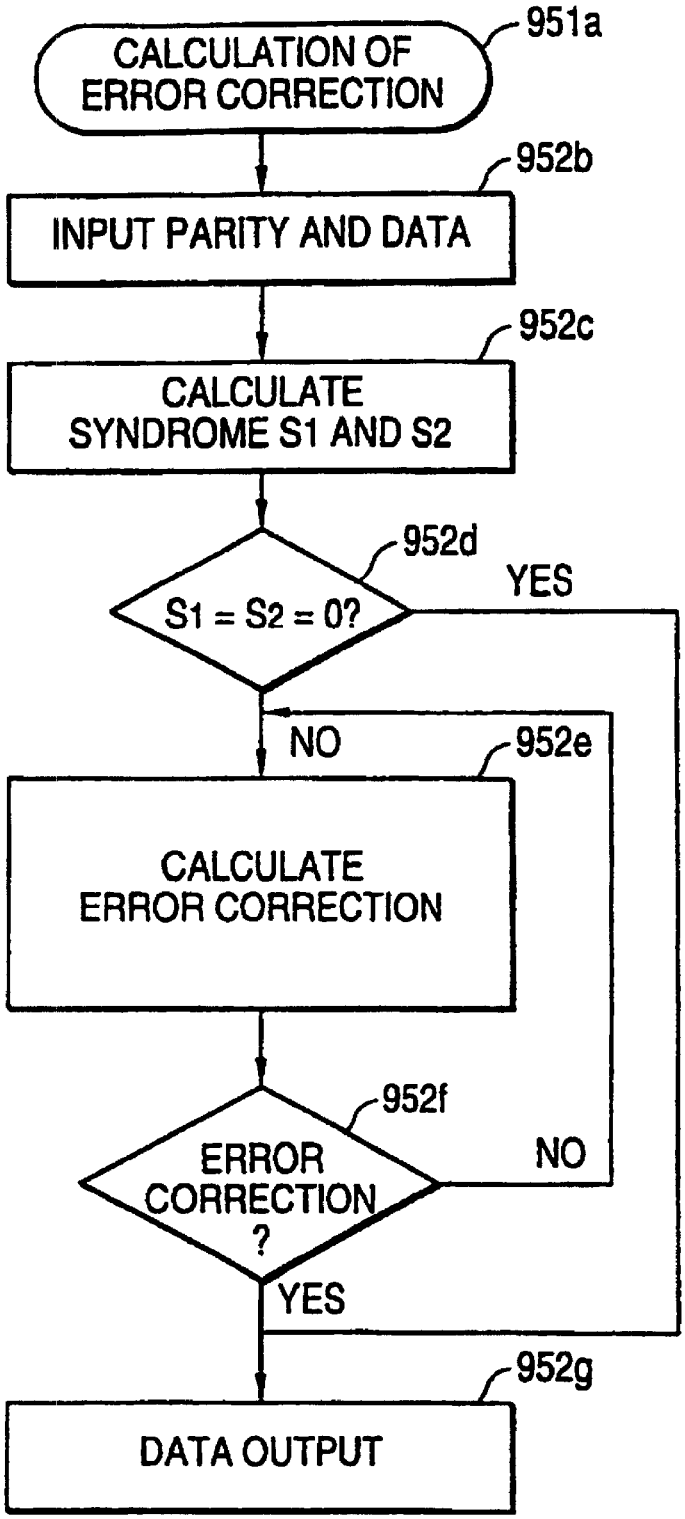
Figure 167:
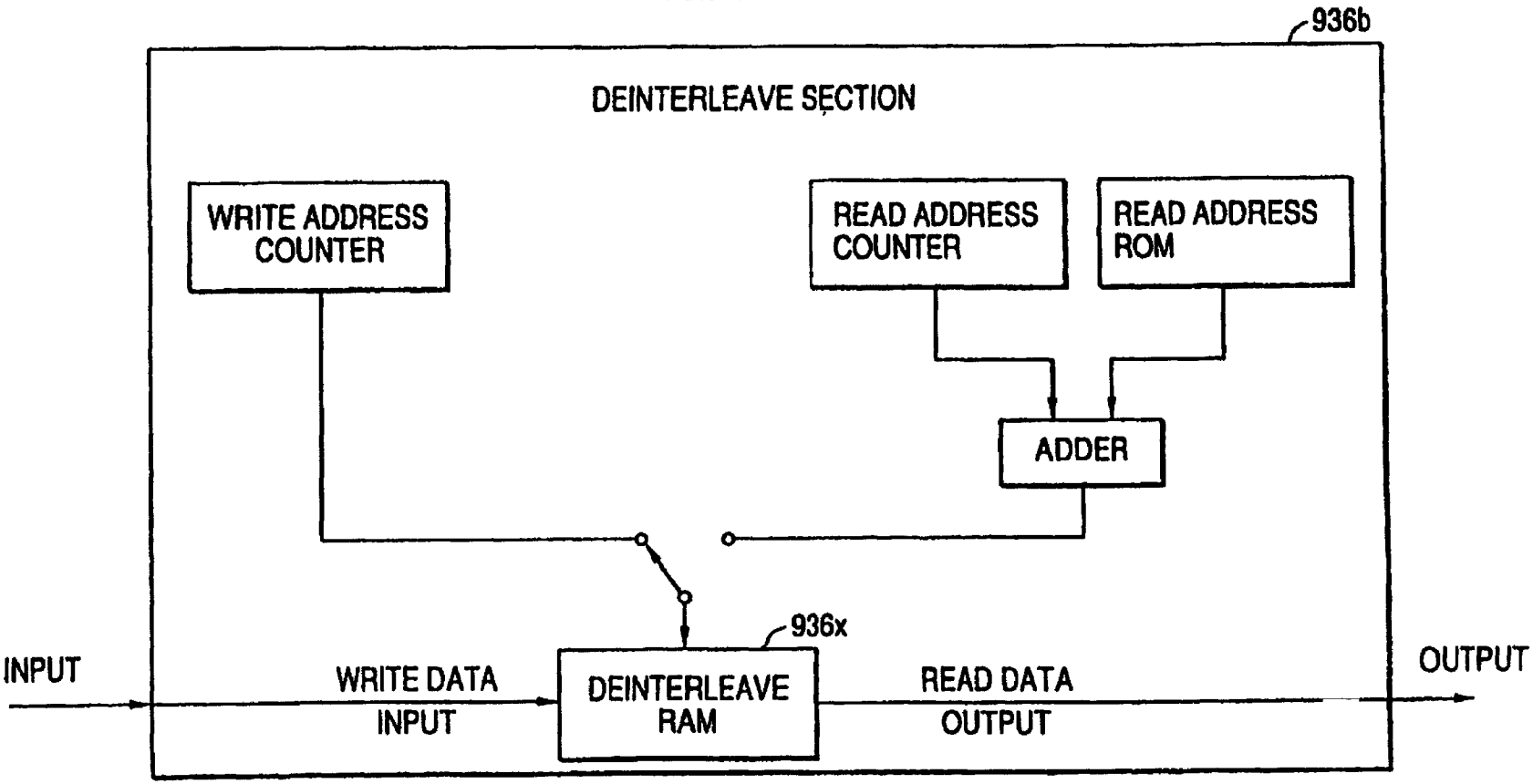
Figure 168A:
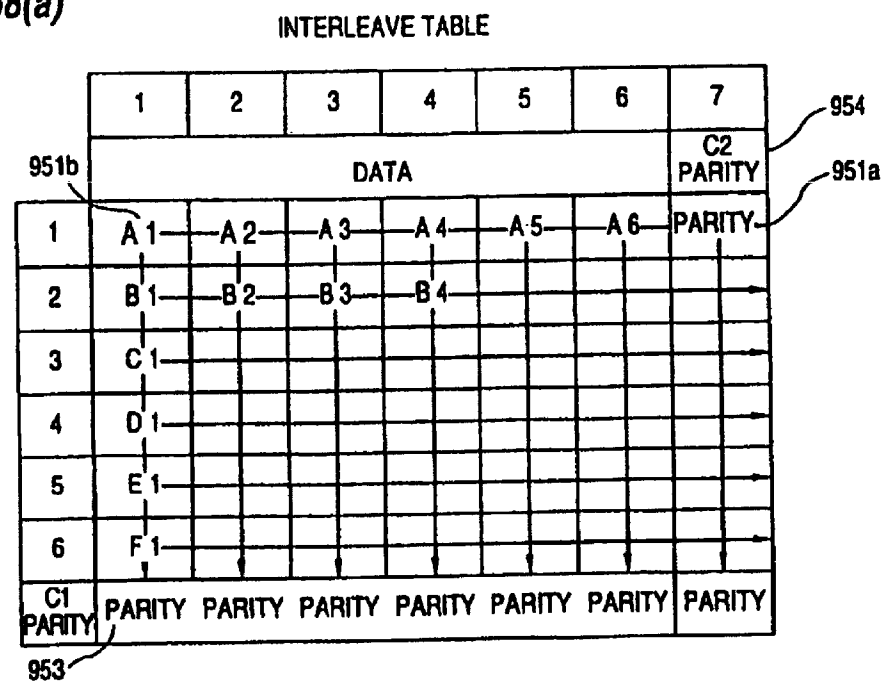
Figure 168B:
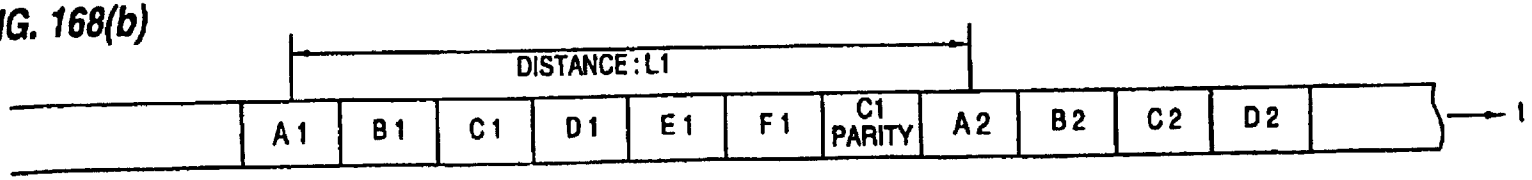
Figure 170:
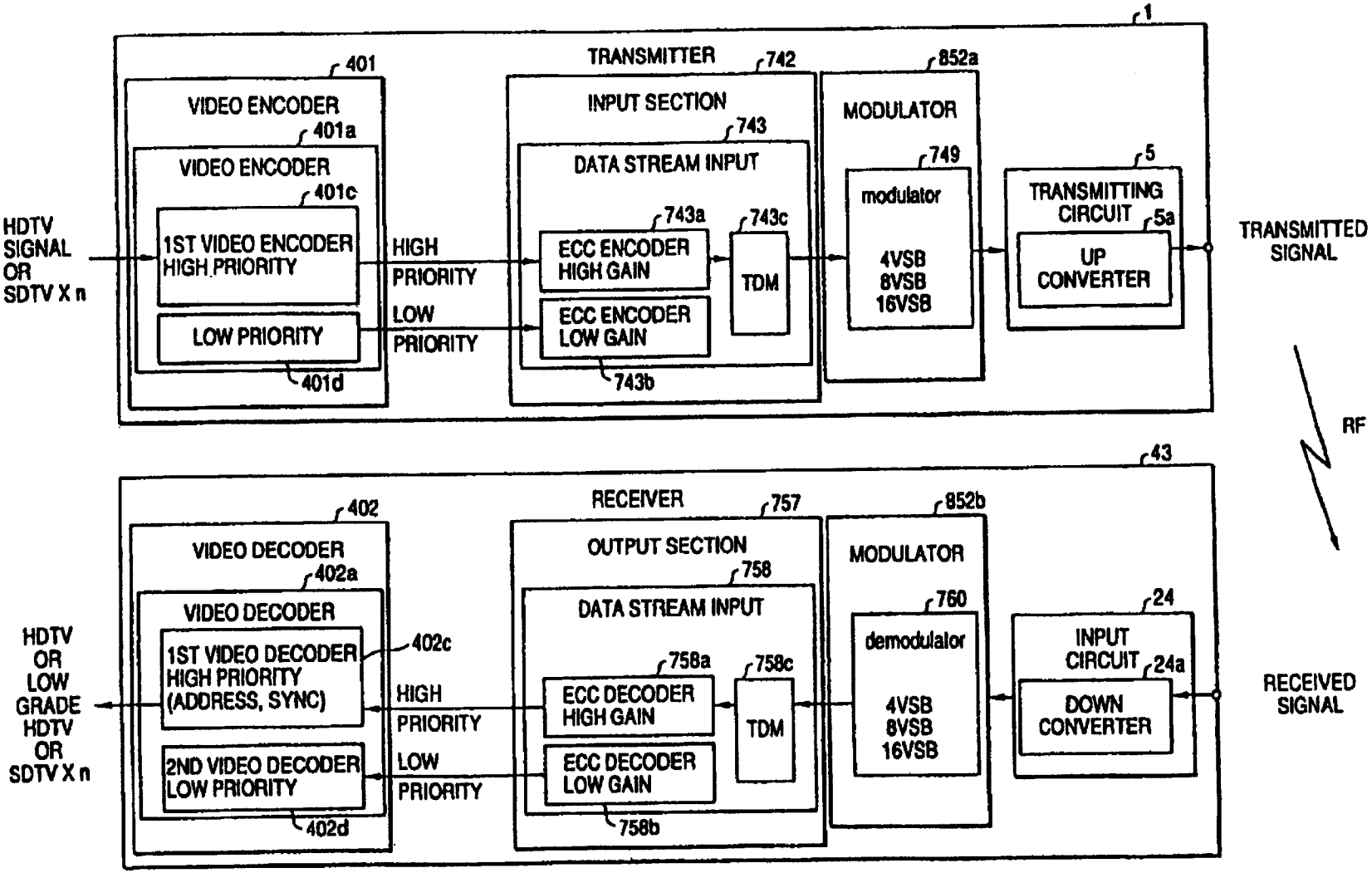
Figure 171:
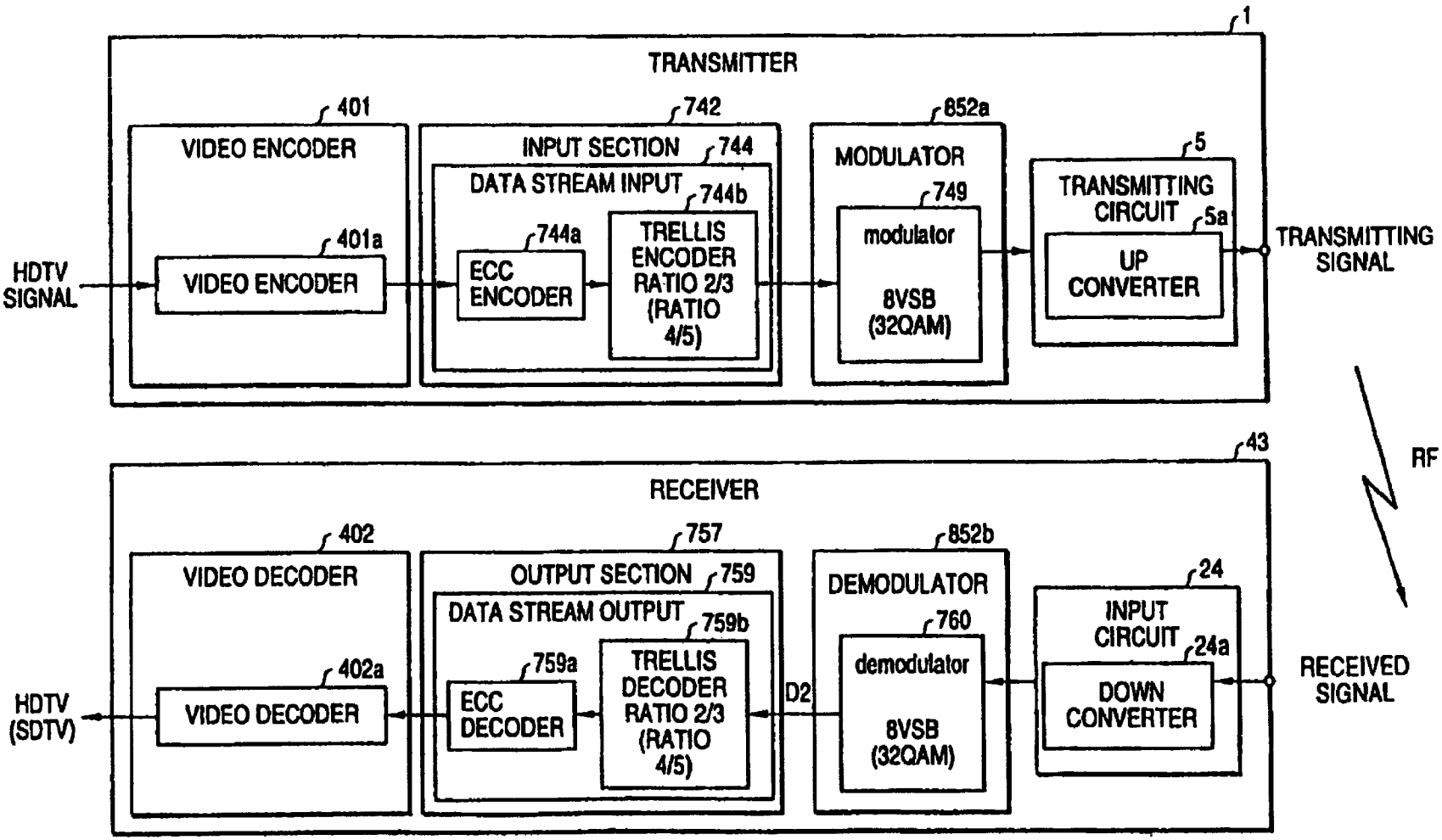
Figure 172:
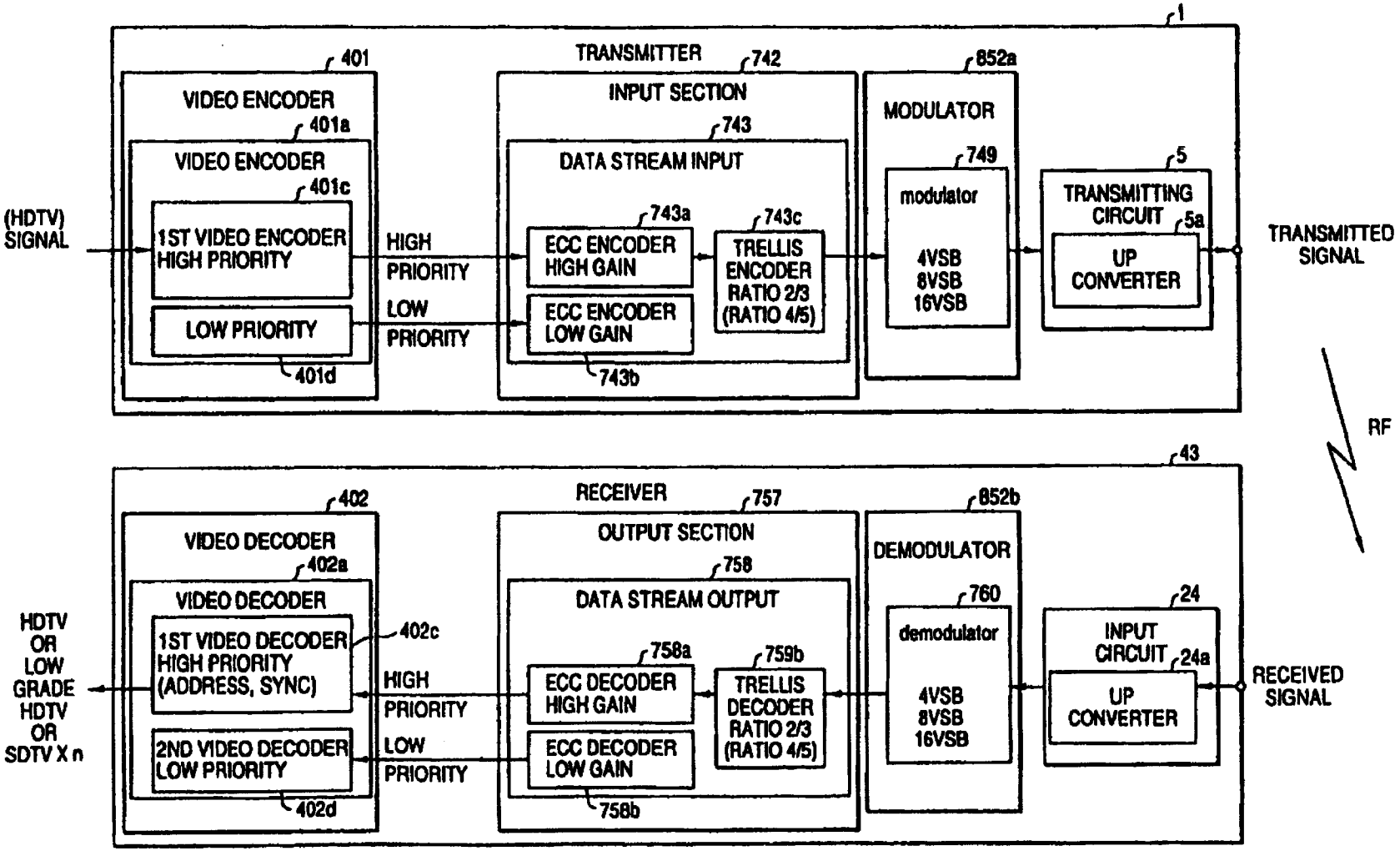
Figure 173:
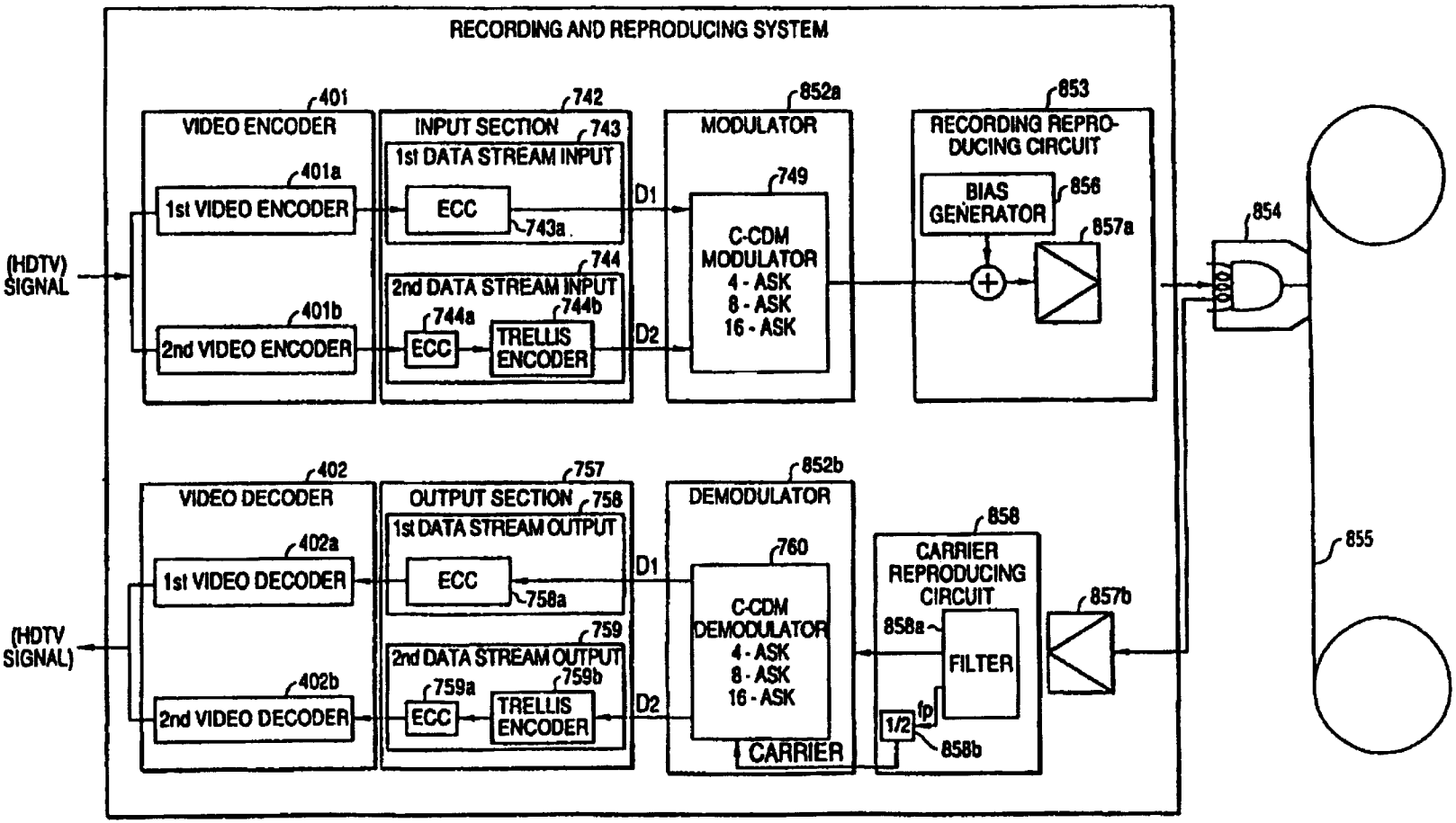
Figure 174:
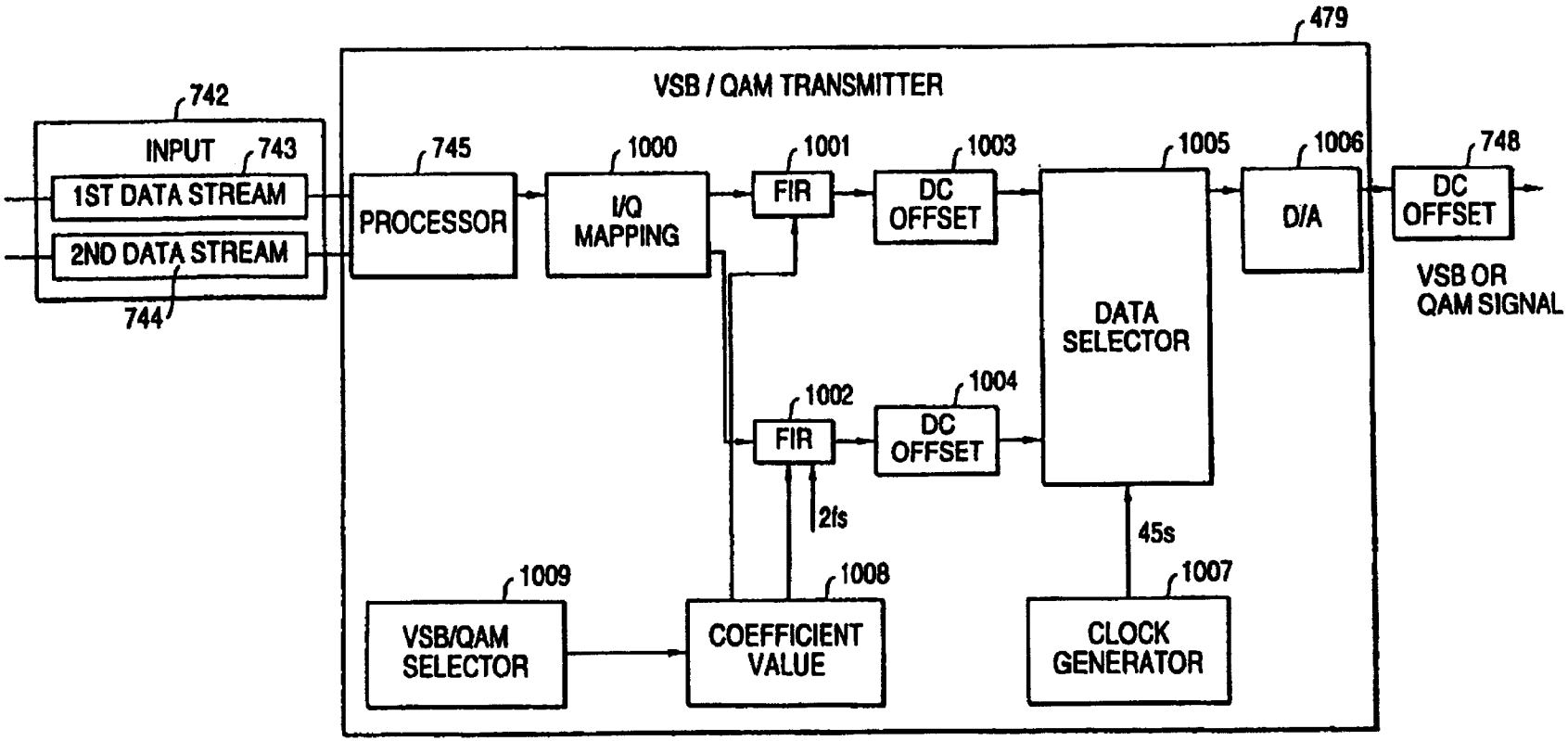

FIG. 152 is a timing chart of a 3-level hierarchical television signal at each time slot when GTW-OFDM of the ninth embodiment is combined with C-CDM (or CSW-OFDM);

FIG. 153 shows the relationship between the multipath signal delay time, C/N ratio, and transmission rate when GTW-OFDM of the ninth embodiment is combined with C-CDM (or CSW-OFDM), and is used to describe the hierarchical broadcasting method using three-dimensional matrix structure;

FIGS. 154A–C together form a frequency distribution graph of power weight OFDM in the ninth embodiment;

FIG. 155 shows the position on the time axis of a 3-level hierarchical television signal at each time slot when guard time-OFDM of the ninth embodiment is combined with C-CDM;

FIG. 156 is a block diagram of the transmitter and the receiver in the fourth and fifth embodiments of the invention;

FIG. 157 is a block diagram of the transmitter and the receiver in the fourth and fifth embodiments of the invention;

FIG. 158 is a block diagram of the transmitter and the receiver in the fourth and fifth embodiments of the invention;

FIG. 159(a) is a signal point positioning diagram in 16-level VSB in the fifth embodiment of the invention;

FIG. 159(b) is a signal point positioning (8-level VSB) diagram in 16-level VSB in the fifth embodiment of the invention;

FIG. 159(c) is a signal point positioning (4-level VSB) diagram in 16-level VSB in the fifth embodiment of the invention;

FIG. 159(d) is a signal point positioning (16-level VSB) diagram in 16-level VSB in the fifth embodiment of the invention;

FIG. 160(a) is a block diagram of an ECC encoder in the fifth and sixth embodiments of the invention;

FIG. 160(b) is a block diagram of an ECC encoder in the fifth and sixth embodiments of the invention;

FIG. 161 is an overall block diagram of a VSB receiver in the fifth embodiment of the invention;

FIG. 162 is a block diagram of [a] the receiver in the fifth embodiment of the invention;

FIG. 163 is a graph of the error rate and C/N ratio curve in 4-level VSB and TC-8-level VSB in the fourth embodiment of the invention;

FIG. 164 is an error rate curve of subchannel 1 and subchannel 2 in 4-level VSB and TC-8-level VSB in the fourth embodiment of the invention;

FIG. 165(a) is a block diagram of the Reed-Solomon encoder in the second, fourth, and fifth embodiments of the invention;

FIG. 165(b) is a block diagram of the Reed-Solomon encoder in the second, fourth, and fifth embodiments of the invention;

FIG. 166 is a flowchart of Reed-Solomon error correction and operation in the second, fourth and fifth embodiments of the invention;

FIG. 167 is a block diagram of the deinterleaver in the second, third, fourth, fifth and sixth embodiments of the invention;

FIG. 168(a) is an interleave/deinterleave table for the second, third, fourth, and fifth embodiments of the invention;

FIG. 168(b) shows the interleave distance in the second, third, fourth, and fifth embodiments of the invention;

FIG. 169 is a comparison of redundancy in 4-level VSB, 8-level VSB, and 16-level VSB in the fifth embodiment of the invention;

FIG. 170 is a block diagram of a television receiver for receiving the high priority signal of the second, third, fourth, and fifth embodiments of the invention;

FIG. 171 is a block diagram of the receiver and transmitter in the second, third, fourth, and fifth embodiments of the invention;

FIG. 172 is a block diagram of the receiver and transmitter in the second, third, fourth, and fifth embodiments of the invention; and FIG. 173 is a block diagram of an ASK magnetic recording and reproducing apparatus according to the sixth embodiment of the invention;

FIG. 174 is a block diagram showing a circuitry arrangement of QAM/VSB compatible modulator for multi-level transmission according to Embodiment 5.

Figure 175:
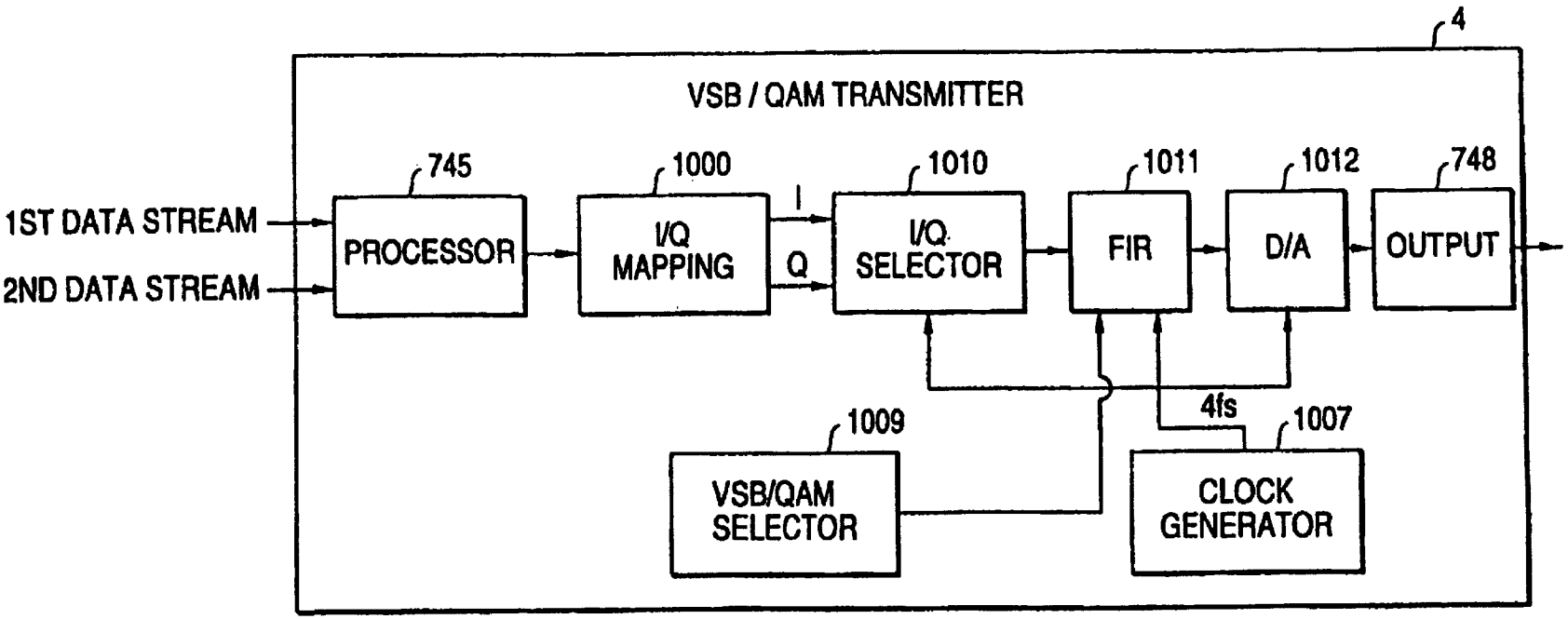

FIG. 175 is a block diagram showing another circuitry arrangement of the QAM/VSB modulator for multi-level transmission according to Embodiment 5.

Figure 176:
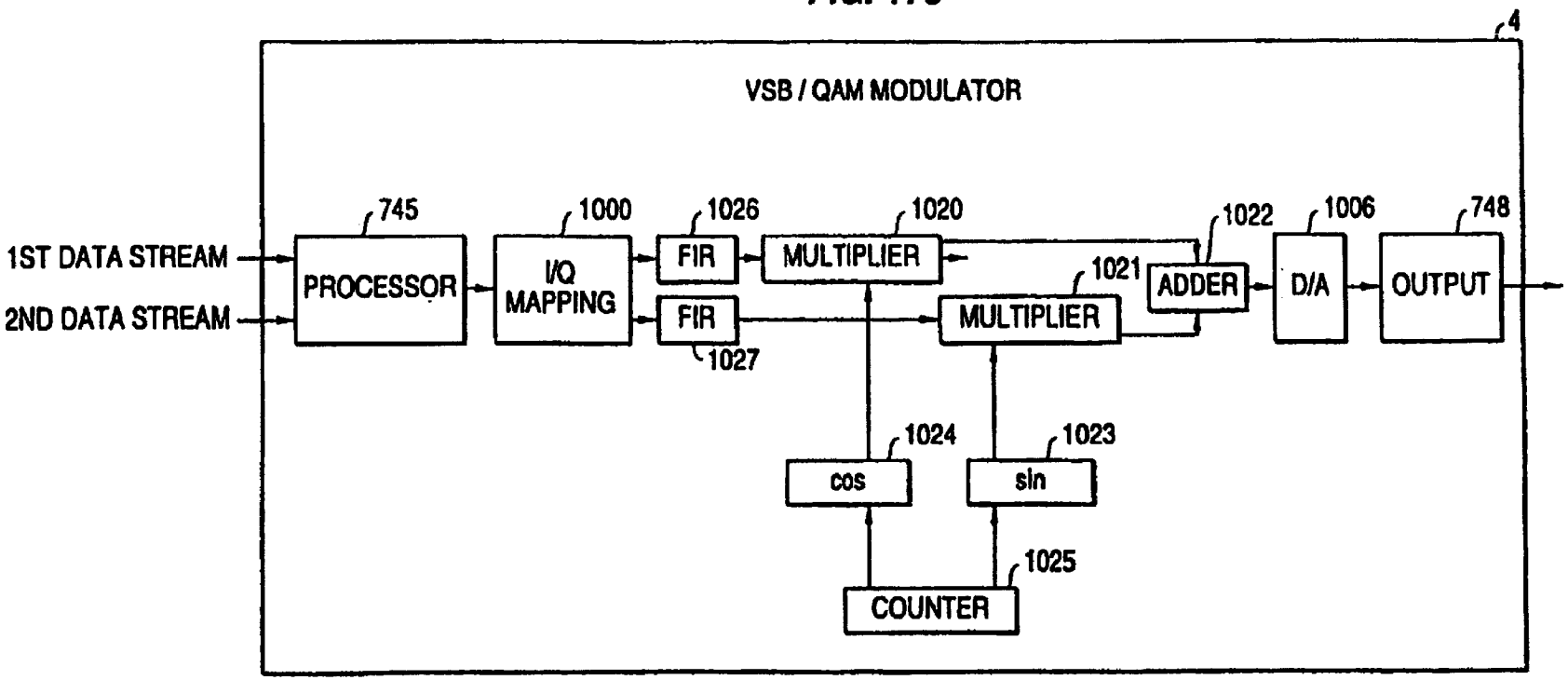

FIG. 176 illustrates a third modification of the QAM/VSB modulator of Embodiment 5.

Figure 177:
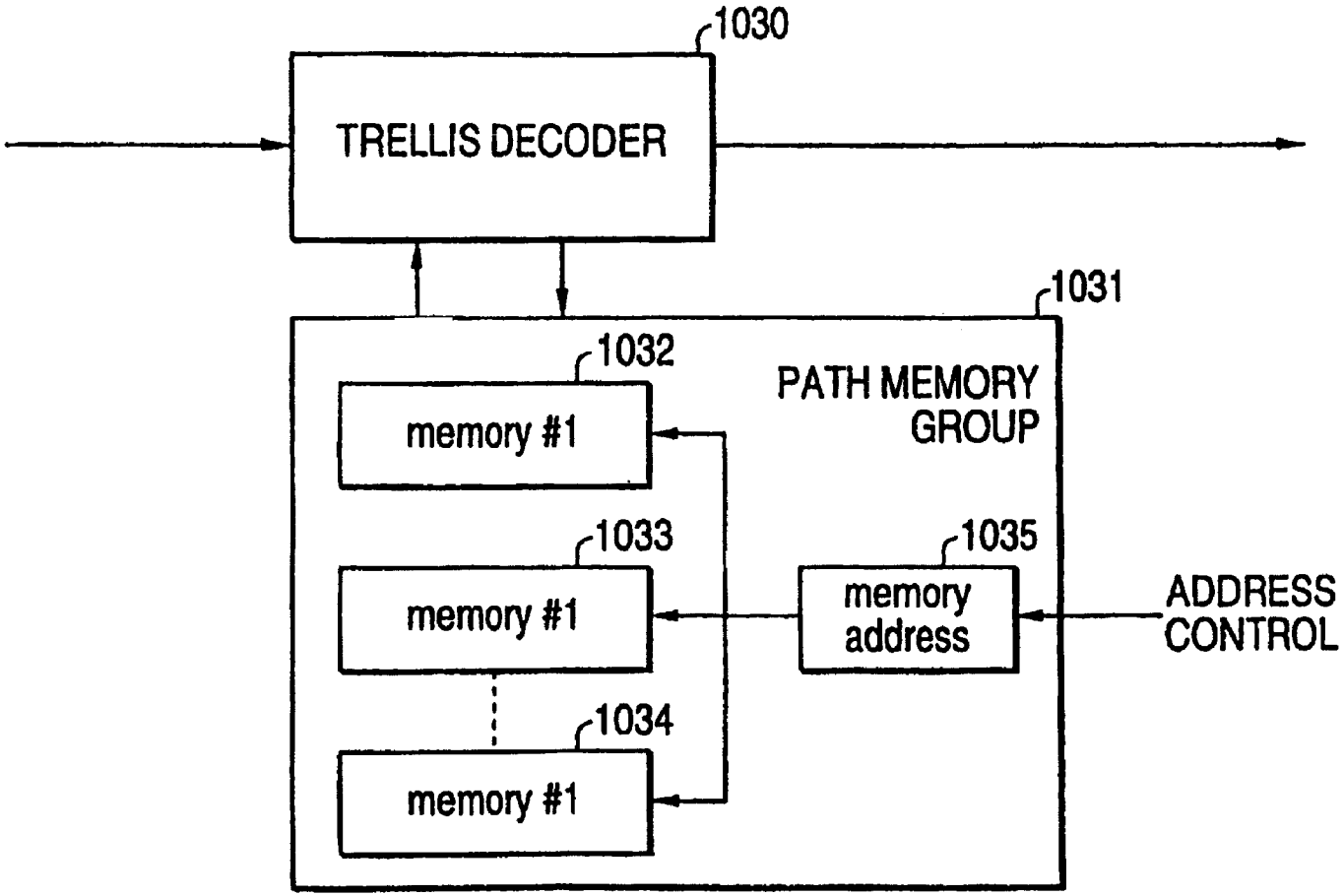

FIG. 177 is a block diagram showing a Trellis decoder in the demodulator of Embodiment 5.

Figure 178:
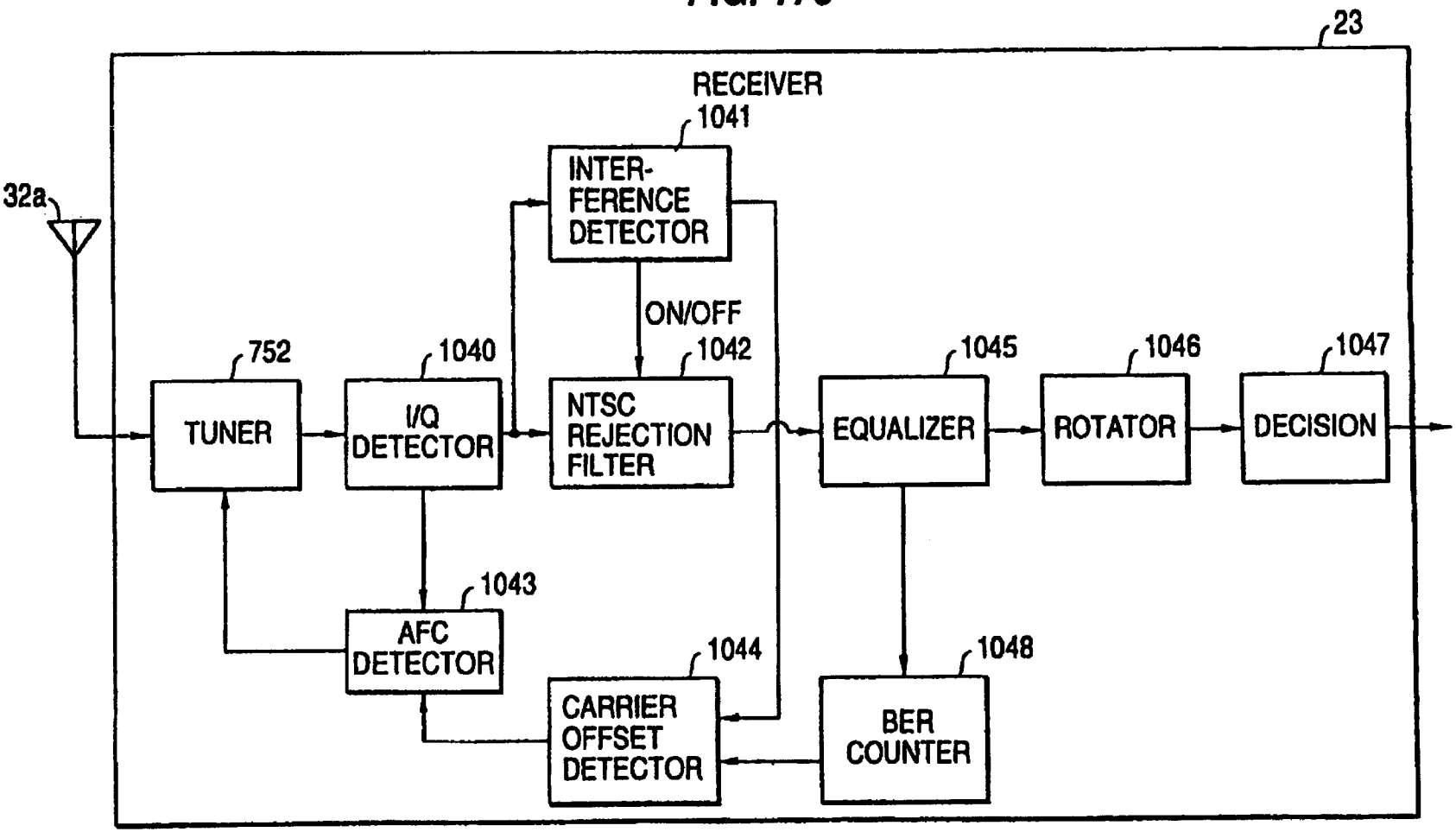

FIG. 178 is a block diagram of a receiver of Embodiment 5 for interception of VSB multi-level transmitted signals emitted in the air.

Figure 179:
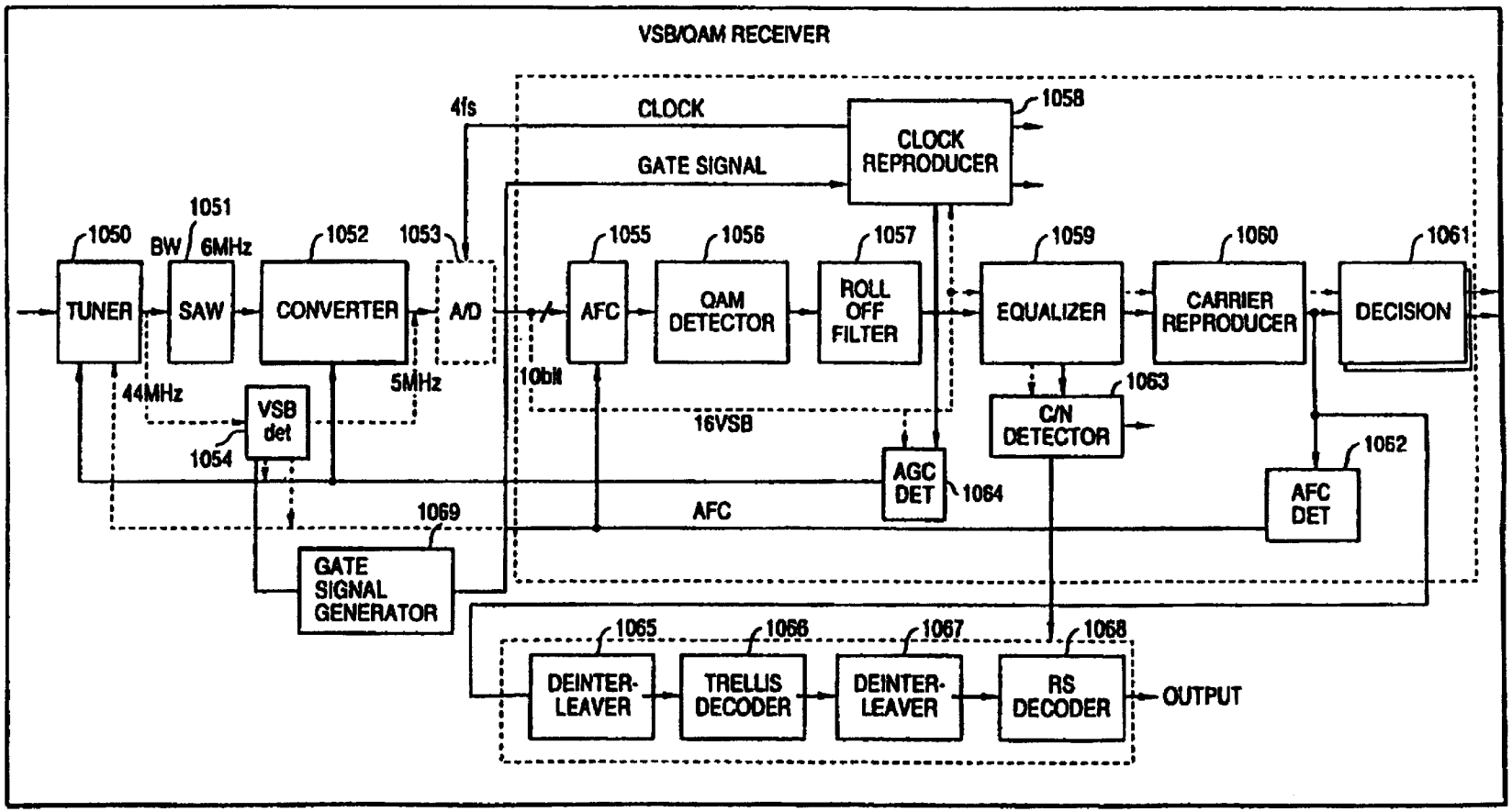

FIG. 179 [is] illustrates another arrangement of the QAM/VSB compatible receiver of Embodiment 5.

DETAILED DESCRIPTION OF THE PREFERRED EMBODIMENTS

EMBODIMENT 1

One embodiment of the present invention will be described referring to the relevant drawings.

In the preferred embodiment of the invention both the transmission apparatus, which comprises a transmitter for transmitting a digital HDTV signal or other digital signal and a receiver for receiving the transmitted signal, and the recording and reproducing apparatus, which records the digital HDTV signal or other digital signal on a magnetic tape or other recording medium and reproduces the recorded signal from said medium, are described.

Figure 1:
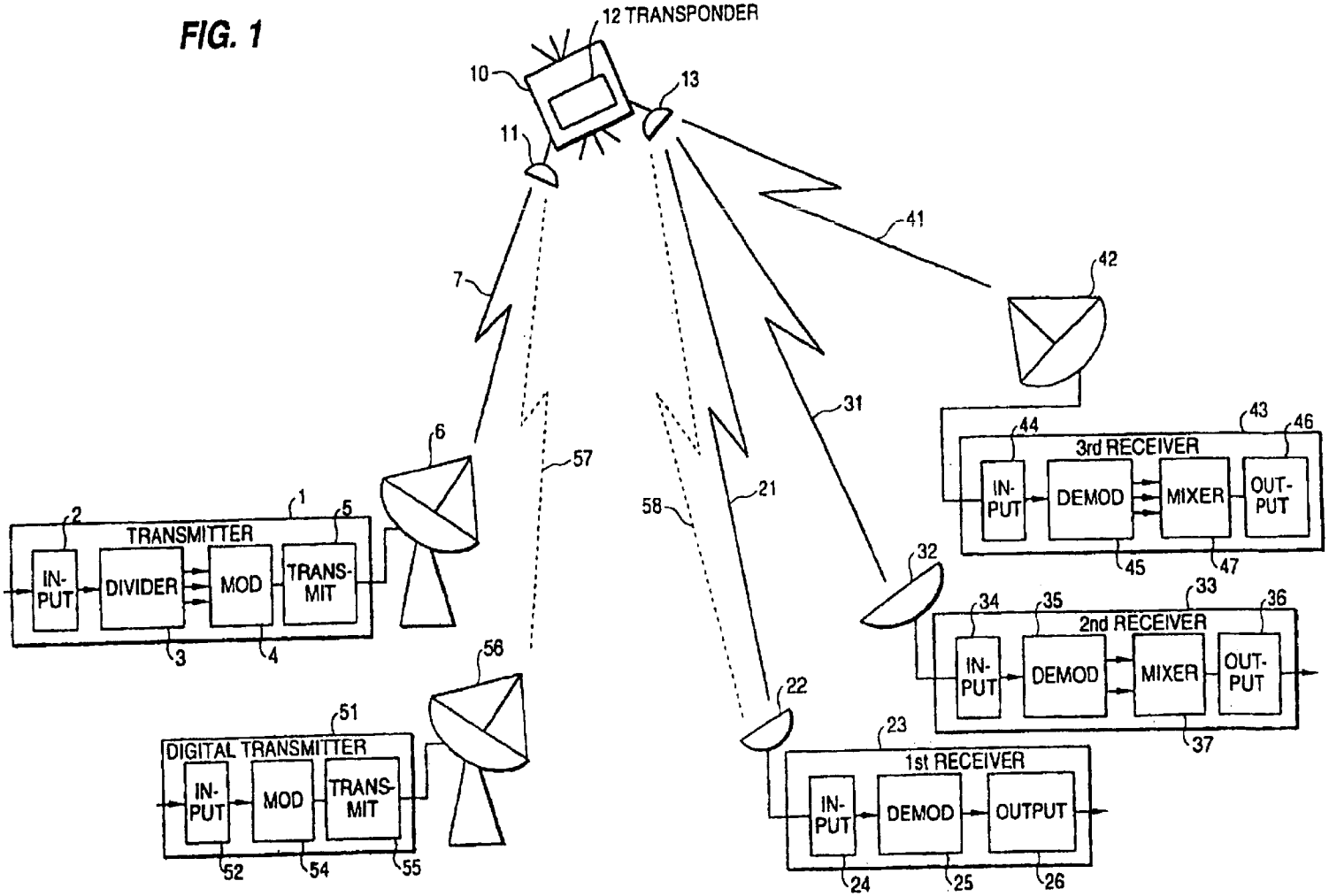
FIG. 1 is a schematic view of the entire arrangement of a signal transmission system showing a first embodiment of the present invention.

It should be noted, however, that the configuration, operation, and principle of the digital modulator and demodulator, error correction encoder and decoder, and the encoder and decoder for image coding the HDTV signal are common to the transmission apparatus and the recording and reproducing apparatus, and apply essentially the same technologies. Therefore, to more concisely describe each embodiment, the block diagrams for either the transmission apparatus or the recording and reproducing apparatus are referenced in the description of each embodiment. In addition, the configuration of each embodiment of the invention can be achieved by means of any multi-value digital modulation method, e.g., QAM, ASK and PSK, positioning signal points in a constellation, and for brevity the embodiments of the present invention are described using only one modulation method. FIG. 1 shows the entire arrangement of a signal transmission system according to the first embodiment of the present invention. A transmitter 1 comprises an input unit 2, divider circuit 3, a modulator 4, and a transmitter unit 5. In operation, each input multiplex signal is divided by the divider circuit 3 into three groups, a first data stream D1, a second data stream and, a third data stream D3, which are then modulated by the modulator 4 before being transmitted from the transmitter unit 5. The modulated signal is sent up from an antenna 6 through an uplink 7 to a satellite 10 where it is intercepted by an uplink antenna 11 and amplified by a transponder 12 before being transmitted from a downlink antenna 13 towards the ground.

The transmission signal is then sent down through three downlinks 21, [32] *31*, and 41 to a first 23, a second 33, and a third receiver 43 respectively. In the first receiver 23, the signal intercepted by an antenna 22 is fed through an input unit 24 to a demodulator 25 where its first data stream only is demodulated, while the second and third data streams are not recovered, before being transmitted further from an output unit 26.

Similarly, the second receiver 33 allows the first and second data streams of the signal intercepted by an antenna 32 and fed from an input unit 34 to be demodulated by a demodulator 35 and then, combined by a mixer 37 into a signal data stream which is then transmitted further from an output unit 36.

The third receiver 43 allows all of the first, second, and third data streams of the signal intercepted by an antenna 42 and fed from an input unit 44 to be demodulated by a demodulator 45 and then, combined by a mixer 47 into a single data stream which is then transmitted further from an output unit 46.

As understood, the three discrete receivers 23, 33, and 43 have their respective demodulators of different characteristics such that their outputs demodulated from the same frequency band signal of the transmitter 1 contain data of different sizes. More particularly, three different but compatible data can simultaneously be carried on a given frequency band signal to their respective receivers. For example, each of three, existing NTSC, HDTV, and super HDTV, digital signals is divided into low, high, and super high frequency band components which represent the first, the second, and the third data stream respectively. Accordingly, the three different TV signals can be transmitted on a one-channel frequency band carrier for simultaneous reproduction of medium, high, and super high resolution TV images respectively.

The NTSC TV signal is intercepted by receiver accompanied by a small antenna for demodulation of small-sized data; the HDTV signal is intercepted by a receiver accompanied by a medium antenna for demodulation of medium-sized data, and the super HDTV signal is intercepted by a receiver accomplished by a large antenna for demodulation of large-sized data. Also, as illustrated in FIG. 1, a digital NTSC TV signal containing only the first data stream for digital NTSC TV broadcasting service is fed to a digital transmitter 51 where it is received by an input unit 52 and modulated by a [demodulator] *modulator* 54 before being transmitted further from a transmitter unit 55. The [demodulated] *modulated* signal is then sent up from an antenna 56 through an uplink 57 to the satellite 10 which in turn transmits the same through a downlink 58 to the first receiver 23 on the ground.

The first receiver 23 demodulates with its demodulator 25 the modulated digital signal supplied from the digital transmitter 51 into the original first data stream signal. Similarly, the same modulated digital signal can be intercepted and demodulated by the second receiver 33 or third receiver 43 into the first data stream or NTSC TV signal. In summary, the three discrete receivers 23, 33, and 43 all can intercept and process a digital signal of the existing TV system for reproduction.

The arrangement of the signal transmission system will be described in more detail.

Figure 2:
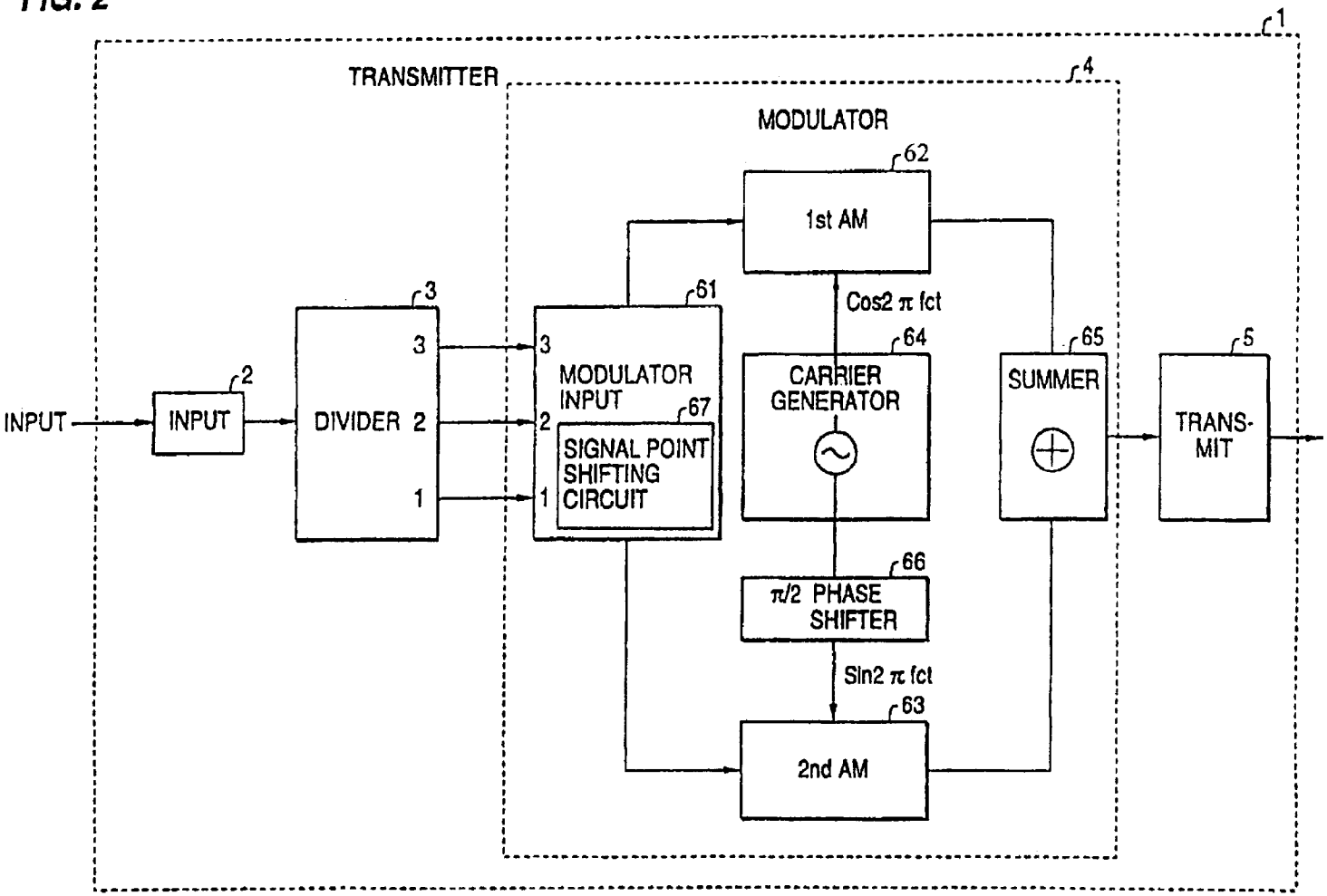
FIG. 2 is a block diagram of a transmitter of the first embodiment.

FIG. 2 is a block diagram of the transmission 1, in which an input signal is fed across the input unit 2 and divided by the divider circuit 3 into three digital signals containing a first, a second, and a third data stream respectively.

Assuming that the input signal is a video signal, its low frequency band component is assigned to the first data stream, its high frequency band component to the second data stream, its super-high frequency band component to the third data stream. The three different frequency band signals are fed to a modulator input 61 of the modulator 4. Here, a signal point shifting circuit 67 shifts the positions of the signal points according to an externally given signal. The modulator 4 is arranged for amplitude modulation on two 90°-out-of phase carriers respectively which are then combined into a multiple QAM signal. More specifically, the signal from the modulator input 61 is fed to both a first AM modulator [64] *62* and a second AM modulator 63. Also, a carrier wave of $\cos(2\pi fct)$ produced by a carrier generator 64 is directly fed to the first AM modulator [64] *62* and also, to a $\pi/2$ phase shifter 66 where it is 90° shifted in phase to a $\sin(2\pi fct)$ form prior to being transmitted to the second AM modulator 63. The two amplitude modulated signals from the first and second AM modulators [64] *62*, 63 are combined by a summer 65 into a transmission signal which is then transferred to the transmitter unit 5 for output. The procedure is well known and will not be further explained.

The QAM signal will now be described in a common 4×4 or 16 state constellation referring to the first quadrant of a space diagram in FIG. 3. The output signal of the modulator 4 is expressed by a sum vector of two, $A\cos 2\pi fct$ and [Bcos] *Bsin* $2\pi fct$, vectors 81 and 82 which respectively represent the two 90°-out-of-phase carriers. When the distal point of a sum vector from the zero point represents a signal point, the 16 QAM signal has 16 signal points determined by a combination of four horizontal amplitude values $a_1$, $a_2$, $a_3$, and $a_4$ and four vertical amplitude values $b_1$, $b_2$, $b_3$, and $b_4$. The first quadrant in FIG. 3 contains *four* signal points 83 at $c_{11}$, 84 at $c_{12}$, 85 at $c_{22}$, and 86 at $c_{21}$.

$c_{11}$ is a sum vector of a vector 0-$a_1$ and a vector 0-$b_1$ and thus, expressed as $c_{11}=a_1 \cos 2\pi fct - b_1 \sin 2\pi fct = A\cos(2\pi fct + d\pi/2)$.

Figure 3:
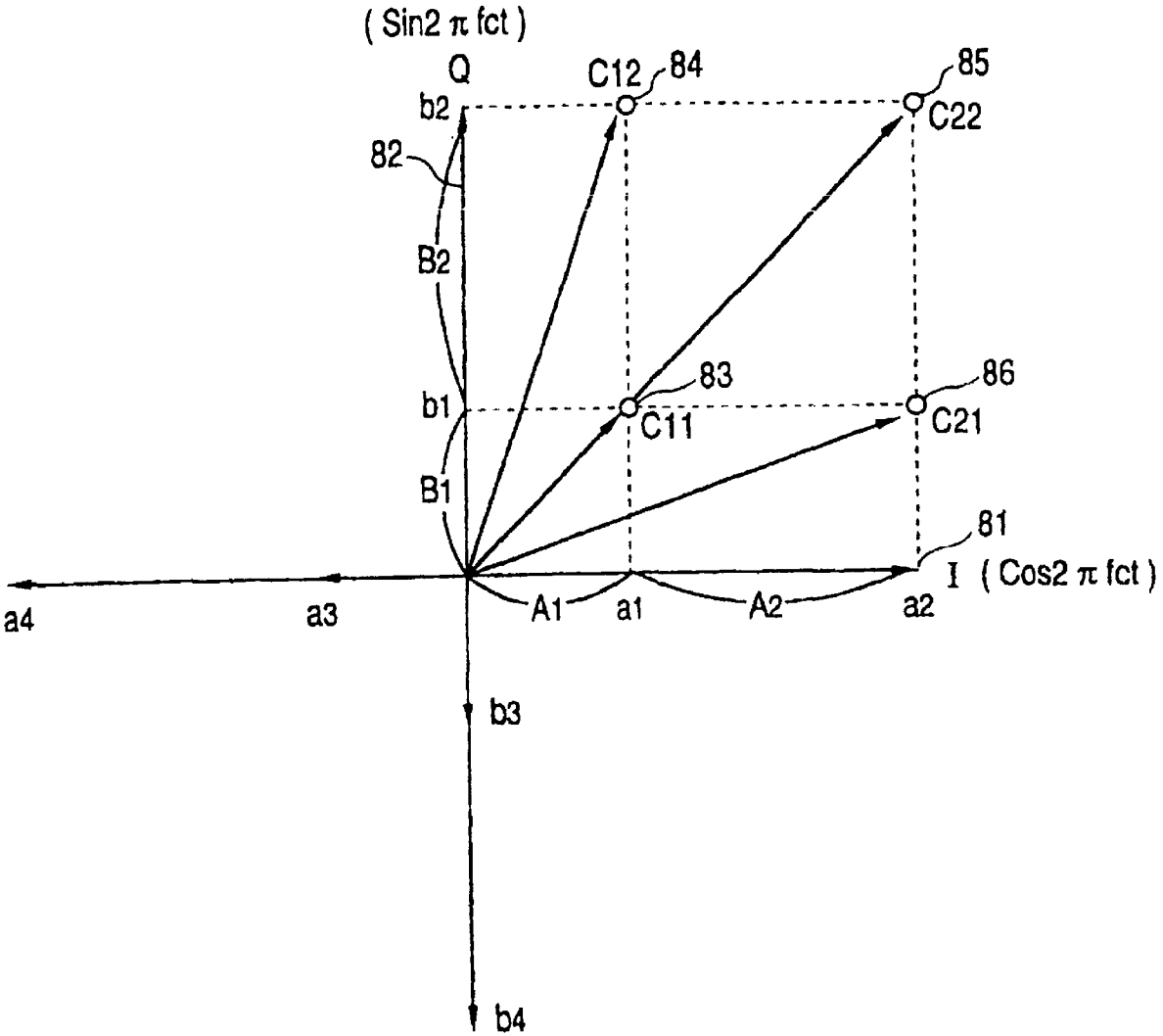
FIG. 3 is a vector diagram showing a transmission signal of the first embodiment.

It is now assumed that the distance between 0 and $a_1$ in the orthogonal coordinates of FIG. 3 is $A_1$, between $a_1$ and $a_2$ is $A_2$, between 0 and $b_1$ is $B_1$, and between $b_1$ and $b_2$ is $B_2$.

Figure 4:
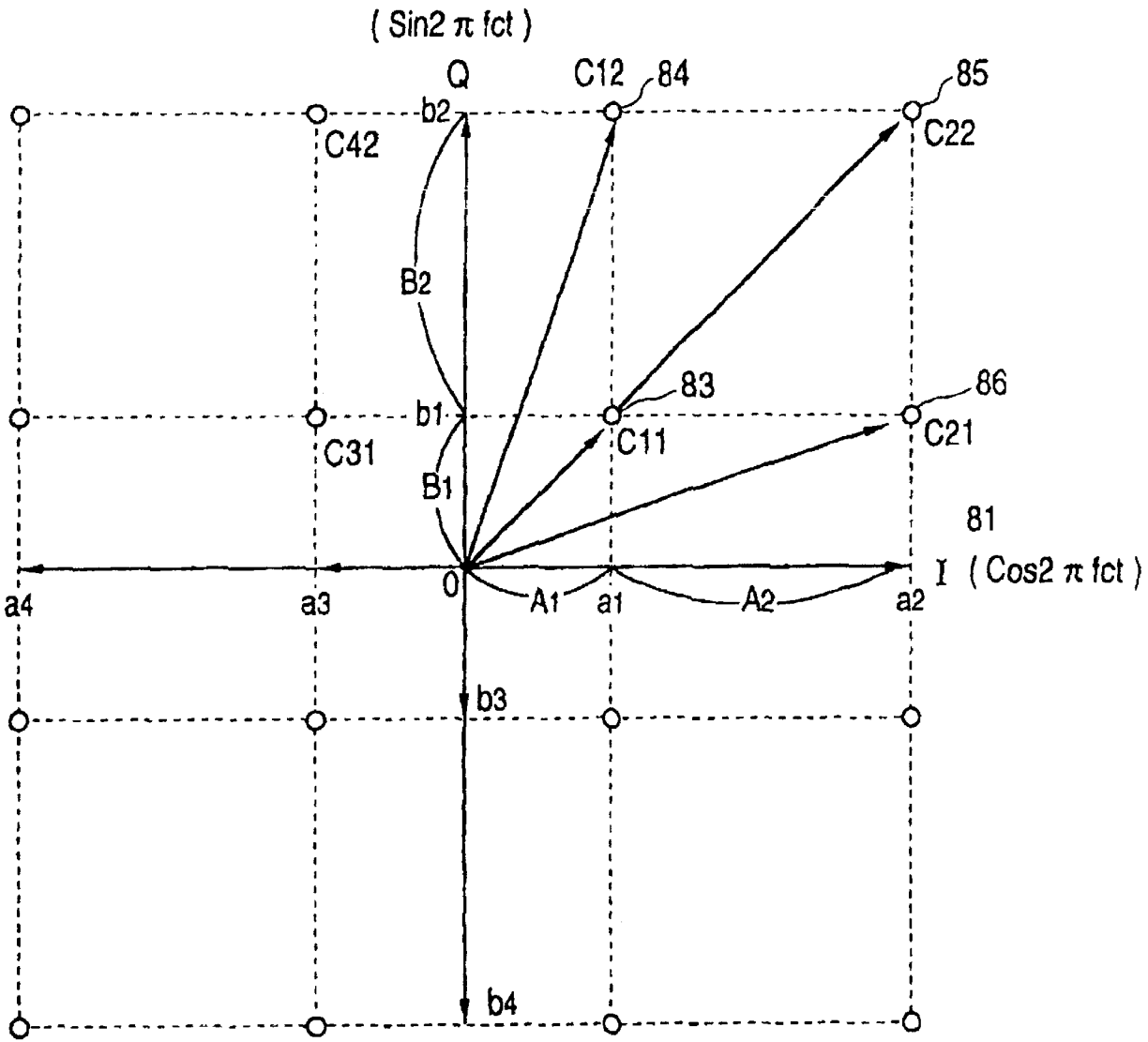
FIG. 4 is a vector diagram showing a transmission signal of the first embodiment.

As shown in FIG. 4, the 16 signal points are allocated in a vector coordinate, in which each point represents a four-bit pattern thus to allow the transmission of four bit data per period or time slot.

Figure 5:
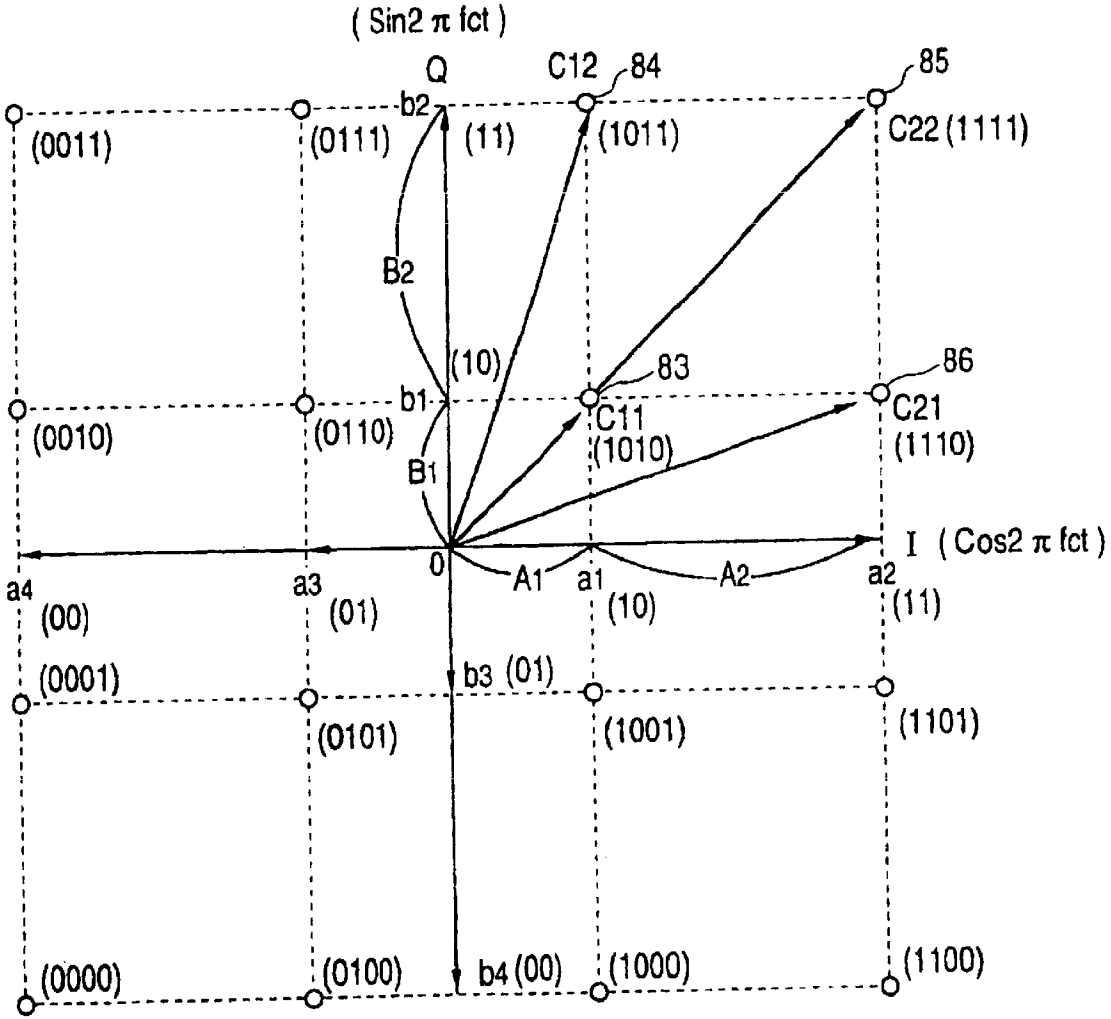
FIG. 5 is a view showing an assignment of binary codes to signal points according to the first embodiment.

FIG. 5 illustrates a common assignment of two-bit patterns to the 16 signal points.

When the distance between two adjacent signal points is great, it will be identified by the receiver with much ease. Hence, it is desirable to space the signal points at greater intervals. If two particular signal points are allocated near to each other, they are rarely distinguished *and* the error rate will be increased. Therefore, it is most preferable to have the signal points spaced at equal intervals as shown in FIG. 5, in which the 16 QAM signal is defined by $A_1=A_2/2$.

Figure 6:
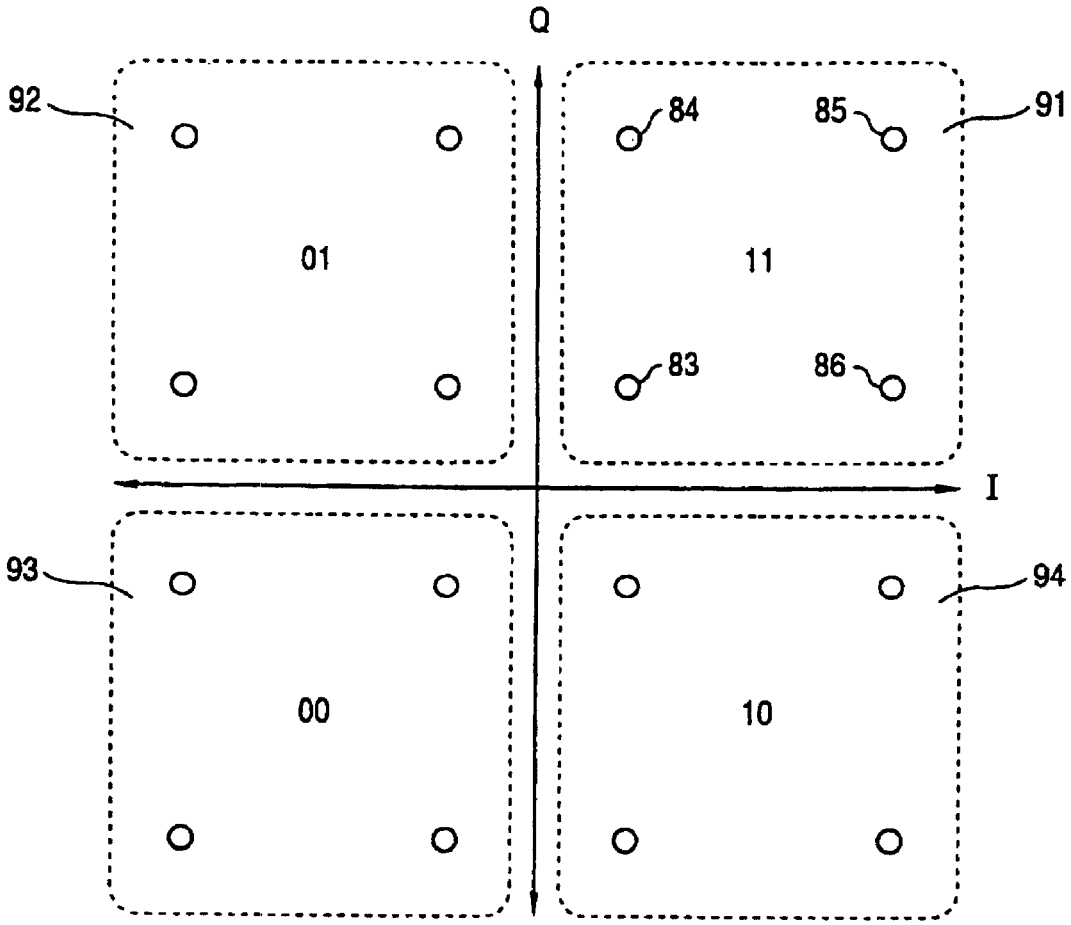
FIG. 6 is a view showing an assignment of binary codes to signal point groups according to the first embodiment.
Figure 7:
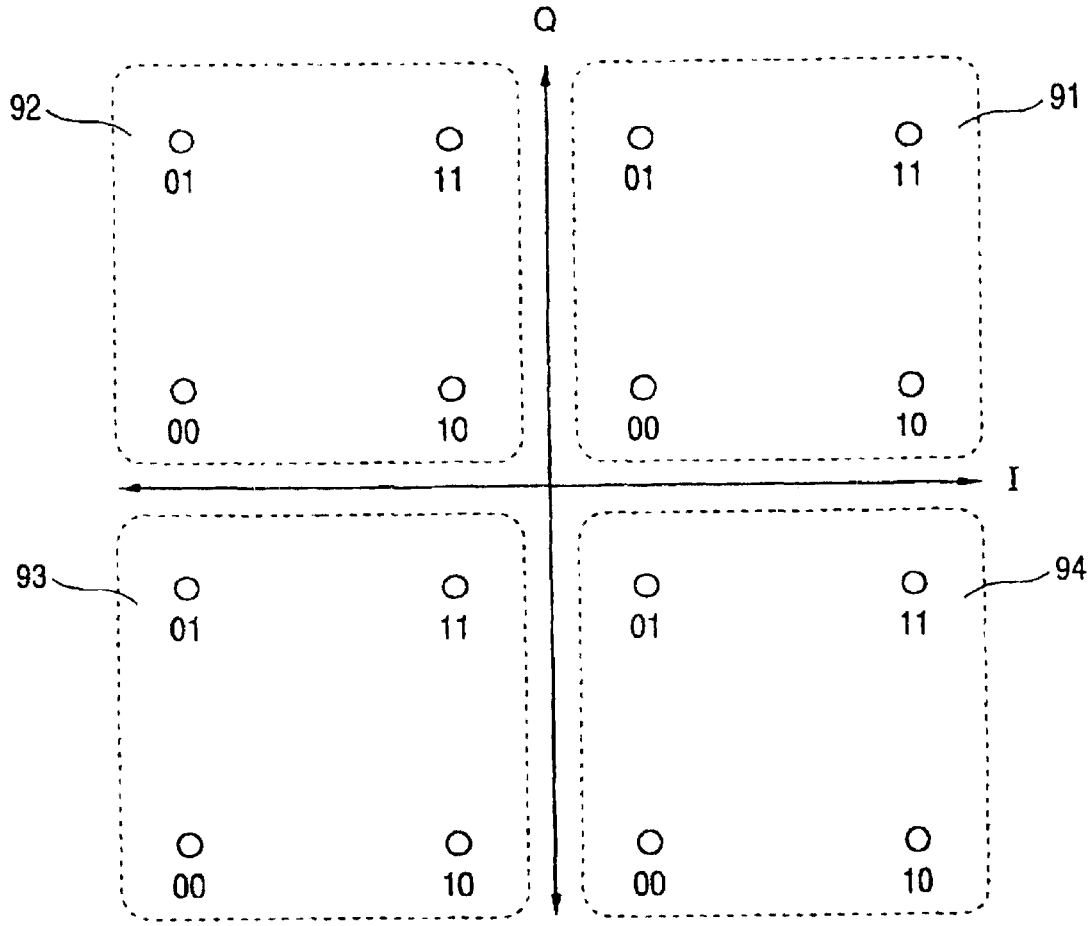
FIG. 7 is a view showing an assignment of binary codes to signal points in each signal point group according to the first embodiment.

The transmitter 1 of the embodiment is arranged to divide an input digital signal into a first, a second, and a third data or bit stream. The 16 signal points or groups of signal points are divided into four groups. Then, 4 two-bit patterns of the first data stream are assigned to the four signal point groups respectively, as shown in FIG. 6. More particularly, when the two-bit pattern of the first data stream is 11, one of four signal points of the first signal point group 91 in the first quadrant is selected depending on the content of the second data stream for transmission. Similarly, when 01, one signal point of the second signal point group 92 in the second quadrant is selected and transmitted. When 00, one signal point of the third signal point group 93 in the third quadrant is transmitted and when 10, one signal point of the fourth signal point group 94 in the fourth quadrant is transmitted. Also, 4 two-bit patterns in the second data stream of the 16 QAM signal, or e.g. 16 four-bit patterns in the second data stream of a 64-state QAM signal, are assigned to four signal points or sub signal point groups of each of the four signal point groups 91, 92, 93, and 94 respectively, as shown in FIG. 7. It should be understood that the assignment is symmetrical between any two quadrants. The assignment of the signal points to the four groups 91, 92, 93, and 94 is determined by priority to the two-bit data of the first data stream. As the result, two-bit data of the first data stream and two-bit data of the second data stream can be transmitted independently. Also, the first data stream will be demodulated *by* using a common 4 PSK receiver having a given antenna sensitivity. If the antenna sensitivity is higher, a modified type of the 16 QAM receiver of the present invention will intercept and demodulate both the first and second data [stream] *streams* with equal success.

Figure 8:
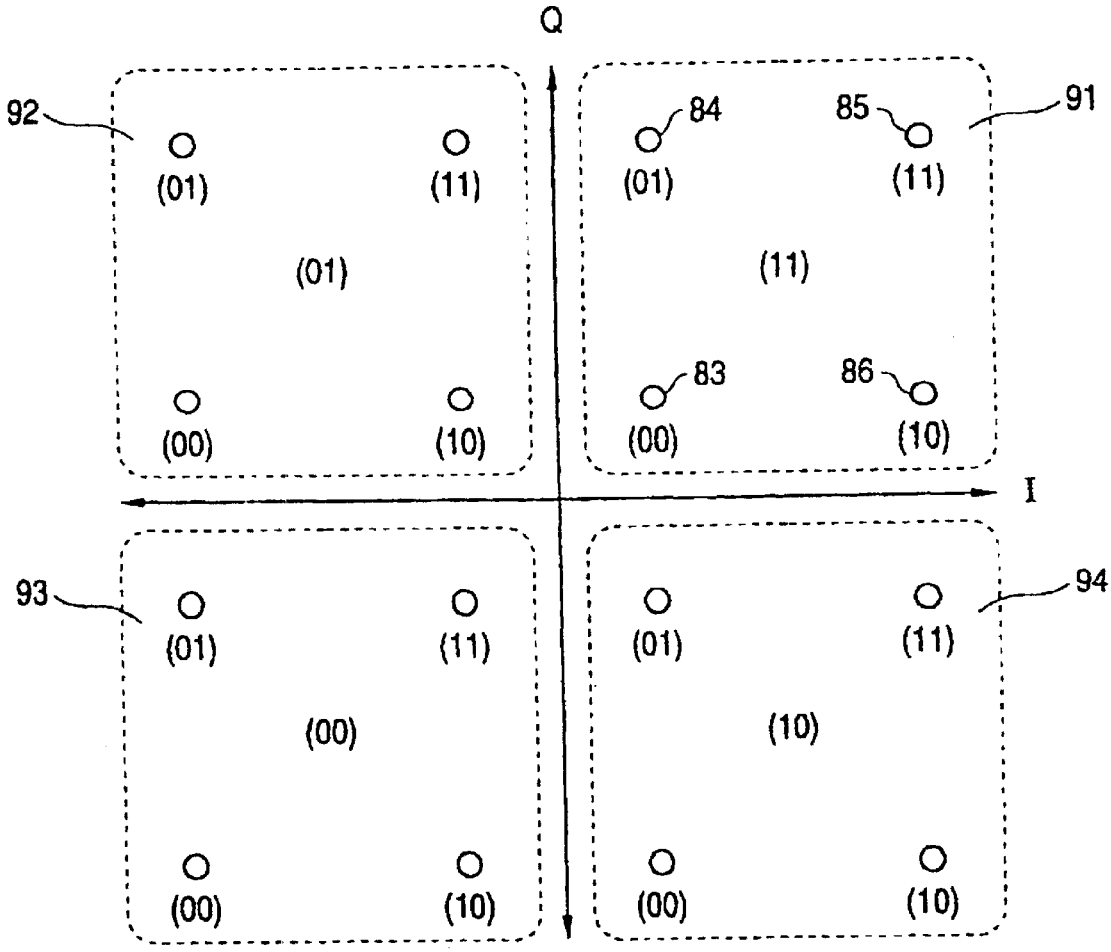
FIG. 8 is a view showing another assignment of binary codes to signal points groups and their signal points group according to the first embodiment.

FIG. 8 shows an example of the assignment of the first and second data streams in two-bit patterns.

When the low frequency band component of an HDTV video signal is assigned to the first data stream and the high frequency component to the second data stream, the 4 PSK receiver can produce an NTSC-level picture from the first data stream and the 16- or 64-state QAM receiver can produce an HDTV picture from a composite reproduction signal of the first and second data streams.

Figure 9:
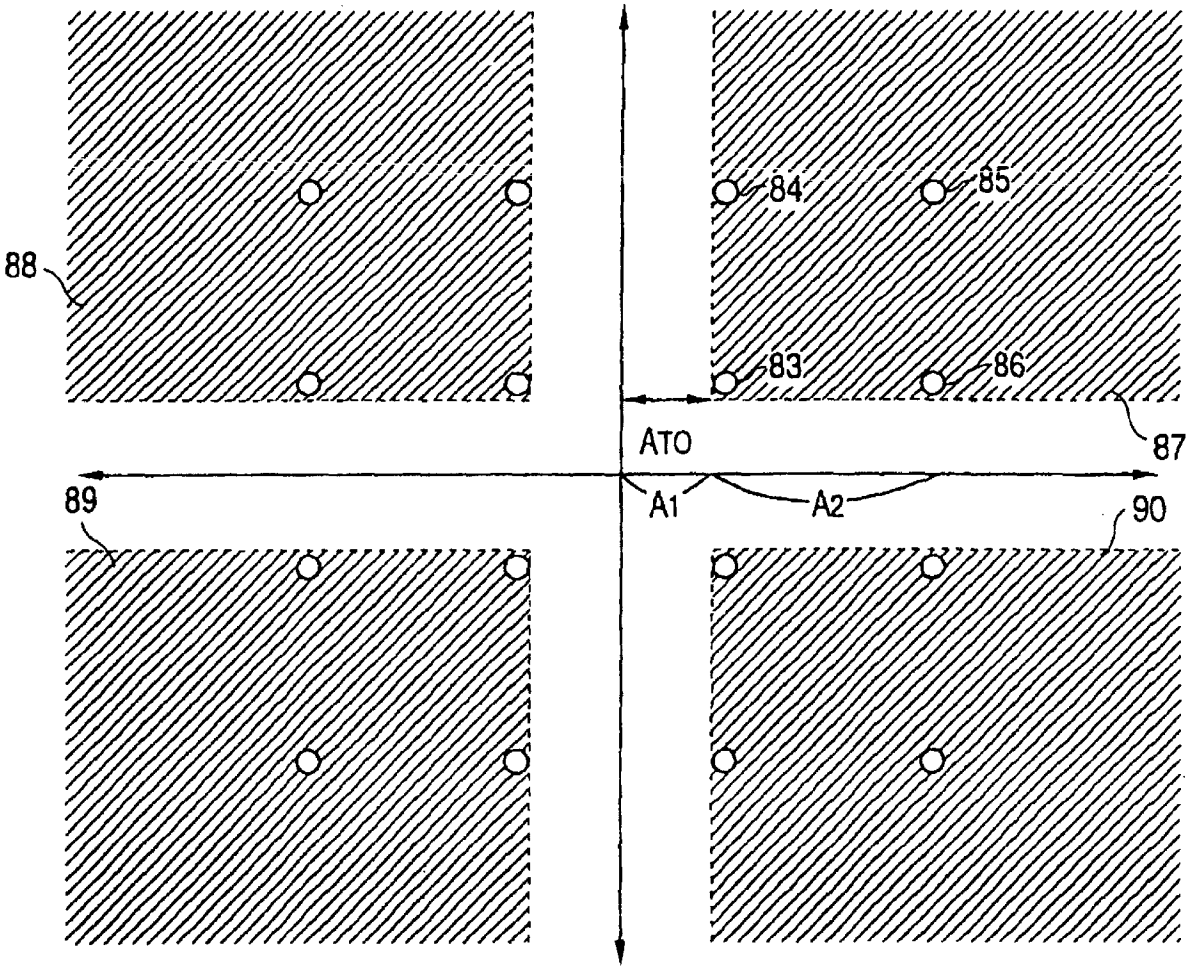
FIG. 9 is a view showing threshold values of the signal point groups according to the first embodiment.

Since the signal points are allocated at equal intervals, there is developed in the 4 PSK receiver a threshold distance between the coordinate axes and the shaded area of the first quadrant, as shown in FIG. 9. If the threshold distance is $A_{T0}$, a PSK signal having an amplitude of $A_{T0}$ will successfully be intercepted. However, the amplitude has to be increased to a three times greater value or $3A_{T0}$ for transmission of a 16 QAM signal while the threshold distance $A_{T0}$ is maintained. More particularly, the energy needed for transmitting the 16 QAM signal is nine times greater than that for sending the 4 PSK signal. Also, when the 4 PSK signal is transmitted in a 16 QAM mode, energy waste will be high and reproduction of a carrier signal will be troublesome. Above all, the energy available for satellite transmitting is not abundant but strictly limited to minimum use. Hence, no large-energy-consuming signal transmitting system will be put into practice until more energy for satellite transmission is available. It is expected that a great number of the 4 PSK receivers will be introduced into the market as digital TV broadcasting is placed in service. After introduction to the market, the 4 PSK receivers will hardly be shifted to higher sensitivity models because a signal intercepting characteristic gap between the two, old and new, models is high. Therefore, the transmission of the 4 PSK signals must not be abandoned. In this respect, a new system is desperately needed for transmitting the signal point data of a quasi 4 PSK signal in the 16 QAM mode using less energy. Otherwise, the limited energy at a satellite station will degrade the entire transmission system.

Figure 10:
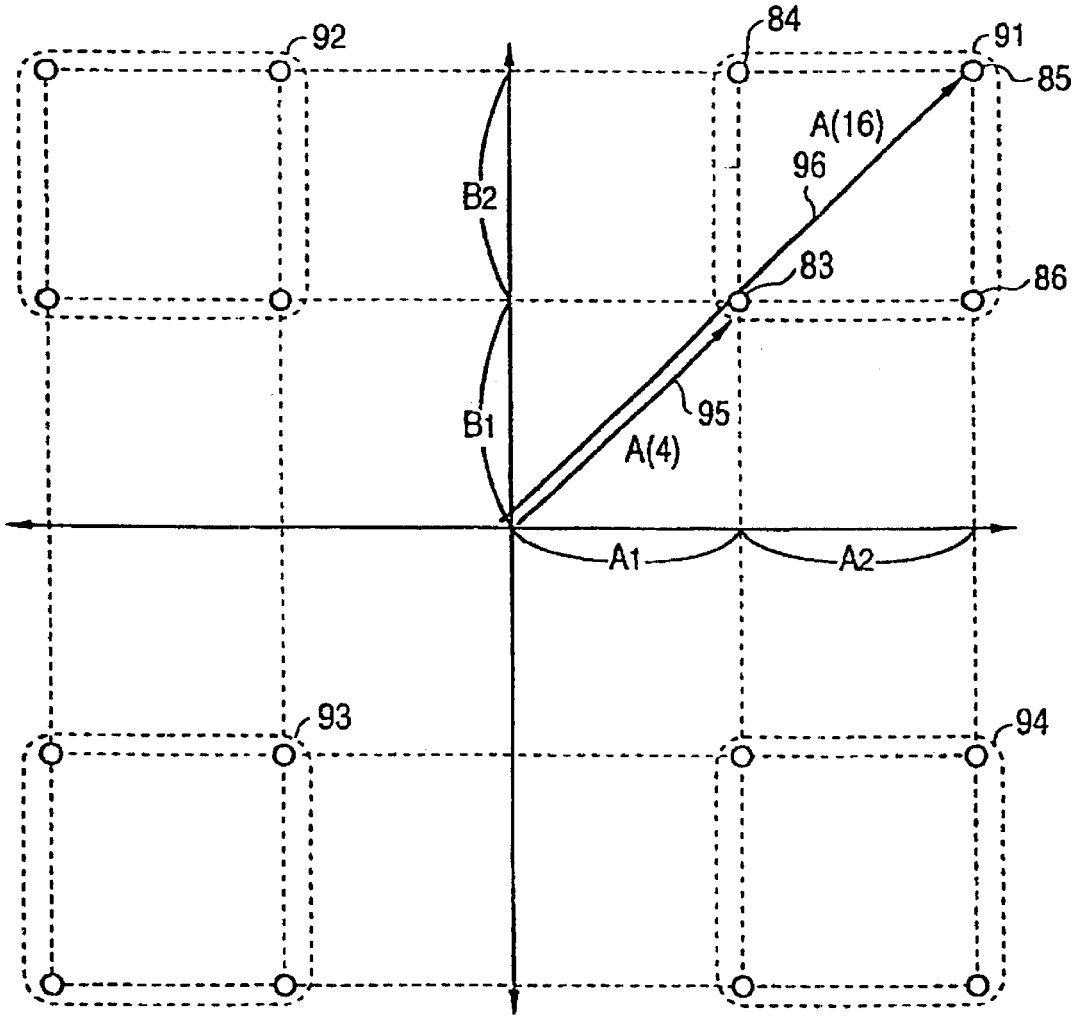
FIG. 10 is a vector diagram of a modified 16 QAM signal of the first embodiment.

The present invention resides in a multiple signal level arrangement in which the four signal point groups 91, 92, 93, and 94 are allocated at a greater distance from each other, as shown in FIG. 10, for minimizing the energy consumption required for 16 QAM modulation of quasi 4 PSK signals.

For clearing the relationship between the signal receiving sensitivity and the transmitting energy, the arrangement of the digital transmitter 51 and the first receiver 23 will be described in more detail referring to FIG. 1.

Figure 17:
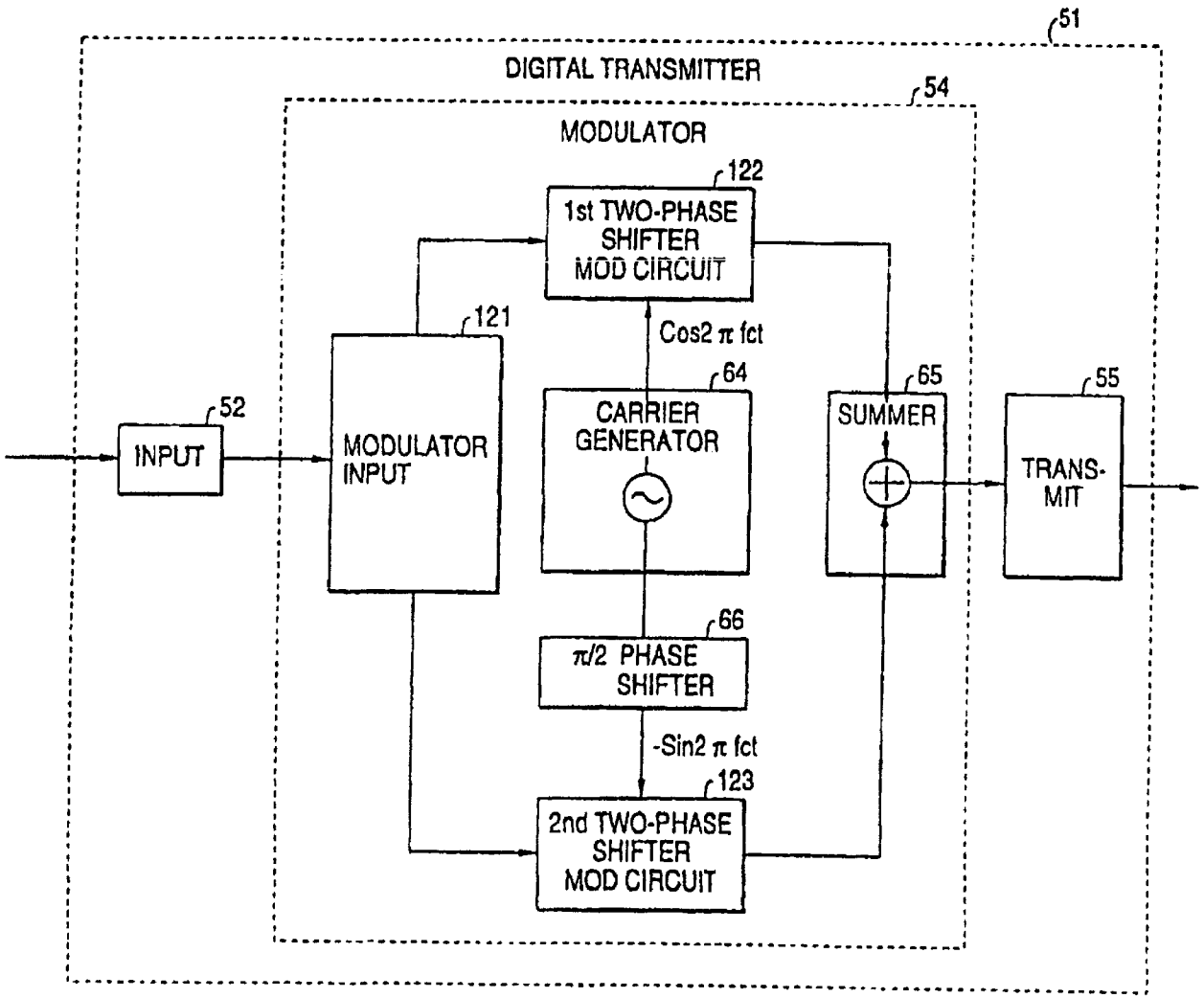
FIG. 17 is a block diagram of a digital transmitter of the first embodiment.

Both the digital transmitter 51 and the first receiver [2 3] *23* are formed of known types for data transmission or video signal transmission e.g. in TV broadcasting service. As shown in FIG. 17, the digital transmitter 51 is a 4 PSK transmitter equivalent to the multiple-bit QAM transmitter 1, shown in FIG. 2, without AM modulation capability. In operation, an input signal is fed through an input unit 52 to a modulator 54 where it is divided by a modulator input 121 into two components. The two components are then transferred to a first two-phase modulator circuit 122 for phase modulation of a base carrier and a second two-phase modulator circuit 123 for phase modulation of a carrier which is 90° out of phase with the base carrier respectively. The two outputs of the first and second two-phase modulator circuits 122 and 123 are then combined by a summer 65 into a composite modulated signal which is further transmitted from a transmitter unit 55.

Figure 18:
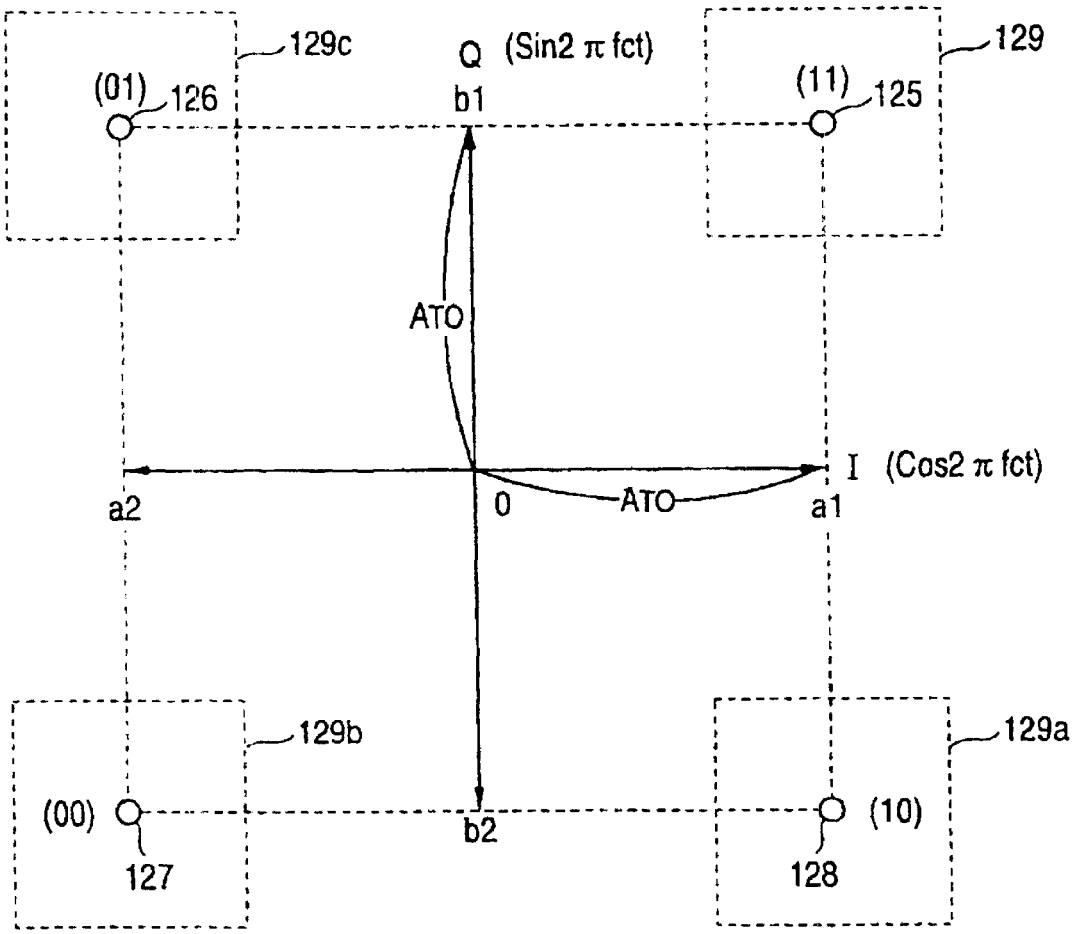
FIG. 18 is a signal space diagram of a 4 PSK modulated signal of the first embodiment.

The resultant modulated signal is shown in the space diagram of FIG. 18.

It is known that the four signal points are [allcated] *allocated* at equal distances for achieving optimum energy utilization. FIG. 18 illustrates an example where the four signal points 125, 126, 127, and 128 represent 4 two-bit patterns, 11, 01, 00, and 10 respectively. It is also desirable for successful data transfer from the digital transmitter 51 to the first receiver 23 that the 4 PSK signal from the digital transmitter 51 has an amplitude of not less than a given level. More specifically, when the minimum amplitude of the 4 PSK signal needed for transmission from the digital transmitter 51 to the first receiver 23 of 4 PSK mode, or the distance between 0 and $a_1$ in FIG. 18 is $A_{T0}$, the first receiver 23 must successfully intercept any 4 PSK signal having an amplitude of more than $A_{T0}$.

The first receiver 23 is arranged to receive at its small-diameter antenna 22 a desired or 4 PSK signal which is transmitted from the transmitter 1 or digital transmitter 51 respectively through the transponder 12 of the satellite 10 and demodulate it with the demodulator [24] *25*. In more detail, the first receiver 23 is substantially designed for interception of a digital TV or data communications signal of 4 PSK or 2 PSK mode.

Figure 19:
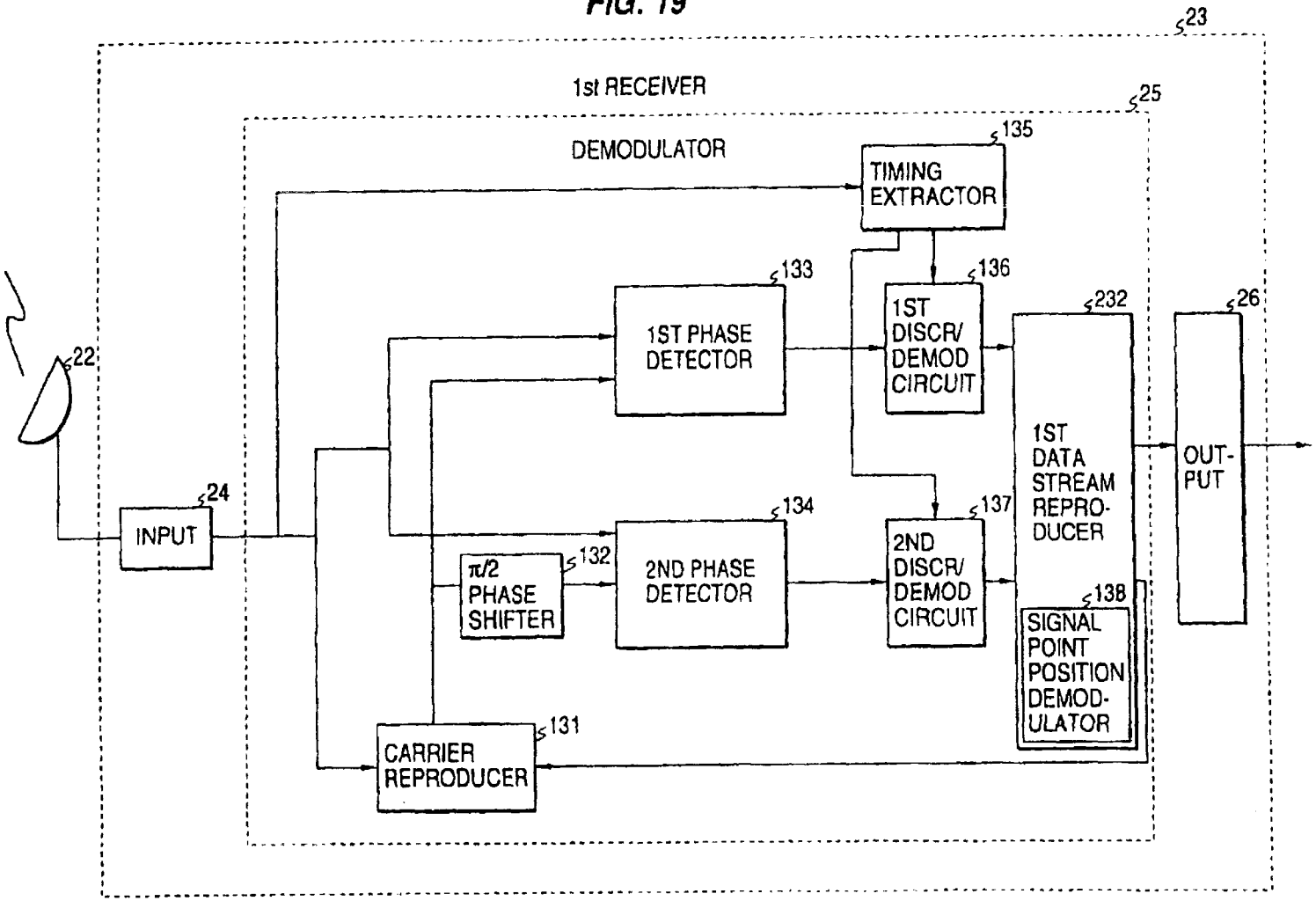
FIG. 19 is a block diagram of a first receiver of the first embodiment.

FIG. 19 is a block diagram of the first receiver 23 in which an input signal received by the antenna 22 from the satellite [12] *10* is fed through the input unit 24 to a carrier reproducing circuit 131 where a carrier wave is demodulated and to a $\pi/2$ phase shifter 132 where a 90° phase carrier wave is demodulated. Also, two 90°-out-of-phase components of the input signal are respectively detected by a first phase detector circuit 133 and a second phase detector circuit 134 and are respectively transferred to first 136 and second discrimination/demodulation circuits 136 and 137. Two demodulated components from their respective discrimination/demodulation circuits 136 and 137, which have separately been discriminated at units of time slots by means of timing signals from a timing wave extracting circuit 135, are fed to a first data stream reproducing unit 232 where they are combined into a first data stream signal which is then delivered as an output from the output unit 26.

Figure 20:
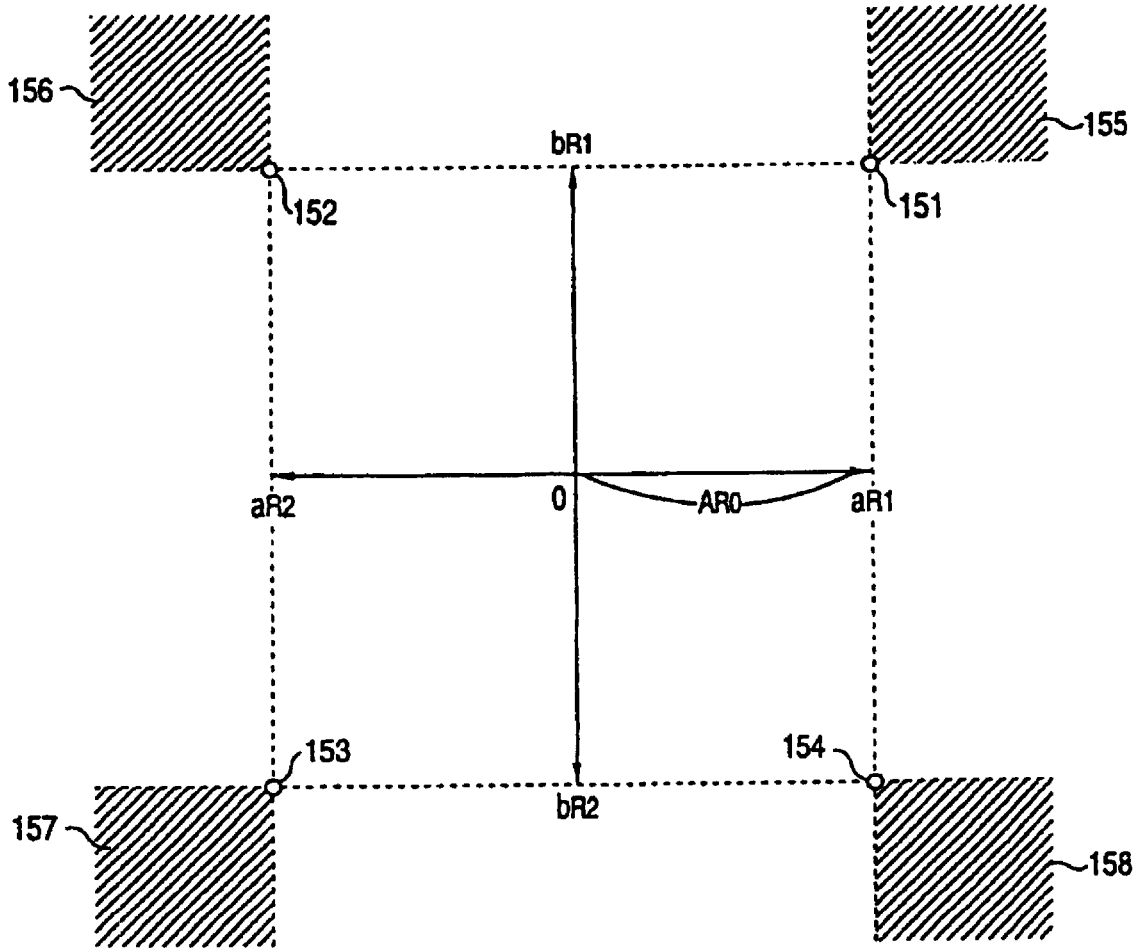
FIG. 20 is a signal space diagram of a 4 PSK modulated signal of the first embodiment.

The input signal to the first receiver 23 will now be explained in more detail referring to the vector diagram of FIG. 20. The 4 PSK signal received by the first receiver 23 from the digital transmitter 51 is expressed in an ideal form without transmission distortion and noise, using four signal points 151, 152, 153, and 154, as shown in FIG. 20.

In practice, the real four signal points appear in particular extended areas about the ideal signal positions 151, 152, 153, and 154 respectively due to noise, amplitude distortion, and phase error developed during transmission. If one signal point is unfavorably displaced from its original position, it will hardly be distinguished from its neighboring signal point and the error rate will thus be increased. As the error rate increases to a critical level, the reproduction of data becomes less accurate. For enabling the data reproduction at a maximum acceptable level of the error rate, the distance between any two signal points should be far enough to be distinguished from each other. If the distance is $1A_{R0}$, the signal point 151 of a 4 PSK signal close to a critical error level has to stay in a first discrimination area 155 denoted by the hatching of FIG. 20 and determined by $|0-a_{R1}|>A_{R0}$ and $|0-b_{R1}|>A_{R0}$. This allows the signal transmission system to reproduce carrier waves and thus, demodulate a wanted signal. When the minimum radius of the antenna 22 is set to $r_0$, the transmission signal of more than a given level can be intercepted by any receiver of the system. The amplitude of a 4 PSK signal of the digital transmitter 51 shown in FIG. 18 is minimum at $A_{T0}$ and thus, the minimum amplitude $A_{R0}$ of a 4 PSK signal to be received by the first receiver 23 is determined to be equal to $A_{T0}$. As a result, the first receiver 23 can intercept and demodulate the 4 PSK signal from the digital transmitter 51 at the maximum acceptable level of the error rate when the radius of the antenna 22 is more than $r_0$. If the transmission signal is of a modified 16- or 64-state QAM mode, the first receiver 23 may find it difficult to reproduce its carrier wave. For compensation, the signal points are increased to eight which are allocated at angles of $(\pi/4+n\pi/2)$ as shown in FIG. 25(a) and its carrier wave will be reproduced by a 16× multiplication technique. Also, if the signal points are assigned to 16 locations at angles of $n\pi/8$ as shown in FIG. 25(b), the carrier of a quasi 4 PSK mode 16 QAM modulated signal can be reproduced with the carrier reproducing circuit 131 which is modified for performing 16× frequency multiplication. At the time, the signal points in the transmitter 1 should be arranged to satisfy $A_1/(A_1+A_2)=\tan(\pi/8)$.

Here, a case of receiving a QPSK signal will be considered. Similarly to the manner performed by the signal point setting circuit 67 in the transmitter shown in FIG. 2, it is also possible to modulate the positions of the signal points of the QPSK signal shown in FIG. 18 (amplitude-modulation, pulse-modulation, or the like). In this case, the signal point demodulating unit 138 in the first receiver 23 demodulates the position modulated or position changed signal. The demodulated signal is outputted together with the first data stream.

The 16 PSK signal of the transmitter 1 will now be explained referring to the vector diagram of FIG. 9. When the horizontal vector distance $A_1$ of the signal point 83 is greater than $A_{T0}$ of the minimum amplitude of the 4 PSK signal of the digital transmitter 51, the four signal points 83, 84, 85, and 86 in the first quadrant of FIG. 9 stay in the shaded or first 4 PSK signal receivable area 87. When received by the first receiver 23, the four points of the signal appear in the first discriminating area of the vector field shown in FIG. 20. Hence, any of the signal points 83, 84, 85, and 86 of FIG. 9 can be translated into the signal level 151 of FIG. 20 by the first receiver 23 so that the two-bit pattern of 11 is assigned to a corresponding time slot. The two-bit pattern of 11 is identical to 11 of the first signal point group 91 or first data stream of a signal from the transmitter 1. Equally, the first data stream will be reproduced at the second, third, or fourth quadrant. As the result, the first receiver 23 reproduces two-bit data or the first data stream out of the plurality of data streams in a 16-, 32-, or 64-state QAM signal transmitted from the transmitter 1. The second and third data streams are contained in four segments of the signal point group 91 and thus, will not affect the demodulation of the first data stream. They may however affect the reproduction of a carrier wave and an adjustment, described later, will be needed.

If the transponder of a satellite supplies an abundance of energy, the foregoing technique of 16 to 64-state QAM mode transmission will be feasible. However, the transponder of the satellite in any existing satellite transmission system is strictly limited in the power supply due to its compact size and the capability of solar batteries. If the transponder or satellite is increased in size and thus weight, its launching cost will soar. This disadvantage will rarely be eliminated by traditional techniques unless the cost of launching a satellite rocket is reduced [by] *to* a considerable level. In the existing system, a common communications satellite provides as low as 20 W of power and a common broadcast satellite offers 100 W to 200 W at best. For transmission of such a 4 PSK signal in the symmetrical 16-state QAM mode as shown in FIG. 9, the minimum signal point distance [is needed] *needed is* $3A_{T0}$ as the 16 QAM amplitude is expressed by $2A_1=A_2$. Thus, the energy needed for the purpose is nine times greater than that for transmission of a common 4 PSK signal, in order to maintain compatibility. Also, any conventional satellite transponder can hardly provide [a] power for enabling such a small antenna of the 4 PSK first receiver to intercept a transmitted signal therefrom. For example, in the existing 40 W system, 360 W is needed for appropriate signal transmission and will be unrealistic with respect to cost.

It would be understood that the symmetrical signal state QAM technique is most effective when the receivers equipped with the same sized antennas are employed corresponding to a given transmitting power. Another novel technique will however be preferred for use with receivers equipped with different sized antennas.

In more detail, while the 4 PSK signal can be intercepted by a common low cost receiver system having a small antenna, the 16 QAM signal is intended to be received by a high cost, high quality, multiple-bit modulating receiver system with a medium or large sized antenna which is designed for providing highly valuable services, e.g. HDTV entertainment, to a particular person who invests more money. This allows both 4 PSK and 16 QAM signals, if desired, with a 64 [DMA] *QAM*, to be transmitted simultaneously with the help of a small increase in the transmitting power.

For example, the transmitting power can be maintained low when the signal points are allocated at $A_1=A_2$ as shown in FIG. 10. The amplitude A(4) for transmission of 4 PSK data is expressed by a vector 96 equivalent to *the* square root of $(A_1+A_2)^2+(B_1+B_2)^2$. Then, $$|A(4)|_2=A_1^2+B_1^2=A^2_{T0}+A^2_{T0}=2A^2_{T0}$$

$$|A(16)|_2=(A_1+A_2)^2+(B_1+B_2)^2=4A^2_{T0}+4A^2_{T0}=8A_{T0}$$

$$|A(16)|/|A(4)|=2$$

Accordingly, the 16 QAM signal can be transmitted at a two times greater amplitude and a four times greater transmitting energy than those needed for the 4 PSK signal. A modified 16 QAM signal according to the present invention will not be demodulated by a common receiver designed for symmetrical, equally distanced signal point QAM. However, it can be demodulated with the second receiver 33 when two threshold values $A_1$ and $A_2$ are preset to appropriate values. In FIG. 10, the minimum distance between two signal points in the first segment of the signal point group 91 is $A_1$ and $A_2/2A_1$ is established as compared with the distance $2A_1$ of 4 PSK. Then, as $A_1 = A_2$, the distance becomes ½. This explains that the signal receiving sensitivity has to be two times greater for the same error rate and four times greater for the same signal level. For having a four times greater value of sensitivity, the radius $r_2$ of the antenna 32 of the second receiver 33 has to be two times greater than the radius $r_1$ of the antenna 22 of the first receiver 23 thus satisfying $r_2=2r_1$. For example, the antenna 32 of the second receiver 33 is 60 cm diameter when the antenna 22 if the first receiver 23 is 30 cm. In this manner, the second data stream representing the high frequency component of an HDTV will be carried on a signal channel and demodulated successfully. As the second receiver 33 intercepts the second data stream or a higher data signal, its owner can enjoy a [of] high *return of* investment [return]. Hence, the second receiver 33 of a high price may be accepted. As the minimum energy for transmission of 4 PSK data is predetermined, the ratio $n_{16}$ of modified 16 APSK transmitting energy to 4 PSK transmitting energy will be calculated according to the antenna radius $r_2$ of the second receiver 33 using a ratio between $A_1$ and $A_2$ shown in FIG. 10.

In particular, $n_{16}$ is expressed by $((A_1+A_2)/A_1)^2$ which is the minimum energy for transmission of 4 PSK data. As the signal point distance suited for modified 16 QAM interception is $A_2$, [The] *the* signal point distance for 4 PSK interception is $2A_1$, and the signal point distance ratio is $A_2/2A_1$, the antenna radius $r_2$ is determined as shown in FIG. 11, in which the curve 101 represents the relationship between the transmitting energy ratio $n_{16}$ and the radius $r_2$ of the antenna 22 of the second receiver 23.

Also, the point 102 indicates transmission of common 16 QAM at the equal distance signal state mode where the transmitting energy is nine times greater and thus will no more be practical. As apparent from the graph of FIG. 11, the antenna radius $r_2$ of the second receiver 23 cannot be reduced further even if $n_{16}$ is increased more than 5 times.

Figure 11:
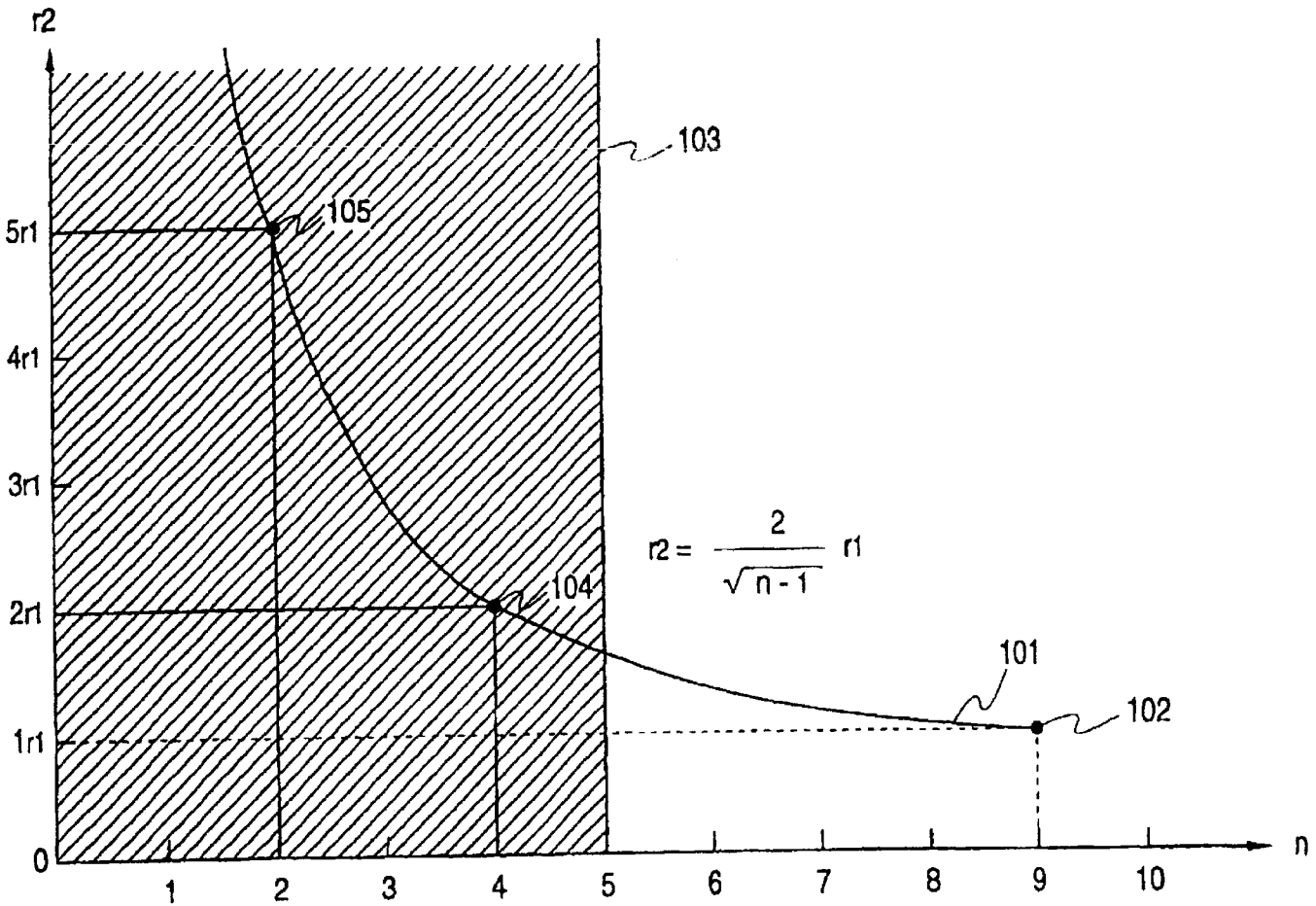
FIG. 11 is a graphic diagram showing the relationship between antenna radius $r_2$ and transmission energy ratio n according to the first embodiment.

The transmitting energy at the satellite is limited to a small value and thus, $n_{16}$ preferably stays not more than 5 times the value, as denoted by the hatching of FIG. 11. The point 104 within the hatching area 103 indicates, for example, that the antenna radius $r_2$ of a two times greater value is matched with a 4× value of the transmitting energy. Also, the point 105 represents that the transmission energy should be doubled when $r_2$ is about 5× greater. Those values are all within a feasible range.

The value of $n_{16}$ not greater than 5× value is expressed using $A_1$ and $A_2$ as:

$$n_{16}=((A_1+A_2)/A_1)^2<5$$

Hence, $A_2<1.23A_1$.

If the distance between any two signal point group segments shown in FIG. 10 is 2A(4) and the maximum amplitude is 2A(16), A(4) and A(16)–A(4) are proportional to [A1] $A_1$ and [A2] $A_2$ respectively. Hence, $(A(16))^2<5(A(14))^2$ is established.

The action of a modified 64 ASPK transmission will be described as the third receiver 43 can perform 64-state QAM demodulation.

Figure 12:
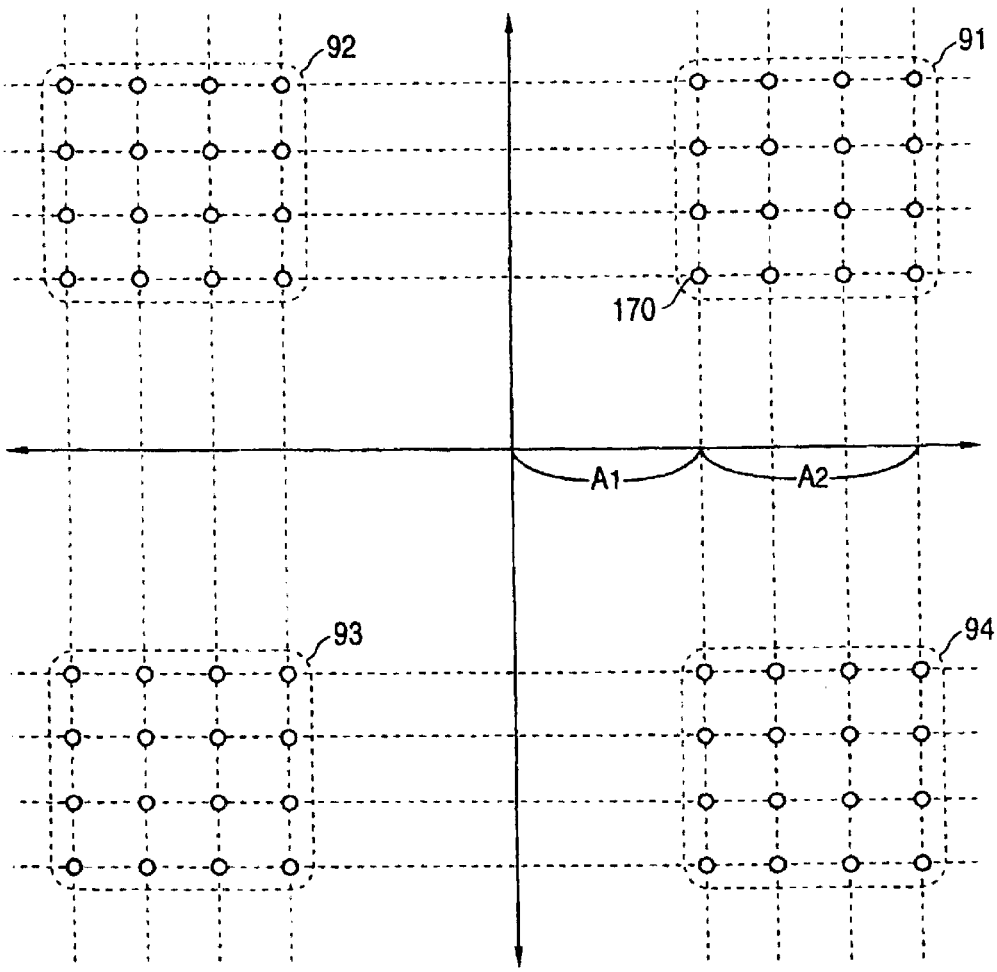
FIG. 12 is view showing the signal points of a modified 64 QAM signal of the first embodiment.

FIG. 12 is a vector diagram in which each signal point group segment contains 16 signal points as compared with 4 signal points of FIG. 10. The first signal point group segment 91 in FIG. 12 has a 4×4 matrix of 16 signal points allocated at equal intervals including the point 170. For providing compatibility with 4 PSK, $A_1>A_{70}$ has to be satisfied. If the radius of the antenna 42 of the third receiver 43 is $r_3$ and the transmitting energy is $n_{64}$, the equation is expressed as:

$$r_3^2=\{6^2/(n-1)\}r_1^2$$

Figure 13:
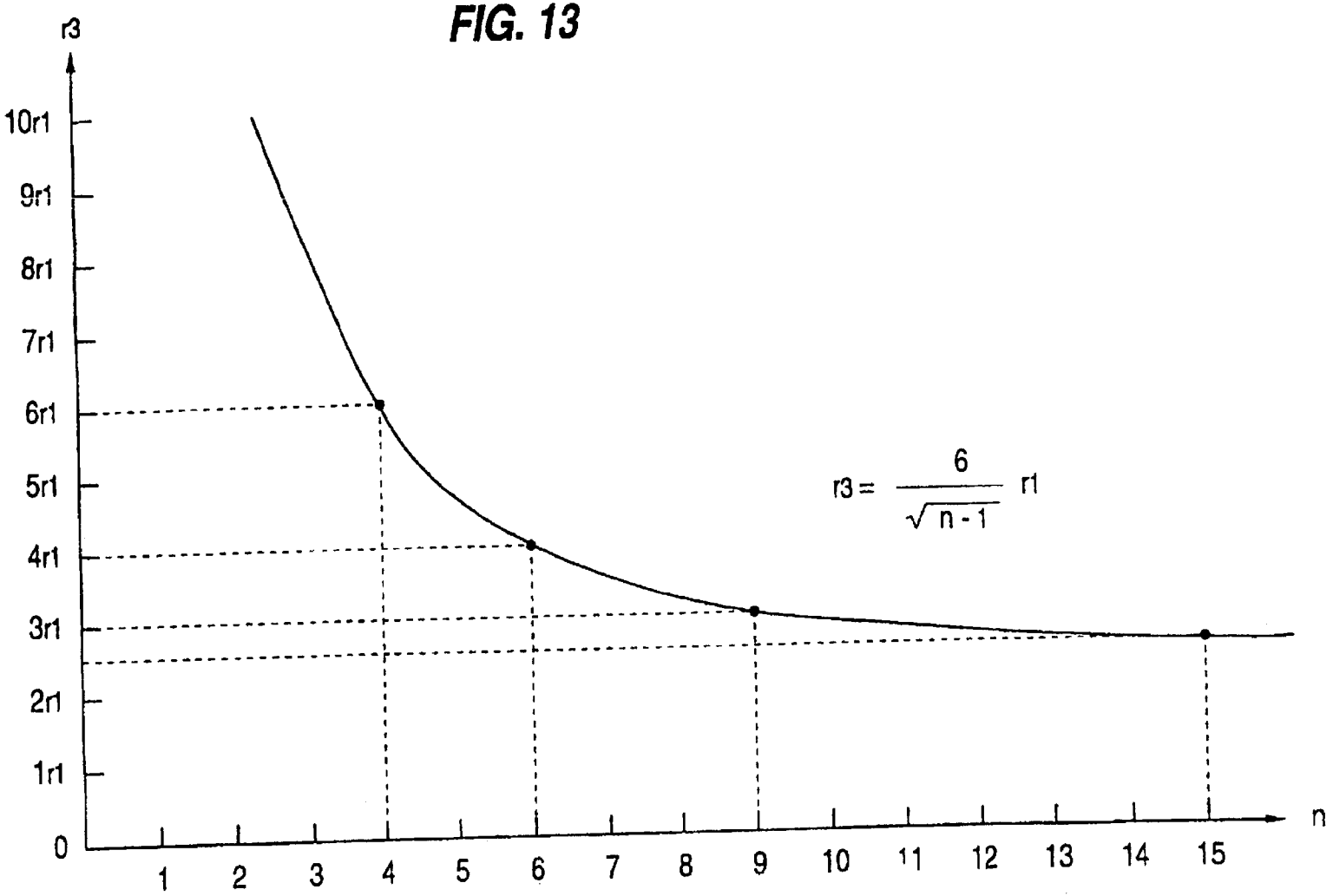
FIG. 13 is a graphic diagram showing the relationship between antenna radius $r_3$ and transmission energy ratio n according to the first embodiment.

This relationship between [$r^3$] $r_3$ and n of a 64 QAM signal is also shown in the graphic representation of FIG. 13.

It is understood that the signal point assignment shown in FIG. 12 allows the second receiver 33 to demodulate only two-bit patterns of 4 PSK data. Hence, it is desirable [for] *to have* compatibility [between] *among* the first, second, and third receivers that the second receiver 33 is capable of demodulating a modified 16 QAM form from the 64 QAM modulated signal.

Figure 14:
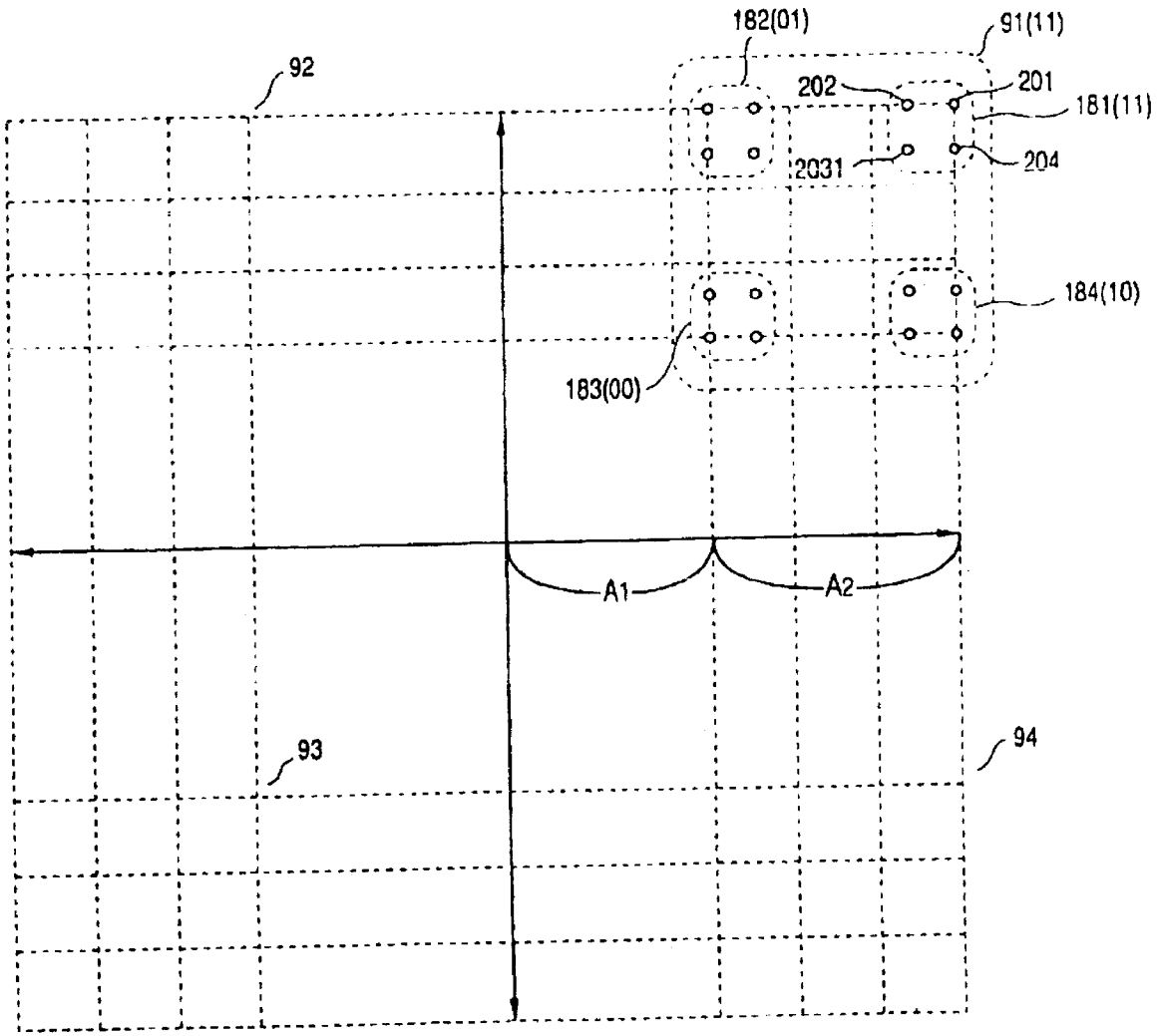
FIG. 14 is a vector diagram showing signal point groups and their signal points of the modified 64 QAM signal of the first embodiment.

The compatibility [between] *among* the three discrete receivers can be implemented by *a* three-level grouping of signal points, as illustrated in FIG. 14. A description follows referring to the first quadrant in which the first signal point group segment 91 represents the two-bit pattern 11 of the first data stream.

In particular, a first sub segment 181 in the first signal point group segment 91 is assigned the two-bit pattern 11 of the second data stream. Equally, a second 182, a third 183, and a fourth sub segment 184 are assigned 01, 00, and 10 of the same respectively. This assignment is identical to that shown in FIG. 7.

The signal point allocation of the third data stream will now be explained referring to the vector diagram of FIG. 15 which shows the first quadrant. As shown, the four signal points 201, 205, 209, and 213 represent the two-bit pattern of 11, the signal points 202, 206, 210, and 214 represent 01, the signal points 203, 207, 211, and 215 represent 00, and signal points 204, 208, 212, and 216 represent 10. Accordingly, the two-bit patterns of the third data stream can be transmitted separately of the first and second data streams. In other words, two-bit data of the three different signal levels can be transmitted respectively.

As understood, the present invention permits not only transmission of six-bit data but also interception of three, two-bit, four-bit, and six-bit, different bit length data with their respective receivers while the signal compatibility remains between these levels.

The signal point allocation for providing compatibility [between] *among* the three levels will be described.

Figure 15:
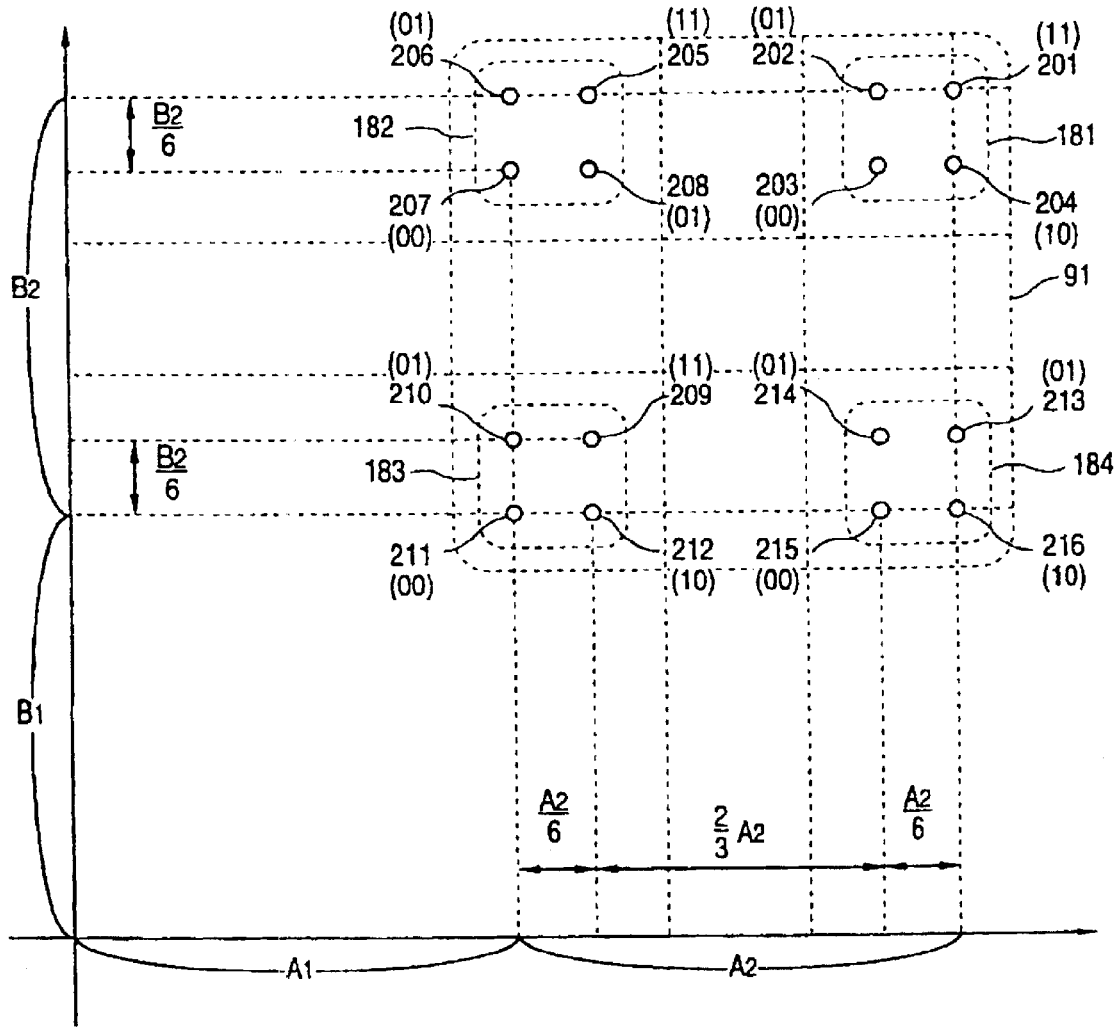
FIG. 15 is an explanatory view showing the relationship between $A_1$ and $A_2$ of the modified 64 QAM signal of the first embodiment.

As shown in FIG. 15, $A_1>A_{70}$ is essential for allowing the first receiver 23 to receive the first data stream.

It is necessary to space any two signal points from each other by such a distance that the sub segment signal points, e.g. 182, 183, 184, of the second data stream shown in FIG. 15 can be distinguished from the signal point 91 shown in FIG. 10.

FIG. 15 shows that they are spaced by $\frac{2}{3}A_2$. In this case, the distance between the two signal points 201 and 202 in the first sub segment 181 is $A_2/6$. The transmitting energy needed for signal interception with the third receiver 43 is now calculated. If the radius of the antenna [32] *42* is $r_3$ and the needed transmitting energy is $n_{64}$ times the 4 PSK tranmitting energy, the equation is expressed as:

$$[R_3^2(12r_1)^2/(n-1)]\ R_3^2=(12r_1)^2/(n-1)$$

Figure 16:
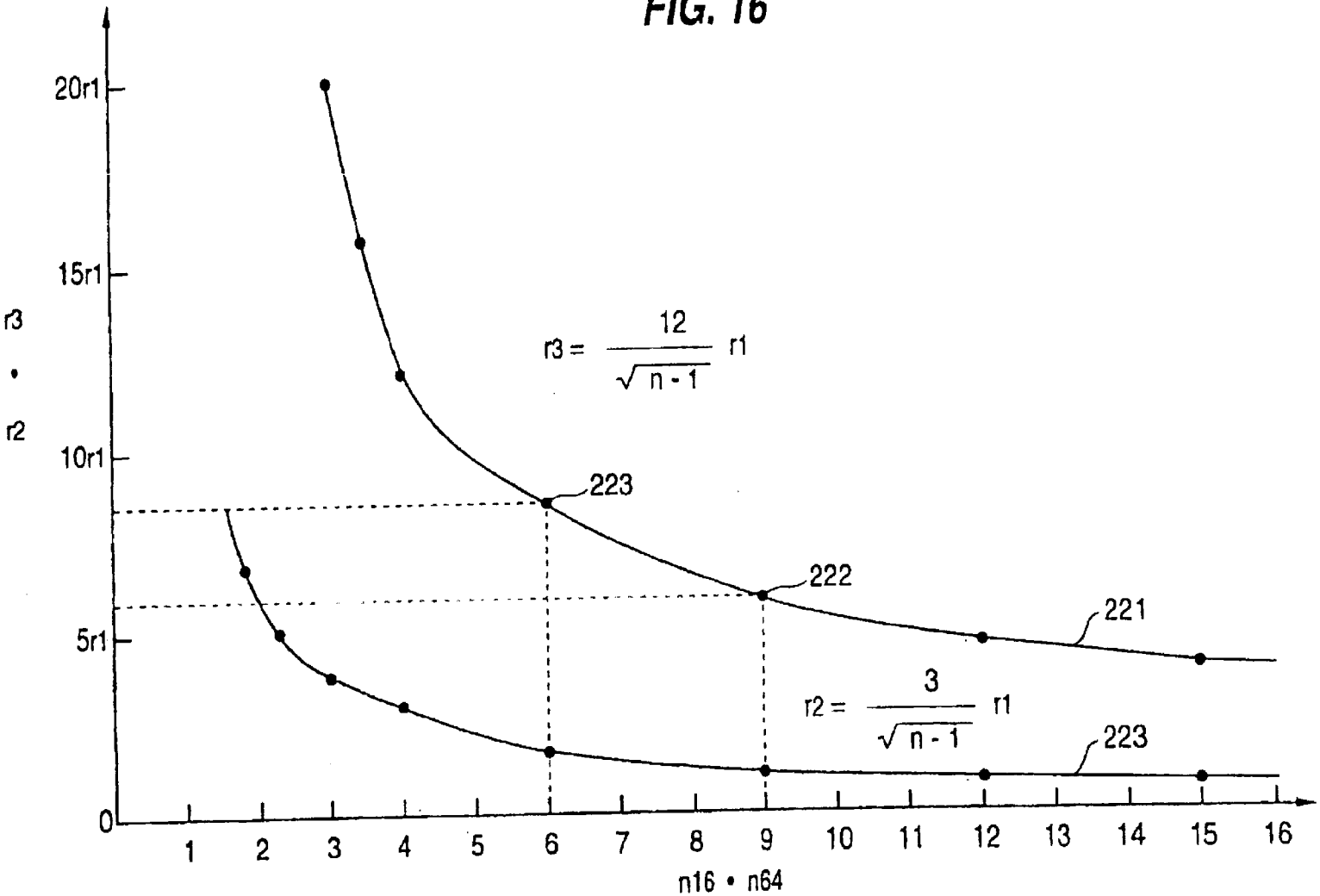
FIG. 16 is a graph showing the relationship between antenna radius $r_2$ and $r_3$ and transmission energy ratio $n_{16}$ and $n_{64}$ respectively according to the first embodiment.

This relationship is also denoted by the curve 211 in FIG. 16. For example, if the transmitting energy is 6 or 9 times greater than that for 4 PSK transmission at the point 223 or 222, the antenna 32 having a radius of 8× or 6× value respectively can intercept the first, second, and third data streams for demodulation. As the signal point distance of the second data stream is close to $\frac{2}{3}A_2$, the relationship between $r_1$ and $r_2$ is expressed by:

$$[R_2 2=(3r_1)^2/(n-1)]\ R_2^2=(3r_1)^2/(n-1)$$

Therefore, the antenna 32 of the second receiver 33 has to be slightly increased in radius as denoted by the curve 223.

As understood, while the first and second data streams are transmitted through a traditional satellite which provides a small signal transmitting energy, the third data stream can also be transmitted through a future satellite which provides a greater signal transmitting energy without interrupting the action of the first and second receivers 23 or 33 or with no need of modification of the same and thus, both the compatibility and the advancement is ensured.

The signal receiving action of the second receiver 33 will first be described. As compared with the first receiver 23 arranged for interception with a small radius $r_1$ antenna and demodulation of the 4 PSK modulated signal of the digital transmitter 51 or the first data stream of the signal of the transmitter 1, the second receiver 33 is adopted for perfectly demodulating the 16 signal state two-bit data, shown in FIG. 10, or second data stream of the 16 QAM signal from the transmitter 1. In total, four-bit data including also the first data stream can be demodulated. The ratio between $A_1$ and $A_2$ is however different in the two transmitters. The two different data are loaded to a demodulation controller 231 of the second receiver 33, shown in FIG. 21, which in turn supplies their respective threshold values to the demodulating circuit for AM demodulation.

Figure 21:
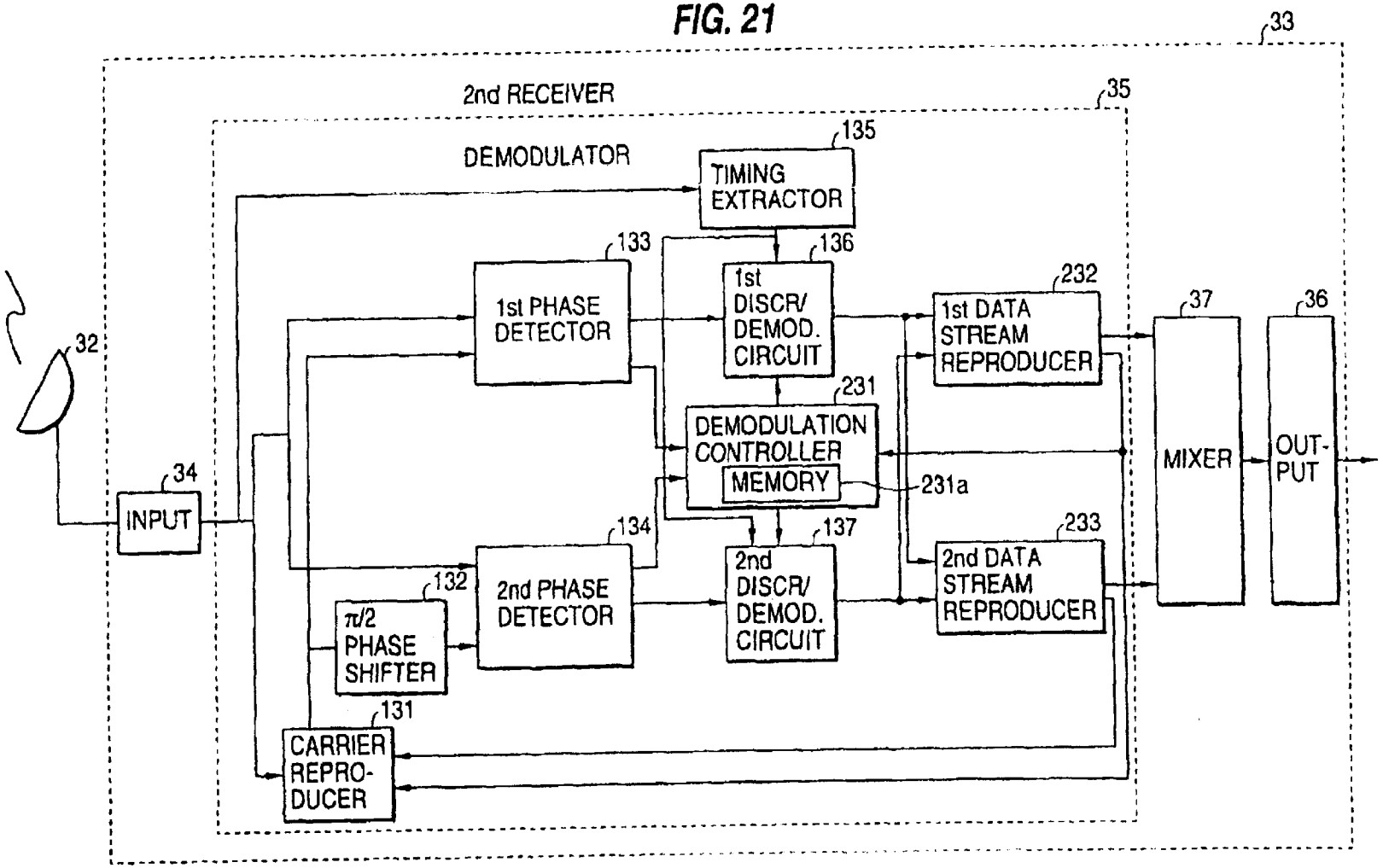
FIG. 21 is a block diagram of a second receiver of the first embodiment.
Figure 22:
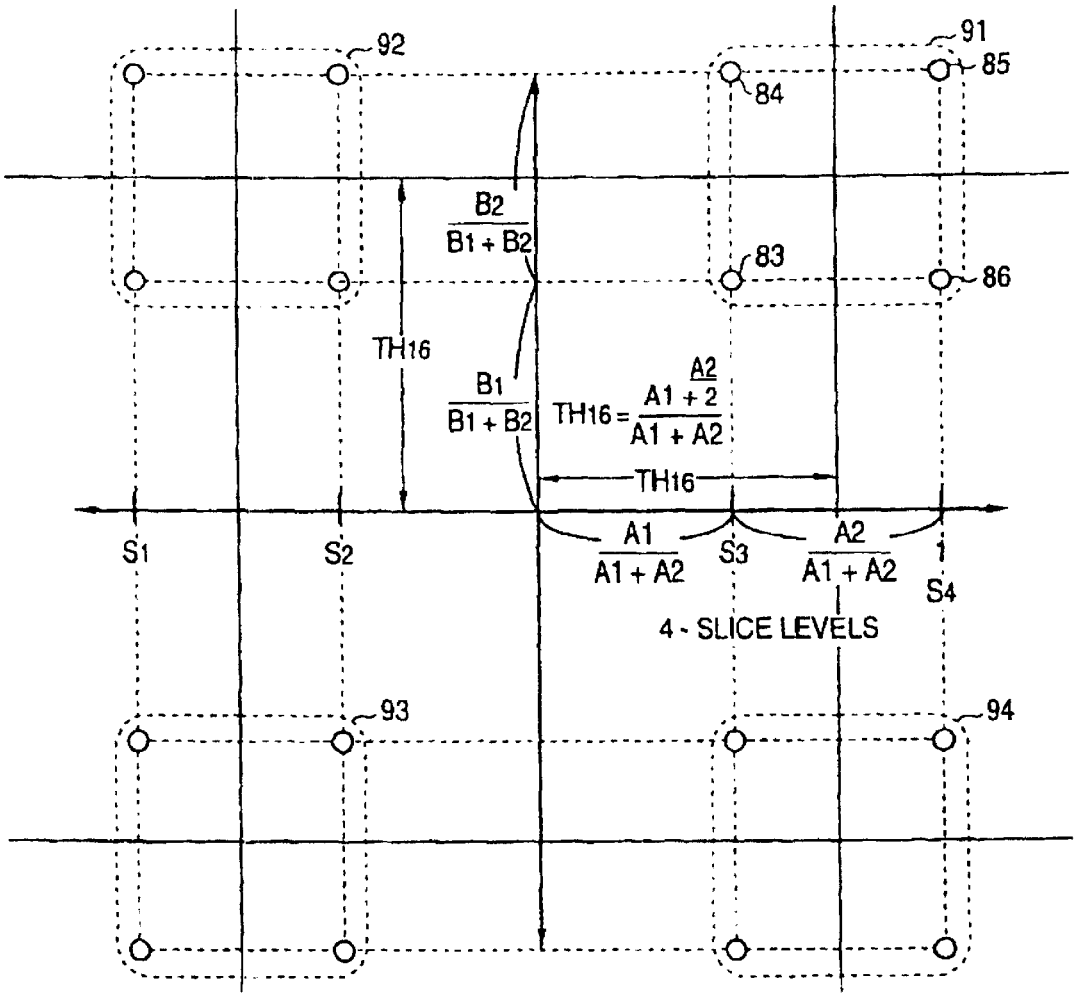
FIG. 22 is a vector diagram of a modified 16 QAM signal of the first embodiment.

The block diagram of the second receiver 33 in FIG. 21 is similar in basic construction to that of the first receiver 23 shown in FIG. 19. The difference is that the radius $r_2$ of the antenna 32 is greater than $r_1$ of the antenna 22. This allows the second receiver 33 to identify a signal component involving a smaller signal point distance. The demodulator 35 of the second receiver 33 also contains first and second data stream reproducing units 232 and 233 in addition to the demodulation controller 231. There is provided a first discrimination/demodulation circuit 136 for AM demodulation of modified 16 QAM signals. As understood, each carrier is a four-bit signal having two, positive and negative, threshold values about the zero level. [AS] *As* apparent from the vector diagram, of FIG. 22, the threshold values are varied depending on the transmitting energy of a transmitter since the transmitting signal of the embodiment is a modified 16 QAM signal. When the reference threshold is $TH_{16}$, it is determined by, as shown in FIG. 22:

$$TH_{16}=(A_1+A_2/2)/(A_1+A_2)$$

The various data for demodulation including $A_1$ and $A_2$ or $TH_{16}$, and the value m for multiple-bit modulation are also transmitted from the transmitter 1 as carried in the first data stream. The demodulation controller 231 may be arranged for recovering such demodulation data through statistical process of the received signal.

Figure 26:
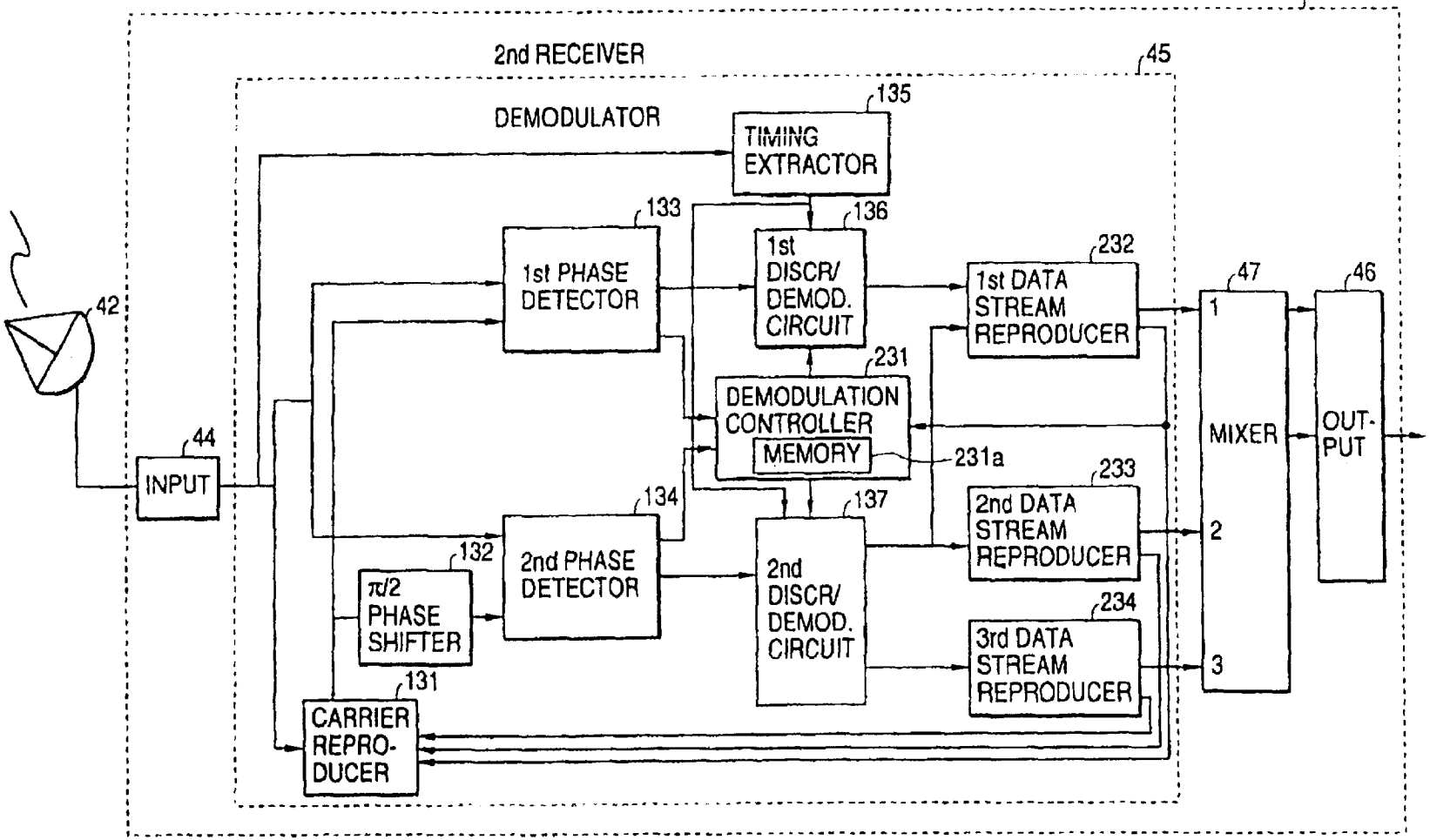
FIG. 26 is a block diagram of a third receiver of the first embodiment.

A way of determining the shift factor $A_1/A_2$ will be described with reference to FIG. 26. A change of the shift factor $A_1/A_2$ causes a change of the threshold value. Increase of a difference of a value of $A_1/A_2$ set at the receiver side from a value of $A_1/A_2$ set at the transmitter side will increase the error rate. Referring to FIG. 26, the demodulated signal from the second data stream reproducing unit 233 may be fed back to the demodulation controller 231 to change the shift factor $A_1/A_2$ in a direction to increase the error rate. By this arrangement, the third receiver 43 may not demodulate the shift factor $A_1/A_2$, so that the circuit construction can be simplified. Further, the transmitter may not transmit the shift factor $A_1/A_2$, so that the transmission capacity can be increased. This technique can be applied also to the second receiver 33.

FIGS. 25(a) and 25(b) are views showing signal point allocations for the C-CDM signal points, wherein signal points are added by shifting in the polar coordinate direction (r,θ). The previously described C-CDM is characterized in that the signal points are shifted in the rectangular coordinate direction, i.e. XY direction; therefore it is referred to as rectangular coordinate system C-CDM. Meanwhile, this C-CDM characterized by the shifting of signal points in the polar coordinate direction, i.e. r,θ direction, is referred to as polar coordinate system C-CDM.

FIG. 25(a) shows the signal allocation of 8PS-APSK signals, wherein four signal points are added by shifting each of 4 QPSK signals in the radius r direction of the polar coordinate system. In this manner, the APSK of polar coordinate system C-CDM having 8 signal points is obtained from the QPSK as shown in FIG. 25(a). As the pole is shifted in the polar coordinate system to add signal points in this APSK, it is referred to as shifted pole-APSK, i.e. SP-APSK in the abbreviated form. In this case, coordinate values of the newly added four QPSK signals 85 are specified by using a shift factor $S_1$ as shown in FIG. 139. Namely, 8PS-APSK signal points includes ordinary QPSK signal points 83 $(r_0, \theta_0)$ and a signal point $((S_1+1)(r_0, \theta_0)$ obtained by shifting the signal point 83 in the radius r direction by an amount of $S_1r_0$. Thus, a 1-bit subchannel 2 is obtained in addition to a 2-bit subchannel 1 identical with the QPSK.

Furthermore, as shown in the constellation diagram of FIG. 140, new eight signal points, represented by coordinates $(r_0+S_2r_0, \theta_0)$ and $(r_0+S_1r_0+S_2r_0, \theta_0)$, can be added by shifting the eight signal points $(r_0, \theta_0)$ and $(r_0+S_1r_0, \theta_0)$ in the radius r direction. As this allows two kinds of allocations, a 1-bit subchannel is obtained and is referred to as 16PS-APSK which provides the 2-bit subchannel 1, 1-bit subchannel 2, and 1-bit subchannel 3. As the 16-PS-APSK disposes the signal points on the lines of $\theta=\frac{1}{4}(2n+1)\pi$, it allows the ordinary QPSK receiver explained with reference to FIG. 19 to reproduce the carrier wave to demodulate the first 2-bit subchannel although the second subchannel cannot be demodulated. As described above, the C-CDM method of shifting the signal points in the polar coordinate direction is useful in expanding the capacity of information data transmission while assuring compatibility to the PSK, especially to the QPSK receiver, a main receiver for the present satellite broadcast service. Therefore, without losing the first generation viewers of the satellite broadcast service based on the PSK, the broadcast service will advance to a second generation stage wherein the APSK will be used to increase transmittable information amount by use of the multi-level modulation while maintaining compatibility.

In FIG. 25(b), the signal points are allocated on the lines $\theta=\pi/8$. With this arrangement, the 16 PSK signal points are reduced or limited to 12 signal points, i.e. 3 signal points in each quadrant. With this limitation, these three signal points in each quadrant are roughly regarded as one signal point for 4 QPSK signals. Therefore, this enables the QPSK receiver to reproduce the first subchannel in the same manner as in the previous embodiment.

More specifically, the signal points are disposed on the lines of $\theta=\pi/4$, $\theta=\pi/4+\pi/8$, and $\theta=\pi/4-\pi/8$. In other words, the added signals are offset by an amount $\pm\theta$ in the angular direction of the polar coordinate system from the QPSK signals disposed on the lines of $\theta=\pi/4$. Since all the signals are in the range of $\theta=\pi/4\pm\pi/8$, they can be regarded as one of the QPSK signal points on the line of $\theta=\pi/4$. Although the error rate is lowered a little bit in this case, the QPSK receiver 23 shown in FIG. 19 can discriminate these points as four signal points angularly allocated. Thus, 2-bit data can be reproduced. In case of the angular shift C-CDM, if signal points are disposed on the lines of $\pi/n$, the carrier wave reproduction circuit can reproduce the carrier wave by the use of an n-multiplier circuit in the same manner as in other embodiments. If the signal points are not disposed on the lines of $\pi/n$, the carrier wave can be reproduced by transmitting several pieces of carrier information within a predetermined period in the same manner as in other [embodiment] *embodiments*. Assuming that an angle between two signal points of the QPSK or 8-SP-APSK is $2\theta_0$ in the polar coordinate system and a first angular shift factor is P1, two signal points $(r_0, \theta_0+P_1\theta_0)$ and $(r_0, [\%]\ \theta_0-P_1\theta_0)$ are obtained by shifting the QPSK signal point in the angular $\theta$ direction by an amount $\pm P_1\theta_0$. Thus, the number of signal points are doubled. Thus, the 1-bit subchannel 3 can be added and is referred to as 8-SP-PSK of P=P1. If eight signal points are further added by shifting the 8-SP-PSK signals in the radius r direction by an amount $S_1r_0$, it will become possible to obtain 16-SP-APSK (P, $S_1$ type) as shown in FIG. 142. The subchannels 1 and 2 can be reproduced by two 8PS-PSKs having the same phase. Returning to FIG. 25(b), as the C-CDM based on the angular shift in the polar coordinate system can be applied to the PSK as shown in FIG. 141, this will be adopted to the first generation satellite broadcast service. However, if adopted to the second generation satellite broadcasting based on the APSK, this polar coordinate system C-CDM is inferior in that signal points in the same group cannot be uniformly spaced as shown in FIG. 142. Accordingly, utilization efficiency of electrical power is worsened. On the other hand, the rectangular coordinate system C-CDM has good compatibility to the PSK.

The system shown in FIG. 25(b) is compatible with both the rectangular and polar coordinate systems. As the signal points are disposed on the angular lines of the 16 PSK, they can be demodulated by the 16 PSK. Furthermore, as the signal points are divided into groups, the QPSK receiver can be used for demodulation. Still further, as the signal points are also allocated to suit the rectangular coordinate system, the demodulation will be performed by the 16-SRQAM. Consequently, the compatibility between the rectangular coordinate system C-CDM and the polar coordinate system C-CDM can be assured in any of the QPSK, 16PSK, and 16-SRQAM.

The demodulation controller 231 has a memory 231a for storing therein different threshold values (i.e., the shift factors, the number of signal points, the synchronization rules, etc.) which correspond to different TV broadcast channels. When receiving one of the channels again, the values corresponding to the receiving channel will be read out of the memory to thereby stabilize the reception quickly.

If the demodulation data is lost, the demodulation of the second data stream will hardly be executed. This will be explained referring to a flowchart shown in FIG. 24.

Even if the demodulation data is not available, demodulation of the 4 PSK at Step 313 and of the first data stream at Step 301 can be implemented. At Step 302, the demodulation data retrieved by the first data stream reproducing unit 232 is transferred to the demodulation controller 231. If m is 4 or 2 at Step 303, the demodulation controller 231 triggers demodulation of 4 PSK or 2 PSK at Step 313. If not, the procedure moves to Step 310. At Step 305, two threshold values $TH_8$ and $TH_{16}$ are calculated. The threshold value $TH_{16}$ for AM demodulation is fed at Step 306 from the demodulation controller 231 to both the first 136 and the second discrimination/demodulation circuit 137. Hence, demodulation of the modified 16 QAM signal and reproduction of the second data stream can be carried out at Steps 307 and 315 respectively. At Step 308, the error rate is examined and if high, the procedure returns to Step 313 for repeating the 4 PSK demodulation.

As shown in FIG. 22 [and] the signal points 85, 83, are aligned on a line at an angle of $\cos(\omega t+n\pi/2)$ while 84 and 86 are off the line. Hence, the feedback of a second data stream transmitting carrier wave data from the second data stream reproducing unit 233 to a carrier reproducing circuit 131 is carried out so that no carrier needs to be extracted at the timing of the signal points 84 and 86.

The transmitter 1 is arranged to transmit carrier timing signals at intervals of a given time with the first data stream for the purpose of compensation for no demodulation of the second data stream. The carrier timing signal enables one to identify the signal points 83 and 85 of the first data stream regardless of demodulation of the second data stream. Hence, the reproduction of carrier wave can be triggered by the transmitting *of* carrier data to the carrier reproducing circuit 131.

Figure 23:
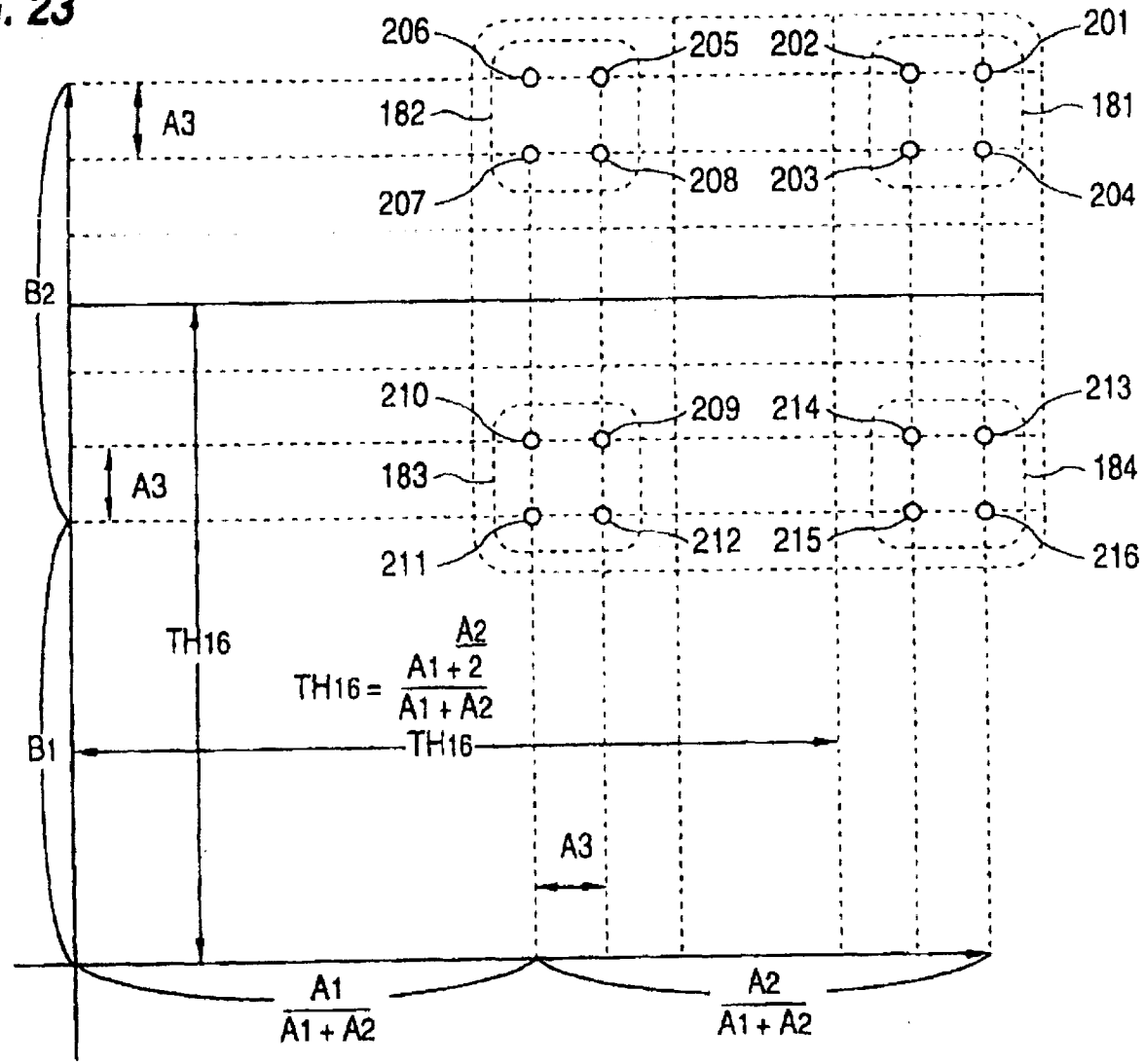
FIG. 23 is a vector diagram of a modified 64 QAM signal of the first embodiment.
Figure 24:
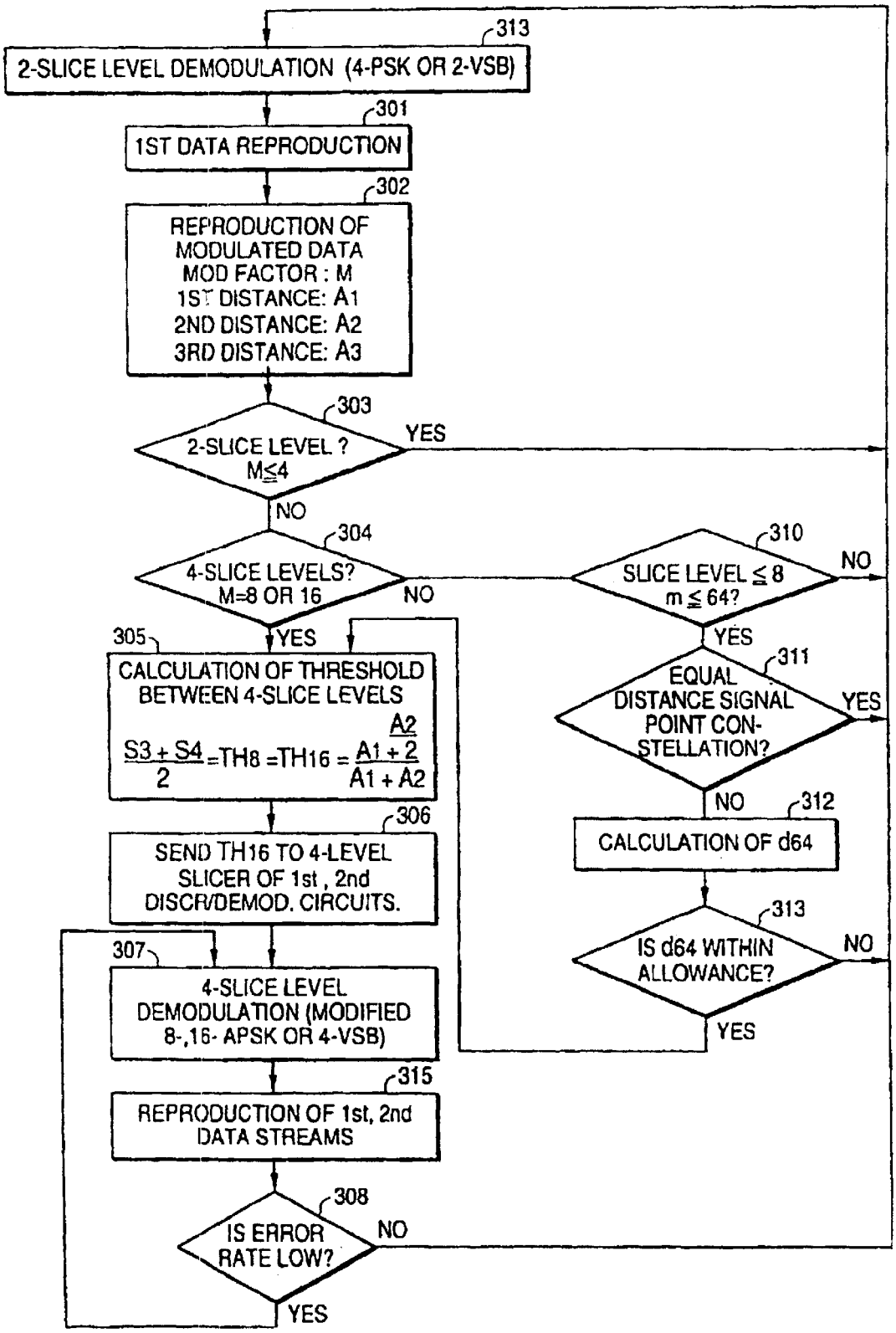
FIG. 24 is a flowchart showing the operation of the first embodiment.

A determination then made at Step 304 of the flowchart of FIG. 24 as to whether or not m is 16 upon receipt of such a modified 64 QAM signal as shown in FIG. 23. At Step 310, a determination is also made as to whether or not m is more than 64. If it is determined at Step 311 that the received signal has no equal distance signal point constellation, the procedure goes to Step 312. The signal point distance $TH_{64}$ of the modified 64 QAM signal is calculated from:

$$TH_{64}=(A_1+A_2/2)/(A_1+A_2)$$

This calculation is equivalent to that of $TH_{16}$ but its resultant distance between signal points is smaller.

If the signal point distance in the first sub segment 181 is $A_3$, the distance between the first 181 and the second sub segment 182 is expressed by $(A_2-2A_3)$. Then, the average distance is $(A_2-2A_3)/(A_1+A_2)$ which is designated as $d_{64}$. when $d_{64}$ is smaller than $T_2$ which represents the signal point discrimination capability of the second receiver 33, any two signal points in the segment will hardly be distinguished from each other. This judgement is executed at Step 313. If $d_{64}$ is out of a permissive range, the procedure moves back to Step 313 for 4 PSK mode demodulation. If $d_{64}$ is within the range, the procedure advances to Step 305 for allowing the demodulation of 16 QAM at Step 307. If it is determined at Step 308 that the error rate is too high, the procedure goes back to Step 313 for 4 PSK mode demodulation.

When the transmitter 1 supplied a modified 8 QAM signal such as shown in FIG. 25(a) in which all the signal points are at angles of cos $(2\pi f+\cdot\pi/4)$, the carrier waves of the signal are lengthened to the same phase and will thus be reproduced with much ease. At the time, two-bit data of the first data stream are demodulated by the 4-PSK receiver while one-bit data of the second data stream is demodulated by the second receiver 33 and the total of three-bit data can be reproduced.

The third receiver 43 will be described in more detail. FIG. 26 shows a block diagram of the third receiver 43 similar to that of the second receiver 33 in FIG. 21. The difference is that a third data stream reproducing unit 234 is added and also, the discrimination/demodulation circuit has a capability of identifying eight-bit data. The antenna 42 of the third receiver 43 has a radius $r_3$ greater than $r_2$ thus allowing smaller distance state signals, e.g. 32- or 64-state QAM signals, to be demodulated. For demodulation of the 64 QAM signal, the first discrimination/ reproduction circuit 136 has to identify 8 digital levels of the detected signal in which seven different threshold levels are involved. As one of the threshold values is zero, three are contained in the first quadrant.

Figure 27:
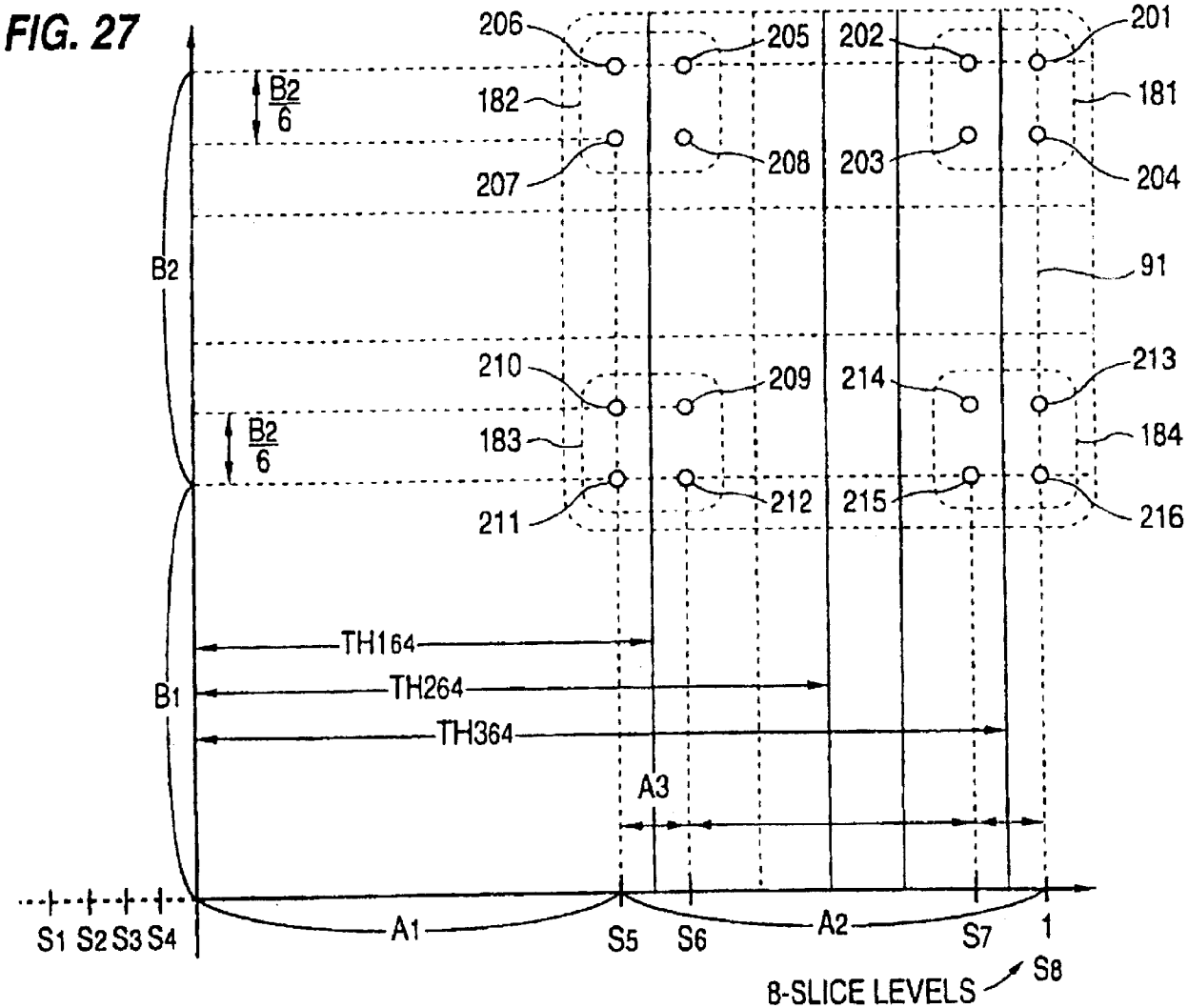
FIG. 27 is a view showing signal points of the modified 64 QAM signal of the first embodiment.

FIG. 27 shows a space diagram of the signal in which the first quadrant contains three different threshold values.

As shown in FIG. 27, when the three normalized threshold values are $TH1_{64}$, $TH2_{64}$, and $TH3_{64}$ they are expressed by:

$$TH1_{64}=(A_1+A_3/2)/(A_1+A_2)$$

$$TH2_{64}=(A_1+A_2/2)/(A_1+A_2) \text{ and}$$

$$TH3_{64}=(A_1+A_2-A_3/2)/(A_1+A_2)$$

Through AM demodulation of a phase detected signal using the three threshold values, the third data stream can be reproduced like the first and second data stream explained with FIG. 21. The third data stream contains e.g. four signal points 201, 202, 203, and 204 at the first sub segment 181 shown in FIG. 23 which represent 4 values of two-bit pattern. Hence, six digits or modified 64 QAM signals can be demodulated.

Figure 28:
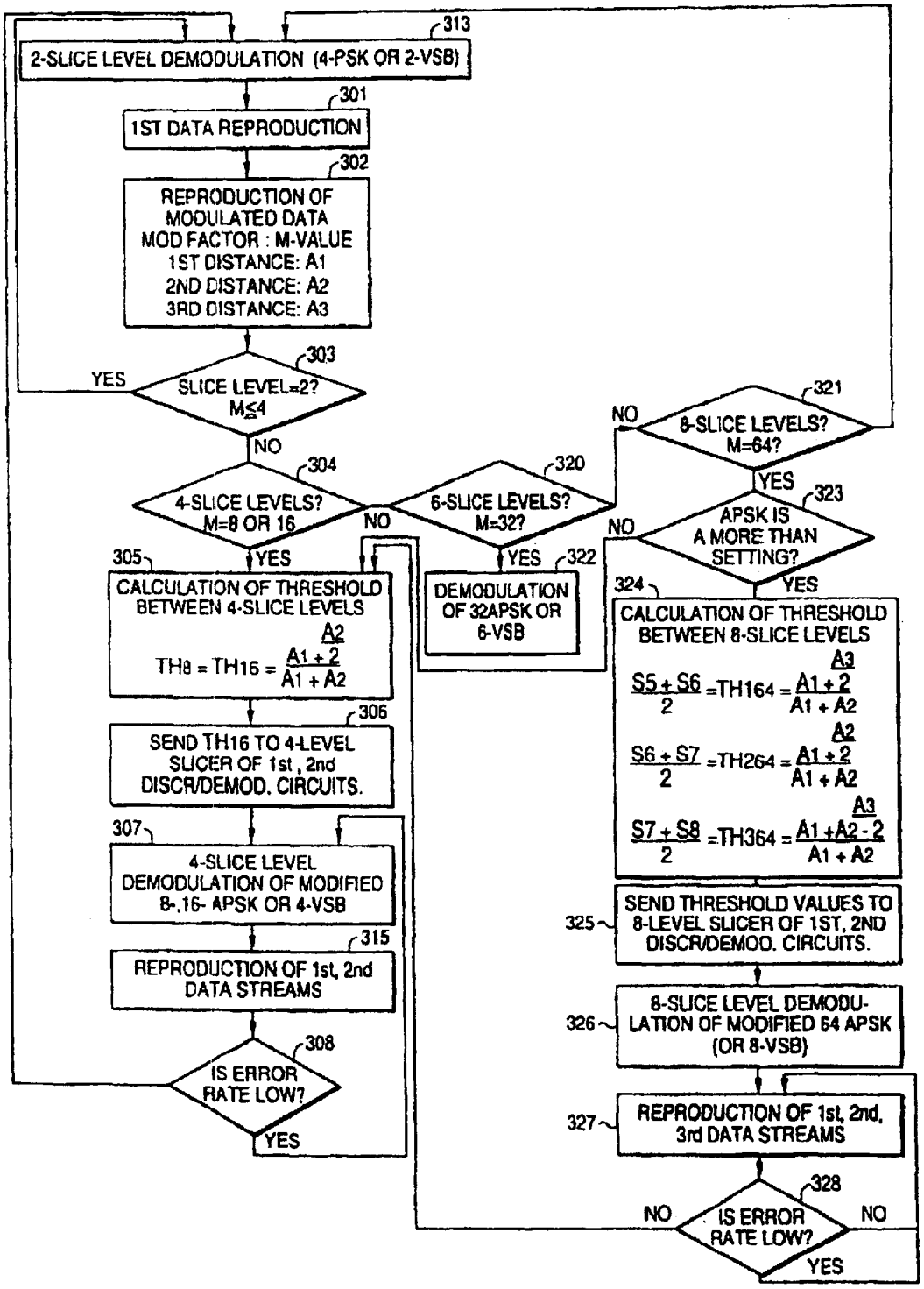
FIG. 28 is a flowchart showing another the operation of the first embodiment.

The demodulated controller 231 detects the value m, $A_1$, $A_2$, and $A_3$ from the demodulation data contained in the first data stream demodulated by the first data stream reproducing unit 232 and calculates the three threshold values $TH1_{64}$, $TH2_{64}$, and $TH3_{64}$ which are then fed to the first 136 and the second discrimination/demodulation circuit 137 so that the modified 64 QAM signal is demodulated with certainty. Also, if the demodulation data have been scrambled, the modified 64 QAM signal can be demodulated only with a specific or subscriber receiver. FIG. 28 is a flowchart showing the action of the demodulation controller 231 for modified 64 QAM signals. The difference from the flowchart for demodulation of 16 QAM shown in FIG. 24 will be explained. The procedure moves from Step 304 to Step 320 where it is determined whether or not m=32 or not. If m=32, demodulation of 32 QAM signals is executed at Step 322. If not, the procedure moves to Step 321 where it is determined whether or not m=64. If yes, $A_3$ is examined at Step 323. If $A_3$ is smaller than a predetermined value, the procedure moves to Step 305 and the same sequence as of FIG. 24 is implemented. If it is judged at Step 323 that $A_3$ is not smaller than the predetermined value, the procedure goes to Step 324 where the threshold values are calculated. At Step 325, the calculated threshold values are fed to the first and second discrimination/demodulation circuits and at Step 326, the demodulation of the modified 64 QAM signal is carried out. Then, the first, second, and third data streams are reproduced at Step 327. At Step 328, the error rate is examined. If the error rate is high, the procedure moves to Step 305 where the 16 QAM demodulation is repeated and if low, the demodulation of the 64 QAM is continued.

The action of carrier wave reproduction needed for execution of a satisfactory demodulating procedure will now be described. The scope of the present invention includes reproduction of the first data stream of a modified 16 or 64 QAM signal using a 4 PSK receiver. However, a common 4 PSK receiver rarely reconstructs carrier waves, thus failing to perform a correct demodulation. For compensation, some arrangements are necessary at both the transmitter and receiver sides.

Two techniques for compensation are provided according to the present invention. A first technique relates to transmission of signal points aligned at angles of $(2n-1)\pi/4$ at intervals of a given time. A second technique offers transmission of signal points arranged at intervals of an angle of $n\pi/8$.

Figure 38:
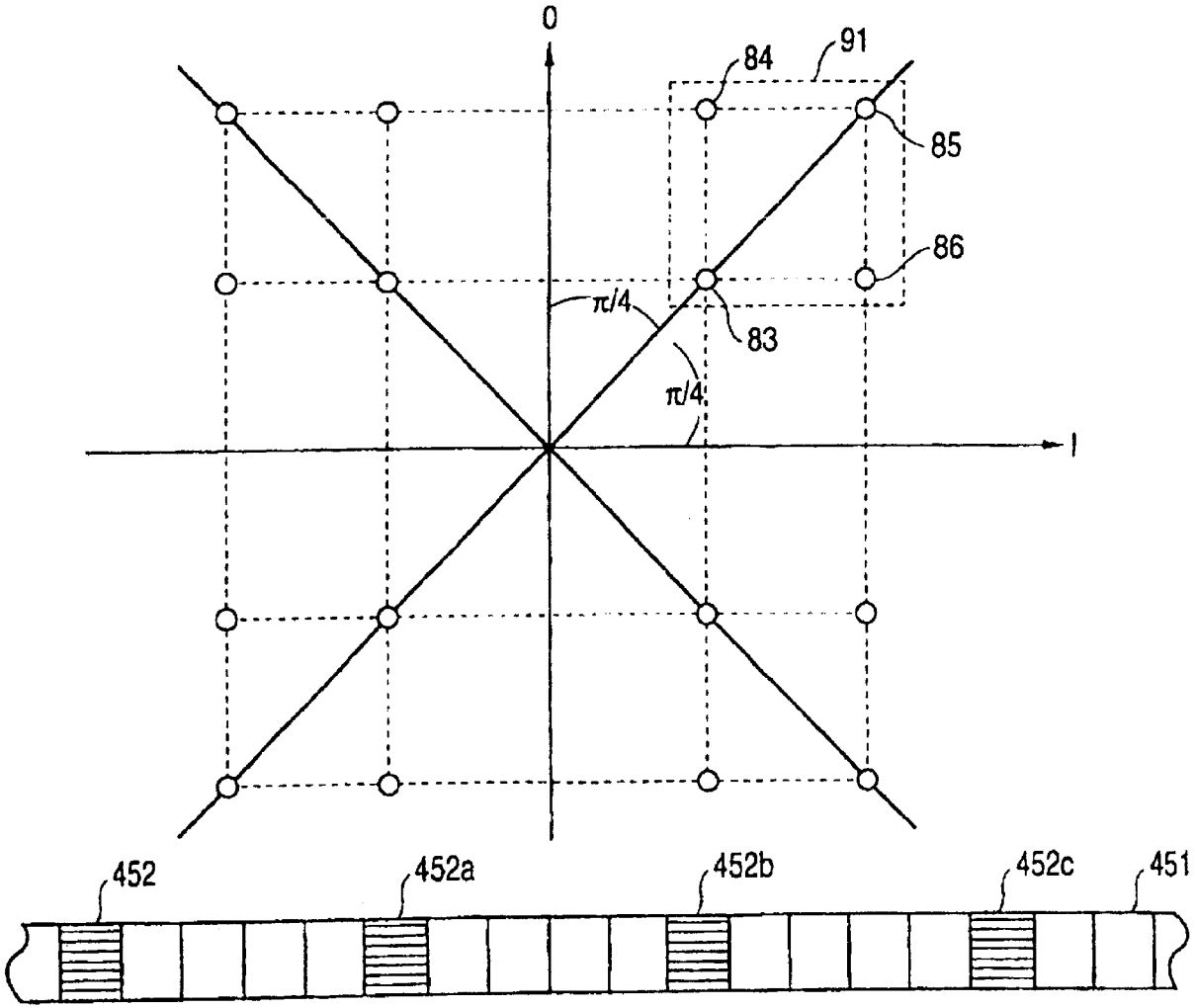
FIG. 38 is a vector diagram of a modified 16 QAM signal of the third embodiment.
Figure 41:
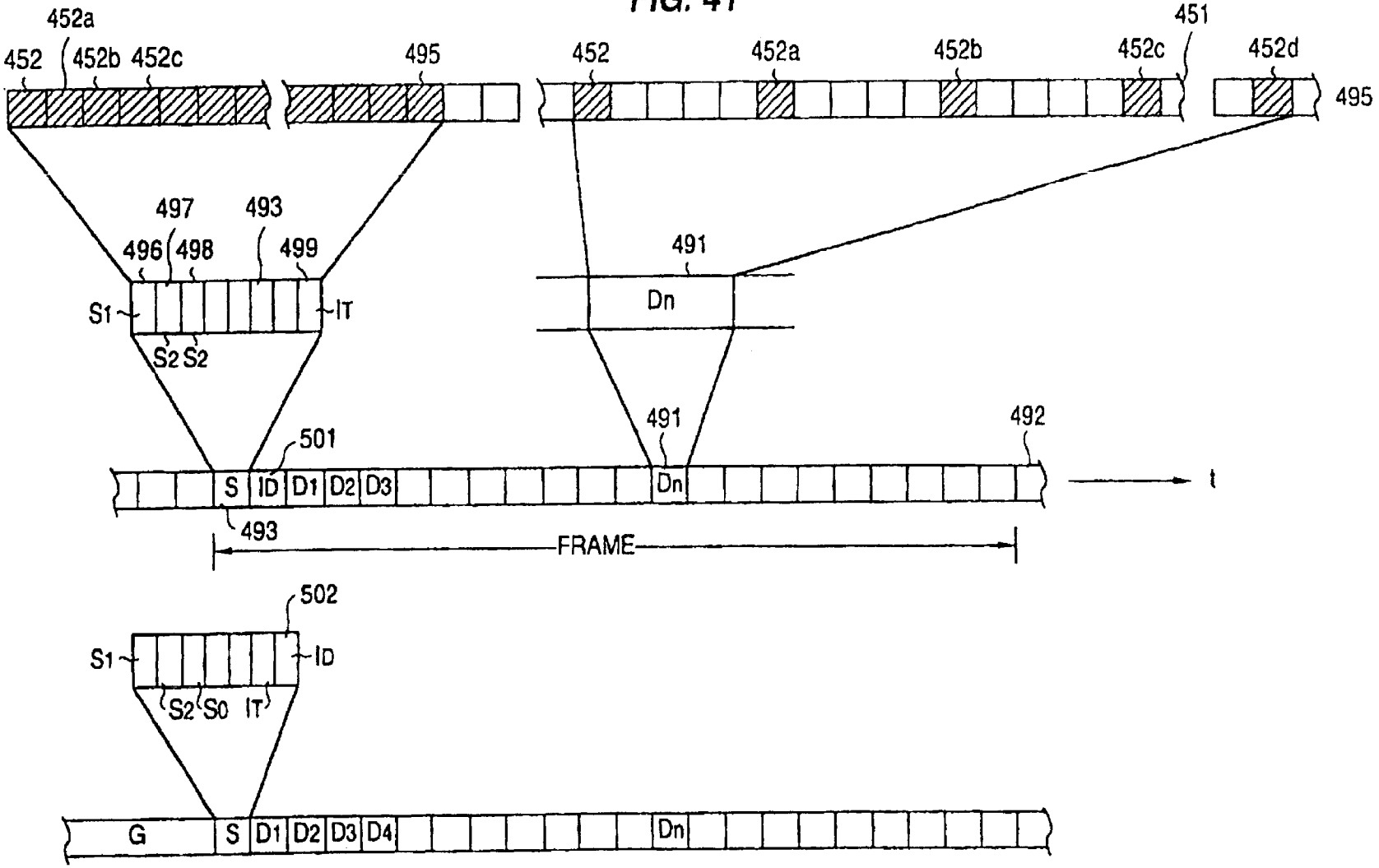
FIG. 41 is a diagram of assignment of data components on a time base according to the third embodiment.

According to the first technique, the eight signal points including 83 and 85 are aligned at angles of $\pi/4$, $3\pi/4$, $5\pi/4$, and $7\pi/4$, as shown in FIG. 38. In action, at least one of the eight signal points is transmitted during sync time slot periods 452, 453, 454, and 455 arranged at equal intervals of time in a time slot gap 451 shown in the time chart of FIG. 38. Any desired signal points are transmitted during the other time slots. The transmitter 1 is also arranged to assign a data for the time slot interval to the sync timing data region 499 of a sync data block, as shown in FIG. 41.

The content of a transmitting signal will be explained in more detail referring to FIG. 41. The time slot group 451 containing the sync time slots 452, 453, 454, and 455 represents a unit data stream or block 491 carrying a data of Dn.

The sync time slots in the signal are arranged at equal intervals of a given time determined by the time slot interval or sync timing data. Hence, when the arrangement of the sync time slots is detected, reproduction of carrier waves will be executed slot by slot through extracting the sync timing data from their respective time slots. Such a sync timing data S is contained in a sync block 493 at the front end of a data frame 492, which consists of a number of sync time slots denoted by the hatching in FIG. 41. Accordingly, the data to be extracted for carrier wave reproduction are increased, thus allowing the 4 PSK receiver to reproduce desired carrier waves at higher accuracy and efficiency.

The sync block 493 comprises sync data regions 496, 497, and 498,—containing sync data S1, S2, and S3,—respectively which include unique words and demodulation data. The phase sync signal assignment region 499 is at the end of the sync block 493, which holds a data of $I_T$ including information about interval arrangement and assignment of the sync time slots.

The signal point data in the phase sync time slot has a particular phase and can thus be reproduced by the 4 PSK receiver. Accordingly, $I_T$ in the phase sync signal assignment region 499 can be retrieved without error thus ensuring the reproduction of carrier waves [at] *with* accuracy.

As shown in FIG. 41, the sync block 493 is followed by a demodulation data block 501 which contains demodulation data about threshold voltages needed for demodulation of the modified multiple-bit QAM signal. This data is essential for demodulation of the multiple-bit QAM signal and may preferably be contained in a region 502 which is a part of the sync block 493 for ease of retrieval.

Figure 42:
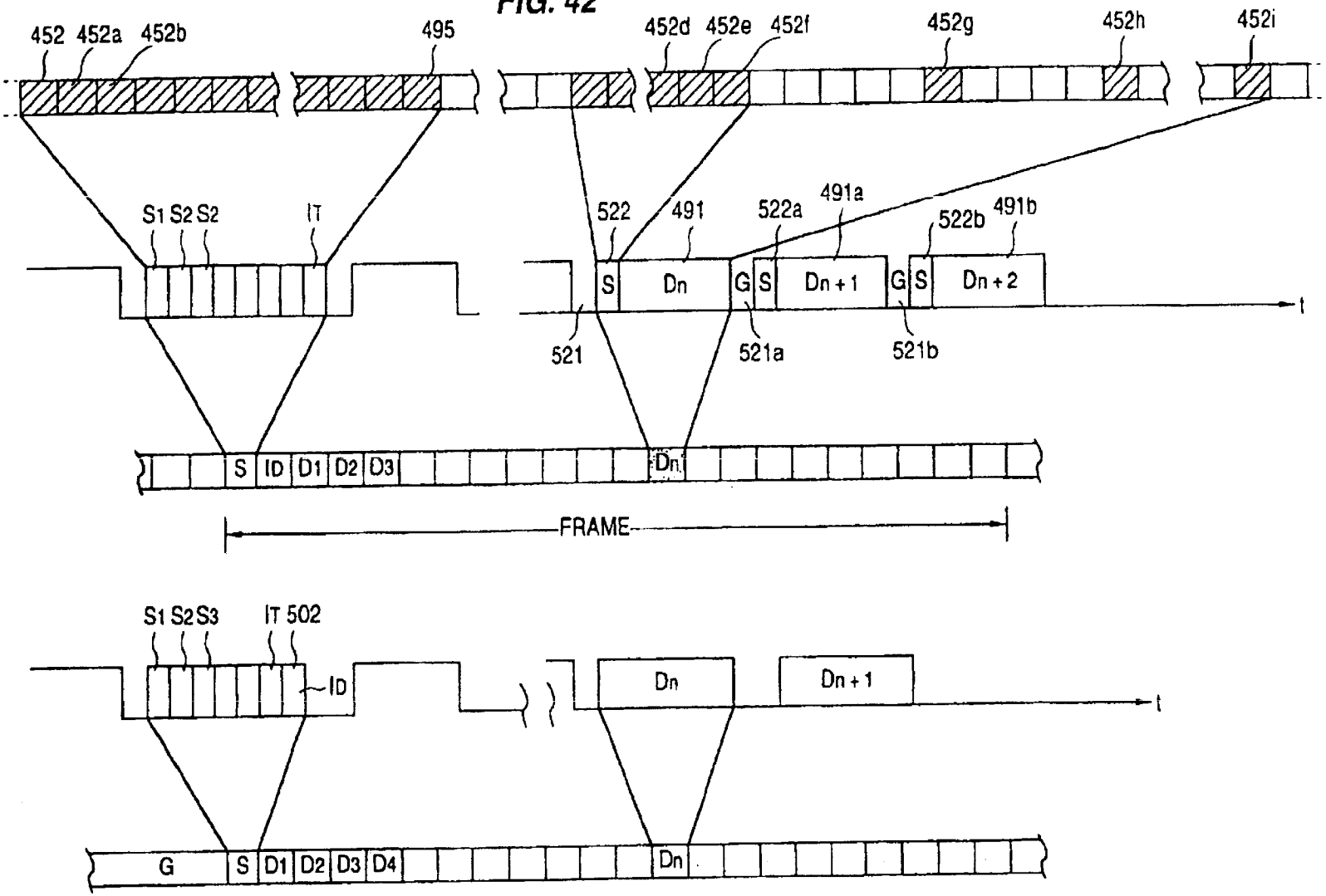
FIG. 42 is a diagram of assignment of data components on a time base in TDMA action according to the third embodiment.

FIG. 42 shows the assignment of signal data for transmission of burst form signals through a TDMA method.

The assignment is distinguished from that of FIG. 41 by the fact that a guard period 521 is inserted between any two adjacent Dn data blocks 491 and 491 for interruption of the signal transmission. Also, each data block 491 is at the front end of a sync region 522, the signal points at a phase of $(2n-1)\pi/4$ are only transmitted. Accordingly, the carrier wave reproduction will be feasible with the 4 PSK receiver. More specifically, the sync signal and carrier waves can be reproduced through the TDMA method.

Figure 43:
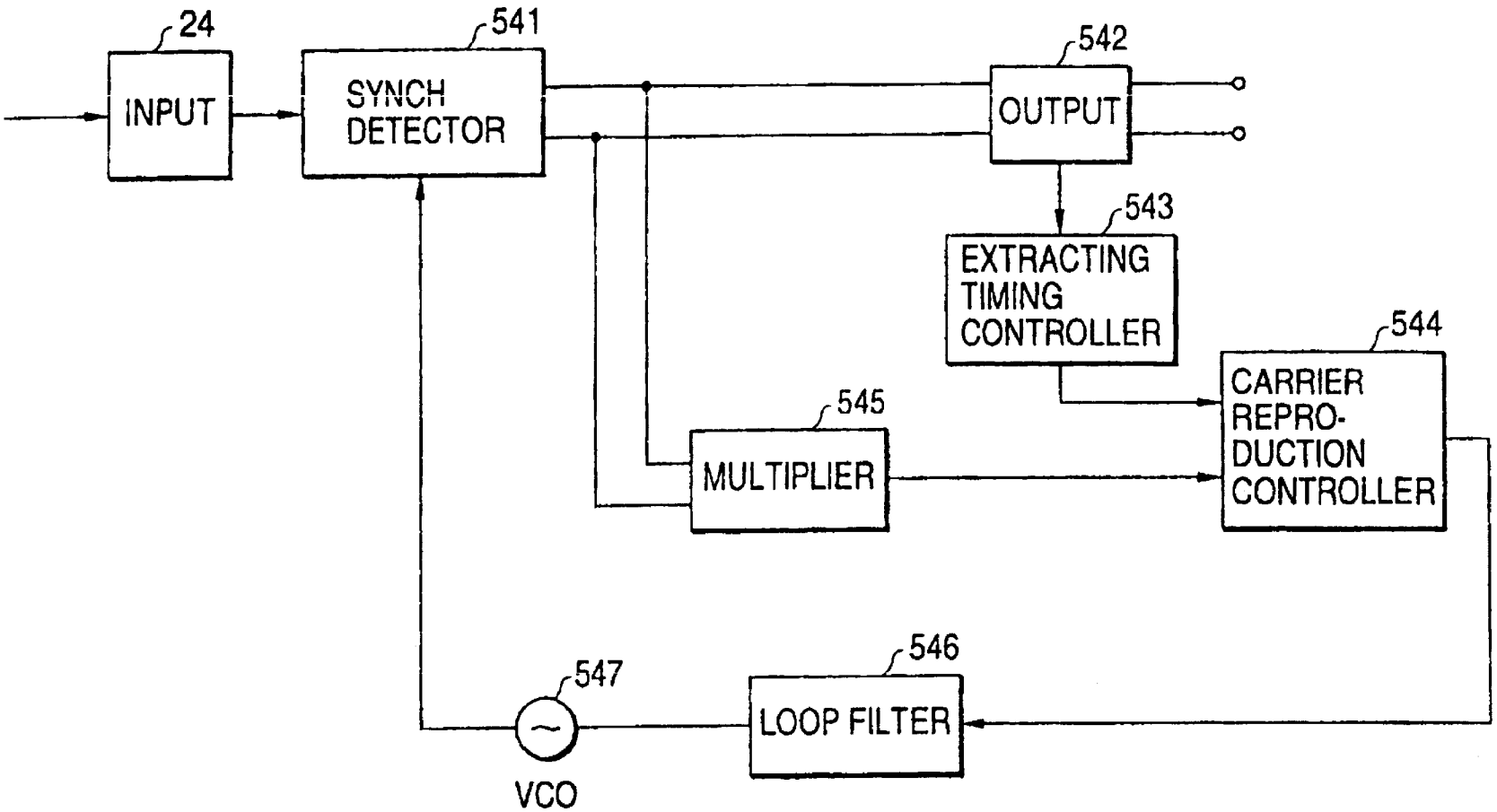
FIG. 43 is a block diagram of a carrier reproducing circuit of the third embodiment.
Figure 44:
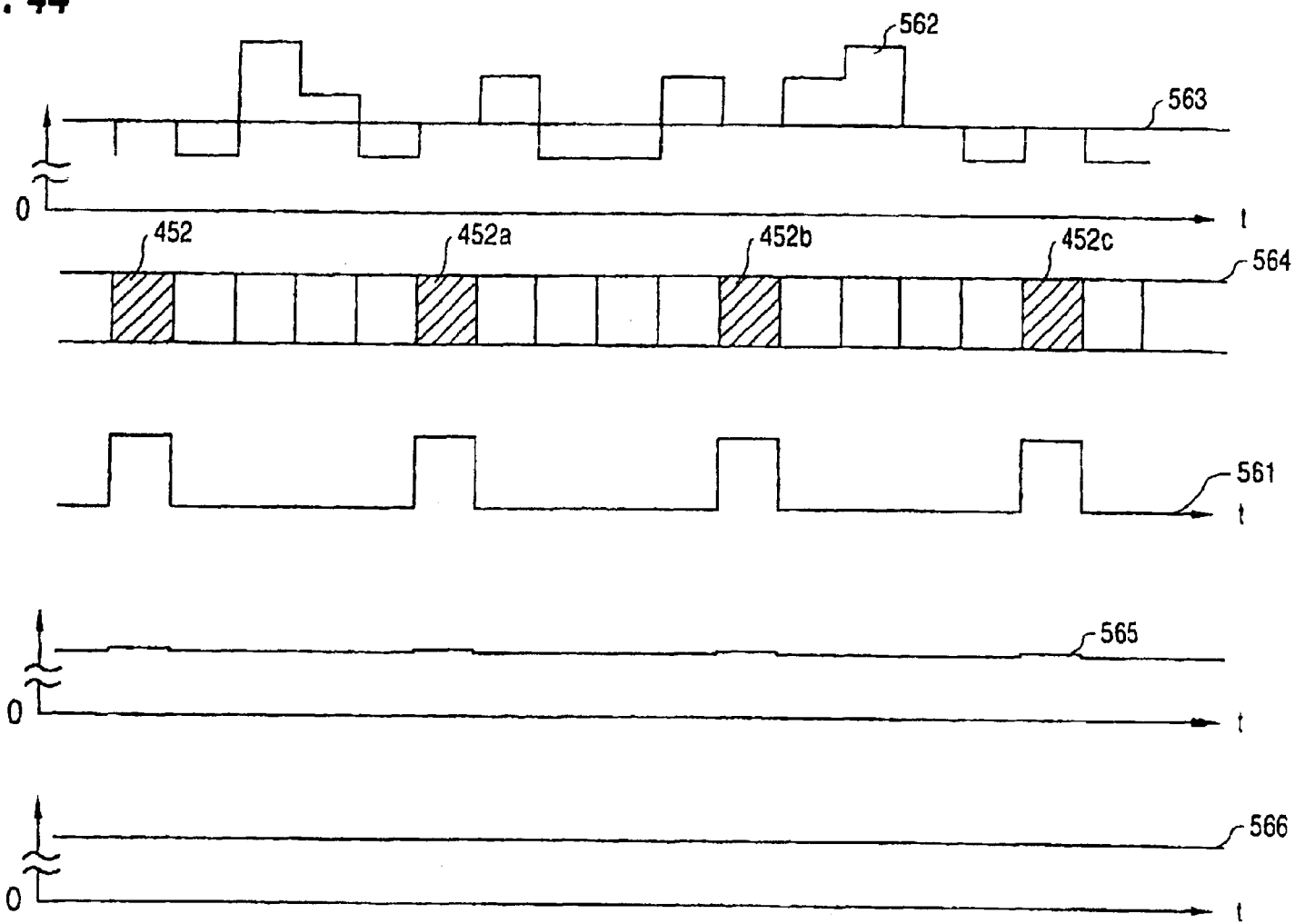
FIG. 44 is a diagram showing the principle of carrier wave reproduction according to the third embodiment.

The carrier wave reproduction of the first receiver 23 shown in FIG. 19 will be explained in more detail referring to FIGS. 43 and 44. As shown *in* FIG. 43, an input signal is fed through the input unit 24 to a sync detector circuit 541 where it is sync detected. A demodulated signal from the sync detector 541 is transferred to an output circuit 542 for reproduction of the first data stream. A data of the phase sync signal assignment data region 499 (shown in FIG. 41) is retrieved by an extracting timing controller circuit 543 so that the timing of sync signals of $(2n-1)\pi/4$ data can be acknowledged and transferred as a phase sync control pulse 561 shown in FIG. 44 to a carrier reproduction controlling circuit 544. Also, the demodulated signal of the sync detector circuit 541 is fed to a frequency multiplier circuit 545 where it is 4× multiplied prior to being transmitted to the carrier reproduction controlling circuit 544. The resultant signal denoted by 562 in FIG. 44 contains true phase data 563 and other data. As illustrated by 564 in the time chart 564 of FIG. 44, the phase sync time slots 452 carrying the $(2n-1)\pi/4$ data are also contained at equal intervals. In the carrier reproducing controlling circuit 544, the signal 562 is sampled by the phase sync control pulse 561 to produce a phase sample signal 565 which is then converted through a sample and hold operation into a phase signal 566. The phase signal 566 of the carrier reproduction controlling circuit 544 is fed through a loop filter 546 to a VCO 547 where its relevant carrier wave is reproduced. The reproduced carrier is then sent to the sync detector circuit 541.

Figure 39:
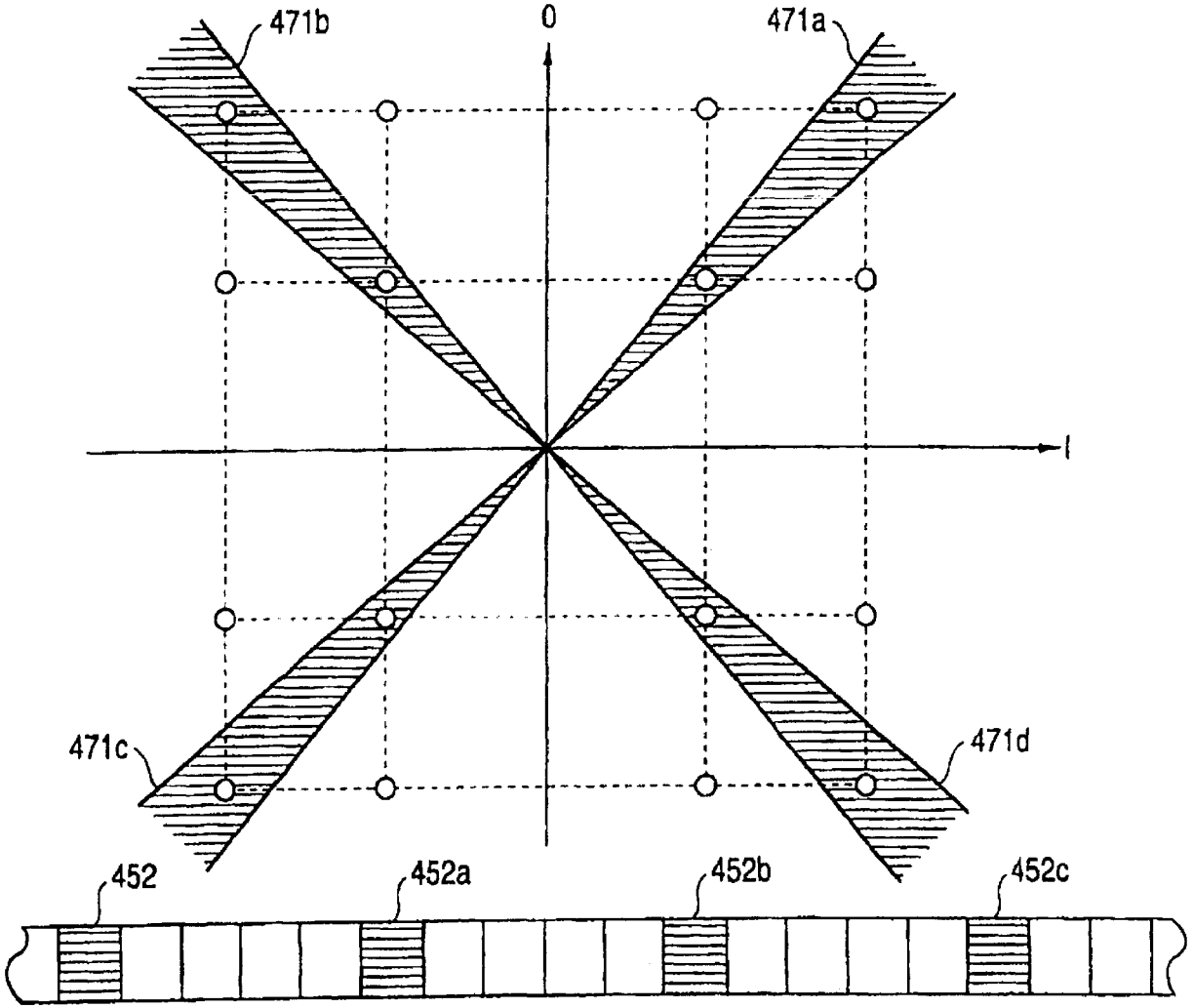
FIG. 39 is a vector diagram of a modified 16 QAM signal of the third embodiment.

In this manner, the signal point data of the $(2n-1)\pi/4$ phase denoted by the shaded areas in FIG. 39 is recovered and utilized so that a correct carrier wave can be reproduced by 4× or 16× frequency multiplication. Although a plurality of phases are reproduced at the time, the absolute phases of the carrier can be successfully be identified using a unique word assigned to the sync region 496 shown in FIG. 41.

Figure 40:
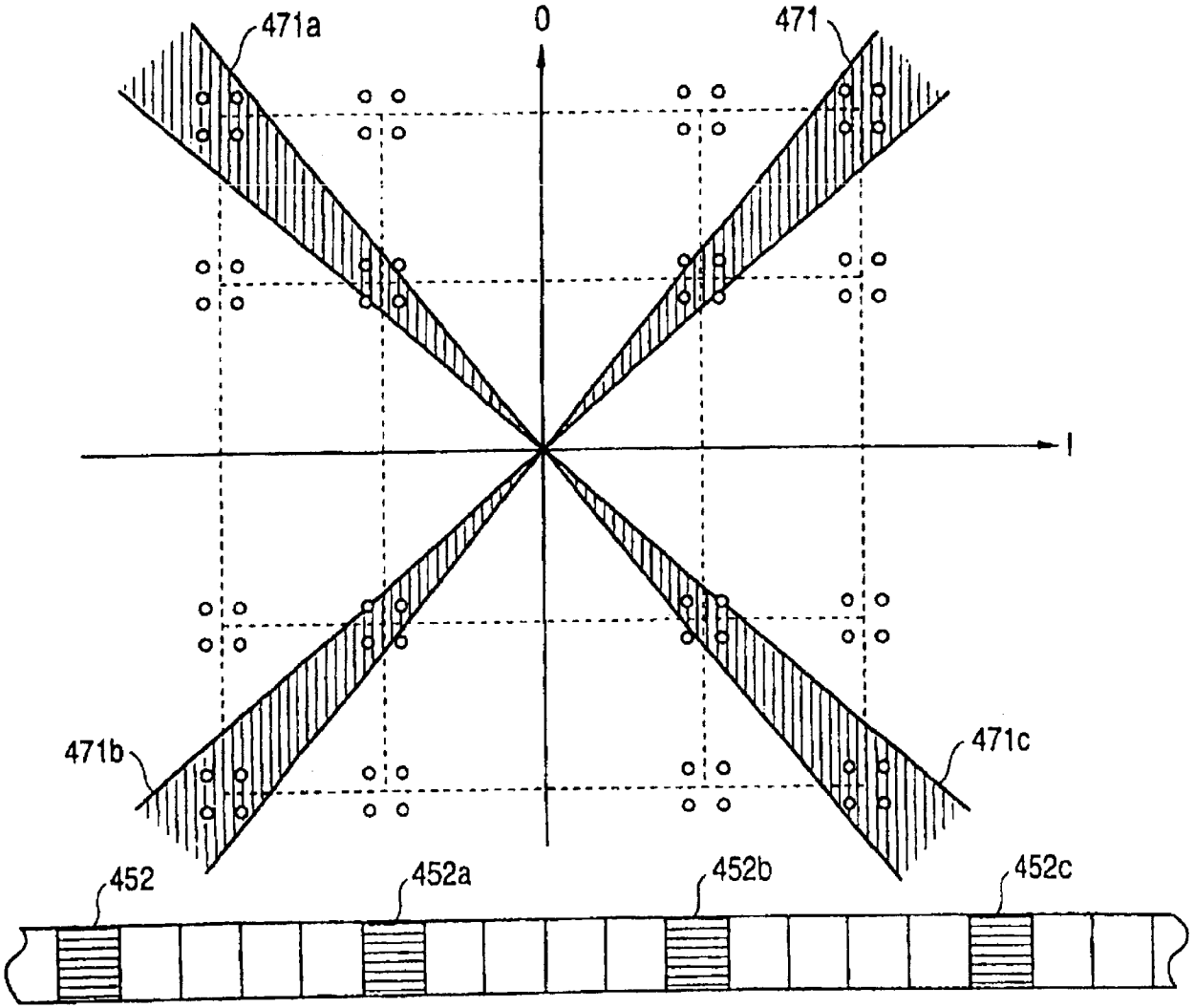
FIG. 40 is a vector diagram of a modified 16 QAM signal of the third embodiment.

For transmission of a modified 64 QAM signal such as shown in FIG. 40, signal points in the phase sync areas 471 at the $(2n-1)\pi/4$ phase denoted by the hatching are assigned to the sync time slots 452, 452b, etc. Its carrier can hardly be reproduced with a common 4 PSK receiver but can be successfully reproduced with the first receiver 23 of 4 PSK mode provided with the carrier reproducing circuit of the embodiment.

The foregoing carrier reproducing is of COSTAS type. A carrier reproducing circuit of the reverse modulation type will now be explained according to the embodiment.

Figure 45:
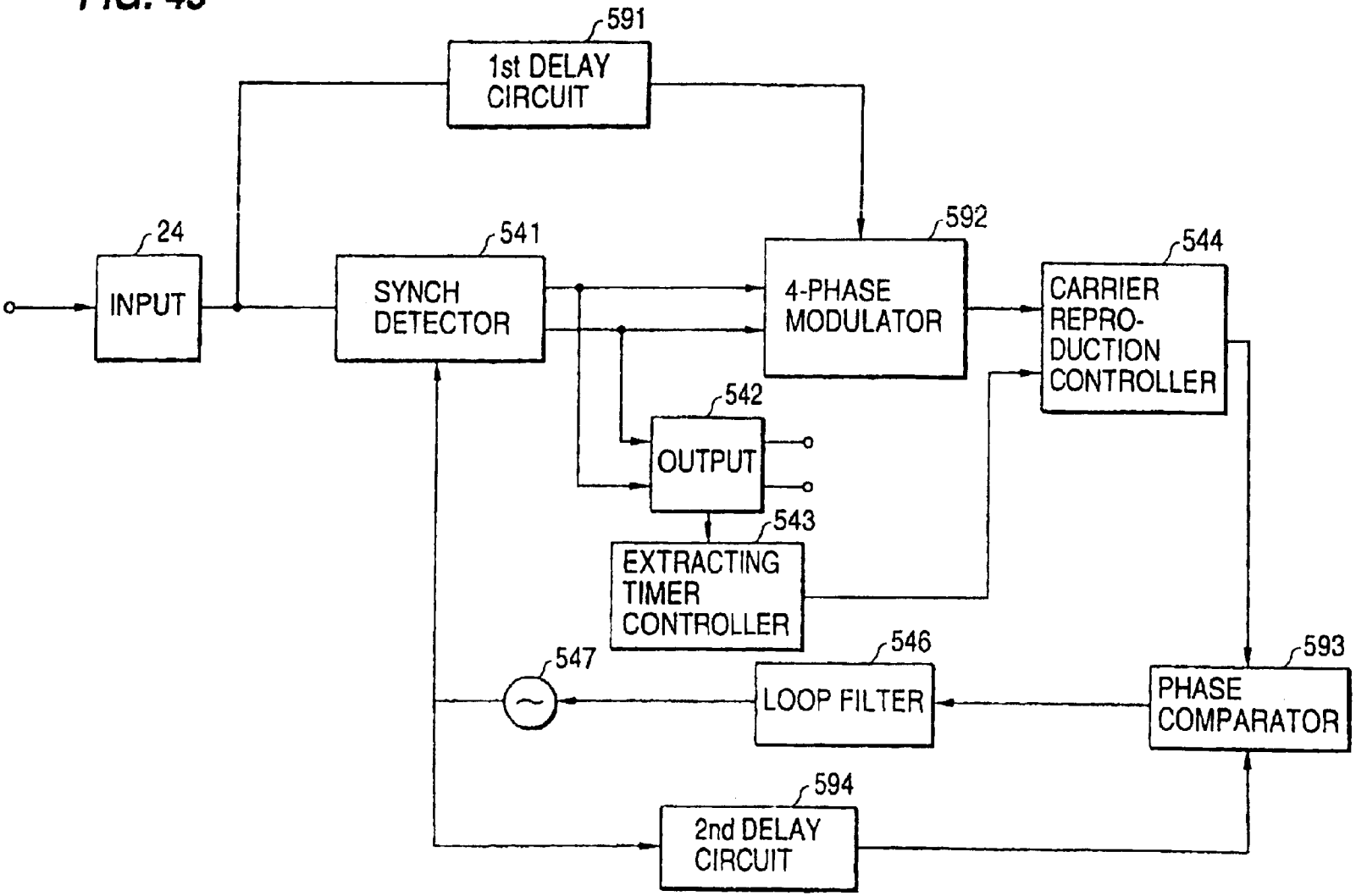
FIG. 45 is a block diagram of a carrier reproducing circuit for reverse modulation of the third embodiment.

FIG. 45 shows a reverse modulation type carrier reproducing circuit according to the present invention, in which a received signal is fed from the input unit 24 to a sync detector circuit 541 for producing a demodulated signal. Also, the input signal is delayed by a first delay circuit 591 to a delay signal. The delay signal is then transferred to a quadrature phase modulator circuit 592 where it is reverse demodulated by the demodulated signal from the sync detector circuit 541 to a carrier signal. The carrier signal is fed through a carrier reproduction controller circuit 544 to a phase comparator 593. A carrier wave produced by a VCO 547 is delayed by a second delay circuit 594 into a delay signal which is also fed to the phase comparator 593. At the phase comparator 593, the reverse demodulated carrier signal is compared in phase with the delay signal thus producing a phase difference signal. The phase difference signal is fed through a loop filter 546 to the VCO 547 which in turn produces a carrier wave arranged in phase with the received carrier wave. In the same manner as of the COSTAS carrier reproducing circuit shown in FIG. 43, an extracting timing controller circuit 543 performs sampling of signal points contained in the hatching areas of FIG. 39. Accordingly, the carrier wave of a 16 or 64 QAM signal can be reproduced with the 4 PSK demodulator of the first receiver 23.

Figure 46:
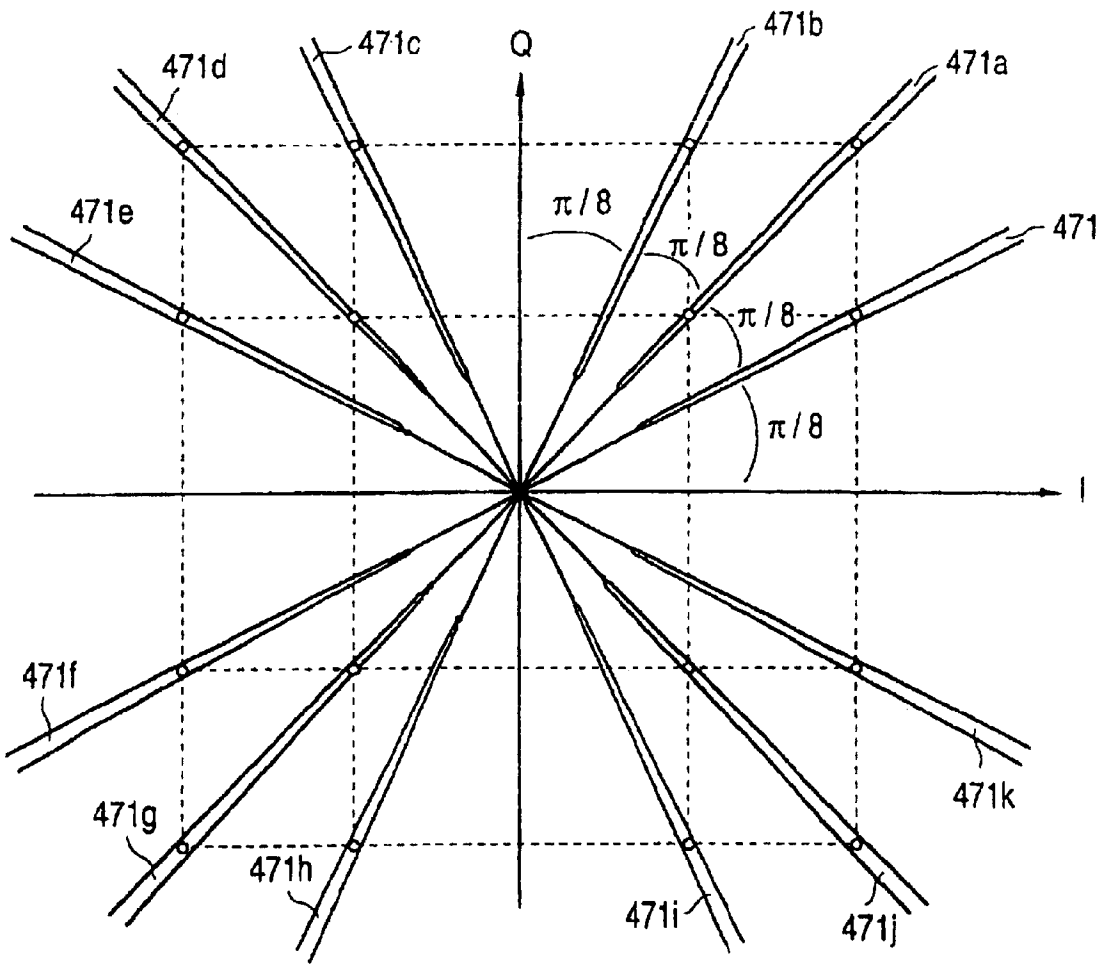
FIG. 46 is a diagram showing an assignment of signal points of the 16 QAM signal of the third embodiment.

The reproduction of a carrier wave by 16× frequency multiplication will be explained. The transmitter 1 shown in FIG. 1 is arranged to modulate and transmit a modified 16 QAM signal with assignment of its signal points at $n\pi/8$ phase as shown in FIG. 46. At the first receiver 23 shown in FIG. 19, the carrier wave can be reproduced with its COSTAS carrier reproduction controller circuit containing a 16× multiplier circuit 661 shown in FIG. 48. The signal points at each $n\pi/8$ phase shown in FIG. 46 are processed at the first quadrant b the action of the 16× multiplier circuit 661, whereby the carrier will be reproduced by the combination of a loop filter 546 and a VCO [541] *547*. Also, the absolute phase may be determined from 16 different phases by assigning a unique word to the sync region.

The arrangement of the 16× multiplier circuit will be explained referring to FIG. 48. A sum signal and a difference signal are produced from the demodulated signal by an adder circuit 662 and a subtractor circuit 663 respectively and then, multiplied together by a multiplier 664 into a cos 2θ signal. Also, a multiplier 665 produces a sin 2θ signal. The two signals are then multiplied by a multiplier 666 into a sin 4θ signal.

Similarly, a sin 8θ signal is produced from the two, sin 2θ and cos 2θ, signals by the combination of an adder circuit 667, a subtracter circuit 668, and a multiplier 670. Furthermore, a sin 16θ signal is produced by the combination of an adder circuit 671, a subtractor circuit 672, and a multiplier 673. Then, the 16× multiplication is completed.

Through the foregoing 16× multiplication, the carrier wave of all the signal points of the modified 16 QAM signal shown in FIG. 46 will successfully be reproduced without extracting particular signal points.

Figure 47:
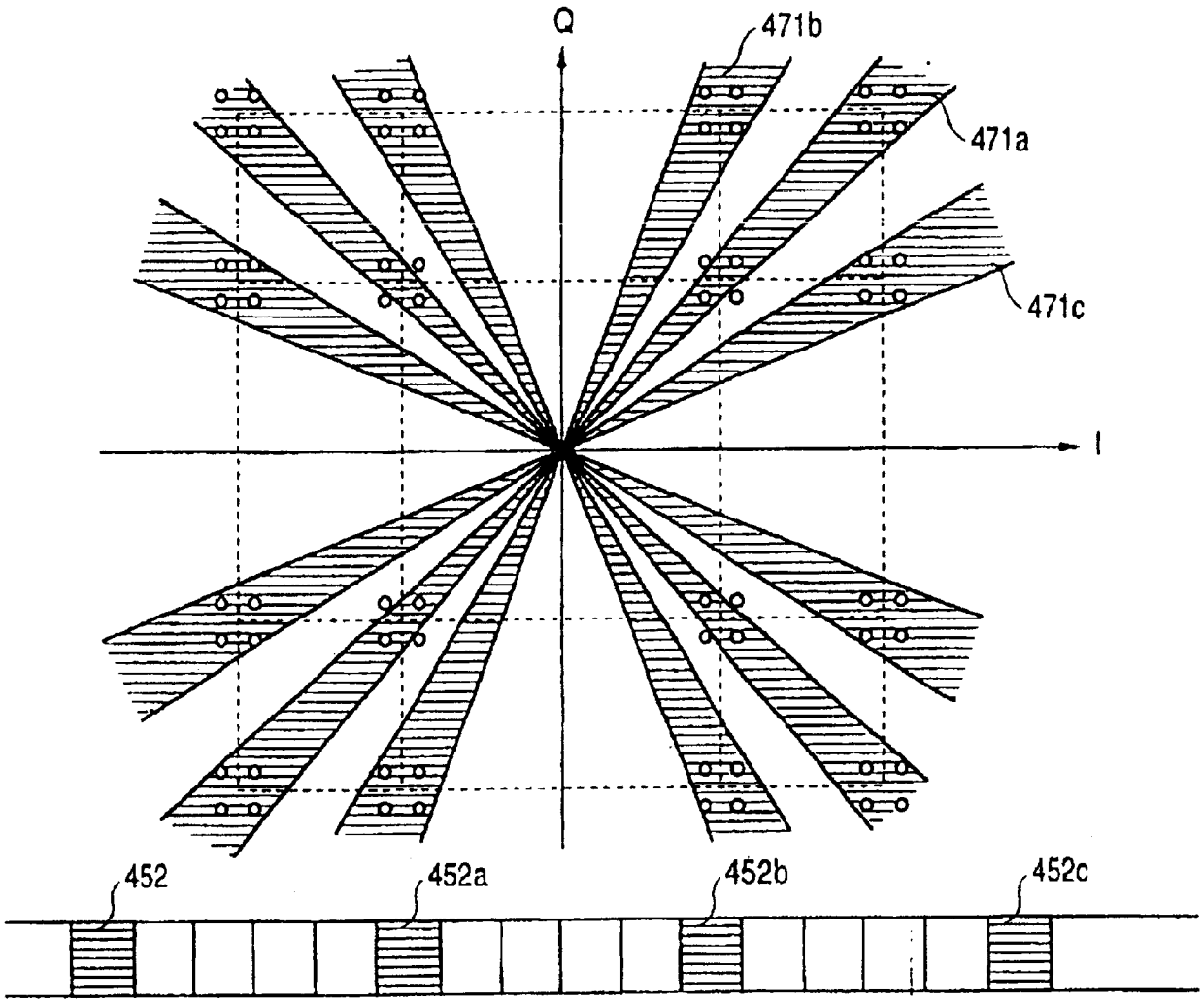
FIG. 47 is a diagram showing an assignment of signal points of the 64 QAM signal of the third embodiment.

However, reproduction of the carrier wave of the modified 64 QAM signal shown in FIG. 47 can involve an increase in the error rate due to dislocation of some signal points from the sync areas 471.

Two techniques are known for compensation for the consequences. One is inhibiting transmission of the signal points dislocated from the sync areas. This causes the total amount of transmitted data to be reduced but allows the arrangement to be facilitated. The other is providing the sync time slots as described in FIG. 38. In more particular, the signal point in the $n\pi/8$ sync phase areas, e.g. 471 and 471a, are transmitted during the period of the corresponding sync time slots in the time slot group 451. This triggers an accurate synchronizing action during the period thus minimizing phase error.

As now understood, the 16x multiplication allows the simple 4 PSK receiver to reproduce the carrier wave of a modified 16 or 64 QAM signal. Also, the insertion of the sync time slots causes the phasic accuracy to be increased during the reproduction of carrier waves from a modified 64 QAM signal.

As set forth above, the signal transmission system of the present invention is capable of transmitting a plurality of data on a single carrier wave simultaneously in the multiple signal level arrangement.

More specifically, three different level receivers which have discrete characteristics of signal intercepting sensitivity and demodulating capability are provided in relation to one single transmitter so that any one of them can be selected depending on a wanted data size to be demodulated which is proportional to the price. When the first receiver of low resolution quality and low price is acquired together with a small antenna, its owner can intercept and reproduce the first data stream of a transmission signal. When the second receiver of medium resolution quality and medium price is acquired together with a medium antenna, its owner can intercept and reproduce both the first and second data streams of the signal. When the third receiver of high resolution quality and high price is acquired with a large antenna, its owner can intercept and reproduce all the first, second, and third data streams of the signal.

If the first receiver is a home-use digital satellite broadcast receiver of low price, it will overwhelmingly be welcome by a majority of viewers. The second receiver accompanied with the medium antenna costs more and will be accepted by not common viewers but particular people who want to enjoy HDTV services. The third receiver accompanied with the large antenna at least before the satellite output is increased, is not appropriate for home use and will possibly be used in relevant industries. For example, the third data stream carrying super HDTV signals is transmitted via a satellite to subscriber cinemas which can thus play video tapes rather than traditional movie films and run movies at low cost.

When the present invention is applied to a TV signal transmission service, three different quality pictures are carried on one signal channel wave and will offer compatibility with each other. Although the first embodiment refers to a 4 PSK, a modified 8 QAM, a modified 16 QAM, and a modified 64 QAM signal, other signals will also be employed with equal success including a 32 QAM, a 256 QAM, an 8 PSK, [and] a 16 PSK, *and* a 32 PSK signal. It would be understood that the present invention is not limited to a satellite transmission system and can be applied to a terrestrial communications system or a cable transmission system.

Figure 58:
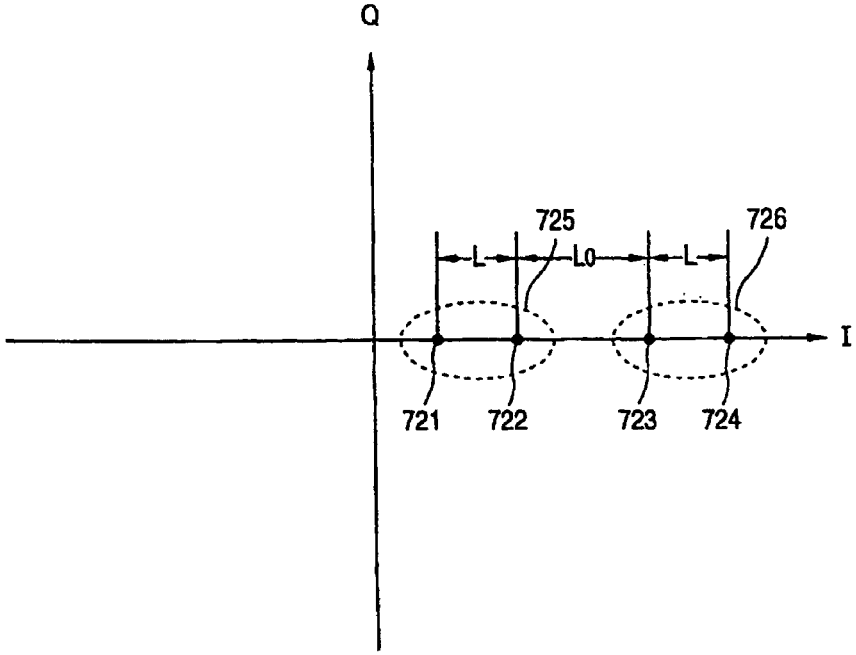
FIG. 58 is a diagram showing another assignment of signal points of the modified 4 ASK signal of the fifth embodiment.
Figure 68C:
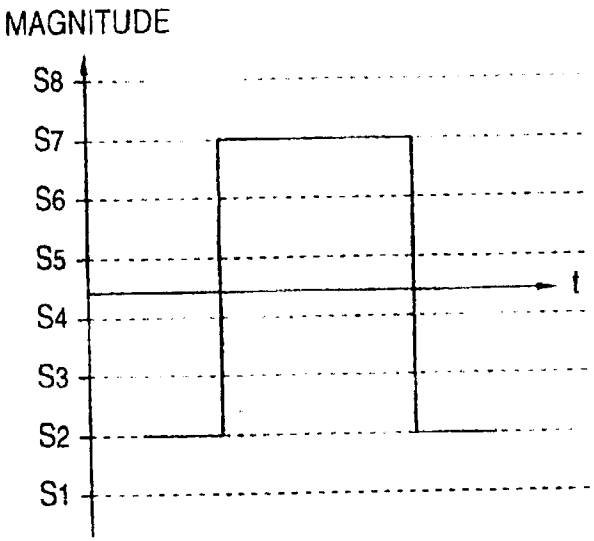
FIG. 68(c) is an 8-level VSB signal-time waveform diagram in the fifth and sixth embodiments of the invention.
Figure 68A:
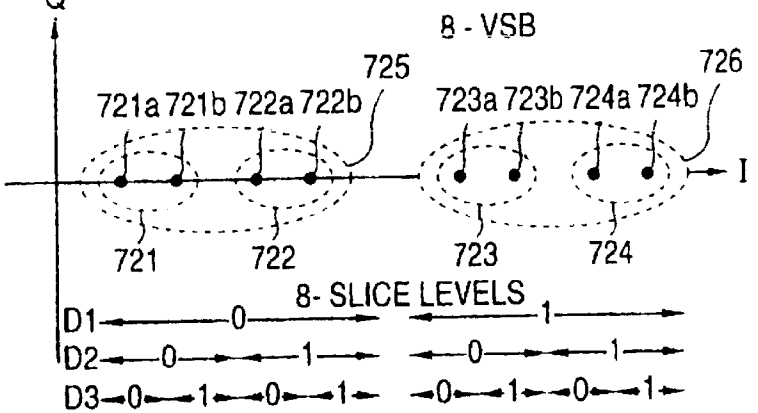
FIG. 68(a) is an 8-level VSB constellation map in the fifth and sixth embodiments of the invention.

The transmission method of the invention can also be applied to a 4-level or 8-level ASK signal as shown in FIG. 58 and FIGS. 68(a) and (b), respectively.

EMBODIMENT 2

A second embodiment of the present invention is featured in which the physical multi-level arrangement of the first embodiment is divided into small levels through e.g. discrimination in error correction capability, thus forming a logic multi-level construction. In the first embodiment, each multi-level channel has different levels in the [electrical]0 *electric* signal amplitude or physical demodulating capability. The second embodiment offers different levels in the logic reproduction capability such as error correction. For example, the data $D_1$ in a multi-level channel is divided into two, $D_{1-1}$ and $D_{1-2}$, components and $D_{1-1}$ is more increased in the error correction capability than $D_{1-2}$ for discrimination. Accordingly, as the error detection and correction capability is different between $D_{1-1}$ and $D_{1-2}$ at demodulation, $D_{1-1}$ can successfully be reproduced within a given error rate when the C/N level of an original transmitting signal is as low as disenabling the reproduction of $D_{1-2}$. This will be implemented using the logic multi-level arrangement.

More specifically, the logic multi-level arrangement consists of dividing data of a modulated multi-level channel and discriminating distances between error correction codes by mixing error correction codes with product codes for varying error correction capability. Hence, a more multi-level signal can be transmitted.

In fact, a $D_{1-1}$ channel is divided into two sub channels $D_1$ and $D_{1-2}$ and a $D_2$ channel is divided into two sub channels $D_{2-1}$ and $D_{2-2}$.

Figure 85:
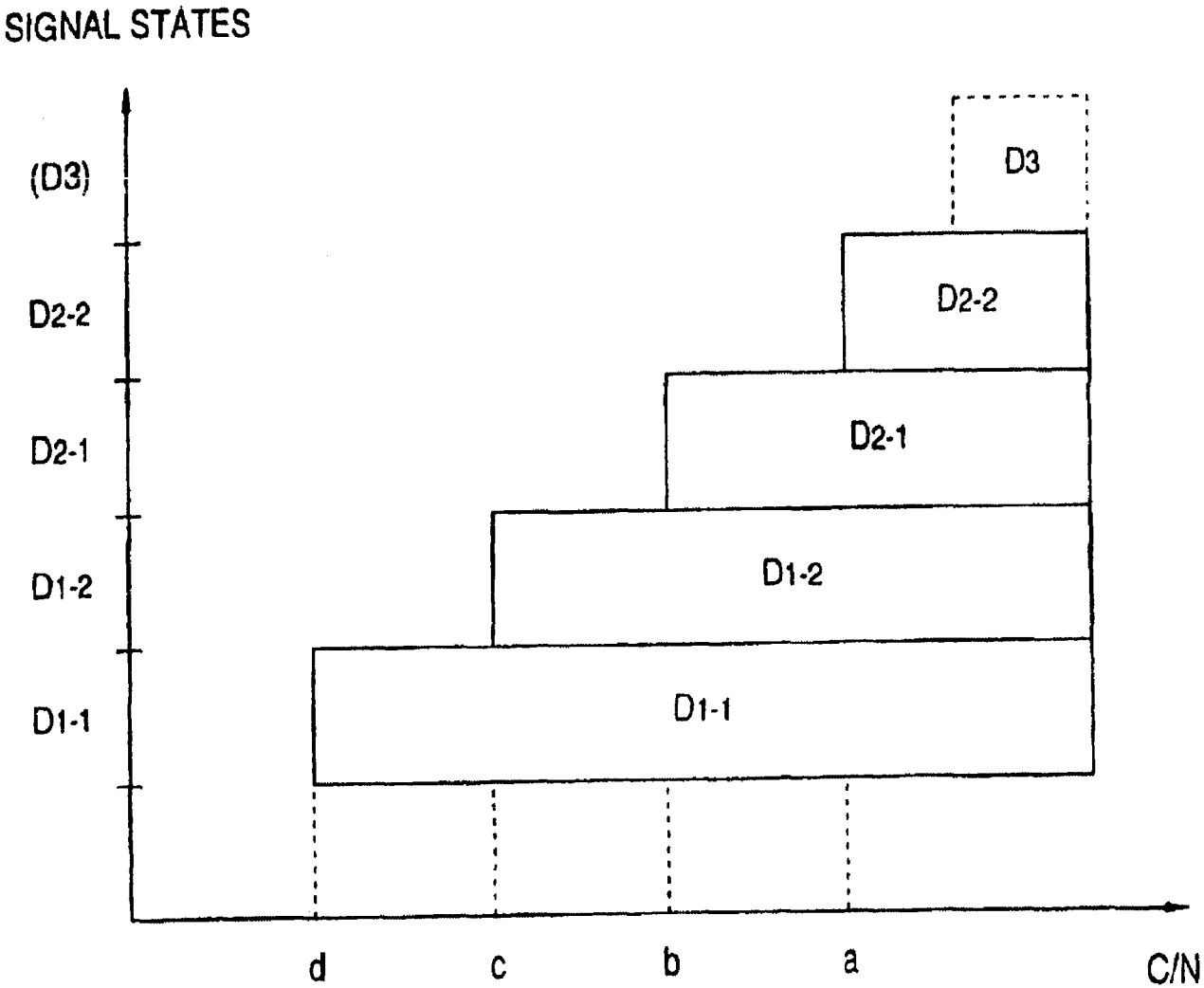
FIG. 85 is a graphic diagram showing the relationship between C/N and level according to the second embodiment.
Figure 86:
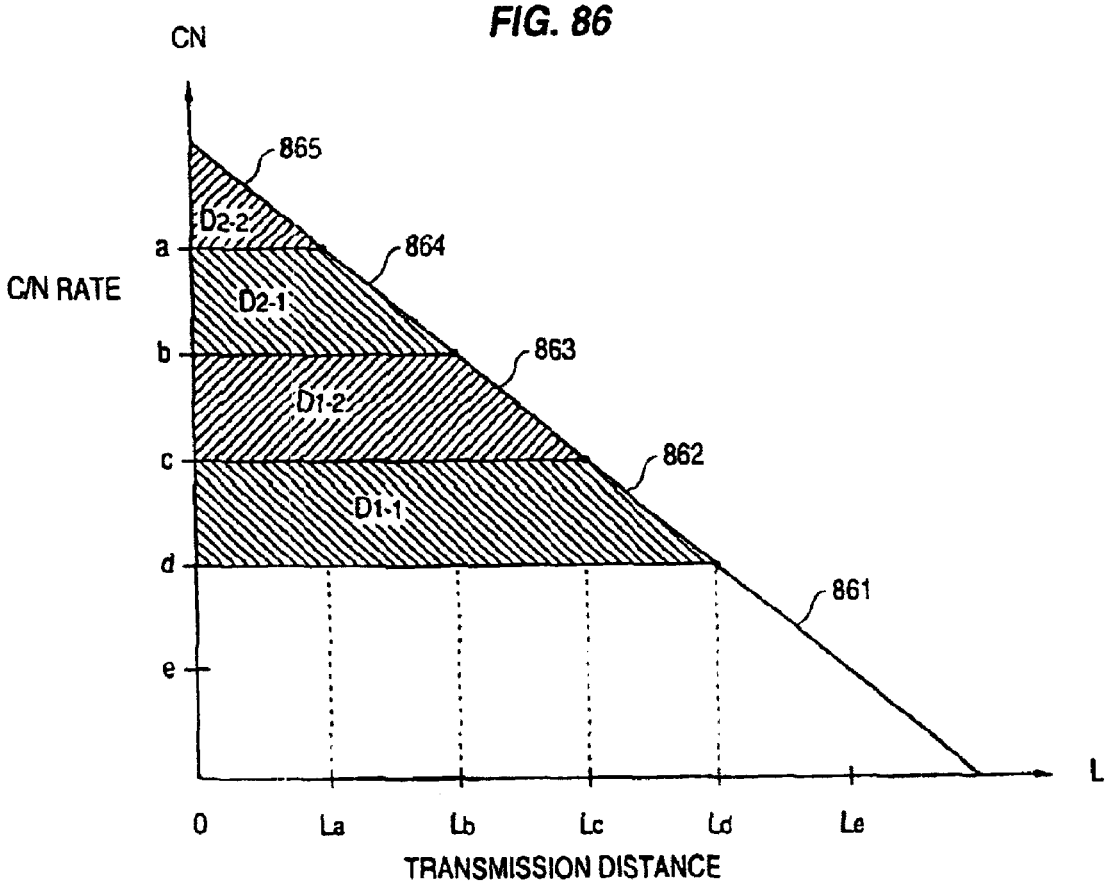
FIG. 86 is a graphic diagram showing the relationship between C/N and transmission distance according to the second embodiment.

This will be explained in more detail referring to FIG. [87] *85* in which $D_{1-1}$ is reproduced from a lowest C/N signal. If the C/N rate is d at minimum, three components $D_{1-2}$, $D_{2-1}$ and $D_{2-2}$ cannot be reproduced while $D_{1-1}$ is reproduced. If C/N is not less than c, $D_{1-2}$ can also be reproduced. Equally, when C/N is b, $D_{2-1}$ is reproduced and when C/N is a, $D_{2-2}$ is reproduced. As the C/N rate increases, the reproducible signal levels are increased in number. The lower the C/N, the fewer the reproducible signal levels. This will be explained in the form of relationship between transmitting distance and reproducible C/N value referred to FIG. 86. In common, the C/N value of a received signal is decreased in proportion to the distance of transmission as expressed by the real line 861 in FIG. 86. It is now assumed that the distance from a transmitter antenna to a receiver antenna is La when C/N=a, Lb when C/N=b, Lc when C/N=c, Ld when C/N=d, and Le when C/N=e. If the distance from the transmitter antenna is greater than Ld, $D_{1-1}$ can be reproduced as shown in FIG. 85 where the receivable area 862 is denoted by the hatching. In other words, $D_{1-1}$ can be reproduced within a most extended area. Similarly, $D_{1-2}$ can be reproduced in an area 863 when the distance is not more than Lc. In this area 863 containing the area 862, $D_{1-1}$ can with no doubt be reproduced. In a small area [854] *864*, $D_{2-1}$ can be reproduced and in a smallest area 865, $D_{2-2}$ can be reproduced. As understood, the different data levels of a channel can be reproduced corresponding to degrees of declination in the C/N rate. The logic multi-level arrangement of the signal transmission system of the present invention can provide the same effect as of a traditional analogue transmission system in which the amount of receivable data is gradually lowered as the C/N rate decreases.

Figure 87:
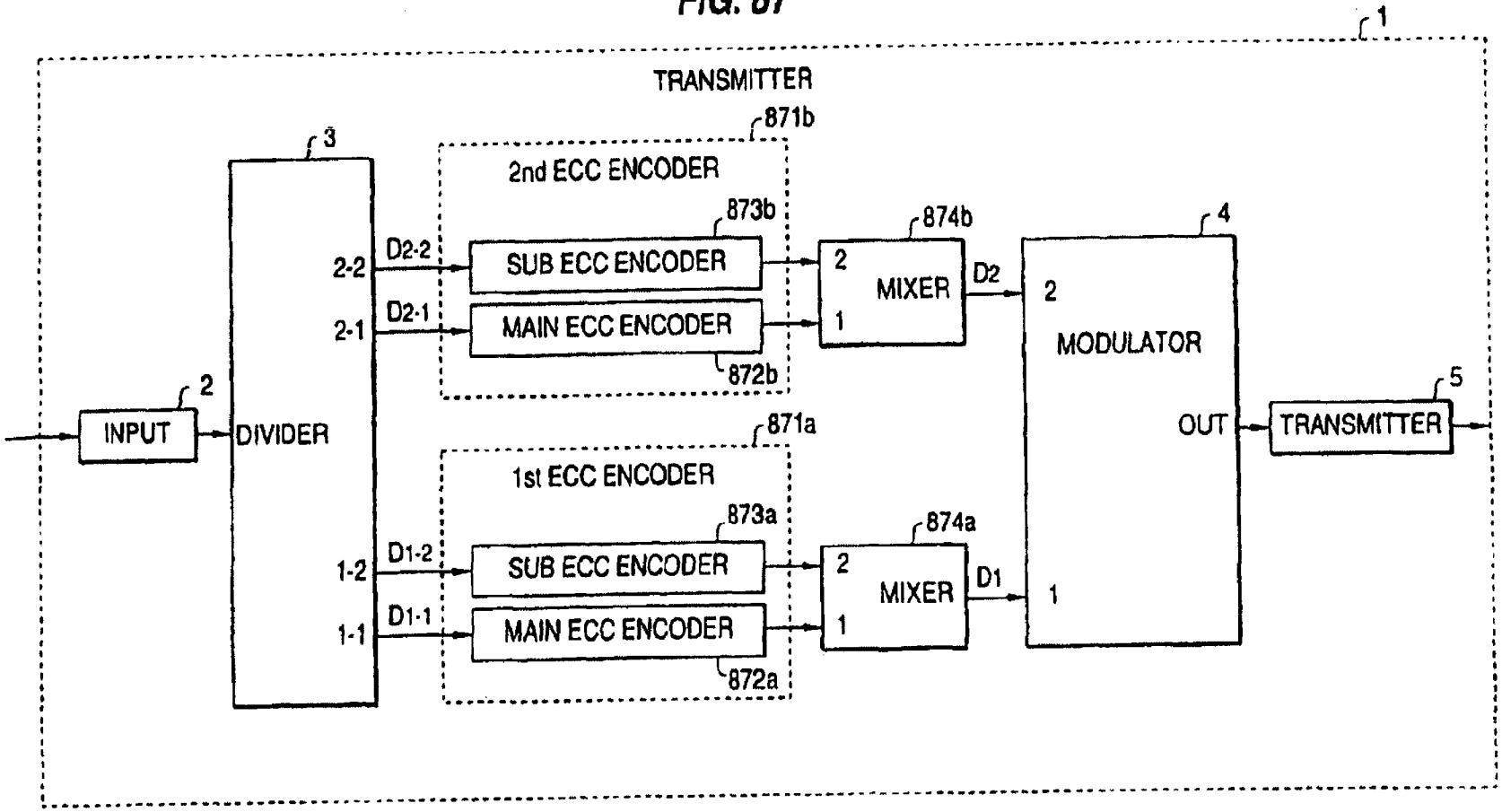
FIG. 87 is a block diagram of a [transmission] *transmitter* of the second embodiment.

The construction of the logic multi-level arrangement will be described in which there are provided two physical levels and two logic levels. FIG. 87 is a block diagram of a transmitter 1 which is substantially identical in construction to that shown in FIG. 2 and described previously in the first embodiment and will not be further explained in detail. The only difference is that error correction code encoders are added as abbreviated to ECC encoders. The divider circuit 3 has four outputs 1-1, 1-2, 2-1, and 2-2 through which four signals $D_{1-1}$, $D_{1-2}$, $D_{2-1}$, and $D_{2-2}$ divided from an input signal are delivered. The two signals $D_{1-1}$ and $D_{1-2}$ are fed to two, main and sub, ECC encoders 872a and 873a of a first ECC encoder 871a respectively for converting to error correction code forms.

The main ECC encoder 872a has a higher error correction capability than that of the sub ECC encoder 873a. Hence, $D_{1-1}$ can be reproduced at a lower rate of C/N than $D_{1-2}$ as apparent from the CN-level diagram of FIG. 85. More particularly, the logic level of $D_{1-1}$ is less affected by declination of the C/N than that of $D_{1-2}$. After error correction code encoding, $D_{1-1}$ and [$D_{2-2}$] $D_{1-2}$ are summed by a summer 874a to a $D_1$ signal which is then transferred to the modulator 4. The other two signals $D_{2-1}$ and $D_{2-2}$ of the divider circuit 3 are error correction encoded by two, main and sub, ECC encoders [872 b] *872b* and 873b of a second ECC encoder 871b respectively and then, summed by a summer 874b to a $D_2$ signal which is transmitted to the modulator 4. The main ECC encoder 872b is higher in the error correction capability than the sub ECC encoder 873b. The modulator 4 in turn produces from the two, $D_1$ and $D_2$, input signals a multi-level modulated signal which is further transmitted from the transmitter unit 5. As understood, the output signal from the transmitter 1 has two physical levels $D_1$ and $D_2$ and also, four logic levels $D_{1-1}$, $D_{1-2}$, $D_{2-1}$, and $D_{2-2}$ based on the two physical levels for providing different error correction capabilities.

Figure 88:
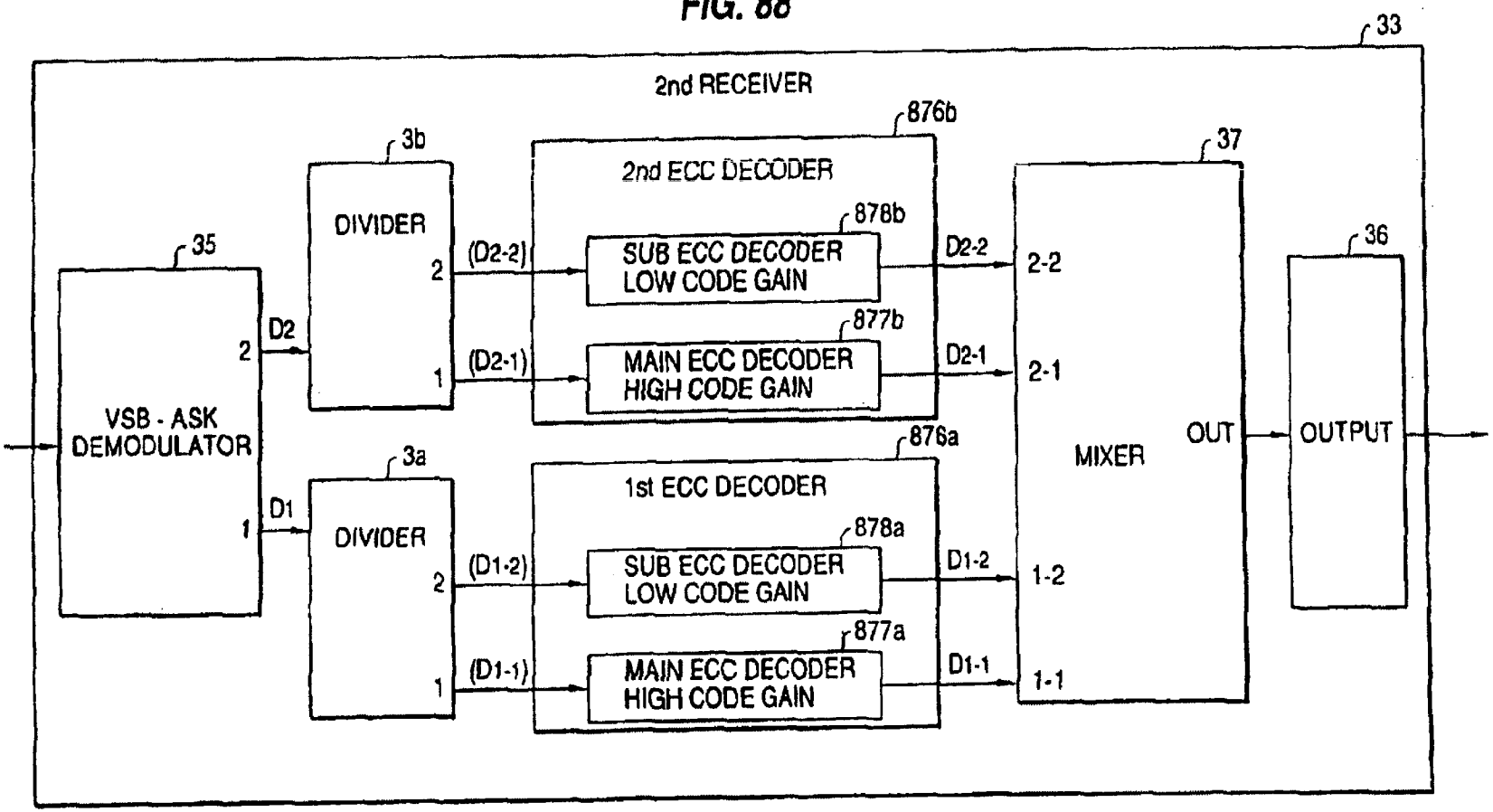
FIG. 88 is a block diagram of a receiver of the second embodiment.

The reception of such a multi-level signal will be [expelained] *explained*. FIG. 88 is a block diagram of a second receiver 33 which is almost identical in construction to that shown in FIG. 21 and described in the first embodiment. The second receiver 33 arranged for intercepting multi-level signals from the transmitter 1 shown in FIG. 87 further comprises first and second ECC decoder 876a, 876b, in which the demodulation of QAM, or any of ASK, PSK, and FSK if desired, is executed.

As shown in FIG. 88, a receiver signal is demodulated by the demodulator 35 to the two, $D_1$ and $D_2$, signals which are then fed to two dividers 3a and 3b respectively where they are divided into four logic levels $D_{1-1}$, $D_{1-2}$, $D_{2-1}$, and $D_{2-2}$. The four signals are transferred to the first and second ECC decoders 876a and 876b in which $D_{1-1}$ is error corrected by a main ECC decoder 877a, $D_{1-2}$ by a sub ECC decoder 878a, $D_{2-1}$ by a main ECC decoder 877b, $D_{2-2}$ by a sub ECC decoder 878b before all *being* sent to the summer 37. In the mixer 37, the four $D_{1-1}$, $D_{1-2}$, $D_{2-1}$, and $D_{2-2}$, error corrected signals are combined into a signal which is then delivered from the output unit 36.

Since $D_{1-1}$ and $D_{2-2}$ are higher in the error correction capability than $D_{1-2}$ and $D_{2-2}$ respectively, the error rate remains less than a given value although C/N is fairly low as shown in FIG. 85 and thus, an original signal will be reproduced successfully.

The action of discriminating the error correction capability between the main ECC decoders 877a and 877b of high code gain and the sub ECC decoders 878a and 878b of low code gain will now be described in more detail. It is a good idea for having a difference in the error correction capability, i.e., in the code gain, to use in the sub ECC decoder a common coding technique, e.g. Reed-Solomon or BCH method, as shown in FIG. 165(b) for the ECC decoder, having a standard code distance and in [%he] *the* main ECC decoder, another encoding technique in which distance between correction codes is increased using Reed-Solomon codes, their product codes, or other long-length codes or a trellis decoder 744p, 744q, and 744r shown in FIGS. 128(d), 128(e), 128(f). A variety of known techniques for increasing the error correction code distance have been introduced and will not be explained in detail. The present invention can be associated with any known technique for having the logic multi-level arrangement.

Also, as shown in the block diagram of FIGS. 160 and 167, the transmitter further has an interleaver 744k and the receiver further has de-interleavers 759k and 936b. The interleave process is carried out by the use of the Interleave Table 954 shown in FIG. 168(a). De-interleave RAM 936x in the de-interleaver 936b is used for decoding the data. By this arrangement, the data transmission system having high reliability with respect to the burst error can be realized, resulting in stable transmitted images.

Figure 89:
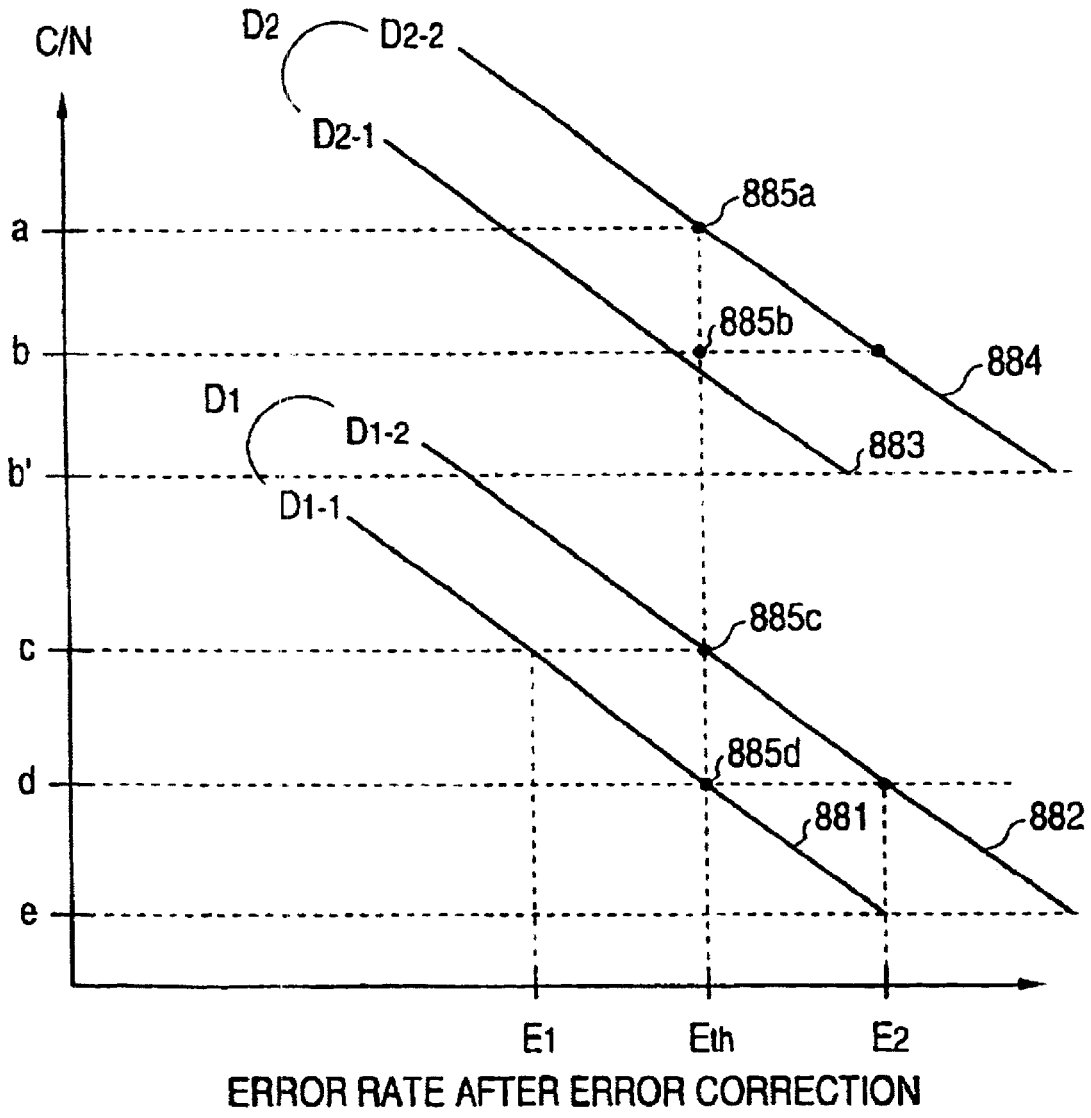
FIG. 89 is a graphic diagram showing the relationship between C/N and error rate according to the second embodiment.

The logic multi-level arrangement will be explained in [conjuction] *conjunction* with a diagram of FIG. 89 showing the relationship between C/N and error [race] *rate* after error correction. As shown, the straight line 881 represents $D_{1-1}$ at the C/N and error rate relation and the line 882 represents $D_{1-2}$ at same.

As the C/N rate of an input signal decreases, the error rate increases after error correction. If C/N is lower than a given value, the error rate exceeds a reference value Eth determined by the system design standards and no original data will normally be reconstructed. When C/N is lowered to less than e, the $D_1$ signal fails to be reproduced as expressed by the line 881 of $D_{1-1}$ in FIG. 89. When $e \leqq C/N < d$, $D_{1-1}$ of the $D_1$ signal exhibits a higher error rate than Eth and will not be reproduced.

When C/N is d at the point 885d, $D_{1-1}$ having a higher error correction capability than $D_{1-2}$ becomes not higher in the error rate than Eth and can be reproduced. At the time, the error rate of $D_{1-2}$ remains higher than Eth after error correction and will no longer be reproduced.

When C/N is increased up to c at the point 885c, $D_{1-2}$ becomes not higher in the error rate than Eth and can be reproduced. At the time, $D_{2-1}$ and $D_{2-2}$ remain in no demodulation state. After the C/N rate is increased further to b', the $D_2$ signal becomes ready to be demodulated.

When C/N is increased to b at the point 885b, $D_{2-1}$ of the $D_2$ signal becomes not higher in the error rate than Eth and can be reproduced. At the time, the error rate of $D_{2-2}$ remains higher than Eth and will not be reproduced. When C/N is increased up to a at the point 885a, $D_{2-2}$ becomes not higher than Eth and can be reproduced.

As described above, the four different signal logic levels divided from two, $D_1$ and $D_2$, physical levels through discrimination of the error correction capability between the levels, can be transmitted simultaneously.

Using the logic multi-level arrangement of the present invention with a multi-level construction in which at least a part of the original signal is reproduced even if data in a higher level is lost, digital signal transmission will successfully be executed without losing the advantageous effect of an analogue signal transmission in which transmitting data is gradually decreased as the C/N rate becomes low.

[Thanking] *Thanks* to up-to-date compression techniques, compressed image data can be transmitted in the logic multi-level arrangement for enabling a receiver station to reproduce a higher quality image than that of an analogue system and also, with not sharply but at steps declining the signal level for ensuring signal interception in a wider area. The present invention can provide an extra effect of the multi-layer arrangement which is hardly implemented by a known digital signal transmission system without deteriorating high quality image data.

In addition, the address data of the image segment data, the base image data for image compression, the scramble cancellation data shown in the descrambler (FIG. 66), and high priority (HP) data, i.e., the data (e.g., the frame synchronization signal and header) that is most essential to image expansion of the HDTV signal, is transmitted as $D_{1-1}$ by the high code gain ECC encoder 743a (FIGS. 88, 133, 170, and 172), and is received by the high code gain ECC decoder 758 of the receiver 43.

Figure 68B:
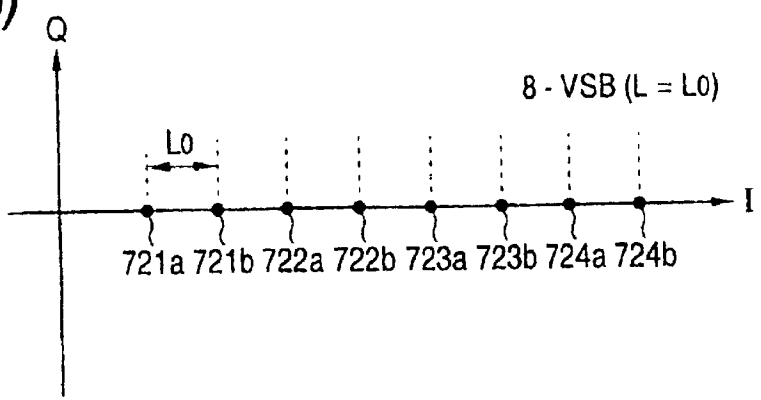
FIG. 68(b) is an 8-level VSB constellation map in the fifth and sixth embodiments of the invention.

This high priority data is protected because the error rate of priority data $D_{1-1}$ does not increase noticeably. Fatal deterioration of the characteristic image quality of digital video transmissions is thus avoided, and a "graceful degradation" effect whereby image quality gradually deteriorates is obtained. The modulator 749 and demodulator 760 of FIGS. 133 and 170, respectively, can achieve this graceful degradation effect with 16-level QAM and 32-level QAM described above, 4-level VSB (FIG. 57) and 8-level VSB (FIG. 68) described below in the description of the fourth embodiment, and 8-level PSK.

Furthermore, as shown in the block diagrams of FIGS. 133 and 156, a big difference in the error rate of high priority data and low priority data can be created during signal reception by applying high code gain error correction coding of the high priority data by means of the ECC encoder 744a and trellis encoder 744b in the 2nd data stream input 744, while error correction encoding the low priority data with low code gain by the ECC encoder 743a only.

As a result, even if the C/N ratio of the transmission system deteriorates significantly, the high priority data can be received. Therefore, while the image quality deteriorates with the deterioration of the low priority data, the high priority data can also be reproduced in applications subject to severe C/N ratio deterioration, as found in the reception conditions encountered with mobile television receivers, and the pixel block positioning information is also reproduced. Because image block destruction is thus prevented, viewers are still able to receive and view broadcast programming under extremely poor reception conditions.

EMBODIMENT 3

A third embodiment of the present invention will be described referring to the relevant drawings.

Figure 29:
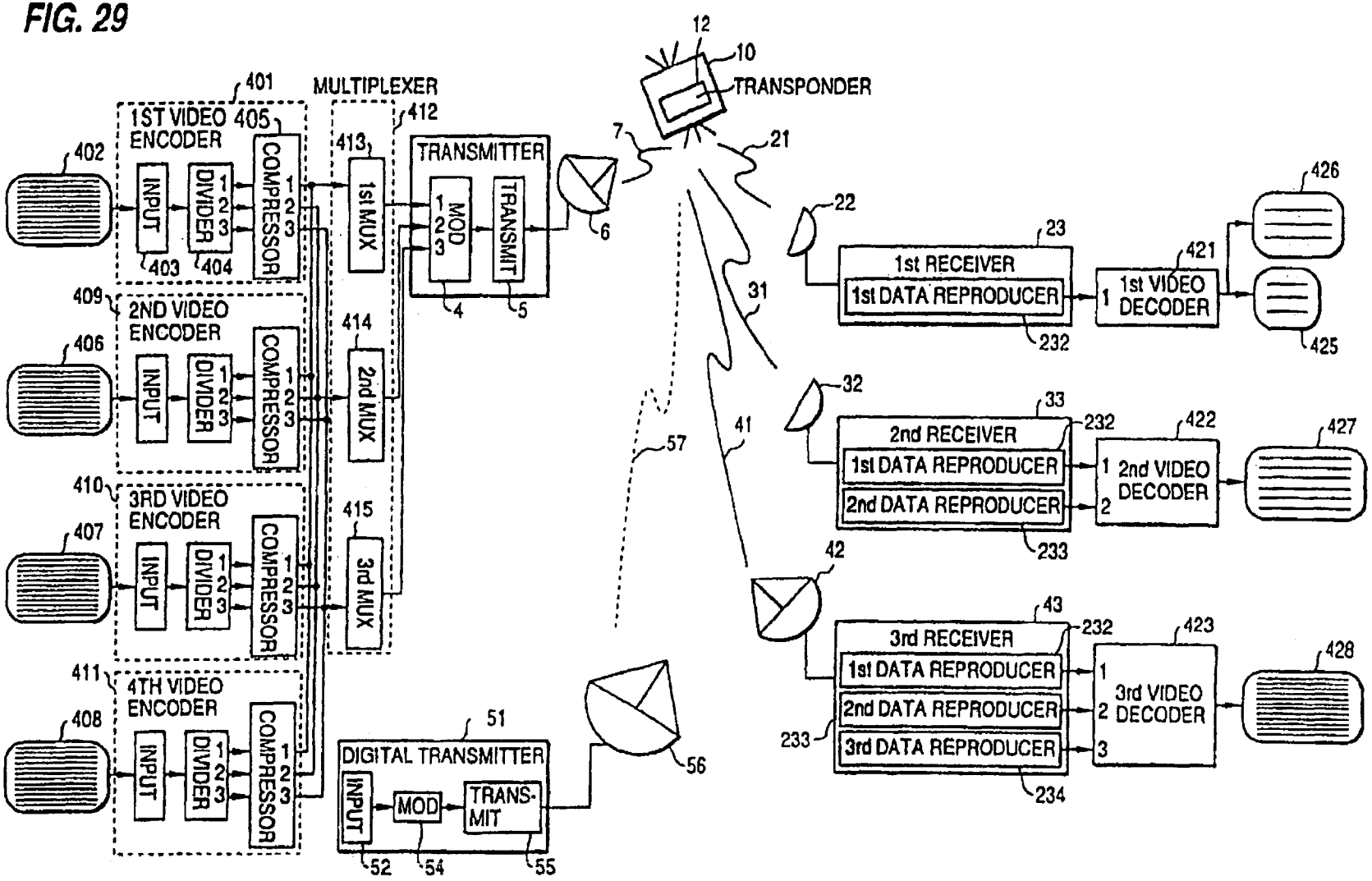
FIG. 29 is a schematic view of the entire arrangement of a signal transmission system showing a third embodiment of the present invention.

FIG. 29 is a schematic total view illustrating the third embodiment in the form of a digital TV broadcasting system. An input video signal 402 of super high resolution TV image is fed to an input unit 403 of a first video encoder 401. Then, the signal is divided by a divider circuit 404 into three, first, second, and third, data streams which are transmitted to a compressing circuit 405 for data compression before *being* further delivered.

Equally, other three input video signals 406, 407, 408 are fed to a second 409, a third 410, and a fourth video encoder 411 respectively which all are arranged identical in construction to the first video encoder 401 for data compression.

The four first data streams from their respective encoders 401, 409, 410, and 411 are transferred to a first multiplexer 413 of a multiplexer 412 where they are time multiplexed by a TDM process into a first data stream multiplex signal which is fed to a transmitter 1.

A part or all of the four second data streams from their respective encoders 401, 409, 410, and 411 are transferred to a second multiplexer 414 of the multiplexer 412 where they are time multiplexed to a second data stream multiplex signal which is then fed *to* transmitter 1. Also, a part or all of the four third data streams are transferred to a third multiplexer 415 where they are time multiplexed to a data stream multiplex signal which is then fed to the transmitter 1.

The transmitter 1 performs modulation of the three data stream signals with its modulator 4 by the same manner as described in the first embodiment. The modulated signals are sent from a transmitter unit 5 through an antenna 6 and an uplink 7 to a transponder 12 of a satellite 10 which in turn transmits it to three different receivers including a first receiver 23.

The modulated signal transmitted through a downlink 21 is intercepted by a small antenna 22 having a radius $r_1$ and fed to a first data stream reproducing unit 232 of the first receiver 23 where its first data stream only is demodulated. The demodulated first data stream is then converted by a first video decoder 421 to a traditional 425 or wide-picture NTSC or video output signal 426 of low image resolution.

Also, the modulated signal transmitted through a downlink 31 is intercepted by a medium antenna 32 having a radius $r_2$ and fed to a first 232 and a second data stream reproducing unit 233 of a second receiver 33 where its first and second data streams are demodulated respectively. The demodulated first and second data streams are then summed and converted by a second video decoder 422 to an HDTV or video output signal 427 of high image resolution and/or to the video output signals 425 and 426.

Also, the modulated signal transmitted through a downlink 41 is intercepted by a large antenna 42 having a radius $r_3$ and fed to a first 232, a second 233, and a third data stream reproducing unit 234 of a third receiver 43 where its first, second, and third data streams are demodulated respectively. The demodulated first, second, and third data streams are then summed and converted by a third video decoder 423 to a super HDTV or video output signal 428 of super high image resolution for use in a video theater or cinema. The video output signals 425, 426, and 427 can also be reproduced if desired. A common digital TV signal is transmitted from a conventional digital transmitter 51 and when intercepted by the first-receiver 23, will be converted to the video output signal 426 such as a low resolution NTSC TV signal.

The first video encoder 401 will now be explained in more detail referring to the block diagram of FIG. 30. An input video signal of super high resolution is fed through the input unit 403 to the divider circuit 404 where it is divided into four components by sub-band coding process. In particular, the input video signal is separated by passing through a horizontal lowpass filter 451 and a horizontal highpass filter 452 of e.g. QAM mode to two, low and high, horizontal frequency components which are then subsampled into half of their quantities by two subsamplers 453 and 454 respectively. The low horizontal component is filtered by a vertical lowpass filter 455 and a vertical highpass filter 456 into a low horizontal low vertical component of $H_LV_L$ signal and a low horizontal high vertical component or $H_LV_H$ signal respectively. The two, $H_LV_L$ and $H_LV_H$, signals are then subsampled into one half by two subsamplers 457 and 458 respectively and transferred to the compressing circuit 405.

The high horizontal component is filtered by a vertical lowpass filter 459 and a vertical highpass filter 460 into a high horizontal low vertical highpass component or $H_HV_L$ signal and a high horizontal high vertical component or $H_HV_H$ signal respectively. The two, $H_HV_L$ and $H_HV_H$, signals are then subsampled into one half by two subsamplers 461 and 462 respectively and transferred to the compressing circuit 405.

The $H_LV_L$ signal is preferably DCT compressed by a first compressor 471 of the compressing circuit 405 and fed to a first output circuit 472 as the first data stream.

Also, the $H_LV_H$ signal is compressed by a second compressor 473 and fed to a second output circuit 464. The $H_HV_L$ signal is compressed by a third compressor 463 and fed to the second output circuit 464.

The $H_HV_H$ signal is divided by a divider 465 into two high resolution ($H_HV_H1$) and super high resolution ($H_HV_H2$) video signals which are then transferred to the second output circuit 464 and a third output circuit 468 respectively.

Figure 31:
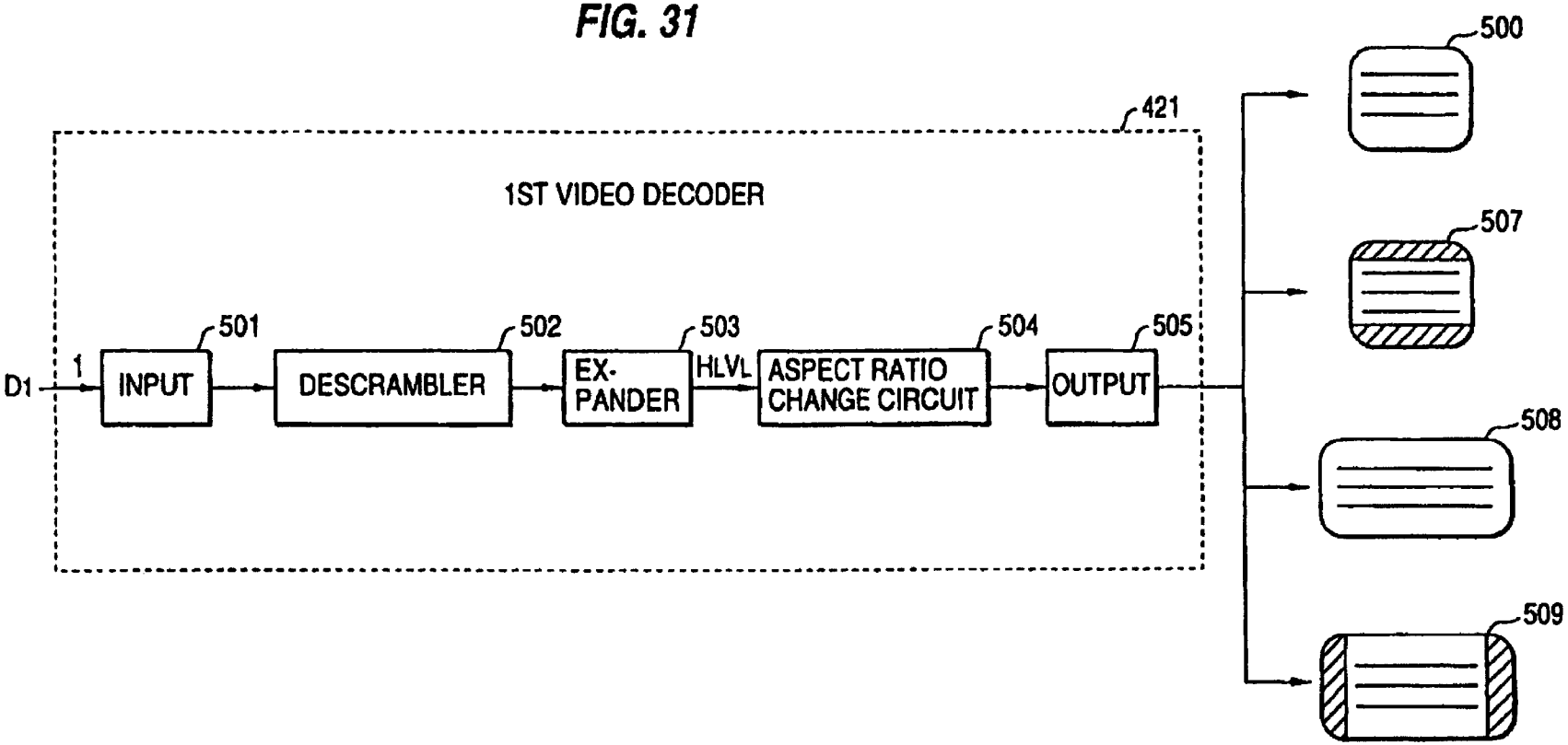
FIG. 31 is a block diagram of a first video decoder of the third embodiment.

The first video decoder 421 will now be explained in more detail referring to FIG. 31. The first data stream of $D_1$ signal of the first receiver 23 is fed through an input unit 501 to a descrambler 502 of the first video decoder 421 where it is descrambled. The descrambled $D_1$ signal is expanded by an expander 503 to $H_LV_L$ which is then fed to an aspect ratio changing circuit 504. Thus, the $H_LV_L$ signal can be delivered through an output unit 505 as a standard 500, letterbox format 507, wide-screen 508, or sidepanel format NTSC signal 509. The scanning format may be of non-interlace or interlace type and its NTSC mode lines may be 525 or doubled to 1050 by double tracing. When the received signal from the digital transmitter 51 is *a* digital TV signal of 4 PSK mode, it can also be converted by the first receiver 23 and the first video decoder 421 to a TV picture. The second video decoder 422 will be explained in more detail referring to the block diagram of FIG. 32. The $D_1$ signal of the second receiver 33 is fed through a first input 521 to a first expander 522 for data expansion and then, transferred to an oversampler 523 where it is sampled at 2x. The oversampled signal is filtered by a vertical lowpass filter 524 into $H_LV_L$. Also, the $D_2$ signal of the second receiver 33 is fed through a second input 530 to a divider 531 where it is divided into three components which are then transferred to second, third, and fourth expanders 532–534 respectively for data expansion. The three expanded components are sampled at 2x by three oversamplers 535, 536, and 537 and filtered by a vertical highpass 538, a vertical lowpass 539, and a vertical highpass filter 540 respectively. Then, $H_LV_L$ from the vertical lowpass filter 524 and $H_LV_H$ from the vertical highpass filter 538 are summed by an adder 525, sampled by an oversampler 541, and filtered by a horizontal lowpass filter 542 into a low frequency horizontal video signal. $H_HV_L$ from the vertical lowpass filter 539 and $H_HV_H1$ from the vertical highpass filter 540 are summed by an adder 526, sampled by an oversampler 544, and filtered by a horizontal highpass filter 545 to a high frequency horizontal video signal. The two, high and low frequency, horizontal video signals are then summed by an adder 543 into a high resolution video signal HD which is further transmitted through an output unit 546 as a video output 547 of e.g. HDTV format. If desired a traditional NTSC video output can be reconstructed with equal success.

Figure 33:
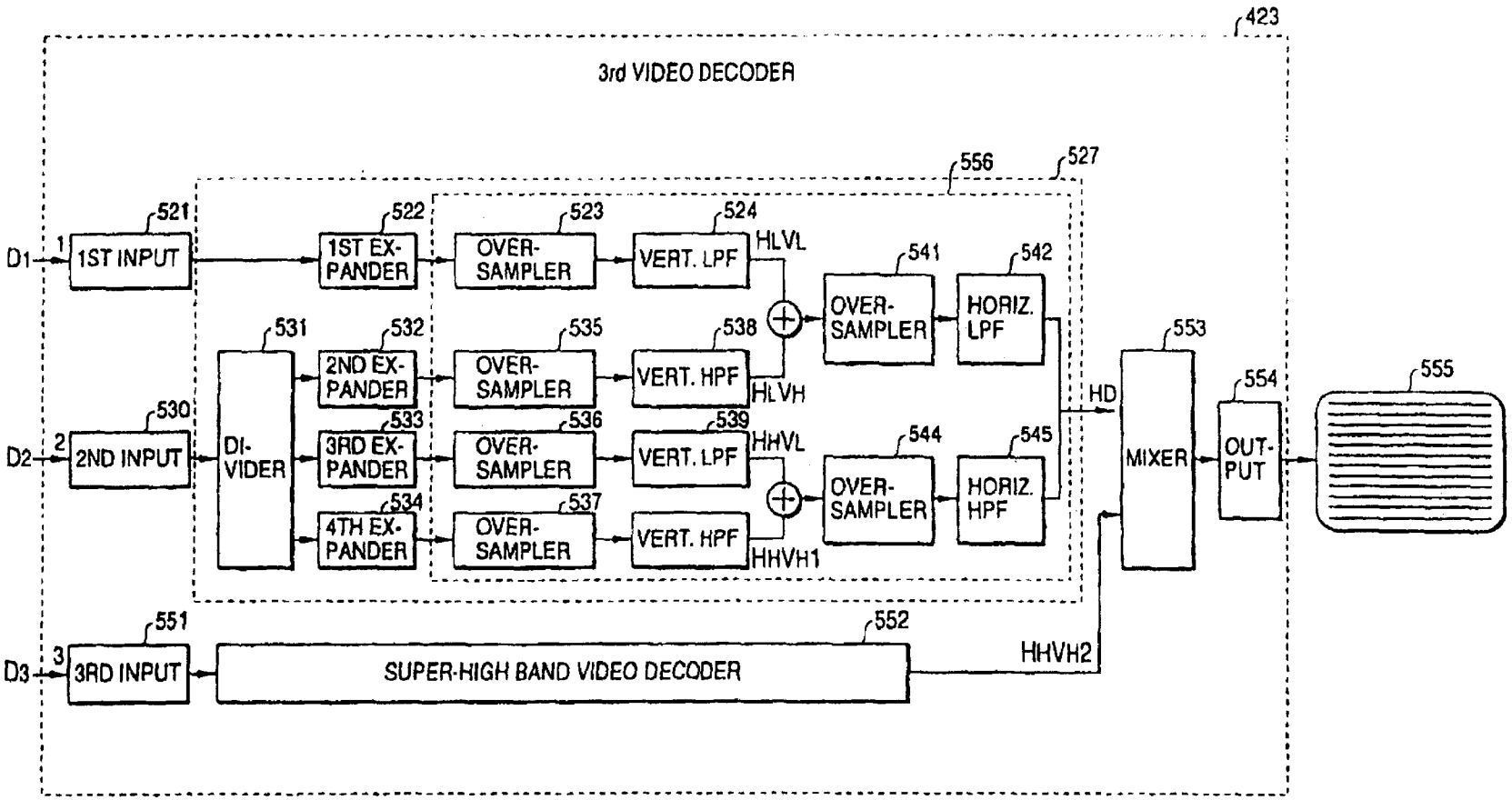
FIG. 33 is a block diagram of a third video decoder of the third embodiment.

FIG. 33 is a block diagram of the third video decoder 423 in which the $D_1$ and $D_2$ signals are fed through a first 521 and a second input 530 respectively to a high frequency band video decoder circuit 527 where they are converted to an HD signal in the same manner as described above. The $D_3$ signal is fed through a third input 551 to a super high frequency band video decoder circuit 522 where it is expanded, descrambled, and composed into $H_HV_H2$ signal. The HD signal of the high frequency band video decoder circuit 527 and the $H_HV_H2$ signal of the super high frequency band video decoder circuit 552 are summed by a summer 553 to a super high resolution TV or S-HD signal which is then delivered through an output unit 554 as *a* super resolution video output 555.

Figure 34:
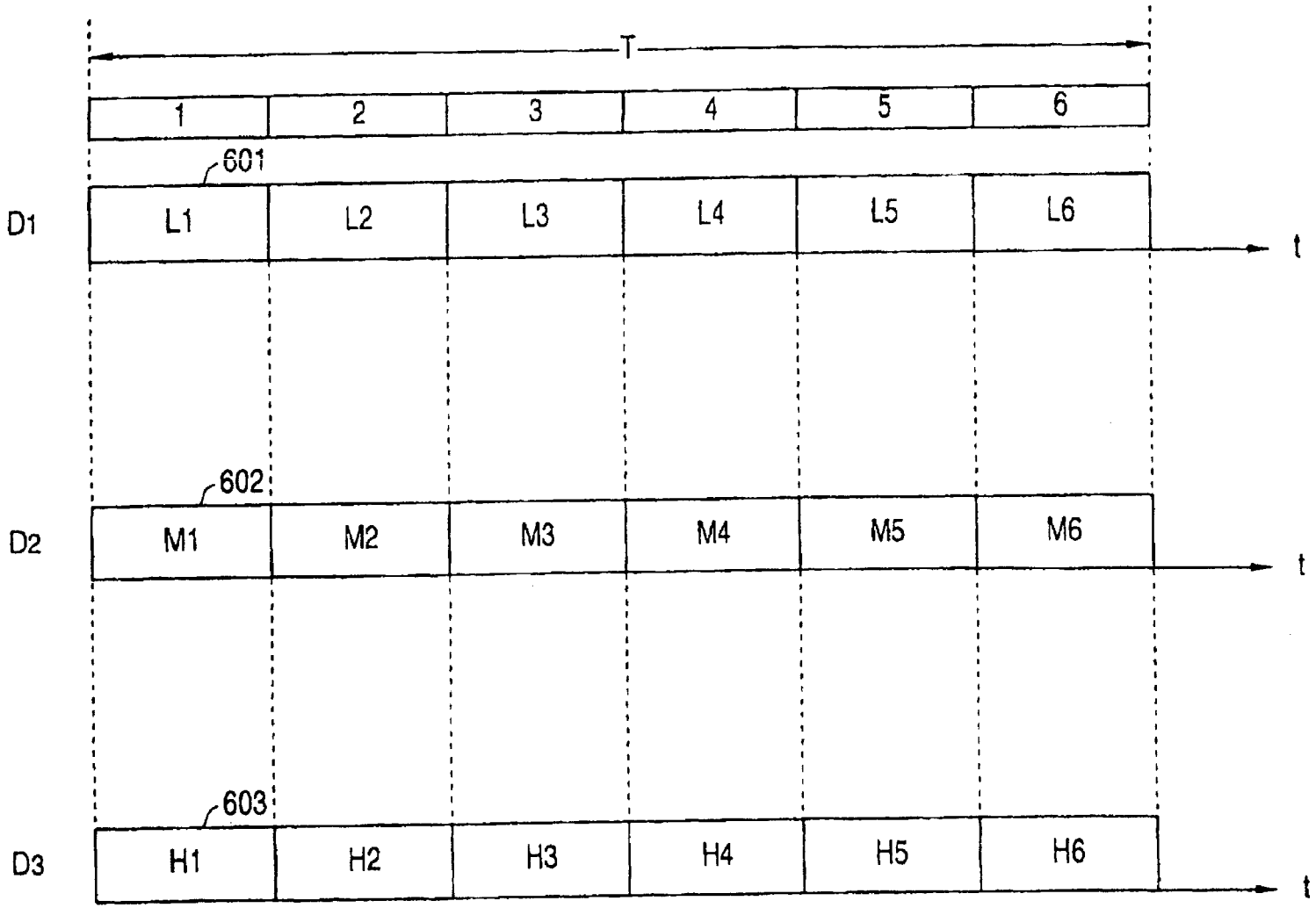
FIG. 34 is an explanatory view showing a time multiplexing of $D_1$, $D_2$, and $D_3$ signals according to the third embodiment.

The action of multiplexing in the multiplexer 412 shown in FIG. 29 will be explained in more detail. FIG. 34 illustrates a data assignment in which the three, first, second, and third, data streams $D_1$, $D_2$, $D_3$ contain in a period of T six NTSC channel data L1, L2, L3, L4, L5, L6, six HDTV channel data M1, M2, M3, M4, M5, M6 and six S-HDTV channel data H1, H2, H3, H4, H5, H6 respectively. In operation, the NTSC or $D_1$ signal data L1 to L6 are time multiplexed by TDM process during the period T. More particularly, $H_LV_L$ of $D_1$ is assigned to a domain 601 for the first channel. Then, a difference data M1 between HDTV and NTSC or a sum of $H_LV_H$, $H_HV_L$, and $H_HV_H1$ is assigned to a domain 602 for the first channel. Also, a difference data [HI] *H1* between HDTV and super HDTV or $H_HV_H2$ (See FIG. 30) is assigned to a domain 603 for the first channel.

The selection of the first channel TV signal will now be described. When intercepted by the first receiver 23 with a small antenna coupled to the first video decoder 421, the first channel signal is converted to a standard or widescreen NTSC TV signal as shown in FIG. 31. When intercepted by the second receiver 33 with a medium antenna coupled to the second video decoder 422, the signal is converted by summing L1 of the first data stream $D_1$ assigned into the domain 601 and M1 of the second data stream $D_2$ assigned to the domain 602 at an HDTV signal of the first channel equivalent in program to the NTSC signal.

When intercepted by the third receiver 43 with a large antenna coupled to the third video decoder 423, the signal is converted by summing L1 of $D_1$ assigned to the domain 601, M1 of $D_2$ assigned to the domain 602, and $H_1$ of $D_3$ assigned to the domain 603 into a super HDTV signal of the first channel equivalent in program to the NTSC signal. The other channel signals can be reproduced in an equal manner.

Figure 35:
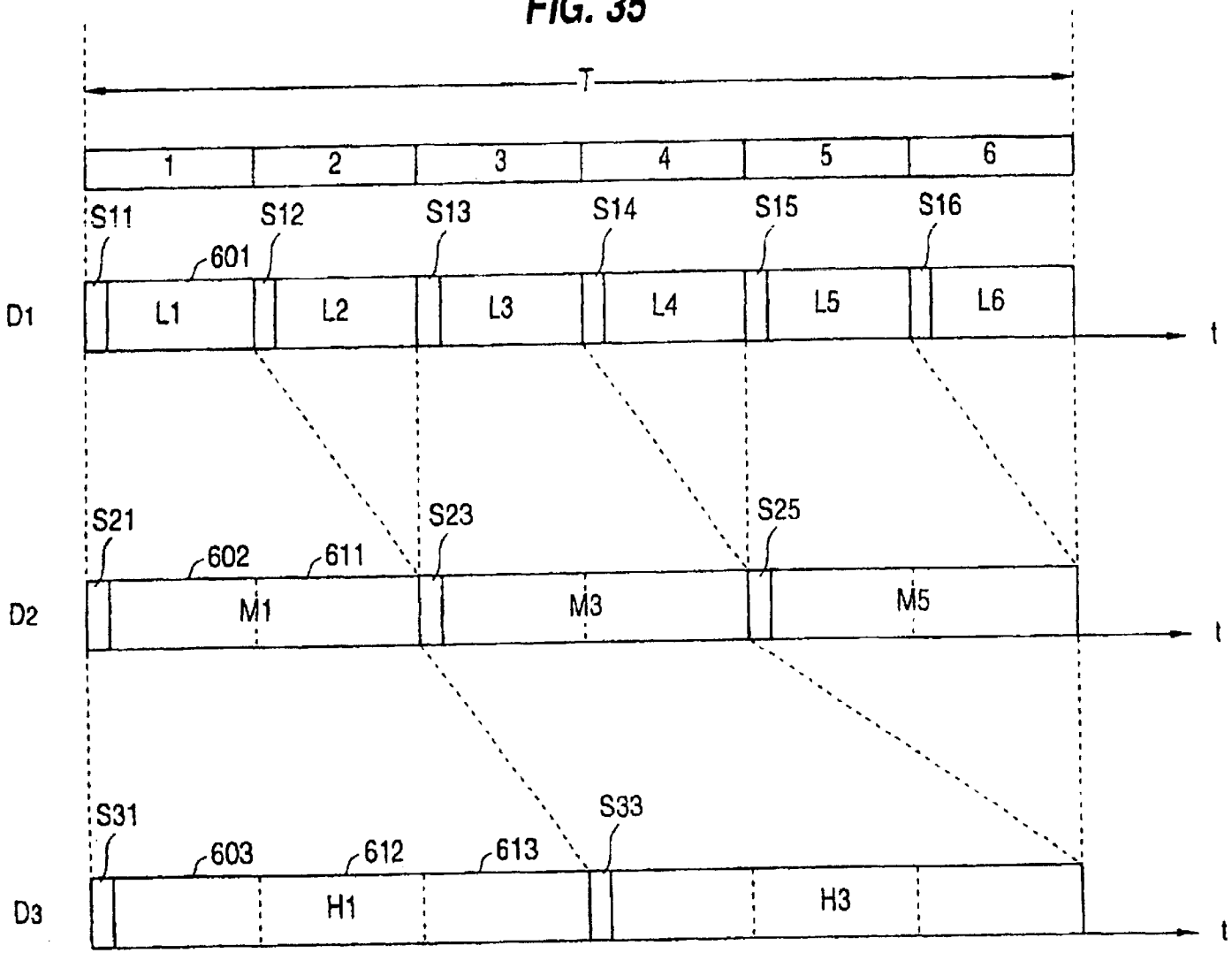
FIG. 35 is an explanatory view showing another time multiplexing of $D_1$, $D_2$, and $D_3$ signals according to the third embodiment.

FIG. 35 shows another data assignment L1 of a first channel NTSC signal is assigned to a [fist] *first* domain 601. The domain 601 which is allocated at the front end of the first data stream $D_1$, also contains at front a data $S_{11}$ including a descrambling data and the demodulation data described in the first embodiment. A first channel HDTV signal is transmitted as L1 and M1. M1, which is thus a difference data between NTSC and HDTV, is assigned to two domains 602 and 611 of $D_2$. If L1 is a compressed NTSC component of 6 Mbps, M1 is two times higher, that is, 12 Mbps. Hence, the total of L1 and M1 can be demodulated at 18 Mbps with the second receiver 33 and the second video decoder 423. According to current data compression techniques, HDTV compressed signals can be reproduced at about 15 Mbps. This allows the data assignment shown in FIG. 35 to enable simultaneous reproduction of an NTSC and HDTV first channel signal. However, this assignment allows no second channel HDTV signal to be carried. S21 is a descrambling data in the HDTV signal. A first channel super HDTV signal component comprises L1, M1, and H1. The difference data H1 is assigned to three domains 603, 612, and 613 of $D_3$. If the NTSC signal is 6 Mbps, the super HDTV is as high as 36 Mbps. When a compressed rate is increased, super HDTV video data of about 2000 scanning line for reproducing of a cinema size picture for commercial use can be transmitted in an equal manner.

Figure 36:
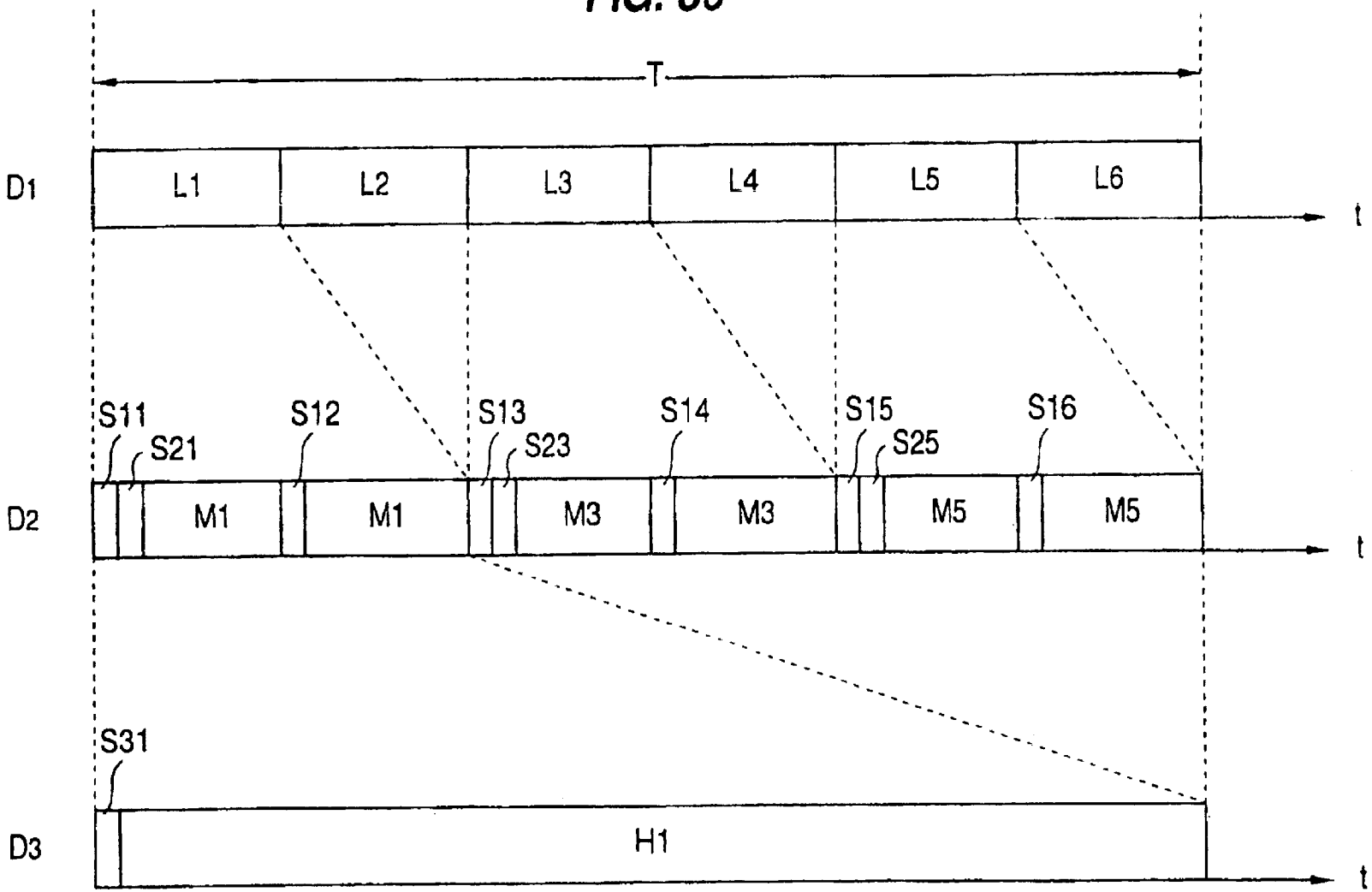
FIG. 36 is an explanatory view showing a further time multiplexing of $D_1$, $D_2$, and $D_3$ signals according to the third embodiment.

FIG. 36 shows a further data assignment in which H1 of a super HDTV signal is assigned to six time domains. If a NTSC compressed signal is 6 Mbps, this assignment can be nine times higher, that is, 54 Mbps of $D_3$ data. Accordingly, super HDTV data of higher picture quality can be transmitted.

The foregoing data assignment makes the use of one of two, horizontal and vertical, polarization planes of a transmission wave. When both the horizontal and vertical polarization planes are used, the frequency utilization will be doubled. This will be explained below.

Figure 49:
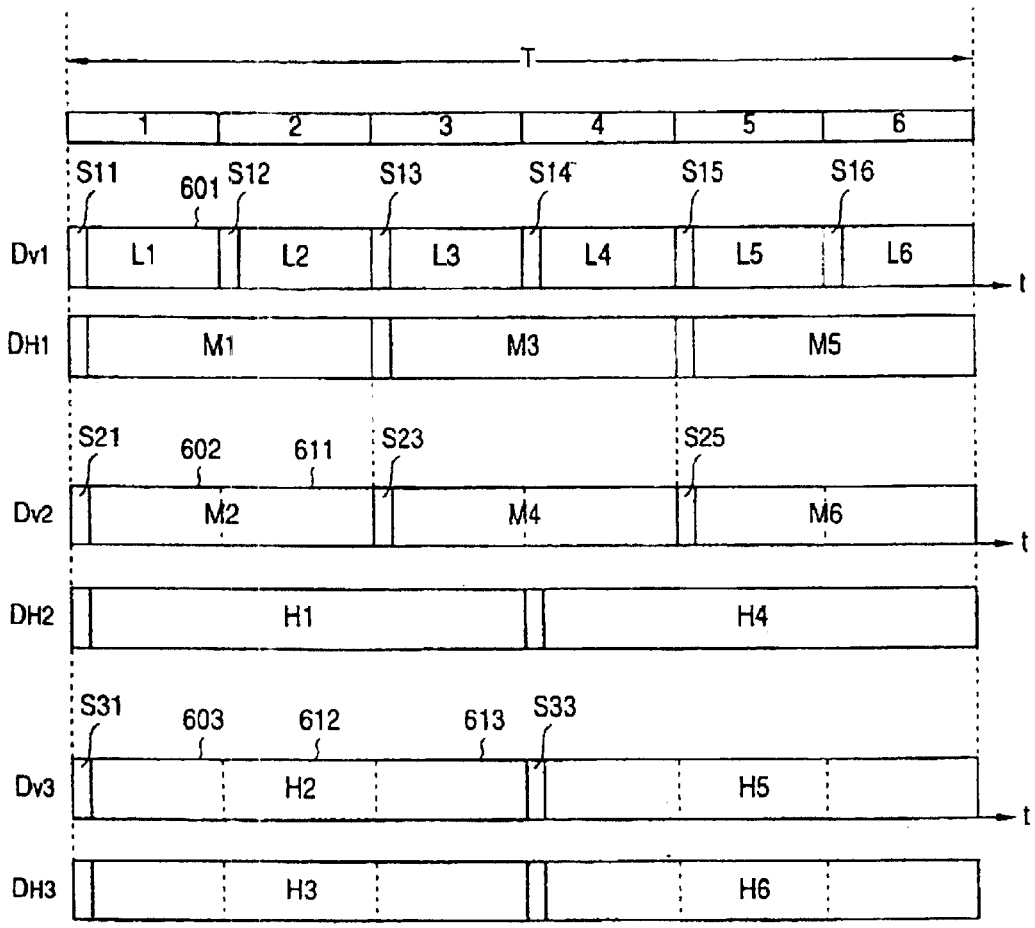
FIG. 49 is an explanatory view showing a time multiplexing of $D_{V1}$, $D_{H1}$, $D_{V2}$, $D_{H2}$, $D_{V3}$, and $D_{H3}$ signals according to the third embodiment.

FIG. 49 shows a data assignment in which $D_{V1}$ and $D_{H1}$ are a vertical and a horizontal polarization signal of the first data stream respectively, $D_{V2}$ and $D_{H2}$ are a vertical and a horizontal polarization signal of the second data stream respectively, and $D_{V3}$ and $D_{H3}$ are a vertical and a horizontal polarization signal of the third data stream respectively. The vertical polarization signal $D_{V1}$ of the first data stream carries a low frequency band or NTSC TV data and the horizontal polarization signal $D_{H1}$ carries a high frequency band or HDTV data. When the first receiver 23 is equipped with a vertical polarization signal $D_{H1}$ carries a high frequency band or HDTV data. When the first receiver 23 is equipped with an antenna for both horizontally and vertically polarized waves, it can reproduce the HDTV signal through summing L1 and M1. More specifically, the first receiver 23 can provide compatibility between NTSC and HDTV with the use of a particular type antenna.

Figure 50:
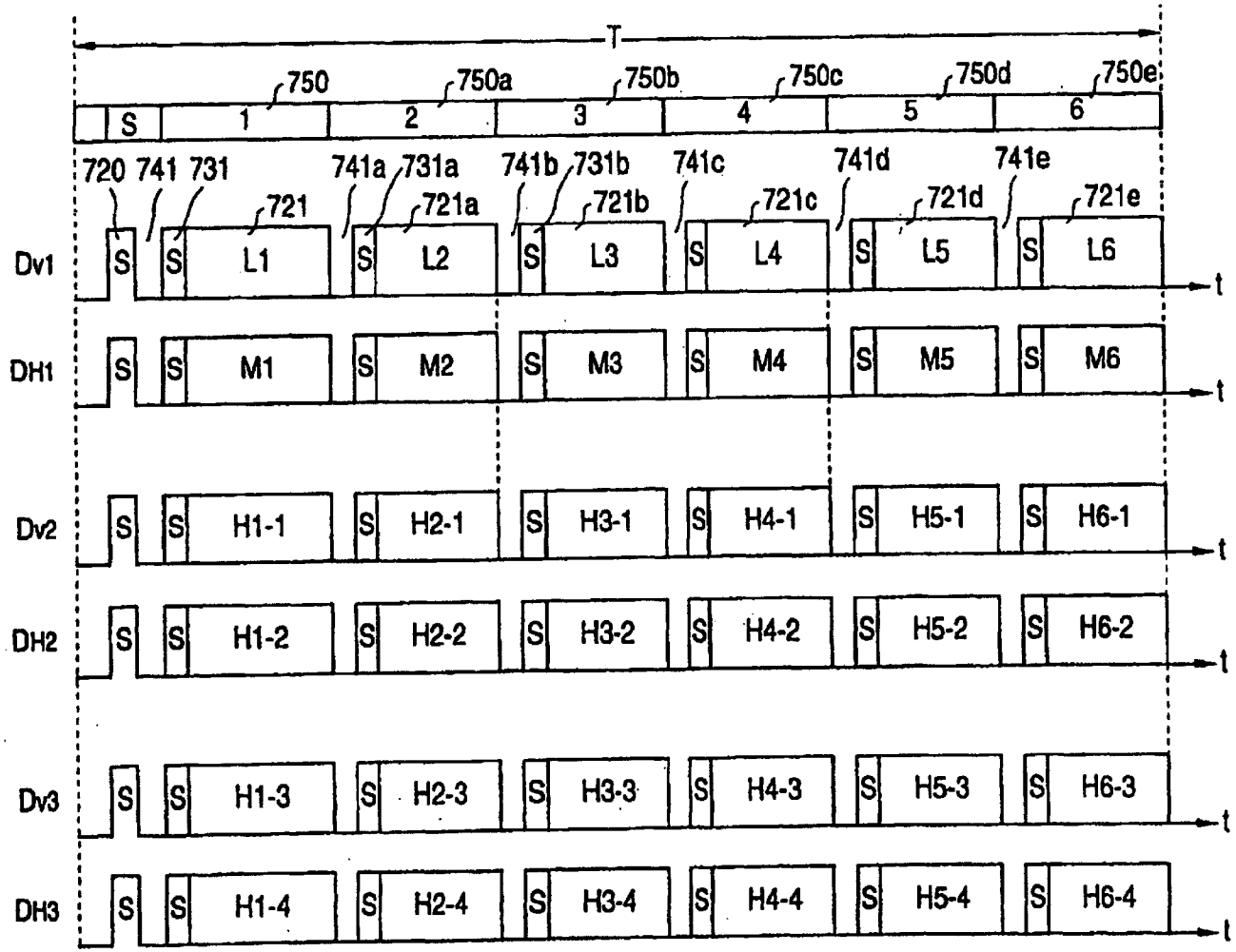
FIG. 50 is an explanatory view showing a TDMA time multiplexing of $D_{V1}$, $D_{H1}$, $D_{V2}$, $D_{H2}$, $D_{V3}$, and $D_{H3}$ signals according to the third embodiment.
Figure 51:
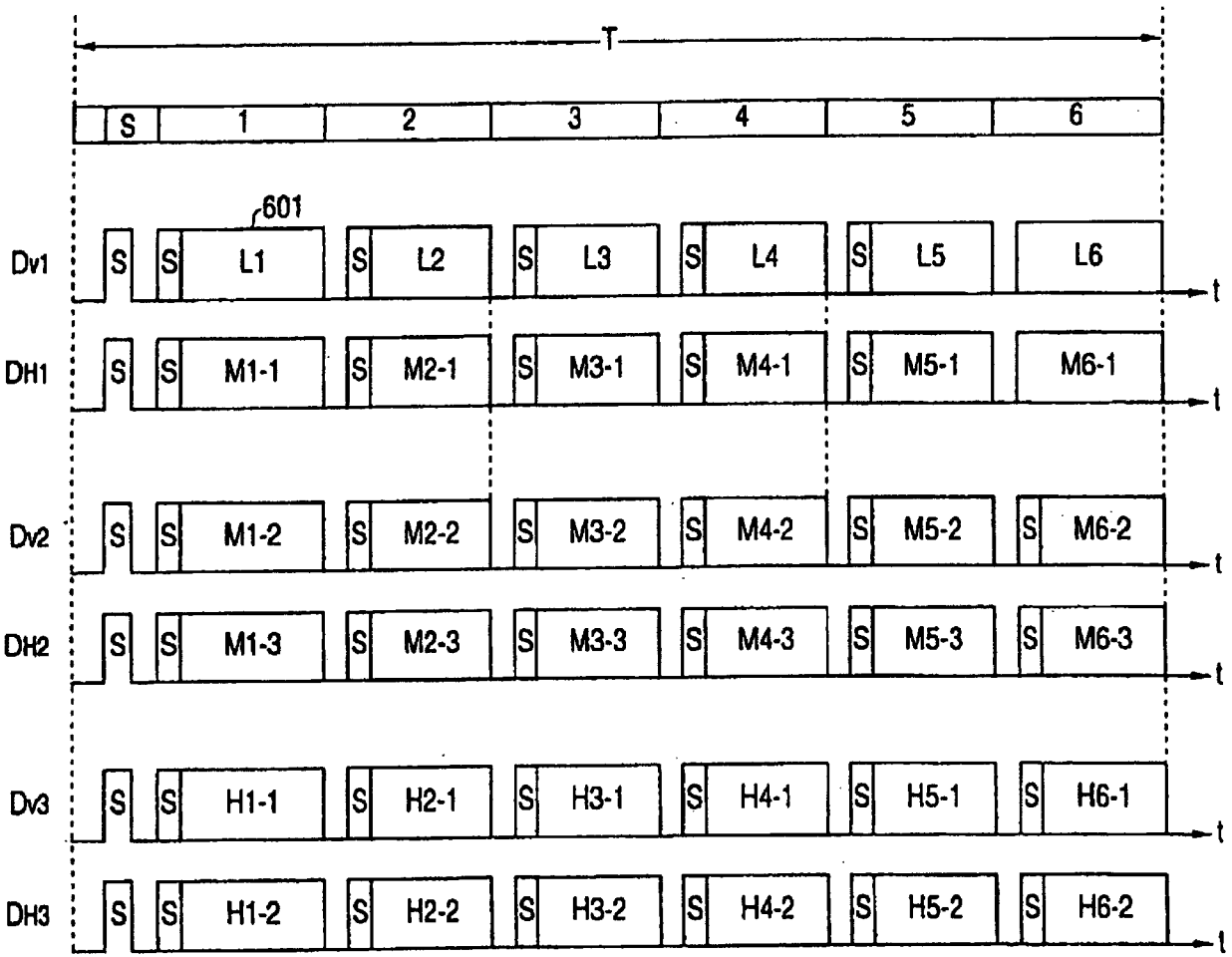
FIG. 51 is an explanatory view showing another TDMA time multiplexing of the $D_{V1}$, $D_{H1}$, $D_{V2}$, $D_{H2}$, $D_{V3}$, and $D_{H3}$ signals according to the third embodiment.

FIG. 50 illustrates a TDMA method in which each data burst 721 is accompanied at front a sync data 731 and a card data 741. Also, a frame sync data 720 is provided at the front of a frame. Like channels are assigned to like time slots. For example, a first time slot 750 carries NTSC, HDTV, and super HDTV data of the first channel simultaneously. The six time slots 750, 750a, 750b, 750c, 750d, 750e, *are* arranged independent from each other. Hence, each station can offer NTSC, HDTV, and/or super HDTV services independently of the other stations through selecting a particular channel of the time slots. Also, the first receiver 23 can reproduce an NTSC signal when equipped with a horizontal polarization antenna and both NTSC and HDTV signals when equipped with a compatible polarization antenna. In this respect, the second receiver 33 can reproduce a super HDTV at lower resolution while the third receiver 43 can reproduce a full super HDTV signal. According to the third embodiment, a compatible signal transmission system will be constructed. It is understood that the data assignment is not limited to the burst mode TDMA method shown in FIG. 50 and another method such as time division multiplexing of continuous signals as shown in FIG. 49 will be employed with equal success. Also, a data assignment shown in FIG. 51 will permit a HDTV signal to be reproduced at high resolution.

As set forth above, the compatible digital TV signal transmission system of the third embodiment can offer three, super HDTV, HDTV, and conventional NTSC, TV broadcast services simultaneously. In addition, a video signal intercepted by a commercial station or cinema can be electronized.

The modified QAM of the embodiments is now termed as SRQAM and its error rate will be examined.

Figure 99:
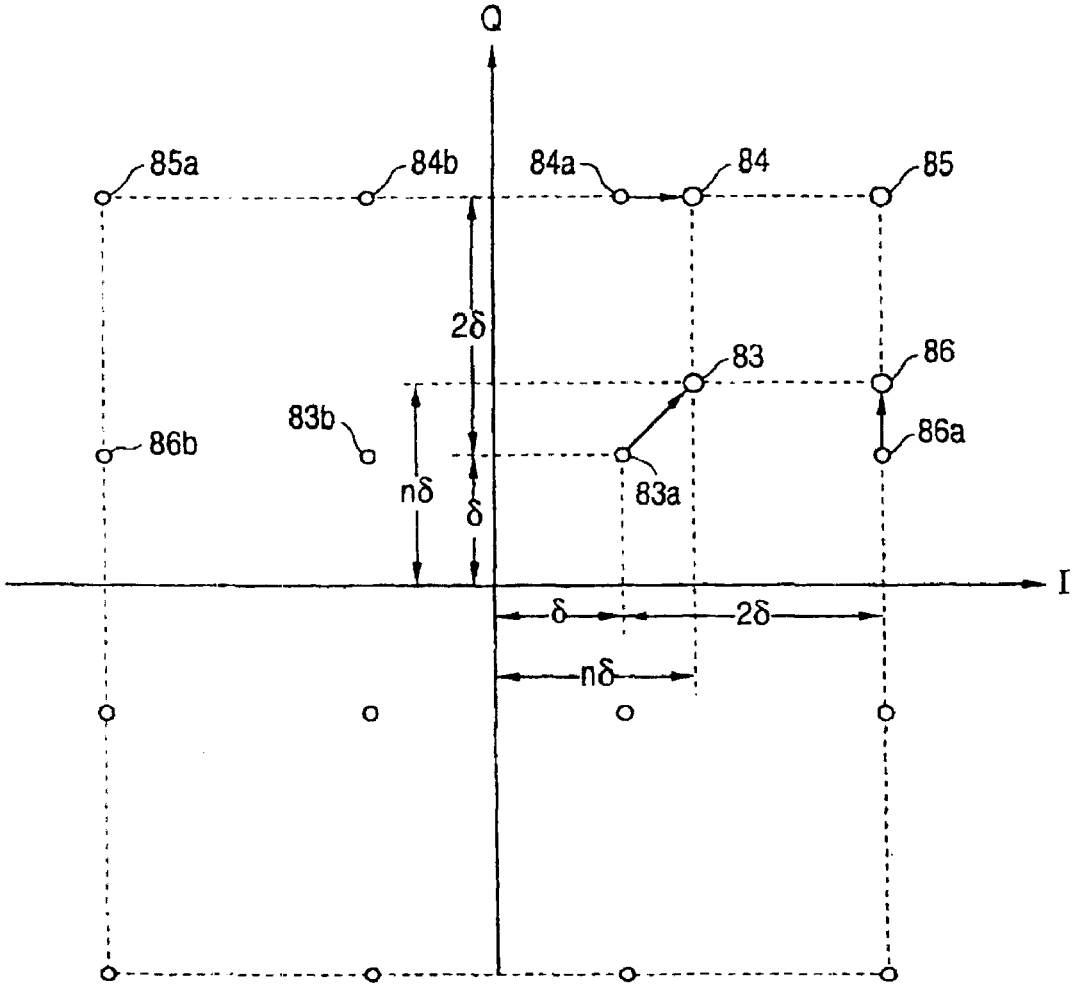
FIG. 99 is a vector diagram of a 16 SRQAM signal of the third embodiment.

First, the error rate in 16 SRQAM will be calculated. FIG. 99 shows a vector diagram of 16 SRQAM signal points. As apparent from the first quadrant, the 16 signal points of standard 16 QAM including 83a, [83b] *85*, 84a, [83a] *86a* are allocated at equal intervals of 2δ.

The signal point 83a is spaced Δ from both the I-axis and the Q-axis of the coordinate. It is now assumed that n is a shift value of the 16 SRQAM. In 16 SRQAM, the signal point 83a of 16 QAM is shifted to a signal point 83 where the distance from each axis is nΔ. The shift value n is thus expressed as:

$$0<n<3.$$

The other signal points 84a and 86a are also shifted to two points 84 and 86 respectively.

If the error rate of the first data stream is $Pe_1$, it is obtained from:

$$Pe_{1-16} = \frac{1}{4}\mathrm{erfc}\left(\frac{n\delta}{\sqrt{2\sigma}}\right) + \frac{1}{4}\mathrm{erfc}\left(\frac{3\delta}{\sqrt{2\sigma}}\right) = \frac{1}{8}\mathrm{erfc}\left(\frac{n\sqrt{p}}{\sqrt{9+n^2}}\right)$$

Also, the error rate $Pe_2$ of the second data stream is obtained from:

$$Pe_{2-16} = \frac{1}{2}\mathrm{erfc}\left(\frac{\frac{3-n}{2}\delta}{\sqrt{2\sigma}}\right) = \frac{1}{4}\mathrm{erfc}\left(\frac{\frac{3-n}{2}\delta}{2\sqrt{9+n^2}}\sqrt{p}\right)$$

Figure 100:
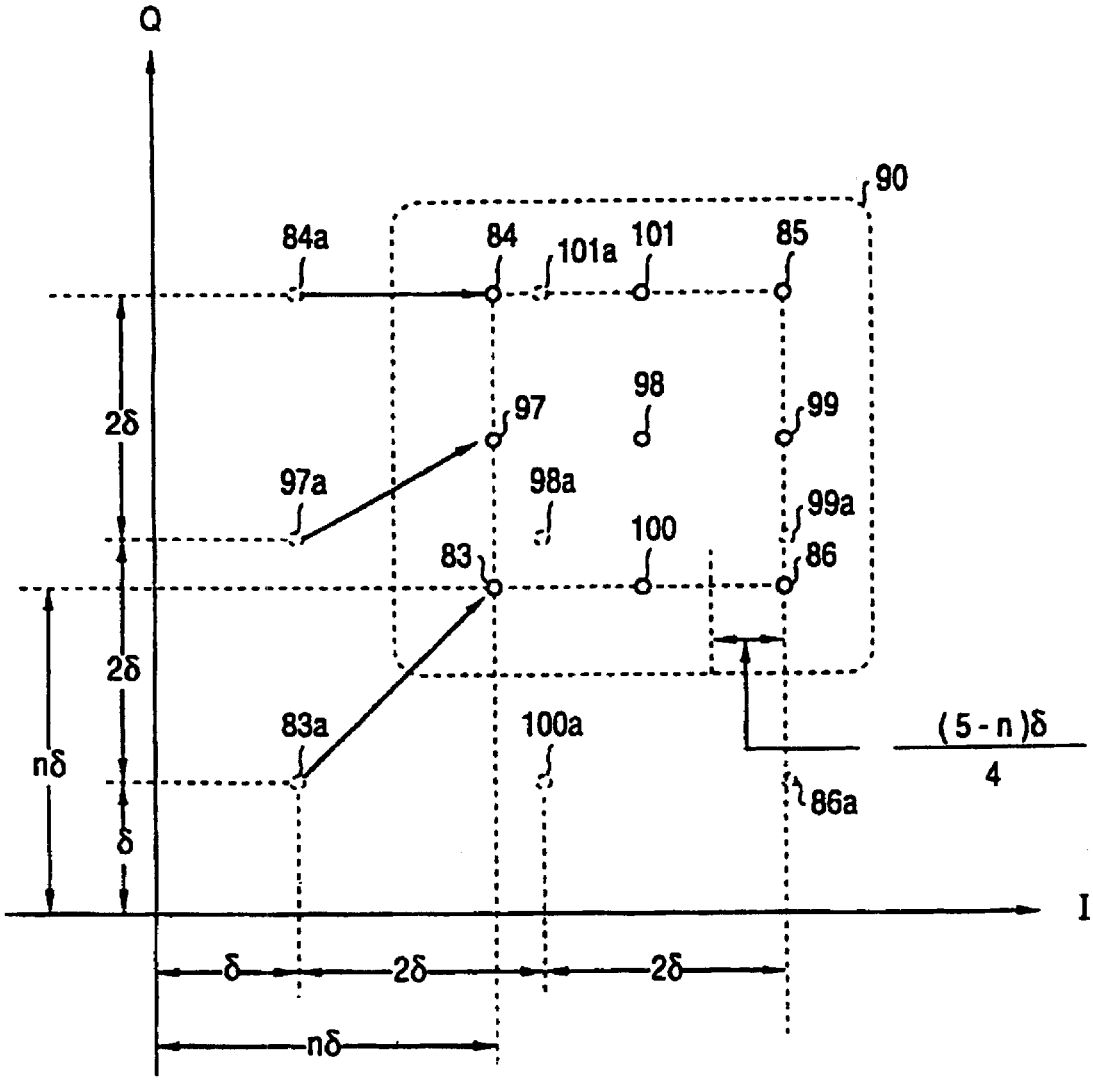
FIG. 100 is a vector diagram of a 32 SRQAM signal of the third embodiment.

The error rate of 36 or 32 SRQAM will be calculated. FIG. 100 is a vector diagram of a 36 SRQAM signal in which the distance between any two 36 QAM signal points is 2δ.

The signal points 83a of 36 QAM is spaced δ from each axis of the coordinate. It is now assumed that n is a shift value of the 16 SRQAM. In 36 SRQAM, the signal point 83a is shifted to a signal point 83 where the distance from each axis is nΔ. Similarly, the nine 36 QAM signal points in the first quadrant are shifted to points 83, 84, 85, 86, 97, 98, 99, 100, 101 respectively. If a signal point group 90 comprising the nine signal points is regarded as a single signal point, the error rate $Pe_1$ in reproduction of only the first data stream $D_1$ with a modified 4 PSK receiver and the error rate $Pe_2$ in reproduction of the second data stream $D_2$ after discriminating the nine signal points of the group 90 from each other, are obtained respectively from:

$$Pe_{1-32} = \frac{1}{6}\mathrm{erfc}\left(\frac{n\delta}{\sqrt{2\sigma}}\right) = \frac{1}{6}\mathrm{erfc}\left(\sqrt{\frac{6p}{5}} \times \frac{n}{\sqrt{n^2+2n+25}}\right)$$

Figure 101:
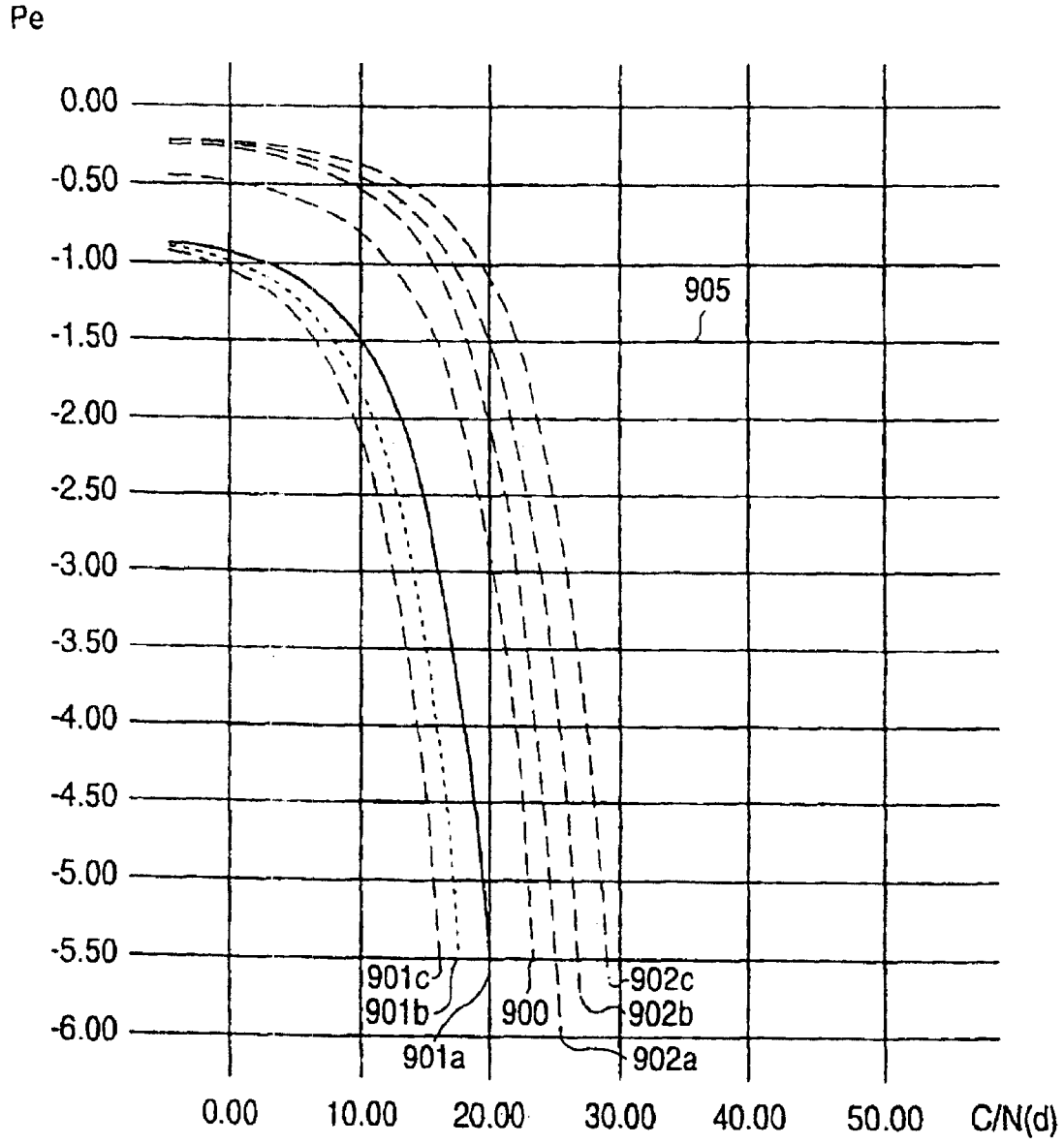
FIG. 101 is a graphic diagram showing the relationship between C/N and error [rake] *rate* according to the third embodiment.

FIG. 101 shows the relationship between error rate Pe and C/N rate in transmission in which the curve 900 represents a conventional or not modified 32 QAM signal. The straight line 905 represents a signal having $10^{-1.5}$ of the error rate. The curve 901a represents a $D_1$ level 32 SRQAM signal of the present invention at the shift rate n of 1.5. As shown, the C/N rate of the 32 SRQAM signal is 5 dB lower at the error rate of $10^{-1.5}$ than that of the conventional 32 QAM. This means that the present invention allows a $D_1$ signal to be reproduced at a given error rate when its C/N rate is relatively low.

The curve 902a represents a $D_2$ level SRQAM signal at n=1.5 which can be reproduced at the error rate of $10^{-1.5}$ only when its C/N rate is 2.5 dB higher than that of the conventional 32 QAM of the curve 900. Also, the curves 901b and 902b represent $D_1$ and $D_2$ SRQAM signals at n=2.0 respectively. The [curves] *curve* 902c represents a $D_2$ SRQAM signal at n=2.5. It is apparent that the C/N rate of the SRQAM signal at the error data of $10^{-1.5}$ is 5 dB, 8 dB, and 10 dB higher at n=1.5, 2.0, and 2.5 respectively in the $D_1$ level and 2.5 dB lower in the $D_2$ level than that of a common 32 QAM signal.

Figure 103:
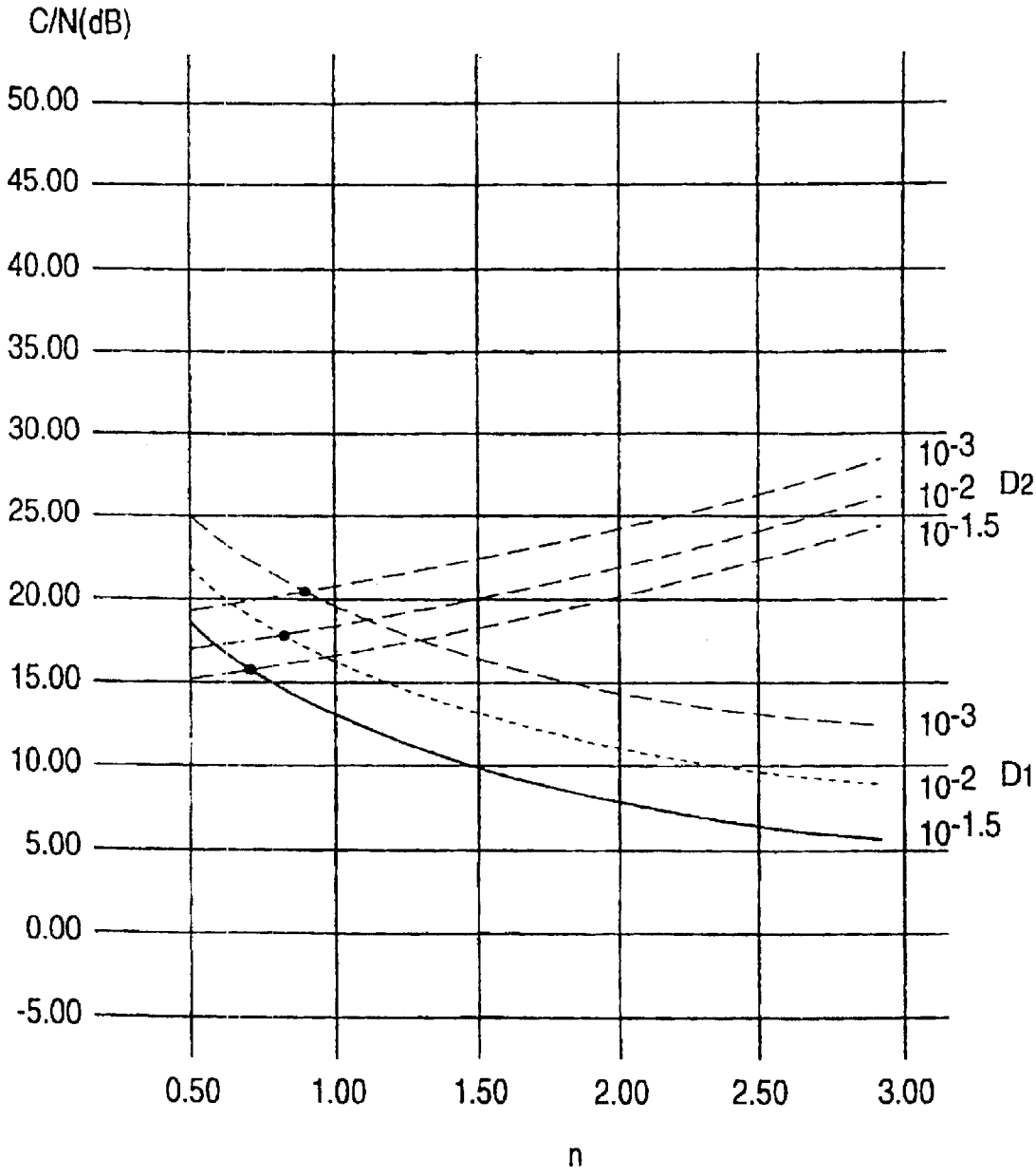
FIG. 103 is a graphic diagram showing the relationship between shift distance n and C/N needed for transmission according to the third embodiment.

Shown in FIG. 103 is the C/N rate of the first and second data streams $D_1$, $D_2$ of a 32 SRQAM signal which is needed for maintaining a constant error rate against variation of the shift n. As apparent, when the shift n is more than 0.8, there is developed a clear difference between two C/N rates of their respective $D_1$ and $D_2$ levels so that the multi-level signal, namely first and second data, transmission can be implemented successfully. In brief, n>0.85 is essential for multi-level data transmission of the 32 SRQAM signal of the present invention.

Figure 102:
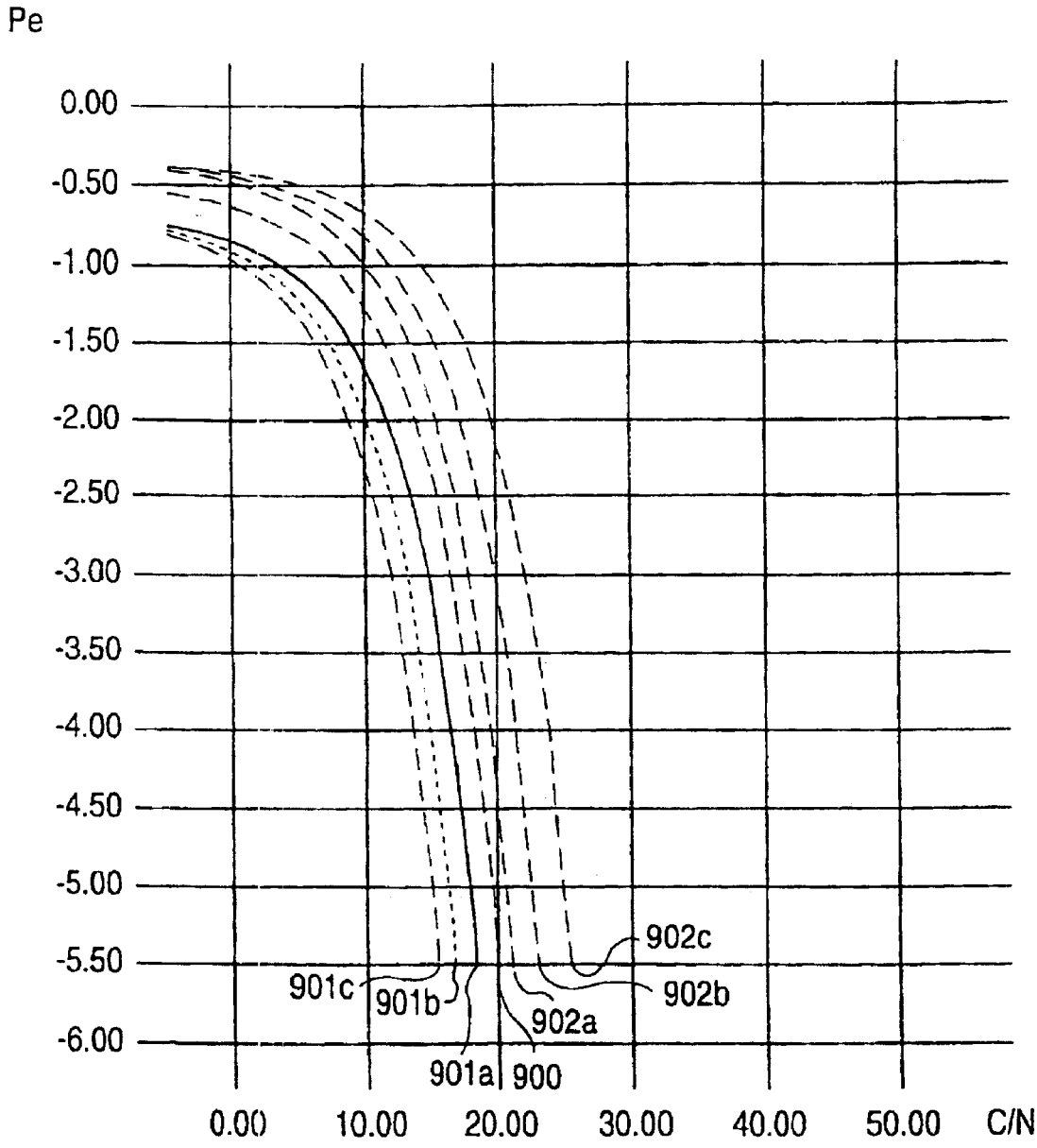
FIG. 102 is a graphic diagram showing the relationship between C/N and error rate according to the third embodiment.

FIG. 102 shows the relationship between the C/N rate and the error rate for 16 SRQAM signals. The curve 900 represents a common 16 QAM signal. The curves 901a, 901b, 901c and $D_1$ level or first data stream 16 SRQAM signals at n=1.2, 1.5, and 1.8 respectively. The curves 902a, 902b, 902c are $D_2$ level or second data stream 16 SRQAM signals at n=1.2, 1.5, and 1.8 respectively.

Figure 104:
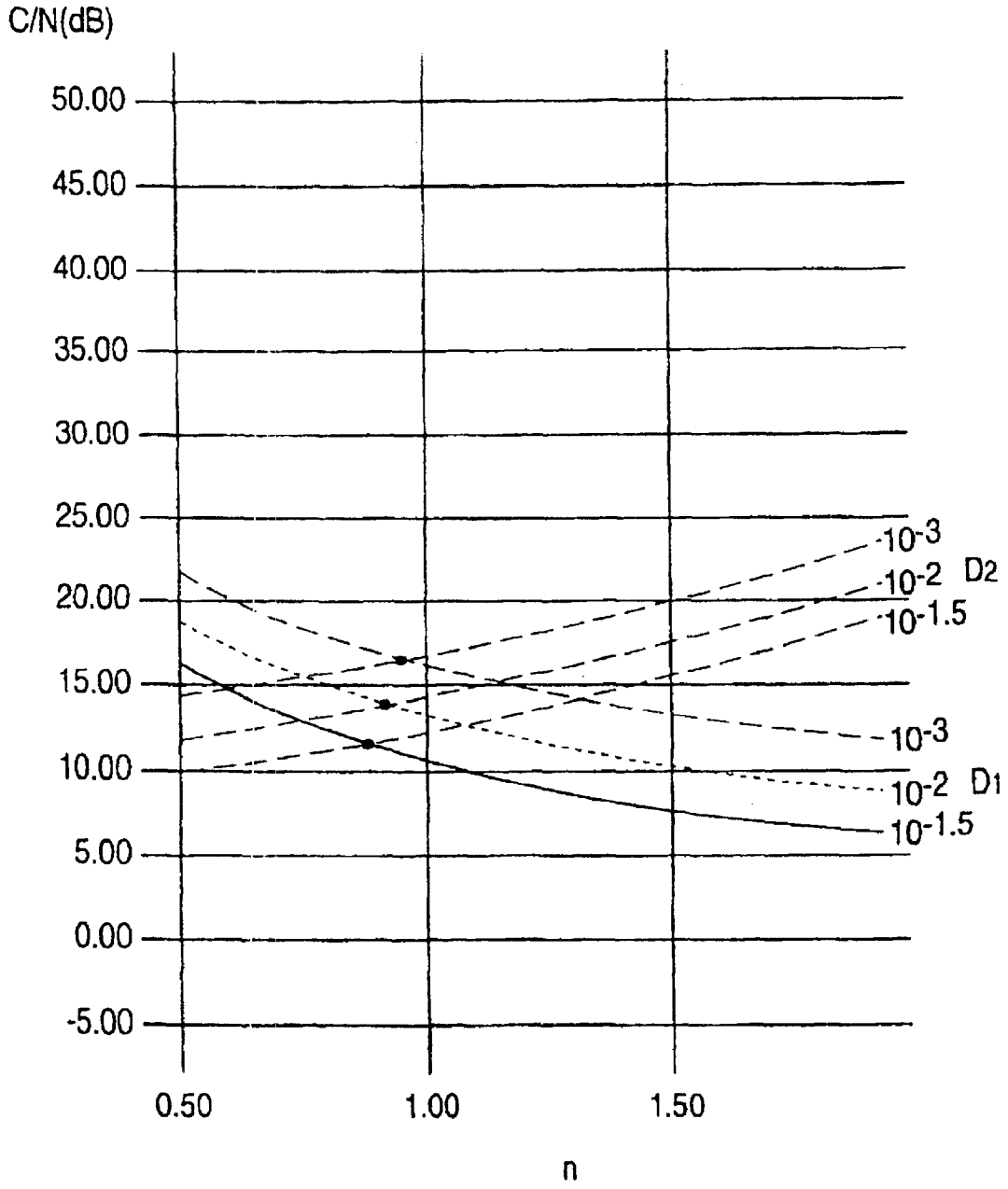
FIG. 104 is a graphic diagram showing the relationship between shift distance n and C/N needed for transmission according to the third embodiment.

The C/N rate of the first and second data streams $D_1$, $D_2$ of a 16 SRQAM signal is shown in FIG. 104, which is needed for maintaining a constant error rate against variation of the shift n. As apparent, when the shift n is more than 0.9 (n>0.9), the multi-level data transmission of the 16 SRQAM signal will be executed.

Figure 105:
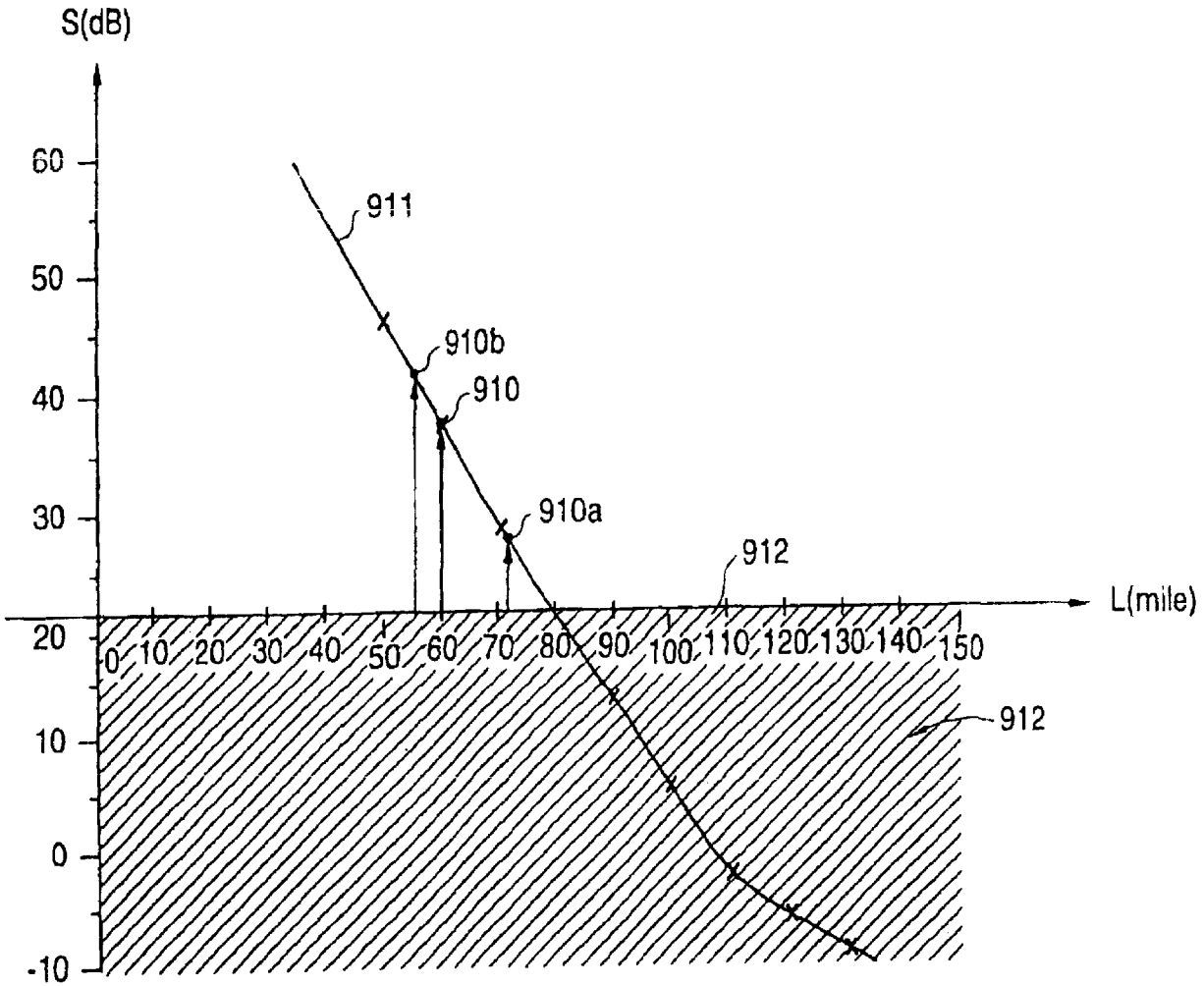
FIG. 105 is a graphic diagram showing the relationship between signal level and distance from a transmitter antenna in terrestrial broadcast service according to the third embodiment.

One example of propagation of SRQAM signals of the present invention will now be described for use with a digital TV terrestrial broadcast service. FIG. 105 shows the relationship between the signal level and the distance between a transmitter antenna and a receiver antenna in the terrestrial broadcast service. The curve 911 represents a transmitted signal from the transmitter antenna which is 1250 feet high. It is assumed that the error rate essential for reproduction of an applicable digital TV signal is $10^{-1.5}$. The hatching area 912 represents a noise interruption. The point 910 represents a signal reception limit of a conventional 32 QAM signal at C/N=15 dB where the distance L is 60 miles and a digital HDTV signal can be intercepted at minimum.

The C/N rate varies 5 dB under a worst case receiving condition such as bad weather. If a change in the relevant condition, e.g. weather, attenuates the C/N rate, the interception of an HDTV signal will hardly be ensured. Also, geographical conditions largely affect the propagation of signals and a decrease of about 10 dB at least will be unavoidable. Hence, successful signal interception within 60 miles will never be guaranteed and above all, a digital signal will be harder to propagate than an analogue signal. It would be understood that the service area of a conventional digital TV broadcast service is less dependable.

Figure 106:
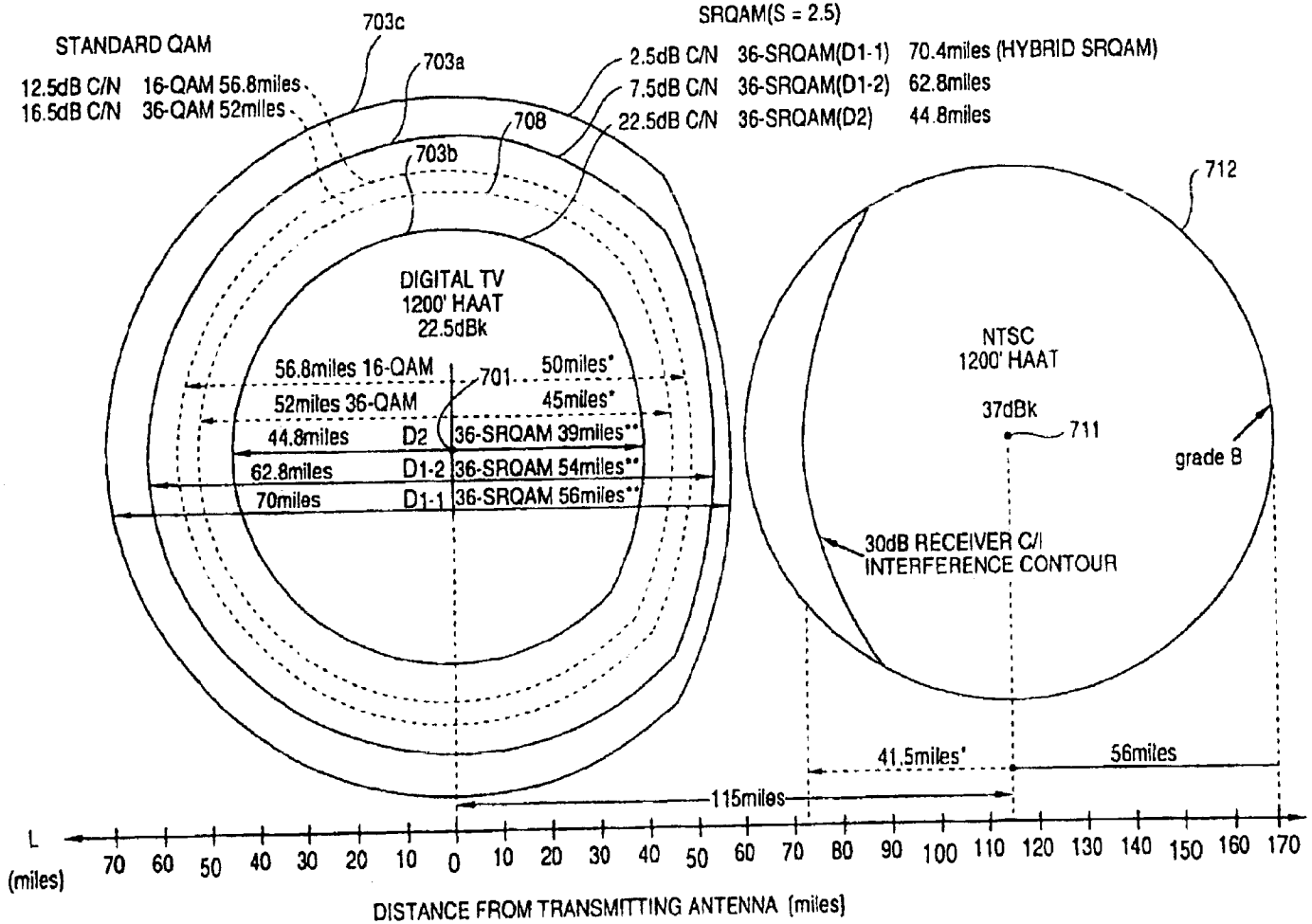
FIG. 106 is a diagram showing a service area of the 32 SRQAM signal of the third embodiment.

In case of the 32 SRQAM signal of the present invention or the 8-VSB shown in FIG. 68, *a* three-level signal transmission system is constituted as shown in FIGS. 133 and 137. This permits a low resolution NTSC signal of MPEG level to be carried on the 1-1 data stream $D_{1-1}$, a medium resolution TV data of e.g. NTSC system to be carried on the 1-2 data stream $D_{1-2}$, and a high frequency component of HDTV data to be carried on the second data stream $D_2$. Accordingly, the service area of the 1-2 data stream of the SRQAM signal is increased to a 70 mile point 910a while *that* of the second data stream remains within a 55 mile point 910b, as shown in FIG. 105. FIG. 106 illustrates a computer simulation result of the service area of the 32 SRQAM signal of the present invention, which is similar to FIG. 53 but explains it in more detail. As shown, the regions 708, 703c, 703a, 703b, and 712 represent a conventional 32 QAM receivable area, a 1-1 data level $D_{1-1}$ receivable area, a 1-2 data level $D_{1-2}$ receivable area, a second data level $D_2$ receivable area, and a service area of a neighboring analogue TV station respectively. The conventional 32 QAM signal data used in this drawing is based on a conventionally disclosed one.

For common 32 QAM signal, the 60-mile-radius service area can be established theoretically. The signal level will however be attenuated by geographical or weather conditions and particularly, considerably declined [at] near the limit of the service area.

Figure 107:
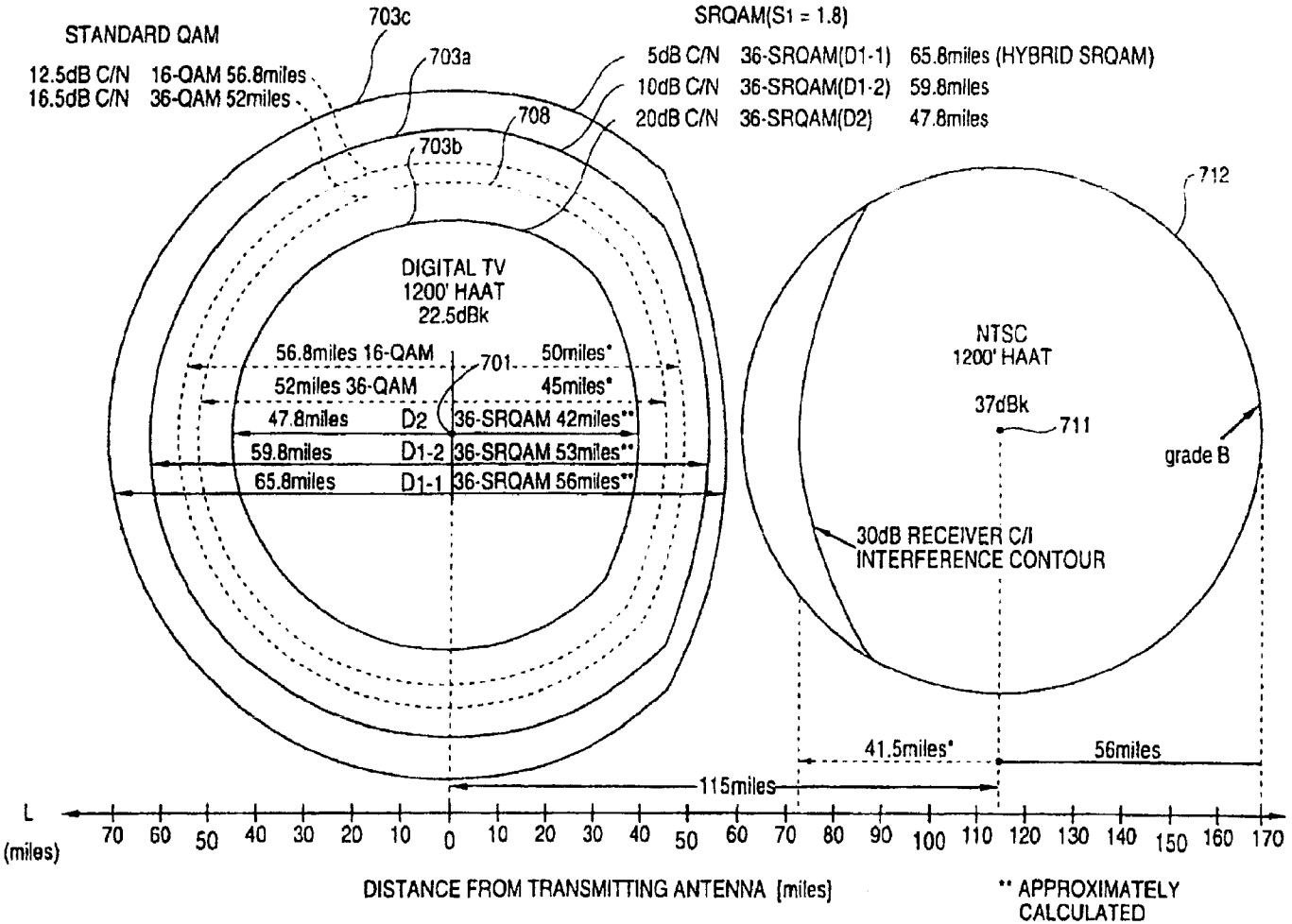
FIG. 107 is a diagram showing a service area of the 32 SRQAM signal of the third embodiment.

If the low frequency band TV component of MPEG1 grade is carried on the 1-1 level $D_{1-1}$ data and the medium frequency band TV component of NTSC grade on the 1-2 level $D_{1-2}$ data and high frequency band TV component of HDTV on the second level $D_2$ data, the service area of the 32 SRQAM signal of the present invention is increased by 10 miles in radius for reception of an EDTV signal of medium resolution grade and 18 miles for reception of an LDTV signal of low resolution grade although decreased by 5 miles for reception of an HDTV signal of high resolution grade, as shown in FIG. 106. FIG. 107 shows a service area in case of a shift factor n or s=1.8. FIG. 135 shows the service area of FIG. 107 in terms of area.

More particularly, the medium resolution component of a digital TV broadcast signal of the SRQAM mode of the preset invention can successfully be intercepted in an unfavorable service region or shadow area where a conventional medium frequency band TV signal is hardly propagated and attenuated due to obstacles. Within at least the predetermined service area, the NTSC TV signal of the SRQAM mode can be intercepted by any traditional TV receiver. As the shadow or signal attenuating area developed by building structures and other obstacles or by interference of a neighbor analogue TV signal or produced in a low land is decreased to a minimum, TV viewers or subscribers will be increased in number.

Also, the HDTV service can be appreciated by only a few viewers who afford to have a set of high cost HDTV receiver and display, according to the conventional system. The system of the present invention allows a traditional NTSC, PAL, or SECAM receiver to intercept a medium resolution components of the digital HDTV signal with the use of an additional digital tuner. A majority of TV viewers can hence enjoy the service at less cost and will be increased in number. This will encourage the TV broadcast business and create an extra social benefit.

Furthermore, the signal receivable area for medium resolution or NTSC TV service according to the present invention is increased about 36% at n=2.5, as compared with the conventional system[,]. As the service area thus the number of TV viewers is increased, the TV broadcast business enjoys an increasing profit. This reduces a risk in the development of a new digital TV business which will thus be encouraged to put into practice.

FIG. 107 shows the service area of a 32 SRQAM signal of the present invention in which the same effect will be ensured at n=1.8. Two service areas 703a and 703b, of $D_1$ and $D_2$ signals respectively can be determined in extension for optimum signal propagation by varying the shift n considering a profile of HDTV and NTSC receiver distribution or geographical features. Accordingly, TV viewers will satisfy the service and a supplier station will enjoy a maximum of viewers.

This advantage is given when:

$$n>1.0$$

Hence, if the 32 SRQAM signal is selected, the shift n is determined by:

$$1<n<5$$

Also, if the 16 SRQAM signal is employed, n is determined by:

$$1<n<3$$

In the SRQAM mode signal terrestrial broadcast service in which the first and second data levels are created by shifting corresponding signal points as shown in FIGS. 99 and 100, the advantage of the present invention will be given when the shift n in a 16, 32, or 64 SRQAM signal is more than 1.0.

In the above embodiments, the low and high frequency band components of a video signal are transmitted as the first and second data streams. However, the transmitted signal may be an audio signal. In this case, low frequency or low resolution components of an audio signal may be transmitted as the first data stream, and high frequency or high resolution components of the audio signal may be transmitted as the second data stream. Accordingly, it is possible to receive high C/N portion in high sound quality, and low C/N portion in low sound quality. This can be utilized in PCM broadcast, radio, portable telephone and the like. In this case, the broadcasting area or communication distance can be expanded as compared with the conventional systems.

Furthermore, the third embodiment can incorporate a time division multiplexing (TDM) system as shown in FIG. 133.

Utilization of the TDM makes it possible to increase the number of subchannels. An ECC encoder 743a and ECC encoder 743b, provided in two subchannels, differentiate ECC code gains so as to make a difference between thresholds of these two subchannels, whereby an increase in the number of channels of the multi-level signal transmission can be realized. In this case, it is also possible to provide the ECC encoder, such as two Trellis encoders 743a and 743b for VSB-ASK signals of 4 VSB, 8 VSB, 16 VSB as shown in FIG. 137 and differentiate their code gains. The explanation of this block diagram is substantially identical to that of later described block diagram of FIG. 131 which shows sixth embodiment of the present invention and, therefore, will not be described here.

FIG. 131 is a block diagram of the magnetic recording and reproducing apparatus, and FIG. 137 is a block diagram of the transmission apparatus.

Figure 84:
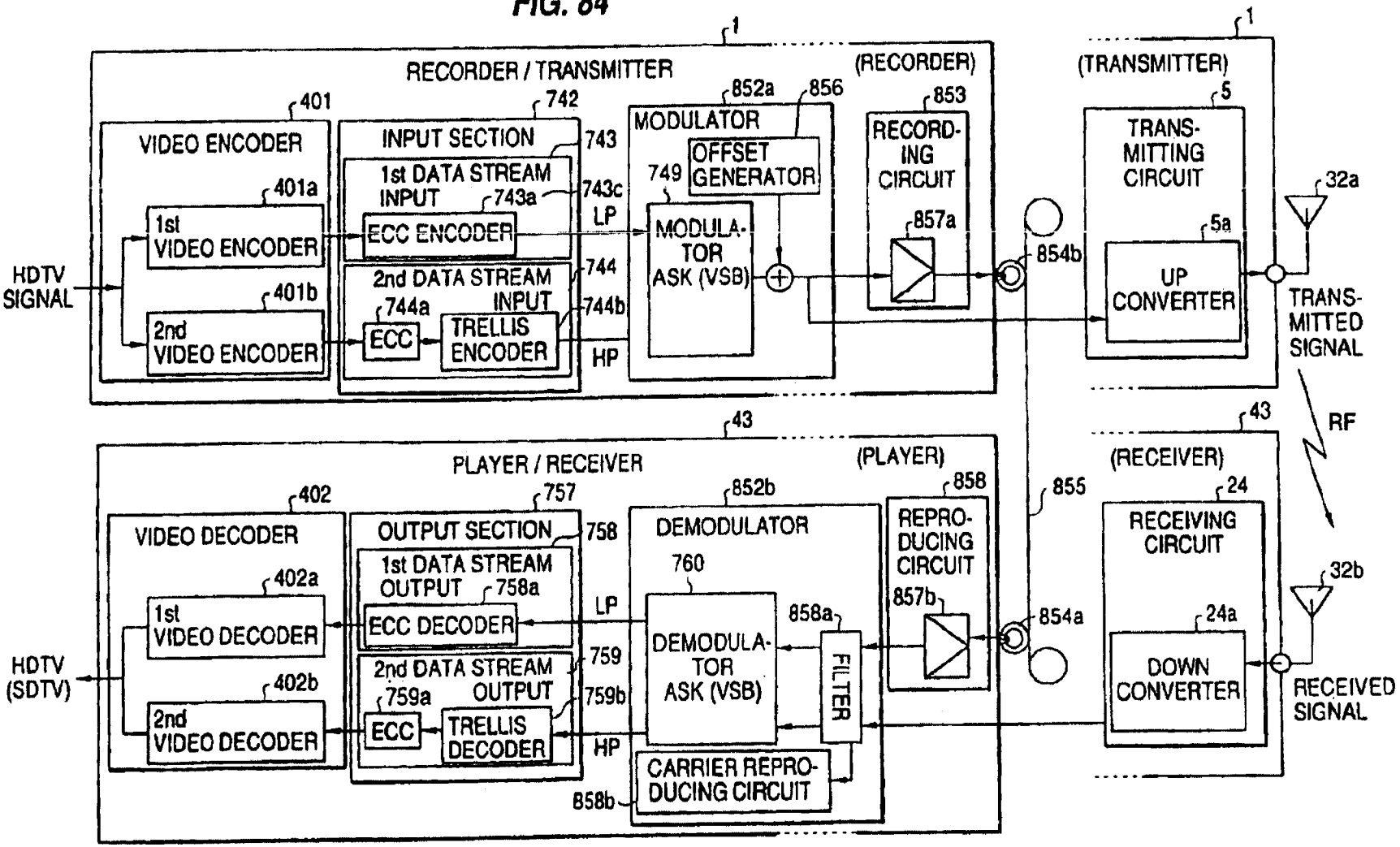
FIG. 84 is a block diagram of a magnetic record/playback apparatus of the fifth embodiment.

The up converter of the transmitter and the down converter of the receiver of the transmission apparatus can be substituted for the magnetic head recording signal amplifier circuit and the magnetic head reproducing signal amplifier circuit of the magnetic recording and reproducing apparatus, respectively, and there respective components are therefore identically constructed. The configuration and operation of the modulator and demodulator of the magnetic recording and reproducing apparatus are therefore also identical to those of the transmission apparatus. Similarly, the recording/reproducing/transmission system shown in FIG. 84 is identical in construction to the transmission system shown in FIG. 156. To further simplify the system, the configuration shown in the block diagram of FIG. 157 can be used, or for even greater simplification the block diagram of FIG. 158 can be used.

In a simulation of FIG. 106, there is provided 5 dB difference of a coding gain between 1-1 subchannel $D_{1-1}$ and 1-2 subchannel $D_{1-2}$.

An SRQAM is the system applying a C-CDM (Constellation-Code Division Multiplex) of the present invention to a rectangle-QAM. A C-CDM, which is a multiplexing method independent of TDM or FDM, can obtain subchannels by dividing a constellation-code corresponding to a code. An increase of the number of codes will bring an expansion of transmission capacity, which is not attained by TDM or FDM alone, while maintaining almost perfect compatibility with conventional communication apparatus. Thus, C-CDM can bring excellent effects.

Although above embodiment combines the C-CDM and the TDM, it is also possible to combine the C-CDM with FDM (Frequency Division Multiplex) to obtain similar modulation effect of threshold values. Such a system can be used for a TV broadcasting, and FIGS. 108(a)–108(e) show [shows] a frequency distribution of a TV signal. A spectrum 725 represents a frequency distribution of a conventional analogue, e.g. NTSC, broadcasting signal. The largest signal is a video carrier 722. A color carrier 723 and a sound carrier 724 are not so large. There is known a method of using an FDM for dividing a digital broadcasting signal into two frequencies. In this case, a carrier is divided into a first carrier 726 and a second carrier 727 to transmit a first 720 and a second signal 721 respectively. Interference can be lowered by placing first and second carriers 726 and 727 sufficiently far from the video carrier 722. The first signal 720 serves to transmit a low resolution TV signal at a large output level, while the second signal 721 serves to transmit a high resolution TV signal at a small output level. Consequently, the multi-level signal transmission making use of an FDM can be realized without being bothered by obstruction.

FIG. 134 shows an example of a conventional method using a 32 QAM system. As the subchannel A has a larger output than the subchannel B, a threshold value for the subchannel A, i.e. a threshold 1, can be set small 4~5 dB than a threshold value for the subchannel B, i.e. a threshold 2. Accordingly, a two-level broadcasting having 4~5 dB threshold difference can be realized. In this case, however, a large reduction of signal reception amount will occur if the receiving signal level decreases below the threshold 2. Because the second signal 721a, having a large information amount as shaded in the drawing, cannot be received in such a case and only the first signal 720a, having a small information amount, is received. Consequently, a [pecture] *picture* quality brought by the second level will be extremely worse.

However, the present invention resolves this problem. According to the present invention, the first signal 720 is given by 32 SRQAM mode which is obtained through C-CDM modulation so that the subchannel A is divided into two subchannels 1 of A and 2 of A. The newly added subchannel 1 of A, having a lowest threshold value, carries a low resolution component. The second signal 721 is also given by 32 SRQAM mode, and a threshold value for the subchannel 1 of B is equalized with the threshold 2.

With this arrangement, the region in which a transmitted signal is not received when the signal level decreases below the threshold 2 is reduced to a shaded portion of the second signal 721a in FIG. 108. As the subchannel 1 of B and the subchannel A are both receivable, the transmission amount is not so much reduced in total. Accordingly, a better picture quality is reproduced even in the second level at the signal level of the threshold 2.

By transmitting a normal resolution component in one subchannel, it becomes possible to increase the number of multiple level and expand a low resolution service area. This low-threshold subchannel is utilized for transmitting important information such as sound information, sync information, headers of respective data, because these information carried on this low-threshold subchannel can be surely received. Thus stable reception is feasible. If a subchannel is newly added in the second signal 721 in the same manner, the number of levels of multi-level transmission can be increased in the service area. In the case where an HDTV signal has 1050 scanning line, [an] *a* new service area equivalent to 775 lines can be provided in addition to 525 lines.

Accordingly, the combination of the FDM and the C-CDM realizes an increase of service area. Although above embodiment divides a subchannel into two, it is needless to say it is also possible to divide it into three or more parts.

Figure 109:
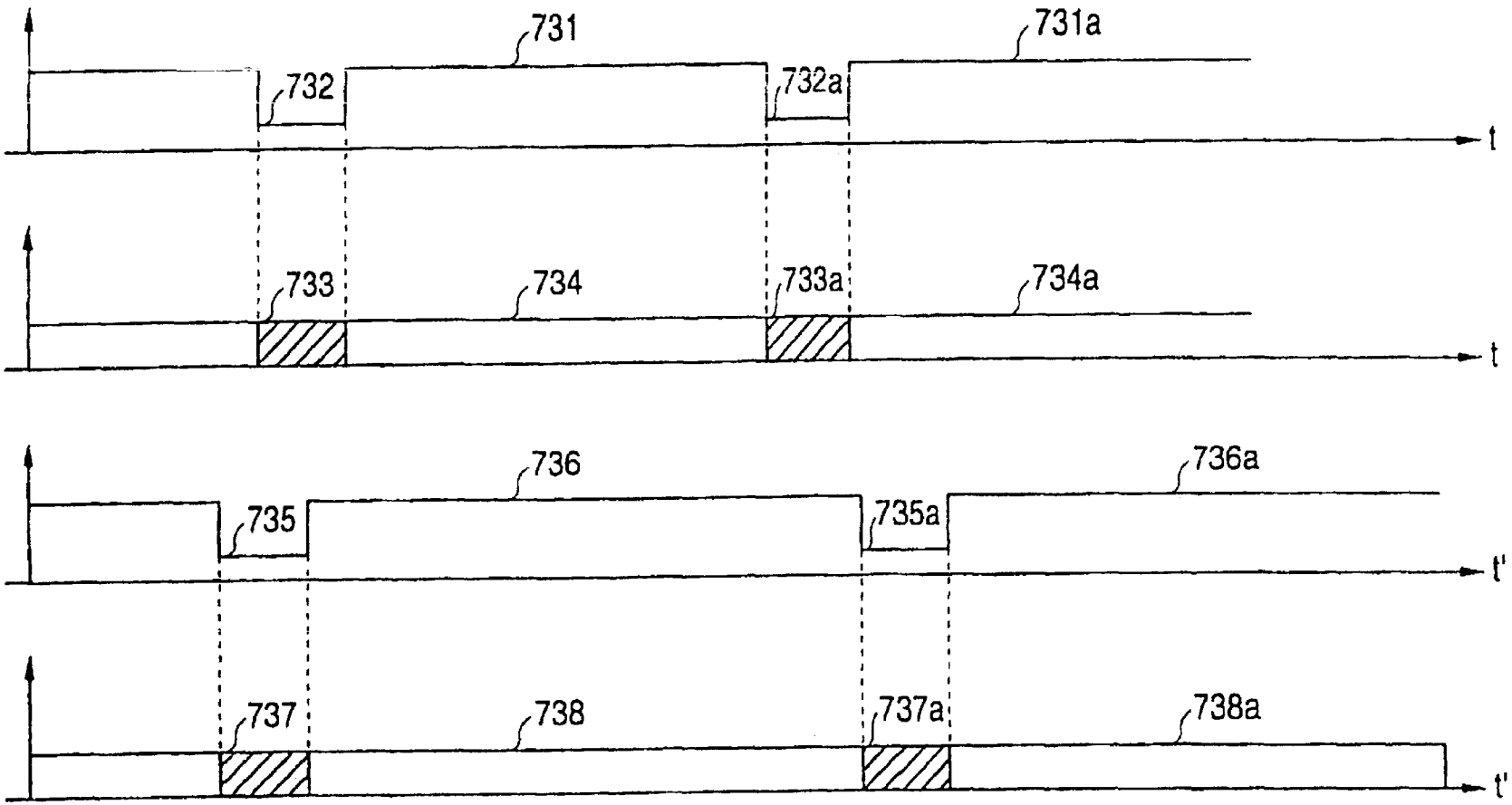
FIG. 109 is a diagram showing a time assignment of the TV signal of the third embodiment.

Next, a method of avoiding obstruction by combining the TDM and the C-CDM will be explained. As shown in FIG. 109, an analogue TV signal includes a horizontal retrace line portion 732 and a video signal portion 731. This method utilizes a low signal level of the horizontal retrace line portion 732 and non-display of obstruction on a picture plane during this period. By synchronizing a digital TV signal with an analogue TV signal, horizontal retrace line sync slots 733 and 733a of the horizontal retrace line portion 732 can be used for transmission of an important signal, e.g. a sync signal or numerous data at a high output level. Thus, it becomes possible to increase the data amount or output level without increasing obstruction. A similar effect will be expected even if vertical retrace line sync slots 737 and 737a are provided synchronously with vertical retrace line portions 735 and 735a.

Figure 110:
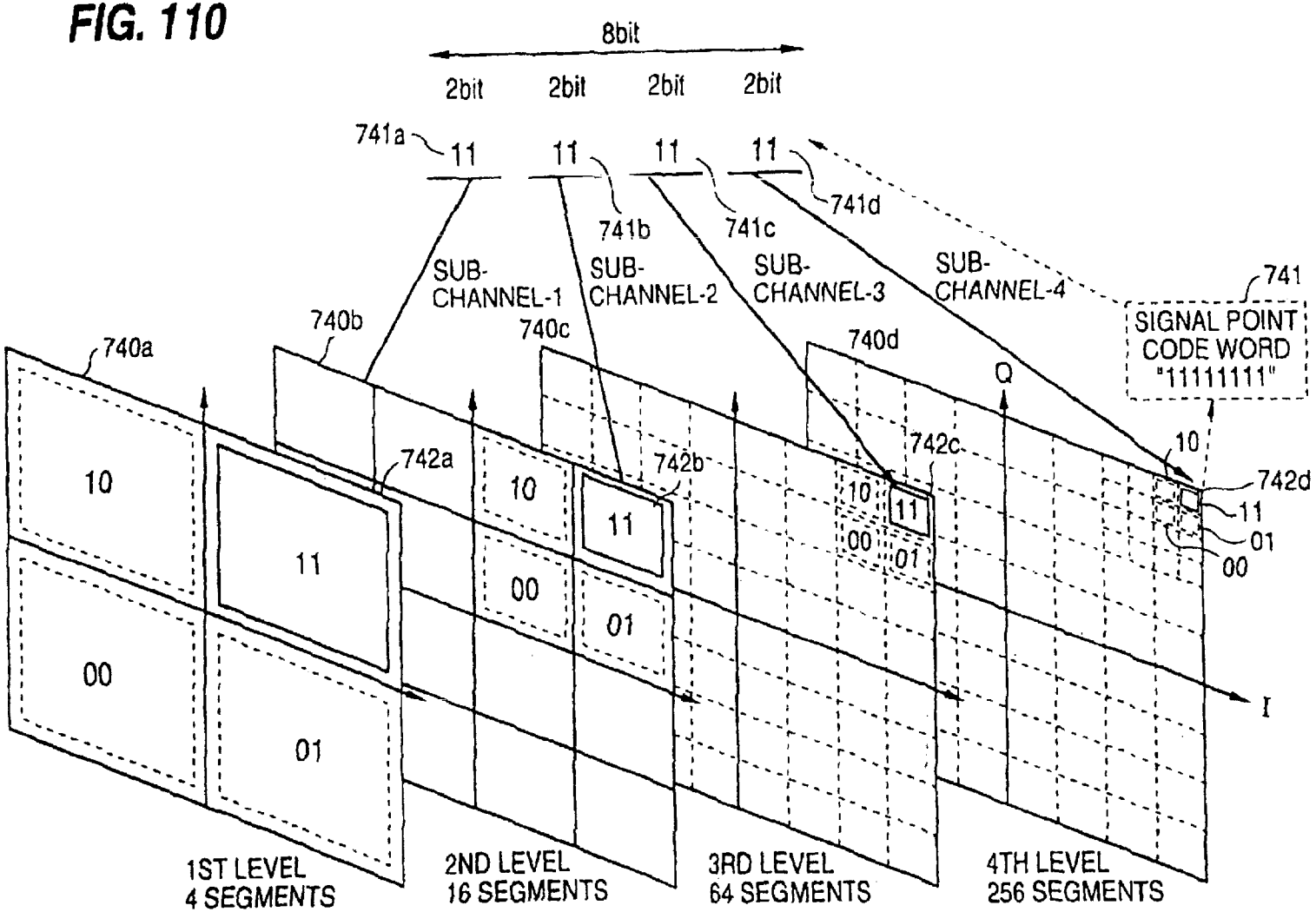
FIG. 110 is a diagram showing a principle of C-CDM of the third embodiment.
Figure 111:
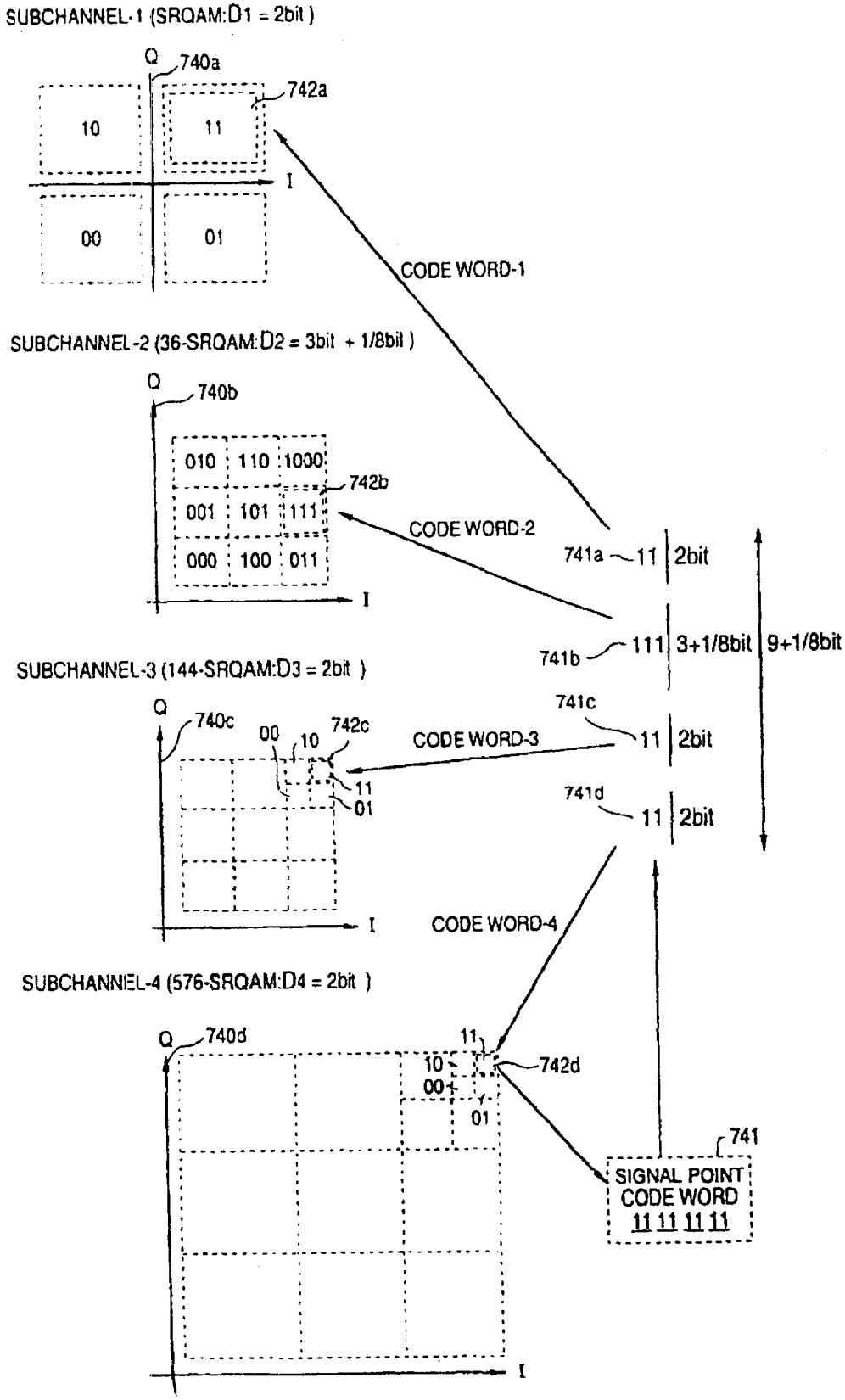
FIG. 111 is a view showing an assignment of codes according to the third embodiment.

FIG. 110 shows a principle of the C-CDM. Furthermore, FIG. 111 shows a code assignment of the C-CDM equivalent to an expanded 16 QAM. FIG. 112 shows a code assignment of the C-CDM equivalent to an expanded 32 QAM. As shown in FIGS. 110 and 111, a 256 QAM signal is divided into four, 740a, 740b, 740c, and 740d, levels which have 4, 16, 64, and 256 segments, respectively. A signal code word 742d of 256 QAM on the fourth level 740d is "11111111" of 8 bits. This is split into four code words 741a, 741b, 741c, and 741d of 2-bits—i.e. "11", "11", "11", "11", which are then allocated on signal point regions 742a, 742b, 742c, and 742d of first, second, third, and fourth levels 740a, 740b, 740c, and 740d, respectively. As a result, subchannels 1, 2, 3, and 4 of 2 bits are created. This is termed C-CDM (Constellation-Code Division Multiplex). FIG. 111 shows a detailed code assignment of the C-CDM equivalent to expanded 16 QAM, and FIG. 112 shows a detailed code assignment of the C-CDM equivalent to expanded 32 QAM. As the C-CDM is an independent multiplexing method, it can be combined with the conventional FDM (Frequency Division Multiplex) or TDM (Time Division Multiplex) to further increase the number of subchannels. In this manner, the C-CDM method realizes a novel multiplexing system. Although the C-CDM is explained by using rectangular QAM, other modulation system having signal points, e.g. QAM, PSK, ASK, and even FSK if frequency regions are regarded as signal points, can be also used for this multiplexing in the same manner.

For example, the error rate of the subchannel 1 of 8PS-APSK, explained in the embodiment 1 with reference to FIG. 139, will be expressed as follows:

$$[\mathrm{Pe}_{1-8} = \frac{1}{4}\mathrm{erfc}\left(\frac{\delta}{\sqrt{2\alpha}}\right) + \frac{1}{4}\mathrm{erfc}\left(\frac{(\mathrm{S}_1+1)\delta}{\sqrt{2\sigma}}\right)]$$

$$Pe_{1-8} = \frac{1}{4}erfc\left(\frac{\delta}{\sqrt{2\sigma}}\right) + \frac{1}{4}erfc\left(\frac{(S_1+1)\delta}{\sqrt{2\sigma}}\right)$$

The error rate of the subchannel 2 is expressed as follows:

$$\mathrm{Pe}_{2-8} = \frac{1}{2}\mathrm{erfc}\left(\frac{\mathrm{S}_1\delta}{2\sigma}\right)$$

Furthermore, the error rate of the subchannel 1 of 16-PS-APSK (PS type), explained with reference to FIG. 142, will be expressed as [follow] *follows*:

$$\mathrm{Pe}_{1-16} = \frac{1}{8}\mathrm{erfc}\left(\frac{\delta}{\sqrt{2\sigma}}\right) + \frac{1}{8}\mathrm{erfc}\left(\frac{(\mathrm{S}_2+1)\delta}{\sqrt{2\sigma}}\right) + \frac{1}{8}\mathrm{erfc}\left(\frac{(\mathrm{S}_1+1)\delta}{\sqrt{2\sigma}}\right) + \frac{1}{8}\mathrm{erfc}\left(\frac{(\mathrm{S}_1+\mathrm{S}_2+1)\delta}{\sqrt{2\sigma}}\right)$$

The error rate of the subchannel 2 is expressed as follows:

$$\mathrm{Pe}_{2-16} = \frac{1}{4}\mathrm{erfc}\left(\frac{\mathrm{S}_1\delta}{2\sigma}\right) + \frac{1}{8}\mathrm{erfc}\left(\frac{(\mathrm{S}_1-\mathrm{S}_2)\delta}{2\sigma}\right) + \frac{1}{8}\mathrm{erfc}\left(\frac{(\mathrm{S}_1+\mathrm{S}_2)\delta}{2\sigma}\right)$$

The error rate of the subchannel 3 is expressed as follows:

$$\mathrm{Pe}_{3-10} = \frac{1}{2}\mathrm{erfc}\left(\frac{\mathrm{S}_2\delta}{2\sigma}\right)$$

EMBODIMENT 4

A fourth embodiment of the present invention will be described referring to the relevant drawings.

Figure 37:
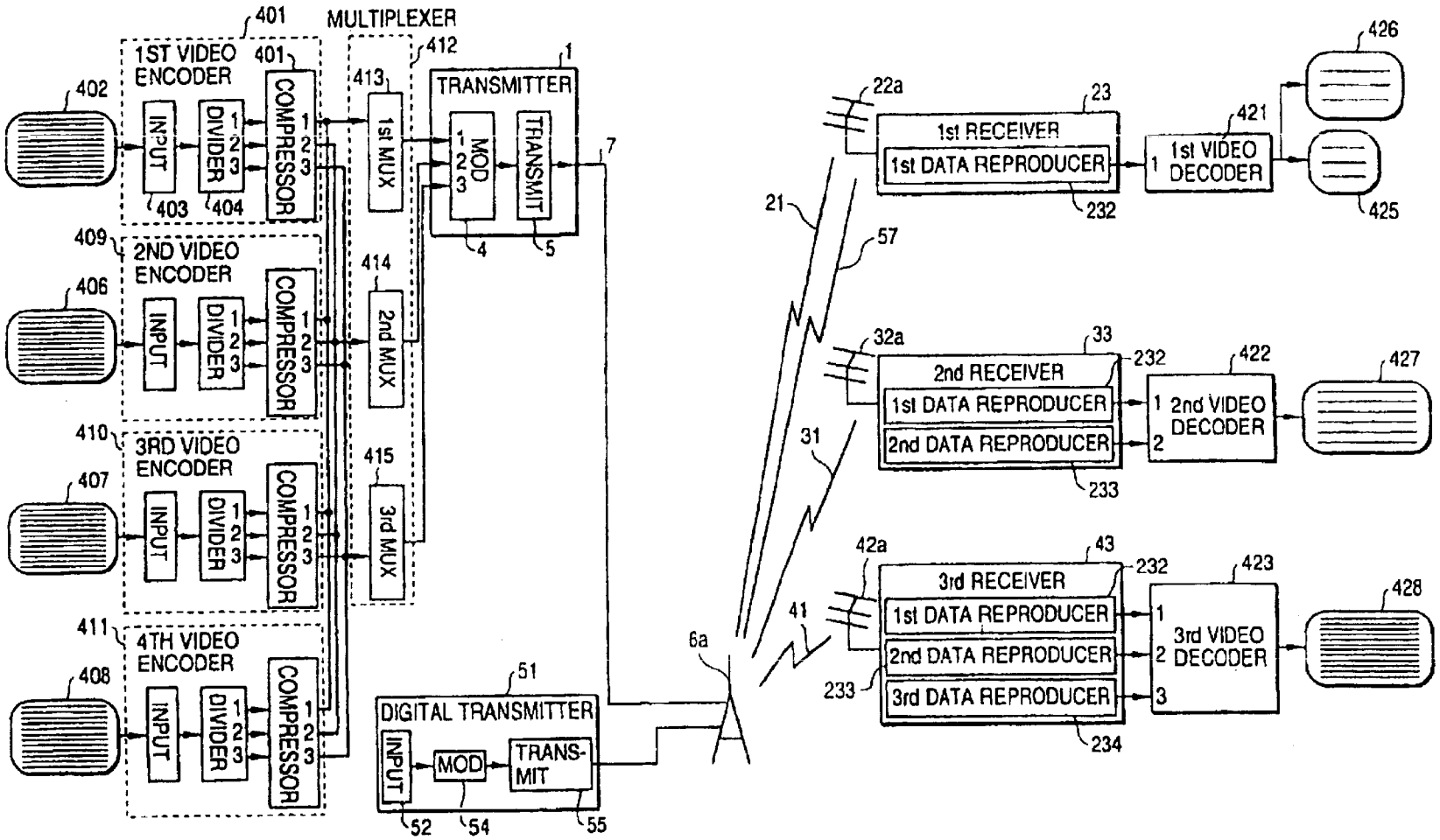
FIG. 37 is a schematic view of the entire arrangement of a signal transmission system showing a fourth embodiment of the present invention.

FIG. 37 illustrates the entire arrangement of a signal transmission system of the fourth embodiment, which is arranged for terrestrial service and similar in both construction and action to that of the third embodiment shown in FIG. 29. The difference is that the transmitter antenna 6 is replaced by a terrestrial antenna 6a and the receiver antennas 22, [23, and 24] *32, and 42* are also replaced by three terrestrial antennas 22a, [23a, and 24a] *32a, and 42a*. The action of the system is identical to that of the third embodiment and will not be explained in more detail. The terrestrial broadcast service unlike a satellite service depends much on the distance between the transmitter antenna 6a to the receiver antennas 22a, 32a, and 42a. If a receiver is located far from the transmitter, the level of a received signal is low. Particularly, a common multi-level QAM signal can hardly be demodulated by the receiver which thus reproduces no TV program.

The signal transmission system of the present invention allows the first receiver 23 equipped with the antenna 22a, which is located at a far distance as shown in FIG. 37, to intercept a modified 16 or 64 QAM signal and demodulated at 4 PSK mode the first data stream or $D_1$ component of the received signal to an NTSC video signal so that a TV program picture of medium resolution can be displayed even if the level of the received signal is relatively low.

Also, the second receiver 33 with the antenna 32a is located at a medium distance from the antenna 6a and can thus intercept and demodulate both first and second data streams or $D_1$ and $D_2$ components of the modified 16 or 64 QAM signal to an HDTV video signal which in turn produces an HDTV program picture.

The third receiver 43 with the antenna 42a is located at a near distance and can intercept and demodulate the first, second, and third data streams or $D_1$, $D_2$, and $D_3$ components of the modified 16 or 64 QAM signal to a super HDTV video signal which in turn produces a super HDTV picture in quality to a common movie picture.

The assignment of frequencies is determined by the same manner as of the time division multiplexing shown in FIGS. 34, 35, and 36. Like FIG. 34, when the frequencies are assigned to first to sixth channels, L1 of the $D_1$ component carries an NTSC data of the first channel, M1 of the $D_2$ component carries an HDTV difference data of the first channel, and H1 of the $D_3$ component carries a super HDTV difference data of the first channel. Accordingly, NTSC, HDTV, and super HDTV data all can be carried on the same channel. If $D_2$ and $D_3$ of the other channels are utilized as shown in FIGS. 35 and 36, more data of HDTV and super HDTV respectively can be transmitted for higher resolution display.

As understood, the system allows three different but compatible digital TV signals to be carried on a single channel or using $D_2$ and $D_3$ regions of other channels. Also, the medium resolution TV picture data of each channel can be intercepted in a wider service area according to the present invention.

A variety of terrestrial digital TV broadcast systems employing a 16 QAM HDTV signal of 6 MHz bandwidth have been proposed. Those are however not compatible with the existing NTSC system and thus, have to be associated with a simulcast technique for transmitting NTSC signals of the same program on another channel. Also, such a common 16 QAM signal limits a service area. The terrestrial service system of the present invention allows a receiver located at a relatively far distance to intercept successfully a medium resolution TV signal with no use of an additional device nor an extra channel.

Figure 52:
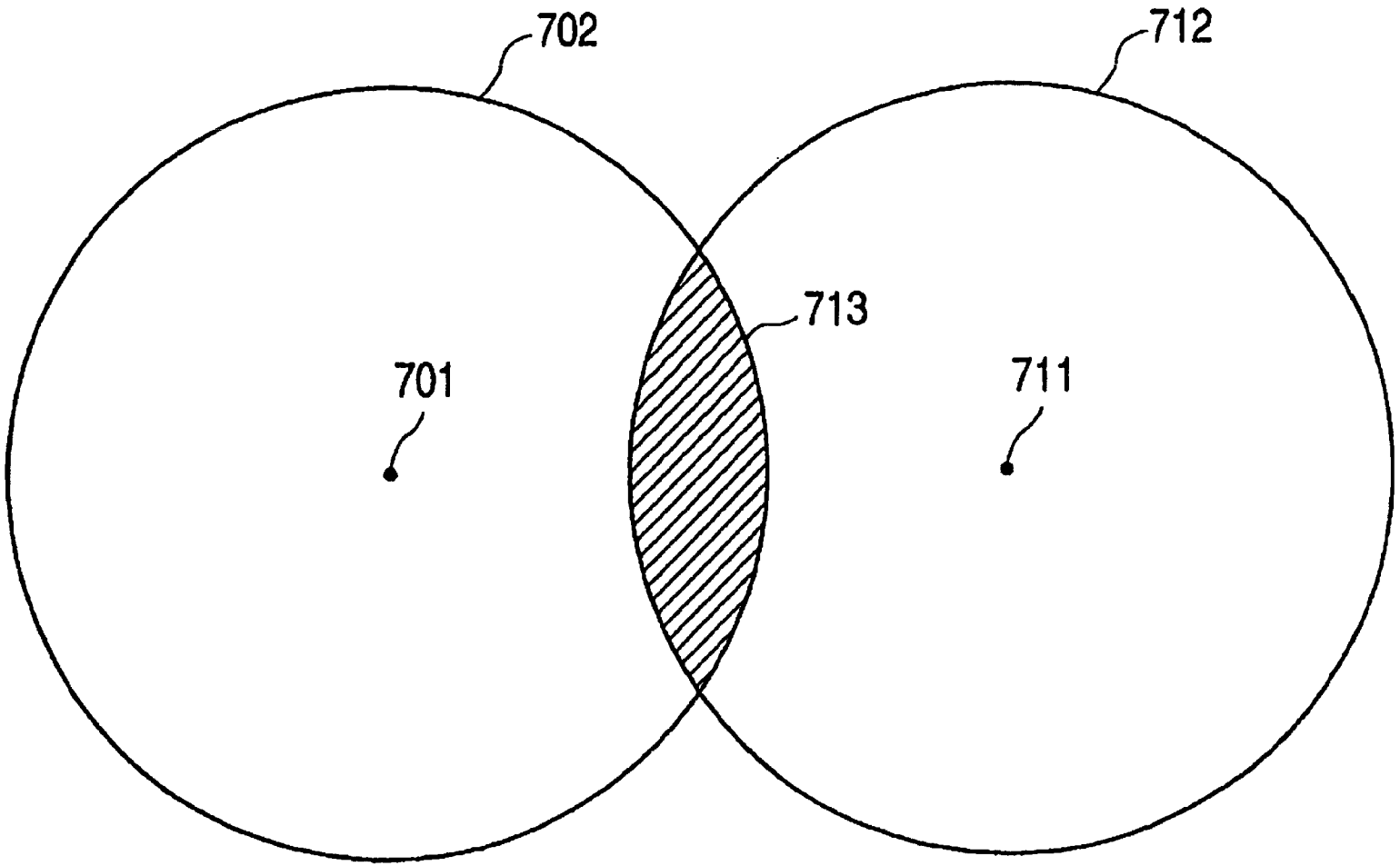
FIG. 52 is a diagram showing a signal interference region in a known transmission method according to the fourth embodiment.

FIG. 52. shows an interference region of the service area 702 of a conventional terrestrial digital HDTV broadcast station 701. As shown, the service area 702 of the conventional HDTV station 701 intersects with the service area 712 of a neighboring analogue TV station 711. At the intersecting region 713, an HDTV signal is attenuated by signal interference from the analogue TV station 711 and will thus be intercepted with less consistency.

Figure 53:
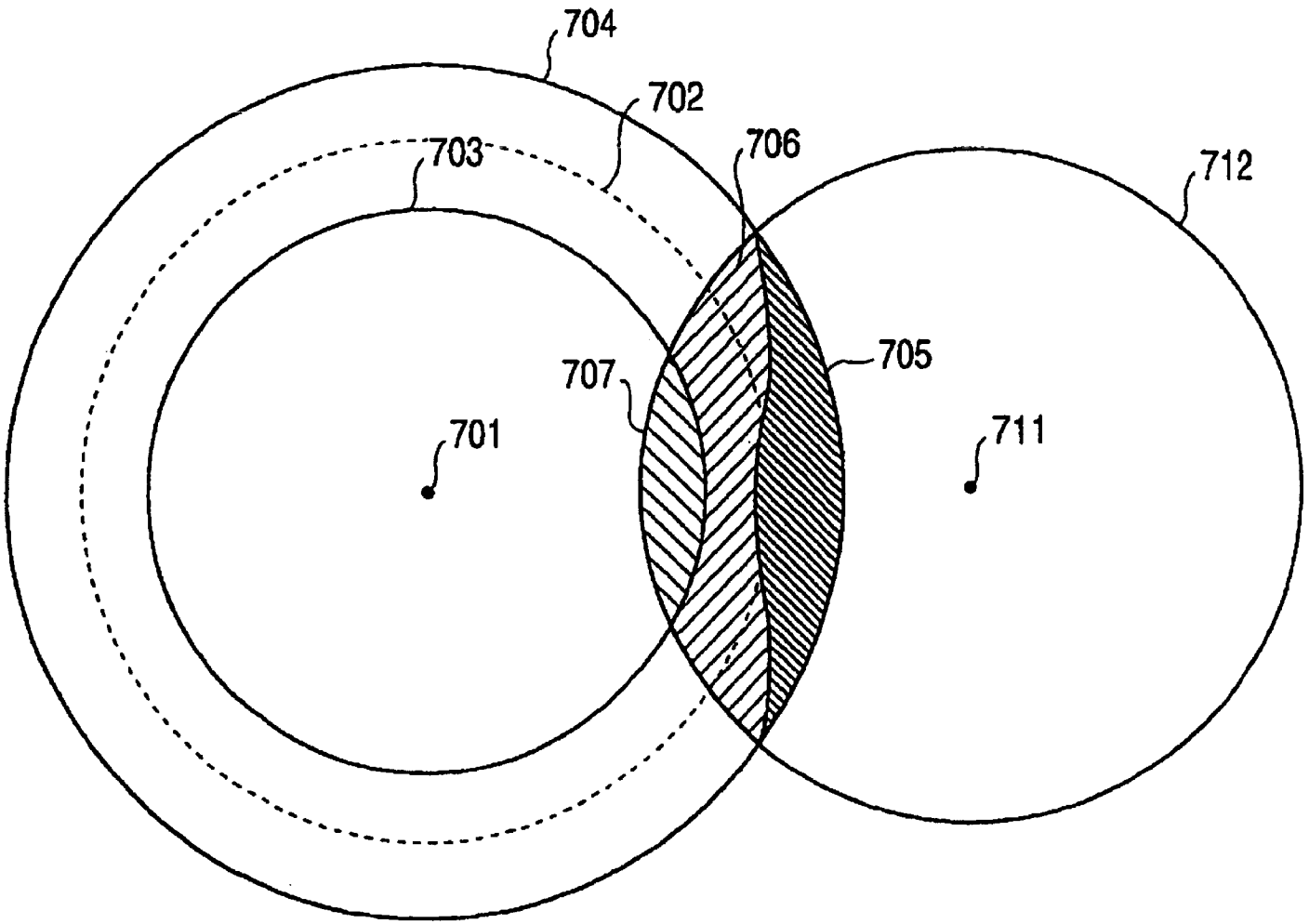
FIG. 53 is a diagram showing signal interference regions in a multi-level signal transmission method according to the fourth embodiment.

FIG. 53 shows an interference region associated with the multi-level signal transmission system of the present invention. The system is low in the energy utilization as compared with a conventional system and its service area 703 for HDTV signal propagation is smaller than the area 702 of the conventional system. On the contrary, the service area 704 for digital NTSC or medium resolution TV signal propagation is larger than the conventional area 702. The level of signal interference from a digital TV station 701 of the system to a neighboring analogue TV station 711 is equivalent to that from a conventional digital TV station, such as shown in FIG. 52.

In the service area of the digital TV station 701, there are three interference regions developed by signal interference from the analogue TV station 711. Both HDTV and NTSC signals can hardly be intercepted in the first region 705. Although fairly interfered, an NTSC signal may be intercepted at an equal level in the second region 706 denoted by the left down hatching. The NTSC signal is carried on the first data stream which can be reproduced at a relatively low C/N rate and will thus be [minimum] *minimally* affected when the C/N rate is declined by signal interference from the analogue TV station 711.

At the third region 707 denoted by the right down hatching, an HDTV signal can also be intercepted when signal interference is absent while the NTSC signal can constantly be intercepted at a low level.

Accordingly, the overall signal receivable area of the system will be increased although the service area of HDTV signals becomes a little bit smaller than that of the conventional system. Also, at the signal attenuating regions produced by interference from a neighboring analogue TV station, NTSC level signals of an HDTV program can successfully be intercepted as compared with the conventional system where no HDTV program is viewed in the same area. The system of the present invention much reduces the size of signal attenuating area and when increases the energy of signal transmission at a transmitter or transporter station, can extend the HDTV signal service area to an equal size to the conventional system. Also, NTSC level signals of a TV program can be intercepted more or less in a far distance area where no service is given by the conventional system or a signal interference area caused by an adjacent analogue TV station.

Figure 78:
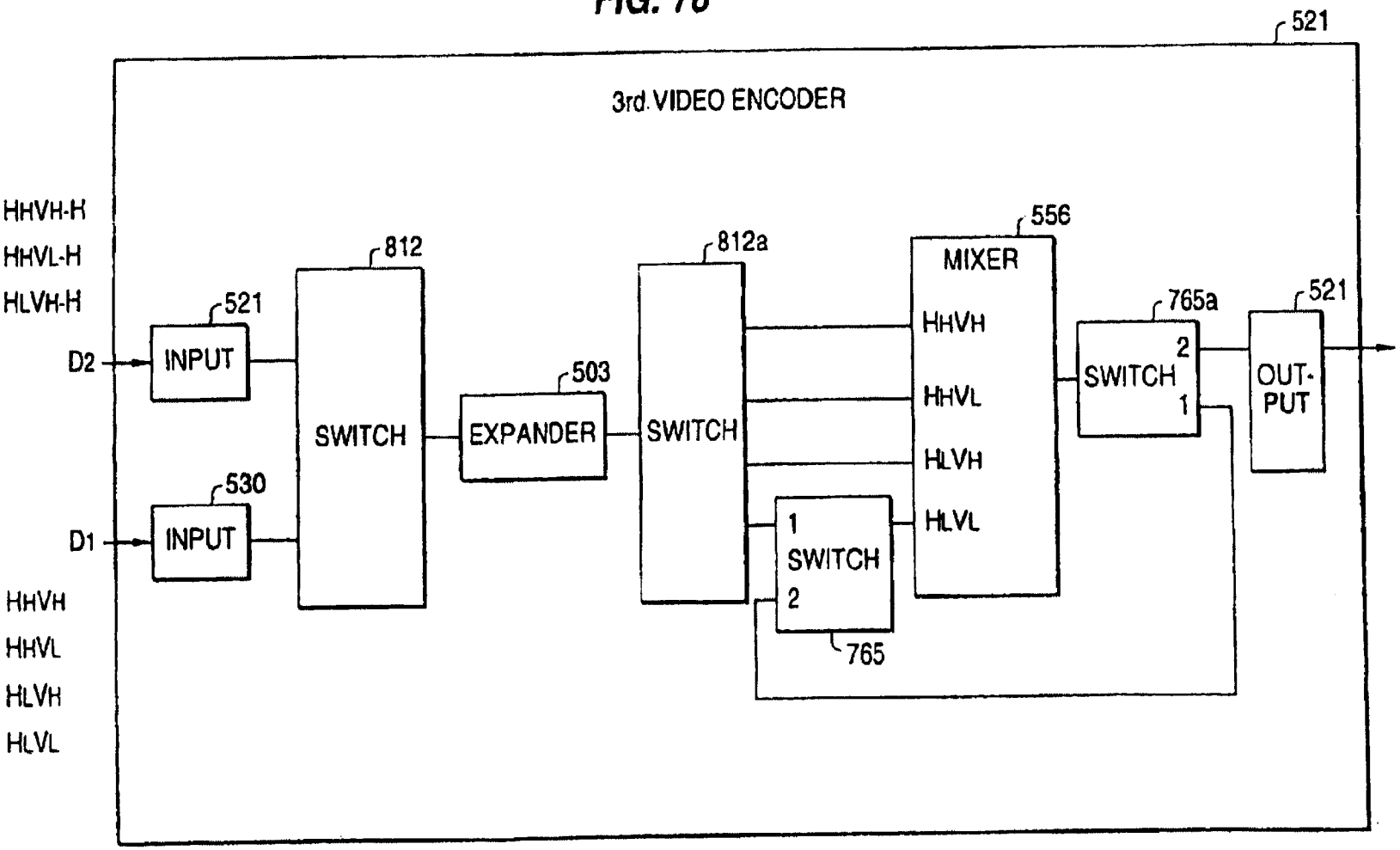
FIG. 78 is a block diagram of a video decoder of the fifth embodiment.

Although the embodiment employs a two-level signal transmission method, a three-level method such as shown in FIG. 78 will be used with equal success. If an HDTV signal is divided into three picture levels-HDTV, NTC, and low resolution NTSC, the service area shown in FIG. 53 will be increased from two levels to three levels where the signal propagation is extended radially and outwardly. Also, low resolution NTSC signals can be received at an acceptable level at the first signal interference region 705 where NTSC signals are hardly [be] intercepted in the two-level system. As understood, the signal interference is also involved from a digital TV station to an analogue TV station.

Figure 54:
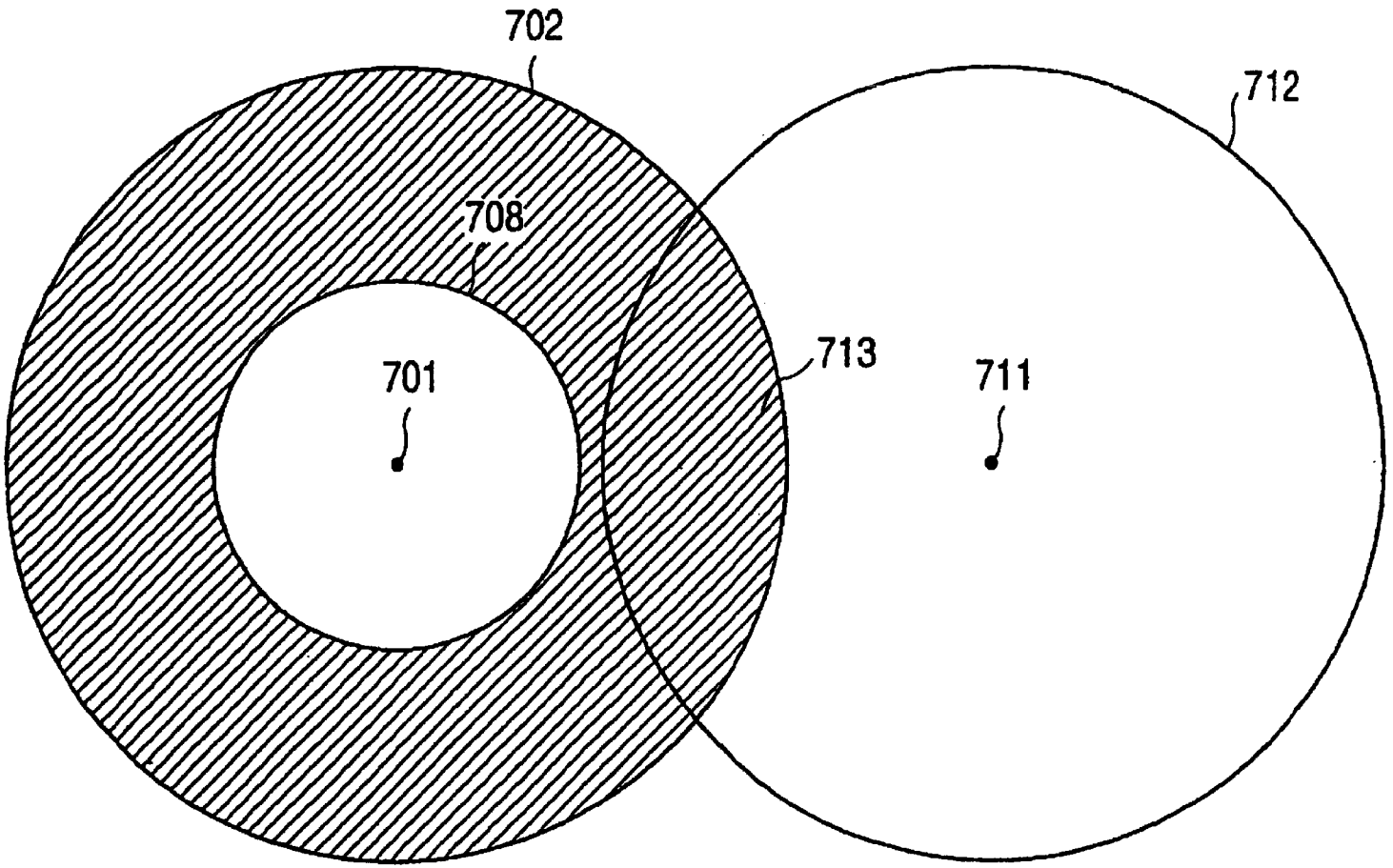
FIG. 54 is a diagram showing signal attenuating regions in the known transmission method according to the fourth embodiment.

The description will now be continued, provided that no digital TV station should cause a signal interference to any neighboring analogue TV station. According to a novel system under consideration in U.S.A., no-use channels of the existing service channels are utilized for HDTV and thus, digital signals must not interfere with analogue signals. For the purpose, the transmitting level of a digital signal has to be decreased lower than that shown in FIG. 53. If the digital signal is of conventional 16 QAM or 4 PSK mode, its HDTV service area 708 becomes decreased as the signal interference region 713 is fairly large as shown in FIG. 54. This results in a less number of viewers and sponsors, whereby such a digital system will have much difficulty in operating as a profitable business.

Figure 55:
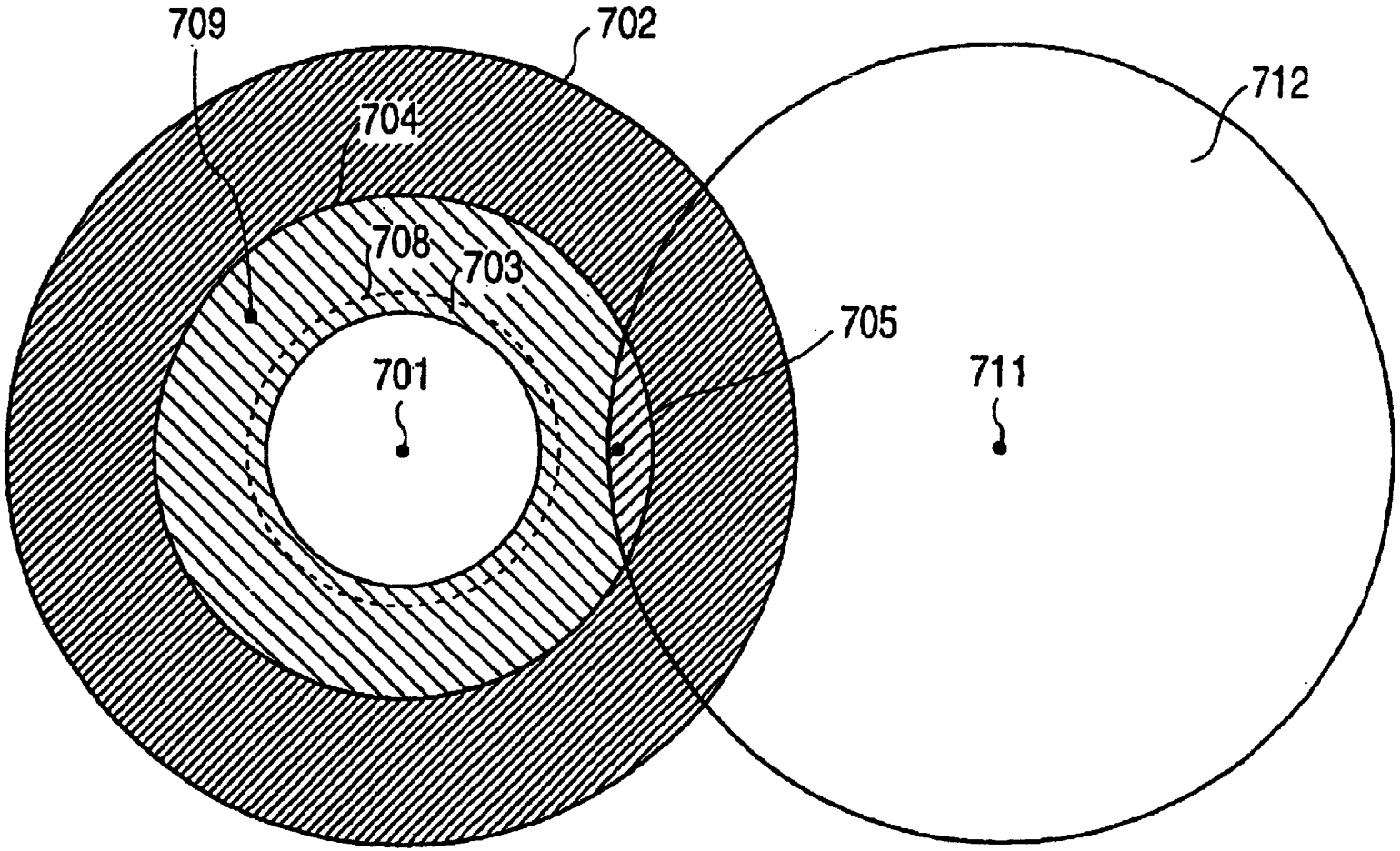
FIG. 55 is a diagram showing signal attenuating regions in the multi-level signal transmission method according to the fourth embodiment.

FIG. 55 shows a similar result according to the system of the present invention. As apparent, the HDTV signal receivable *area* 703 is a little bit smaller than the equal area 708 of the conventional system. However, the lower resolution or NTSC TV signal receivable area 704 will be increased as compared with the conventional system. The hatching area represents a region where the NTSC level signal of a program can be received while HDTV signal of the [seme]0 *same* is hardly intercepted. At the first interference region 705, both HDTV and NTSC signals cannot be intercepted due to signal interference from an analogue station 711.

When the level of signals is equal, the multi-level transmission system of the present invention provides a smaller HDTV service area and a greater NTSC service area for interception of an HDTV program at an NTSC signal level. Accordingly, the overall service area of each station is increased and more viewers can enjoy its TV broadcasting service. Furthermore, HDTV/NTSC compatible TV business can be operated with economical advantages and consistency. It is also intended that the level of a transmitting signal is increased when the control on averting signal interference to neighboring analogue TV stations is lessened corresponding to a sharp increase in the number of home-use digital receivers. Hence, the service area of HDTV signals will be increased and in this respect, the two different regions for interception of HDTV/NTSC and NTSC digital TV signal levels respectively, shown in FIG. 55, can be adjusted in proportion by varying the signal point distance in the first and/or second data stream. As the first data stream carries information about the signal point distance, a multi-level signal can be received with more certainty.

Figure 56:
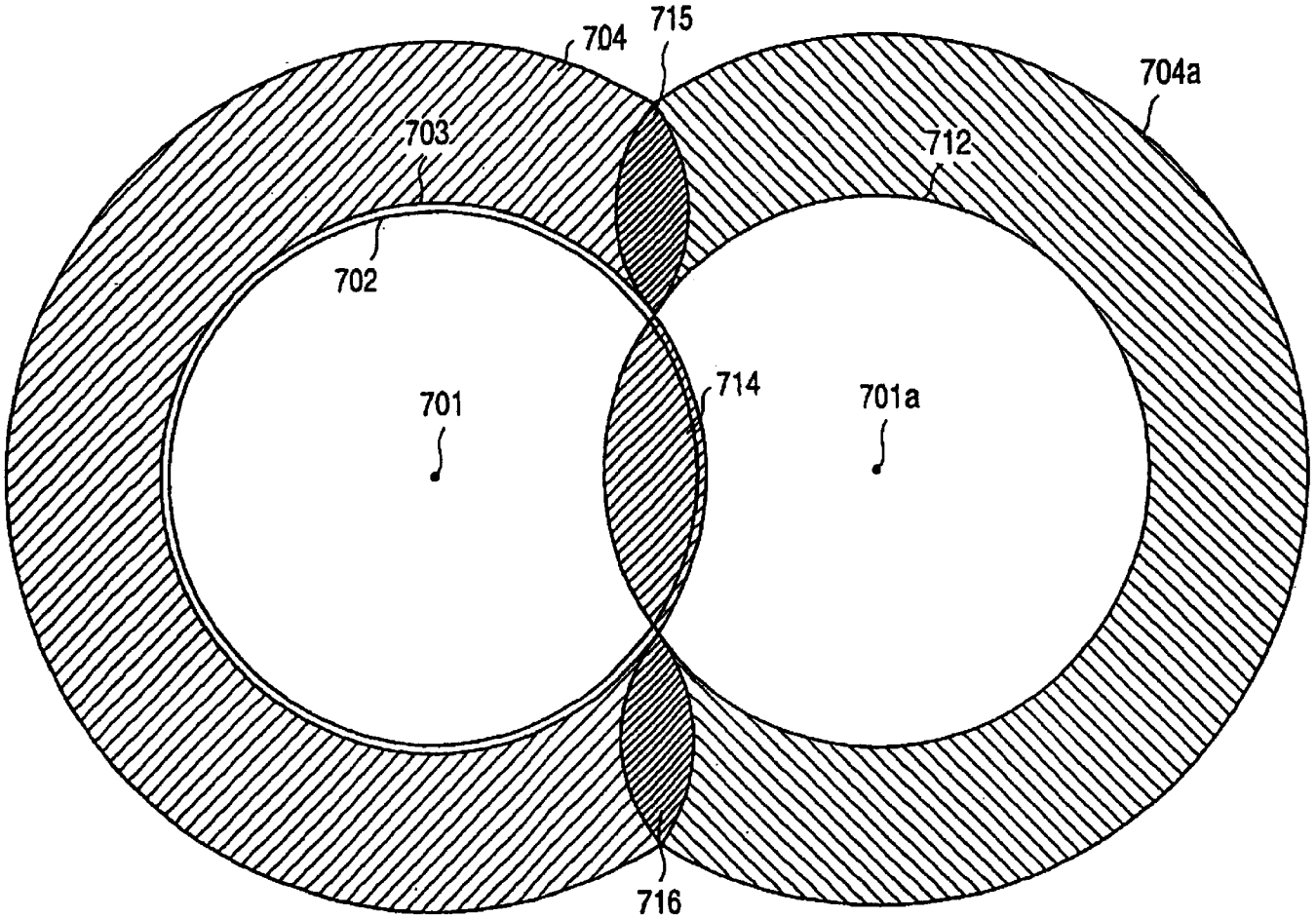
FIG. 56 is a diagram showing a signal interference region between two digital TV stations according to the fourth embodiment.

FIG. 56 illustrates signal interference between two digital TV stations in which a neighboring TV station 701a also provides a digital TV broadcast service, as compared with an analogue station in FIG. 52. Since the level of a transmitting signal becomes high, the HDTV service or high resolution TV signal receivable area 703 [in] *is* increased to an extension equal to the service area 702 of an analogue TV system.

At the intersecting region 714 between two service areas of their respective stations, the received signal can be reproduced not to an HDTV level picture using common directional antenna due to signal interference but to an NTSC level picture with a particular directional antenna directed towards a desired TV station. If a highly directional antenna is used, the received signal from a target station will be reproduced as an HDTV picture. The low resolution signal receivable area 704 is increased larger than the analogue TV system service area 702 and a pair of intersecting regions 715 and 716 developed by the two low resolution signal receivable areas 704 and 704a of their respective digital TV stations 701 and 701a permit the received signal from an antenna directed to one of the two stations to be reproduced as an NTSC level picture.

The HDTV service area of the multi-level signal transmission system of the present invention itself will be much increased when applicable signal restriction rules are withdrawn in a coming digital TV broadcast service maturity time.

At the time, the system of the present invention also provides as a wide HDTV signal receivable area as of the conventional system and particularly, allows its transmitting signal to be reproduced at an NTSC level in a further distance or intersecting areas where TV signals of the conventional system are hardly intercepted. Accordingly, signal attenuating or shadow regions in the service area will be minimized.

EMBODIMENT 5

Figure 57:
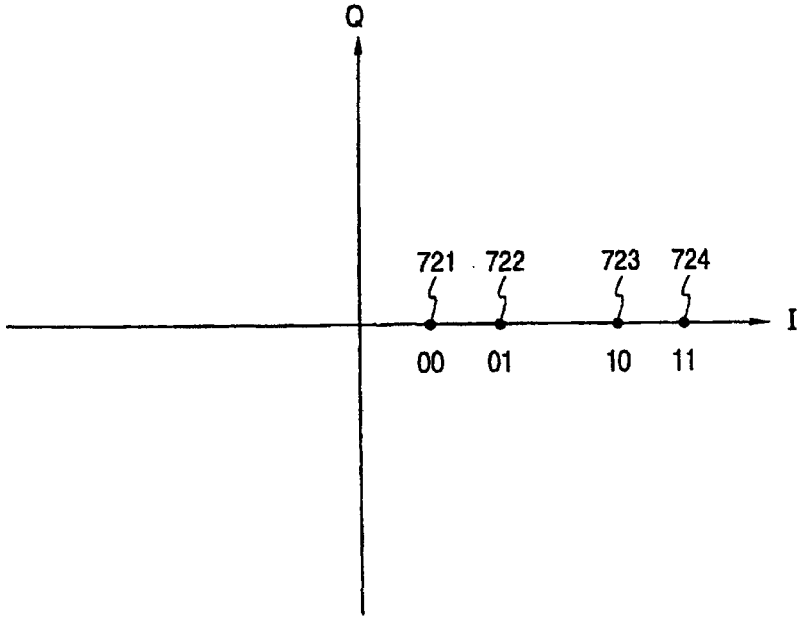
FIG. 57 is a diagram showing an assignment of signal points of modified 4 ASK signal of the fifth embodiment.

A fifth embodiment of the present invention resides in amplitude modulation or ASK procedure. FIG. 57 illustrates the assignment of signal points of a 4-level ASK signal, such as VSB signal, according to the fifth embodiment, in which four signal points are denoted by 721, 722, 723, and 724. FIG. 68(a) shows the constellation of 8-level VSB signal. The four-level transmission permits a 2-bit data to be transmitted in every cycle period where as the eight-level transmission permits a 4-bit data. It is assumed that the four signal points 721, 722, 723, and 724 in the case of 4 VSB represent two-bit patterns 00, 01, 10, and 11 respectively.

In FIG. 58, the constellation of 4-level ASK, such as 4-level VSB, is shown. For ease of four-level signal transmission of the embodiment, the two signal points 721 and 722 are designated as a first signal point group 725 and the other two signal points 723 and 724 are designated as a second signal point group 726. The distance between the two signal point groups 725 and 726 is then determined wider than that between any two adjacent signal points. More specifically, the distance $L_0$ between the two signals 722 and 723 is arranged wider than the distance L between the two adjacent points 721 and 722 or 723 and 724.

This is expressed as:

$$L_0>L$$

Hence, the multi-level signal transmission system of the embodiment is based on $L_0>L$. The embodiment is however not limited to $L_0>L$, and $L_0=L$ will be employed temporarily or permanently depending on the requirements of design, condition, and setting. In the case of VSB, the constellation shown in FIGS. 68(a) and (b) are taken.

Figure 59C:
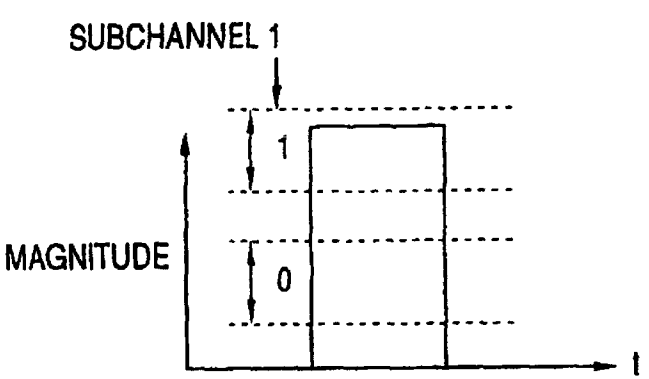
FIGS. 59(a) and 59(b) are diagrams showing assignment of signal points of the modified 4 ASK signal of the fifth embodiment and FIGS. 59(c) and 59(d) are diagrams respectively showing the slice levels of the modulated 4 ASK signal in subchannels 1 and 2.
Figure 59D:
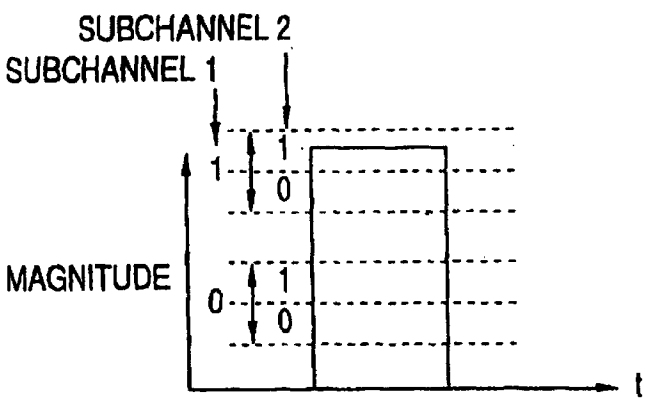
Figure 59A:
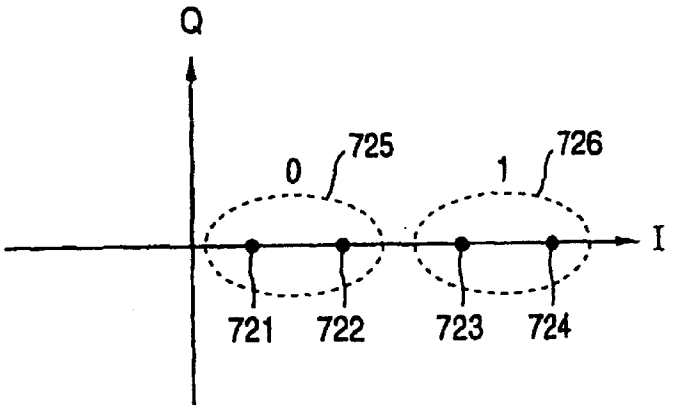
Figure 59B:
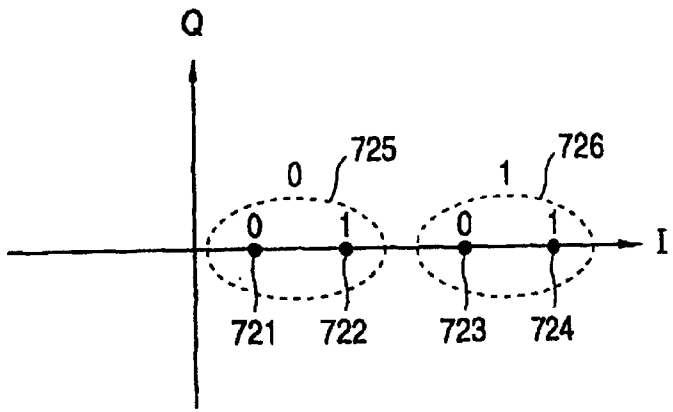

The two signal point [group] *groups* are assigned one-bit patterns of the first data stream $D_1$, as shown in FIG. 59(a). More particularly, a bit 0 of binary system is assigned to the first signal point group 725 and another bit 1 to the second signal point group 726. Then, a one-bit pattern of the second data stream $D_2$ is assigned to each signal point. For example, the two signal points 721 and 723 are assigned $D_2=0$ and the other two signal points 722 and 724 are assigned $D_2=1$.

Figure 60:
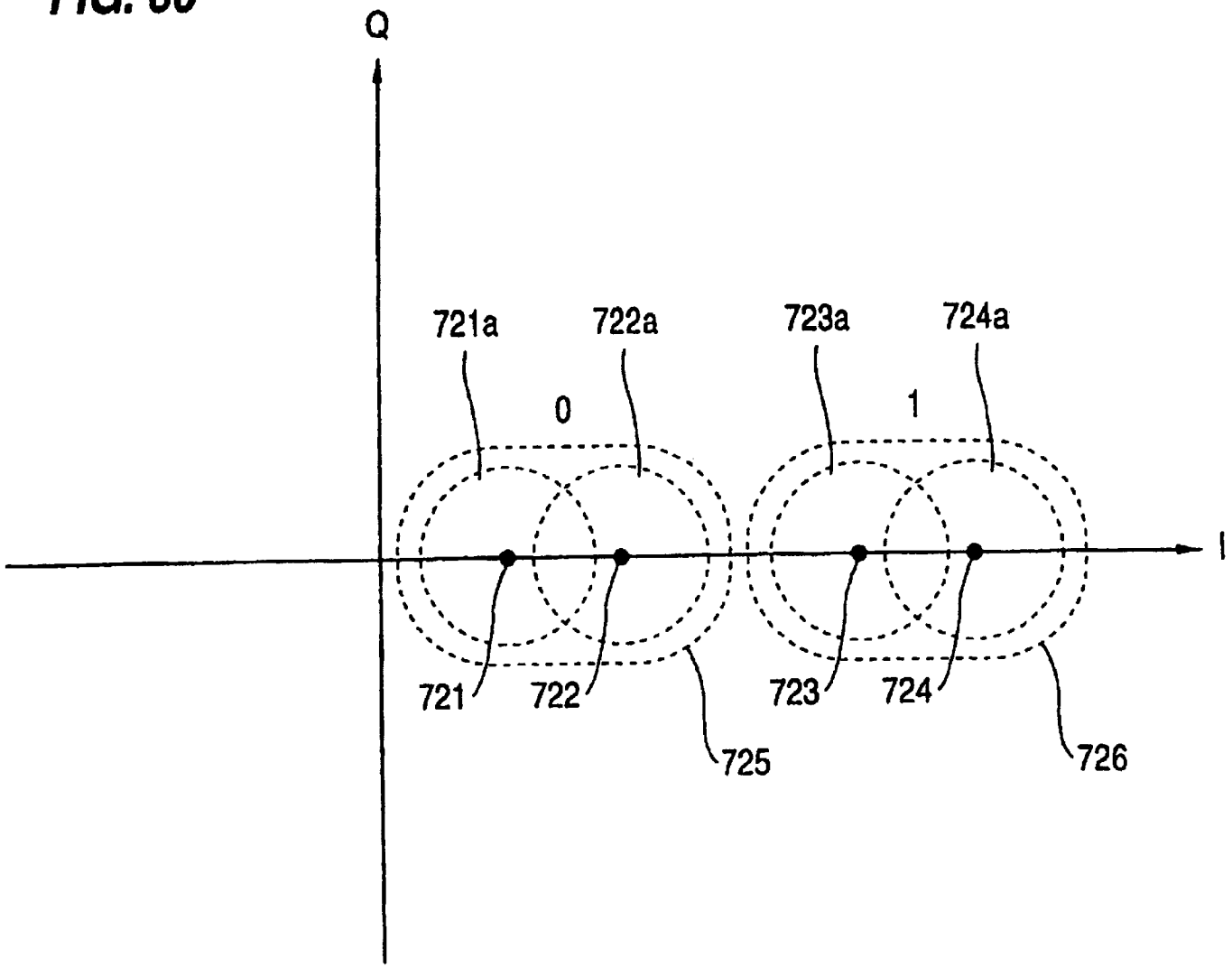
FIG. 60 is a diagram showing another assignment of signal points of the modified 4 ASK signal of the fifth embodiment when the C/N rate is low.

The multi-level signal transmission of the present invention can be implemented in an ASK mode using the foregoing signal point assignment. The system of the present invention works in the same manner as of a conventional equal signal point distance technique when the signal to noise ratio or C/N rate is high. If the C/N rate becomes low and no data can be reproduced by the conventional technique, the present system ensures reproduction of the first data stream $D_1$ but not the second data stream $D_2$. In more detail, the state at *a* low C/N is shown in FIG. 60 illustrating the constellation of ASK of 4 VSB. The signal points transmitted are displaced by a Gaussian [distrigution] *distribution* to ranges 721a, 722a, 723a, and 724a respectively at the receiver side due to noise and transmission distortion. Therefore, the distinction between the two signals 721 and 722 in the case of slice level 2 or between 723 and 724 in the case of slice level 4 will hardly be executed. In other words, the error rate in the second data stream $D_2$ will be increased. As apparent from FIG. 60, the two signal points 721 and 722 are easily distinguished from the other two signal points 723 and 724. The distinction between the two signal point groups 725 and 726 can thus be carried out with ease. As the result, the first data stream $D_1$ will be reproduced at a low error rate.

Accordingly, the two different level data $D_1$ and $D_2$ can be transmitted simultaneously. More particularly, both the first and second data streams $D_1$ and $D_2$ of a given signal transmitted through the multi-level transmission system can be reproduced at the area where the C/N rate is high and the first data stream $D_1$ only can be reproduced in the area where the C/N rate is low.

Figure 61:
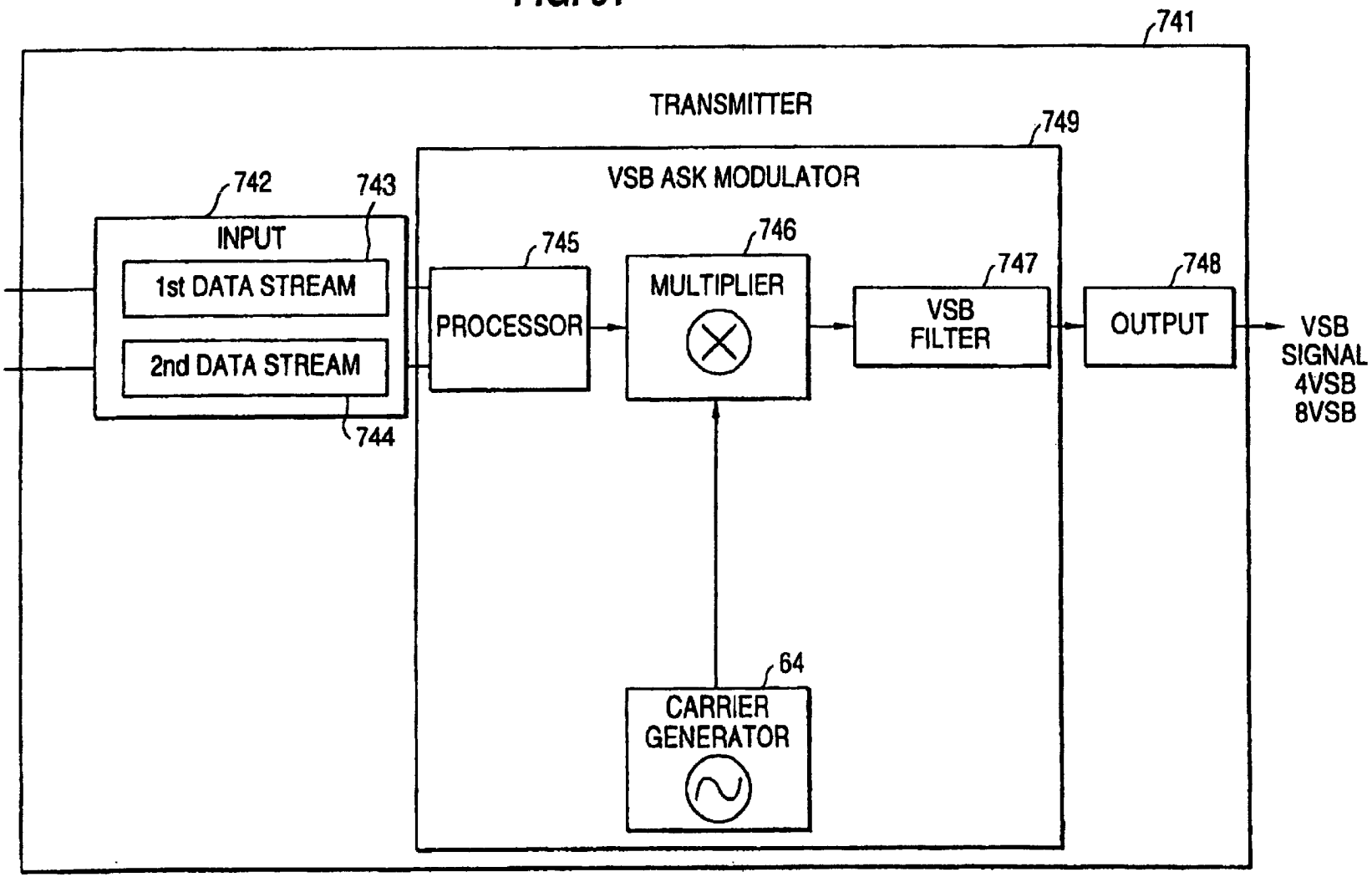
FIG. 61 shows a 4- and 8-level VSB transmitter according to the fifth embodiment of the invention.
Figure 62A:
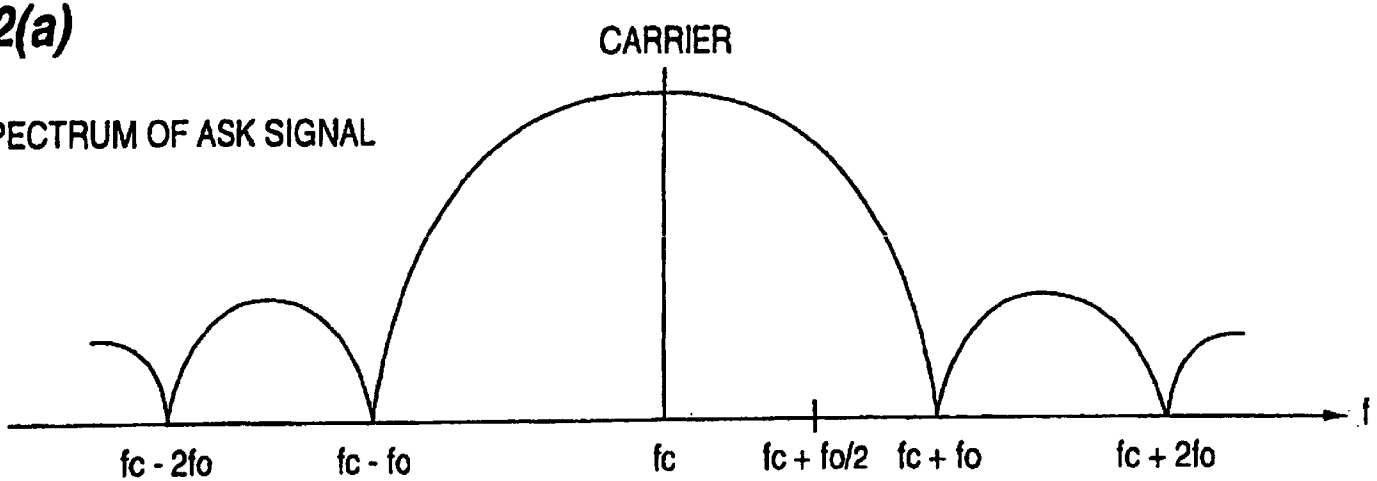
FIG. 62(a) is a wave spectrum diagram of the ASK signal, i.e., a multi-value VSB signal before filtering, in the fifth embodiment of the invention
Figure 62B:
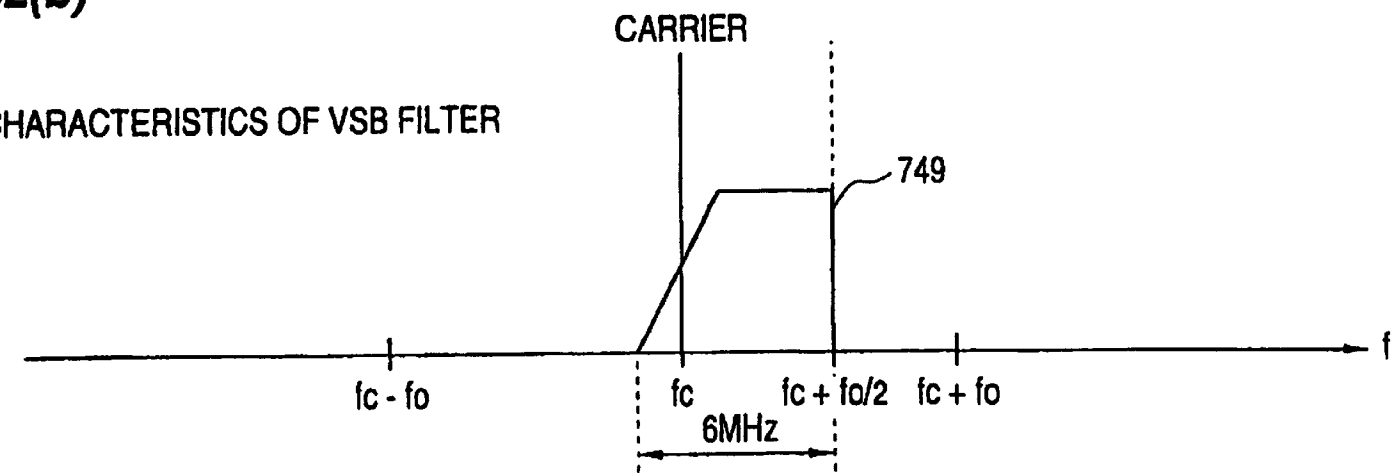
FIG. 62(b) is a wave spectrum diagram showing the characteristics of the filtered VSB signal.

FIG. 61 is a block diagram of a transmitter 741 in which an input unit 742 comprises a first data stream input 743 and a second data stream input 744. A carrier wave from a carrier generator 64 is amplitude modulated by a multiplier 746 using an input signal fed through a processor 745 from the input unit [743] *742* to provide the 4-level or 8-level ASK signal, as shown in FIG. 62(a). The modulated signal, i.e., the 4-level or 8-level ASK signal is then band limited by a band pass filter 747 into a vestigial side band having some residual side band of the carrier, as shown in FIG. 62(b), i.e., to an ASK signal of e.g. VSB mode which is then delivered from an output unit 748.

The waveform of the ASK signal after filtering will now be examined. FIG. 62(a) shows a frequency spectrum of the ASK modulated signal in which two sidebands are provided on both sides of the carrier frequency band. One of the two sidebands is eliminated by the filter 474 to produce a signal 749 which contains a carrier component as shown in FIG. 62(b). The signal 749 is a VSB signal and if the modulation frequency band is $f_0$, will be transmitted in a frequency band of about $f_0/2$. Hence, the frequency utilization becomes high. Using VSB mode transmission, the ASK signal of two bit per symbol shown in FIG. 60 can thus carry in the same frequency band an amount of data equal to that of 16 QAM mode at four bits per symbol for 4 VSB, and 32 QAM mode at five bits per symbol for 8 VSB.

Figure 63:
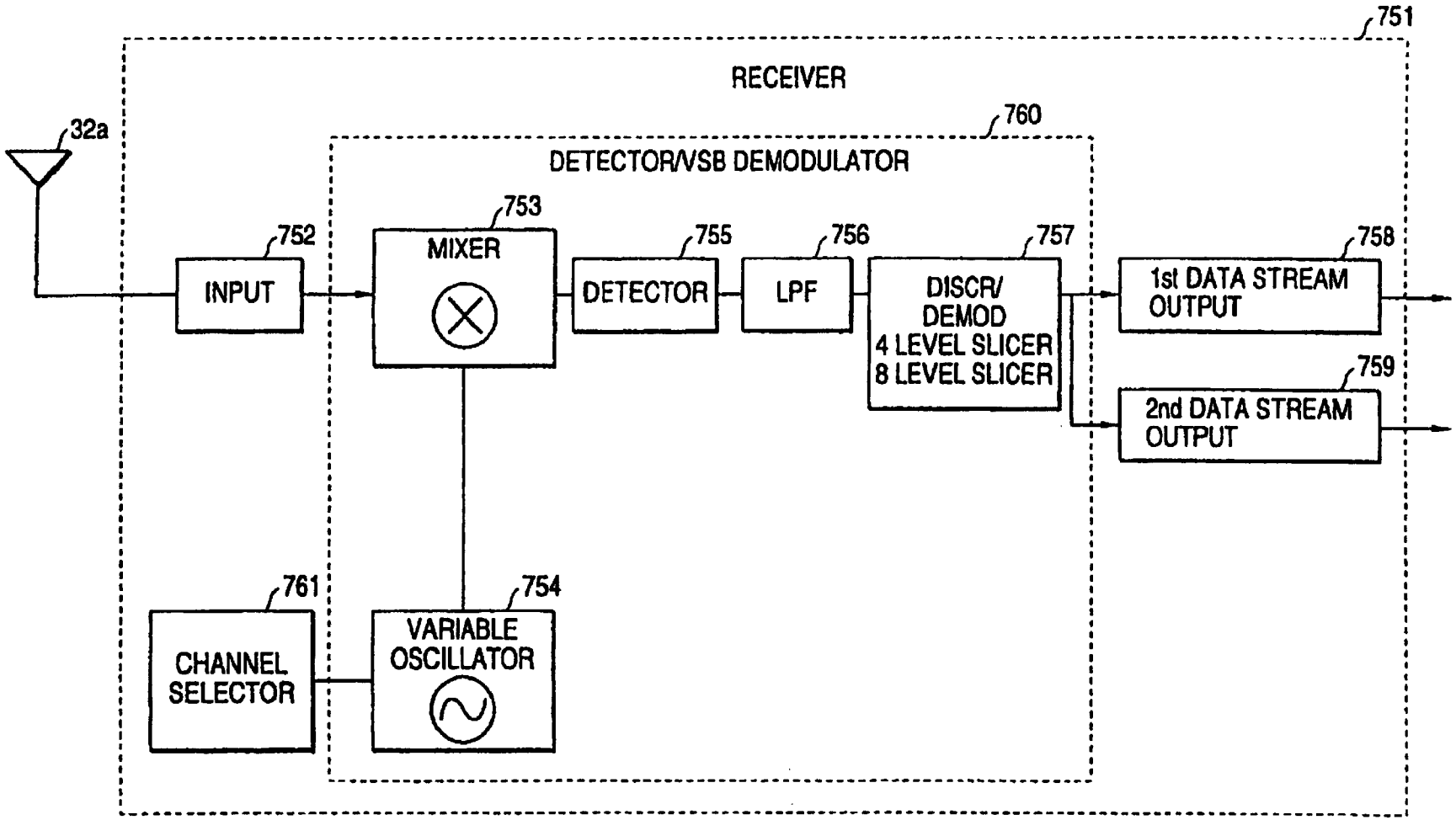
FIG. 63 is a block diagram of a 4-, 8-, and 16-level VSB receiver in the fifth embodiment of the invention.

FIG. 63 is a block diagram of a receiver 751 in which an input signal intercepted by a terrestrial antenna 32a is transferred through an input unit 752 to a mixer 753 where it is mixed with a signal from a variable oscillator 754 controlled by channel selection to a lower medium frequency signal. The signal from the mixer 753 is then detected by a detector 755 and filtered by an LPF 756 to a baseband signal which is transferred to a discriminating/demodulator circuit 757 which has 4-level slicer in the case of 4 VSB, and 8-level slicer in the case of 8 VSB. The discrimination/demodulator circuit 757 reproduces two, first $D_1$ and second $D_2$, data streams from the baseband signal and transmits them further through first and second data stream output 758 and 759 respectively.

Figure 64:
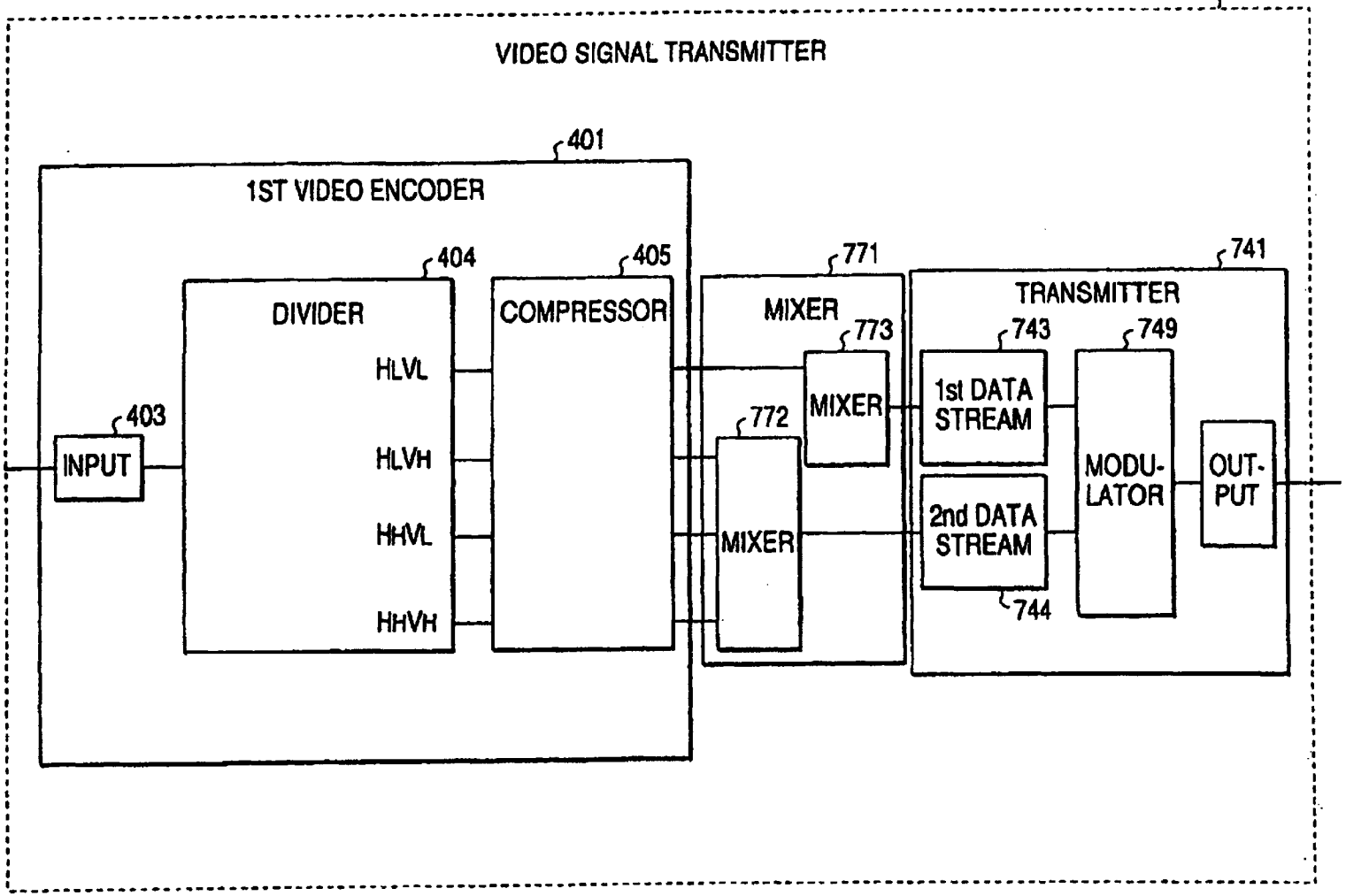
FIG. 64 is a block diagram of a video signal transmitter of the fifth embodiment.

The transmission of a TV signal using such a transmitter and a receiver will be explained. FIG. 64 is a block diagram of a video signal transmitter 774 in which a high resolution TV signal, e.g. and HDTV signal, is fed through an input unit 403 to a divider circuit 404 of a first video encoder 401 where it is divided into four high/low frequency TV signal components denoted by e.g. $H_LV_L$, .$H_LV_H$, $H_HV_L$, and $H_HV_H$. This action is identical to that of the third embodiment previously described referring to FIG. 30 and will not be explained in more detail. The four separate TV signals are encoded respectively by a compressor 405 using a known DPCMDCT variable length code encoding technique which is commonly used e.g. in MPEG. Meanwhile, the motion compensation of the signal is carried out at the input unit 403. The compressed signals are summed by a summer 771 into two, first and second, data streams $D_1$ and $D_2$. The low frequency video signal component or $H_LV_L$ signal is contained in the first data stream $D_1$. The two data stream signals $D_1$ and $D_2$ are then transferred to first and second data stream inputs 743 and 744 of a transmitter unit 741 where they are amplitude modulated and summed into an ASK signal of e.g. VSB mode which is propagated from a terrestrial antenna for broadcasting service.

FIG. 65 is a block diagram of a TV receiver for such a digital TV broadcast system. A 4-VSB or 8-VSB digital TV signal intercepted by a terrestrial antenna 32a is fed to an input 752 of a receiver 781. The signal is then transferred to a VSB detection/demodulation circuit 760 where a desired channel signal is selected and demodulated to two, first and second, data streams $D_1$ and $D_2$ which are then fed to first and second data stream outputs 758 and 759 respectively. The operation in the receiver unit 751 is similar to that described previously and will not be explained in more detail. The two data streams $D_1$ and $D_2$ are sent to a divider unit 776 in which $D_1$ is divided by a divider 777 into two components; one or compressed $H_LV_L$ is transferred to a first input 521 of a second video decoder 422 and the other is fed to a summer 778 where it is summed with $D_2$ prior to transfer to a second input 531 of the second video decoder 422. Compressed $H_LV_L$ is then sent from the first input 521 to a first expander 523 where it is expanded to $H_LV_L$ of the original length which is then transferred to a video mixer 548 and an aspect ratio changing circuit 779. When the input TV signal is an HDTV signal, $H_LV_L$ represents a wide-screen NTSC signal. When the same is an NTSC signal, $H_LV_L$ represents a lower resolution video signal, e.g. MPEG1, [that] *than* an NTSC level.

The input TV signal of the embodiment is an HDTV signal and $H_LV_L$ becomes a wide-screen NTSC signal. If the aspect ratio of an available display is 16:9, $H_LV_L$ is directly delivered through an output unit as a 16:9 video output 426. If the display has an aspect ratio of 4:3, $H_LV_L$ is shifted by the aspect ratio changing circuit 779 to a letterbox or sidepanel format and then, delivered from the output unit 780 as a corresponding format video output 425.

The second data stream $D_2$ fed from the second data stream output 759 to the summer 778 is summed with the output of the divider 777 to a sum signal which is then fed to the second input 531 of the second video decoder 422. The sum signal is further transferred to a divider circuit 531 while it is divided into three compressed forms of $H_LV_H$, $H_HV_L$, and $H_HV_H$. The three compressed signals are then fed to a second 535, a third 536, and a fourth expander 537 respectively for converting by expansion to $H_LV_H$, $H_HV_L$, and $H_HV_H$, of the original length. The three signals are summed with $H_LV_L$, by the video mixer 548 to a composite HDTV signal which is fed through an output 546 of the second video decoder to the output unit 780. Finally, the HDTV signal is delivered from the output unit 780 as an HDTV video signal 427.

The output unit 780 is arranged for detecting an error rate in the second data stream of the second data stream output 759 through an error rate detector 782 and if a condition in which the error rate is high continues for a predetermined time, $H_LV_L$ of low resolution video data systematically are produced for a predetermined time.

Accordingly, the multi-level signal transmission system for digital TV signal transmission and reception becomes feasible. For example, if a TV signal transmitter station is near, both the first and second data streams of a received signal can successfully be reproduced to exhibit an HDTV quality picture. If the transmitter station is far, the first data stream can be reproduced to $H_LV_L$ which is converted to a low resolution TV picture. Hence, any TV program will be intercepted in a wider area and displayed at a picture quality ranging from HDTV to NTSC level.

Figure 66:
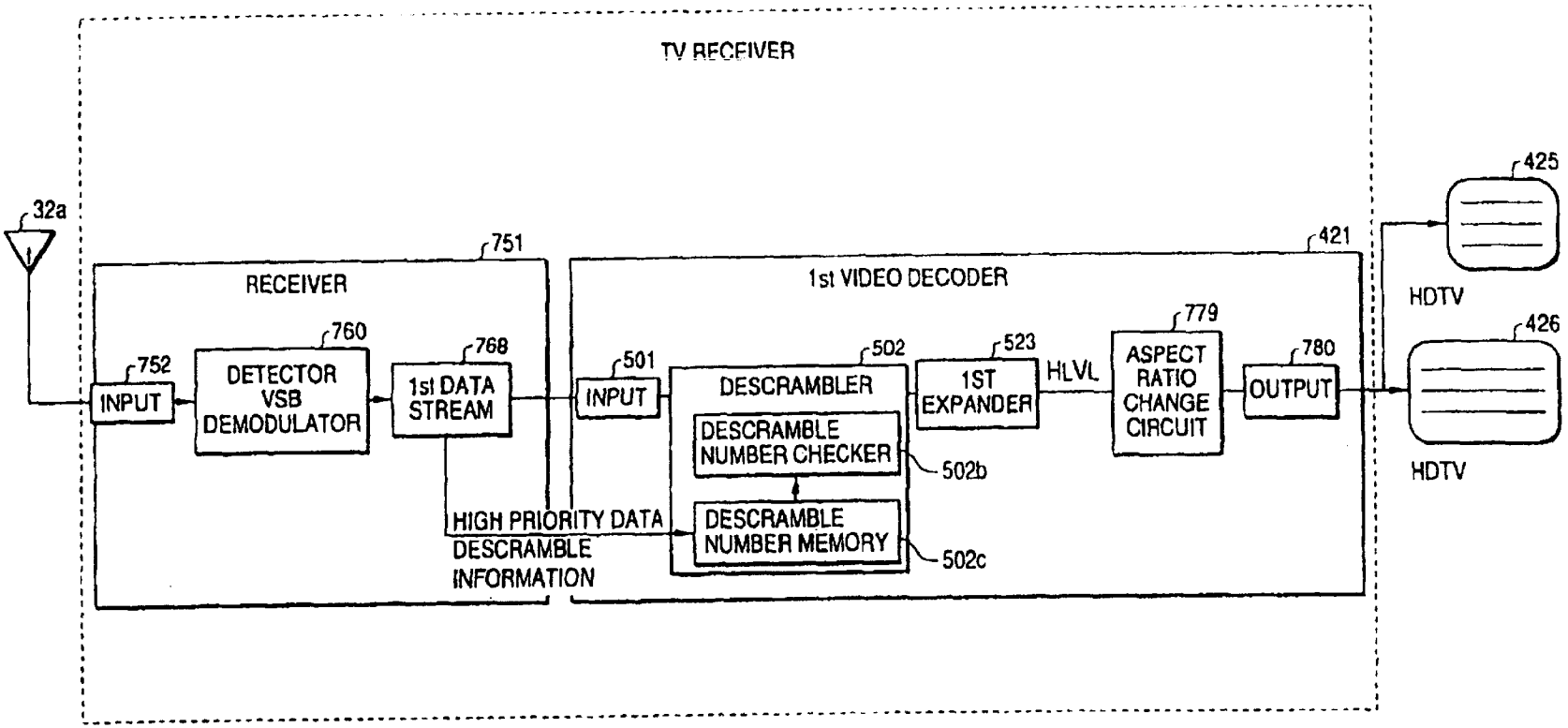
FIG. 66 is a block diagram of another TV receiver of the fifth embodiment.

FIG. 66 is a block diagram showing another arrangement of the TV receiver. As shown, the receiver unit 751 contains only a first data stream output 768 and thus, the processing of the second data stream or HDTV data is not needed so that the overall construction can be minimized. It is a good idea to have the first video decoder 421 shown in FIG. 31 as a video decoder of the receiver. Accordingly, an NTSC level picture will be reproduced. The receiver is fabricated at much less cost as having no capability to receive any HDTV level signal and will widely be accepted in the market. In brief, the receiver can be used as an adapter tuner for interception of a digital TV signal with giving no modification to the existing TV system including a display.

When a scrambled 4-level VSB or 8-level VSB is received as shown in FIG. 66, the scramble cancellation signal transmitted with the 4- or 8-level VSB signal is compared by the descramble number comparator 502b with the number stored in the descramble number register 502c in the descrambler 502. Only when the transmitted stored numbers match is descrambling of specific scrambled transmissions permitted.

Figure 67:
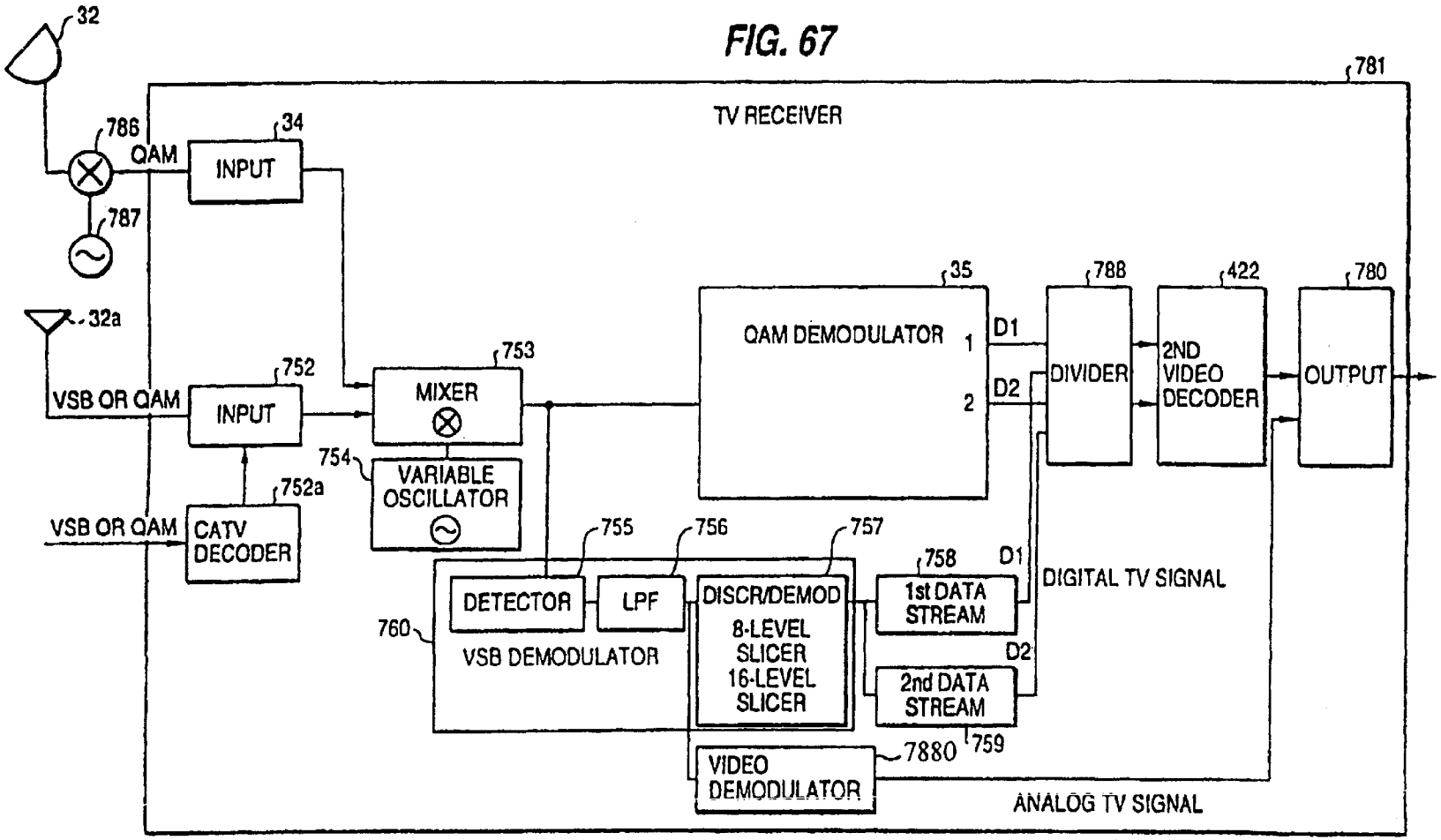
FIG. 67 is a block diagram of a satellite-to-ground TV receiver of the fifth embodiment.

The TV receiver 781 may have a further arrangement shown in FIG. 67, which serves as both a satellite broadcast receiver for demodulation of PSK signals and a terrestrial broadcast receiver for demodulation of VSB signals. In operation, a PSK signal received by a satellite antenna 32 is mixed by a mixer 786 with a signal from an oscillator 787 into a low frequency signal which is then fed through an input unit 34 to a mixer 753 similar to one shown in FIG. 63. The low frequency signal of PSK or QAM mode in a given channel of the satellite TV system is transferred to a [modulator] *demodulator* 35 where two data streams $D_1$ and $D_2$ are reproduced from the signal. $D_1$ and $D_2$ are sent through a divider 788 to a second video decoder 422 where they are converted to a video signal which is then delivered from an output unit 780. Also, a digital or analogue terrestrial TV signal intercepted by a terrestrial antenna 32a is fed through an input unit 752 to the mixer 753 where one desired channel is selected in the same manner as described in FIG. 63 and converted into [to] a low frequency base band signal. The signal of analogue form is sent directly to the demodulator 35 for demodulation. The signal of digital form is then fed to a discrimination/demodulation circuit 757 where two data streams $D_1$ and $D_2$ are reproduced from the signal. $D_1$ and $D_2$ are converted by the second video decoder 422 into a video signal which is then delivered further. A satellite analogue TV signal is transferred to a video demodulator [788] *7880* where it is [AN] *AM* modulated into an analogue video signal which is then delivered from the output unit 780. As understood, the mixer 753 of the TV receiver 781 shown in FIG. 67 is arranged to be compatible between two, satellite and terrestrial, broadcast services. Also, a receiver circuit including a detector 755 and an LPF 756 for AM modulation of an analogue signal can be utilized compatible with a digital ASK signal of the terrestrial TV [serivice] *service*. The major part of the arrangement shown in FIG. 67 is arranged for compatible use, thus minimizing a circuitry construction.

According to the embodiment, a 4-level ASK signal is divided into two, $D_1$ and $D_2$, level components for execution of the one-bit mode multi-level signal transmission. If an 8-level [ASk] *ASK* signal as shown in FIGS. 68(a) and (b) illustrating the constellation of the 8-VSB signal, i.e., 8-level VSB signal is used, it can be transmitted in a one-bit mode three-level, $D_1$, $D_2$, and $D_3$, arrangement, thus, three bits [pre] *per* symbol in total. A shown in FIG. 68(a), the first bit coding is done as follows. $D_3$ is assigned to eight signal points 721a and 721b; 722a and 722b; 723a and 723b; and 724a and 724b, each pair, i.e., small group, representing a two-level pattern using one bit. Next, the second bit coding is done as follows. $D_2$ is assigned to two signal point groups 721 and 722; and 723 and 724, two mid groups representing a two-level pattern using one bit. Next, the third bit coding is done as follows. $D_1$, is assigned to two large signal point groups 725 and 726 representing a two-level pattern using one bit. More particularly, this is equivalent to a form in which each of the four signal points 721, 722, 723, and 724 shown in FIG. 57 is divided into two components thus [producint] *producing*, at the maximum, three different level data.

As understood from the above, each of the eight signal points is assigned with three bit data ($D_1$, $D_2$, $D_3$). For example, if left side and right side are defined as logic 0 and logic 1, respectively, the three bit data ($D_1$, $D_2$, $D_3$) for the signal point 722a will be (0, 1, 0). This can be explained as follows. Since the signal point 722a is in the left side of the two large groups 725 and 726, logic 0 is given to $D_1$. Also, the signal point 722a is in the right side of the two mid groups 721 and 722, so that logic 1 is given to $D_2$. Further the signal point 722a is in the left side of the two small groups 722a and 722b, so that logic 0 is given to $D_3$. In a similar manner, the three bit data ($D_1$, $D_2$, $D_3$) for the signal point 723a will be (1, 0, 0).

The three-level signal transmission, such as for the digital HDTV, is identical to that described in the third and fourth embodiments and will no further be explained in detail.

The effects of television broadcasting using the 8-level VSB shown in FIGS. 68(a), (b), and (c) are described below.

While the transmitted data quantity is high with 8level VSB, it also has a higher error rate than 4-level VSB for the same C/N value. However, in high image quality HDTV transmissions, the available transmission capacity makes it possible to apply more error correction coding, and the error rate can thus be reduced. This band capacity also [enable] *enables* multi-level (hierarchical) television broadcasts and other new features in the future.

The relative effects of 4-level, 8-level, and 16-level VSB are described below.

In ground station broadcasts using the NTSC or PAL frequency band, the usable transmission band is effectively limited to approximately 5 MHz because of the 6-MHz frequency limit of the NTSC format, for example, as shown in FIG. 136. With 4-level VSB, the effective data transmission quantity is 5 MHz×4=20 Mbps because the frequency utilization efficiency is 4 bits/Hz. A minimum of 15 Mbps–18 Mbps is required, however, for digital HDTV signal transmission. Because there is no spare capacity with 4-level VSB, the redundancy used for error correction is only 10–20% of the HDTV effective transmission quantity as shown in the comparison chart in FIG. 169.

With 8-level VSB, the effective data transmission quantity is 5 Mhz×6=30 Mbps because the frequency utilization efficiency is 5 bits/Hz. While 15 Mbps–18 Mbps is required for digital HDTV signal transmission as described above, when using 8-level VSB modulation, more than 50% of the actual HDTV signal transmission quantity can be used for error correction coding as shown in FIG. 169. As shown by error rate curves 805 and 806 in FIG. [161] *163*, the error rate relative to the same C/N value in the transmission system is less with TCM 8-level VSB than with 4-level VSB, even through error correction code gain is greater with 8-level VSB than with 4-level VSB, because significantly more error correction coding can be added with 8-level VSB during ground station broadcasting of same-data-rate HDTV digital signals using the 6-MHz band. As a result, 8-level VSB with high code gain error correction coding also has the effect of enabling a larger service area for ground station HDTV broadcasts than does 4-level VSB. While the increased size of the error correction circuits required with 8-level VSB does increase the complexity of the receiver circuitry the circuit scale of the equalizer in the receiver is significantly smaller than that of receivers using QAM modulation, which contains a phase component, because VSB and ASK are amplitude modulation methods. As a result, an 8-level VSB circuit board containing the error correction circuit is smaller than an equivalent 32-level QAM board with the same transmission capacity.

A digital HDTV receiver with an appropriate circuit scale and a large ground station broadcasting service area can therefore be achieved using 8-level VSB.

Note that the ECC 744a and trellis encoder 744b in the transmitter and receiver block diagrams of FIG. 84 for the present embodiment, FIGS. 131, 137, 156, and 157 for embodiment 6, and FIG. 144 for embodiment 9 are used as examples of the specific error correction method, and the 4-, 8-, and 16-level VSB modulator 749 described with reference to FIG. 61 are used for transmission. The VSB demodulator 760 described with reference to FIG. 63 is used in the receiver to generate the digital reception data by means of the 4-, 8-, and 16-level level slicer 757 from the 4-, 8-, and 16-level VSB signal. After error correction by means of the trellis decoder 759b and ECC decoder 759a, described below with reference to FIG. 84 for the present embodiment, and FIGS. 131, 137, 156, and 157 for embodiment 6, a digital HDTV signal is generated by the image expander of the image decoder 402, and the digital HDTV signal is then output.

As shown in FIGS. 160(a) and (b) described below with the sixth embodiment, the ECC encoder 744a uses a Reed-Solomon encoder 744j and interleaver 744k, and uses a deinterleaver 759k and Reed-Solomon decoder 759j for the ECC decoder 759a. Applying interleaving as described in the previous embodiment improves resistance to transmission system noise such as burst error.

Code gain can be further increased and the error rate decreased by using a trellis encoder as shown in FIGS. 128(a), (b), (c), (d), (e), and (f). A ratio 2/3 trellis encoder [744b] *743c* and decoder 759b as shown in FIG. 172 are most appropriate with 8-level VSB because of 3bits/symbol coding. The data quantity is compressed 2/3 in this case.

The embodiments have been described using primarily the example of a multilevel (hierarchical) digital television signal. While an ideal broadcasting format can be achieved using a multilevel signal, the image compression circuit and modulator/demodulator circuits become more complex, and are therefore not preferable due to cost for the start of new broadcasting services. As described at the beginning of the fifth embodiment, a broadcasting system with a simple television circuit can be achieved by using a signal-signal interval $L=L_0$, i.e., an equal interval, in the 4-level VSB and 8-level VSB signals and a non-multilevel television transmission, and by simplifying the circuit shown in FIG. 137 as shown in FIG. 157. Once the HDTV format is in common use, it is then possible to change to a hierarchical 8-level VSB transmission format.

Four- and 8-level VSB have been described above, and 16- and 32-level VSB are described below with reference to FIGS. 159(a)–(b). FIG. 159(a) shows the 16-level VSB constellation. As shown in FIG. 159(b), the signal between two signal points is grouped into eight groups 722a–722h, which are treated as eight signal points and can be treated as 8-level VSB signals to enable a two-stage multilevel transmission. In this case, multilevel transmission can be achieved with time division multiplexing even when intermittently transmitting an 8-level VSB signal. The maximum data rate with this method is 2/3. In FIG. 157(c), the data is further grouped into four groups 723a–723d, which can be handled as 4-level VSB signals adding one more level to the hierarchy. While the maximum data rate drops with time division multiplex transmission of 4-level VSB signals, multilevel transmission is possible with 3-stage multilevel VSB transmission.

Figure 32:
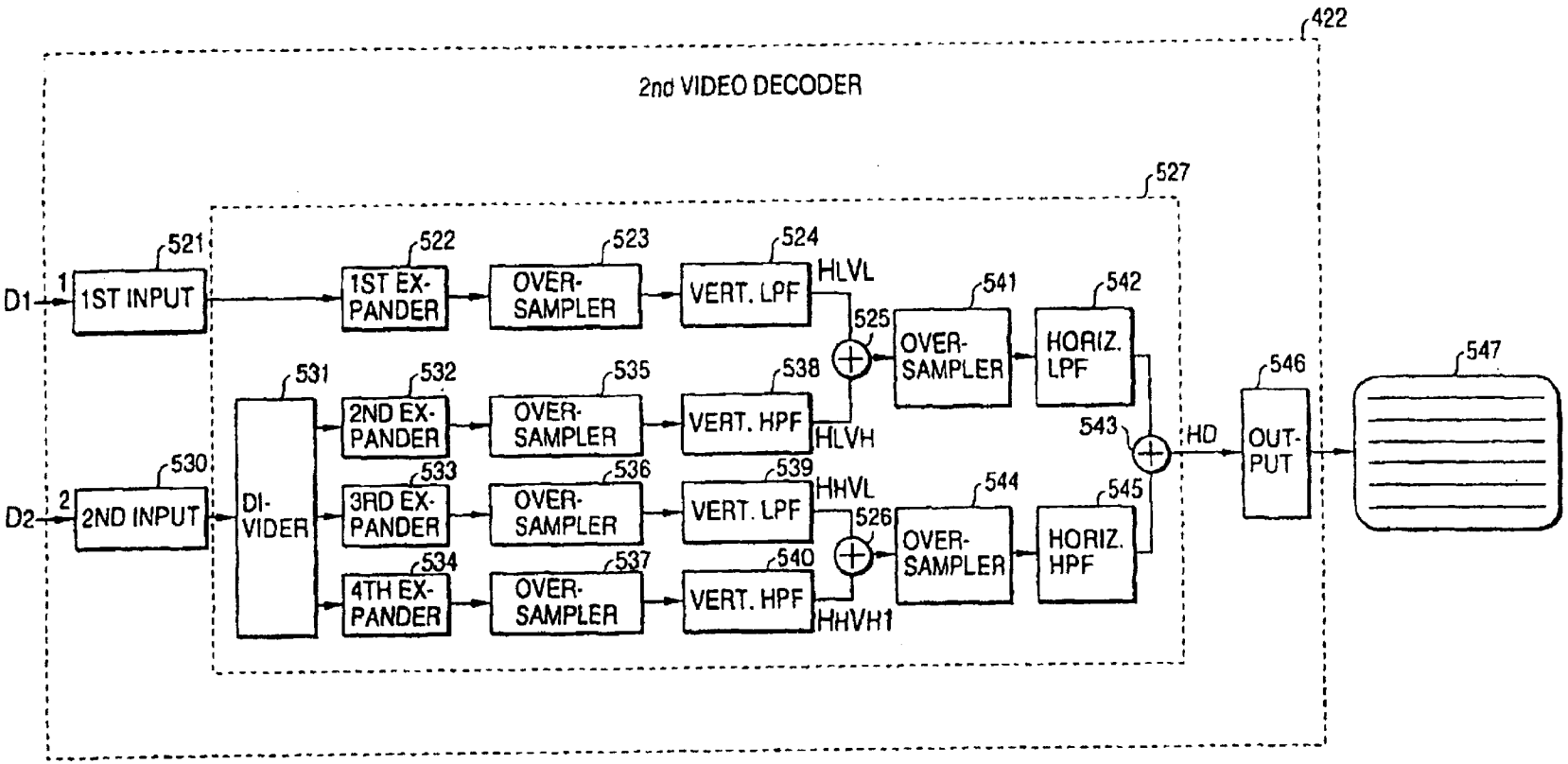
FIG. 32 is a block diagram of a second video decoder of the third embodiment.

With this method, a multilevel transmission whereby 8-level VSB or 4-level VSB data can be reproduced when the C/N ratio of the 16-level VSB data deteriorates can be achieved. By doubling the signal points of the 16-level VSB format as shown in FIG. 159(d), 32-level VSB transmission is enabled. When 16-level VSB capacity is increased in the future, this method will maintain compatibility while making it possible to obtain a 6-bit/symbol data capacity.

By summarizing the above, the VSB receiver shown in the block diagram of FIG. 161 and the VSB transmitter shown in the block diagram of FIG. 162 can be achieved.

While 4-level VSB and 8-level VSB are used by way of example above, 16-level VSB as shown in FIGS. 159(a)–(c) can also be used for transmission. With 16-level VSB, a 40-Mbps transmission capacity can be used with a 6-MHz band in ground station broadcasting. Because the data rate of the HDTV digital compression signal is 15–18 Mbps using the MPEG standard, there is excessive reserve in the transmission capacity. As shown in FIG. 169, redundancy $R_{16}$= 100% or greater; redundancy is therefore too great for transmitting one channel digital HDTV, and the circuitry is simply made more complex with little additional advantage gained over 8-level VSB. In addition, 16-level VSB redundancy is only about 10%, the same as 4-level VSB redundancy, in ground station HDTV broadcasting of two programs with 16-level VSB. As a result, the service area is reduced because sufficient error correction coding cannot be applied with two-program 16-level VSB. As described before, sufficient error correction cannot be applied with 4-level VSB because the redundancy $R_4$=10–20% and the service area is limited. As will be known from FIG. 169, sufficient error correction coding can be achieved with 8-level VSB because the redundancy $R_8$=50%. A broad service area can also be achieved [without significantly].

Figure 30:
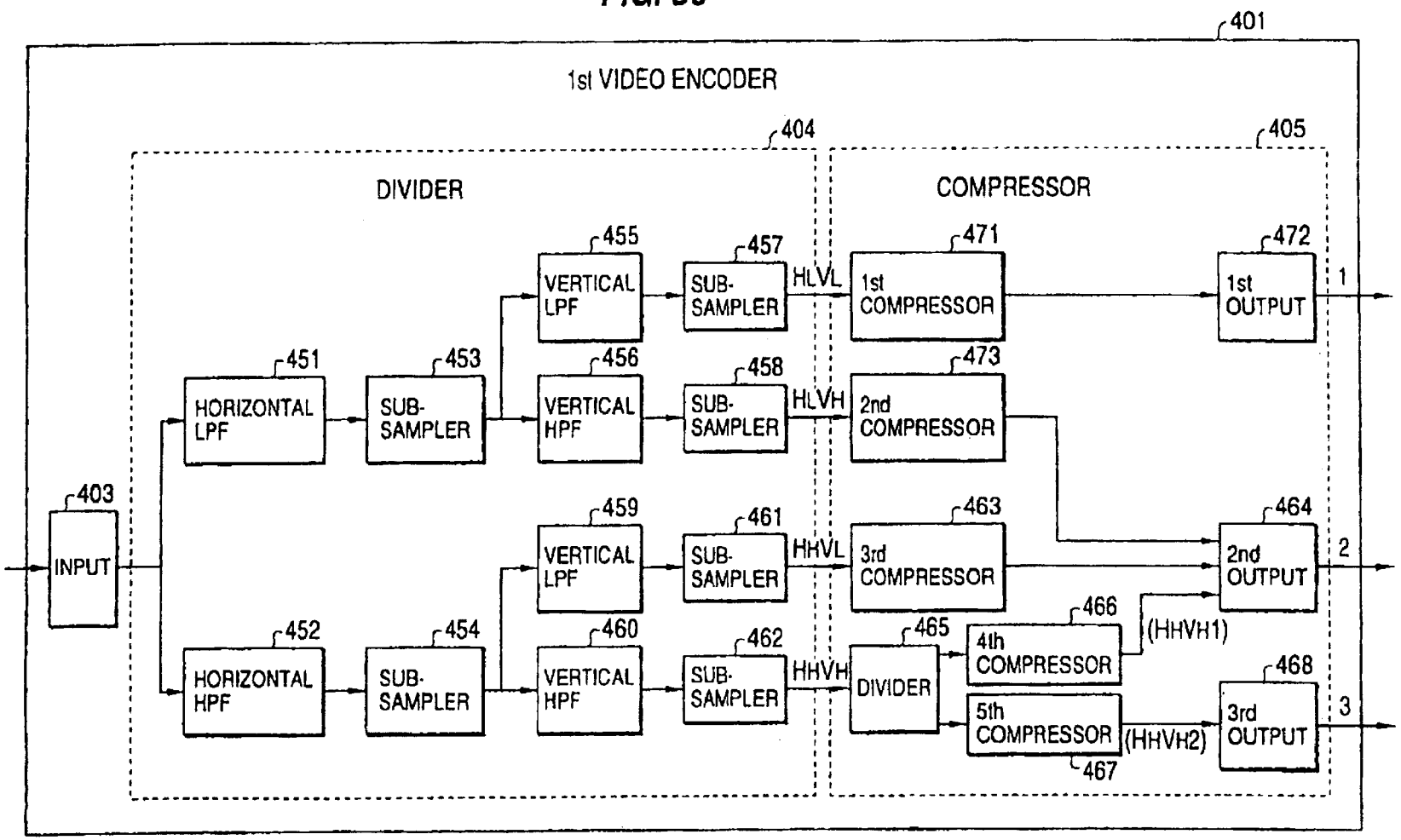
FIG. 30 is a block diagram of a first video encoder of the third embodiment.
Figure 69:
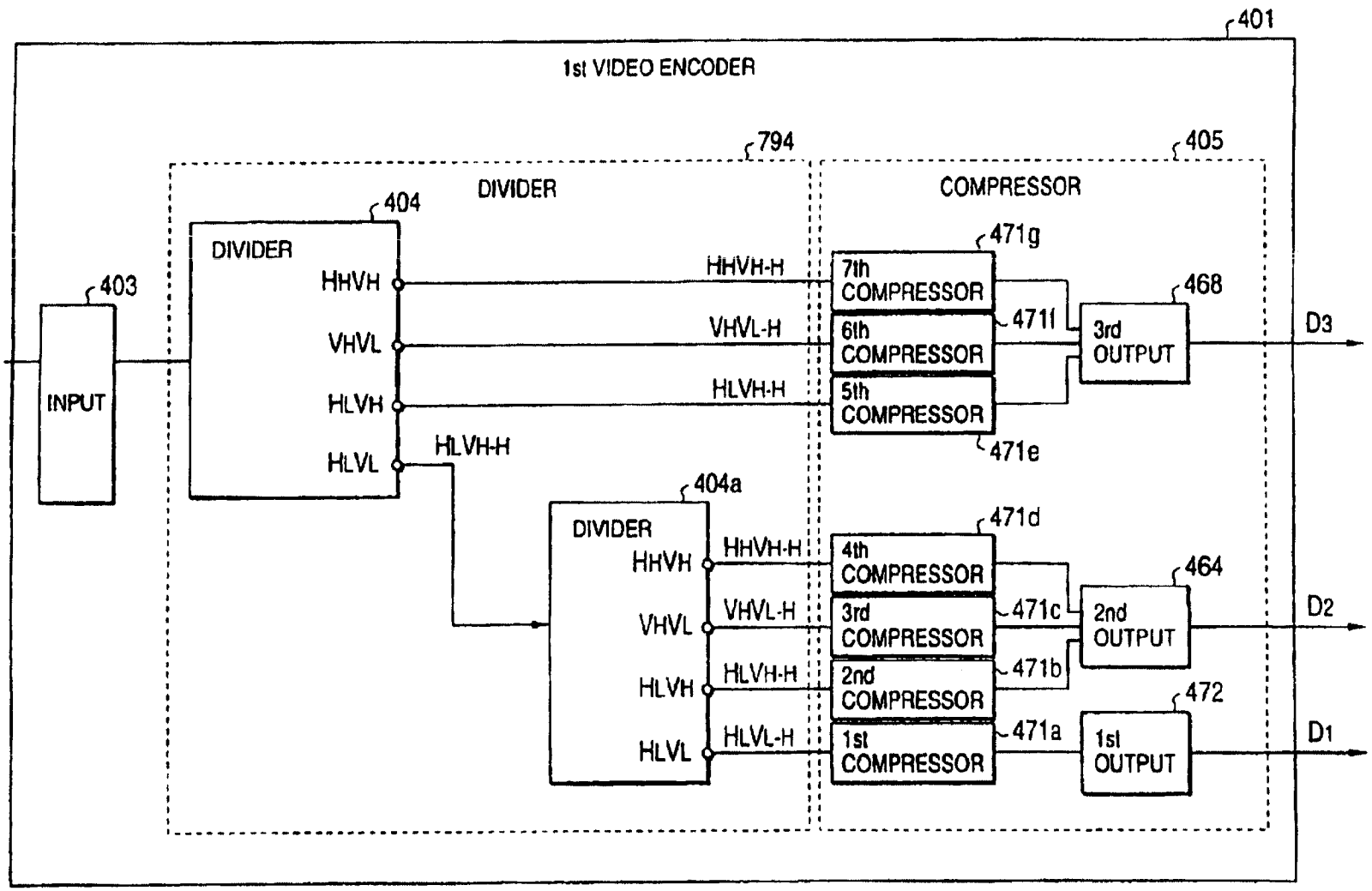
FIG. 69 is a block diagram of a video encoder of the fifth embodiment.
Figure 70:
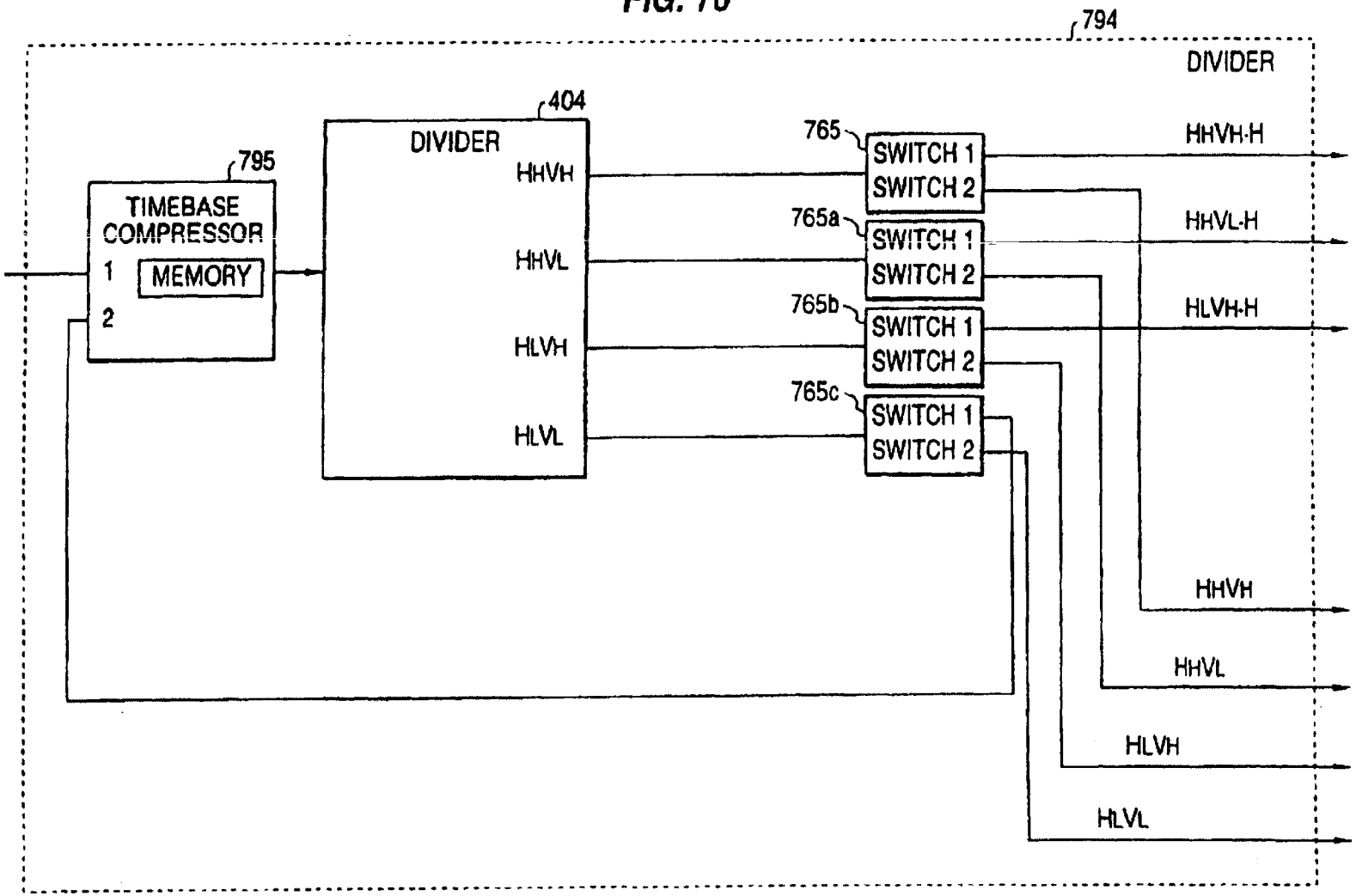
FIG. 70 is a block diagram of a video encoder of the fifth embodiment containing one divider circuit.

In particular, the arrangement of the video encoder 401 of the third embodiment shown in FIG. 30 is replaced by a modification of the block diagram of FIG. 69. The operation of the modified arrangement is similar and will not be explained in greater detail. Two video signal divider circuits 404 and 404a which may be sub-band filters are provided forming a divider unit 794. The divider unit 794 may also be arranged more [simple a] *simply as* shown in the block diagram of FIG. 70, in which a signal passes across one signal divider circuit two times at time division mode. More specifically, a video signal of e.g. HDTV or super HDTV from the input unit 403 in time-base compressed by a time-base compressor 795 and fed to the divider circuit 404 where it is divided into four components, $H_HV_H$-H, $H_HV_L$-H, and $H_LV_H$-H, and $H_LV_L$-H, at a first cycle. At the time, four switches 765, 765a, 765b, and 765c remain turned to the position 1 so that $H_HV_H$-H, $H_HV_L$-H, and $H_LV_H$-H, are transmitted to a compressing circuit 405. Meanwhile, $H_LV_L$-H is fed back through the terminal 1 of the switch 765c to the time-base compressor 795. At a second cycle, the four switches 765, 765a, 765b, and 765c turned to the position 2 and all the four components of the divider circuit 404 are simultaneously transferred to the compressing circuit 405. Accordingly, the divider unit [769] *794* of FIG. 70 arranged for time division processing of an input signal can be constructed in a simpler dividing circuit form.

Figure 71:
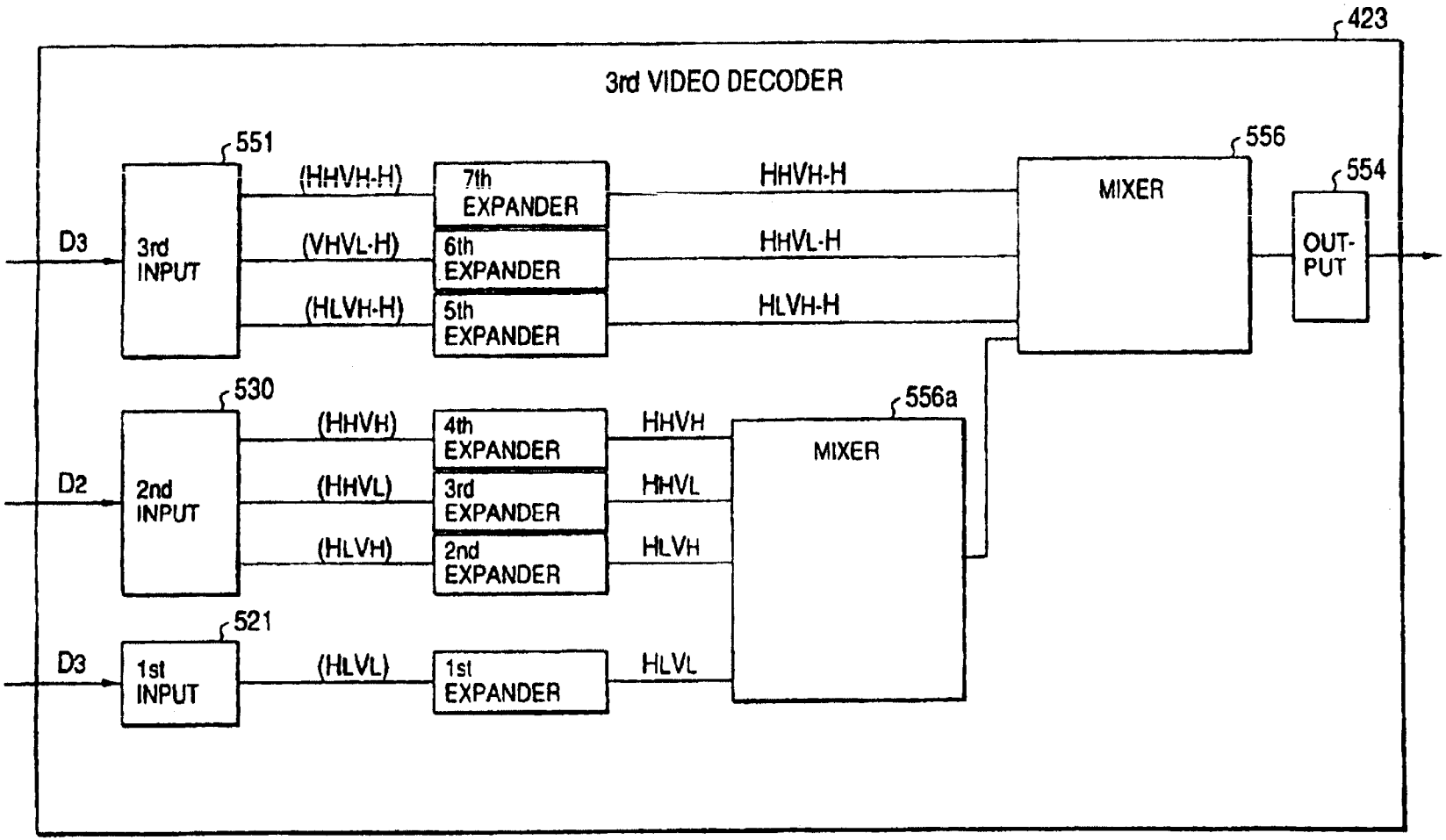
FIG. 71 is a block diagram of a video decoder of the fifth embodiment.

At the receiver side, such a video decoder as described in the third embodiment and shown in FIG. 30 is needed for three-level transmission of a video signal. More particularly, a third video decoder 423 is provided which contains two mixers 556 and 556a of different processing capability as shown in the block diagram of FIG. 71.

Figure 72:
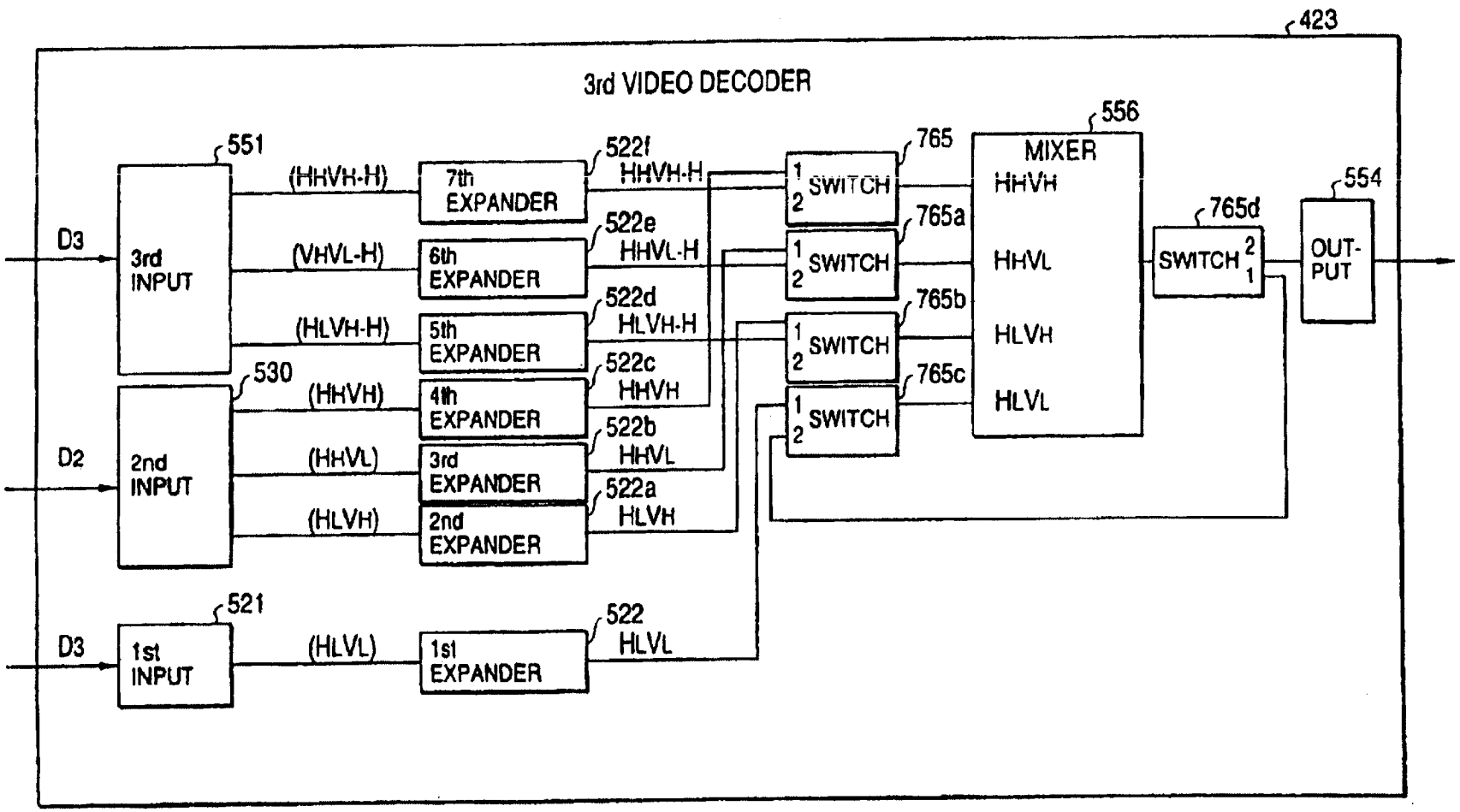
FIG. 72 is a block diagram of a video decoder of the fifth embodiment containing one mixer circuit.

Also, the third video decoder 423 may be modified in which the same action is executed with one single mixer 556 as shown in FIG. 72. At the first timing, five [swatches] *switches* 765, 765a, 765b, 765c, 765d remains turned to the position 1. Hence, $H_LV_L$, $H_LV_H$, $H_HV_L$, and $H_HV_H$ are fed from a first 522, a second 522a, a third 522b and a fourth expander 522c [to] through their respective switches to the mixer 556 where they are mixed to a single video signal. The video signal which represents $H_LV_L$-H of an input high resolution video signal is then fed back through the terminal 1 of the switch 765d to the terminal 2 of the switch 765c. At the second timing, the four switches 765, 765a, 765b, 765c are turned to the point 2. Thus, $H_HV_H$-H, $H_HV_L$-H, $H_LV_H$-H, and $H_LV_L$-H are transferred to the mixer 556 where they are mixed to a signal video signal which is then sent across the terminal 2 of the switch 765d to the output unit 554 for further delivery.

In this manner of time division processing of a three-level signal, two mixers can be replaced with one mixer.

More particularly, four components $H_LV_L$, $H_LV_H$, $H_HV_L$, and $H_HV_H$ are fed to produce $H_LV_L$-H at the first timing. Then, $H_LV_H$-H, $H_HV_L$-H, and $H_HV_H$-H are fed at the second timing delayed from the first timing and mixed with $H_LV_L$-H to a target video signal. It is thus essential to perform the two actions at an interval of time.

If the four components [are] overlap each other or are supplied in a variable sequence, they have to be time-base adjusted to a given sequence through using memories accompanied with their respective switches 765, 765a, 765b, and 765c. In the foregoing manner, a signal is transmitted from the transmitter at two different timing periods as shown in FIG. 73 so that no time-base controlling circuit is needed in the receiver which is thus arranged more [compact] *compactly*.

Figure 73:
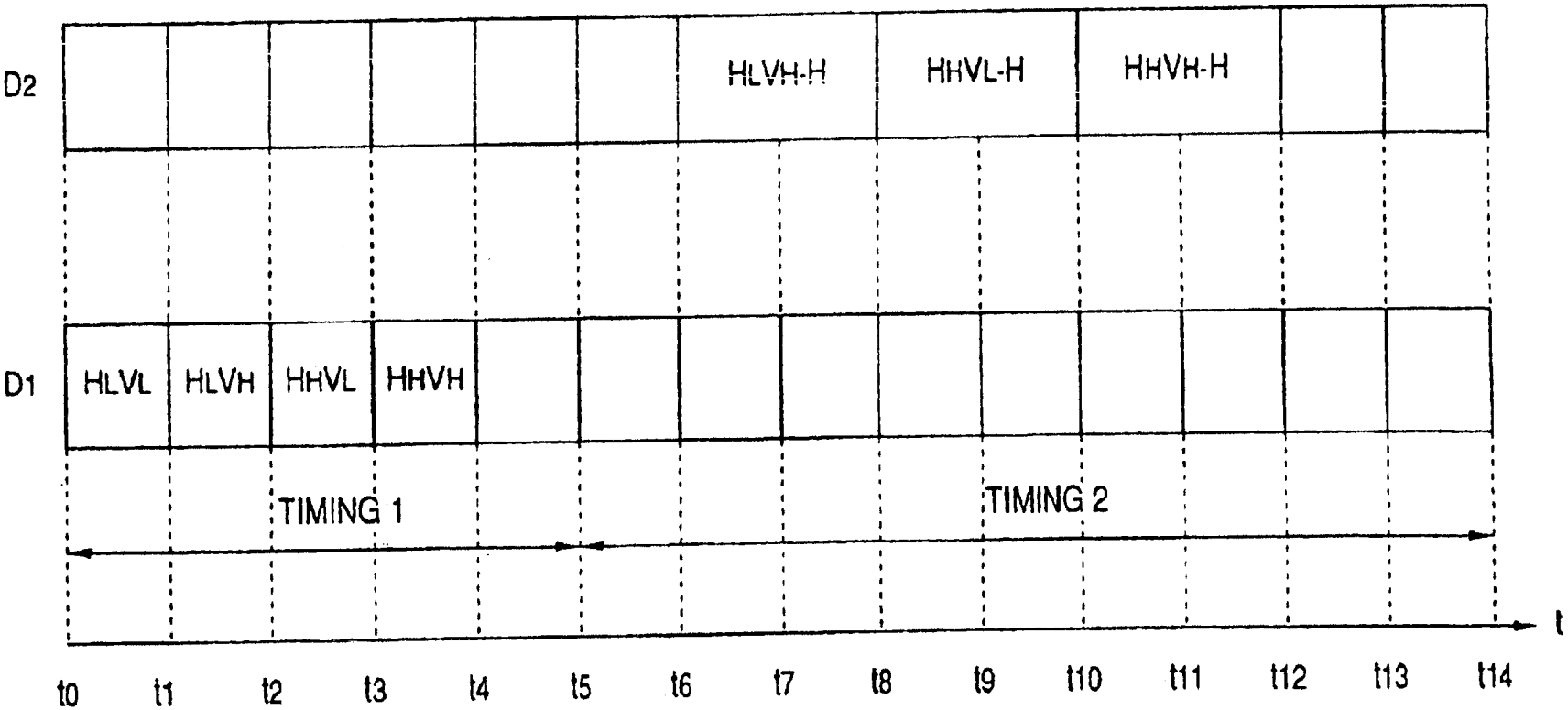
FIG. 73 is a diagram showing a time assignment of data components of a transmission signal according to the fifth embodiment.

As shown in FIG. 73, $D_1$ is the first data stream of a transmitting signal and $H_LV_L$, $H_LV_H$, $H_HV_L$, and $H_HV_H$ are transmitted on $D_1$ channel at the period of first timing. Then, at the period of second timing, $H_LV_H$ and $H_HV_H$, are transmitted on $D_2$ channel. As the signal is transmitted in a time division sequence, the encoder in the receiver can be arranged more [simple] *simply*.

The technique of reducing the number of the expanders in the decoder will now be explained. FIG. 74(b) shows a time-base assignment of four data components 810, 810a, 810b, and 810c of a signal. When other four data components 811, 811a, 811b, and 811c are inserted between the four data components 811, 811a, 811b, and 811c respectively, the latter can be transmitted at intervals of time. In operation, the second video decoder 422 shown in FIG. 74(a) receives the four components of the first data stream $D_1$ at a first input 521 and transfers them through a switch 812 to an expander 503 one after another.

More particularly, the component 810 first fed is expanded during the feeding of the component 811 and after completion of processing the component 810, the succeeding component 810a is fed. Hence, the expander 503 can process a row of the components at time intervals by the same time division manner as of the mixer, thus substituting for the simultaneous operation of a number of expanders.

Figure 75:
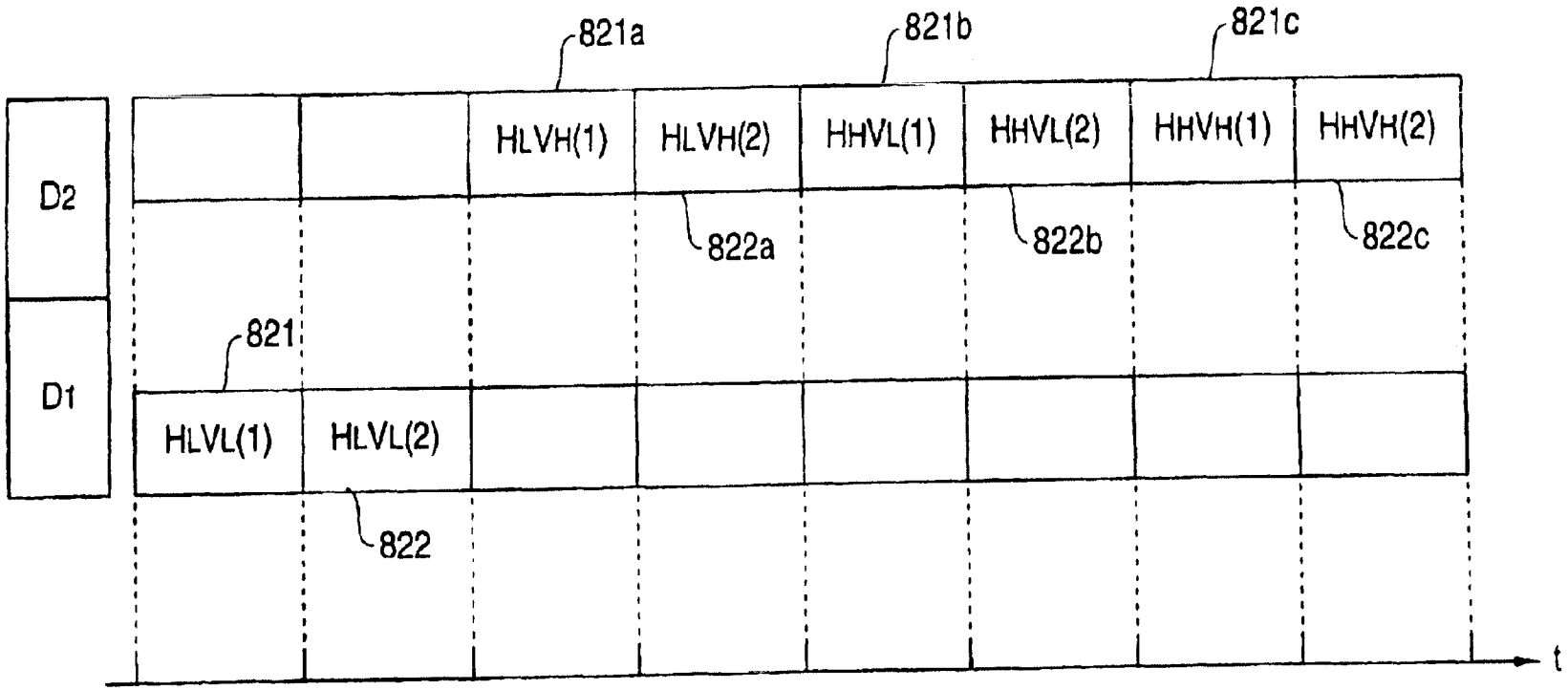
FIG. 75 is a diagram showing a time assignment of data components of a transmission signal according to the fifth embodiment.

FIG. 75 is a time-base assignment of data components of an HDTV signal, in which $H_LV_L(1)$ of an NTSC component of the first channel signal for a TV program is allocated to a data domain 821 of $D_1$ signal. Also, $H_LV_H$, $H_HV_L$, and $H_HV_H$ carrying HDTV additional components of the first channel signal are allocated to three domains 821a, 821b, and 821c of $D_2$ signal respectively. There are provided other data components 822, 822a, 822b, and 822c between the data components of the first channel signal which can thus be expanded with an expander circuit during transmission of the other data. Hence, all the data components of one channel signal will be processed by a single expander capable of operating at a higher speed.

Figure 76:
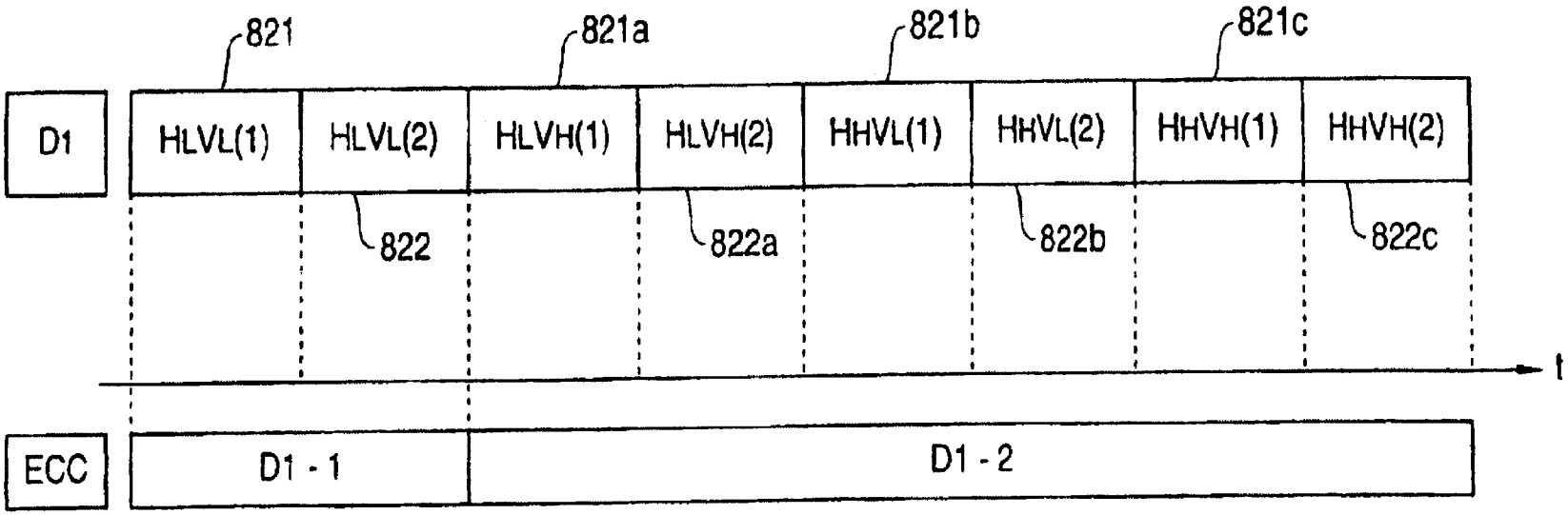
FIG. 76 is a diagram showing a time assignment of data components of a transmission signal according to the fifth embodiment.

Similar effects will be ensured by assignment of the data components to other domains 821, 821a, 821b, and 821c as shown in FIG. 76. This becomes more effective in transmission and reception of a common 4 PSK or ASK signal having no different digital levels.

Figure 77:
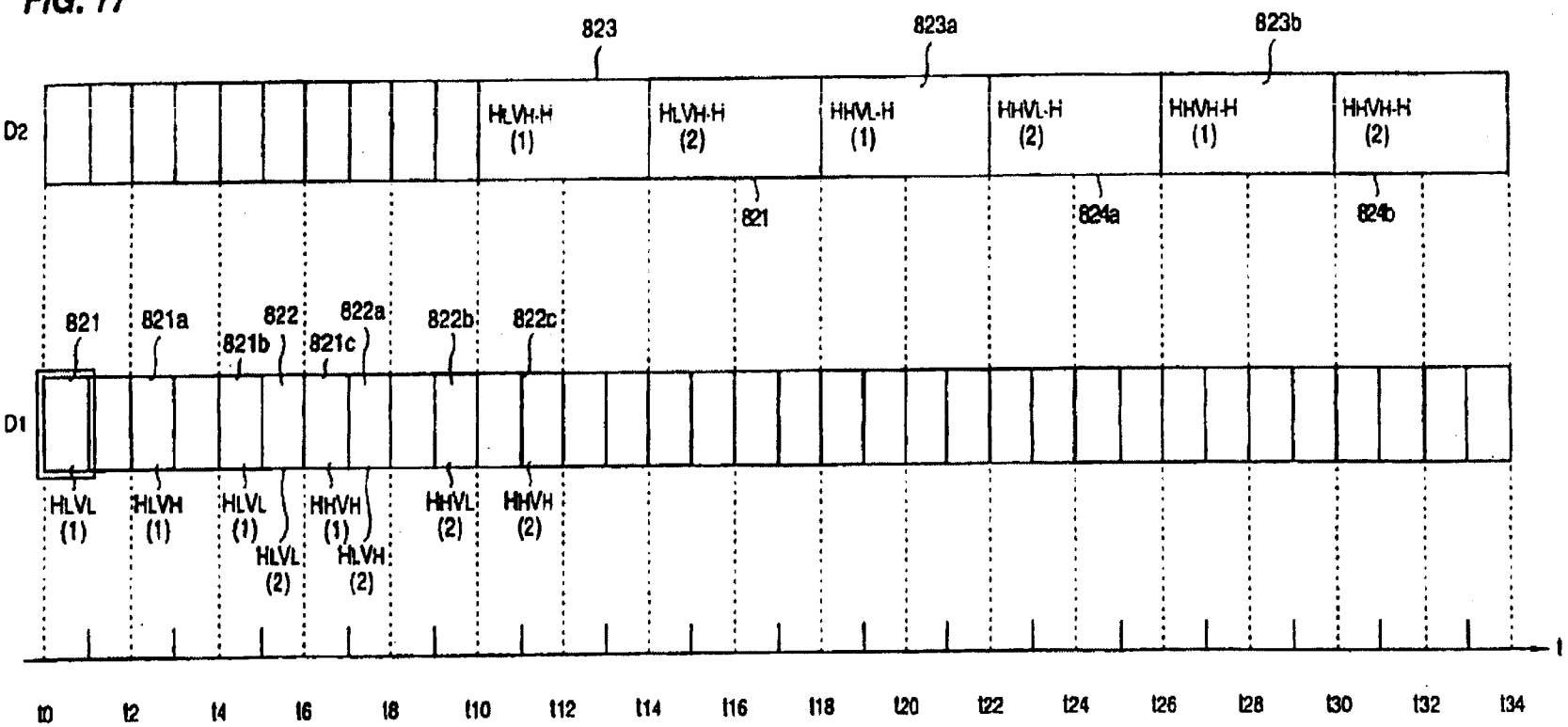
FIG. 77 is a diagram showing a time assignment of data components of a transmission signal according to the fifth embodiment.

FIG. 77 shows a time-base assignment of data components during physical two-level transmission of three different signal level data: e.g. NTSC HDTV, and super HDTV or low resolution NTSC, standard resolution NTSC, and HDTV. For example, for transmission of three data components of low resolution NTSC, standard NTSC, and HDTV, the low resolution NTSC or $H_LV_L$ is allocated to the data domain 821 of $D_1$ signal. Also, $H_LV_H$, $H_HV_L$, and $H_HV_H$ of the standard NTSC component are allocated to three domains 821a, 821b, 821c respectively. $H_LV_H$-H, $H_HV_L$-H, and $H_HV_H$-H, of the HDTV component are allocated to domains 823, 823a, and 823b respectively.

Here, as shown by the block diagrams of FIGS. 156 and 170, a logic level arrangement based on discrimination in the error correction capability as described in the second embodiment is added to 4 VSB or 8 VSB. More particularly, $H_LV_L$ is carried on $D_{1-1}$ channel of the $D_1$ signal. The $D_{1-1}$ channel is higher in the error correction capability than $D_{1-2}$ channel, as described in the second embodiment. The $D_{1-1}$ channel is higher in the redundancy but lower in the error rate than the $D_{1-2}$ channel and the [date] *data* 821 can be reconstructed at a lower C/N rate than that of the other data 821a, 821b, and 821c. More specifically, a low resolution NTSC component will be reproduced at a far location from the transmitter antenna or in a signal attenuating or shadow area, e.g. the interior of a vehicle.

In view of the error rate, the data 821 of $D_{1-1}$ channel is less affected by signal interference than the other data 821a, 821b, and 821c of $D_{1-2}$ channel, while being specifically discriminated and stayed in a different logic level, as described in the second embodiment. While $D_1$ and $D_2$ are divided into two physically different levels, the levels determined by discrimination of the distance between error correcting codes are arranged differently in the logic level.

Figure 90:
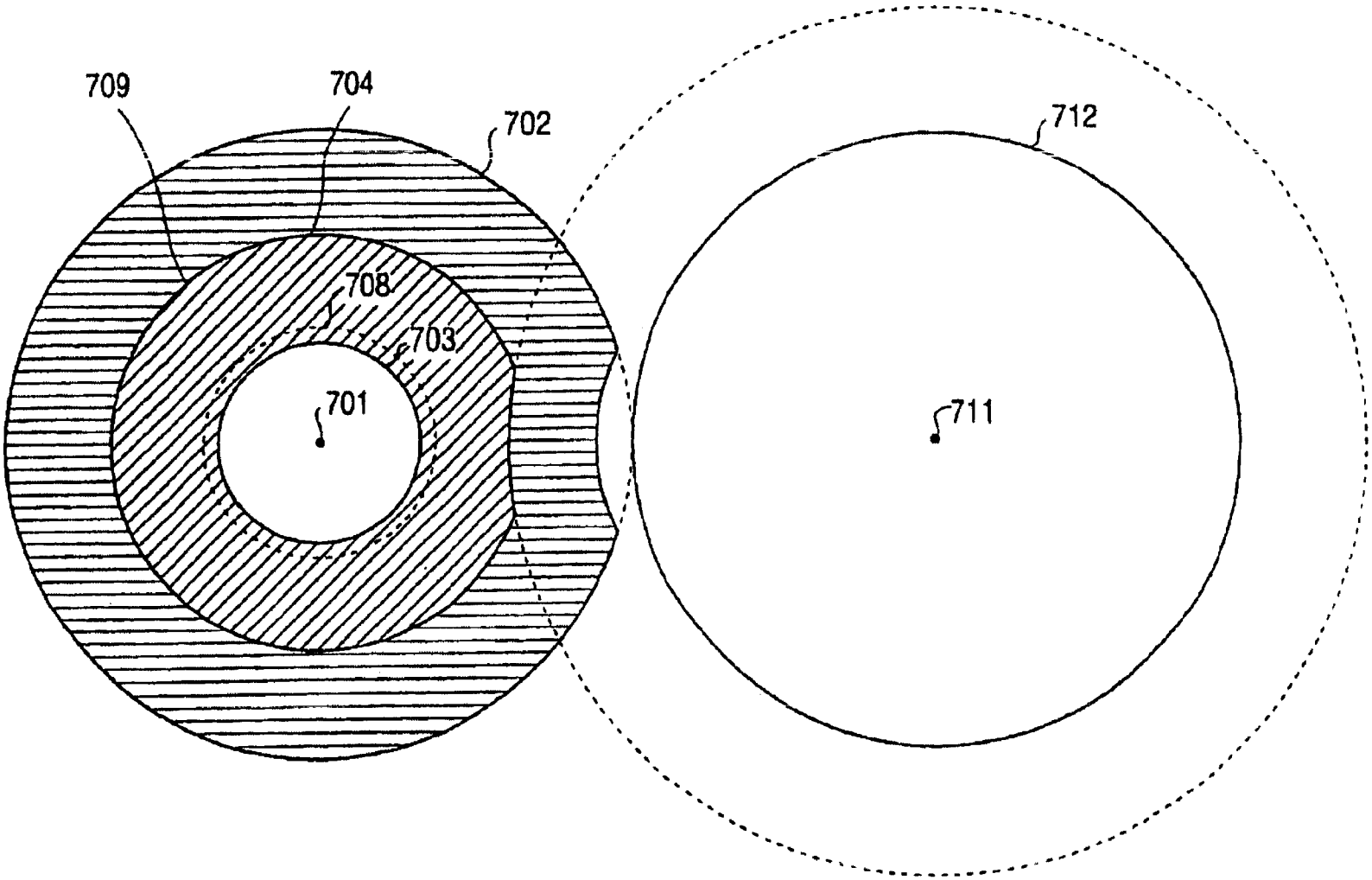
FIG. 90 is a diagram showing signal attenuating regions in the three-level transmission of the fifth embodiment.

The demodulation of $D_2$ data requires a higher C/N rate than that for $D_1$ data. In action, $H_LV_L$ or low resolution NTSC signal can at least be reproduced in a distant or lower C/N service area. $H_LV_H$, $H_HV_L$, and $H_HV_H$ can in addition be reproduced at a lower C/N area. Then, at a high C/N area, $H_LV_H$-H, $H_HV_L$-H, and $H_HV_H$-H components can also be reproduced to develop an HDTV signal. Accordingly, three different level broadcast signals can be played back. This method allows the signal receivable area shown in FIG. 53 to increase from a double region to a triple region, as shown in FIG. 90, thus ensuring a higher opportunity for enjoying TV programs.

Figure 74A:
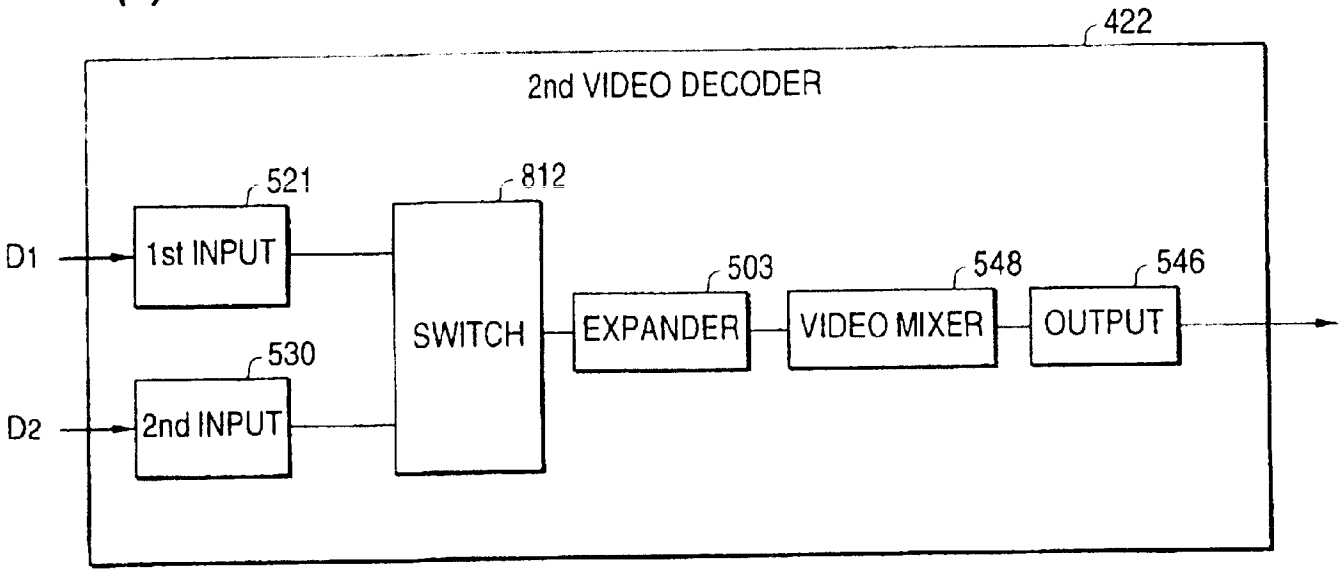
FIG. 74(a) is a block diagram of a video decoder of the fifth embodiment.
Figure 74B:
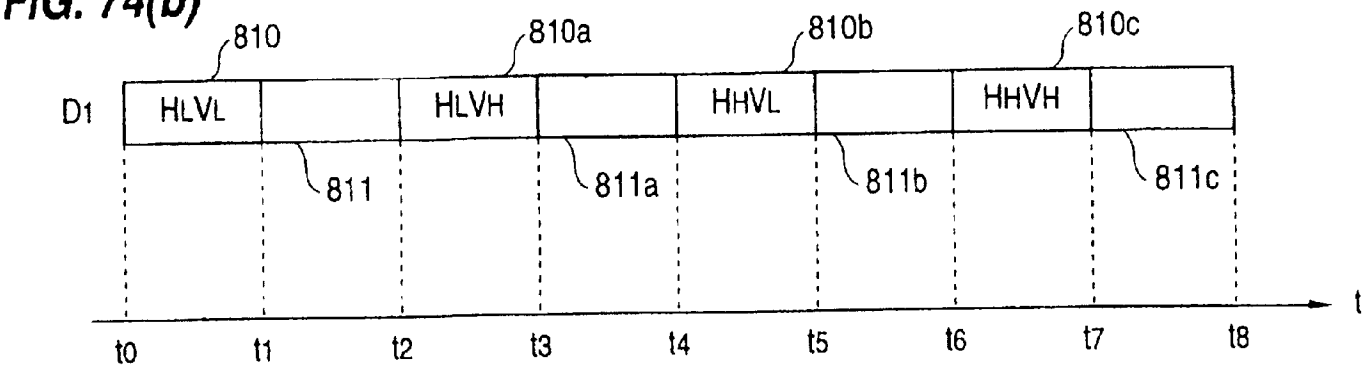
FIG. 74(b) is a diagram showing another time assignment of data components of the transmission signal according to the fifth embodiment.

[FIGS.] *FIG.* 78 is a block diagram of the third video decoder arranged for the time-base assignment of data shown in FIG. 77, which is similar to that shown in FIG. 72 except that the third input 551 for $D_3$ signal is eliminated and the arrangement shown in FIG. 74(a) is added.

In operation, both the $D_1$ and $D_2$ signals are fed through two input units 521 and 530 respectively to a switch 812 at the first timing. As their components including $H_LV_L$ are time divided, they are transferred in a sequence by the switch 812 to an expander 503. This sequence will now be explained referring to the time-base assignment of FIG. 77. A compressed form of $H_LV_L$ of the first channel is first fed to the expander 503 where it is expanded. Then, $H_LV_H$, $H_HV_L$, and $H_HV_H$ are expanded. All the four expanded components are sent through a switch 812a to a mixer 556 where they are mixed to produce $H_LV_L$-H. $H_LV_L$-H is then fed back from the terminal 1 of a switch 765a through the input 2 of a switch 765 to the $H_LV_L$ input of the mixer 556.

At the second timing, $H_LV_H$-H, $H_HV_L$-H, and $H_HV_H$-H of the $D_2$ signal shown in FIG. 77 are fed to the expander 503 where they are expanded before transferred through the switch 821a to the mixer 556. They are mixed by the mixer 556 to an HDTV signal which is fed through the terminal 2 of the switch 765a to the output unit 521 for further delivery. The time-base assignment of data components for transmission, shown in FIG. 77, contributes to the simplest arrangement of the expander and mixer. Although FIG. 77 shows two, $D_1$ and $D_2$, signal levels, four-level transmission of a TV signal will be feasible using the addition of a $D_3$ signal and a super resolution HDTV signal.

Figure 79:
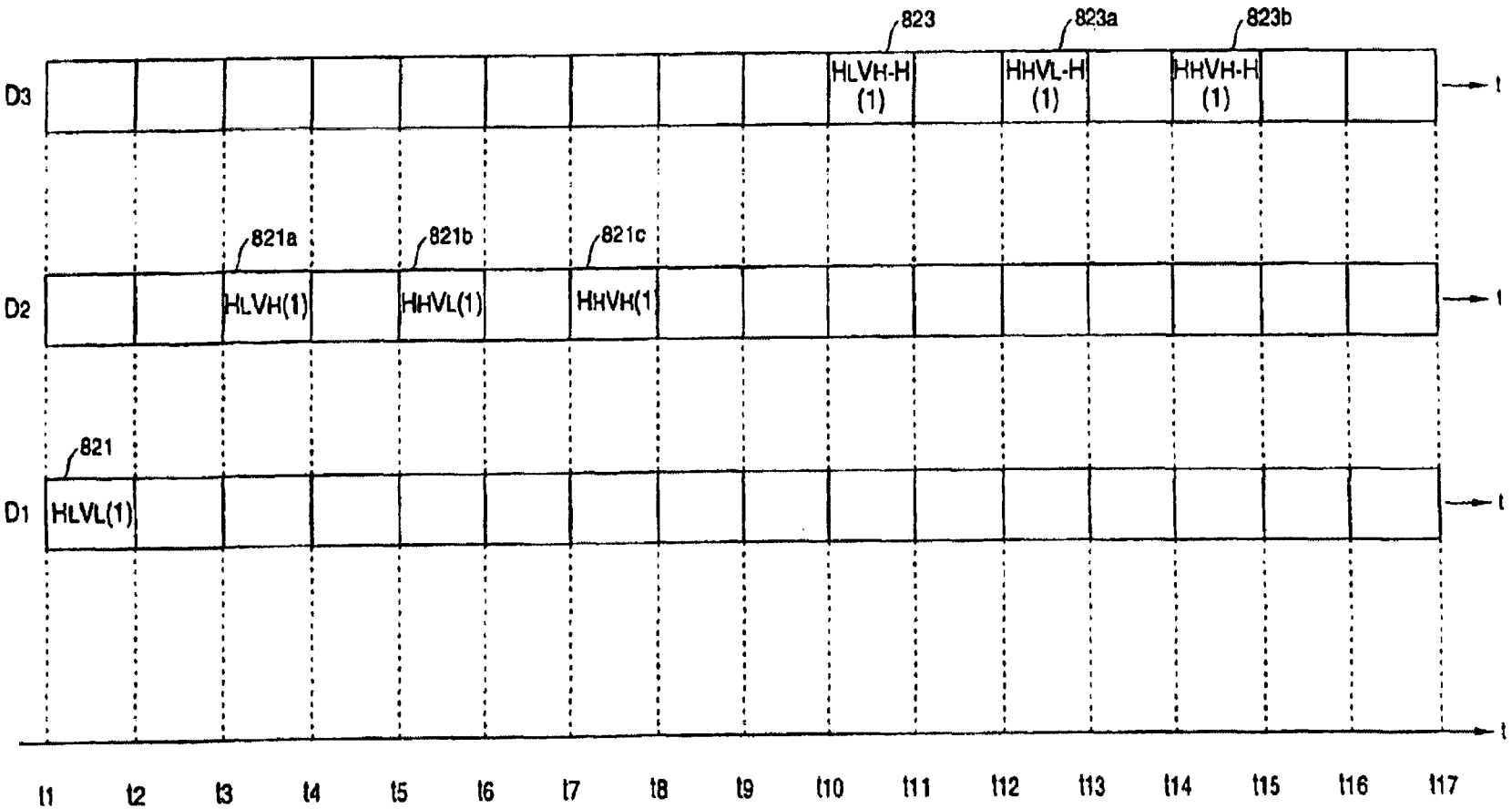
FIG. 79 is a diagram showing a time assignment of data components of a three-level transmission signal according to the fifth embodiment.
Figure 80:
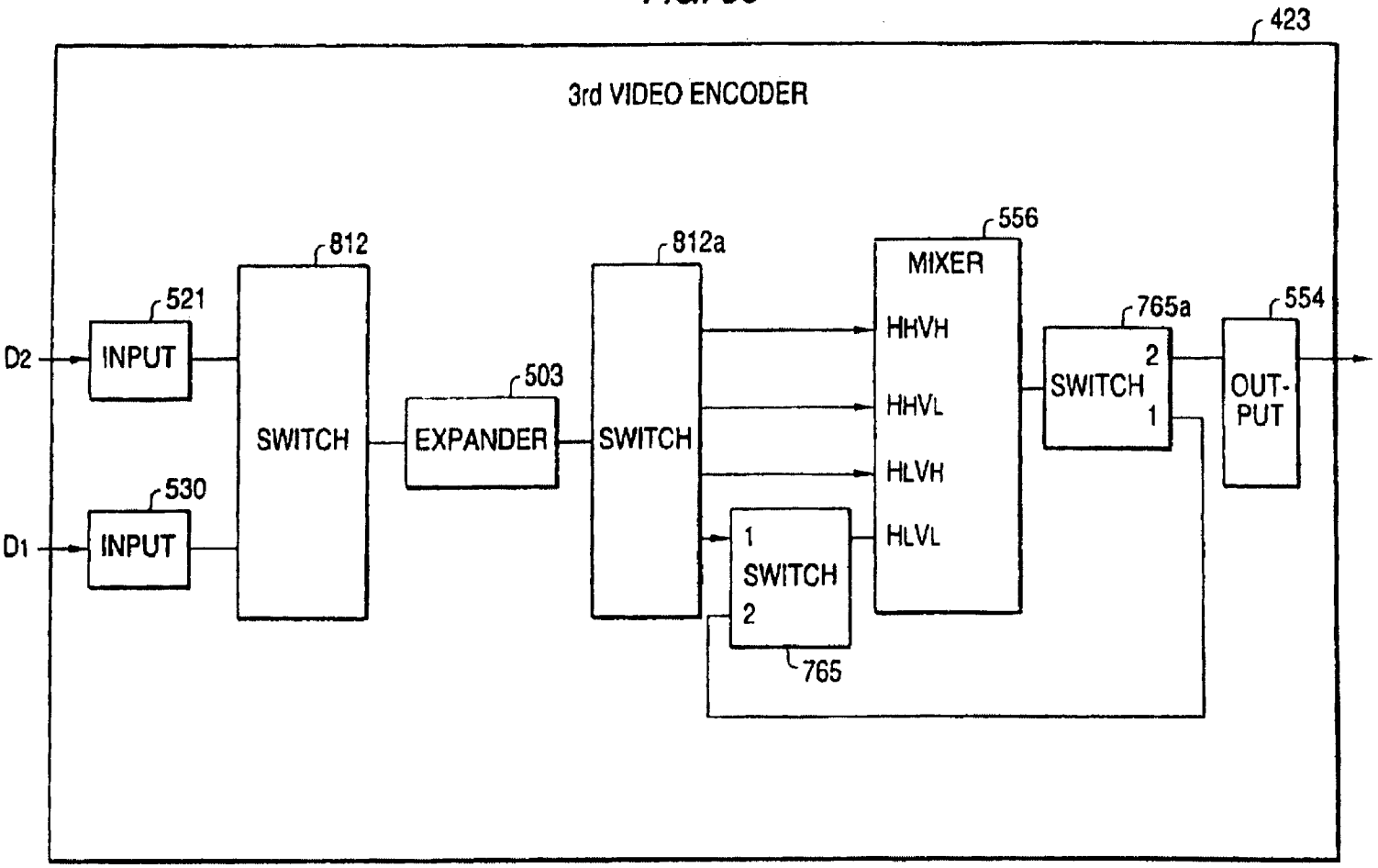
FIG. 80 is a block diagram of another video decoder of the fifth embodiment.

FIG. 79 illustrates a time-base assignment of data components of a physical three-level, $D_1$, $D_2$, $D_3$, TV signal, in which data components of the same channel are so arranged as not to overlap with one another with time. FIG. 80 is a block diagram of a modified video decoder 423, similar to FIG. 78, in which a third input 521a is added. The time-base assignment of data components shown in FIG. 79 also contributes to the simple construction of the decoder.

Figure 81:
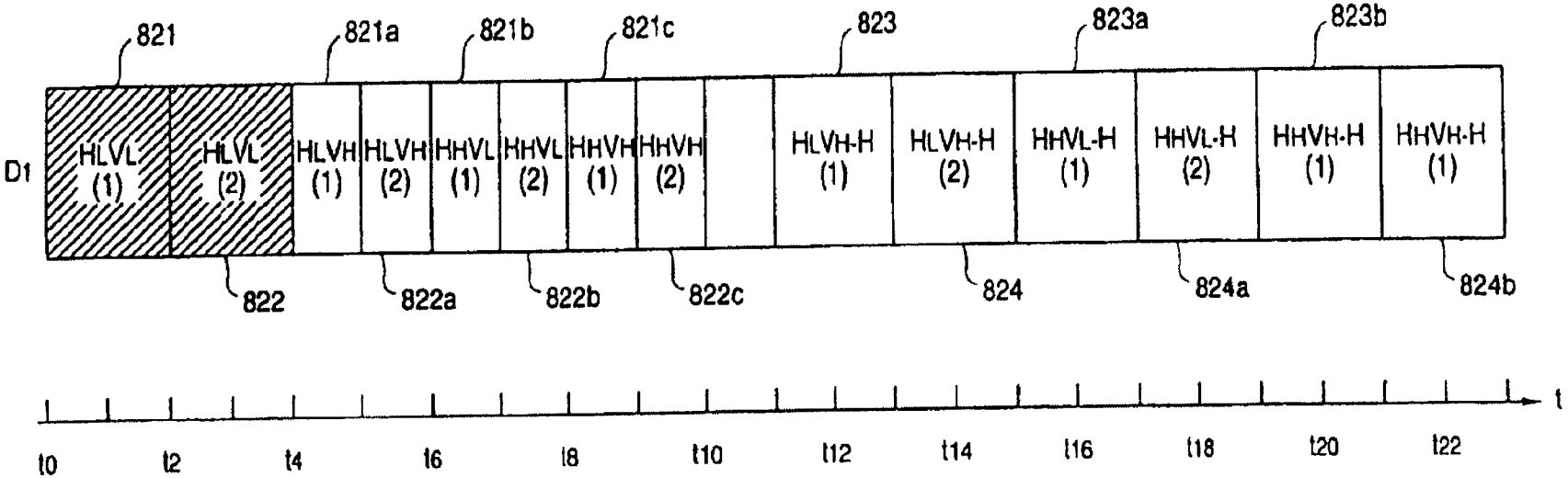
FIG. 81 is a diagram showing a time assignment of data components of a transmission signal according to the fifth embodiment.

The operation of the modified decoder 423 is almost identical to that shown in FIG. 78 and associated with the time-base assignment shown in FIG. 77 and will not be explained in greater detail. It is also possible to multiplex data components on the $D_1$ signal as shown in FIG. 81. However, two data components 821 and 822 have increased error correction capability than the other data components 821a, 812b, and 812c, thus staying at a higher signal level. More particularly, the data assignment for transmission made in one physical level but two logic level relationship. Also, each data component of the second channel is inserted between two adjacent data components of the first channel so that serial processing can be executed at the receiver side and the same effects as of the time-base assignment shown in FIG. 79 will thus be obtained.

The time-base assignment of data components shown in FIG. 81 is based on the logic level mode and can also be carried in the physical level mode when the bit transmission rate of the two data components 821 and 822 is decreased to ½ or ⅓ thus to lower the error rate. The physical level arrangement consists of three different levels.

Figure 82:
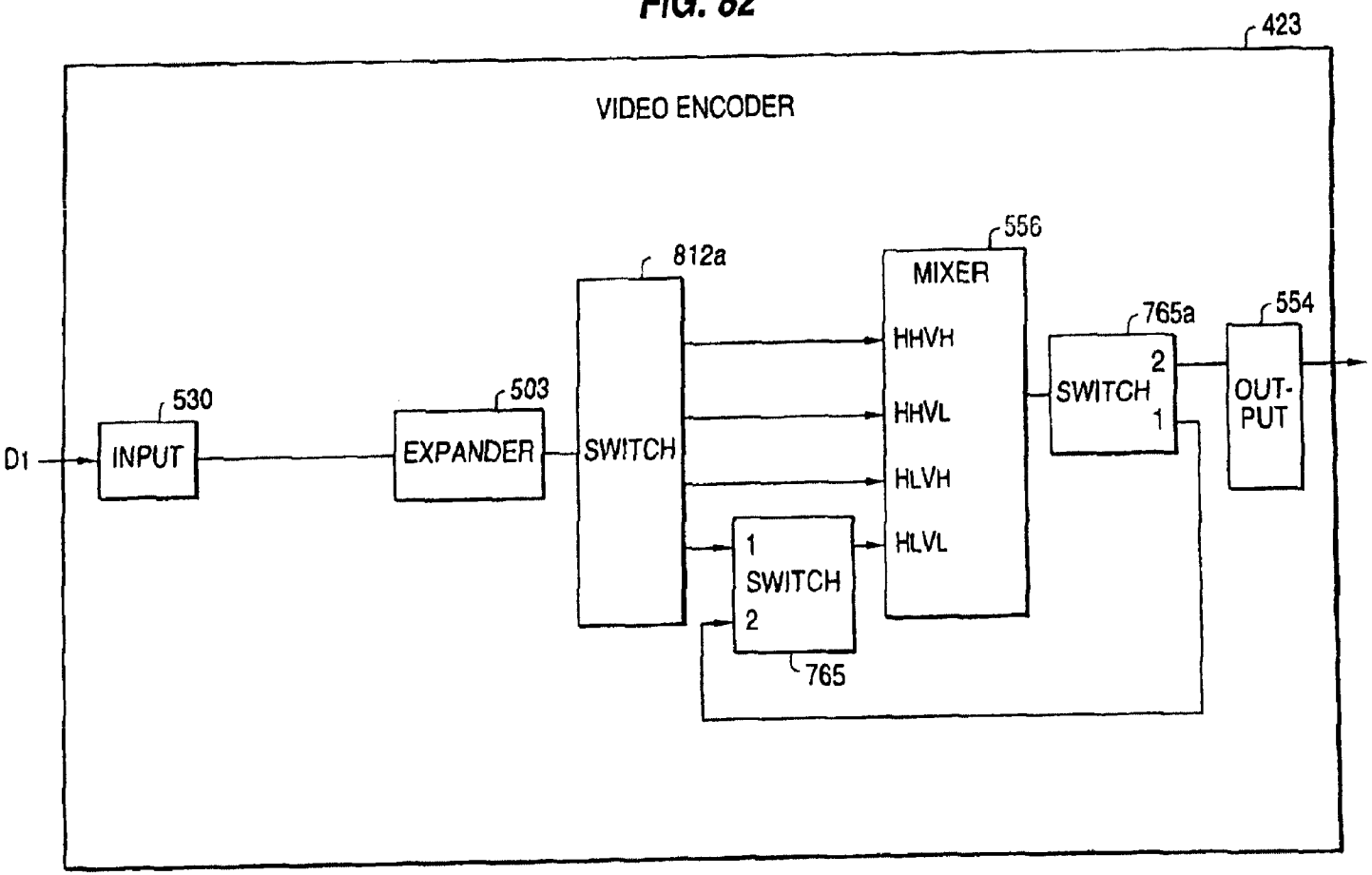
FIG. 82 is a block diagram of a video decoder for $D_1$ signal of the fifth embodiment.

FIG. 82 is a block diagram of another modified video decoder 423 for decoding of the $D_1$ signal time-base arranged as shown in FIG. 81, which is simpler in construction than that shown in FIG. 80. Its operation is identical to that of the decoder shown in FIG. 80 and will not be explained in greater details.

As understood, the time-base assignment of data components shown in FIG. 81 also contributes to the similar arrangement of the expander and mixer. Also, four data components of the $D_1$ signal are fed at respective time slices to a mixer 556. Hence, the circuitry arrangement of the mixer 556 or a plurality of circuit blocks such as provided in the video mixer 548 of FIG. 32 may be arranged for changing the connection therebetween corresponding to each data component so that they become compatible in time division operation and thus, minimized in circuitry construction.

Accordingly, the receiver can be minimized in the overall construction.

It would be understood that the fifth embodiment is not limited to ASK modulation and the other methods including PSK and QAM modulation, such as described in the first, second, and third embodiments, will be employed with equal success.

Figure 83:
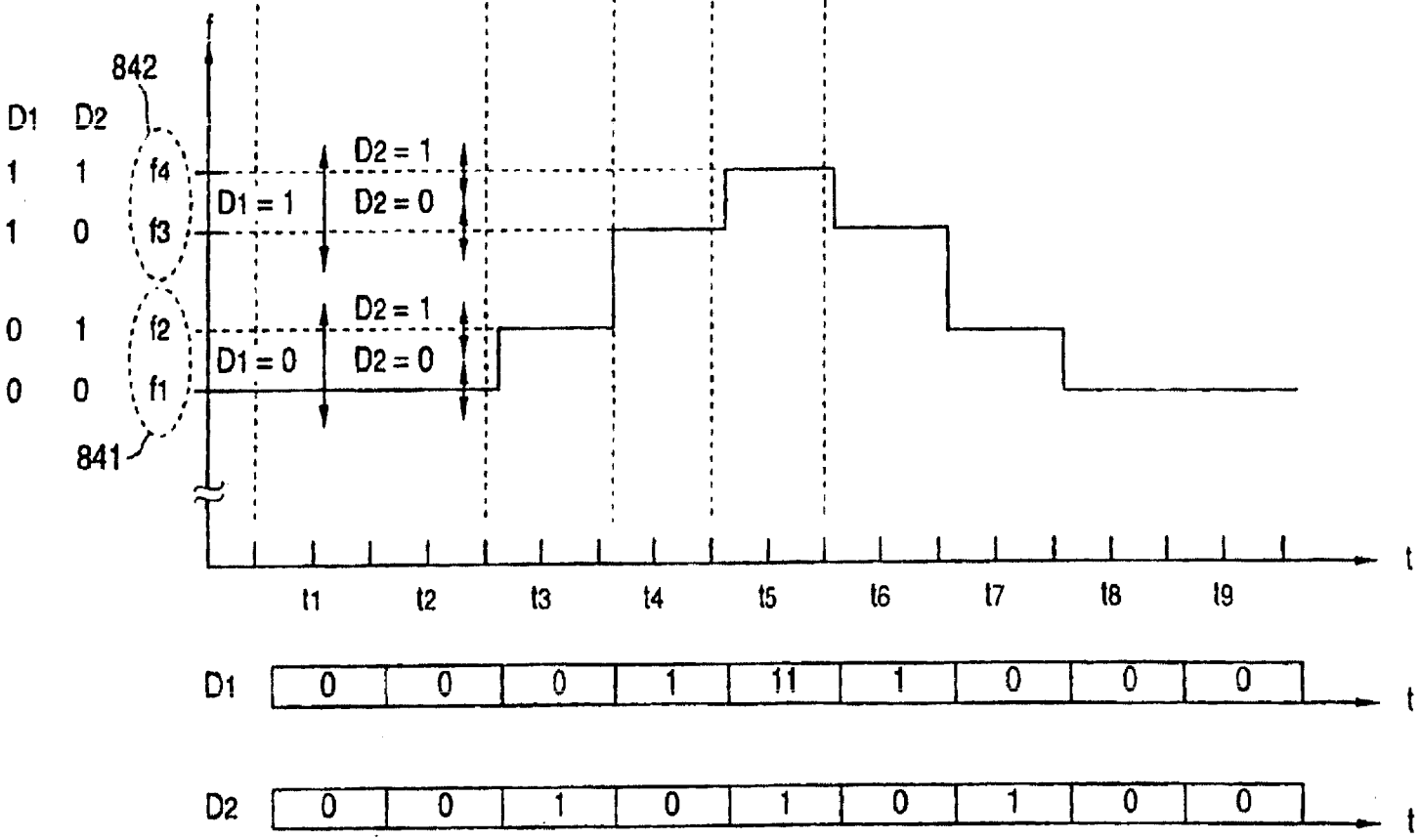
FIG. 83 is a graphic diagram showing the relationship between frequency and time of a frequency modulated signal according to the fifth embodiment.

Also, FSK modulation will be eligible in any of the embodiments. For example, the signal points of a multiple-level FSK signal consisting of four frequency components [F1] *f1*, f2, f3, and f4 are divided into groups as shown in FIG. 58 and when the distance between any two groups are spaced from each other for ease of discrimination, the multi-level transmission of the FSK signal can be implemented, as illustrated in FIG. 83.

More particularly, it is assumed that the frequency group 841 of f1 and f2 is assigned $D_1$=0 and the group 842 of f3 and f4 is assigned $D_1$=1. If f1 and f3 represent 0 at $D_2$ and f2 and f4 represent 1 at $D_2$, two-bit data transmission, one bit at $D_1$ or $D_2$, will be possible as shown in FIG. 83. When the C/N rate is high, a combination of $D_1$=0 and $D_2$=1 is reconstructed at t=t3 and a combination of $D_1$=1 and $D_2$=0 at t=t4. When the C/N rate is low, $D_1$=0 only is reproduced at t=t3 and $D_1$=1 at t=t4. In this manner, the FSK signal can be transmitted in the multi-level arrangement. This multi-state FSK signal transmission is applicable to each of the third, fourth, and fifth embodiments.

The fifth embodiment may also be implemented in the form of a magnetic record/playback apparatus of which block diagram shown in FIG. 84 because its ASK mode action is appropriate to magnetic record and playback operation.

The effects of television broadcasting using the 8-level VSB shown in FIGS. 68(a), (b), and (c) are described below.

While the transmitted data quantity is high with 8-level VSB, it also has a higher error rate than 4-level VSB for the same C/N value. However, in high image quality HDTV transmissions, the available transmission capacity makes it possible to apply more error correction coding, and the error rate can thus be reduced. This band capacity also [enable] *enables* multi-level (hierarchical) television broadcasts and other new features in the future.

The relative effects of 4-level, 8-level, and 16-level VSB are described below.

In ground station broadcasts using the NTSC or PAL frequency band, the usable transmission band is effectively limited to approximately 5 MHz because of the 6-MHz frequency limit of the NTSC format, for example, as shown in FIG. 136. With 4-level VSB, the effective data transmission quantity is 5 MHz×4=20 Mbps because the frequency utilization efficiency is 4 bits/Hz. A minimum of 15 Mbps–18 Mbps is required, however, for digital HDTV signal transmission. Because there is no spare capacity with 4-level VSB, the redundancy used for error correction is only 10–20% of the HDTV effective transmission quantity as shown in the comparison chart in FIG. 169.

With 8-level VSB, the effective data transmission quantity is 5 Mhz×6=30 Mbps because the frequency utilization efficiency is 5 bits/Hz. While 15 Mbps–18 Mbps is required for digital HDTV signal transmission as described above, when using 8-level VSB modulation, more than 50% of the actual HDTV signal transmission quantity can be used for error correction coding as shown in FIG. 169. As shown by error rate curves 805 and 806 in FIG. [161] *163*, the error rate relative to the same C/N value in the transmission system is less with TCM 8-level VSB than with 4-level VSB, even through error correction code gain is greater with 8-level VSB than with 4-level VSB, because significantly more error correction coding can be added with 8-level VSB during ground station broadcasting of same-data-rate HDTV digital signals using the 6-MHz band. As a result, 8-level VSB with high code gain error correction coding also has the effect of enabling a larger service area for ground station HDTV broadcasts than does 4-level VSB. While the increased size of the error correction circuits required with 8-level VSB does increase the complexity of the receiver circuitry, the circuit scale of the equalizer in the receiver is significantly smaller than that of receivers using QAM modulation, which contains a phase component, because VSB and ASK are amplitude modulation methods. As a result, an 8-level VSB circuit board containing the error correction circuit is smaller than an equivalent 32-level QAM board with the same transmission capacity.

A digital HDTV receiver with an appropriate circuit scale and a large ground station broadcasting service area can therefore be achieved using 8-level VSB.

Note that the ECC 744a and trellis encoder 744b in the transmitter and receiver block diagrams of FIG. 84 for the present embodiment, FIGS. 131, 137, 156, and 157 for embodiment 6, and FIG. 144 for embodiment 9 are used as examples of the specific error correction method, and the 4-, 8-, and 16-level VSB modulator 749 described with reference to FIG. 61 are used for transmission. The VSB demodulator 760 described with reference to FIG. 63 is used in the receiver to generate the digital reception data by means of the 4-, 8-, and 16-level level slicer 757 from the 4-, 8-, and 16-level VSB signal. After error correction by means of the trellis decoder 759b and ECC decoder 759a, described below with reference to FIG. 84 for the present embodiment, and FIGS. 131, 137, 156, and 157 for embodiment 6, a digital HDTV signal is generated by the image expander of the image decoder 402, and the digital HDTV signal is then output.

As shown in FIGS. 160(a) and (b) described below with the sixth embodiment, the ECC encoder 744a uses a Reed-Solomon encoder 744j and interleaver 744k, and uses a deinterleaver 759k and Reed-Solomon decoder 759j for the ECC decoder 759a. Applying interleaving as described in the previous embodiment improves resistance to transmission system noise such as burst error.

Code gain can be further increased and the error rate decreased by using a trellis encoder as shown in FIGS. 128(a), (b), (c), (d), (e), and (f). A ratio 2/3 trellis encoder [744b] *743c* and decoder 759b as shown in FIG. 172 are most appropriate with 8-level VSB because of 3 bits/symbol coding. The data quantity is compressed 2/3 in this case.

The embodiments have been described using primarily the example of a multilevel (hierarchical) digital television signal. While an ideal broadcasting format can be achieved using a multilevel signal, the image compression circuit and modulator/demodulator circuits become more complex, and are therefore not preferable due to cost for the start of new broadcasting services. As described at the beginning of the fifth embodiment, a broadcasting system with a simple television circuit can be achieved by using a signal-signal interval $L=L_0$, i.e., an equal interval, in the 4-level VSB and 8-level VSB signals and a non-multilevel television transmission, and by simplifying the circuit shown in FIG. 137 as shown in FIG. 157. Once the HDTV format is in common use, it is then possible to change to a hierarchical 8-level VSB transmission format.

Four- and 8-level VSB have been described above, and 16- and 32-level VSB are described below with reference to FIGS. 159(a)–(b). FIG. 159(a) shows the 16-level VSB constellation. As shown in FIG. 159(b), the signal between two signal points is grouped into eight groups 722a–722h, which are treated as eight signal points and can be treated as 8-level VSB signals to enable a two-stage multilevel transmission. In this case, multilevel transmission can be [achieves] *achieved* with time division multiplexing even when intermittently transmitting an 8-level VSB signal. The maximum data rate with this method is 2/3. In FIG. [157(c)] *159*(*c*), the data is further grouped into four groups 723a–723d, which can be handled as 4-level VSB signals adding one more level to the hierarchy. While the maximum data rate drops with time division multiplex transmission of 4-level VSB signals, multilevel transmission is possible with 3-stage multilevel VSB transmission.

With this method, a multilevel transmission whereby 8-level VSB or 4-level VSB data can be reproduced when the C/N ratio of the 16-level VSB data deteriorates can be achieved. By doubling the signal points of the 16-level VSB format as shown in FIG. 159(d), 32-level VSB transmission is enabled. When 16-level VSB capacity is increased in the future, this method will maintain compatibility while making it possible to obtain a 6-bit/symbol data capacity.

By summarizing the above, the VSB receiver shown in the block diagram of FIG. 161 and the VSB transmitter shown in the block diagram of FIG. 162 can be achieved.

While 4-level VSB and 8-level VSB are used by way of example above, 16-level VSB as shown in FIGS. 159(a)–(c) can also be used for transmission. With 16-level VSB, a 40-Mbps transmission capacity can be used with a 6-MHz band in ground station broadcasting. Because the data rate of the HDTV digital compression signal is 15–18 Mbps using the MPEG standard, there is excessive reserve in the transmission capacity. As shown in FIG. 169, redundancy $R_{16}$= 100% or greater; redundancy is therefore too great for transmitting one channel digital HDTV, and the circuitry is simply made more complex with little additional advantage gained over 8-level VSB. In addition, 16-level VSB redundancy is only about 10%, the same as 4-level VSB redundancy, in ground station HDTV broadcasting of two programs with 16-level VSB. As a result, the service area is reduced because sufficient error correction coding cannot be applied with two-program 16-level VSB. As described before, sufficient error correction cannot be applied with 4-level VSB because the redundancy $R_4$=10–20% and the service area is limited. As will be known from FIG. 169, sufficient error correction coding can be achieved with 8-level VSB because the redundancy $R_8$=50%. A broad service area can also be achieved without significantly.

FIG. 84 will now be explained in more detail. FIG. 174 is a block diagram showing a circuitry arrangement of QAM/VSB compatible modulator for multi-level transmission according to Embodiment 5. The input 742 comprises a first data stream 743 and a second data stream 744 which are combined by a processor 745 and then code allocated to I-channel and Q-channel by an I/Q mapping 1000 prior to quadrature modulation. For the VSB modulation, the I/Q mapping 1000 delivers data on one or I-axis of the two channels while the I and Q channels are the same in the level. For the QAM modulation, the code assignment is executed according to the constellation diagram. Resultant mapped signal outputs of the I/Q mapping 1000 are transmitted to two FIR filters 1001 and 1002 where they are weighted with roll-off characteristics before being supplied to DC offsets 1003 and 1004 respectively. In the VSB system, the tap coefficient values of the FIR filters 1001 and 1002 are determined so that two filter outputs are orthogonal to each other. More particularly, a pair of equal input data streams are converted by the FIR filters 1001 and 1002 to two discrete code forms which are plotted in orthogonal relationship to each other in the coordinate. Also, in the VSB system, a portion of the carrier is allowed to pass through for ease of reproduction at the receiver side. This is done at the DC offsets 1003 and 1004. The tap coefficients of the FIR filters 1001 and 1002 are selected with a VSB/QAM selector 1009 for determining the type of modulation. A control output of the QAM/VSB selector 1009 actuates a coefficient generator 1008 for producing and delivering given coefficients to the two FIR filters 1001 and 1002. Two outputs of the DC offsets 1003 and 1004 are fed to a data selector 1005 where their I/Q components are alternately selected to produce a VSB or QAM modulated signal. The resultant digital modulated signal of the data selector 1005 is converted by a D/A converter to its analog form which is further transmitted from an output 748. The action of the data selector 1005 is controlled by a four-time symbol frequency clock produced and supplied from a clock generator 1007.

As explained, the foregoing compatible hardware arrangement is capable of producing both QAM and VSB modulated signals by selectively determining the coefficient values of the coefficient generator 1008.

FIG. 175 is a block diagram showing another circuitry arrangement of the QAM/VSB modulator for multi-level transmission according to Embodiment 5. Two, first and second, data streams are multiplexed by a processor 745 and code allocated by an I/Q mapping 1000 to the I and Q coordinates. Resultant two, I and Q, channel data outputs of the I/Q mapping 1000 are transferred to an I/Q selector 1010 where one of the I and Q signals is selected using a four-time symbol frequency clock produced and supplied from a clock generator 1007. The selected channel modulated signal is waveform shaped by an FIR filter 1011, digital-to-analog converted by a D/A converter 1012, and further transmitted through an output 748.

In this arrangement, the filter circuit is simple as uniaxial although the filter processing speed has to be increased to two times that of the previous arrangement.

FIG. 176 illustrates a third modification of the QAM/VSB modulator of Embodiment 5. Two, first and second, data streams are multiplexed by a processor 745 and transferred to an I/Q mapping 1000. I and Q channel signals plotted to their respective code points by the I/Q mapping 1000 are subjected to VSB orthogonal impulse response processing of two FIR filters 1026 and 1027 and transmitted to two multipliers 1020 and 1021 respectively. The multipliers 1020 and 1021 are loaded with different waveform data determined by a cos table 1024 and a sin table 1023 respectively to which a quasi-carrier is supplied from a counter 1025. Accordingly, the I and Q channel signals are multiplied with the cos and sin signals respectively at their respective multipliers 1020 and 1021. Two modulated outputs of the multipliers 1020 and 1021 are fed to an adder 1022 where their I and Q data are combined. A resultant composite signal is then converted by a D/A converter 1006 to its analog form which is further delivered from an output 748.

In the third modification, the carrier frequency of the analog modulated signal can be changed by varying the counting interval of the counter 1025.

FIG. 177 is a block diagram showing a Trellis decoder in the demodulator. The Trellis [encoder] *decoder* 759b explained with FIG. 84 may change the coding [grain] *gain* according to the level of the transmitter side and the conditions of a transmission line. Hence, a corresponding Trellis decoder is needed in the receiver side.

The performance of the Trellis decoder depends on how a code path is determined through internal calculation and should be associated with some path memories.

The results of calculation with the Trellis decoder denoted by 1030 are stored in a given number of path memories, generally 1032, 1033, and 1034, merged in a path memory group 1031. The number of the results is preliminarily determined from the needs at the receiver side, depending on e.g. the transmission channel basis or the broadcasting system of a type. For the purpose, an address control signal is supplied to a memory address generator 1035 which in turn addresses a corresponding one of the path memories to select a code path.

This arrangement allows the single Trellis decoder 1030 associated with the plural memories to perform multiple characteristics as acting as a number of the Trellis decoders. Thus, *the* demodulator will be reduced in the hardware construction as compared with a conventional circuit arrangement where a plurality of the Trellis decoders are coupled in parallel for selective use.

FIG. 178 is a block diagram of a receiver for interception of VSB multi-level transmitted signals emitted in the air. It is also essential for digital broadcasting service to eliminate any signal interference which is common in the [convential] *conventional* analog broadcasting systems.

For elimination of such an interference, notch filters have been used with optimum success. However, any fixed notch filter can hardly conduct a frequency offset signal used in the conventional analog broadcasting system. The receiver shown in FIG. 178 offers an improvement. An analog or digital signal from an antenna 32a is selectively received by a tuner 752 and data extracted by an I/Q detector 1040. During the detection, a frequency error correction signal is produced by an AFC detector 1043 from orthogonal data and fed back to the tuner 752. The AFC detector 1043 is adapted to vary the feedback of the frequency error correction signal using an external control. The interference by an analog signal in a detected signal is examined by an interference detector 1041 where it is compared with stored interference patterns for identification. If the intercepted digital signal carries a cochannel interference by an analog signal, it is subjected to a notch filter characteristic action of an NTSC rejection filter 1042. If not, the digital signal is directly passed without the rejecting action of the filter 1042. When the interference detector 1041 has found an increase of the interference in the intercepted signal resulting from the frequency offset at the transmitter side, it causes a carrier offset detector 1044 to produce and transmit a command signal via the AFC detector 1043 to the tuner 752 for changing its local oscillation frequency. As the result, the interference level measures at the interference detector 1041 is decreased to a point which represents the optimum receiving level of the receiver. An output signal of the NTSC rejection filter 1042 is then fed to an equalizer 1045 where its ghost component of removed. In addition, a BER (bit error ratio) counter 1048 is provided for detecting remaining errors in the equalized signal and if so, the signal is fed back for optimizing the signal interception in relation to the frequency offset. Finally, the equalized signal from the equalizer 1045 is transferred to a rotator 1046 for carrier reproduction and then to a decision 1047 for reproduction of data from the corresponding code points.

FIG. 179 illustrates another arrangement of the QAM/VSB compatible receiver.

Intercepted broadcasting waveforms including QAM and VSB signals are fed to a tuner 1050. After tuning, an intermediate frequency signal of the selected waveform is band rejected by a filter (SAW) 1051 and converted by an analog converter 1052 to an A/D converter enable frequency. When the selected waveform is a VSB signal, it is subjected to uniaxial detection and AFC detection of a VSB detector 1054. An A/D converter 1053 digitizes a QAM modulated signal directly and a baseband signal extracted from the VSB signal.

When the digitized signal is a QAM signal, it is subjected to digital AFC action of an AFC 1055, I/Q data reconstruction of a QAM detector 1056, and waveform shaping of a roll-off filter 1057. The waveform shaped signal is then transmitted to a waveform equalizer 1059 for removal of unwanted ghost. The output signal of the equalizer 1059 is phase compensated by a carrier recovery 1060 and code reconstructed by a decision 1061. Meanwhile, an AGC detector 1064 produces an AGC signal and an AFC detector 1062 calculates a frequency change from the output of the carrier recovery 1060.

A code form signal of the decision 1061 is then transmitted through a deinterleaver 1065, a Trellis decoder 1066, a deinterleaver 1067, and a Reed-Solomon decoder 1068 and released after an error correction.

The VSB signal output of the A/D converter 1053 is directly fed to the equalizer 1059 and then processed in the same manner as for the QAM signal. It is also subjected to the same error correction as the QAM signal.

There is a clock recovery 1058 operable with the entire symbols for the QAM signal. For the VSB signal, a clock reference signal of a burst form is extracted by a gate signal generator from the VSB output signal of the VSB detector 1054 and fed to the clock recovery 1058 for actuation of its PLL.

EMBODIMENT 6

A sixth embodiment of the present invention is a magnetic recording and playback apparatus in which the above transmission and recording method is employed. Although in the fifth embodiment a multiple-level ASK data transmission is described, [but] it is also feasible in the same manner to adopt this invention in a magnetic recording and playback apparatus of a multi-level ASK recording system as shown in the block diagram of FIG. 173. A multi-level or non-multilevel magnetic recording can be realized by applying the C-CDM method of the present invention to PSK, FCK, and QAM, as well as ASK.

First of all, the method of realizing a multi-level recording in a 16 QAM or 32 QAM magnetic recording playback apparatus will be explained in compliance with the C-CDM method of the present invention. FIG. 84 is a circuit block diagram showing a 16 QAM 32 QAM, 4 ASK, 8 ASK, 16 ASK, 8 PSK system incorporating C-CDM modulator. Hereinafter, a QAM system being multiplexed by the C-CDM method is termed as SRQAM. FIGS. 137 and 154 show block diagrams in which SRQAM is applied to the transmission system, such as broadcast.

[AS] *As* shown in FIG. 84, an input video signal, e.g. an HDTV signal, to a magnetic record/playback apparatus 851 is divided and compressed by a video encoder 401 into a low frequency band signal through a first video encoder 401a and a high frequency band signal through a second video encoder 401b respectively. Then, a low frequency band component, e.g. $H_LV_L$, of the video signal is fed to a first data stream input 743 of an input unit 742 and a high frequency band component including $H_HV_H$ is fed to a second data stream input 744 of the same. The two components are further transferred to a modulator 749 of a modulator[/demodulator] unit [852] *852a*. The first data stream input 743 adds an error correcting code to the low frequency band signal in an ECC 743a. On the other hand, the second data stream fed into the second data stream input 744 is 2 bit in case of 16 SRQAM, 3 bit in case of 36 SRQAM, and 4 bit in case of 64 SRQAM. After an error correcting code is encoded by an ECC 744a, this signal is supplied to a Trellis encoder 744b, such as shown in FIGS. 128(a), (b), (c) in which a Trellis encoded signal having a ratio 1/2 in case of 16 SRQAM, 2/3 in case 32 SRQAM, and 3/4 in case of 64 SRQAM, is produced. A 64 SRQAM signal, for example, has a first data stream of 2 bit and a second data stream of 4 bit. A Trellis encoder 744b of FIG. 128(c) allows this 64 SRQAM signal to perform a Trellis encoding of ratio 3/4 wherein 3 bit data is converted into 4 bit data. In the case of 4 ASK, 8 ASK, and 16 ASK, the Trellis encoding at the ratio of 1/2, 2/3, and 4/3 can be carried [our] *out* solely. Thus, redundancy increases and a data rate decreases, while error correcting capability increases. This results in the reduction of an error [rate-in] *rate in* the same data rate. Accordingly, transmittable information amount of the recording/playback system or transmission system will increase substantially.

Since the 8 VSB transmission system described above in connection with the fifth embodiment takes 3 bits per symbol, the Trellis encoder 744g and the Trellis decoder 744q with the ratio 2/3 as shown in FIGS. 128(b), (e) can be used, and the entire block diagram will be as shown in FIG. 171.

It is, however, possible to constitute the first data stream input 743 not to include a Trellis encoder as shown in FIG. 84 of this sixth embodiment because the first data stream has low error rate inherently. This will be advantageous in view of the simplification of circuit configuration. The second data stream, however, has a narrow inter-code distance as compared with the first data stream and, therefore, has a worse error rate. The Trellis encoding of the second data stream improves such a worse error rate. It is no doubt that an overall circuit configuration becomes simple if the Trellis encoding of the first data stream is eliminated. An operation for modulation is almost identical to that of the transmitter of the fifth embodiment shown in FIG. 64 and will [be] not be explained in greater detail. A modulated signal of the modulator 749 is fed into a recording/playback circuit 853 in which it is AC biased by a bias generator 856 and amplified by an amplifier 857a. Thereafter, the signal is fed to a magnetic head [854] *854b* for recording onto a magnetic tape 855.

Figure 113:
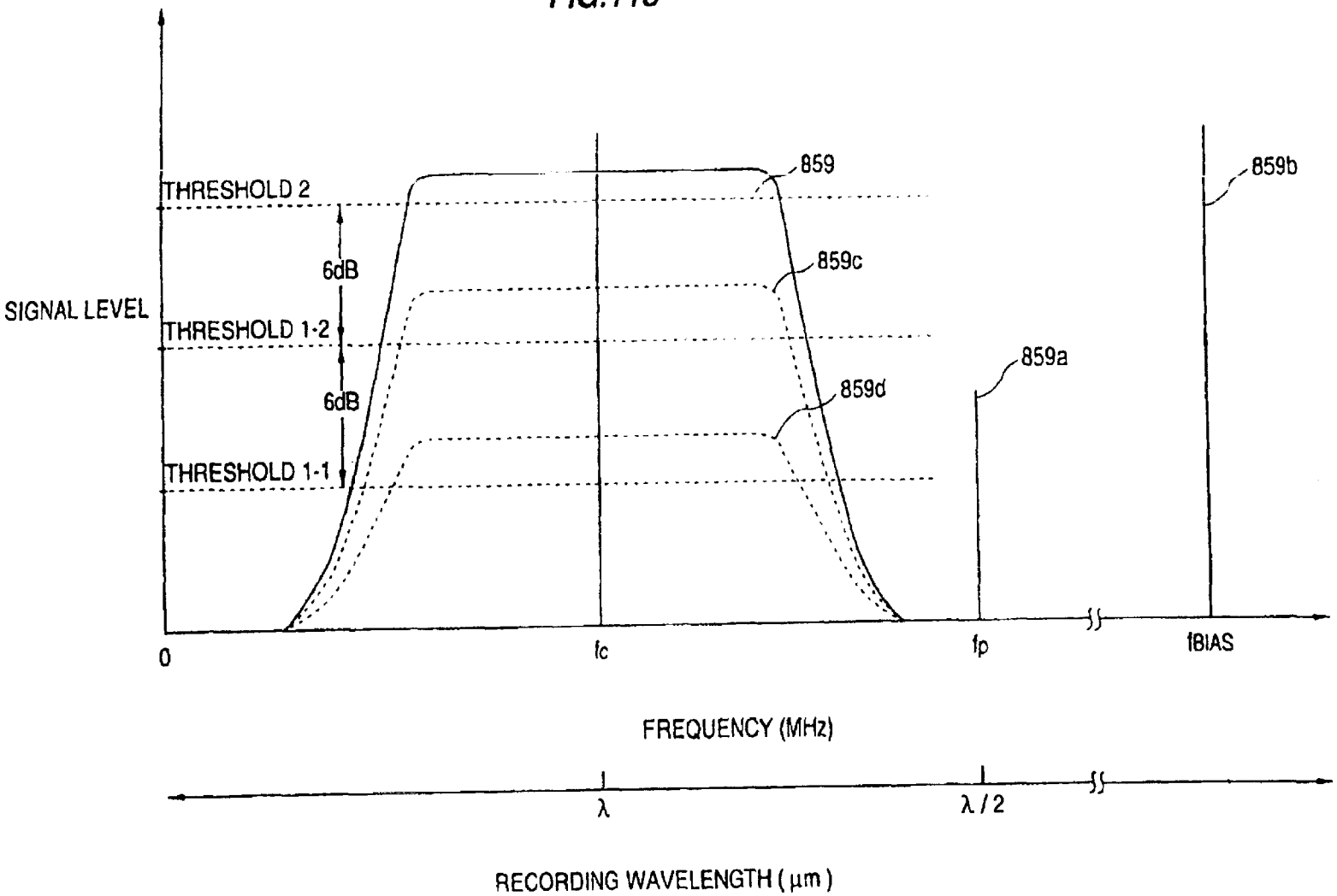
FIG. 113 is a view showing a frequency assignment of a modulation signal according to the fifth embodiment.
Figure 114:
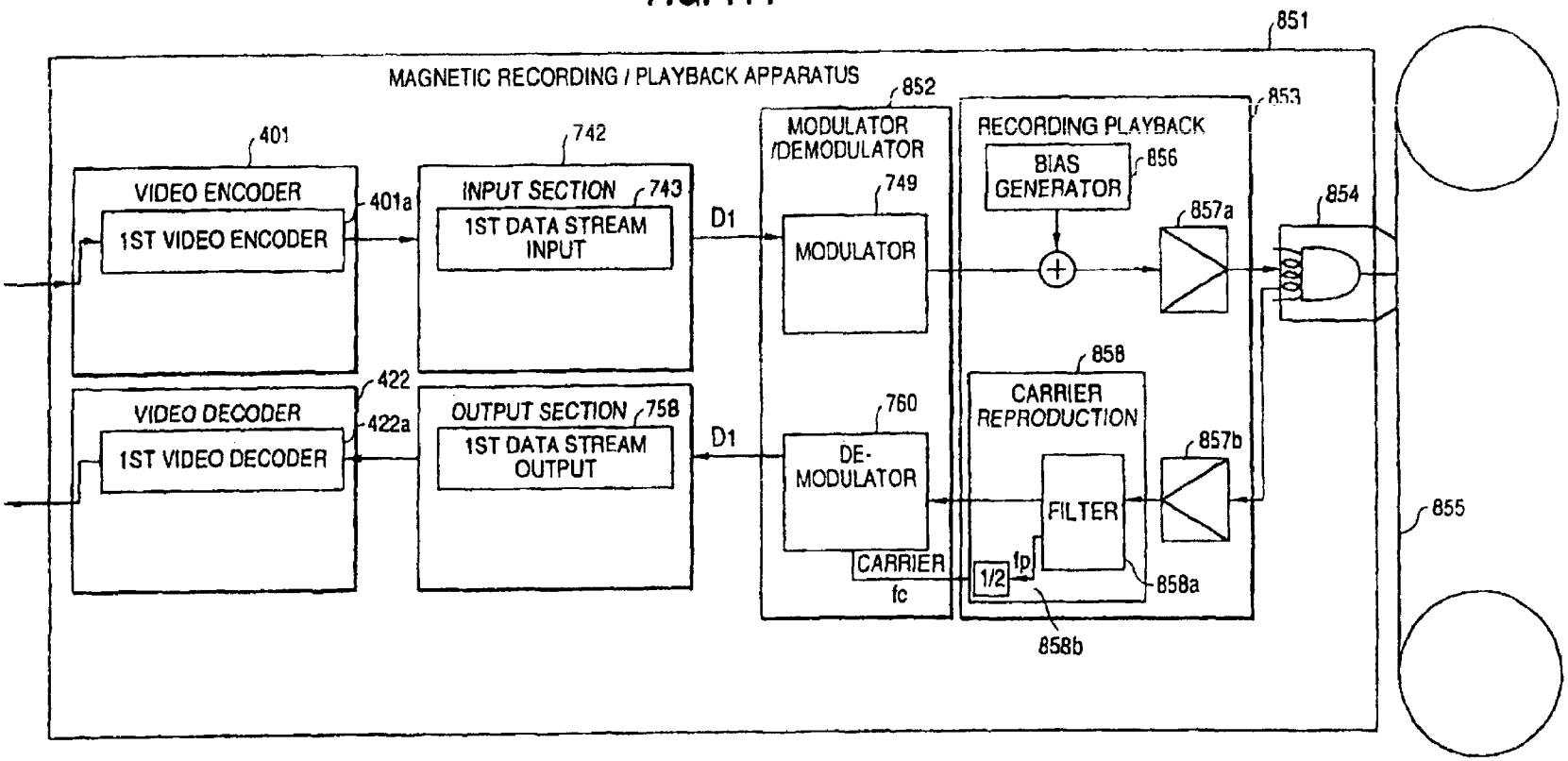

A format of the recorded signal is shown in a recording signal frequency assignment of FIG. 113. A main, e.g. 16 SRQAM, signal 859 having a carrier of frequency fc records information, and also a pilot $f_p$ signal 859a having a frequency 2fc is recorded simultaneously. Distortion in the recording operation is lowered as a bias signal 859b having a frequency 2fc is recorded simultaneously. Distortion in the recording operation is lowered as a bias signal 859b having a frequency $f_{BIAS}$ adds AC bias for magnetic recording. Two of three-level signals shown in FIG. 113 are recorded in multiple state. In order to reproduce these recorded signals, two thresholds Th-1-2, Th-2 are given. A signal 859 will reproduce all of two levels while a signal 859 will reproduce $D_1$ data only, depending on C/N level of the recording/playback.

A main signal of 16 SRQAM will have a signal point assignment shown in FIG. 10. Furthermore, a main signal of 36 SRQAM will have a signal point assignment shown in FIG. 100. When 4 ASK, 8 ASK are used, the constellation will be as shown in FIGS. 58, 68(a) and (b). In reproduction of this signal, both the main signal 859 and the pilot signal 859a are reproduced through the magnetic head [854] *854a* and amplified by an amplifier 857b. An output signal of the amplifier 857b is fed to a carrier reproduction circuit 858 in which a filter 858a separates the frequency of the pilot signal $f_p$ having a frequency [2f0] $2f_0$ and ½ frequency divider 858b reproduces a carrier of frequency [f0] $f_0$ to transfer it to a demodulator 760. This reproduced carrier is used to demodulate the main signal in the demodulator 760. Assuming that a magnetic recording tape 855, e.g. HDTV tape, is of a high C/N rate, 16 signal points are discriminatable and thus both $D_1$ and $D_2$ are demodulated in the demodulator 760. Subsequentially, a video decoder 402 [reproduce] *reproduces* all the signals. An HDTV VCR can reproduce a high bit-rate TV signal such as 15 Mbsp HDTV signal. The [low] *lower* the C/N rate is, the cheaper the cost of a video tape is. So far, a VHS tape in the market is inferior more than 10 dB in C/N rate to a full-scale broadcast tape. If a video tape 855 is of low C/N rate, it will not be able to discriminate all the 16 or 32 valued signal points. Therefore the first data stream $D_1$ can be reproduced, while a 2 bit, 3 bit, or 4 bit data stream of the second data stream $D_2$ cannot be reproduced. Only 2 bit data stream of the first data stream is reproduced. If a two-level HDTV video signal is recorded and reproduced, a low C/N tape having insufficient capability of reproducing a high frequency band video signal can output only a low rate low frequency band video signal of the first data stream, specifically e.g. a 7 Mbps wide NTSC TV signal.

As shown in a block diagram of FIG. 144, a second data stream output 759, the second data stream input 744, and the second video decoder 402a can be eliminated in order to provide customers one aspect of lower grade products. In this case, a recording/playback apparatus 851, dedicated to a low bit rate, will include a modulator such as a modulated QPSK which modulates or demodulates the first [date] *data* stream only. This apparatus allows only the first data stream to be recorded and reproduced. Specifically, a wide NTSC grade video signal can be recorded and reproduced.

Above-described high C/N rate video tape 855 capable of recording a high bit-rate signal, e.g. HDTV signal, will be able to [use] *be used* in such a low bit-rate dedicated magnetic recording/playback apparatus but will reproduce the first data stream $D_1$ only. That is, the wide NTSC signal is outputted, while the second data stream is not reproduced. In other words, one recording/playback apparatus having a complicated configuration can reproduce [a] *an* HDTV signal and the other recording/playback apparatus having a simple configuration can reproduce a wide NTSC signal if a given video tape 855 includes the same multi-level HDTV signal. Accordingly in case of two-level multiple state, four combinations will be realized with [prefect] *perfect* compatibility among two tapes having different C/N rates and two recording/playback apparatus having different recording/playback data rates. This will bring a remarkable effect. In this case, an NTSC dedicated apparatus will be simple in construction as compared with an HDTV dedicated apparatus. In more detail, a circuitry scale of [ECTV] *EDTV* decoder will be ⅙ of that of HDTV decoder. Therefore, a low function apparatus can be realized at fairly low cost. Realization of two, HDTV and EDTV, types recording/playback apparatus having different recording/reproducing capability of picture quality will provide various type products ranging in a wide price range. Users can freely select a tape among a plurality of tapes from an expensive high C/N rate tape to a cheaper low C/N rate tape, as occasion demands so as to satisfy required picture quality. Not only maintaining perfect compatibility but obtaining expandable capability will be attained and further compatibility with a future system will be ensured. Consequently, it will be possible to establish long-lasting standards for recording/playback apparatus. Other recording methods will be used in the same manner. For example, a multi-level recording will be realized by use of phase modulation explained in the first and third embodiments. A recording using ASK explained in the fifth embodiment will also be possible. A two or three multi-level state will be realized by converting present recording from two-level to four-level ASK or to eight-level ASK and dividing into two group as shown in FIGS. 59(c) and 59(d) or in FIGS. 68(a) and 68(b).

A circuit block diagram for ASK [will be as] *is* shown in FIG. 173 which is similar to that disclosed in FIG. 84. By the combination of Trellis and ASK, the error rate will be reduced. Besides embodiments already described, a multi-level recording will also realized by use of multiple tracks on a magnetic [type] *tape*. Furthermore, a theoretical multi-level recording will *be* feasible by differentiating the error correcting capability so as to discriminate respective data.

Compatibility with future standards will be described below. A setting of standards for recording/playback apparatus such as VCR is normally done by taking account of the [most] highest C/N rate tape available in practice. The recording characteristics of a tape progresses rapidly. For example, the C/N rate has been improved more than 10 dB compared with the tape used 10 years ago. If *it is* supposed that new standards will be established after 10 to 20 years due to an advancement of tape property, a conventional method will encounter with difficulty in maintaining compatibility with older standards. New and old standards, in fact, used to be one-way compatible or non-compatible with each other. On the contrary, in accordance with the present invention, the standards are first of all established for recording and/or reproducing the first data stream and/or second data stream on present day tapes. Subsequently, if the C/N rate is improved magnificently in future, an upper level data stream, e.g. a third data stream, will be added without any difficulty as long as the present inventions incorporated in the system. For example, a super HDTV VCR capable of recording or reproducing three-level 64 SRQAM or 8 ASK will be realized while maintaining perfect compatibility with the conventional standards. A magnetic tape, recording first to third data streams in compliance with new standards, will be able to use, of course, in the older two-level magnetic recording/playback apparatus capable of recording and/or reproducing only first and second data streams. In this case, first and second data streams can be reproduced perfectly although the third data stream is left non-reproduced. Therefore, an HDTV signal can be reproduced. For these reasons, the merit of expanding recording data amount while maintaining compatibility between new and old standards is expected.

Returning to the explanation of reproducing operation of FIG. 84, the magnetic head [854] *854a* and the magnetic reproduction circuit [853] *858* reproduce a reproducing signal from the magnetic tape 855 and [feeds] *feed* it to [the modulation/demodulation circuit 852] *a demodulator unit 852b*. The demodulating operation is almost identical with that of first, third, and fourth embodiments and will no further be explained. The demodulator 760 reproduces the first and second data stream $D_1$ and $D_2$. The second data stream $D_2$ is error corrected with high code gain in a Trellis-decoder 759b such as a Vitabi decoder, so as to be low error rate. The video decoder 402 demodulates $D_1$ and $D_2$ signals to output an HDTV video signal.

FIG. 131 is a block diagram showing a three-level magnetic recording/playback apparatus in accordance with the present invention which includes one theoretical level in addition to two physical levels. This system is substantially the same as that of FIG. 84. The difference is that the first data stream is further divided into two subchannels by use of a TDM in order to realize a three-level constitution.

As shown in FIG. 131, an HDTV signal is separated first of all into two, medium and low frequency band video signals $D_{1-1}$ and $D_{1-2}$, through a 1-1 video encoder 401c and a 1-2 video encoder 401d and, thereafter, fed into a first data stream input 743 of an input section 742. The data stream $D_{1-1}$ having a picture quality of MPEG grade is error correcting coded with high code gain in an ECC coder 743a, while the data stream $D_{1-2}$ is error correcting coded with normal code gain in an ECC encoder 743b. $D_{1-1}$ and $D_{1-2}$ are time multiplexed together in a TDM 743c to be one data stream D1. $D_1$ and $D_2$ are modulated into two-level signals in a C-CDM 749 and then recorded on the magnetic tape 855 through the magnetic head 854.

In playback operation, a recording signal reproduced through the magnetic head 854 is demodulated into $D_1$ and $D_2$ by the C-CDM demodulator 760 in the same manner as in the explanation of FIG. 84. The first data stream $D_1$ is demodulated into two, $D_{1-1}$ and $D_{1-2}$, subchannels through the TDM 758c provided in the first data stream output 758. $D_{1-1}$ data is error corrected in an ECC decoder 758a having high code gain. Therefore, $D_{1-1}$ data can be demodulated at a lower C/N rate as compared with $D_{1-2}$ data. A 1-1 video decoder 402a decodes the $D_{1-1}$ data and outputs an LDTV signal. On the other hand, $D_{1-2}$ data is error corrected in an ECC decoder [75 8b] *758b* having normal code gain. Therefore, $D_{1-2}$ data has a threshold value of high C/N rate compared with $D_{1-1}$ data and thus will not be demodulated when a signal level is not large. $D_{1-2}$ data is then demodulated in a 1-2 video decoder [4 02d] *402d* and summed with $D_{1-1}$ data to output an EDTV signal of wide NTSC grade.

The second data stream $D_2$ is Vitabi demodulated in a Trellis decoder 759b and error corrected at an ECC decoder [7 59a] *759a*. Thereafter, $D_2$ data is converted into a high frequency band video signal through a second video decoder 402b and, then, summed with $D_{1-1}$ *and* $D_{1-2}$ data to output an HDTV signal. In this case, a threshold value of the C/N rate of $D_2$ data is set larger than that of C/N rate of $D_{1-2}$ data. Accordingly, $D_{1-1}$ data, i.e. an LDTV signal, will be reproduced from a tape 855 having a smaller C/N rate. $D_{1-1}$ and $D_{1-2}$ data, i.e. an EDTV signal, will be reproduced from a tape 855 having a normal C/N rate. And, $D_{1-1}$, $D_{1-2}$, and $D_2$, i.e. an HDTV signal, will be reproduced from a tape 855 having a high C/N rate.

Three-level magnetic recording/playback apparatus can be realized in this manner. As described in the foregoing description, the tape 855 has an interrelation between C/N rate and cost. The present invention allows users to select a grade of tape in accordance with a content of TV program they want to record because video signals having picture qualities of three grades are recorded and/or reproduced in accordance with tape cost.

Next, an effect of multi-level recording will be described with respect to fast feed playback. As shown in a recording track diagram of FIG. 132, a recording track 855a having an azimuth angle A and a recording track 855b having an opposite azimuth angle B are alternately arrayed on the magnetic tape 855. The recording track 855a has a recording region 855c at its central portion and the remainder as $D_{1-2}$ recording regions 855d, as denoted in the drawing. This unique recording pattern is provided on at least one of several recording tracks. The recording region 855c records one frame of LDTV signal. A high frequency band signal $D_2$ is recorded on a $D_2$ recording region 855e corresponding to an entire recording region of the recording track 855a. This recording format causes no novel effect against a normal speed recording/playback operation.

A fast feed reproduction in a reverse direction does not allow a magnetic head trace 855f having an azimuth angle A to coincide with the magnetic track as shown in the drawing. As the present invention provides the $D_{1-1}$ recording region [8 55c] *855c* at a central narrow region of the magnetic tape as shown in FIG. 132, this region only is surely reproduced although it occurs at a predetermined probability. Thus reproduced $D_{1-1}$ signal can demodulate an entire picture plane of the same time although its picture quality is an LDTV of MPEG1 level. In this manner several to several tens LDTV signals per second can be reproduced with perfect picture images during the fast feed playback operation, thereby enabling users to surely confirm picture images during the fast feed operation.

A head trace 855g corresponds to a head trace in the reverse playback operation, from which it is understood only a part of the magnetic track is traced in the reverse playback operation. The recording/playback format shown in FIG. 132 however allows, even in such a reverse playback operation, to reproduce $D_{1-1}$ recording region and, therefore, an animation of LDTV grade is outputted intermittently.

Accordingly, the present invention makes it possible to record a picture image of LDTV grade within a narrow region on the recording track, which results in intermittent reproduction of almost perfect still pictures with picture quality of LDTV grade during normal and reverse fast feed playback operations. Thus, the users can easily confirm picture images even in high-speed seaching.

Next, another method will be described to respond a higher speed fast feed playback operation. A $D_{1-1}$ recording region 855c is provided as shown at lower right of FIG. 132, so that one frame of LDTV signal is recorded thereon. Furthermore, a narrow $D_{1-1} \cdot D_2$ recording region 855h is provided at a part of the $D_{1-1}$ recording region 855c. A subchannel $D_{1-1}$ in this region records a part of information relating to the one frame of LDTV signal. The remainder of the LDTV information is recorded on the $D_2$ recording region 855j of the $D_{1-1} \cdot D_2$ recording region 855h in a duplicated manner. The subchannel $D_2$ has a data recording capacity 3 to 5 times as much as the subchannel $D_{1-1}$. Therefore, subchannels $D_{1-1}$ and $D_2$ can record one frame information of LDTV signal on a smaller, [1/3 ?/5] *1/3~1/5*, area of the recording tape. As the head trace can be recorded in a further narrower regions 855h, 855j, both time and area are decreased into [1/3 ?/5] *1/3~1/5* as compared with a head trace time $T_{S1}$. Even if the trace of head is further inclined by increasing fast feed speed amount, the probability of entirely tracing this region will be increased. Accordingly, perfect LDTV picture images will be intermittently reproduced even if the fast feed speed is increased up to 3 to 5 times as fast as the case of the subchannel $D_{1-1}$ only.

In case of a two-level VCR, this method is useless in reproducing the $D_2$ recording region 855j and therefore this region will not be reproduced in a high-speed fast feed playback operation. On the other hand, a three-level high performance VCR will allow users to confirm a picture image even if a fast feed playback operation is executed at a faster, 3 to 5 times as fast as two-level VCR, speed. In other words, not only excellent picture quality is obtained in accordance with the cost but a maximum fast feed speed capable of reproducing picture images can be increased in accordance with the cost.

Although this embodiment utilizes a multi-level modulation system, it is needless to say that a normal, e.g. 16 QAM, modulation system can also be adopted to realize the fast feed playback operation in accordance with the present invention as long as an encoding of picture images is of multiple type.

A recording method of a conventional non-multiple digital VCR, in which picture images are highly compressed, disperses video data uniformly. Therefore, it was not possible in a fast feed playback operation to reproduce all the picture images on a picture plane of the same time. The picture reproduced was the one consisting of a plurality of picture image blocks having non-coincident time bases. The present invention, however, provides a multi-level HDTV VCR which can reproduce picture image blocks having coincided time bases on a picture plane during a fast feed playback operation although its picture quality is of LDTV grade.

The three-level recording in accordance with the present invention will be able to reproduce a high resolution TV signal such as HDTV signal when the recording/playback system has a high C/N rate. Meanwhile, a TV signal of EDTV grade, e.g. a wide NTSC signal, or a TV signal of LDTV grade, e.g. a low resolution NTSC signal, will be outputted when the recording/playback system has a low C/N rate or poor function.

As *it* is described in the foregoing description, the magnetic recording/playback apparatus in accordance with the present invention can reproduce picture images consisting of the same content even if C/N rate is low or error is high, although the resolution or the picture quality is relatively low.

EMBODIMENT 7

Figure 91:
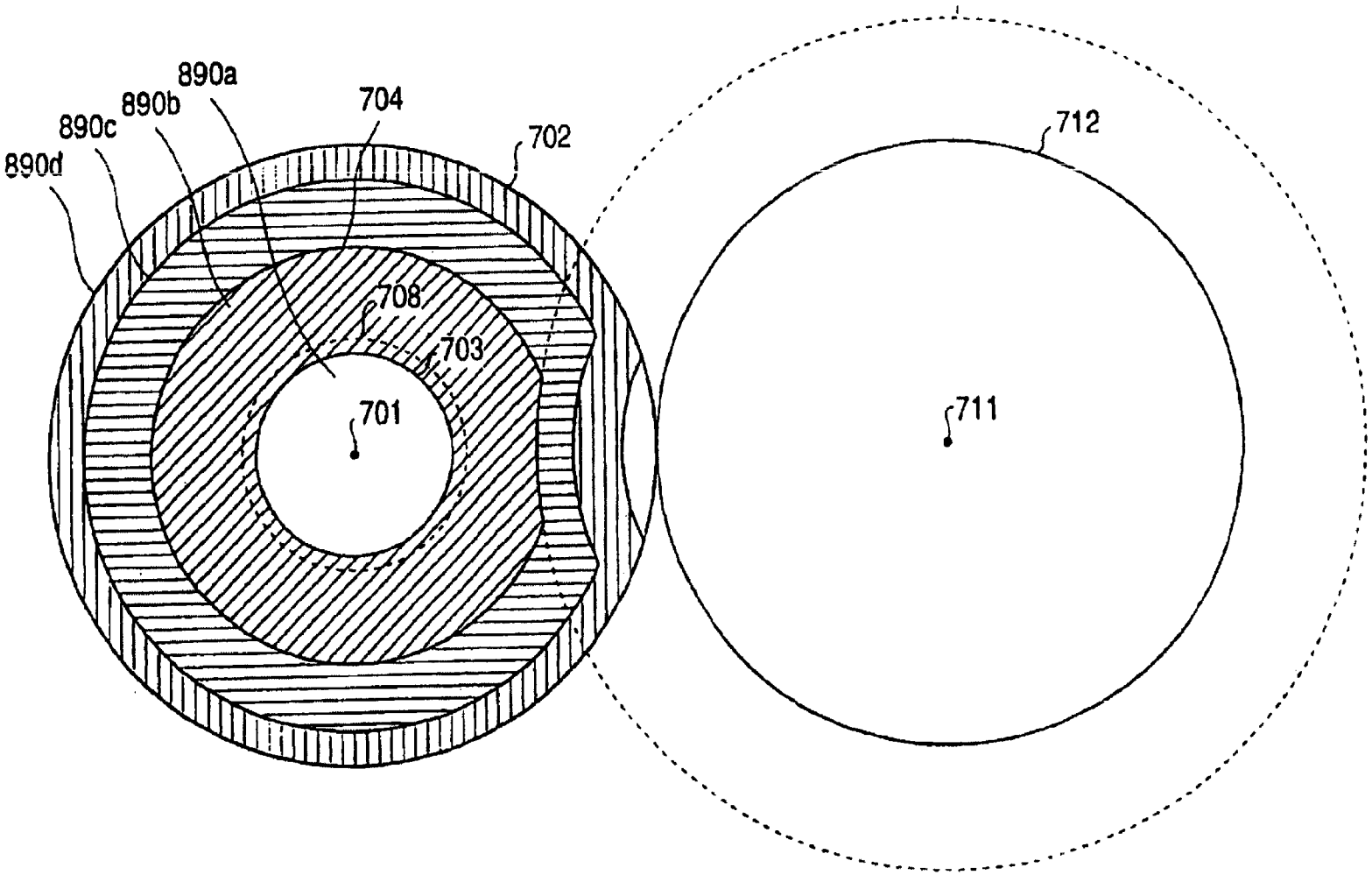
FIG. 91 is a diagram showing signal attenuating regions in the four-level transmission of [a] *the* sixth embodiment.

A seventh embodiment of the present invention will be described for execution of four-level video signal transmission. A combination of the four-level signal transmission and the four-level video data construction will create a four-level signal service area as shown in FIG. 91. The four-level service area is consisted of, from innermost, a first 890a, a second 890b, a third 890c, and a fourth signal receiving area 890d. The method of developing such a four-level service area will be explained in more detail.

The four-level arrangement can be implemented by using four physically different levels determined through modulation or four logic levels defined by data discrimination in the error correction capability. The former provides a large difference in the C/N rate between two adjacent levels and the C/N rate has to be increased to discriminate all the four levels from each other. The latter is based on the action of demodulation and a difference in the C/N rate between two adjacent levels should stay at minimum. Hence, the four-level arrangement is best constructed using a combination of two physical levels and two logic levels. The division of a video signal into four signal levels will be explained.

Figure 93:
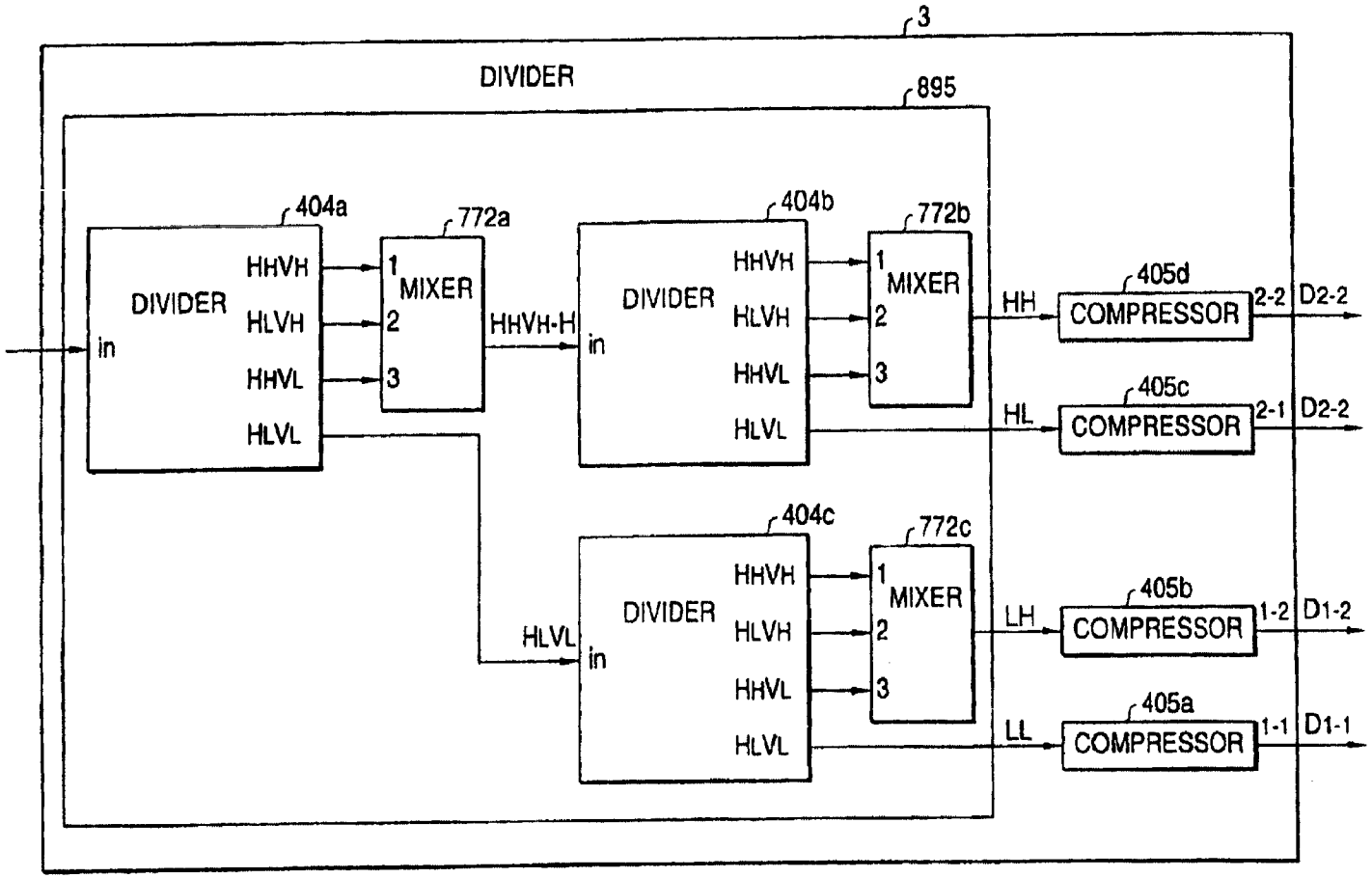
FIG. 93 is a block diagram of a divider of the sixth embodiment.

FIG. 93 is a block diagram of a divider circuit 3 which comprises a video divider 895 and four compressors 405a, 405b, 405c, and 405d. The video divider 895 contains three dividers 404a, 404b, and 404c which are arranged identical to the divider circuit 404 of the first video encoder 401 shown in FIG. 30 and will [be] not be explained in greater detail. An input video signal is divided by the dividers into four components, $H_LV_L$ of low resolution data, $H_HV_H$ of high resolution data, and $H_LV_H$ and $H_HV_L$ for medium resolution data. The resolution of $H_LV_L$ is a half that of the original input signal.

The input video signal is first divided by the divider [4 04a] *404a* into two, high and low, frequency band components, each component being divided into two, horizontal and vertical, segments. The intermediate between the high and low frequency ranges is a dividing point according to the embodiment. Hence, if the input video signal is an HDTV signal of 1000 line vertical resolution, $H_LV_L$ has a vertical resolution of 500 lines and a horizontal resolution of a half value.

Each of two, horizontal and vertical, data of the low frequency component $H_LV_L$ is further divided by the divider 404c into two frequency data segments. Hence, an $H_LV_L$ segment output is 250 lines in the vertical resolution and ¼ of the original horizontal resolution. This output of the divider 404c which is termed as an LL signal is then compressed by the compressor 405a to a $D_{1\text{-}1}$ signal.

The other three higher frequency segments of $H_LV_L$ are mixed by a mixer 772c to an LH signal which is then compressed by the compressor 405b to a $D_{1\text{-}2}$ signal. The compressor 405b may be replaced by three compressors provided between the divider 404c and the mixer 772c.

$H_LV_H$, $H_HV_L$, and $H_HV_H$ [form] *from* the divider 404a are mixed by a mixer 772a to an $H_HV_H$-H signal. If the input signal is as high as 1000 lines in both horizontal and vertical resolution, $H_HV_H$-H has 500 to 1000 lines of a horizontal and a vertical resolution. $H_HV_H$-H is fed to the divider 404b where it is divided again into four components.

Similarly, $H_LV_L$ from the divider 404b has 500 to 750 lines of a horizontal and a vertical resolution and transferred as an $H_L$ signal to the compressor 405c. The other three components, $H_LV_H$, $H_HV_L$, and $H_HV_H$, from the divider 404b have 750 to 1000 lines of a horizontal and a vertical resolution and are mixed by a mixer 772b to an HH signal which is then compressed by the compressor 405d and delivered as a [$D_{202}$] $D_{2\text{-}2}$ signal. After compression, the HL signal is delivered as a $D_{2\text{-}1}$ signal. As the result, LL or $D_{1\text{-}1}$ carries a frequency data of 0 to 250 lines, LH or $D_{1\text{-}2}$ carries a frequency data from more than 250 lines up to 500 lines, HL or $D_{2\text{-}1}$ carries a frequency data of more than 500 lines up to 750 lines, and HH or $D_{2\text{-}2}$ carries a frequency data of more than 750 lines to 1000 lines so that the divider circuit 3 can provide a four-level signal. Accordingly, when the divider circuit 3 of the transmitter 1 shown in FIG. 87 is replaced by the divider circuit of FIG. 93, the transmission of a four-level signal will be implemented.

The combination of multi-level data and multi-level transmission allows a video signal to be at steps declined in the picture quality in proportion to the C/N rate during transmission, thus contributing to the enlargement of the TV broadcast service area. At the receiving side, the action of demodulation and reconstruction is identical to that of the second receiver of the second embodiment shown in FIG. 88 and will not be explained in greater detail. In particular, the mixer 37 is modified for video signal transmission rather than data communications and will now be explained in more detail.

As described in the second embodiment, a received signal after *being* demodulated and error corrected, is fed as a set of four components $D_{1\text{-}1}$, $D_{1\text{-}2}$, $D_{2\text{-}1}$, and $D_{2\text{-}2}$ to the mixer 37 of the second receiver 33 of FIG. 88.

Figure 94:
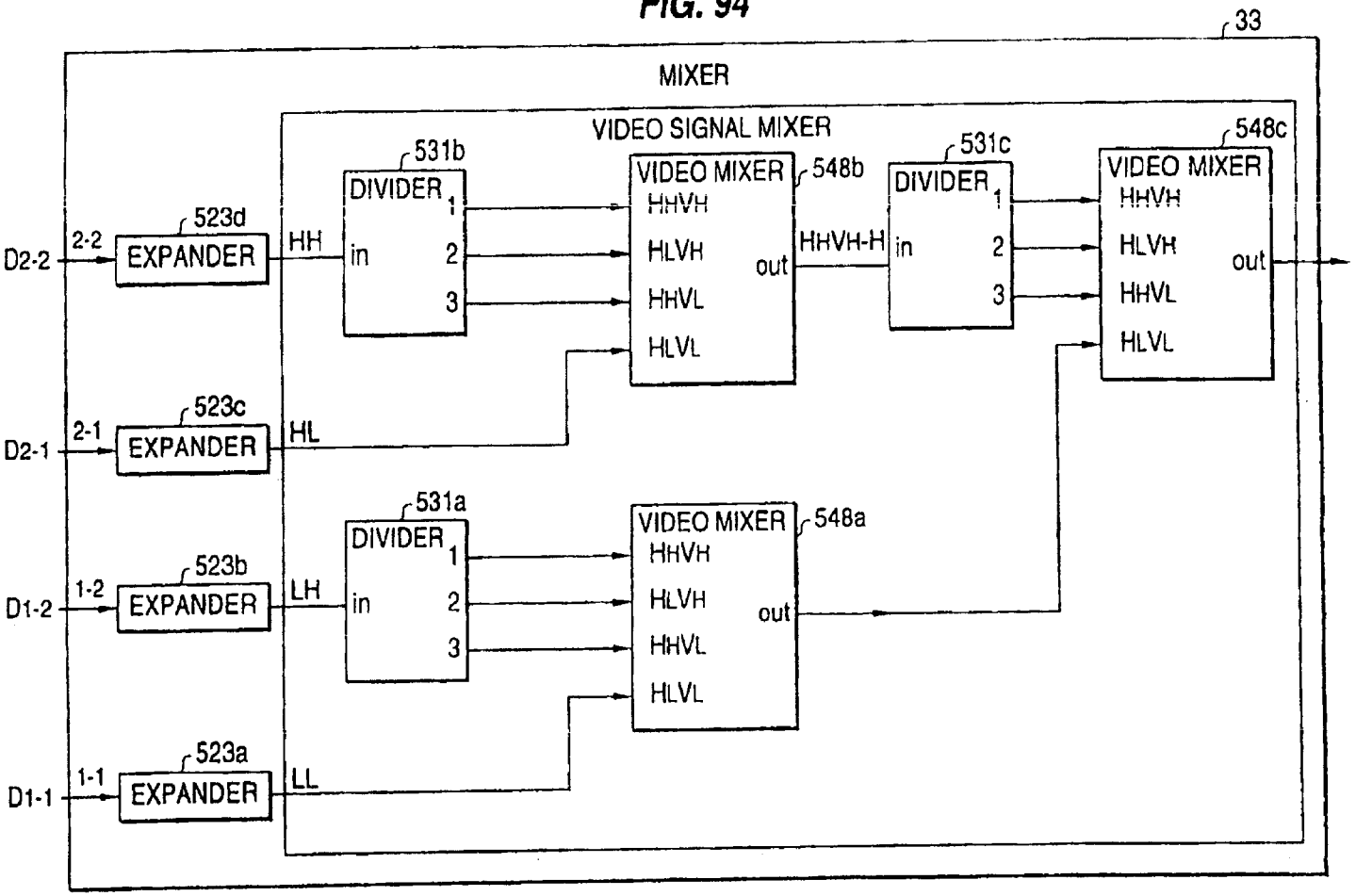
FIG. 94 is block diagram of a mixer of the sixth embodiment.

FIG. 94 is a block diagram of a modified mixer 33 in which $D_{1\text{-}1}$, $D_{1\text{-}2}$, $D_{2\text{-}1}$, and $D_{2\text{-}2}$ are explained by their respective expanders 523a, 523b, 523c, and 523d to an LL, [and] *an* LH, and HL, and an HH signal respectively which are equivalent to those described with FIG. 93. If the bandwidth of the input signal is 1, LL has a bandwidth of ¼, LL+LH has a bandwidth of ½, LL+LH+HL has a bandwidth of ¾, and LL+LH+HL+HH has a bandwidth of 1. The LH signal is then divided by a divider 531a and mixed by a video mixer 548a with the LL signal. An output of the video mixer 548a is transferred to an $H_LV_L$ terminal of a video mixer 548c. The video mixer 531a is identical to that of the second decoder 527 of FIG. 32 and will not be explained in greater detail. Also, the HH signal is divided by a divider 531b and fed to a video mixer 548b. At the video mixer 548b, the HH signal is mixed with the HL signal to an $H_HV_H$-H signal which is then divided by a divider 531c and sent to the video mixer 548c. At the video mixer 548c, $H_HV_H$-H is combined with the sum signal of LH and LL to a video output. The video output of the mixer 33 is then transferred to the output unit 36 of the second receiver shown in FIG. 88 where it is converted to a TV signal for delivery. If the original signal has 1050 lines of vertical resolution or is an HDTV signal of about 1000 -line resolution, its four different signal level components can be intercepted in their respective signal receiving areas shown in FIG. 91.

Figure 92:
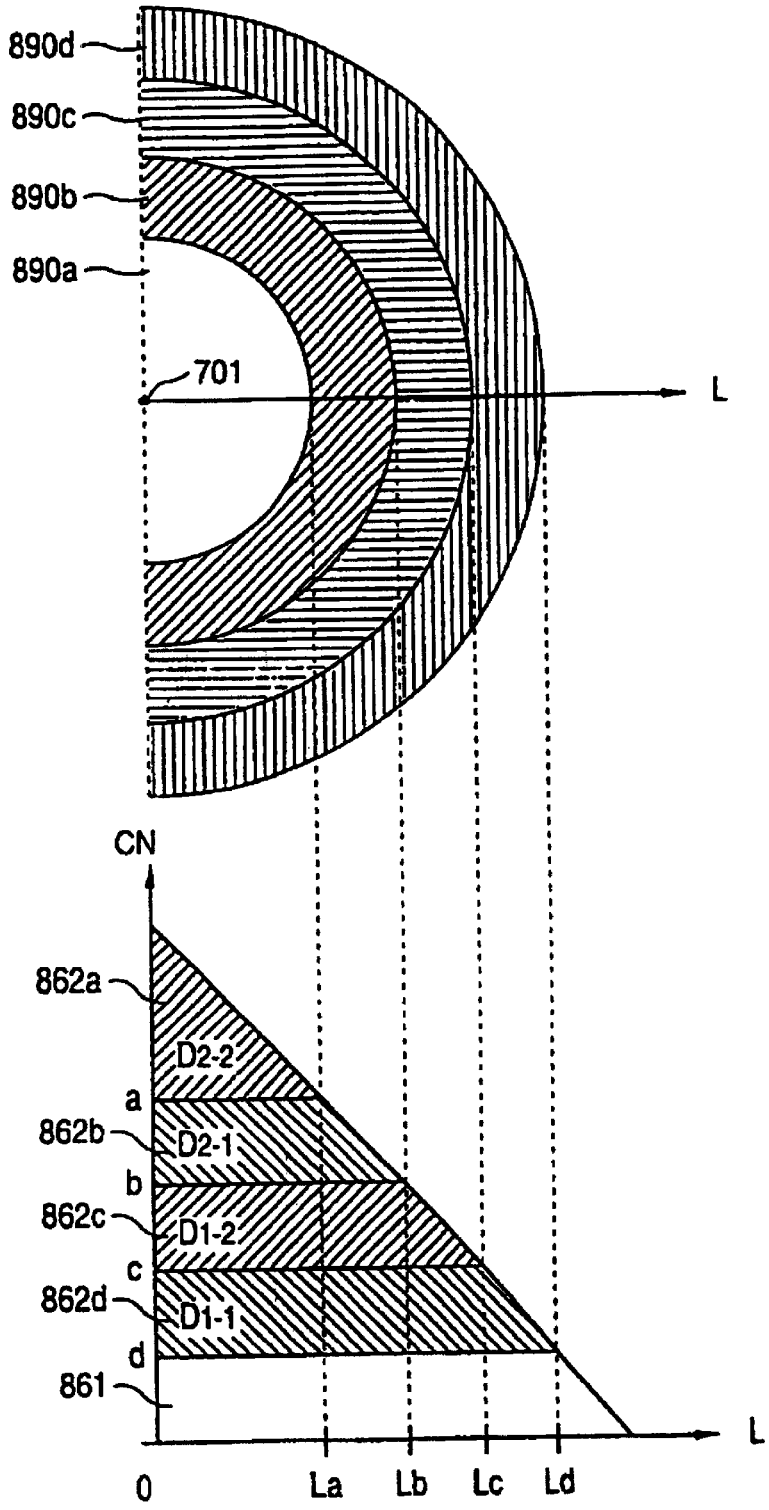
FIG. 92 is a diagram showing the four-level transmission of the sixth embodiment.

The picture quality of the four different components will be described in more detail. The illustration of FIG. 92 represents a combination of FIGS. 86 and 91. As apparent, when the C/N rate increases, the overall signal level of amount of data is increased from 862d to 862a by steps of four signal levels $D_{1\text{-}1}$, $D_{1\text{-}2}$, $D_{2\text{-}1}$, $D_{2\text{-}2}$.

Figure 95:
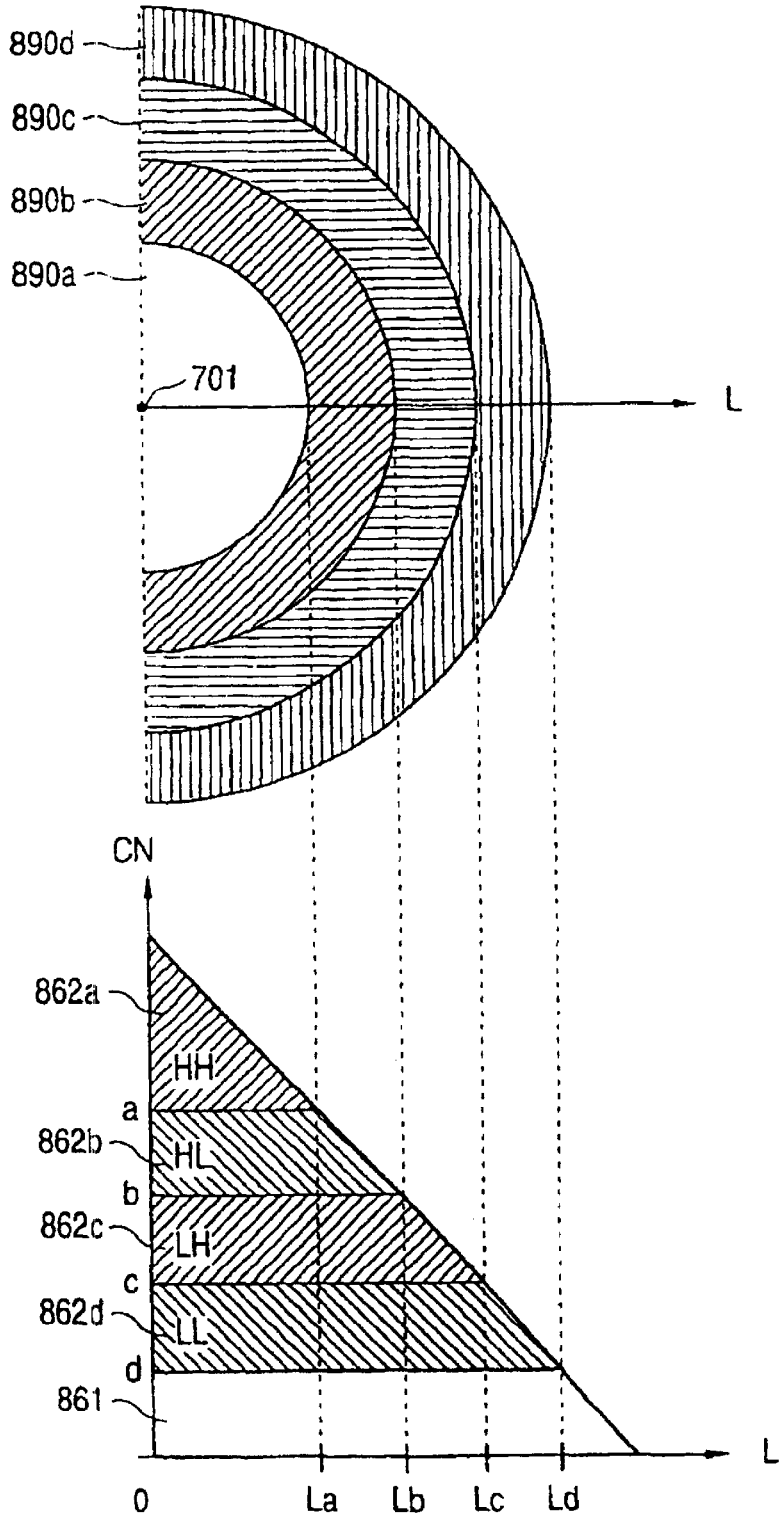
FIG. 95 is a diagram showing another four-level transmission of the sixth embodiment.
Figure 96:
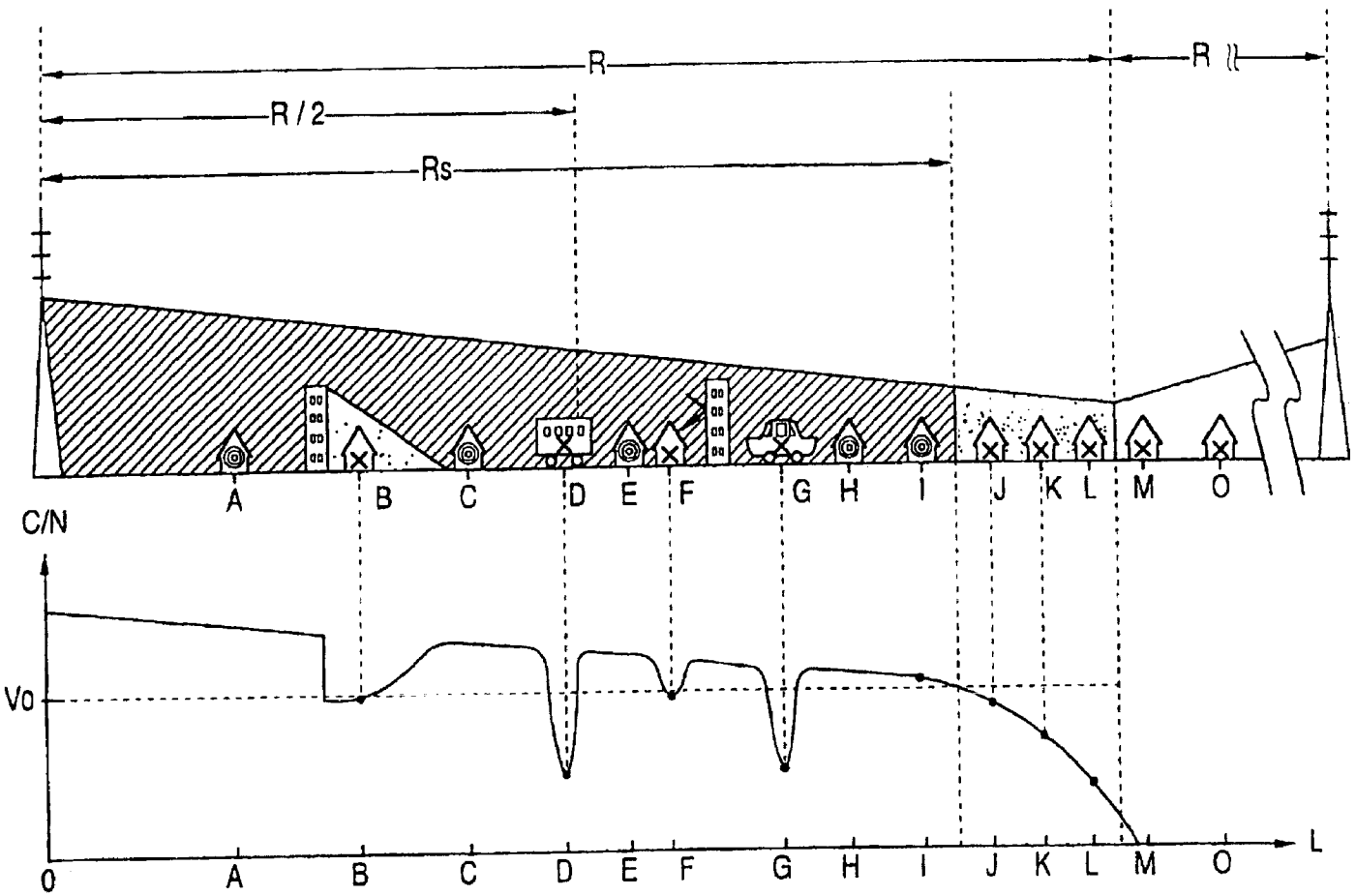
FIG. 96 is a view of signal propagation of a known digital TV broadcast system.
Figure 97:
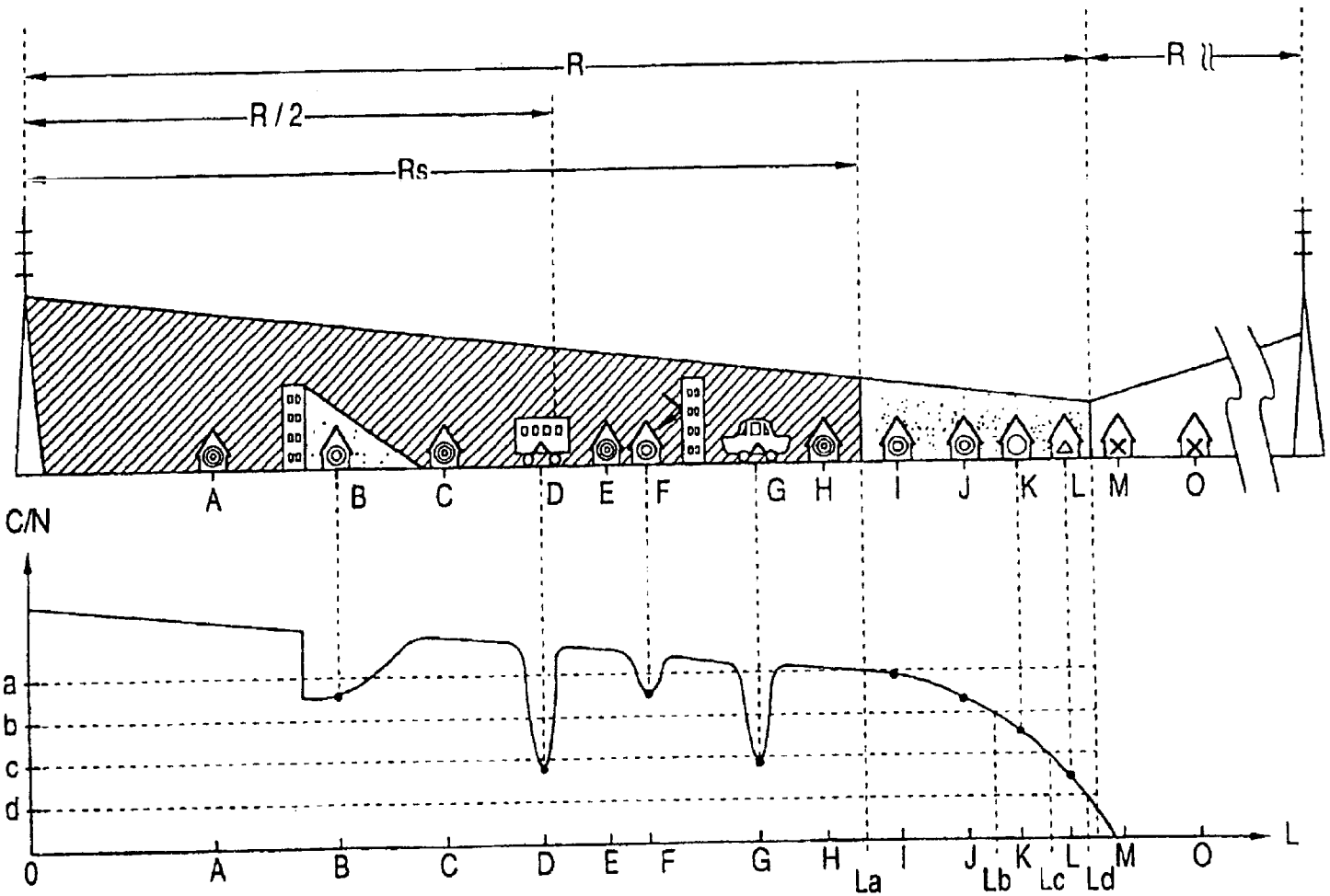
FIG. 97 is a view of signal propagation of a digital TV broadcast system according to the sixth embodiment.
Figure 98:
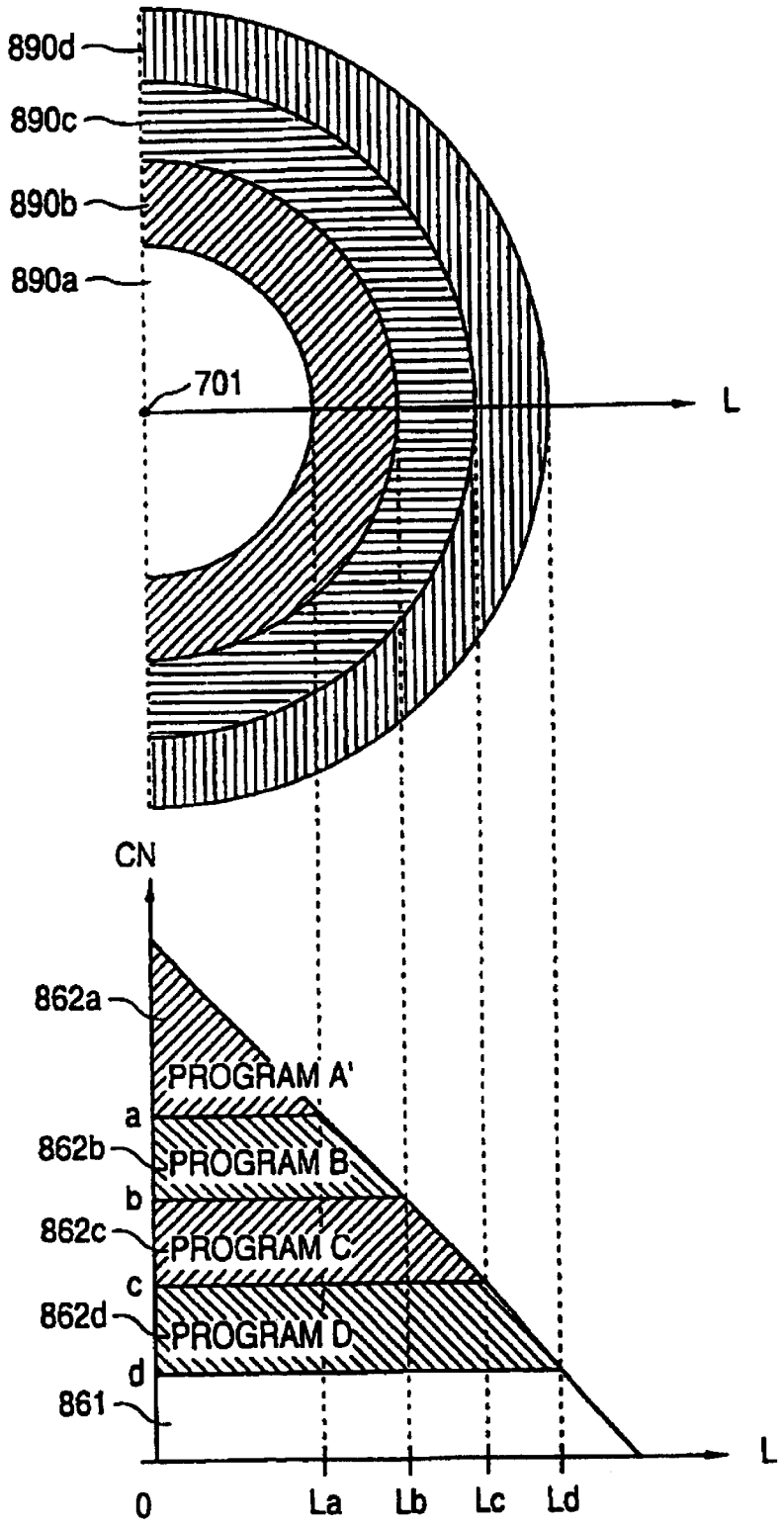
FIG. 98 is a diagram showing a four-level transmission of the sixth embodiment.

Also, as shown in FIG. 95, the four different level components LL, LH, HL, and HH are accumulated in proportion to the C/N rate. More specifically, the quality of a reproduced picture will be increased as the distance from a transmitter antenna becomes small. When L=Ld, LL component is reproduced. When L=Lc, LL+LH signal is reproduced. When L=Lb, LL+LH+HL signal is reproduced. When L=La, LL+LH+HL+HH signal is reproduced. As the result, if the bandwidth of the original signal is 1, the picture quality is enhanced at ¼ increments of bandwidth from ¼ to 1 depending on the receiving area. If the original signal is an HDTV of 1000-line vertical resolution, a reproduced TV signal is 250, [50 0] *500*, 750, and 1000 lines in the resolution at their respective receiving areas. The picture quality will thus be varied at steps depending on the level of a signal. FIG. 96 shows the signal propagation of a conventional digital HDTV signal transmission system, in which no signal reproduction will be possible when the C/N rate is less than V0. Also, signal interception will hardly be guaranteed at signal interference regions, shadow regions, and other signal attenuating regions, denoted by the symbol x, of the service area. FIG. 97 shows the signal propagation of an HDTV signal transmission system of the present invention. As shown, the picture quality will be a full 1000-line grade at the distance La where C/N=a, a 750-line grade at the distance Lb where C/N=b, a 500-line grade at the distance Lc where C/N=c, and a 250-line grade are the distance Ld where C/N=d. Within the distance La, there are shown unfavorable regions where the C/N rate drops sharply and no HDTV quality picture will be reproduced. As understood, a lower picture quality signal can however be intercepted and reproduced according to the multi-level signal transmission system of the present invention. For example, the picture quality will be a 750-line grade at the point B in a building shadow area, a 250-line grade at the point D in a running train, a 750-line grade at the point F in a ghost developing area, a 250-line grade at the point G in a running car, a 250-line grade at the point L in a neighbor signal interference area. As set forth above, the signal transmission system of the present invention allows a TV signal to be successfully received at a grade in the area where the conventional system is poorly qualified, thus increasing its service area. FIG. 98 [shown] *shows* an example of simultaneous broadcasting of four different TV programs, in which three quality programs C, B, A are transmitted on their respective channels $D_{1-2}$, $D_{2-1}$, $D_{2-2}$ while a program D identical to that of a local analogue TV station is propagated on the $D_{1-1}$ channel. Accordingly, while the program D is kept available at simulcast service, the other three programs can also be distributed on air for offering a multiple program broadcast service.

EMBODIMENT 8

Hereinafter, an eighth embodiment of the present invention will be explained referring to the drawings. The eighth embodiment employs a multi-level signal transmission system of the present invention for a transmitter/receiver in a cellular telephone system.

Figure 115:
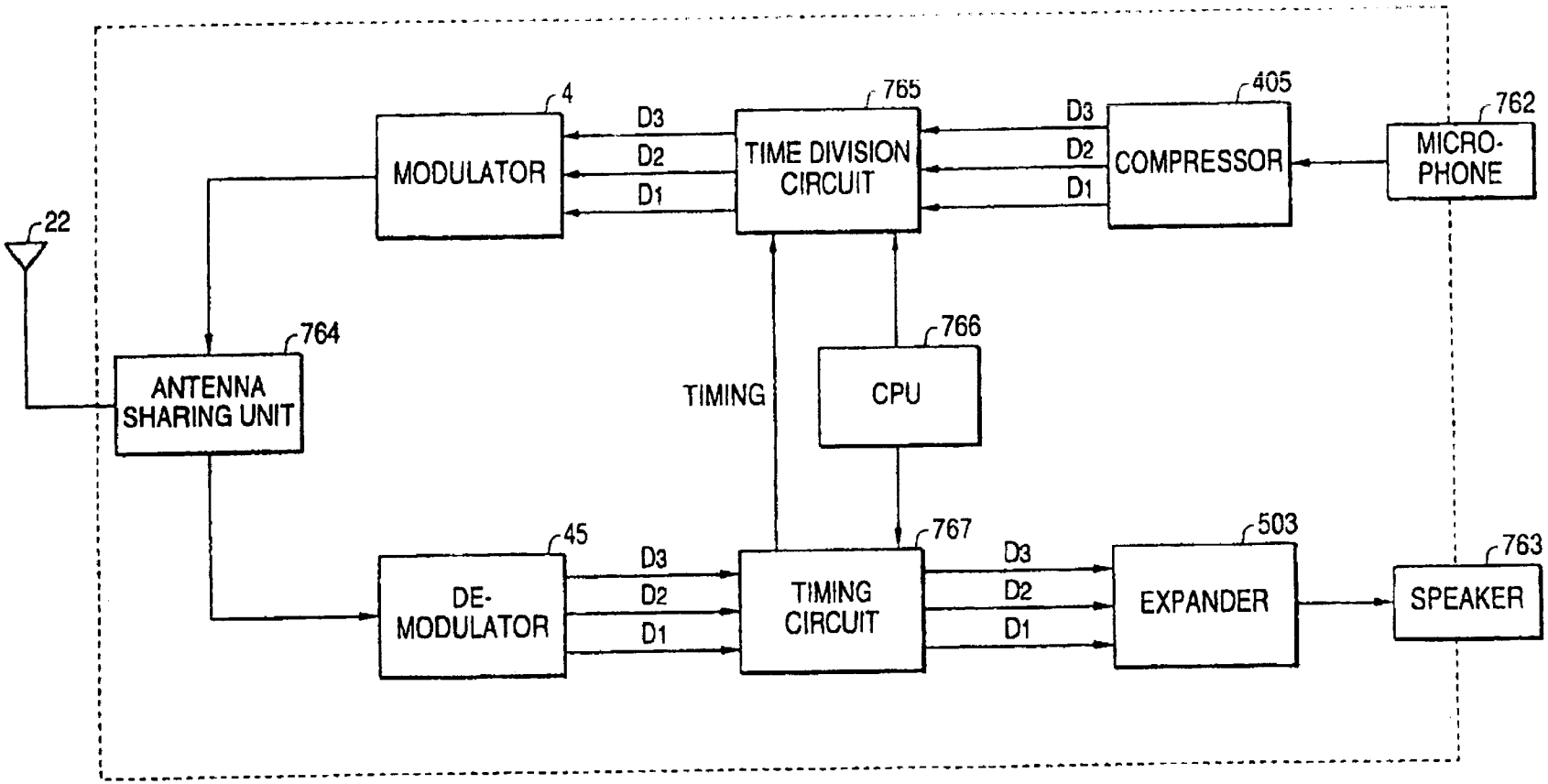

FIG. 115 is a block diagram showing a transmitter/receiver of a portable telephone, in which a telephone conversation sound inputted across a microphone [76 2] *762* is compressed and coded in a compressor 405 into multi-level, $D_1$, $D_2$, and $D_3$, data previously described. These $D_1$, $D_2$, and $D_3$ data are time divided in a time division circuit 765 into predetermined time slots and, then, modulated in a modulator 4 into a multi-level, e.g. SRQAM, signal previously described. Thereafter, an antenna sharing unit 764 and an antenna 22 transmit a carrier wave carrying a modulated signal, which will be intercepted by a base station later described and further transmitted to other base stations or a central telephone exchanger so as to communicate with other telephones.

On the contrary, the antenna 22 receives transmission radio waves from other base stations as communication signals from other telephones. A received signal is demodulated in a multiple-level, e.g. SRQAM, type demodulator 45 into $D_1$, $D_2$, and $D_3$ data. A timing circuit 767 detects timing signals on the basis of demodulated signals. These timing signals are fed into the time division circuit 765. Demodulated signals $D_1$, $D_2$, and $D_3$ are fed into an expander 503 and expanded into a sound signal, which are transmitted to a speaker 763 and converted into sound.

Figure 116:
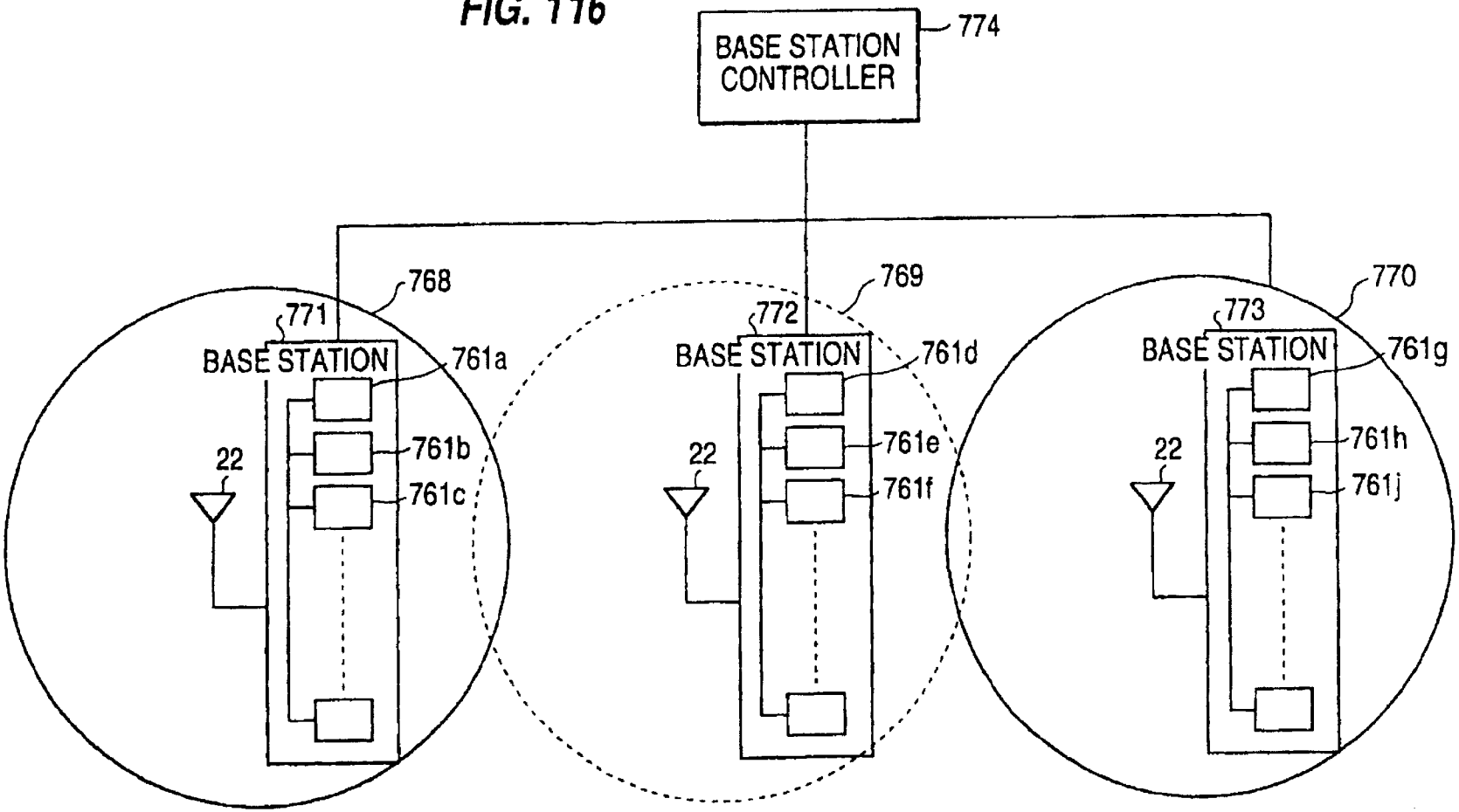

FIG. 116 shows a block diagram exemplarily showing an arrangement of base stations, in which three base stations [7 71] *771*, 772, and 773 locate at center of respective receiving cells 768, 769, and 770 of hexagon or circle. These base stations 771, 772, and 773 respectively [has] *have* a plurality of transmitter/receiver units 761a~761j each similar to that of FIG. 115 so as to have data communication channels equivalent to the number of these transmitter/receiver units. A base station controller 774 is connected to all the base stations and always monitors a communication traffic amount of each base station. Based on the monitoring result, the base station controller 774 carries out an overall system control including allocation of channel frequencies to respective base stations or control of receiving cells of respective base stations.

Figure 117:
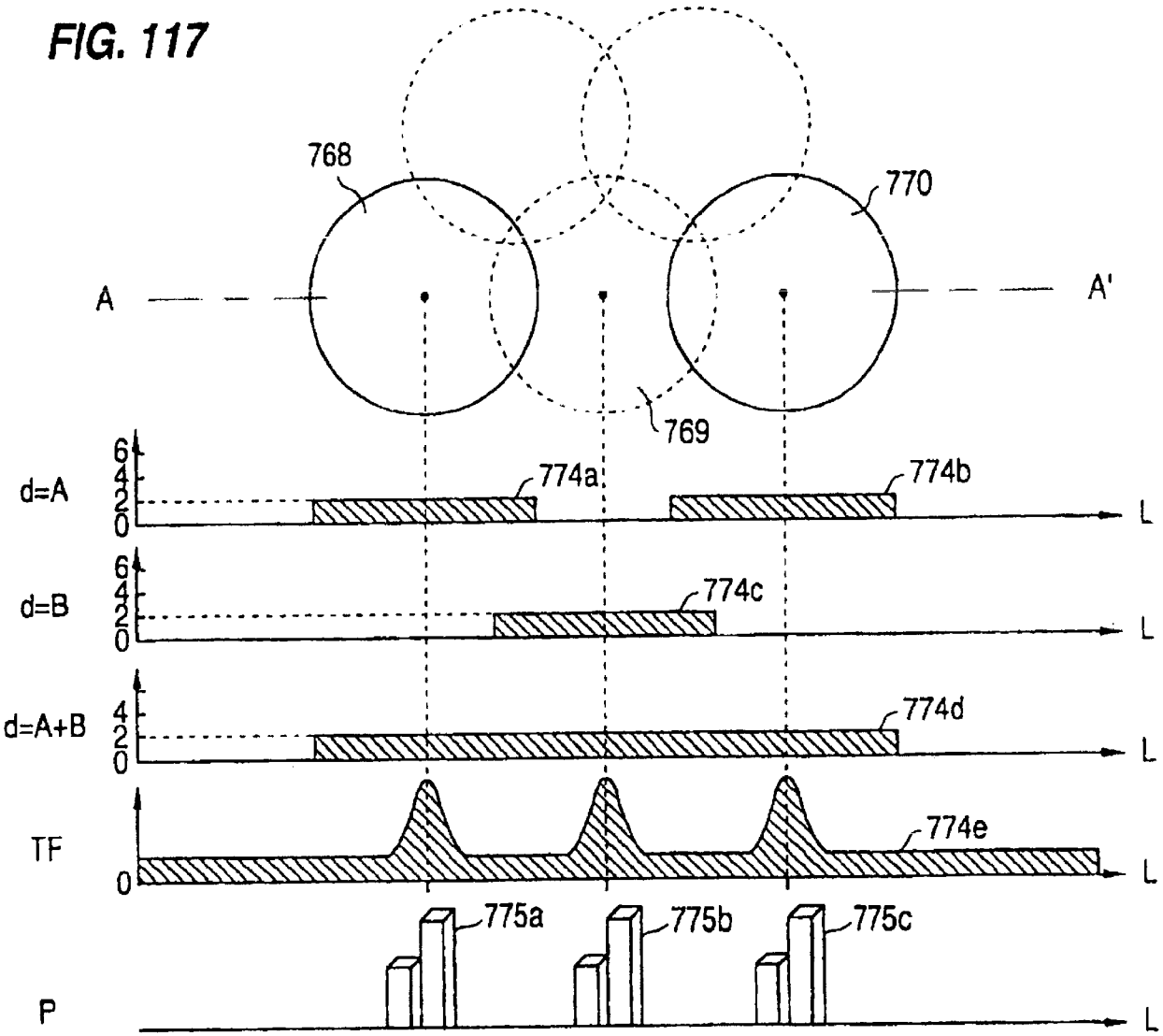

FIG. 117 is a view showing a traffic distribution of communication amount in a conventional, e.g. QPSK, system. A digram d=A shows data 774a and 774b having frequency utilization efficiency 2 bit/Hz, and a diagram d=B shows data 774c of frequency utilization efficiency 2 bit/Hz. A summation of these data 774a, 774b, and 774c becomes [a] data 774d, which represents a transmission amount of Ach consisting of receiving cells 768 and 770. Frequency utilization efficiency of 2 bit/Hz is uniformly distributed. However, density of population in an actual urban area is locally high in several crowded areas 775a, 775b, and 775c which includes buildings concentrated. [A data] *Data* 774e representing a communication traffic amount shows several peaks at locations just corresponding to these crowded areas 775a, 775b, and 775c, in contrast with other areas having a small communication amount. A capacity of conventional cellular telephone was uniformly set to 2 bit/Hz frequency efficiency at entire region as shown by the data 774d irrespective of actual traffic amount TF shown by the data 774e. It is not [not] effective to give the same frequency efficiency regardless of actual traffics amount. In order to compensate for this ineffectiveness, the conventional systems have allocated many frequencies to the regions having a large traffic amount, increased channel number, or decreased the receiving cells thereof. However, an increase of channel number is restricted by the frequency spectrum. Furthermore, conventional multi-level; e.g. 16 QAM or 64 QAM, mode transmission systems increase transmission power. A reduction in the receiving cells will induce an increase in number of base stations, thus increasing installation cost.

It is ideal for the improvement of an overall system efficiency to increase the frequency efficiency of the region having a larger traffic amount and decrease the frequency efficiency of the region having a smaller traffic amount. A multi-level signal transmission system in accordance with the present invention realizes this ideal modification. This will be explained with reference to FIG. 118 showing a communication amount [&] *and* traffic distribution in accordance with the eighth embodiment of the present invention.

Figure 118:
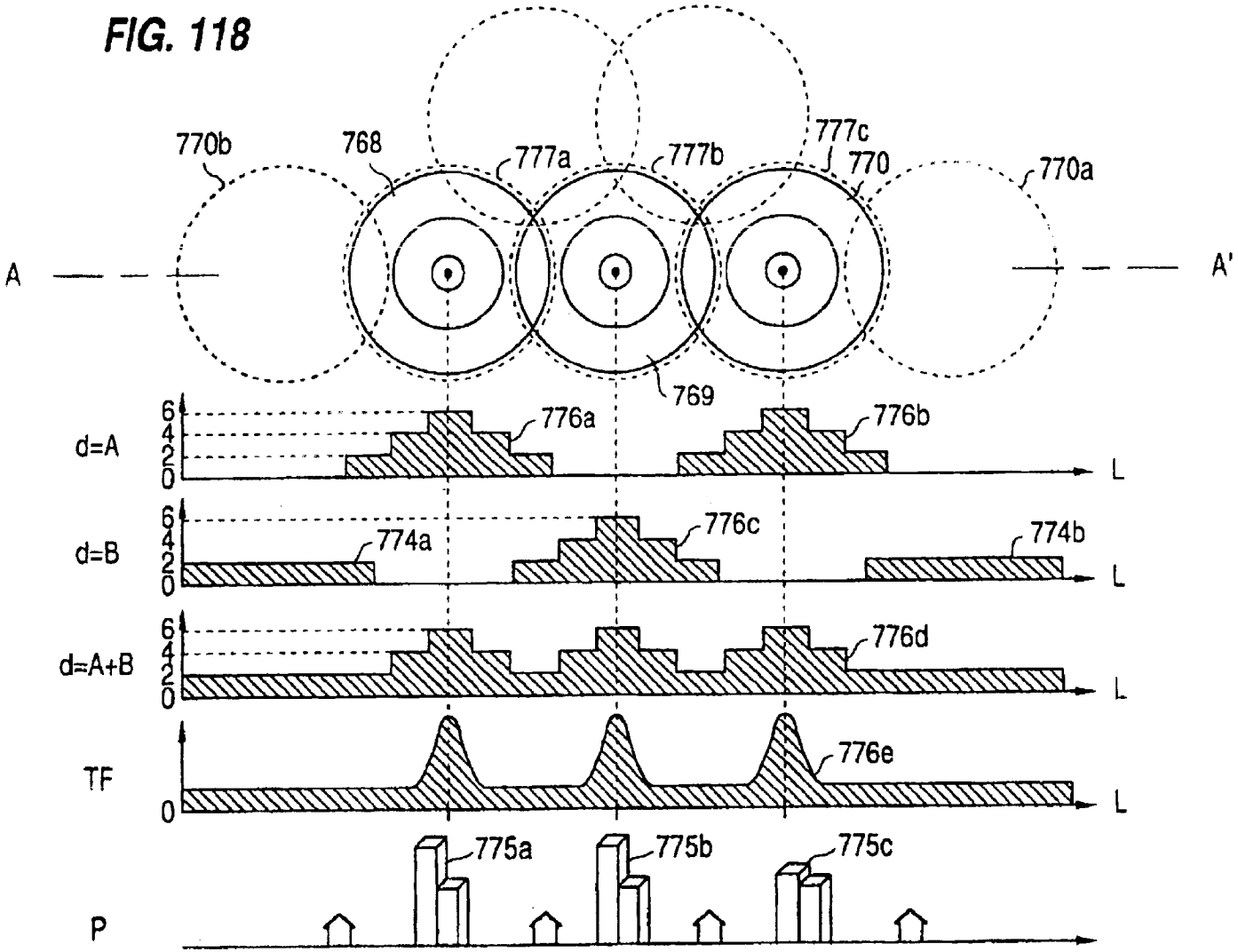

More specifically, FIG. 118 shows communication amounts of respective receiving cells 770b, 768, 769, 770, and 770a taken along a line A—A'. The receiving cells 768 and 770 utilize frequencies of a channel group A, while the receiving cells 770b, 769, and 770a utilize frequencies of a channel group B which does not overlap with the [cannel] *channel* group A. The base station controller 774 shown in FIG. 116 increases or decreases the channel number of these channels in accordance with the traffic amount of respective receiving cells. In FIG. 118, a diagram d=A represents a distribution of a communication amount of the A channel. A diagram d=B represents a distribution of a communication amount of the B channel. A diagram d=A+B represents a distribution of a communication amount of all the channels. A diagram TF represents a communication traffic amount, and a diagram P shows a distribution of buildings and population.

The receiving cells 768, 769, and 770 employ the multi-level, e.g. SRQAM, signal transmission system. Therefore, it is possible to obtain a frequency utilization efficiency of 6 bit/Hz, three times as large as 2 bit/Hz of QPSK, in the vicinity of the base stations as denoted by data 776a, 776b, and 776c. Meanwhile, the frequency utilization efficiency decreases at steps from 6 bit/Hz to 4 bit/Hz, and 4 bit/Hz to 2 bit/Hz, as it goes to suburban area. [if] *If* the transmission power is insufficient, 2 bit/Hz areas become narrower than the receiving cells, denoted by dotted lines 777a, 777b, and 777c, of QPSK. However, an equivalent receiving cell will be easily obtained by slightly increasing the transmission power of the base stations.

Transmitting/receiving operation of a mobile station capable of responding to a 64 SRQAM signal is carried out by use of modified QPSK, which is obtained by [set] *setting* a shift amount of SRQAM to S=1, at the place far from the base station, by use of 16 SRQAM at a place not so far from the same, and 64 SRQAM at the near place. Accordingly, the maximum transmission power does not increase as compared with QPSK.

Figure 121:
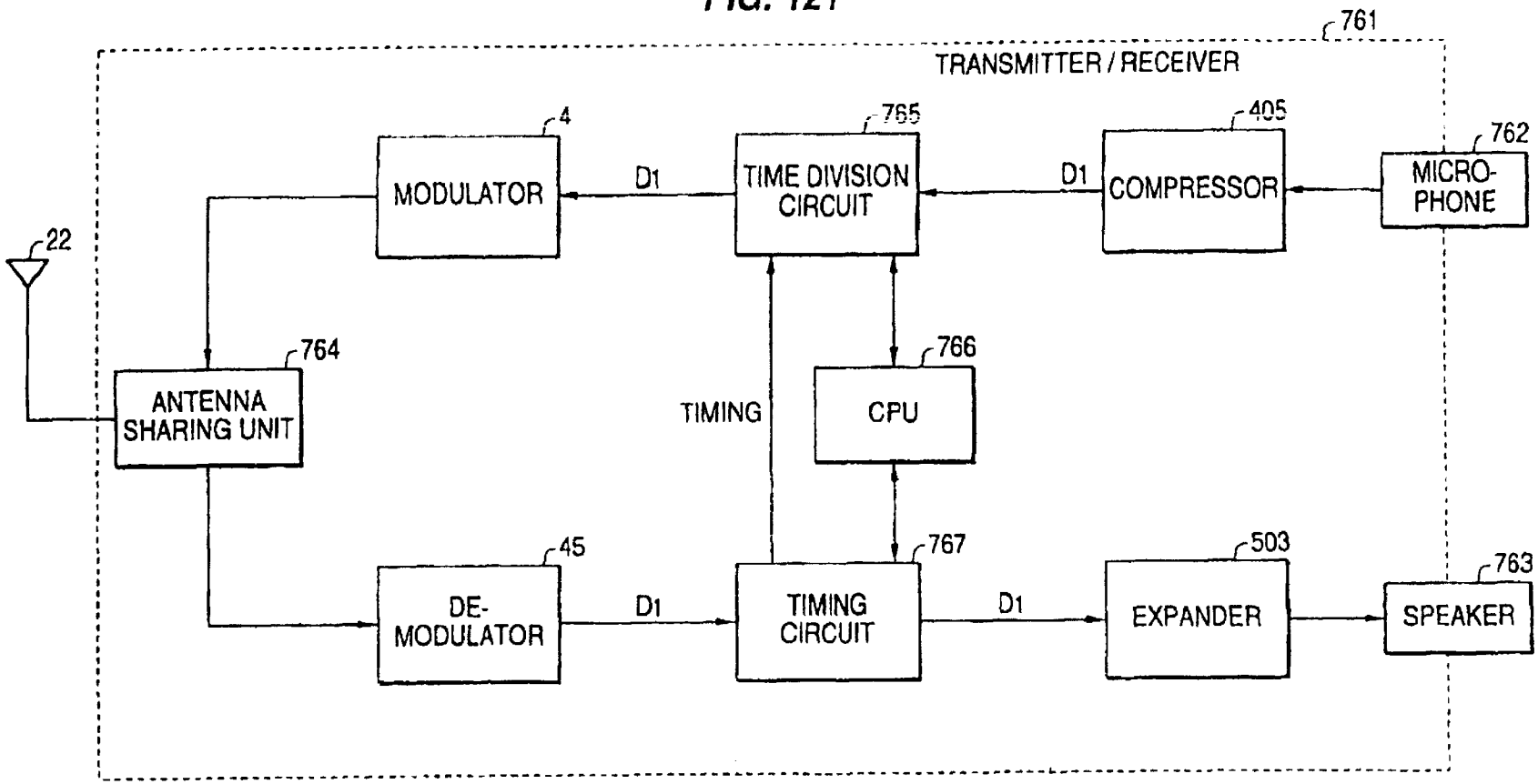
Figure 122:
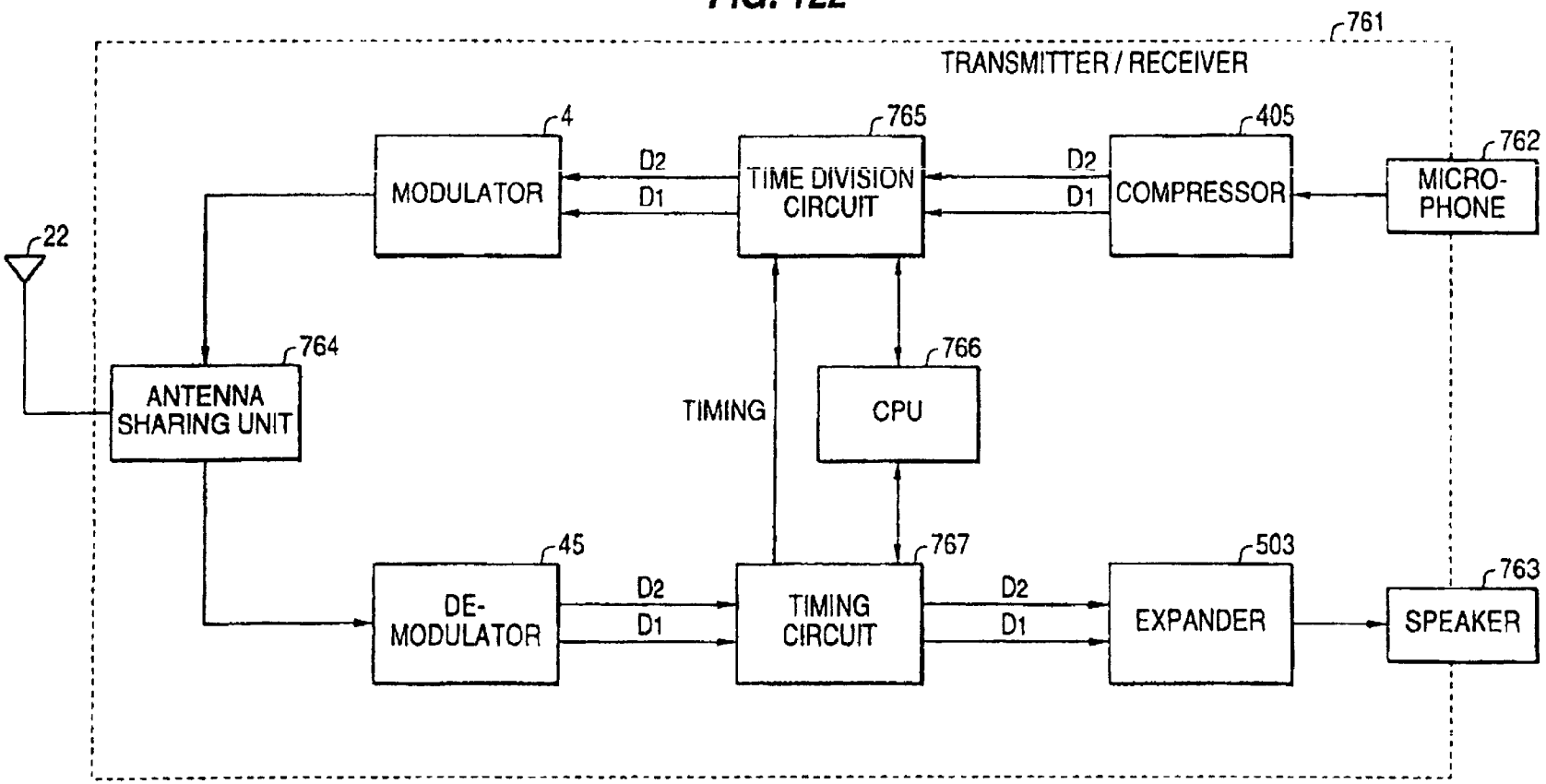

Furthermore, 4 SRQAM type transmitter/receiver, whose circuit configuration is simplified as shown in a block diagram of FIG. 121, will be able to communicate with other telephones while maintaining compatibility. That will be the same in 16 SRQAM type transmitter/receiver shown in a block diagram of FIG. 122. As a result, three different type telephones having different modulation systems will be provided. Small in size and light in weight is important for portable telephones. In this regard, the 4 SRQAM system having a simple circuit configuration will be suitable for the users who want a small and light telephone although its frequency utilization efficiency is low and therefore the cost of a call may increase. In this manner, the present invention system can suit a wide variety of usage.

As is explained above, the transmission system having a distribution liked=A+B of FIG. 118, whose capacity is locally altered, is accomplished. Therefore, an overall frequency utilization efficiency will be much effectively improved if layout of base stations is determined to fit for the actual traffic amount denoted by TF. Especially, effect of the present invention will be large in a micro cell system, whose receiving cells are smaller and therefore numerous sub base stations are required. Because a large number of sub base stations can be easily installed at the place having a large traffic amount.

Figure 119A:
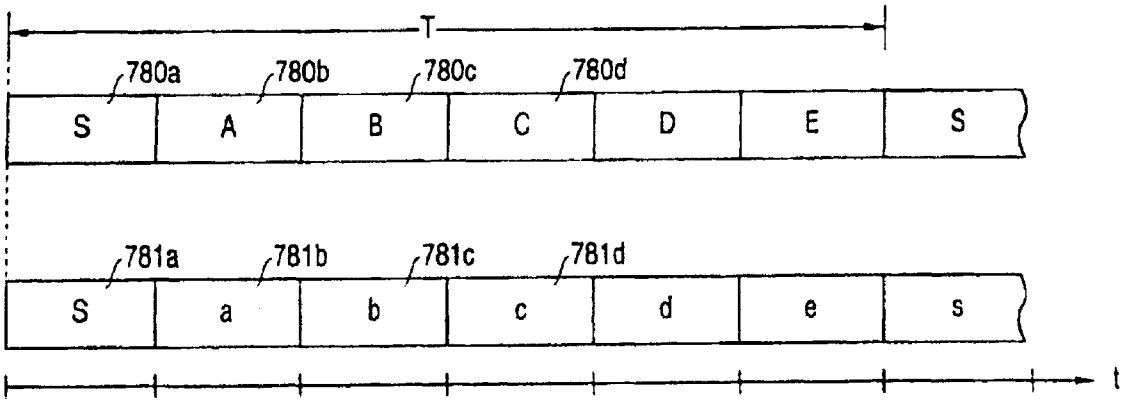
Figure 119B:
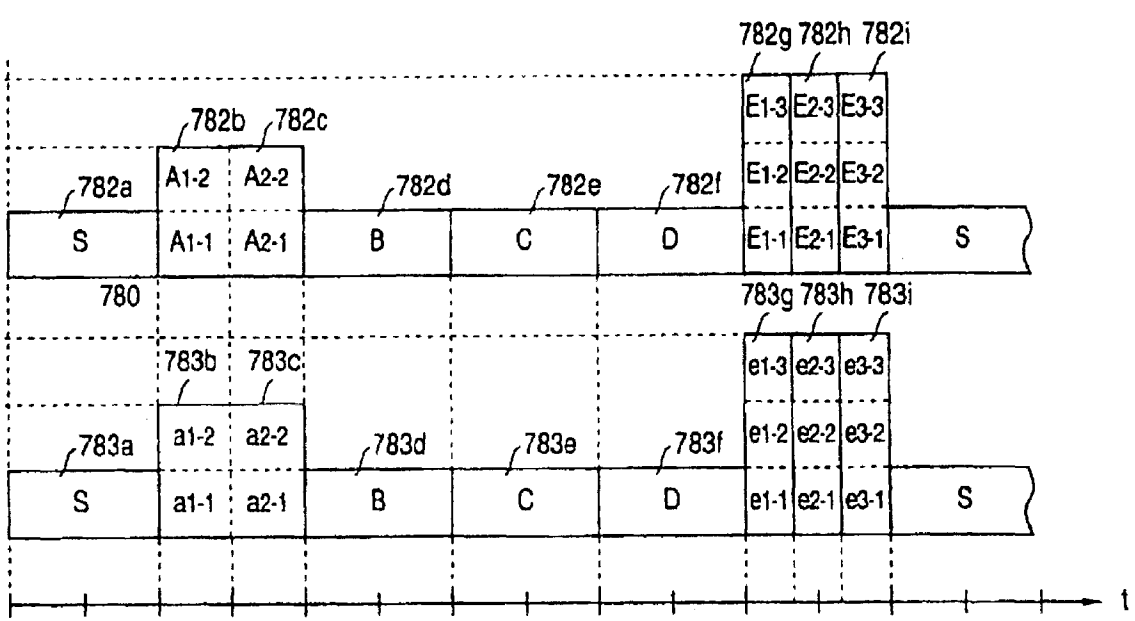

Next, data assignment of each time slot will be explained referring to FIG. 119, wherein FIG. 199(a) shows a conventional time slot and FIG. 119(b) shows a time slot according to the eighth embodiment. The conventional system performs a down, i.e. from a base station to a terminal station, transmission as shown in FIG. 119(a), in which a sync signal S is transmitted by a time slot 780a and transmission signals to respective terminal stations of A, B, C channels by time slots 780b, 780c, and 780d respectively at a frequency A. On the other hand, an up, i.e. from the mobile station to the base station, transmission is performed in such a manner that a sync signal S, and transmission signals of a, b, and c channels are transmitted by time slots 781a, 781b, 781c, and 781d at a frequency B.

The present invention, which is characterized by a multi-level, e.g. 64 SRQAM, signal transmission system, allows to have three-level data consisting of $D_1$, $D_2$, and $D_3$ of 2 bit/Hz as shown in FIG. 119(b). As both the $A_1$ and $A_2$ data are transmitted by 16 SRQAM, their time slots have two times the data rate as shown by slots 782b and 782c and 783b and 783c. It means the same quality sound can be transmitted half the time. Accordingly, a time width of respective time slots [782] *782b* and 782c becomes halved. In this manner, two times the transmission capacity can be acquired at the two-level region 776c shown in FIG. 118, i.e. at the vicinity of the base station.

In the same way, time slots 782g and 783g carry out the transmission/reception of E1 data by use of a 64 SRQAM signal. As the transmission capacity is three times, one time slot can be used for three channels of $E_1$, $E_2$, and $E_3$. This would be used for an area further close to the base station. Thus, up to three times the communication capacity can be obtained at the same frequency band. An actual transmission efficiency, however, would be reduced to 90%. It is desirable for enhancing the effect of the present invention to coincide the transmission amount distribution according to the present invention with the regional distribution of the actual traffic amount as perfect as possible.

In fact, an actual urban area consists of a crowded building district and a greenbelt zone surrounding this building area. Even an actual suburb area consists of a residential district and fields or a forest surrounding this residential district. These urban and suburb areas resemble the distribution of the TF diagram. Thus, the application of the present invention will be effective.

Figure 120A:
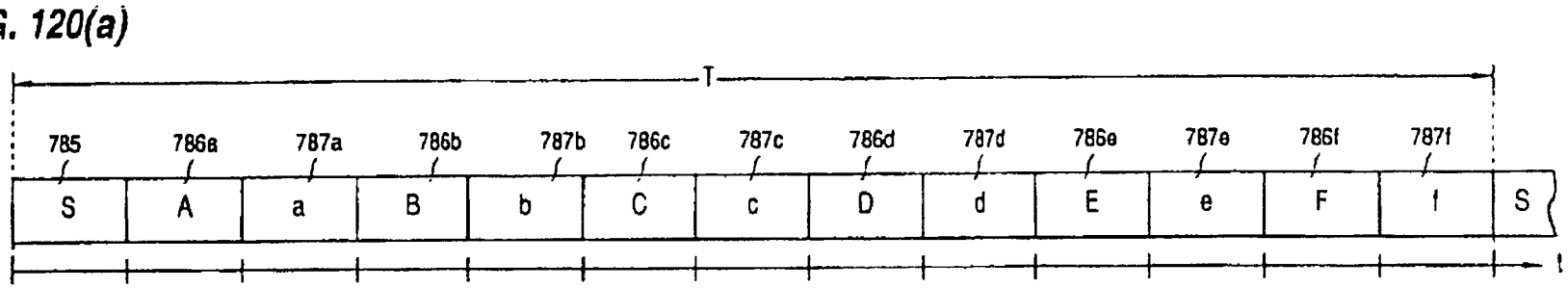
Figure 120B:
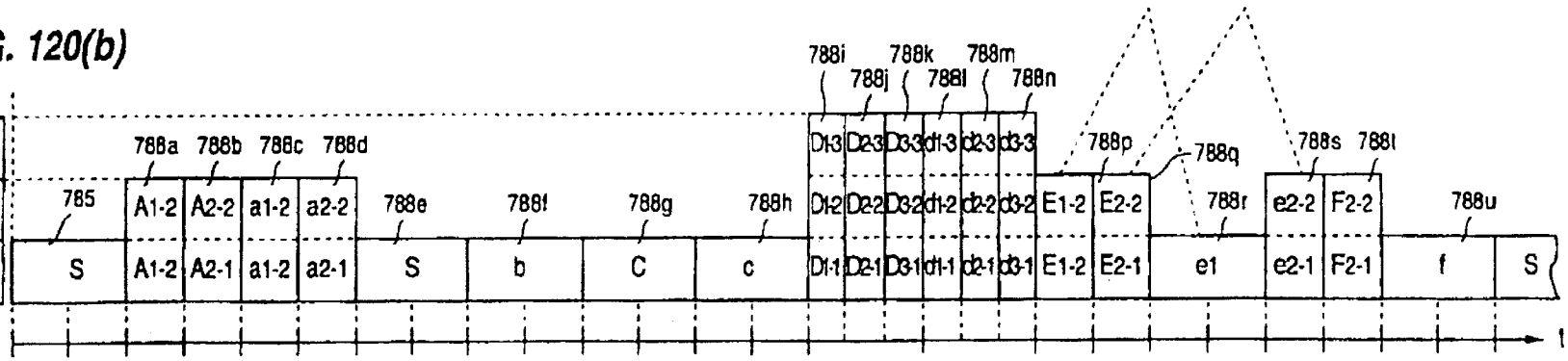

FIG. 120 is a diagram showing time slots by the TDMA method, wherein FIG. 120(a) shows a conventional method and FIG. 120(b) shows the present invention. The conventional method uses time slots 786a and 786b for transmission to portable phones of A and B channels at the same frequency and time slots 787a and 787b for transmission from the same, as shown in FIG. 120(a).

On the contrary, 16 SRQAM mode of the present invention uses a time slot 788a for reception of $A_1$ channel and a time slot 788c for transmission to A1 channels as shown in FIG. [1 20 (b)] *120(b)*. A width of the time slot becomes approximately ½. In case of 64 SRQAM mode, a time slot 788i is used for reception of $D_1$ channel and a time slot 788l is used for transmission to $D_1$ channel. A width of the time slot becomes approximately ⅓.

In order to save electric power, a transmission of $E_1$ channel is executed by use of a normal 4 SRQAM time slot 788 r while reception of E1 channel is executed by use of a 16 SRQAM time slot 788p being a ½ time slot. Transmission power is surely suppressed, although communication cost may increase due to a long occupation time. This will be effective for a small and light portable telephone equipped with a small battery or when the battery is almost worn out. As is described in the foregoing description, the present invention makes it possible to determine the distribution of transmission capacity so as to coincide with an actual traffic distribution, thereby increasing substantial transmission capacity. Furthermore, the present invention allows base stations or terminal stations to freely select one among two or three transmission capacities. If the frequency utilization efficiency is lowered, power consumption will be decreased. If the frequency utilization efficiency is selected higher, communication cost will be saved. Moreover, adoption of a 4 SRQAM having smaller capacity will simplify the circuitry and reduce the size and cost of the telephone. As explained in the previous embodiments, one characteristics of the present invention is that compatibility is maintained among all of associated stations. In this manner, the present invention not only increases transmission capacity but allows to provide customers a wide variety of series from a super mini telephone to a high performance telephone.

EMBODIMENT 9

Figure 123:
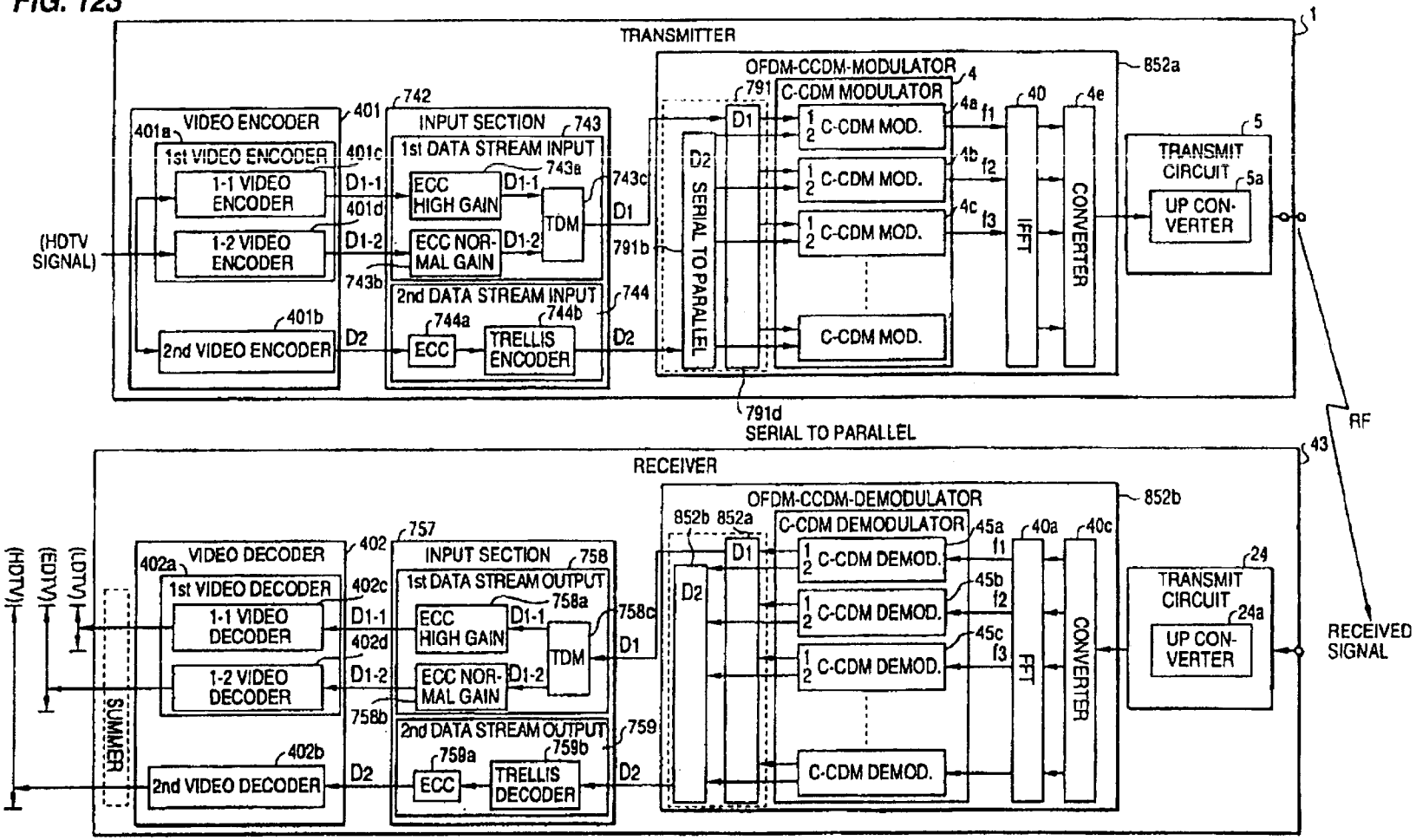

Hereinafter, a ninth embodiment of the present invention will be described referring to the drawings. The ninth embodiment employs this invention in an OFDM transmission system. FIG. 123 is a block diagram of [a] *an* OFDM transmitter/receiver, and FIG. 124 is a diagram showing a principle of an OFDM action. An OFDM is one of FDM and has a better efficiency in frequency utilization as compared with a general FDM, because an OFDM sets adjacent two carriers to be quadrate with each other. Furthermore, OFDM can bear multipath obstructions such as ghosts and, therefore, may be applied in the future to the digital music broadcasting or digital TV broadcasting.

As shown in the principle diagram of FIG. 124, OFDM converts an input signal by a serial to parallel converter 791 into a data being disposed on a frequency axis 793 at intervals of 1/ts, so as to produce subchannels [794a⁻94e] *794a–794e*. This signal is inversely FFT converted by a modulator 4 having an inverse FFT 40 into a signal on a time axis [79⁻9] *799* to produce a transmission signal 795. This inverse FFT signal is transmitted during an effective symbol period 796 of the time period ts. A guard interval 797 having an amount tg is provided between symbol periods.

A transmitting/receiving action of HDTV signal in accordance with this ninth embodiment will be explained referring to the block diagram of FIG. 123, which shows a hybrid OFDM-CCDM system. An inputted HDTV signal is separated by a video encoder 401 into [three-level] *three-levels*, a low frequency band $D_{1-1}$, a medium-low frequency band $D_{1-2}$, and a high-medium-low frequency band $D_2$, video signals, and fed into an input section.

In a first data stream input 743, $D_{1-1}$ signal is ECC encoded with high code gain and $D_{1-2}$ signal is ECC coded with a normal code gain. A TDM 743 performs time division multiplexing of $D_{1-1}$ and $D_{1-2}$ signals to produce a $D_1$ signal, which is then fed to a $D_1$ serial to parallel converter 791d in a modulator 852a. $D_1$ signal consists of n pieces of parallel data, which are inputted into first inputs of n pieces of C-CDM modulator 4a, 4b,—respectively.

On the other hand, the high frequency band signal $D_2$ is fed into a second data stream input 744 of the input section 742, in which $D_2$ signal is ECC (Error Correction Code) encoded in an ECC 744a and then Trellis encoded in a Trellis encoder 744b. Thereafter, the $D_2$ signal is supplied to a $D_2$ serial to parallel converter 791b of the modulator 852a and converted into n pieces of parallel data, which are inputted into second inputs of the n pieces of C-CDM modulator 4a, 4b,—respectively.

The C-CDM modulators 4a, 4b, 4c—respectively [produces] *produce* 16 SRQAM signal on the basis of $D_1$ data of the first data stream input and $D_2$ data of the second data stream input. These n pieces of C-CDM modulator respectively [has] *have* a carrier different from each other. As shown in FIG. 124, carriers [79 4a] *794a*, 794b, 794c,—are arrayed on the frequency axis 793 so that adjacent two carriers are 90°-out-of-phase with each other. Thus C-CDM modulated n pieces of modulated signal are fed into the inverse FFT circuit 40 and mapped from the frequency axis dimension 793 to the time axis dimension [790] *799*. Thus, time signals 796a, 796b—, having an effective symbol length ts, are produced. There is provided a guard interval zone 797a of Tg seconds between the effective symbol time zones 796a and 796b, in order to reduce multipath obstruction. FIG. 129 is a graph showing a relationship between time axis and signal level. The guard time Tg of the guard interval band 797a is determined by taking account of multipath affection and usage of signal. By setting the guard time Tg longer than the multipath affected time, e.g. TV ghost, modulated signals from the inverse FFT circuit 40 are converted by a parallel to serial converter 4e into one signal and, then, transmitted from a transmitting circuit 5 as an RF signal.

Next, an action of a receiver 43 will be described. A received signal, shown as time-base symbol signal 796e of FIG. 124, is fed into an input section 24 of FIG. 123. Then, the received signal is converted into a digital signal in a demodulator 852b and further changed into Fourier coefficients in a FFT 40a. Thus, the signal is mapped from the time axis 799 to the frequency axis 793a as shown in FIG. 124. That is, the time-base symbol signal is converted into frequency-base carriers 794a, 794b,—. As these carriers are in quadrature relationship with each other, it is possible to separate respective modulated signals. FIG. 125(b) shows thus demodulated 16 SRQAM signal, which is then fed to respective C-CDM demodulators 45a, 45b,—of a C-CDM demodulator 45, in which demodulated 16 SRQAM signal is demodulated into multi-level sub signals $D_1$, $D_2$. These sub signals $D_1$ and $D_2$ are further demodulated by a $D_1$ parallel to serial converter 852a and a $D_2$ parallel to serial converter 852b into original $D_1$ and $D_2$ signals.

Since the signal transmission system is of C-CDM multi-level shown in 125(b), both $D_1$ and $D_2$ signals will be demodulated under better receiving condition but only $D_1$ signal will be demodulated under worse, e.g. low C/N rate, receiving condition. Demodulated $D_1$ signal is demodulated in an output section 757. As $D_{1-1}$ signal has higher ECC code gain as compared with the $D_{1-2}$ signal, an error signal of the $D_{1-1}$ signal is reproduced even under worse receiving condition.

The $D_{1-1}$ signal is converted by a 1-1 video decoder 402c into a low frequency band signal and outputted as an LDTV, and the $D_{1-2}$ signal is converted by a 1-2 video decoder 402d into a medium frequency band signal and outputted as EDTV.

The $D_2$ signal is Trellis decoded by a Trellis decoder [75 9b] *759b* and converted by a second video decoder 402b into a high frequency band signal and outputted as an HDTV signal. Namely, an LDTV signal is outputted in case of the low frequency band signal only. An EDTV signal of a wide NTSC grade is outputted if the medium frequency band signal is added to the low frequency band signal, and an HDTV signal is produced by adding low, medium, and high frequency band signals. As well as the previous embodiment, a TV signal having a picture quality depending on a receiving C/N rate can be received. Thus, the ninth embodiment realizes a novel multi-level signal transmission system by combining an OFDM and a C-CDM, which was not obtained by the OFDM alone.

An OFDM is certainly strong against multipath such as TV ghost because the guard time Tg can absorb an interference signal of multipath. Accordingly, the OFDM is applicable to the digital TV broadcasting for automotive vehicle TV receivers. Meanwhile, no OFDM signal is received when the C/N rate is less than a predetermined value because its signal transmission pattern is [non] *not* of a multi-level type.

However the present invention can solve this disadvantage by combining the OFDM with the C-CDM, thus realizing a [graditional] *gradational* degradation depending on the C/N rate in a video signal reception without being disturbed by multipath.

When a TV signal is received in a compartment of *a* vehicle, not only the reception is disturbed by multipath but the C/N rate is deteriorated. Therefore, the broadcast service area of a TV broadcast station will not be expanded as excepted if the countermeasure is only for multipath.

On the other hand, a reception of TV signal of at least LDTV grade will be ensured by the combination with the multi-level transmission C-CDM even if the C/N rate is fairly deteriorated. As a picture plane size of an automotive vehicle TV is normally less than 10 inches, a TV signal of an LDTV grade will provide a satisfactory picture quality. Thus, the LDTV grade service area of automotive vehicle TV will *be* largely expanded. If an OFDM is used in an entire frequency band of HDTV signal, present semiconductor for technologies cannot prevent circuitry scale from increasing so far.

Now, an OFDM method of transmitting only $D_{1-1}$ of low frequency band TV signal will be explained below. As shown in a block diagram in FIG. 138, a medium frequency band component $D_{1-2}$ and a high frequency band component $D_2$ of an HDTV signal are multiplexed in C-CDM modulator 4a, and then transmitted at a frequency band A through an FDM 40d.

On the other hand, a signal received by a receiver 43 is first of all frequency separated by an FDM 40e and, then, demodulated by a C-CDM demodulator 4b of the present invention. Thereafter, thus C-CDM demodulated signal is reproduced into medium and high frequency components of HDTV in the same way as in FIG. 123. An operation of a video decoder 402 is identical to that of embodiments 1, 2, and 3 and will not be explained in greater detail.

Meanwhile, the $D_{1-1}$ signal, a low frequency band signal of MPEG 1 grade of HDTV, is converted by a serial to parallel converter 791 into a parallel signal and fed to an OFDM modulator 852c, which executes QPSK or 16 QAM modulation. Subsequently, the $D_{1-1}$ signal is converted by an inverse FFT 40 into a time-base signal and transmitted at a frequency band B through a FDM 40d.

On the other hand, a signal received by the receiver 43 is frequency separated in the FDM 40e and then converted into a number of frequency-base signals in an FFT 40a of an OFDM [modulator] *demodulator* 852d. Thereafter, frequency-base signals are demodulated in respective demodulators 4a, 4b,—and are fed into a parallel to serial converter 882a, wherein a $D_{1-1}$ signal is demodulated. Thus, a $D_{1-1}$ signal of LDTV grade is outputted from the receiver 43.

In this manner, only an LDTV signal is OFDM modulated in the multi-level signal transmission. The method of FIG. 138 makes it possible to provide a complicated OFDM circuit only for an LDTV signal. A bit rate of LDTV signal is 1/20 of that of an HDTV. Therefore, the circuit scale of the OFDM will be reduced to 1/20, which results in an outstanding reduction of overall circuit scale.

An OFDM signal transmission system is strong against multipath and will soon be applied to a moving station, such as a portable TV, an automotive vehicle TV, or a digital music broadcast receiver, which is exposed under strong and variable multipath obstruction. For such usages a small picture size of less than 10 inches, 4 to 8 inches, is the mainstream. It will be thus guessed that the OFDM modulation of a high resolution TV signal such as HDTV or EDTV will bring less effect. In other words, the reception of a TV signal of LDTV grade would be sufficient for an automotive vehicle TV.

On the contrary, multipath is constant at a fixed station such as a home TV. Therefore, a countermeasure against multipath is relatively easy. Less effect will be brought to such a fixed station by OFDM unless it is in a ghost area. Using OFDM for medium and high frequency band components of HDTV is not advantageous in view of present circuit scale of OFDM which is still large.

Accordingly, the method of the present invention, in which OFDM is used only for a low frequency band TV signal as [sown] *shown* in FIG. 138, can widely reduce the circuit scale of the OFDM to less than 1/10 without losing inherent OFDM effect capable of largely reducing multiple obstruction of LDTV when received at a mobile station such as an automotive vehicle.

Although the OFDM modulation of FIG. 138 is performed only for $D_{1-1}$ signal, it is also possible to modulate both $D_{1-1}$ and [$D_{1-1}$] $D_{1-2}$ by OFDM. In such a case, a C-CDM two-level signal transmission is used for transmission of $D_{1-1}$ and $D_{1-2}$. Thus, a multi-level broadcasting being strong against multipath will be realized for a vehicle such as an automotive vehicle. Even in a vehicle, the gradational graduation will be realized in such a manner that LDTV and SDTV signals are received with picture qualities depending on receiving signal level or antenna sensitivity.

The multi-level signal transmission according to the present invention is feasible in this manner and produces various effects as previously described. Furthermore, if the multi-level signal transmission of the present invention is incorporated with an OFDM, it will become possible to provide a system strong against multipath and to alter data transmission grade in accordance with receivable signal level change.

FIG. 126(a) shows another method of realizing the multi-level signal transmission system, wherein the subchannels 794a–794c of the OFDM are assigned to a first layer 801a and the subchannels 794d–794f are assigned to a second layer 801b. There is provided a frequency guard zone 802a of $f_g$ between these two, first and second, layers. FIG. 126(b) shows an electric power difference 802b of Pg which is provided to differentiate the transmission power of the first and second layers 801a and 801b.

Figure 108A:
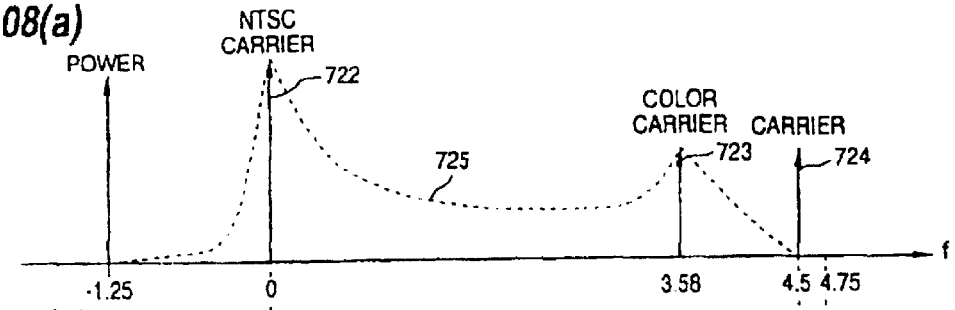
FIG. 108(a) is a diagram showing a frequency distribution profile of a conventional TV signal.
Figure 108B:
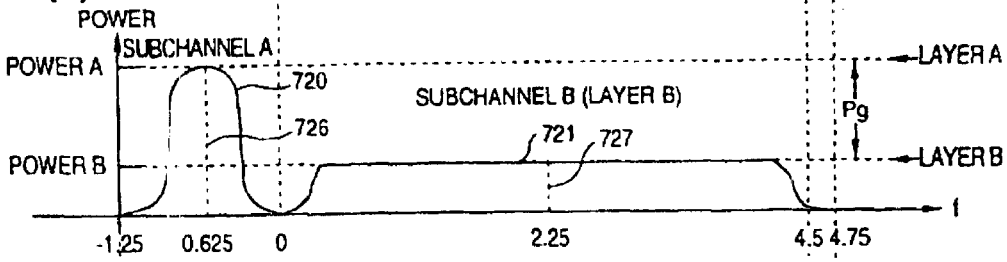
FIG. 108(b) is a diagram showing a frequency distribution profile of a conventional two-layer TV signal.
Figure 108C:
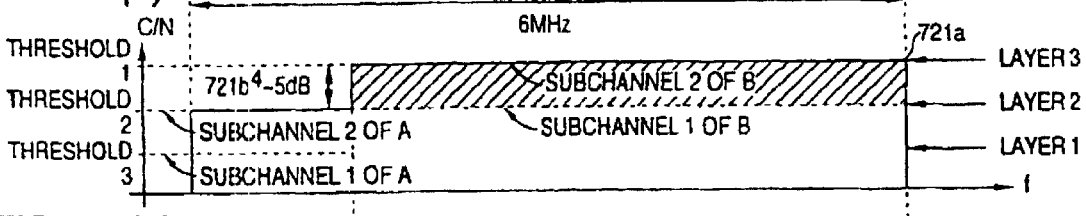
FIG. 108(c) is a diagram showing threshold values of the third embodiment.
Figure 108D:
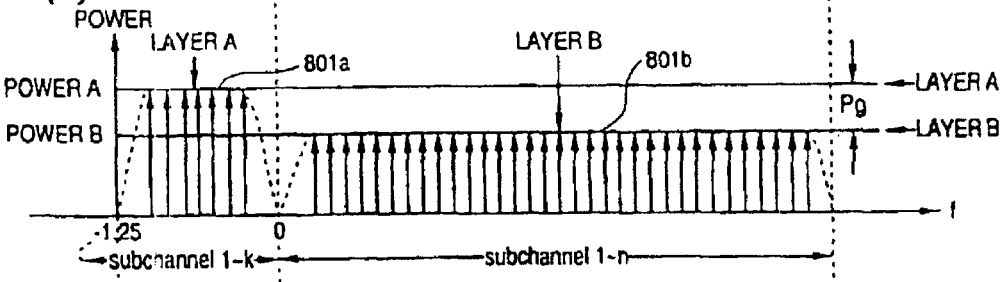
FIG. 108(d) is a diagram showing a frequency distribution profile of two-layer OFDM carriers of the ninth embodiment.
Figure 108E:
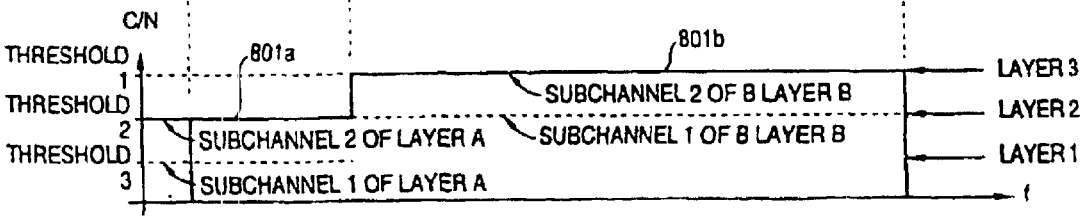
FIG. 108(e) is a diagram showing threshold values for three-layer OFDM of the ninth embodiment.

Utilization of this differentiation makes it possible to increase electric power of the first layer 801a in the range not obstructing the analogue TV broadcast service as shown in FIG. 108(d) previously described. In this case, a threshold value of the C/N ratio capable of receiving the first layer 801a becomes lower than that for the second layer 801b as shown in FIG. 108(e). Accordingly, the first layer 801a can be received even in a low signal-level area or in a large-noise area. Thus, a two-layer signal transmission is realized as shown in FIG. 147. This is referred to as Power-Weighted-OFDM system (i.e. PW-OFDM) in this specification. If this PW-OFDM system is combined with the C-CDM system previously explained, three layers will be realized as shown in FIG. 108(e) and, accordingly, the signal receivable area will be correspondingly expanded.

FIG. 144 shows a specific circuit, wherein the first layer data passing through the first data stream circuit 791 a is modulated into the carriers $f_1$–$f_3$ by the modulators 4a–4c having large amplitude and, then, are OFDM modulated in the inverse FFT 40. On the contrary, the second layer data passing through the second data stream circuit 791b is modulated into the carriers $f_6$–$f_8$ by the modulators 4d–4f having ordinary amplitude and, then, are OFDM modulated in the inverse FFT 40. Then, these OFDM modulated signals are transmitted from the transmit circuit 5.

A signal received by the receiver 43 is separated into several signals having carriers of $f_1$–$f_n$ through the FFT 40a. The carriers $f_1$–$f_3$ are demodulated by the demodulators 45a–45c to reproduce the first data stream $D_1$, i.e. the first layer 801a. On the other hand, the carriers $f_6$–$f_8$ are demodulated by the demodulators 45d–45f to reproduce the second data stream $D_2$, i.e. the second layer 801b.

The first layer 801a has so large electrical power that it can be received even in a weak-signal area. In this manner, the PW-OFDM system realizes the two-layer multi-level signal transmission. If this PW-OFDM is combined with the C-CDM, it will become possible to provide 3–4 layers. As the circuit of FIG. 144 is identical with the circuit of FIG. 123 in the remaining operations and, therefore, will not be explained in greater detail.

Next, a method of realizing a multi-level signal transmission in Time-Weighted-OFDM (i.e. TW-OFDM) in accordance with the present invention will be explained. Although the OFDM System is accompanied with the guard time zone $t_g$ as previously described, adverse affects of ghosts will be eliminated if the delay time $t_M$ of the ghost, i.e. multipath, signal satisfies the requirement of $t_M<t_g$. The delay time $t_M$ will be relatively small, for example in the range of several [microsounds] *microseconds*, in a fixed station such as a TV receiver used for home use. Furthermore, as its value is constant, cancellation of ghosts will be relatively easily done. On the contrary, reflected waves will increase in case of a mobile station such as a vehicle TV receiver. Therefore, the delay time $t_M$ becomes relatively large, for example in the range of several tens [microsound] *microsecond*. Furthermore, the magnitude of $t_M$ varies in response to the running movement of the vehicle. Thus, cancellation of ghosts tends to be difficult. Hence, the multi-level signal transmission is key or essential for such a mobile station TV receiver in order to eliminate adverse affection of multipath.

The multi-level signal transmission in accordance with the present invention will be explained below. A symbol contained in the [subcannel] *subchannel* layer A can be intensified against the ghosts by setting a guard time $t_{ga}$ of the layer A to be larger than a guard time $t_{gb}$ of the layer B as shown in FIG. 146. In this manner, the multi-layer signal transmission can be realized against multipath by use of weighting of guard time. This system is referred to as Guard-Time-Weighted-OFDM (i.e. QTW-OFDM).

If the symbol number of the symbol time Ts is not different in the layer A and in the layer B, a symbol time $t_{sa}$ of the layer A is set to be [larger] *smaller* than a symbol time $t_{sb}$ of the layer B. With this differentiation, a carrier width Δfa of the carrier A becomes larger than a carrier width Δfb of the carrier B. [(Δfa>Δfb)] ($\Delta fa<\Delta fb$)Therefore, the error rate becomes lower in the demodulation of the symbol of the layer A compared with the demodulation of the symbol of the layer B. Thus, the differentiation of the layer A and B in the weighting of the symbol time Ts can realize a two-layer signal transmission against multipath. This system is referred to as Carrier-Spacing-Weighted-OFDM (i.e. CSW-OFDM).

By realizing the two-layer signal transmission based on the GTW-OFDM, wherein a low-resolution TV signal is transmitted by the layer A and a high-frequency component is transmitted by the layer B, the vehicle TV receiver can stably receive the low-resolution TV signal regardless of tough ghost. Furthermore, the multi-level signal transmission with respect to the C/N ratio can be realized by differentiating the symbol time $t_s$ based on the CSW-OFDM between the layers A and B. If this CSW-OFDM is combined with the GTW-OFDM, the signal reception in the vehicle TV receiver can be further stabilized. High resolution is not normally required to the vehicle TV or the portable TV.

As the time ratio of the symbol time including a low-resolution TV signal is small, an overall transmission efficiency will not decrease so much even if the guard time is enlarged. Accordingly, using the GTW-OFDM of the present invention for suppressing multipath by laying emphasis on the low-resolution TV signal will realize the multi-layer type TV broadcast service wherein the mobile station such as the portable or vehicle TV receiver can be compatible with the stationary station such as the home TV without substantially lowering the transmission efficiency. If combined with the CSW-OFDM or the C-CDM as described previously, the multi-layer to the C/N ratio can be also realized. Thus, the signal reception in the mobile station will be further stabilized.

An affection of the multipath will be explained in more detail. In case of multipath 810a, 810b, 810c, and 810d having shorter delay time as shown in FIG. 145(a), the signals of both the first and second layers can be received and therefore the HDTV signal can be demodulated. On the contrary, in case of multipath 811a, 811b, 811c, and 811d having longer delay time as shown in FIG. 145(b), the B signal of the second layer cannot be received since its guard time $t_{gb}$ is not sufficiently long. However, the A signal of the first layer can be received without being bothered by the multipath since its guard time $t_{ga}$ is sufficiently long. As described above, the B signal includes the high-frequency component of TV signal. The A signal includes the low-frequency component of TV signal. Accordingly, the vehicle TV can reproduce the LDTV signal. Furthermore, as the symbol time Tsa is set larger than symbol time Tsb, the first layer is strong against deterioration of C/N ratio.

Such a discrimination of the guard time and the symbol time is effective to realize two-dimensional multi-layer signal transmission of the OFDM in a simple manner. If the discrimination of guard time is combined with the C-CDM in the circuit shown in FIG. 123, the multi-layer signal transmission effective against both multipath and deterioration of C/N ratio will be realized.

Next, a specific example will be described below.

The smaller the D/U ratio of the receiving signal becomes, the larger the multipath delay time $T_M$ becomes. Because, the reflected wave increases compared with the direct wave. For example, as shown in FIG. 148, if the D/U ratio is smaller than 30 dB, the delay time $T_M$ exceeds 30 [us] *μs* because of increase of the reflected wave. Therefore, as can be understood from FIG. 148, it will become possible to receive the signal even in the worst condition if the Tg is set to be larger than 50 [us] *μs*.

Accordingly, as shown in detail in FIGS. 149(a) and 149(b), three groups of first 801a, second 801b, and third [801 c] *801c* layers are assigned in a 2 ms period of 1 sec TV signal. The guard times 797a, 797b, and 797c, i.e. Tga, Tgb, and Tgc, of these three groups are weighted to be, for example, 50 [microsounds] *microseconds*, 5 [microsounds] *microseconds*, and 1 [microsound] *microsecond*, respectively, as shown in FIG. 149(c). Thus, three-layer signal transmission effective to the multipath will be realized as shown in FIG. 150, wherein three layers 801a, 801b, and 801c are provided.

[If the GTW-OFDM is applied to ass the picture quality, it is doubtless.]

At the same time, the multi-layer signal transmission effective to C/N ratio can be realized. By combining the CSW-OFDM and the CSW-OFDM, a two-dimensional multi-layer signal transmission is realized with respect to the multipath and the C/N ratio as shown in FIG. 151. As described previously, it is possible to combine the CSW-OFDM and the C-CDM of the present invention for preventing the overall transmission efficiency from being lowered. In the first, 1-2, and 1-3 layers 801a, 851a, and 851az, the LDTV grade signal can be stably received by, for example, the vehicle TV receiver subjected to the large multipath $T_M$ and low C/N ratio. In the second and 2–3 layers 801b and 851b, the standard-resolution SDTV grade signal can be received by the fixed or stationary station located, for example, in the fringe of the service area which is generally subjected to the lower C/N ratio and ghost. In the third layer 801c which occupies more than half of the service area, the HDTV grade signal can be received since the C/N ratio is high and the ghost is less because of large direct wave. In this manner, a two-dimensional multi-layer broadcast service effective to both the C/N ratio and the multipath can be realized by the combination of the GTW-OFDM and the C-CDM or the combination of the GTW-OFDM and the CSW-C-CDM in accordance with the present invention. [thus] *Thus*, the present invention realizes a two-dimensional, matrix type, multi-layer signal transmission system effective to both the C/N ratio and the 194 multipath, which has not ever been realized by the prior art technologies.

A timing chart of a three level (HDTV, SDTV, LDTV) television signal in a two-dimensional multilevel broadcast of three C/N levels and three multipath levels is shown in FIG. 152. As shown in the figure, the LDTV signal is positioned in slot 796a1 of the first level of [level] *layer* A, the level with the greatest resistance to multipath interference; the SDTV synchronization signal, address signal, and other important high priority signals are positioned in slot 796b2, which has the next greatest resistance to multipath interference, and slot 796b1, which has strong resistance to C/N deterioration. The SDTV common signal, i.e., low priority signals, and HDTV high priority signals are positioned in levels 2 and 3 of level B. SDTV, EDTV, HDTV, and other high frequency component television signals are positioned in levels 1, 2, and 3 of level C.

As the resistance to C/N deterioration and multipath interference increases, the transmission rate drops, causing the TV signal resolution to drop, and achieving the three-dimensional graceful degradation effect shown in FIG. 153 and unobtainable with conventional methods. As shown in FIG. 153, the three-dimensional multilevel broadcast structure of the invention is achieved with three parameters: C/N ratio, multipath delay time, and the transmission rate.

The present embodiment has been described using the example of a two-dimensional multilevel broadcast structure obtained by combining GTW-OFDM of the invention with C-CDM of the invention as previously described, or combining GTW-OFDM, CSW-C-CDM, but other two-dimensional multilevel broadcast structures can be obtained by combining GTW-OFDM and power-weighted OFDM, or GTW-OFDM with other C/N ratio multilevel transmission methods.

FIG. 154 is obtained by transmitting the power of carriers 794a, 794c, and 794e with less weighting compared with carriers 794b, 794d, and 794f, achieving a two level power-weighted OFDM. Two levels are obtained by power weighting carriers 795a and 795c, which are perpendicular to carrier 794a, to carriers 795b and 795d. While a total of four levels are obtained, the embodiment having only two levels is shown in FIG. 154. As shown in the figure, because the carrier frequencies are distributed, interference with other analog transmissions on the same frequency band is dispersed, and there is minimal adverse effect.

By using a time positioning varying the time width of guard times 797a, 797b, and 797c for each symbol 796a, 796b, and 796c as shown in FIG. 155, three-level multipath multilevel transmission can be achieved. Using the time positioning shown in FIG. 155, the A-, B-, and C-level data is distributed on the time axis. As a result, even if burst noise produced at a specific time occurs, data destruction can be prevented and the TV signal can be stably demodulated by interleaving the data from the different layers. In particular, by interleaving with the A level data distributed, interference from burst noise generated by the ignition systems of other vehicles can be significantly reduced in mobile TV receivers.

Block diagrams of a specific ECC encoder 744j and a specific ECC decoder [749j] *759j* are shown in FIG. 160a and FIG. 160b, respectively. FIG. 167 is a block diagram of the deinterleaver 936b. The interleave table 954 processed in the deinterleave RAM 936a of the deinterleaver 936b is shown in FIG. 168a, and interleave distance L1 is shown in FIG. 168b.

Burst noise interference can be reduced by interleaving the data in this way. By using a 4-level VSB, 8-level VSB, or 16-level VSB transmission apparatus as described in embodiments 4, 5, and 6, respectively, and shown in the VSB receiver block diagram (FIG. 161) and the VSB transmitter block diagram (FIG. 162), or by using a QAM or PSK transmission apparatus as described in embodiments 1 and 2, respectively, burst noise interference can be reduced, and television reception with very low noise levels can be achieved in ground station broadcasting.

By using 3-level broadcasting by means of the method shown in FIG. 155, LDTV grade television reception by mobile receivers, including mobile TV receivers in motor vehicles and hand-held portable television sets, can be stabilized because level A has the effect of reducing burst noise interference in addition to multipath interference and C/N ratio deterioration.

The multi-level signal transmission method of the present invention is intended to increase the utilization of frequencies but may be suited for not all the transmission systems since causing some type receivers to be declined in the energy utilization. It is a good idea for use with a satellite communications system for selected subscribers to employ most advanced transmitters and receivers designed for best utilization of applicable frequencies and energy. Such a specific purpose signal transmission system will not be bound by the present invention.

The present invention will be advantageous for use with a satellite or terrestrial broadcast service which is essential to run in the same standards for as long as 50 years. During the service period, the broadcast standards must not be altered but improvements will be provided time to time corresponding to up-to-date technological achievements. Particularly, the energy for signal transmission will surely be increased on any satellite. Each TV station should provide a compatible service for guaranteeing TV program signal reception to any type receivers ranging from today's common ones to future advanced ones. The signal transmission system of the present invention can provide a compatible broadcast service of both the existing NTSC and HDTV systems and also, ensure a future extension to match mass [date] *data* transmission.

The present invention concerns much on the frequency utilization than the energy utilization. The signal receiving sensitively of each receiver is arranged [different] *differently* depending on a signal state level to be received so that the transmitting power of a transmitter needs not be increased largely. Hence, existing satellites which offer a small energy for reception and transmission of a signal can best be used with the system of the present invention. The system is also arranged for performing the same standards corresponding to an increase in the transmission energy in the future and offering the compatibility between old and new type receivers. In addition, the present invention will be more advantageous for use with the satellite broadcast standards.

The multi-level signal transmission method of the present invention is more preferably employed for terrestrial TV broadcast service in which the energy utilization is not crucial, as compared with satellite broadcast service. The results are such that the signal attenuating regions in a service area which are attributed to a conventional digital HDTV broadcast system are considerably reduced in extension and also, the compatibility of an HDTV receiver or display with the existing NTSC system is obtained. Furthermore, the service area is substantially increased so that program suppliers and sponsors can appreciate more viewers. Although the embodiments of the present invention refer to 16 and 32 QAM procedures, other modulation techniques including 64, 128, and 256 QAM will be employed with equal success. Also, multiple PSK, ASK, and FSK techniques will be applicable as described with the embodiments.

A combination of the TDM with the SRQAM of the present invention has been described in the above, However, the SRQAM of the present invention can be combined also with any of the FDM, CDMA and frequency dispersal communications systems.

What is claimed is:

[1. A signal transmission and reception apparatus for transmitting and receiving an n-level VSB signal, the apparatus comprising a transmitter and a receiver;

said transmitter comprising:

a compression means for compressing an input video signal to a digital video compression signal;

an error correction encoding means for adding an error correction code to the digital video compression signal to produce an error correction coded signal;

a modulation means for modulating the error correction coded signal to an n-level VSB modulation signal, said modulation means comprising a means for allocating code points along a uniaxial modulation coordinate system, and a filter means having a plurality of coefficients which are a series of impulse responses defined by plotting timebase responses to the VSB modulation signal along the in-phase axis and its orthogonal axis for filtering a series of said code points allocated along the uniaxial modulation coordinate system; and a transmission means for transmitting the modulation signal, and said receiver comprising:

a means for receiving a transmitted n-level VSB modulation signal;

a demodulation means for demodulating the received n-level VSB modulation signal into a digital reception signal;

an error correction means for error correcting the digital reception signal to obtain an error-corrected digital signal; and an expanding means for expanding the error-corrected digital signal to obtain a video output signal.]

[2. A transmission and reception apparatus according to claim 1, wherein the error correction means comprises a trellis decoder.]

[3. A transmission and reception apparatus according to claim 2, wherein the trellis decoder is associated with a plurality of memories which each holds a number of selectable correct codes.]

[4. A transmission and reception apparatus according to claim 1, wherein the digital reception signal is divided into a high priority signal and a low priority signal, and wherein said error correction means comprises a high code gain first error correction means and a low code gain second error correction means, said first error correction means correcting the high priority signal.]

[5. A transmission and reception apparatus according to claim 4, wherein the high priority signal carries the address data for all data.]

[6. A transmission and reception apparatus according to claim 4, wherein the first error correction means comprises a trellis decoder.]

[7. A signal transmission and reception apparatus according to claim 1, further comprising a band path filtering means for filtering the n-level VSB modulation signal before being transmitted.]

[8. A signal transmission and reception apparatus for transmitting an n-level VSB signal, comprising:

a compression means for compressing an input video signal to a digital video compression signal;

an error correction encoding means for adding an error correction code to the digital video compression signal to produce an error correction coded signal;

a modulation means for modulating the error correction coded signal to an n-level VSB modulation signal, said modulation means comprising a means for allocating code points along a uniaxial modulation coordinate system, and a filter means having a plurality of coefficients which are a series of impulse responses defined by plotting timebase responses to the VSB modulation signal along the in-phase axis and its orthogonal axis for filtering a series of said code points allocated along the uniaxial modulation coordinate system; and a transmission means for transmitting the modulation signal.]

[9. A signal transmission apparatus according to claim 8, further comprising a band path filtering means for filtering the n-level VSB modulation signal before being transmitted.]

[10. A signal receiving apparatus comprising:

a tuner for receiving a transmission signal containing a digital modulation signal and an analog modulation signal and for selecting the digital modulation signal using a local oscillation signal;

an interference detecting means for detecting interference caused by the analog modulation signal from the digital modulation signal selected by the tuner;

a notch filter means responsive to the interference detected by the interference detecting means for removing a carrier of the analog modulation signal in a same frequency band as a frequency band of the digital modulation signal;

an error ratio calculating means for calculating a bit error ratio of an output of the notch filter means; and an automatic frequency correcting means for changing a frequency of the local oscillation signal of the tuner according to a level of the interference detected by the interference detecting means and the bit error ratio calculated by the error ratio calculating means to compensate for a frequency offset of the carrier of the analog modulated signal.]

[11. A signal receiving apparatus according to claim 10, wherein the digital modulation signal is an n-level VSB modulation signal.]

[12. A signal receiving apparatus comprising:

a tuner for receiving a transmission signal containing at least one of a VSB modulated signal and a QAM modulated signal and for selecting one of the VSB modulated signal and the QAM modulated signal to obtain a selected signal;

an analog-to-digital converter for converting the selected signal into a series of digital codes;

a transversal filter provided on an orthogonal axis for suppressing a transmission distortion of the series of digital codes with respect to both orthogonal axes to obtain a series of filtered digital codes allocated on the orthogonal axes;

a carrier recovery means for phase-compensating a carrier of the filtered digital codes allocated on the orthogonal axis outputted from the transversal filter; and a control means for producing a control signal to extract detected codes at equal time intervals from the VSB modulated signal;

a clock reproducing means for phase synchronizing entire codes of the QAM modulated signal when the selected signal is the QAM modulated signal and for phase synchronizing codes of the VSB modulated signal intermittently at predetermined intervals when the selected signal is the VSB modulated signal; and a decoding means for decoding an output of the carrier recovery means.]

*13. A signal receiving apparatus comprising:*

*a receiver operable to receive a digital modulated signal;*

*a demodulator operable to demodulate the digital modulated signal to a data stream;*

*a decoder operable to decode the data stream to an HDTV signal;*

*a controller operable to examine the quality of the data stream; and*

*an output unit operable to output the HDTV signal and to stop outputting the HDTV signal after the quality of the data stream continues being lower than a predetermined acceptable quality for a predetermined period of time.*

*14. A signal receiving apparatus according to claim 13, further comprising a display operable to display the HDTV signal.*

*15. A signal receiving apparatus comprising:*

*a receiver operable to receive a digital modulated signal;*

*a demodulator operable to demodulate the digital modulated signal to a data stream;*

*a decoder operable to decode the data stream to an HDTV signal;*

*a controller operable to detect an error rate of the data stream; and*

*an output unit operable to output the HDTV signal and to stop outputting the HDTV signal after the error rate of the data stream continues being higher than a predetermined error rate for a predetermined period of time.*

*16. A signal receiving apparatus according to claim 15, further comprising a display operable to display the HDTV signal.*

*17. A signal receiving method comprising:*

*receiving a digital modulated signal;*

*demodulating the digital modulated signal to a data stream;*

*decoding the data stream to an HDTV signal;*

*examining the quality of the data stream; and*

*outputting the HDTV signal and stopping outputting the HDTV signal after the quality of the data stream continues being lower than a predetermined acceptable quality for a predetermined period of time.*

*18. A signal receiving method according to claim 17, further comprising displaying the HDTV signal.*

*19. A signal receiving method comprising:*

*receiving a digital modulated signal;*

*demodulating the digital modulated signal to a data stream;*

*decoding the data stream to an HDTV signal;*

*detecting an error rate of the data stream; and*

*outputting the HDTV signal and stopping outputting the HDTV signal after the error rate of the data stream continues being higher than a predetermined error rate for a predetermined period of time.*

*20. A signal receiving method according to claim 19, further comprising a display operable to display the HDTV signal.*

*21. A signal receiving apparatus comprising:*

*a receiver operable to receive a digital modulated signal;*

*a demodulator operable to demodulate the digital modulated signal to a data stream;*

*a decoder operable to decode the data stream to a TV signal;*

*a controller operable to examine the quality of the data stream; and*

*an output unit operable to output the TV signal and to stop outputting the TV signal after the quality of the data stream continues being lower than a predetermined acceptable quality for a predetermined period of time.*

*22. A signal receiving apparatus according to claim 21, further comprising a display operable to display the TV signal.*

*23. A signal receiving apparatus comprising:*

*a receiver operable to receive a digital modulated signal;*

*a demodulator operable to demodulate the digital modulated signal to a data stream;*

*a decoder operable to decode the data stream to a TV signal;*

*a controller operable to detect an error rate of the data stream; and*

*an output unit operable to output the TV signal and to stop outputting the TV signal after the error rate of the data stream continues being higher than a predetermined error rate for a predetermined period of time.*

*24. A signal receiving apparatus according to claim 23, further comprising a display operable to display the TV signal.*

*25. A signal receiving method comprising:*

*receiving a digital modulated signal;*

*demodulating the digital modulated signal to a data stream;*

*decoding the data stream to a TV signal;*

*examining the quality of the data stream; and*

*outputting the TV signal and stopping outputting the TV signal after the quality of the data stream continues being lower than a predetermined acceptable quality for a predetermined period of time.*

*26. A signal receiving method according to claim 25, further comprising displaying the TV signal.*

*27. A signal receiving method comprising:*

*receiving a digital modulated signal;*

*demodulating the digital modulated signal to a data stream;*

*decoding the data stream to a TV signal;*

*detecting an error rate of the data stream; and*

*outputting the TV signal and stopping outputting the TV signal after the error rate of the data stream continues being higher than a predetermined error rate for a predetermined period of time.*

*28. A signal receiving method according to claim 27, further comprising a display operable to display the TV signal.*

* * * * *